US012528215B2

(12) United States Patent
Robertson et al.

(10) Patent No.: US 12,528,215 B2
(45) **Date of Patent: *Jan. 20, 2026**

(54) SHAVING DEVICE

(71) Applicant: INSIGNIA IP DEVELOPMENT COMPANY, LLC, Sandwich, MA (US)

(72) Inventors: Ruairidh Robertson, Sandwich, MA (US); David Carpenter, Jaffrey, NH (US); Alan Kenneth Stratton, Milford, NH (US); George K. Bonnoitt, Amherst, NH (US)

(73) Assignee: INSIGNIA IP DEVELOPMENT COMPANY, LLC, Magnolia, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,316

(22) Filed: Feb. 6, 2023

(65) Prior Publication Data

US 2024/0025066 A1 Jan. 25, 2024

Related U.S. Application Data

(63) Continuation of application No. 16/871,544, filed on May 11, 2020, now abandoned, which is a
(Continued)

(51) Int. Cl.
*B26B 21/52* (2006.01)
*B26B 21/10* (2006.01)
(Continued)

(52) U.S. Cl.
CPC ............ *B26B 21/521* (2013.01); *B26B 21/10* (2013.01); *B26B 21/22* (2013.01); *B26B 21/225* (2013.01);
(Continued)

(58) Field of Classification Search
CPC ....... B26B 21/10; B26B 21/22; B26B 21/225; B26B 21/24; B26B 21/4012;
(Continued)

(56) References Cited

U.S. PATENT DOCUMENTS 3,740,841 A * 6/1973 Risher ..................... B26B 21/16
30/57
5,167,069 A 12/1992 Quinn
(Continued)

FOREIGN PATENT DOCUMENTS

CN 2074705 U 4/1991
CN 103648735 A 3/2014
(Continued)

OTHER PUBLICATIONS

Notice of Allowance mailed Jan. 12, 2021, issued in U.S. Appl. No. 15/433,988.
(Continued)

*Primary Examiner* — Liang Dong
(74) *Attorney, Agent, or Firm* — Grossman, Tucker, Perreault & Pfleger, PLLC

(57) ABSTRACT

A shaving device comprising a head assembly including a support member having at least one support member magnet and a blade cartridge having at least one face with at least one razor blade and configured to be rotatably coupled to the support member about a pivot axis. The blade cartridge includes at least one blade cartridge magnet having a pole aligned with a pole of the support member magnet to generate a magnetic force that urges the blade cartridge about the pivot axis towards an initial starting position (ISP), wherein the blade cartridge is further configured to rotate about the pivot axis away from the ISP upon application of
(Continued)

an external force sufficient to overcome the magnetic force between the support member magnet and the blade cartridge magnet.

19 Claims, 267 Drawing Sheets

Related U.S. Application Data continuation of application No. 16/566,302, filed on Sep. 10, 2019, now Pat. No. 10,647,012, which is a continuation of application No. 16/175,033, filed on Oct. 30, 2018, now Pat. No. 10,406,707, which is a continuation of application No. 15/716,504, filed on Sep. 26, 2017, now Pat. No. 10,112,313, which is a continuation-in-part of application No. 15/433,988, filed on Feb. 15, 2017, now Pat. No. 11,014,255, which is a continuation-in-part of application No. 15/241,042, filed on Aug. 18, 2016, now Pat. No. 9,764,487, which is a continuation-in-part of application No. 15/135,485, filed on Apr. 21, 2016, now Pat. No. 9,687,989, which is a continuation-in-part of application No. 14/977,560, filed on Dec. 21, 2015, now Pat. No. 9,550,303, which is a continuation-in-part of application No. 14/873,857, filed on Oct. 2, 2015, now Pat. No. 9,808,945, which is a continuation of application No. 14/627,282, filed on Feb. 20, 2015, now Pat. No. 9,259,846.

(60) Provisional application No. 62/201,551, filed on Aug. 5, 2015, provisional application No. 62/060,700, filed on Oct. 7, 2014.

(51) Int. Cl.

| | |
|---|---|
| ***B26B 21/22*** | (2006.01) |
| ***B26B 21/24*** | (2006.01) |
| ***B26B 21/40*** | (2006.01) |
| ***B26B 21/44*** | (2006.01) |
| *B26B 21/16* | (2006.01) |
| *B26B 21/20* | (2006.01) |
| *B26B 21/28* | (2006.01) |

(52) U.S. Cl.
CPC .......... *B26B 21/24* (2013.01); *B26B 21/4012* (2013.01); *B26B 21/4062* (2013.01); *B26B 21/443* (2013.01); *B26B 21/52* (2013.01); *B26B 21/523* (2013.01); *B26B 21/16* (2013.01); *B26B 21/20* (2013.01); *B26B 21/28* (2013.01); *B26B 21/4018* (2013.01)

(58) Field of Classification Search
CPC ... B26B 21/4062; B26B 21/443; B26B 21/52; B26B 21/523; B26B 21/16; B26B 21/20; B26B 21/28; B26B 21/4018
See application file for complete search history.

(56) References Cited

U.S. PATENT DOCUMENTS

| | | | |
|---|---|---|---|
| 5,343,622 | A | 9/1994 | Andrews |
| 5,522,137 | A | 6/1996 | Andrews |
| 5,575,068 | A | 11/1996 | Pedersen |
| D388,540 | S | 12/1997 | Ramar |
| 5,911,480 | A | 6/1999 | Morgan |
| 6,082,007 | A | 7/2000 | Andrews |
| 6,115,924 | A | 9/2000 | Oldroyd |
| 6,125,542 | A | 10/2000 | Somma |
| 6,161,288 | A | 12/2000 | Andrews |
| 6,189,222 | B1 | 2/2001 | Doyle |
| 6,266,888 | B1 | 7/2001 | Zowaski |
| 6,434,828 | B1 | 8/2002 | Andrews |
| 6,725,550 | B1 | 4/2004 | Shah |
| 6,915,580 | B2 | 7/2005 | Dassel |
| 7,086,160 | B2 | 8/2006 | Coffin et al. |
| 7,140,116 | B2 | 11/2006 | Coffin |
| 7,578,062 | B2 | 8/2009 | Blackburn |
| 7,895,754 | B2 | 3/2011 | Blackburn |
| 7,913,393 | B2 | 3/2011 | Royle et al. |
| 7,937,837 | B2 | 5/2011 | Psimadas et al. |
| 8,122,606 | B2 | 2/2012 | Hart |
| D656,677 | S | 3/2012 | Cavazos Jimenez et al. |
| D659,285 | S | 5/2012 | Lukan et al. |
| 8,205,343 | B2 | 6/2012 | Winter et al. |
| D664,712 | S | 7/2012 | Christie et al. |
| 8,474,144 | B2 | 7/2013 | Royle |
| 8,567,068 | B2 | 10/2013 | Luxton |
| 8,595,938 | B2 | 12/2013 | Bodet |
| D700,995 | S | 3/2014 | Lee et al. |
| 8,745,876 | B2 | 6/2014 | Hage et al. |
| 8,745,883 | B2 | 6/2014 | Murgida et al. |
| 9,032,631 | B2 | 5/2015 | Christie et al. |
| D749,264 | S | 2/2016 | Leatherman et al. |
| D749,267 | S | 2/2016 | Letherman |
| 9,259,846 | B1 | 2/2016 | Robertson |
| 9,522,472 | B2 | 12/2016 | Leicht et al. |
| 9,550,303 | B2 | 1/2017 | Robertson et al. |
| 9,687,989 | B2 | 6/2017 | Robertson et al. |
| 9,764,487 | B2 | 9/2017 | Robertson et al. |
| 9,808,945 | B2 | 11/2017 | Robertson |
| D806,950 | S | 1/2018 | Robertson |
| 2005/0005400 | A1* | 1/2005 | Park .................... H04M 1/0212 16/367 |
| 2005/0034314 | A1 | 2/2005 | Cuisinier |
| 2005/0138814 | A1 | 6/2005 | Pennella et al. |
| 2005/0198840 | A1 | 9/2005 | Worrick, III et al. |
| 2005/0198841 | A1 | 9/2005 | Worrick, III |
| 2007/0089960 | A1 | 4/2007 | Kanehisa |
| 2008/0155831 | A1 | 7/2008 | Royle |
| 2009/0013534 | A1 | 1/2009 | Mallaridas |
| 2010/0083505 | A1 | 4/2010 | Royle et al. |
| 2010/0101093 | A1 | 4/2010 | Avans et al. |
| 2011/0146079 | A1 | 6/2011 | Clarke et al. |
| 2011/0277326 | A1 | 11/2011 | Bodet |
| 2011/0283539 | A1 | 11/2011 | Bryan |
| 2012/0137526 | A1* | 6/2012 | Forman ................... B26B 13/12 30/146 |
| 2012/0198698 | A1 | 8/2012 | Szczepanowski et al. |
| 2012/0255185 | A1 | 10/2012 | Patel et al. |
| 2012/0311865 | A1 | 12/2012 | Hamilton et al. |
| 2013/0152400 | A1 | 6/2013 | Nunez |
| 2013/0312265 | A1 | 11/2013 | Wilson et al. |
| 2013/0312272 | A1 | 11/2013 | Wilson et al. |
| 2014/0026726 | A1 | 1/2014 | Griffin et al. |
| 2014/0083265 | A1 | 3/2014 | Provost et al. |
| 2014/0096402 | A1 | 4/2014 | Nakasuka et al. |
| 2014/0116211 | A1 | 5/2014 | Griffin et al. |
| 2014/0165800 | A1 | 6/2014 | Griffin et al. |
| 2014/0237830 | A1 | 8/2014 | Wilson et al. |
| 2015/0090085 | A1 | 4/2015 | Griffin et al. |
| 2015/0157109 | A1 | 6/2015 | Provost et al. |
| 2015/0158192 | A1 | 6/2015 | Tucker et al. |
| 2015/0174775 | A1 | 6/2015 | Hodgson |
| 2015/0174776 | A1 | 6/2015 | Hawes |
| 2015/0190935 | A1 | 7/2015 | Griffin et al. |
| 2015/0190936 | A1 | 7/2015 | Griffin et al. |
| 2015/0321366 | A1 | 11/2015 | Papadopoulos-Papageorgis et al. |
| 2016/0096280 | A1 | 4/2016 | Robertson |
| 2016/0107324 | A1 | 4/2016 | Robertson |
| 2017/0021513 | A1 | 1/2017 | Liberatore |
| 2017/0043492 | A1 | 2/2017 | Robertson et al. |
| 2017/0282387 | A1 | 10/2017 | Robertson et al. |
| 2017/0291320 | A1 | 10/2017 | Robertson et al. |
| 2017/0361481 | A1 | 12/2017 | Robertson et al. |

(56) References Cited

U.S. PATENT DOCUMENTS

| | | | |
|---|---|---|---|
| 2018/0001496 | A1 | 1/2018 | Robertson et al. |
| 2022/0055240 | A1 | 2/2022 | Wilson et al. |

FOREIGN PATENT DOCUMENTS

| | | | | | |
|---|---|---|---|---|---|
| CN | 104582913 | A | | 4/2015 | |
| DE | 102009050344 | A1 | | 5/2011 | |
| EP | 2379289 | | | 10/2011 | |
| RU | 2441746 | C2 | | 2/2012 | |
| WO | 9727030 | | | 7/1997 | |
| WO | WO-9727030 | A1 | * | 7/1997 | ............. B26B 21/14 |
| WO | 03095162 | | | 11/2003 | |
| WO | 2008085002 | | | 7/2008 | |
| WO | WO-2008085002 | A1 | * | 7/2008 | ............. B26B 21/14 |
| WO | 2013148480 | | | 10/2013 | |
| WO | 2013165954 | | | 11/2013 | |
| WO | 2015134700 | | | 9/2015 | |
| WO | 2016057066 | | | 4/2016 | |
| WO | 2017024156 | | | 2/2017 | |

OTHER PUBLICATIONS

U.S. Office Action mailed Nov. 24, 2021, received in U.S. Appl. No. 15/708,635.

U.S. Office Action mailed Dec. 7, 2021, received in U.S. Appl. No. 16/871,544.

U.S. Office Action mailed May 12, 2021, received in U.S. Appl. No. 15/708,635.

Indian Office Action with English translation issued May 31, 2021, received in Indian Patent Application No. 201927010292.

Brazilian Office Action with English translation issued Jun. 15, 2021, received in Brazil Patent Application No. BR12-2020-015146-3.

Brazilian Office Action with English translation issued Jul. 21, 2021, received in Brazil Patent Application No. BR11-2019-003255-0.

Chinese Office Action with English translation issued Jul. 21, 2021, received in Chinese Patent Application No. CN201780060517.1.

Japan Office Action from related application 2021-131391 mailed Aug. 30, 2022, with English translation.

Canada Office Action from related application 2,994,679 mailed Nov. 3, 2022.

Brazil Office Action from related application BR112019003255-0 mailed Aug. 9, 2022 with English translation.

First Examination Report from related Indian Appln. No. 202128020189, dated May 31, 2022, with English translation.

First Office Action from related Chinese Appln. No. 202110190114.7, dated Jun. 2, 2022. English translation attached.

European Office Action from related application 20156592.6 dated Jun. 2, 2022.

Office Action dated Apr. 9, 2015, issued in U.S. Appl. No. 14/627,282, 15 pages.

International Search Report and Written Opinion dated May 15, 2015, issued in PCT Patent Application No. PCT/US15/16767, 14 pages.

Notice of Allowance dated Aug. 14, 2015, issued in U.S. Appl. No. 14/627,282, 11 pages.

Office Action dated Mar. 24, 2016, issued in U.S. Appl. No. 14/873,857, 12 pages.

Office Action dated Jun. 15, 2016, issued in U.S. Appl. No. 14/977,560, 13 pages.

Final Office Action dated Jul. 27, 2016, issued in U.S. Appl. No. 14/873,857, 13 pages.

Notice of Allowance dated Sep. 1, 2016, issued in U.S. Appl. No. 14/977,560, 10 pages.

International Search Report and Written Opinion dated Oct. 14, 2016, issued in PCT International Patent Application No. PCT/US2016/045591, 10 pages.

Office Action dated Sep. 21, 2016, issued in U.S. Appl. No. 15/135,485, 19 pages.

U.S. Office Action dated Dec. 15, 2016, issued in U.S. Appl. No. 14/873,857, 21 pages.

U.S. Notice of Allowance dated Feb. 9, 2017, issued in U.S. Appl. No. 15/135,485, 12 pages.

U.S. Office Action dated Feb. 22, 2017, issued in U.S. Appl. No. 15/241,042, 13 pages.

U.S. Notice of Allowance dated Apr. 10, 2017, issued in U.S. Appl. No. 15/241,042, 13 pages.

Preliminary Report on Patentability dated Apr. 20, 2017, issued in PCT Patent Application No. PCT/US2015/016767, 12 pages.

Preliminary Report on Patentability dated Apr. 20, 2017, issued in PCT Patent Application No. PCT/US2015/054155, 6 pages.

U.S. Final Office Action dated May 4, 2017, issued in U.S. Appl. No. 14/873,857, 17 pages.

Notice of Allowance mailed Jul. 28, 2017, issued in U.S. Appl. No. 14/873,857, 15 pages.

U.S. Office Action mailed May 21, 2018, issued in U.S. Appl. No. 15/716,504, 13 pages.

U.S. Office Action mailed May 22, 2018, issued in U.S. Appl. No. 15/708,635, 12 pages.

U.S. Notice of Allowance mailed Aug. 7, 2018, issued in U.S. Appl. No. 15/716,504, 11 pages.

U.S. Office Action mailed Jan. 10, 2018, issued in U.S. Appl. No. 15/628,082, 19 pages.

International Search Report and Written Opinion mailed Oct. 25, 2017, issued in PCT Patent Application No. PCT/US2017/047496, 8 pages.

* cited by examiner

10

FIG. 160
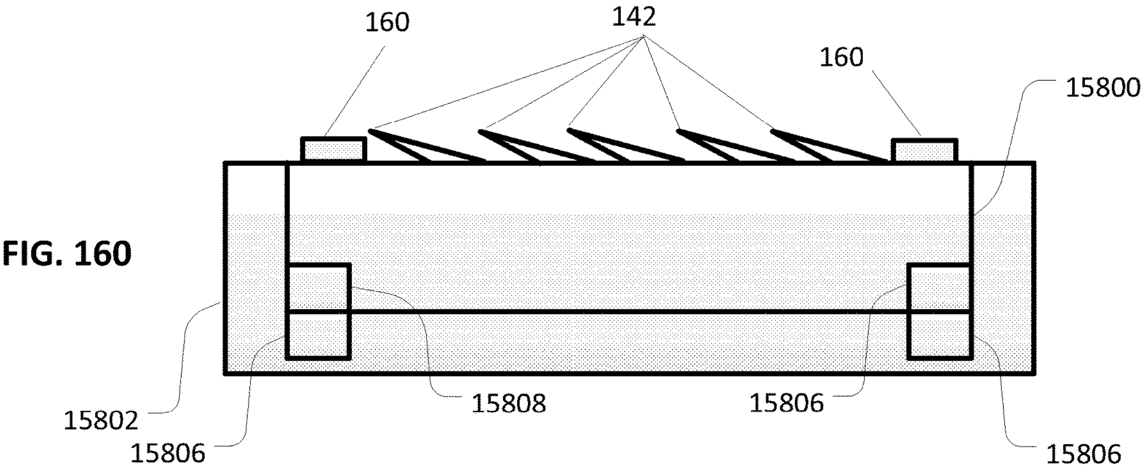
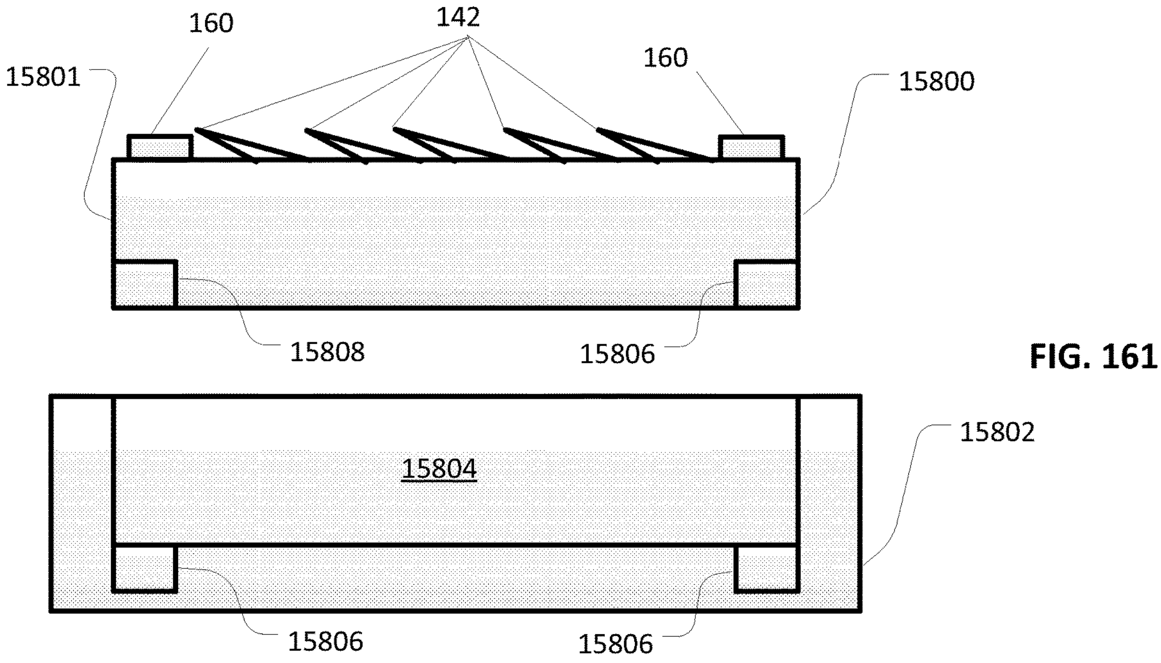
FIG. 161

FIG. 164
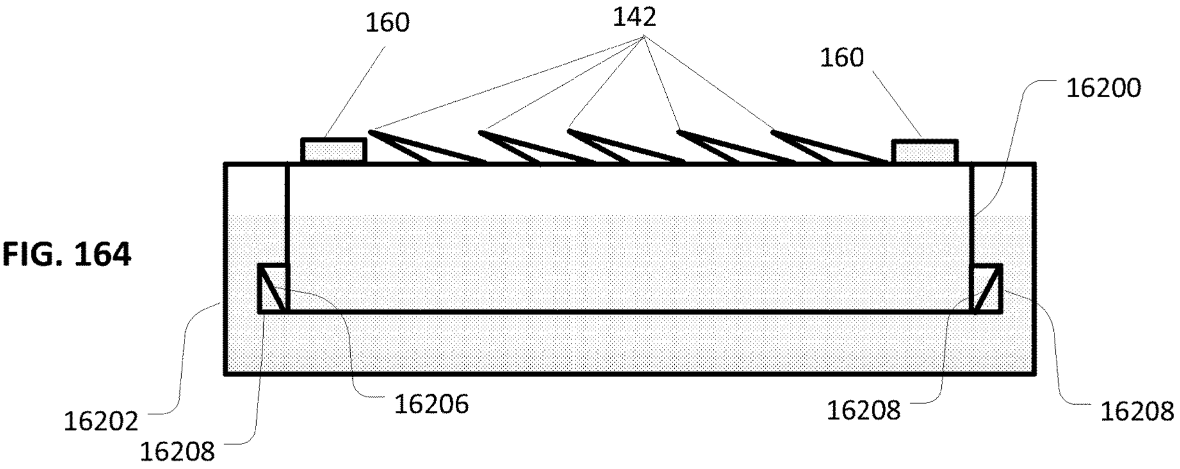
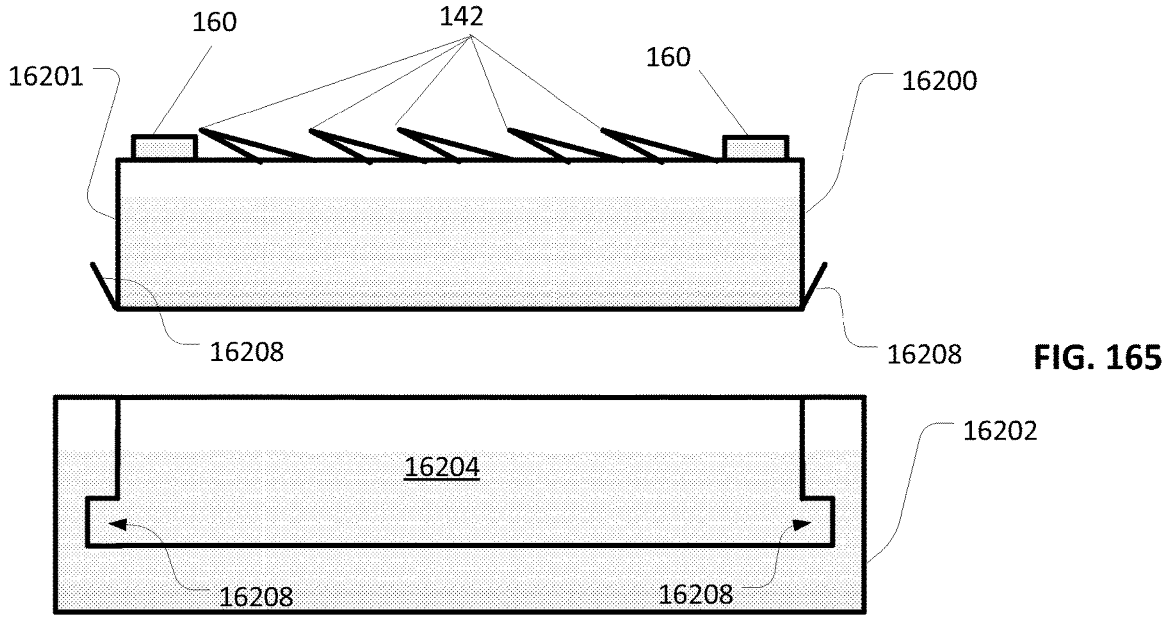
FIG. 165

SHAVING DEVICE

CROSS REFERENCE TO RELATED APPLICATION

This application is a continuation of U.S. patent application Ser. No. 16/871,544 filed May 11, 2020, which is a continuation of U.S. patent application Ser. No. 16/566,302 (now U.S. Pat. No. 10,647,012) filed Sep. 10, 2019, which is a continuation of U.S. patent application Ser. No. 16/175,033 (now U.S. Pat. No. 10,406,707) filed Oct. 30, 2018, which is a continuation of U.S. patent application Ser. No. 15/716,504 (now U.S. patent Ser. No. 10/112,313) filed Sep. 26, 2017, which is a continuation in part of U.S. patent application Ser. No. 15/433,988 filed Feb. 15, 2017, which itself is a continuation in part of U.S. patent application Ser. No. 15/241,042 (now U.S. Pat. No. 9,764,487) filed Aug. 18, 2016, which itself is a continuation in part of U.S. patent application Ser. No. 15/135,485 (now U.S. Pat. No. 9,687,989) filed Apr. 21, 2016, which itself is a continuation in part of U.S. patent application Ser. No. 14/977,560 (now U.S. Pat. No. 9,550,303) filed Dec. 21, 2015, which itself is a continuation in part of U.S. patent application Ser. No. 14/873,857 (now U.S. Pat. No. 9,808,945) filed Oct. 2, 2015, which itself is a continuation of U.S. patent application Ser. No. 14/627,282 (now U.S. Pat. No. 9,259,846) filed Feb. 20, 2015 which claims the benefit of U.S. Provisional Application Ser. No. 62/060,700, filed Oct. 7, 2014, the entire disclosures of which are fully incorporated herein by reference. U.S. patent application Ser. No. 14/977,560 (now U.S. Pat. No. 9,550,303) filed Dec. 21, 2015 also claims the benefit of U.S. Provisional Application Ser. No. 62/201,551, filed Aug. 5, 2015, the entire disclosure of which is fully incorporated herein by reference.

FIELD

The present disclosure relates generally to personal grooming device and, more particularly, to a personal shaving device for shaving hair.

BACKGROUND

Shaving razors are available in a variety of forms. For example, shaving razors may include a disposable razor cartridge configured to be selectively coupled a handle. The razor cartridge may include one or more razor blades disposed on a cutting surface of the disposable razor cartridge. Once the razor blades are dull, the user may disconnect the razor cartridge from the handle and reconnect a new razor cartridge.

FIGURES

The above-mentioned and other features of this disclosure, and the manner of attaining them, will become more apparent and better understood by reference to the following description of embodiments described herein taken in conjunction with the accompanying drawings, wherein.

Figure 18:
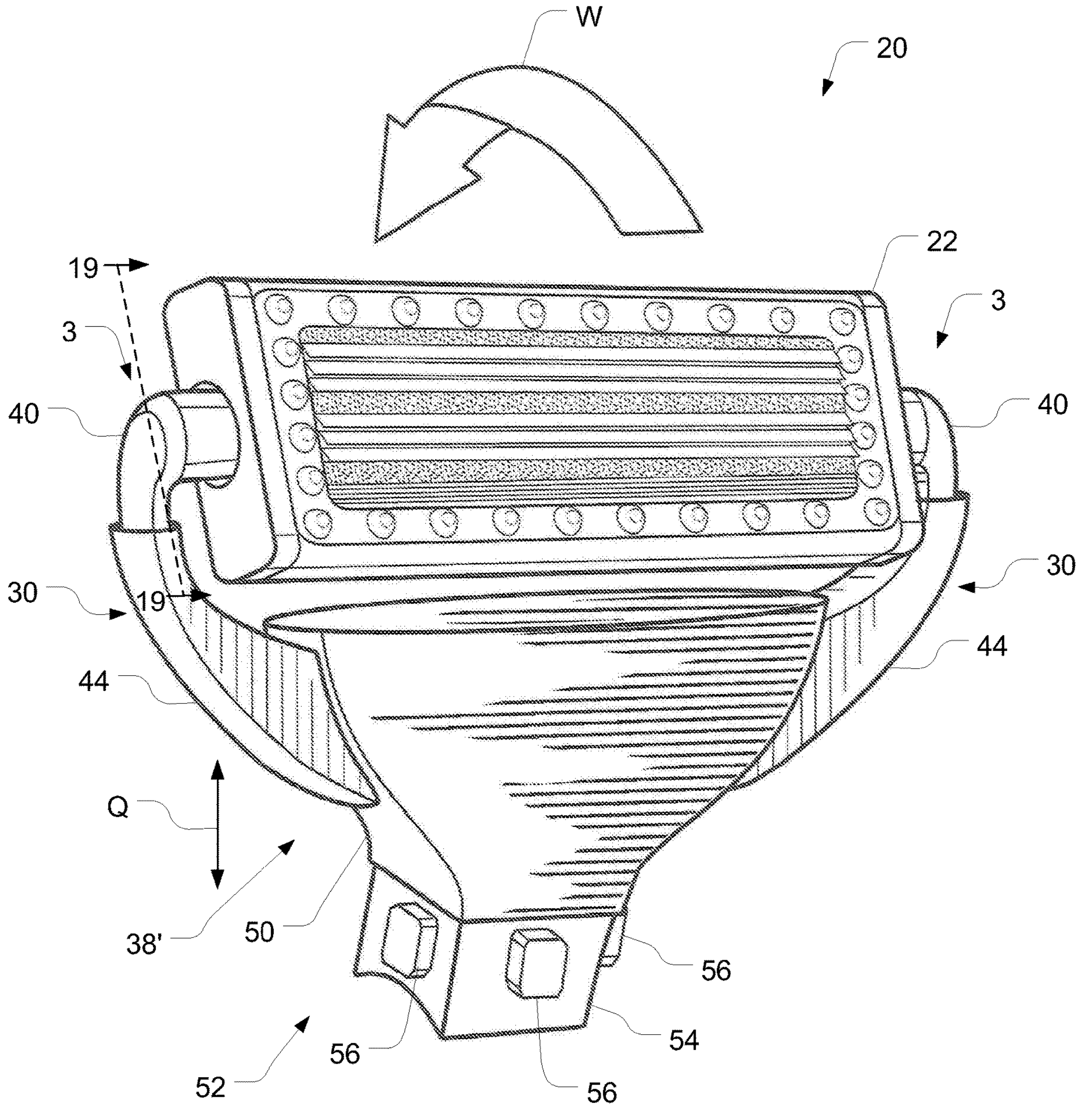
Figure 19:
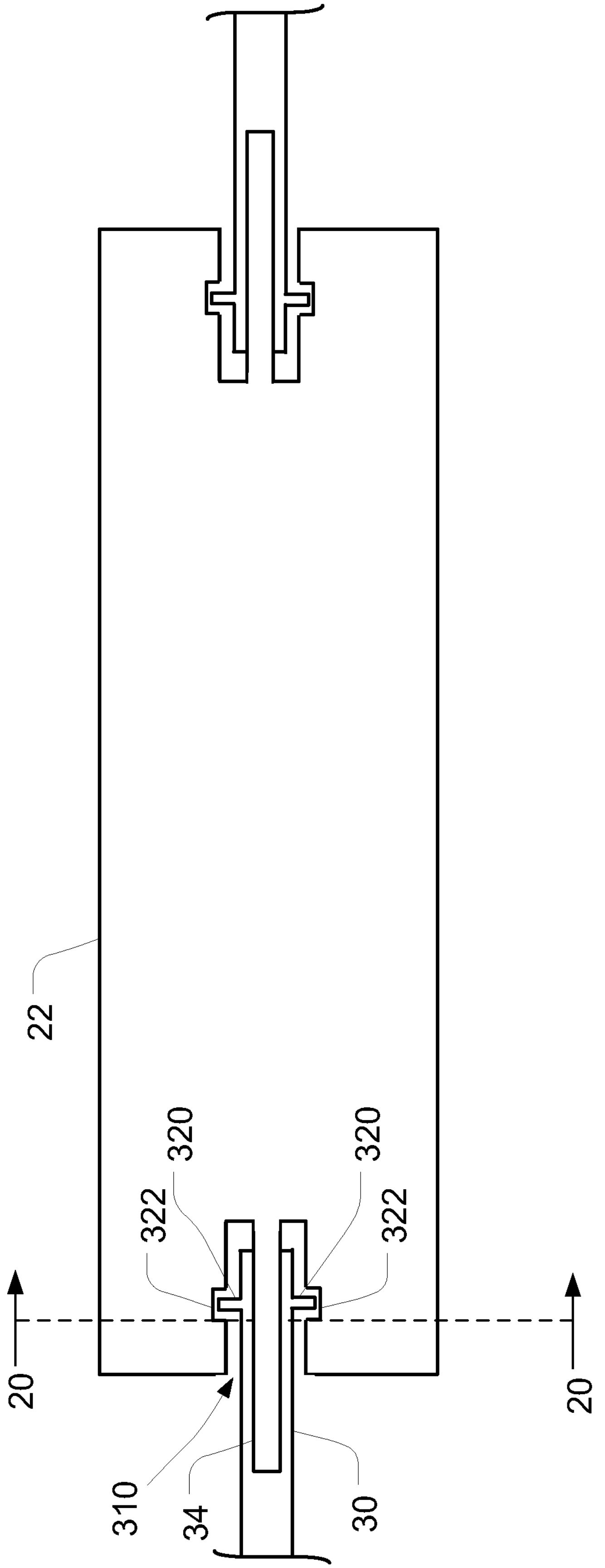
Figure 20:
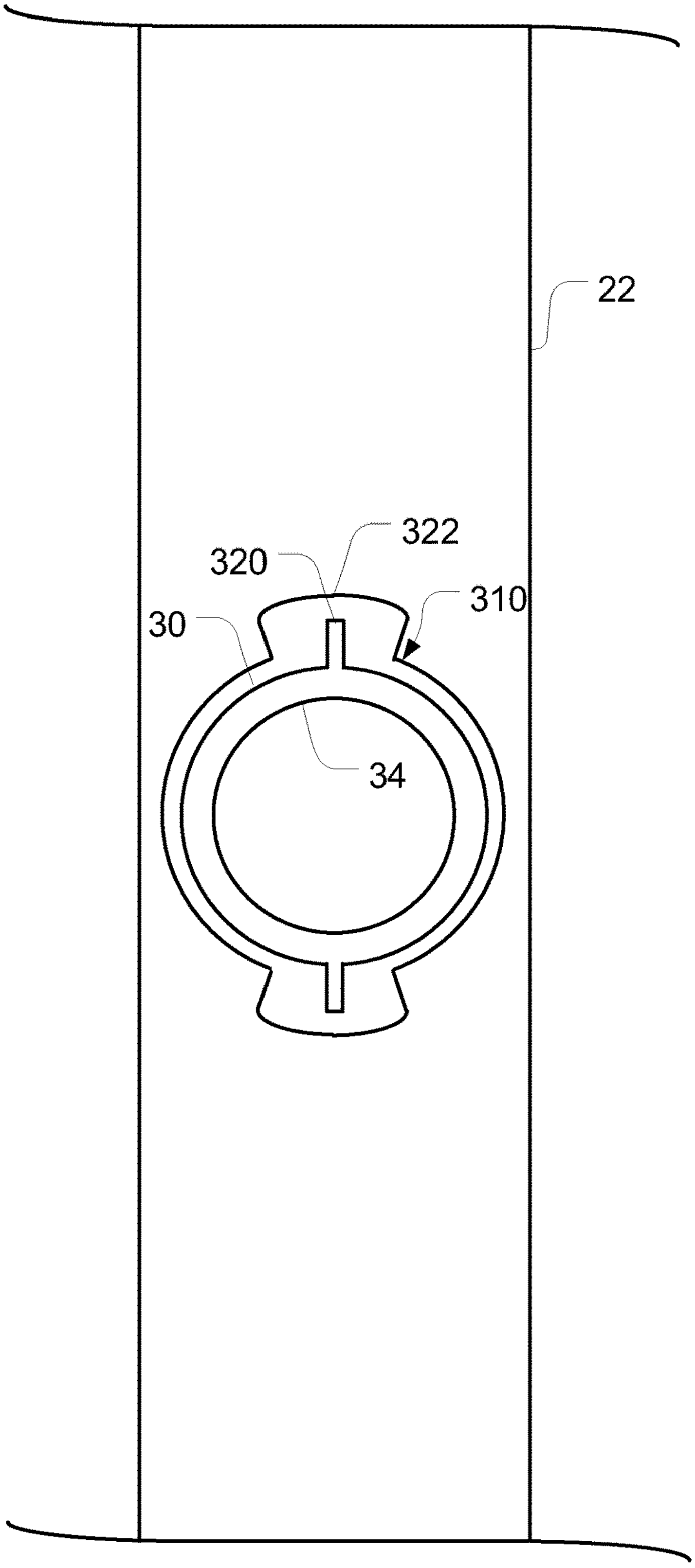
Figure 21:
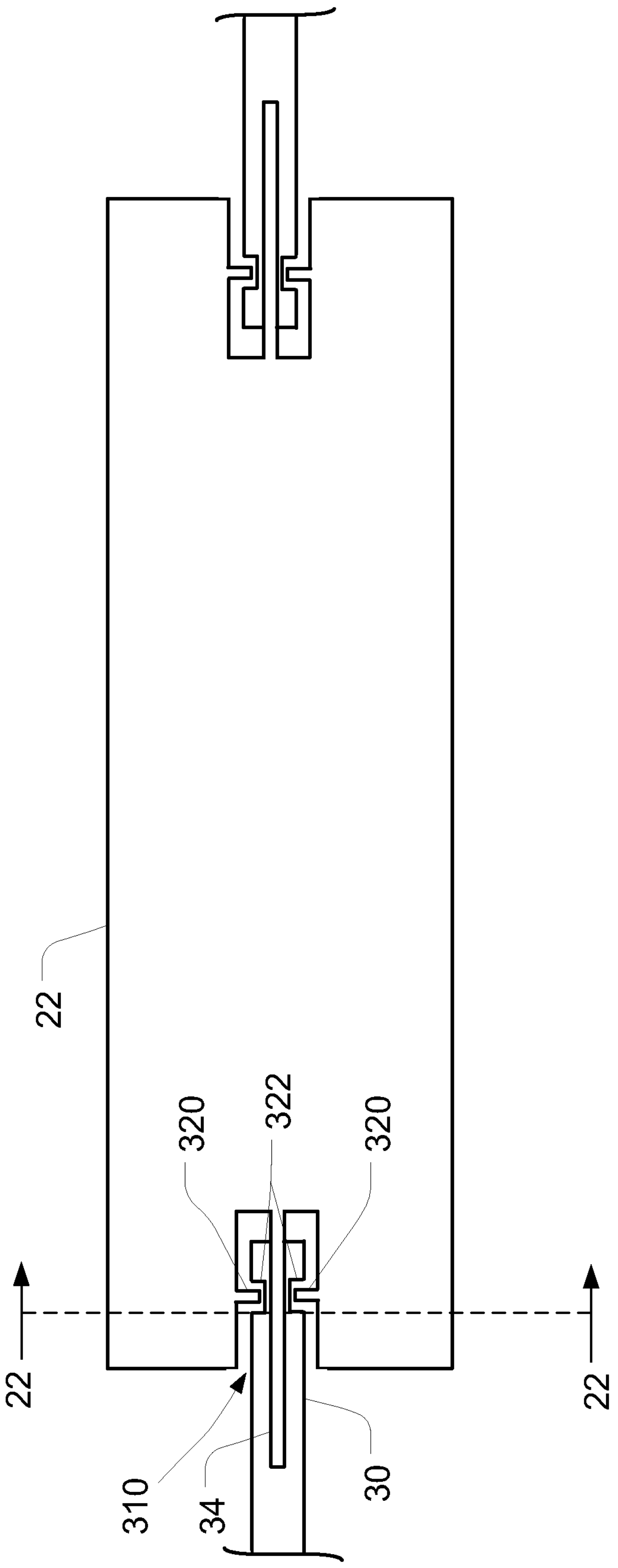
Figure 22:
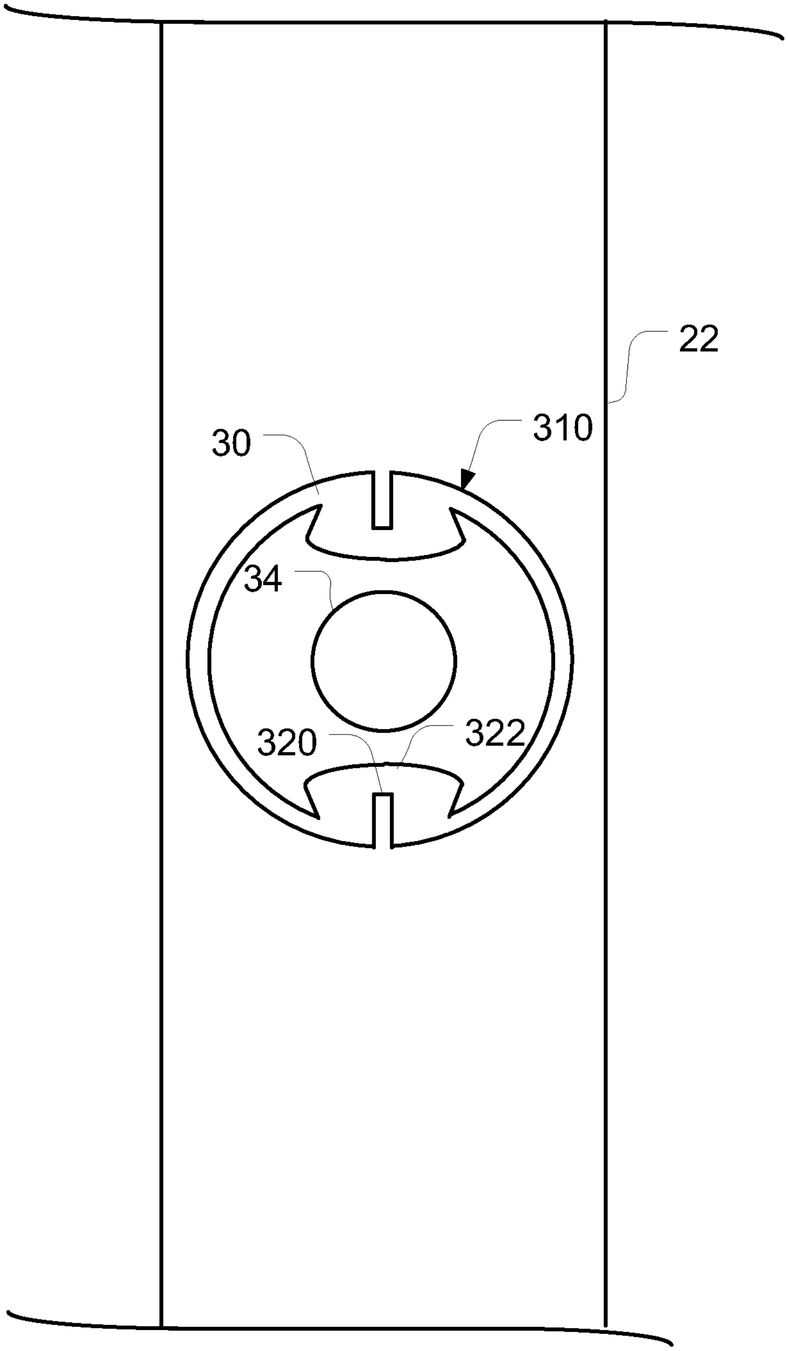
Figure 23:
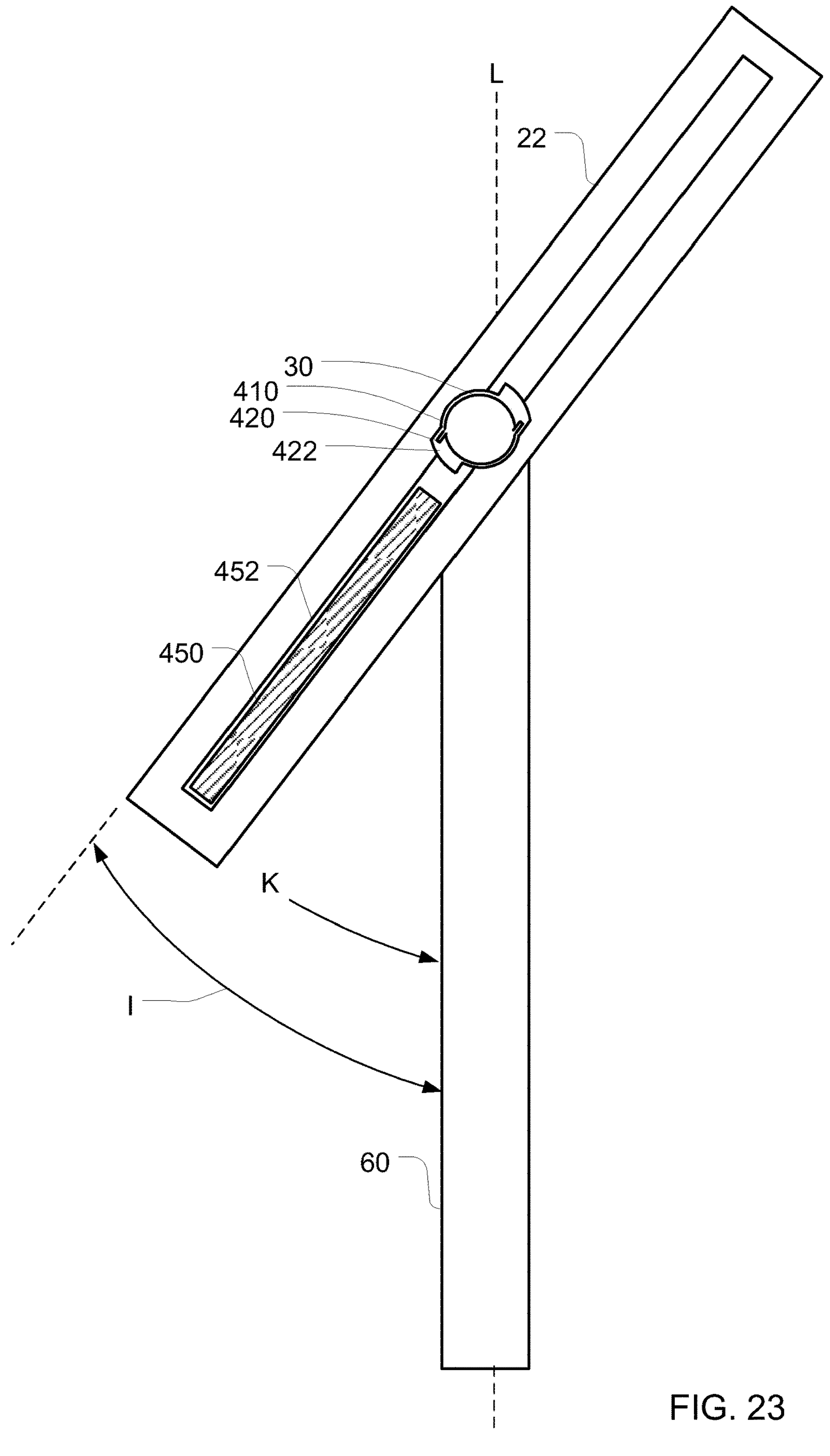
Figure 24:
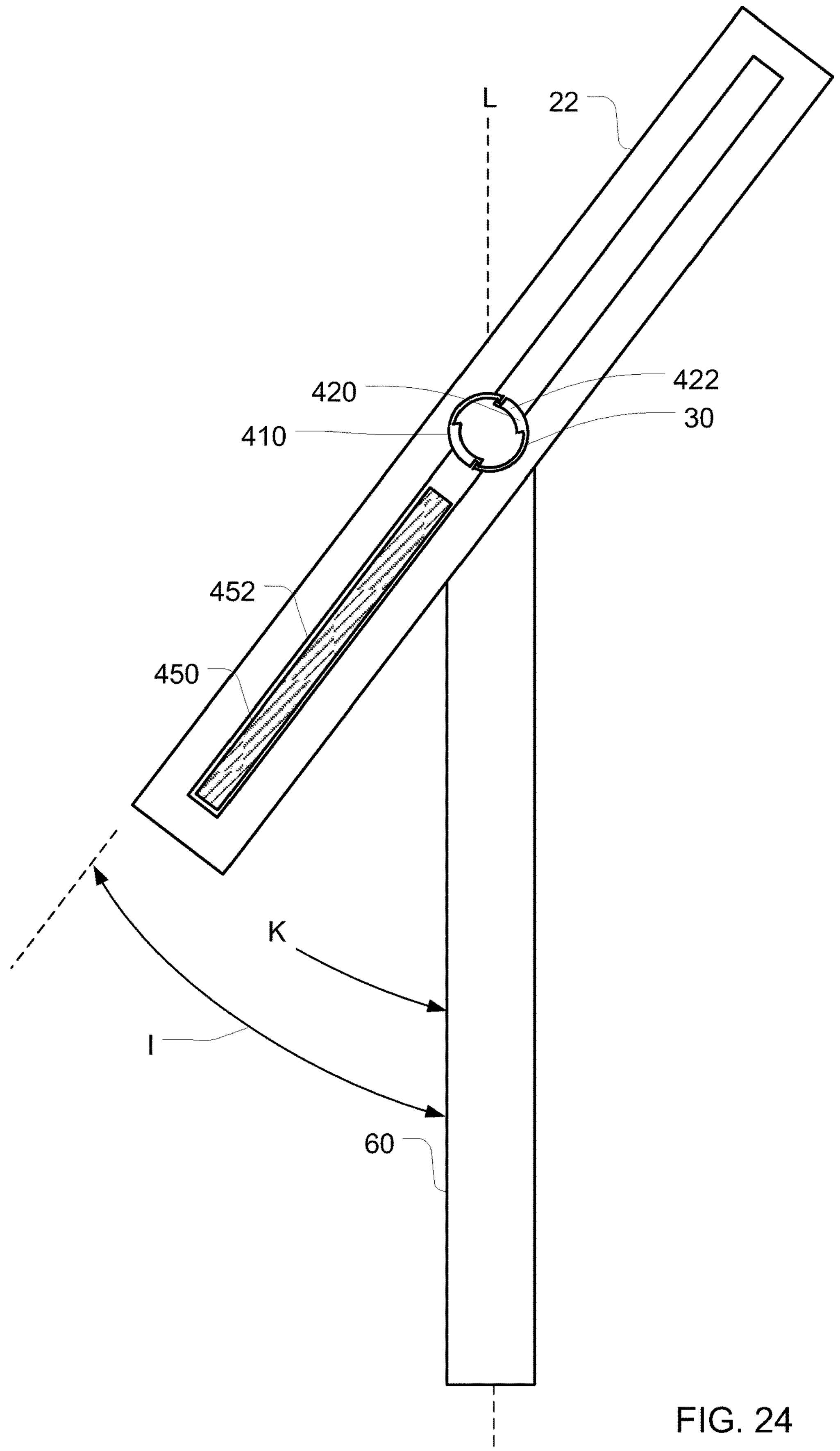
Figure 25:
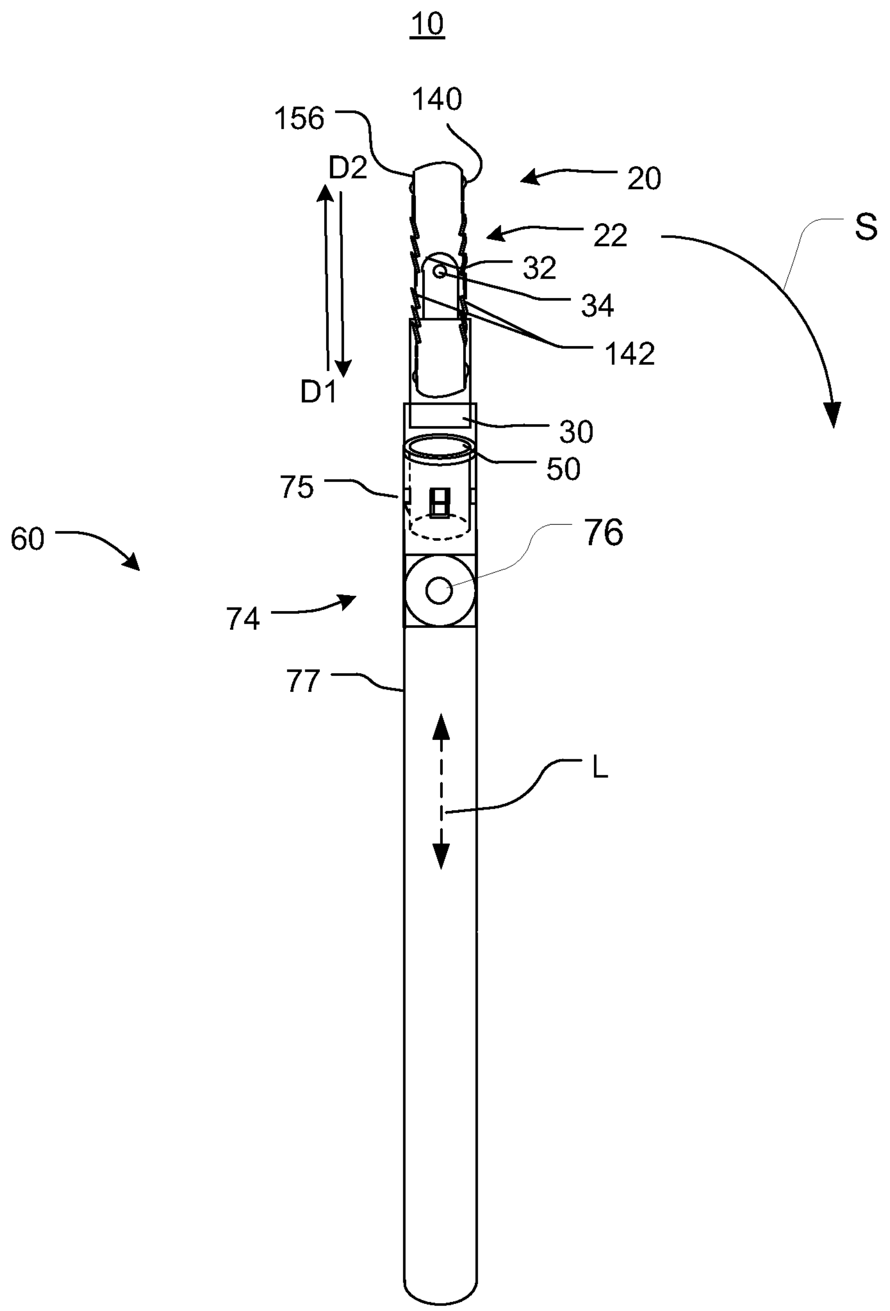
Figure 26:
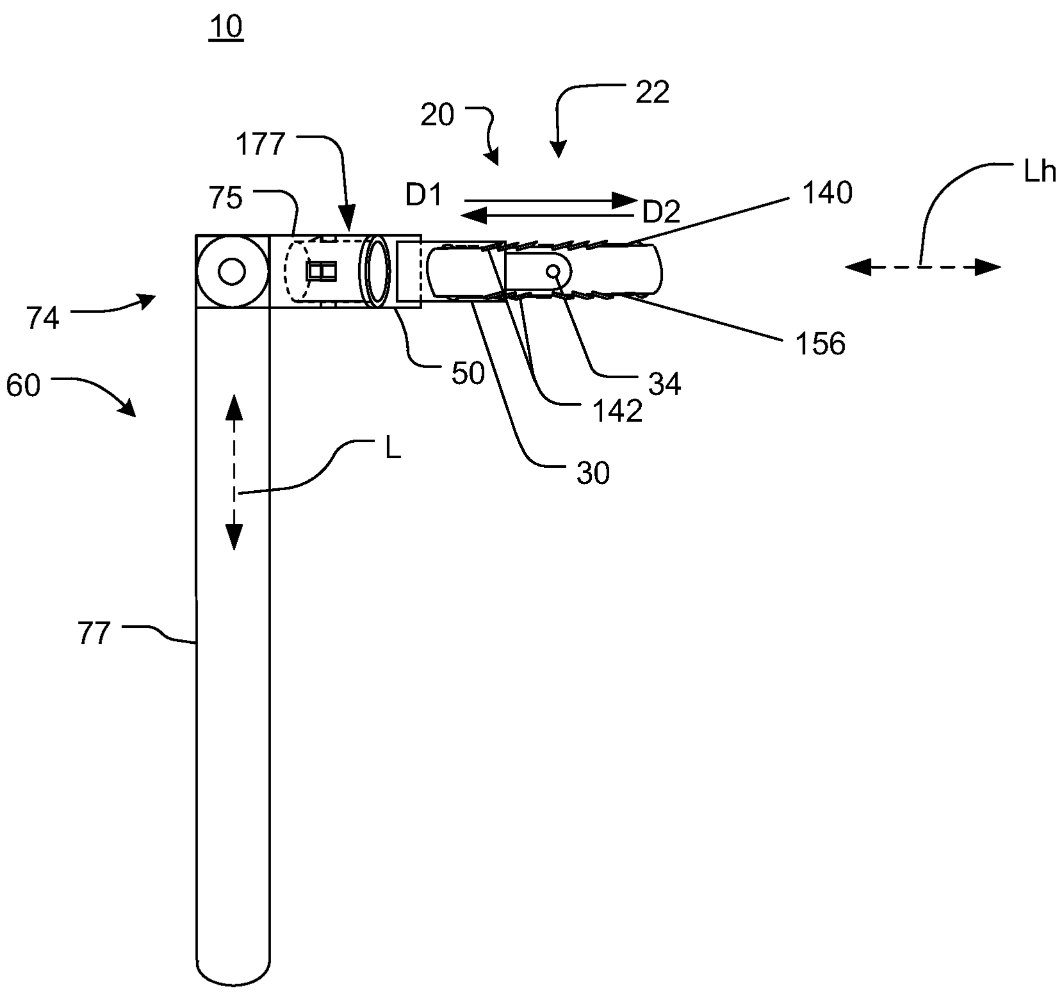
Figure 27:
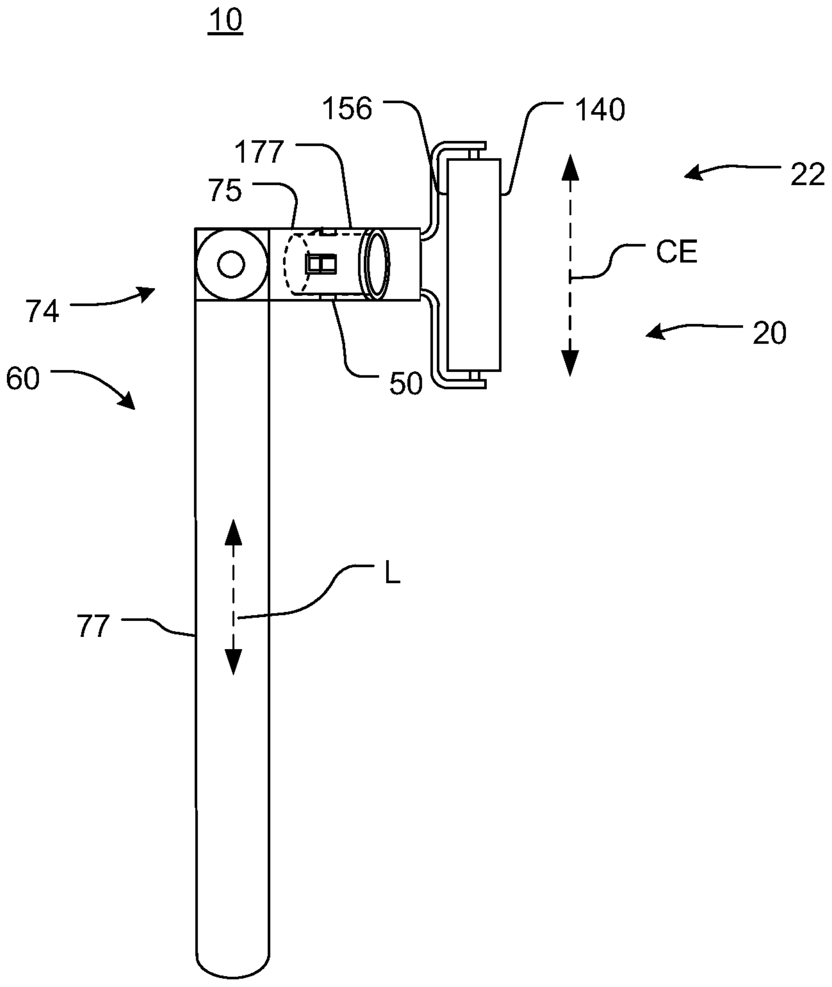
Figure 28:
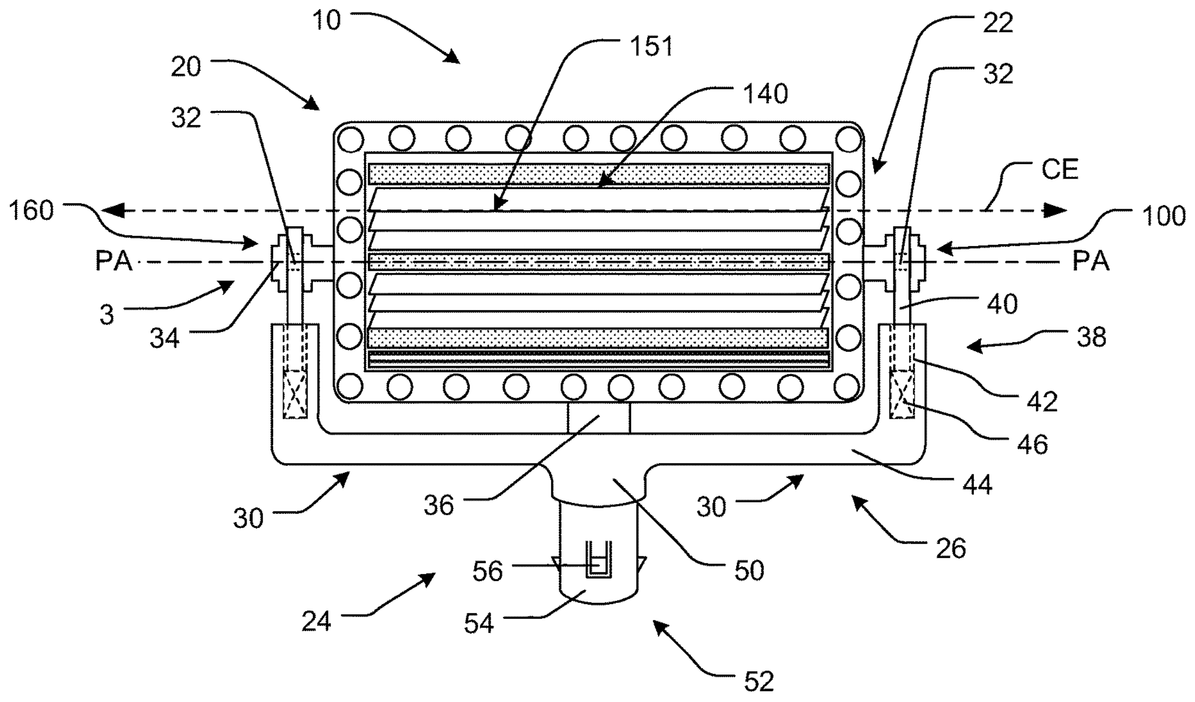
Figure 29:
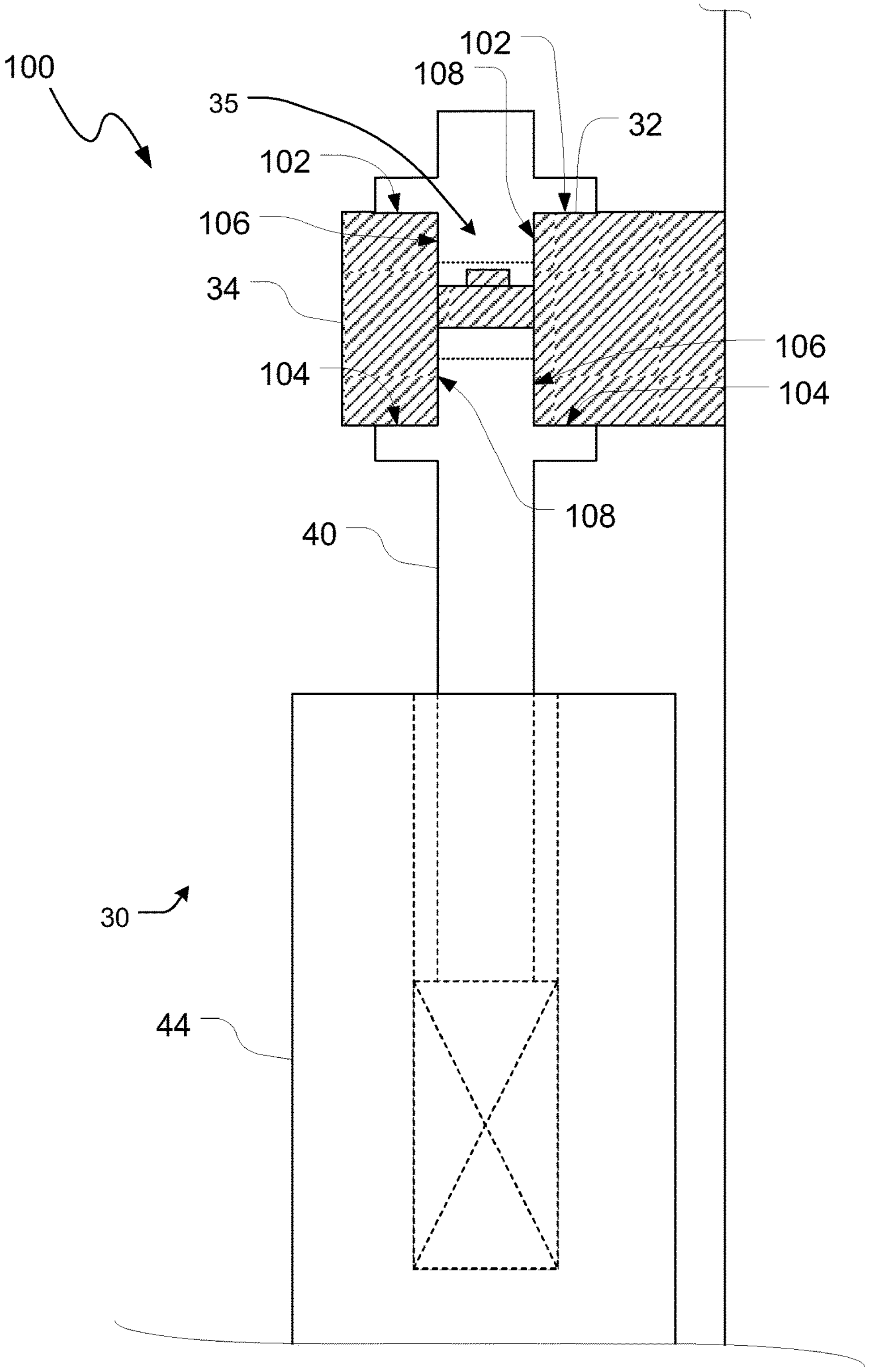
Figure 30A:
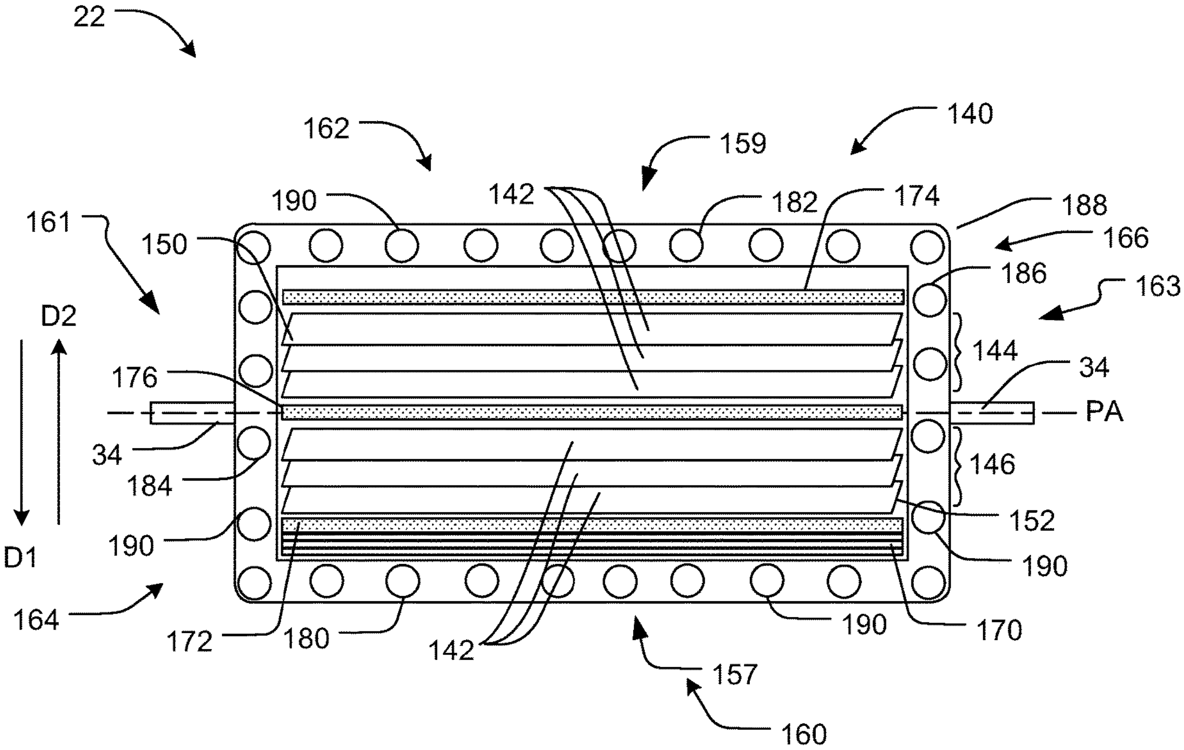
Figure 30B:
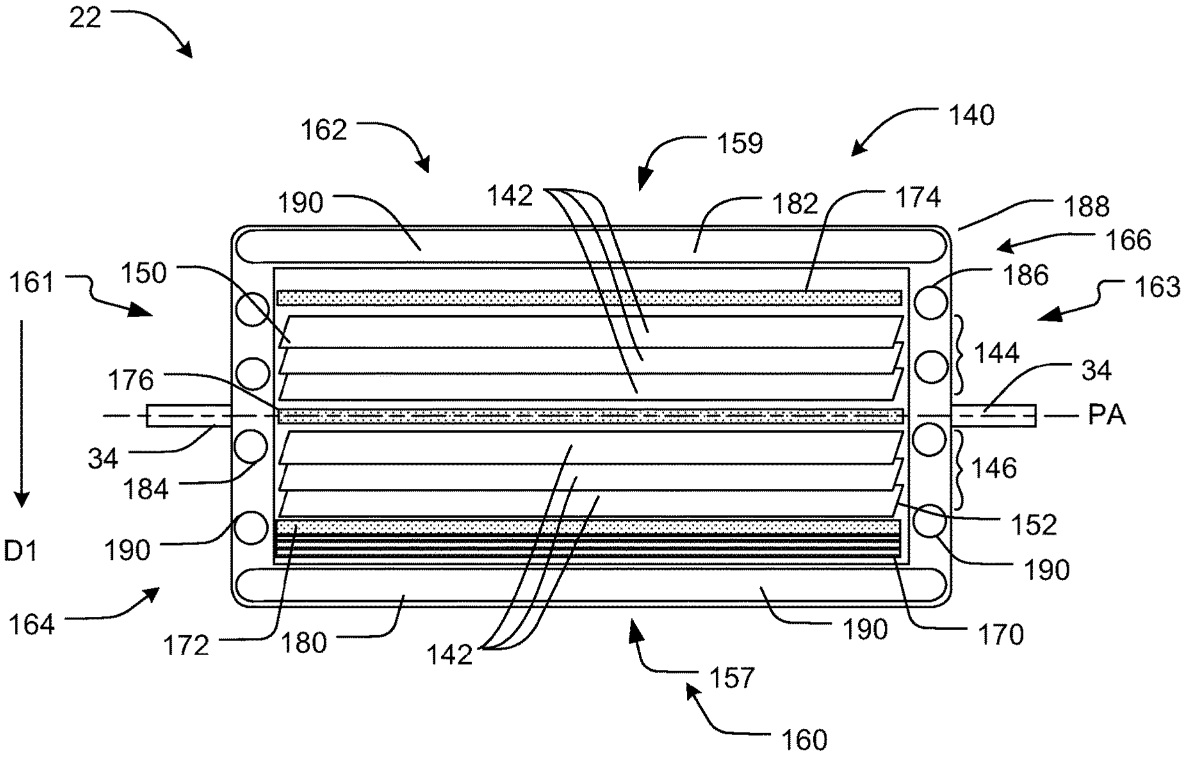
Figure 31:
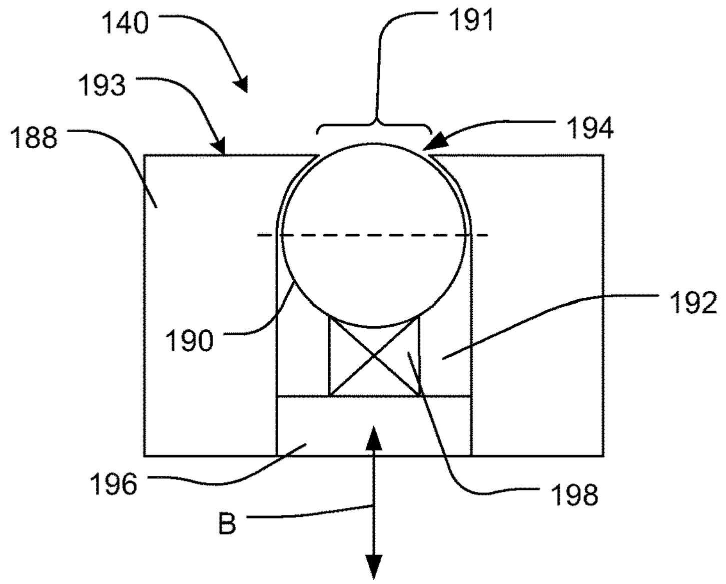
Figure 32:
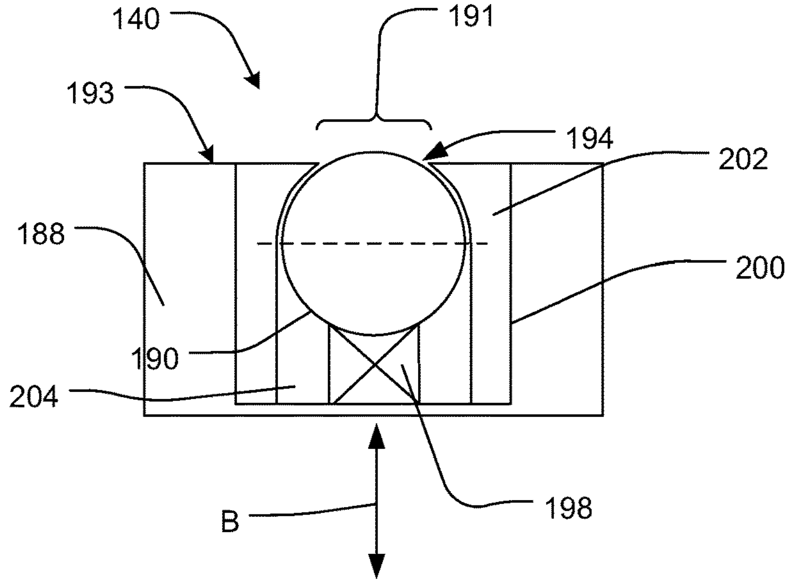
Figure 33:
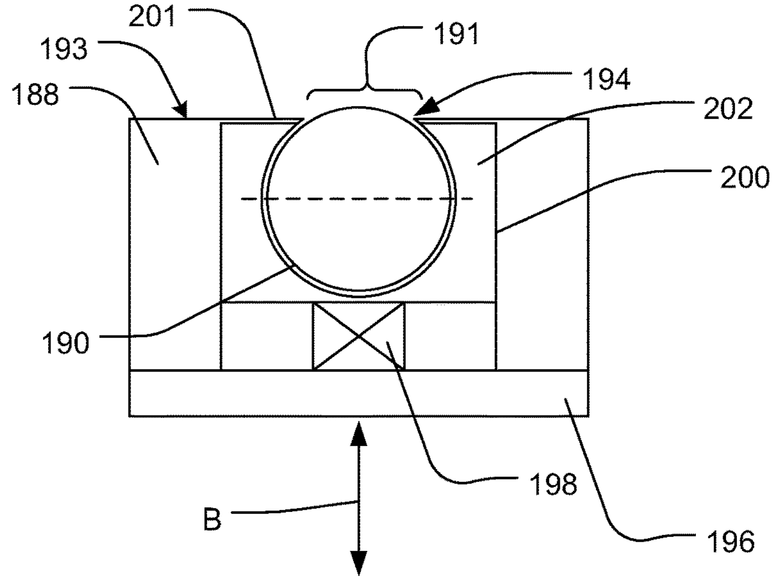
Figure 34:
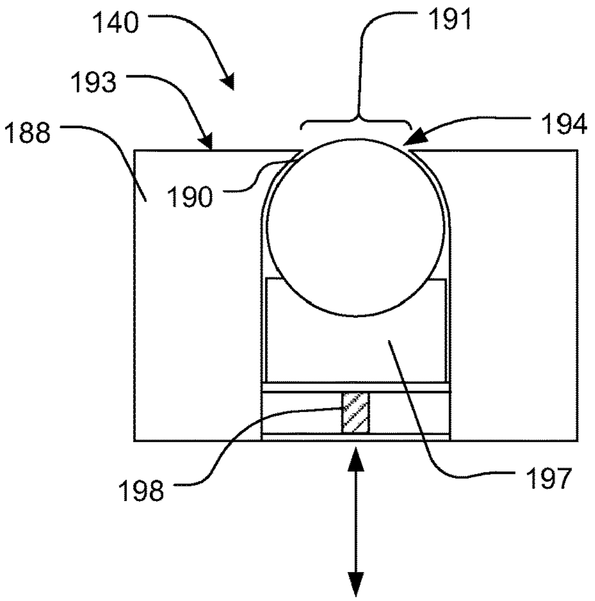
Figure 35A:
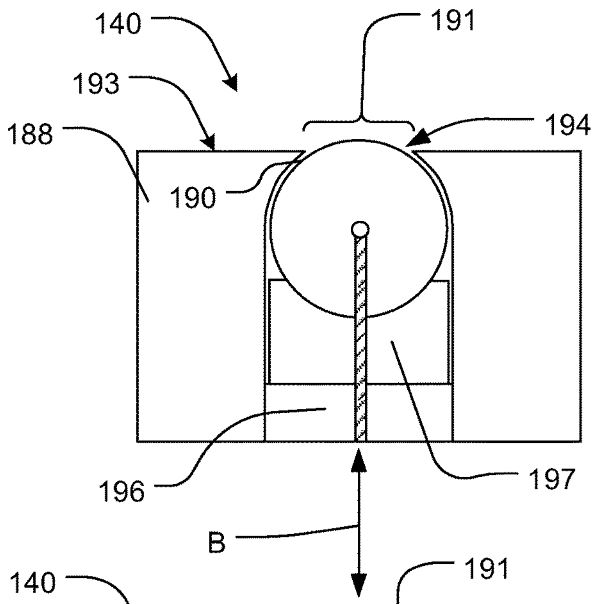
Figure 35B:
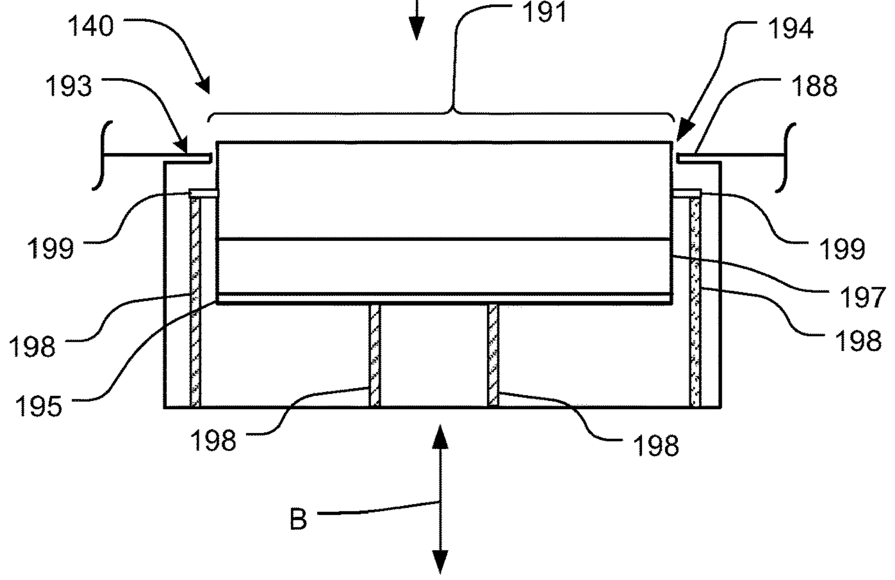
Figure 35C:
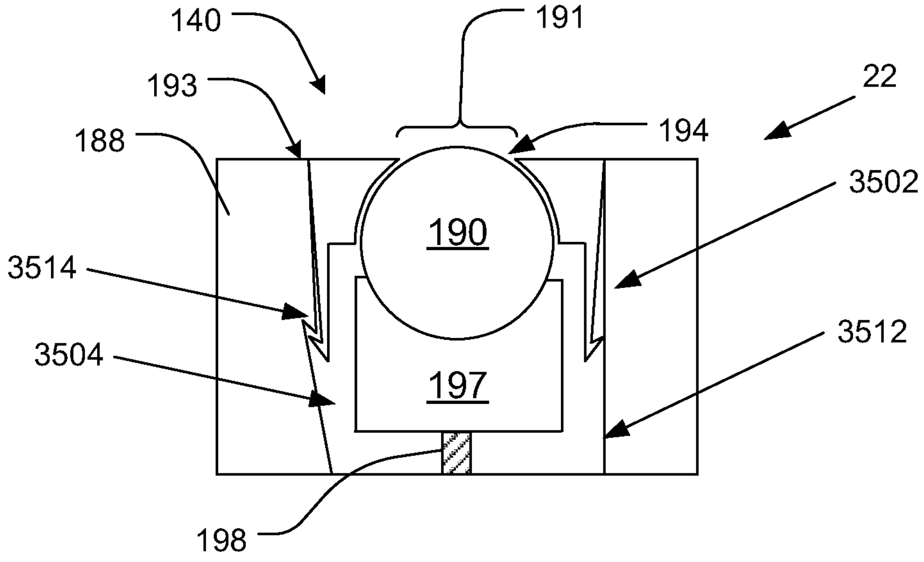
Figure 35D:
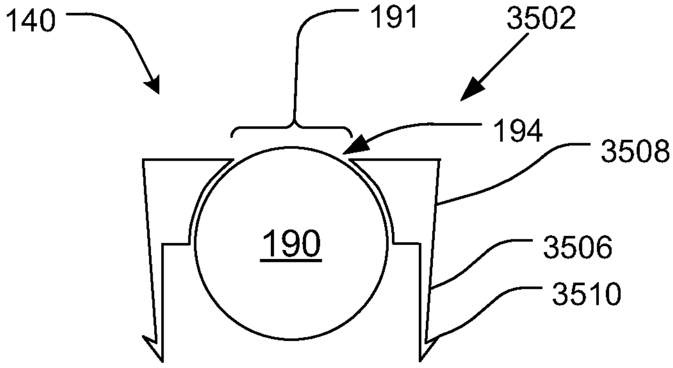
Figure 35E:
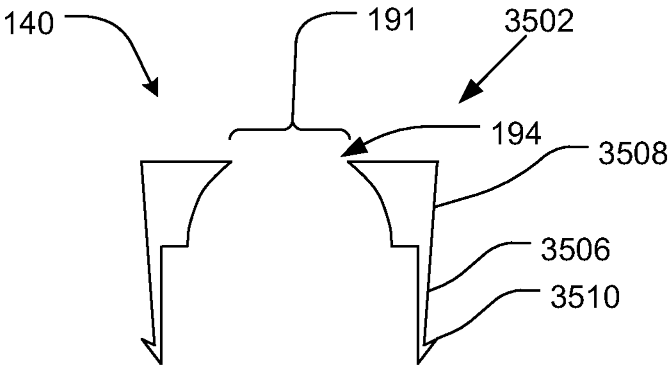
Figure 35F:
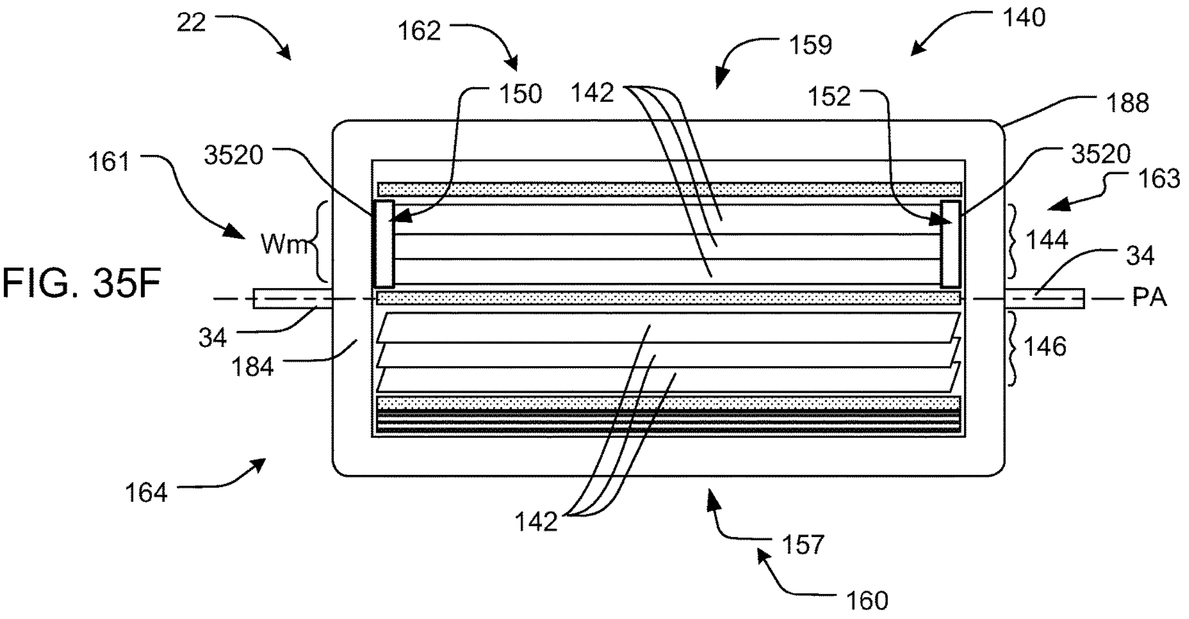
Figure 35G:
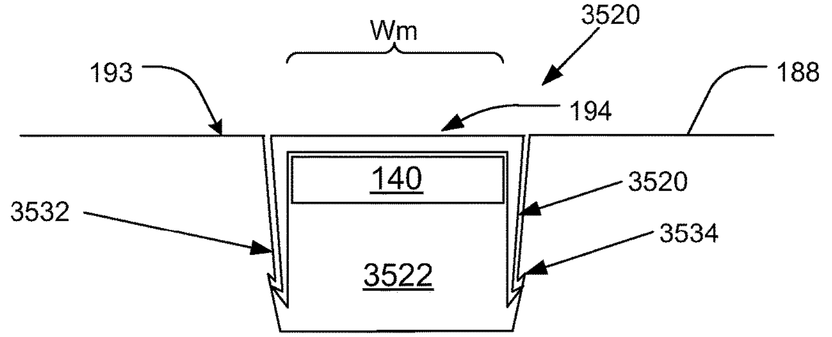
Figure 35H:
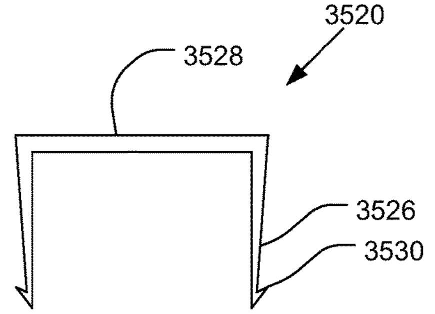
Figure 36:
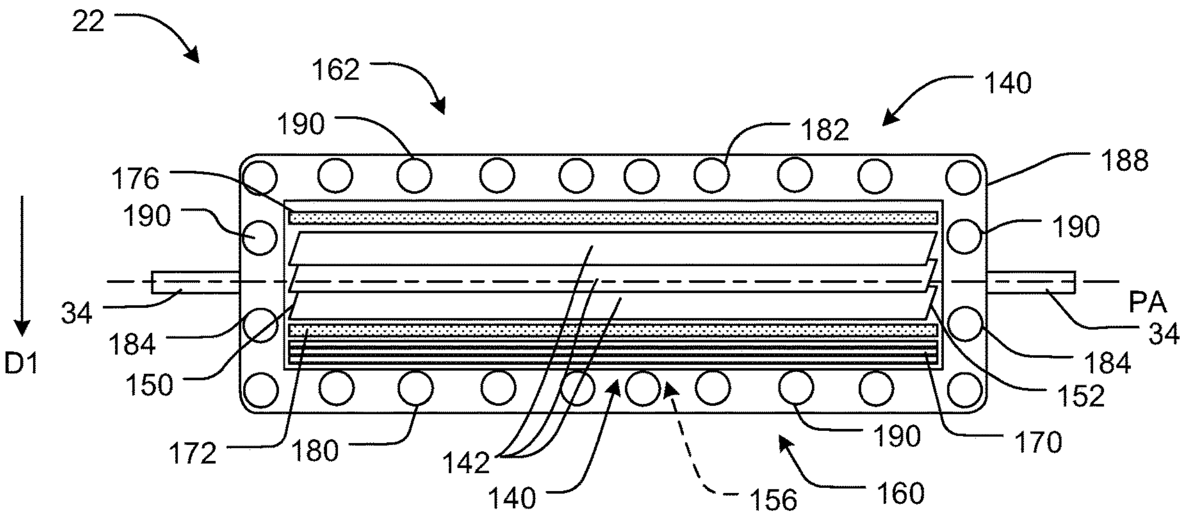
Figure 37:
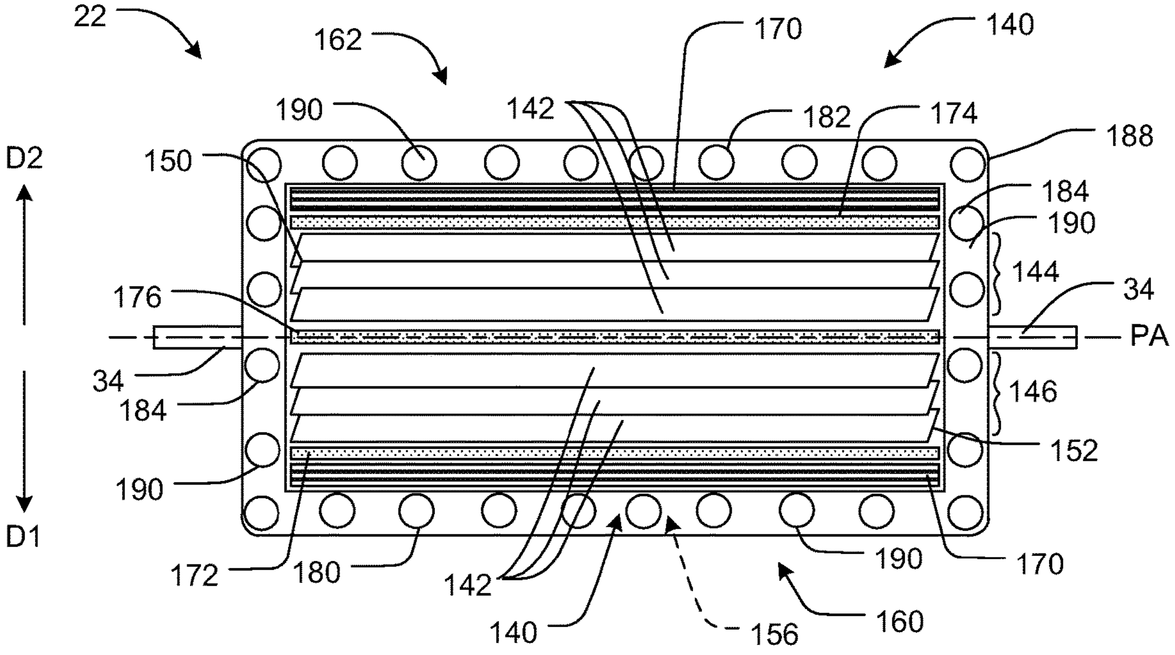
Figure 38:
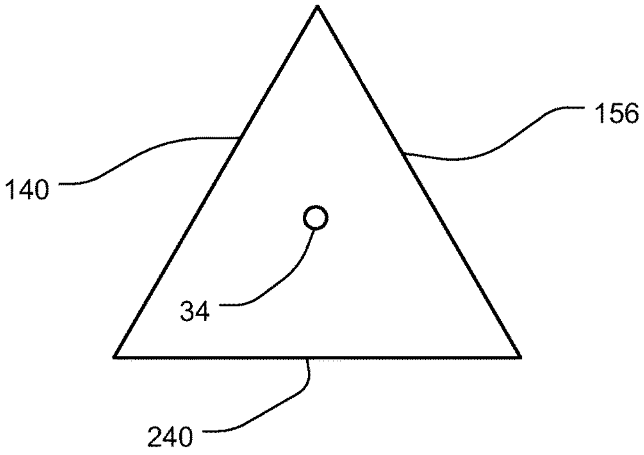
Figure 39:
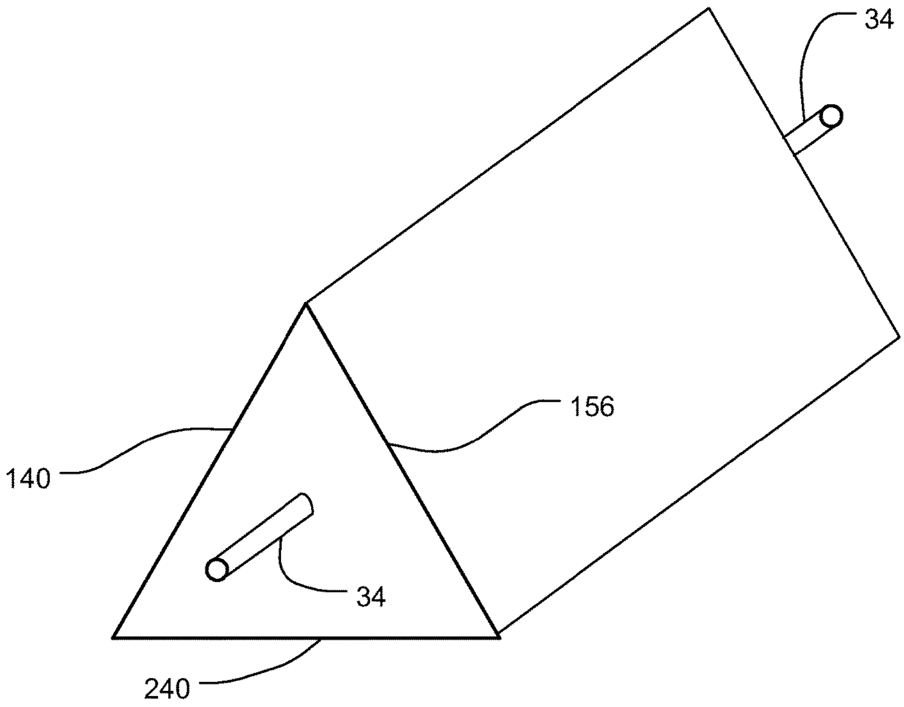
Figure 40:
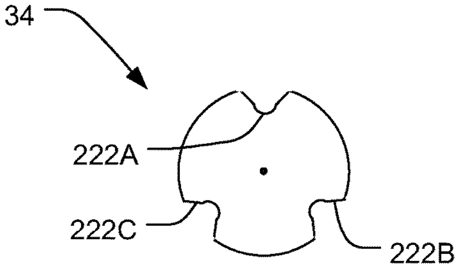
Figure 41:
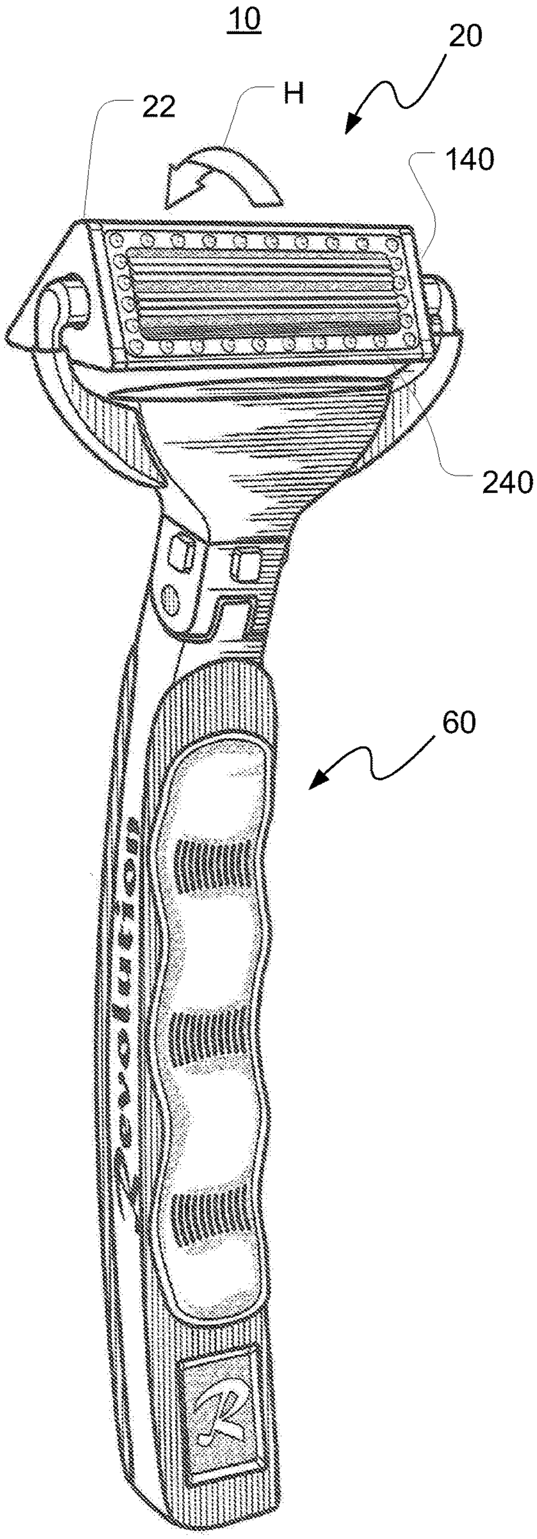
Figure 42:
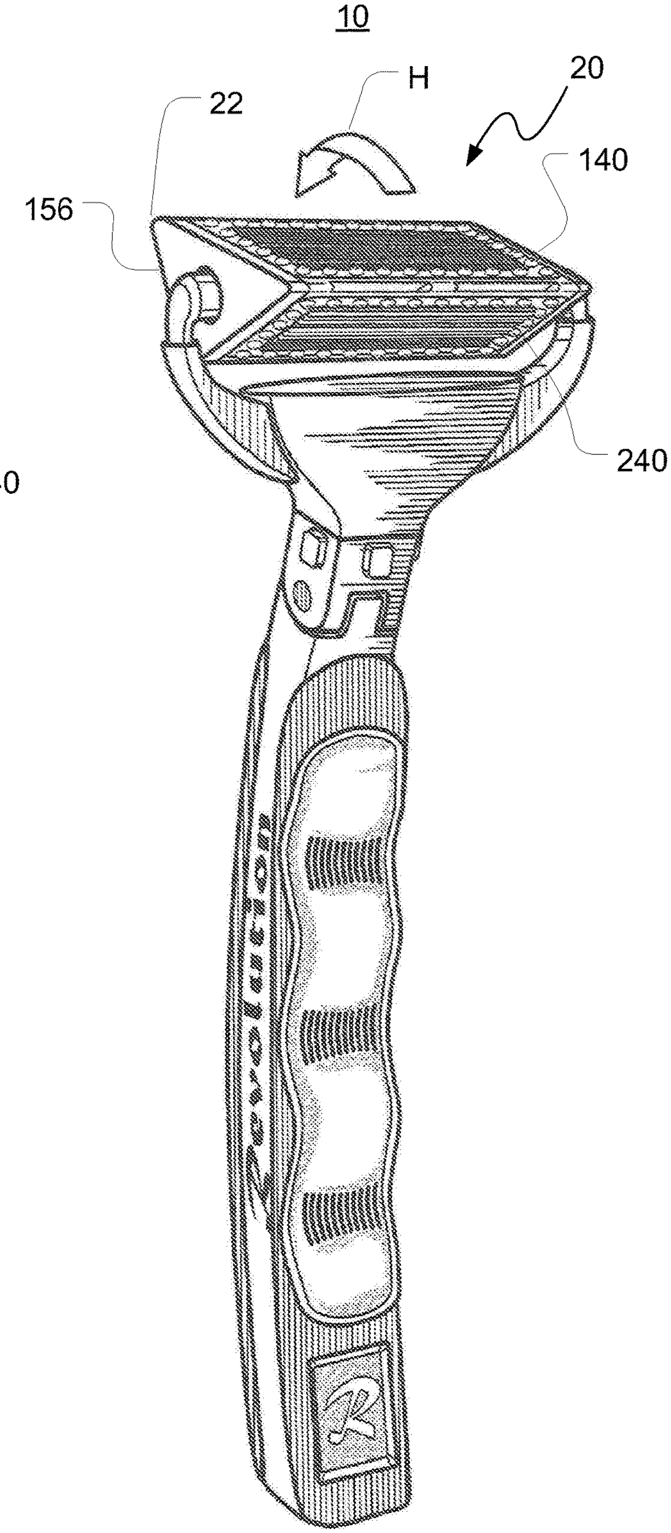
Figure 43:
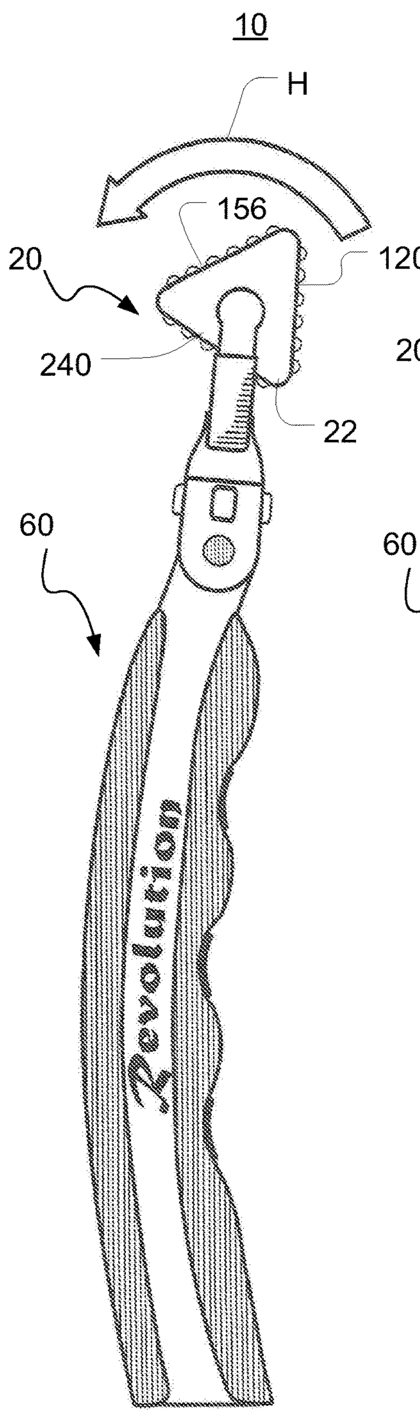
Figure 44:
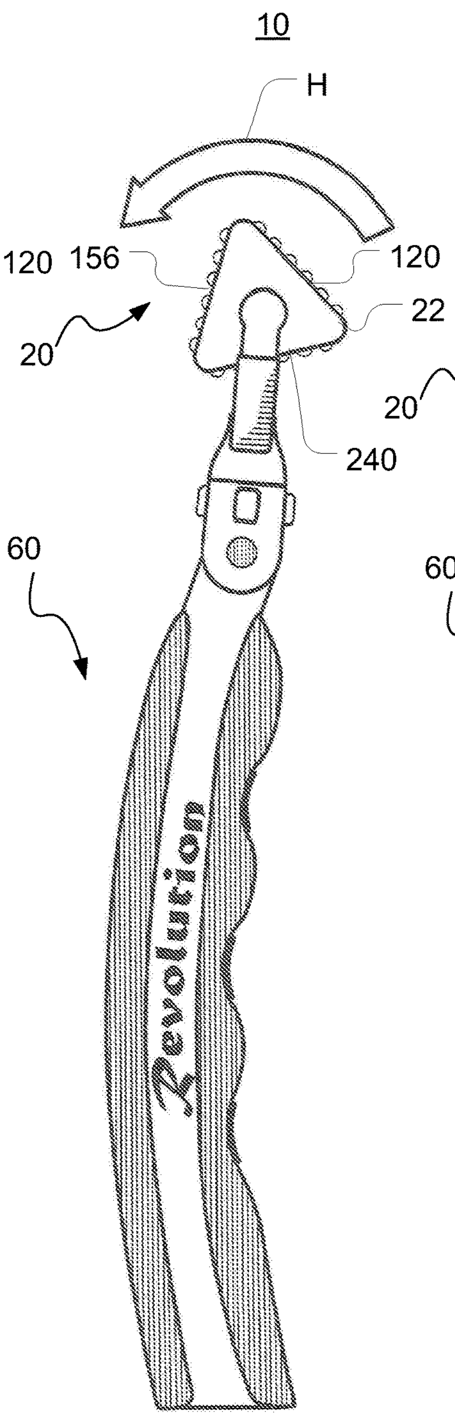
Figure 45:
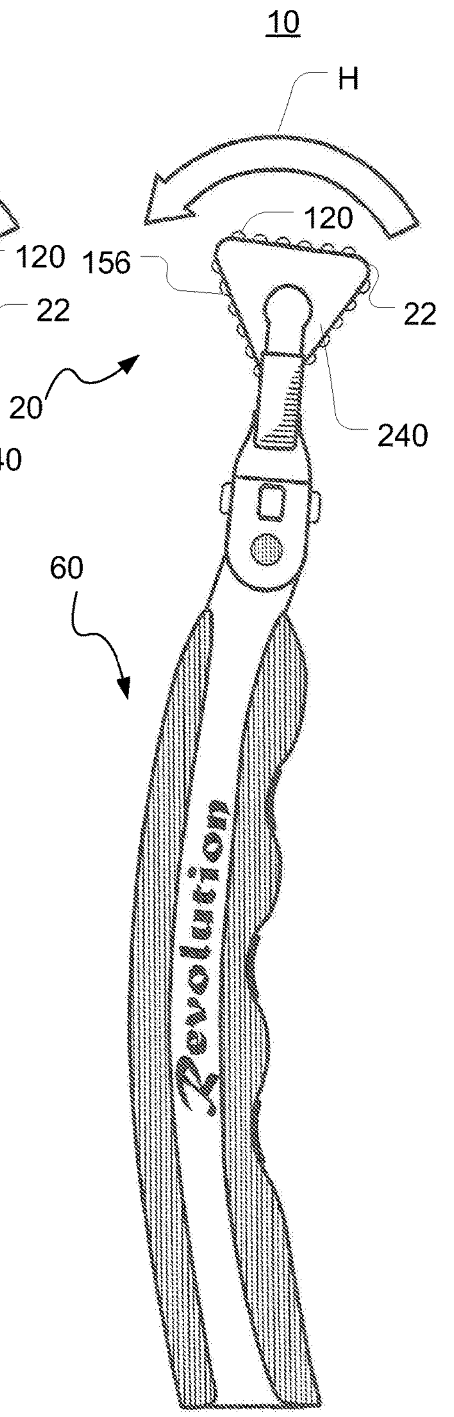
Figure 46:
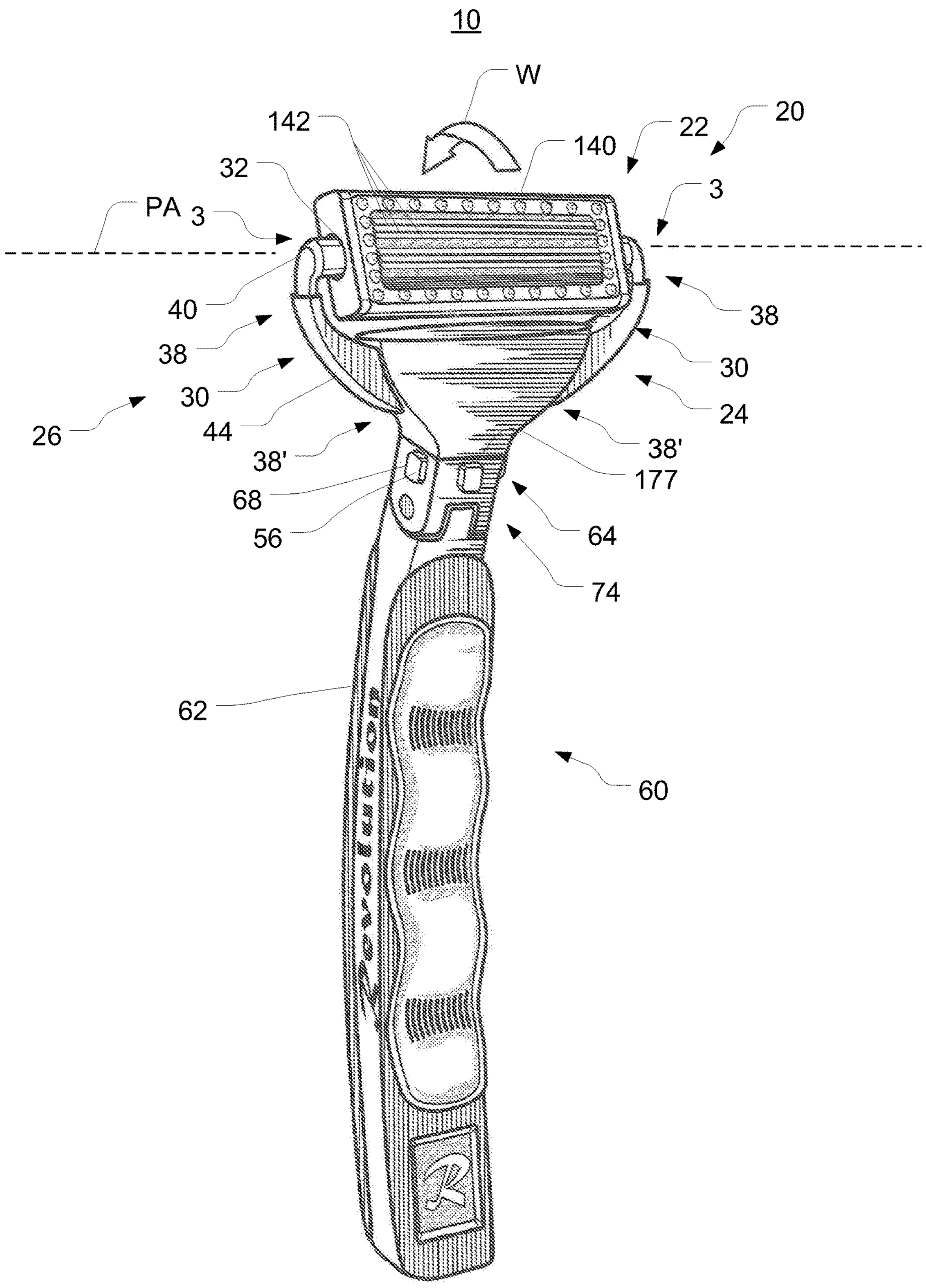
Figure 47:
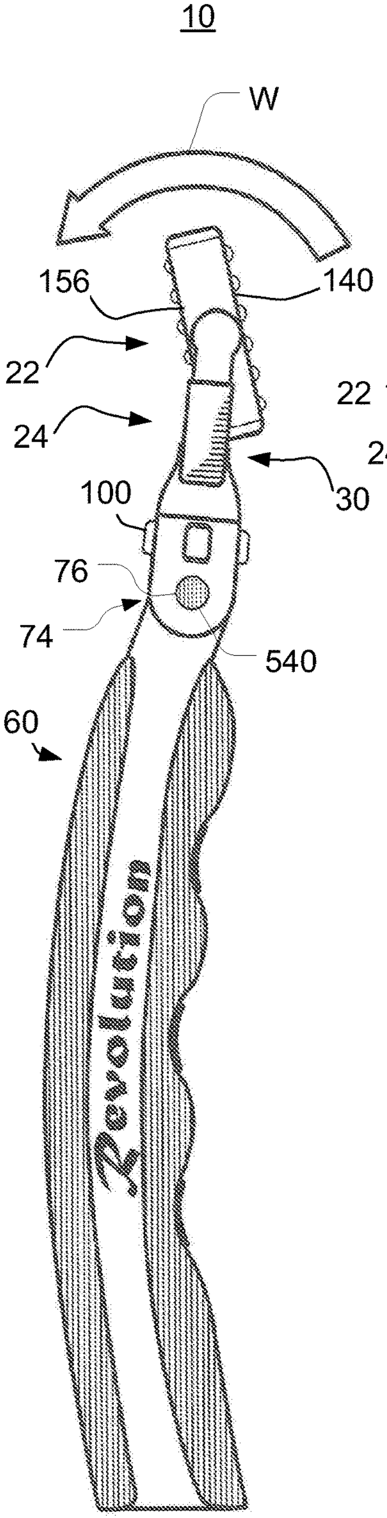
Figure 48:
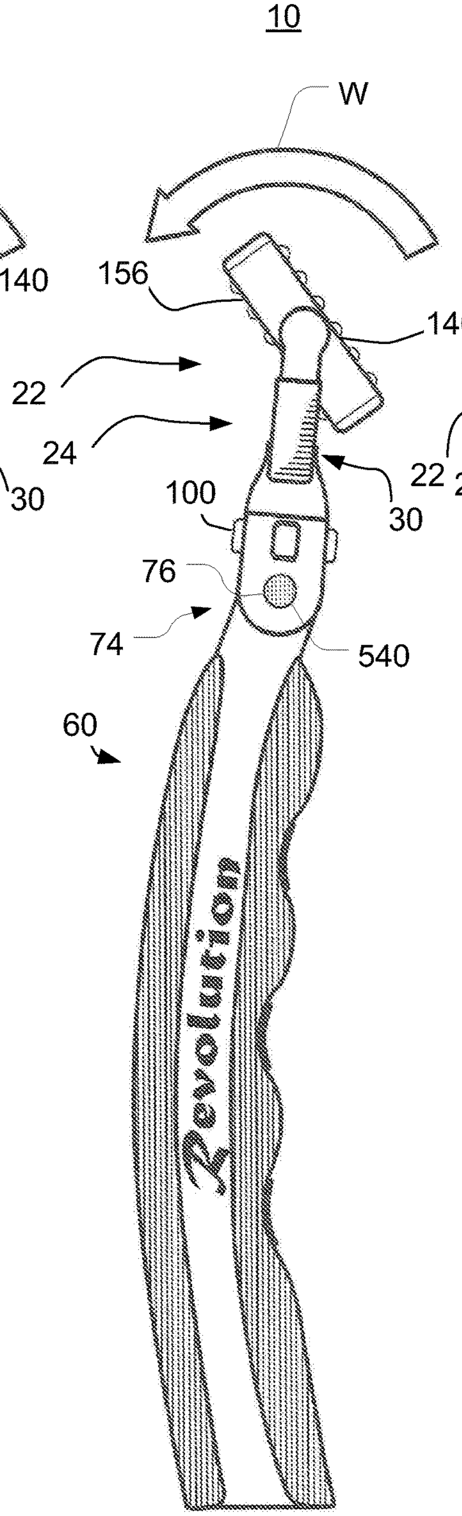
Figure 49:
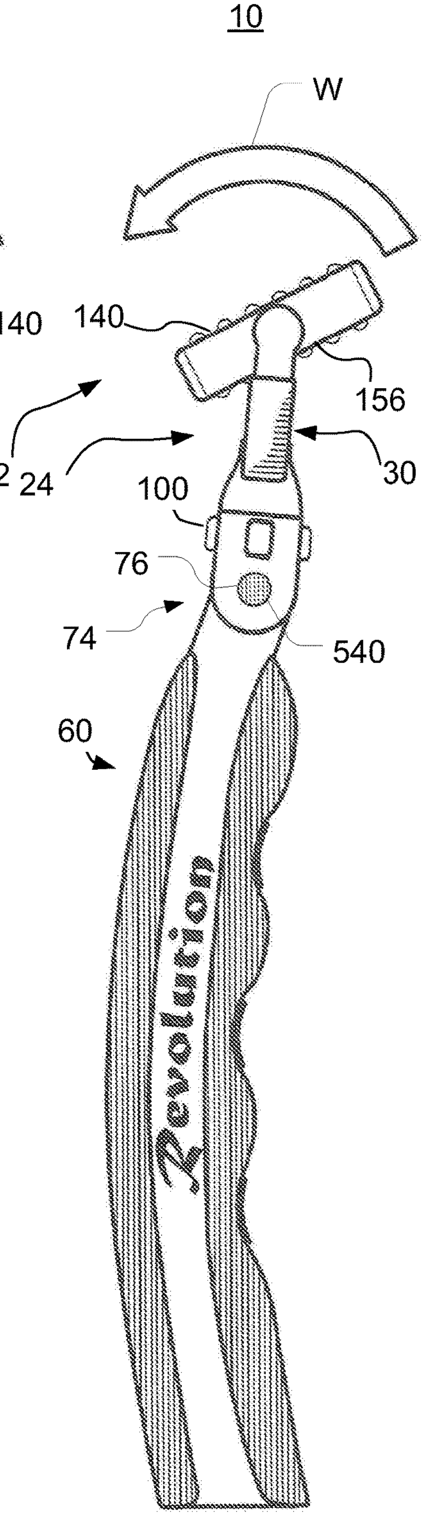
Figure 50:
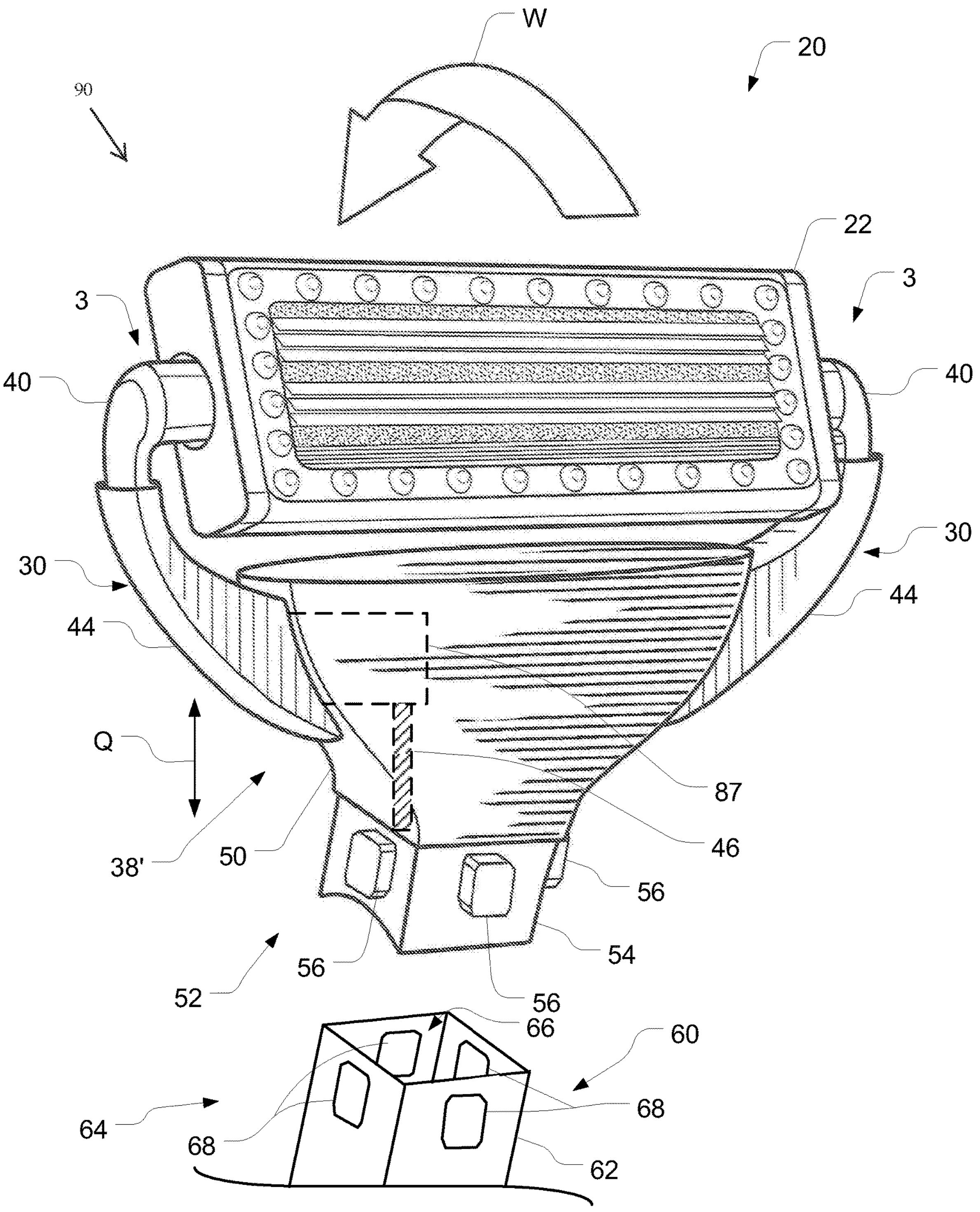
Figure 51:
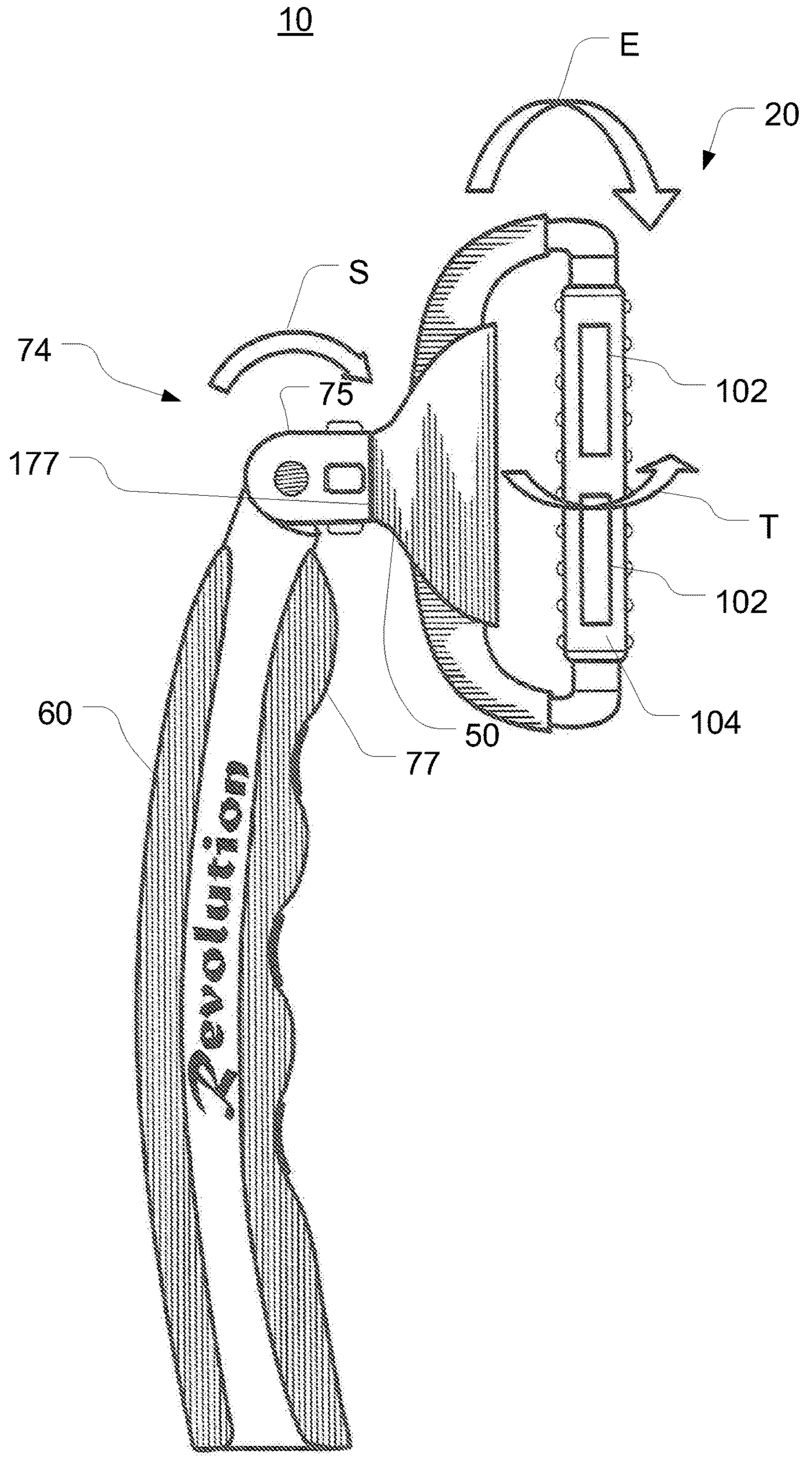
Figure 52:
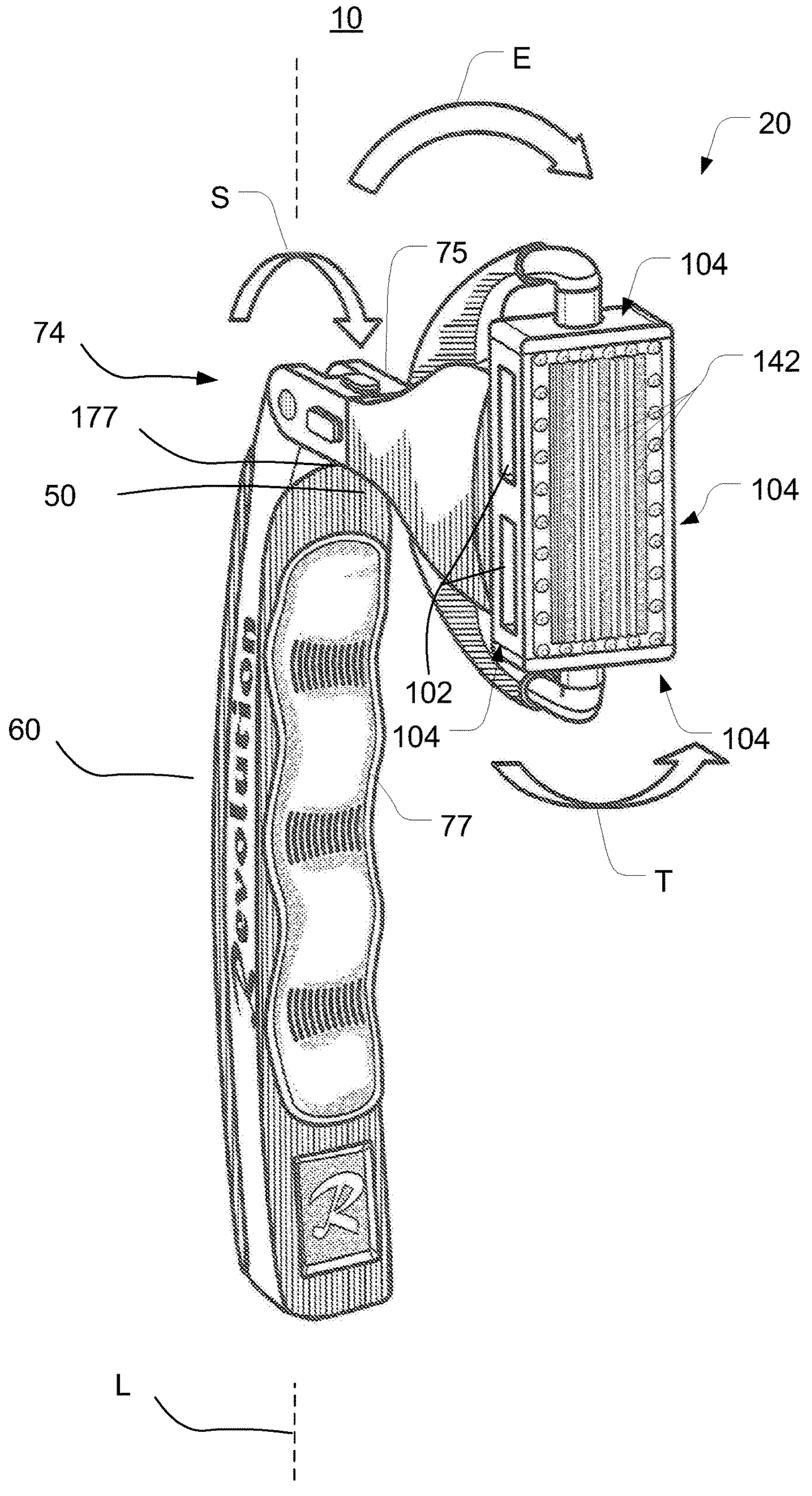
Figure 53:
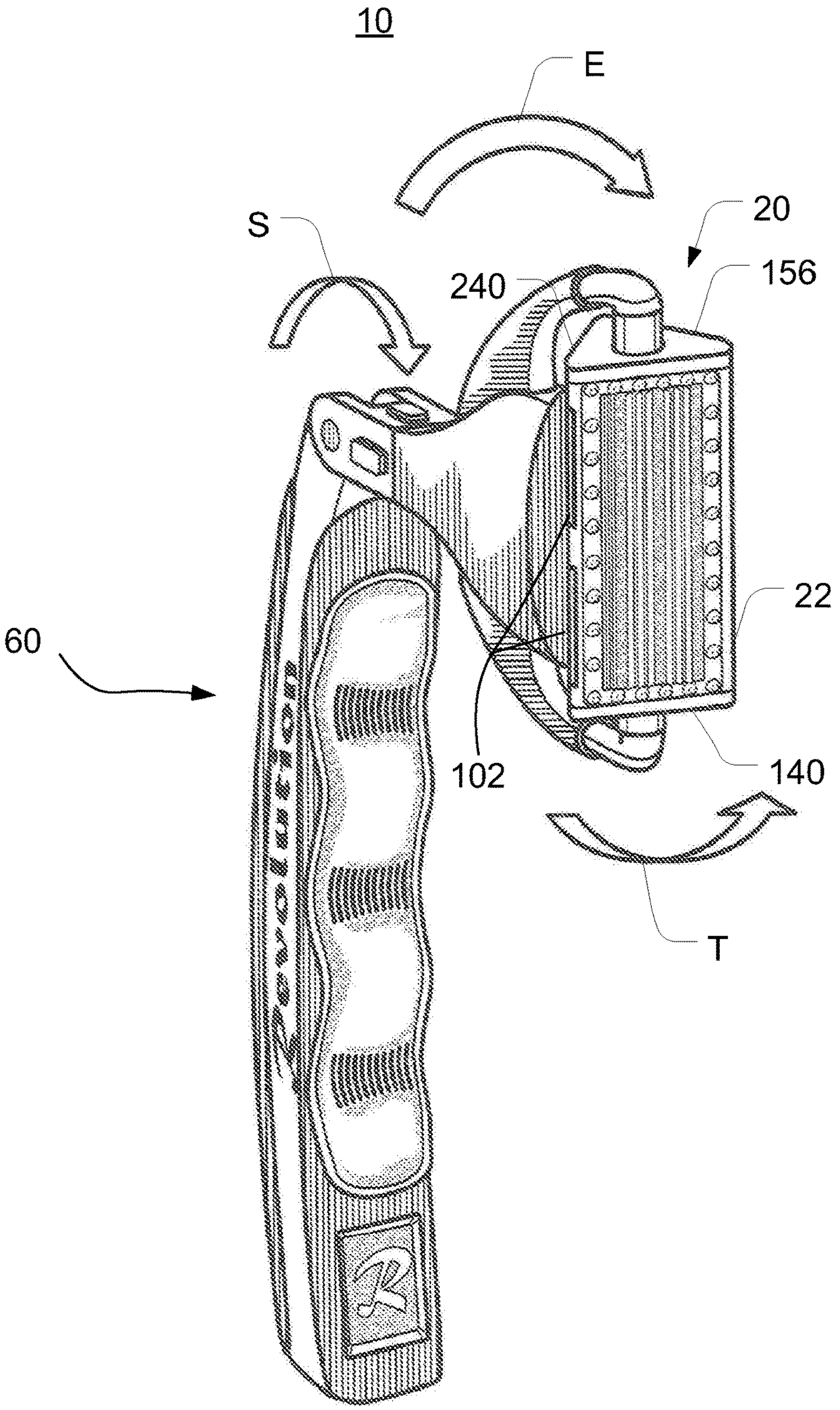
Figure 54:
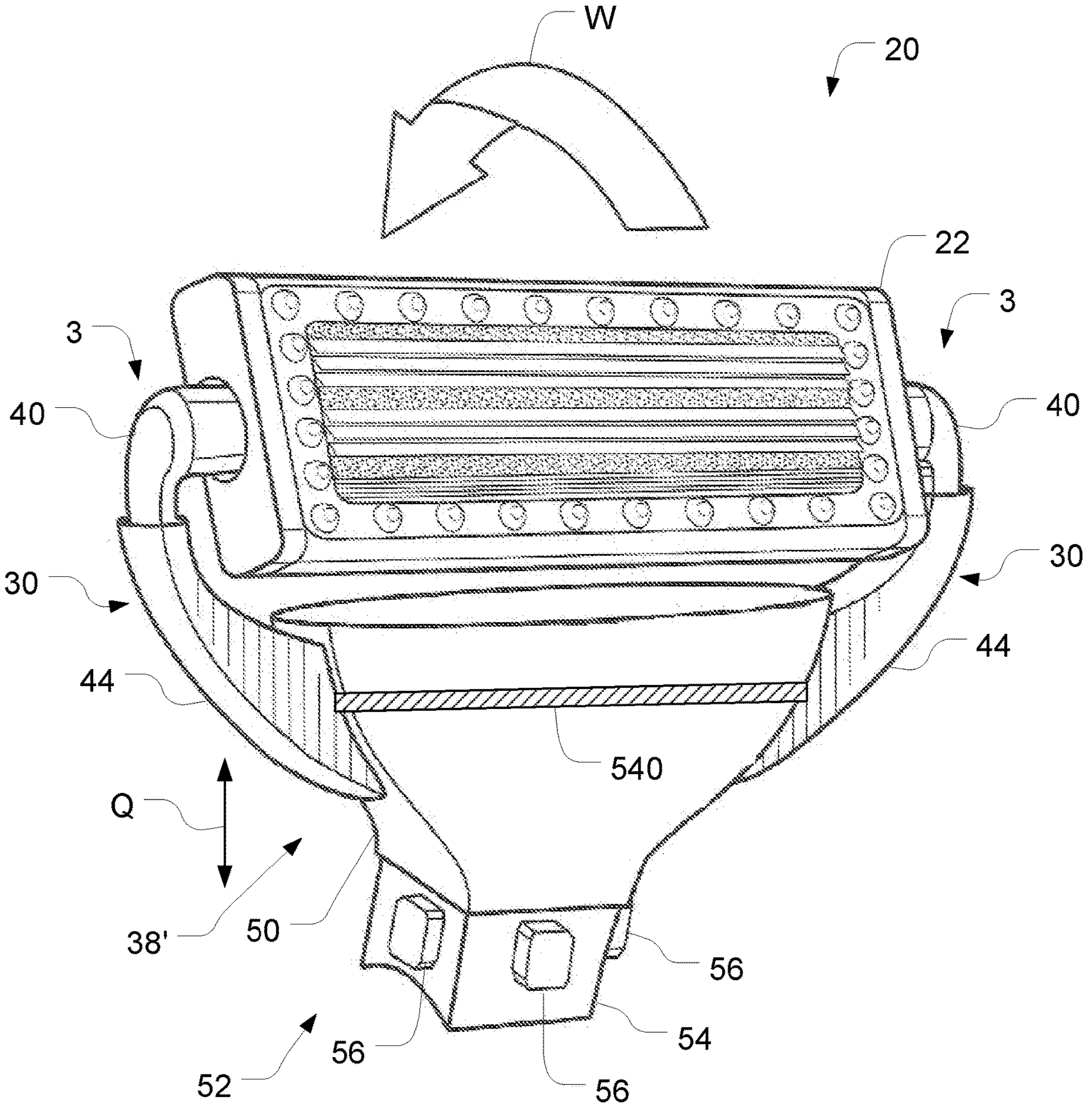
Figure 56:
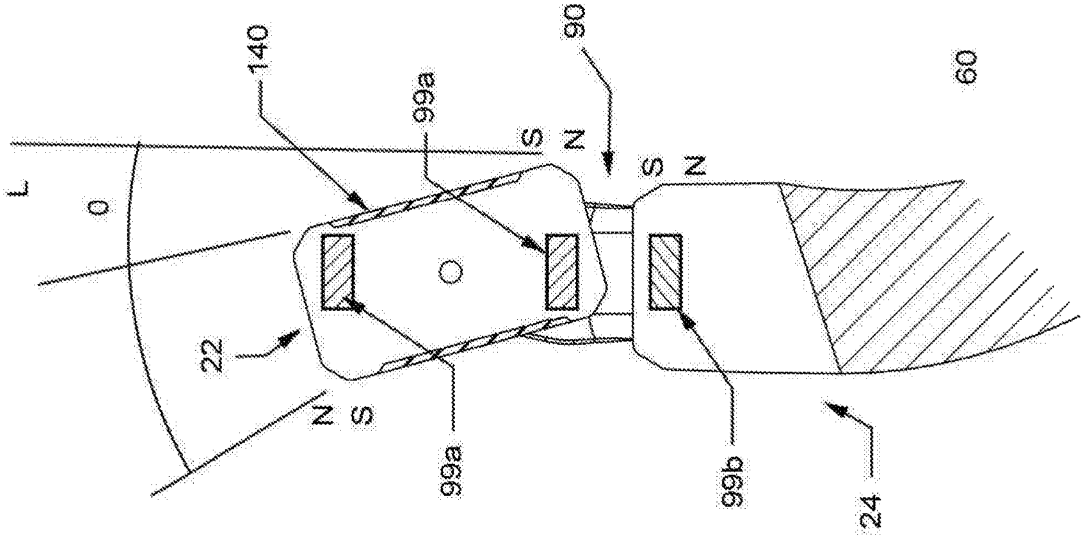
Figure 55:
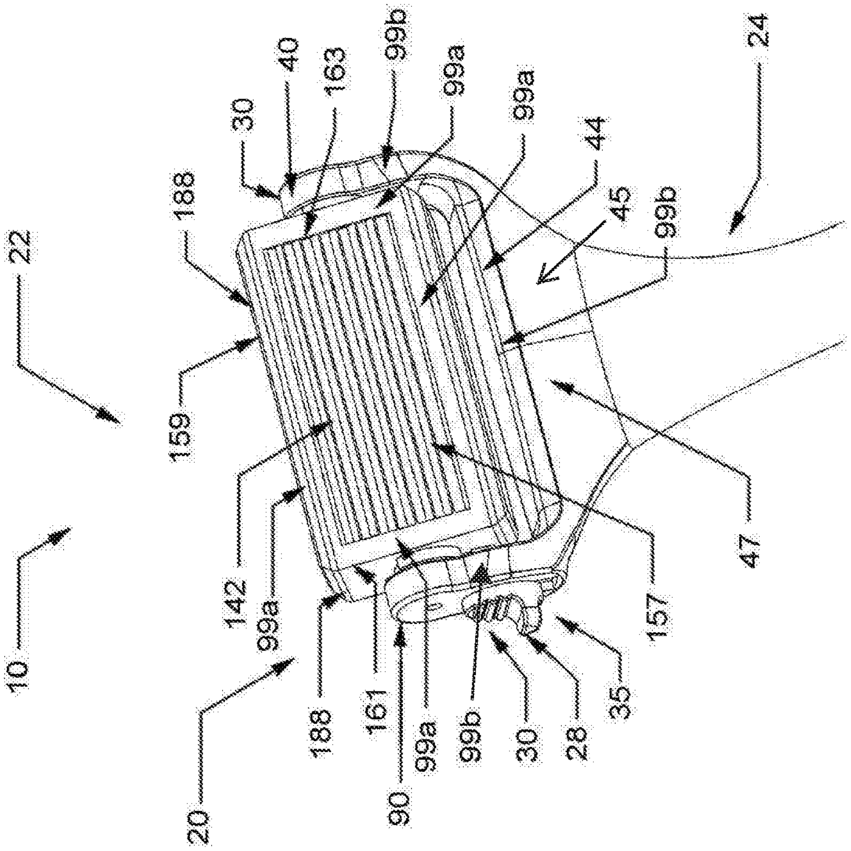
Figure 57:
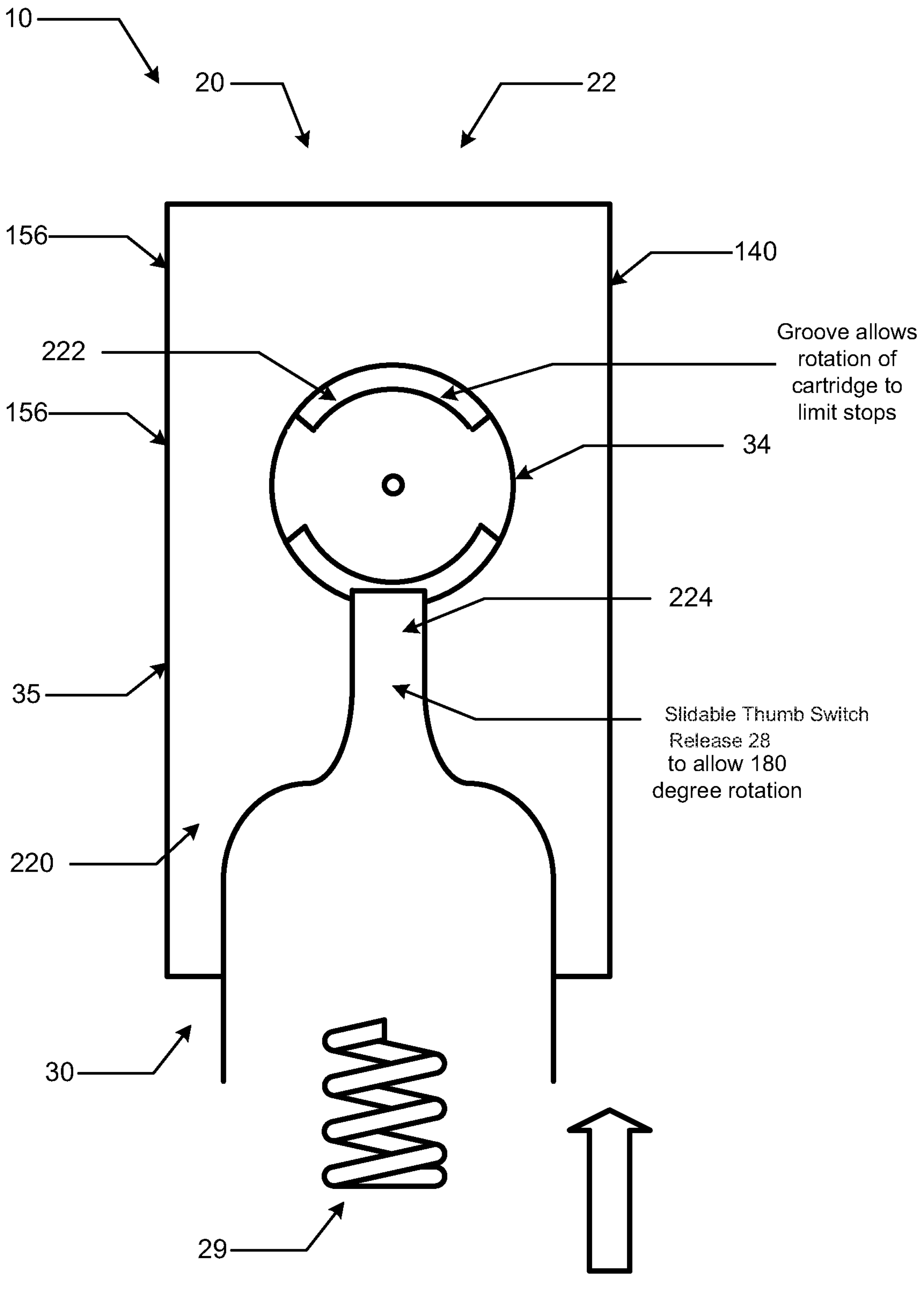
Figure 58:
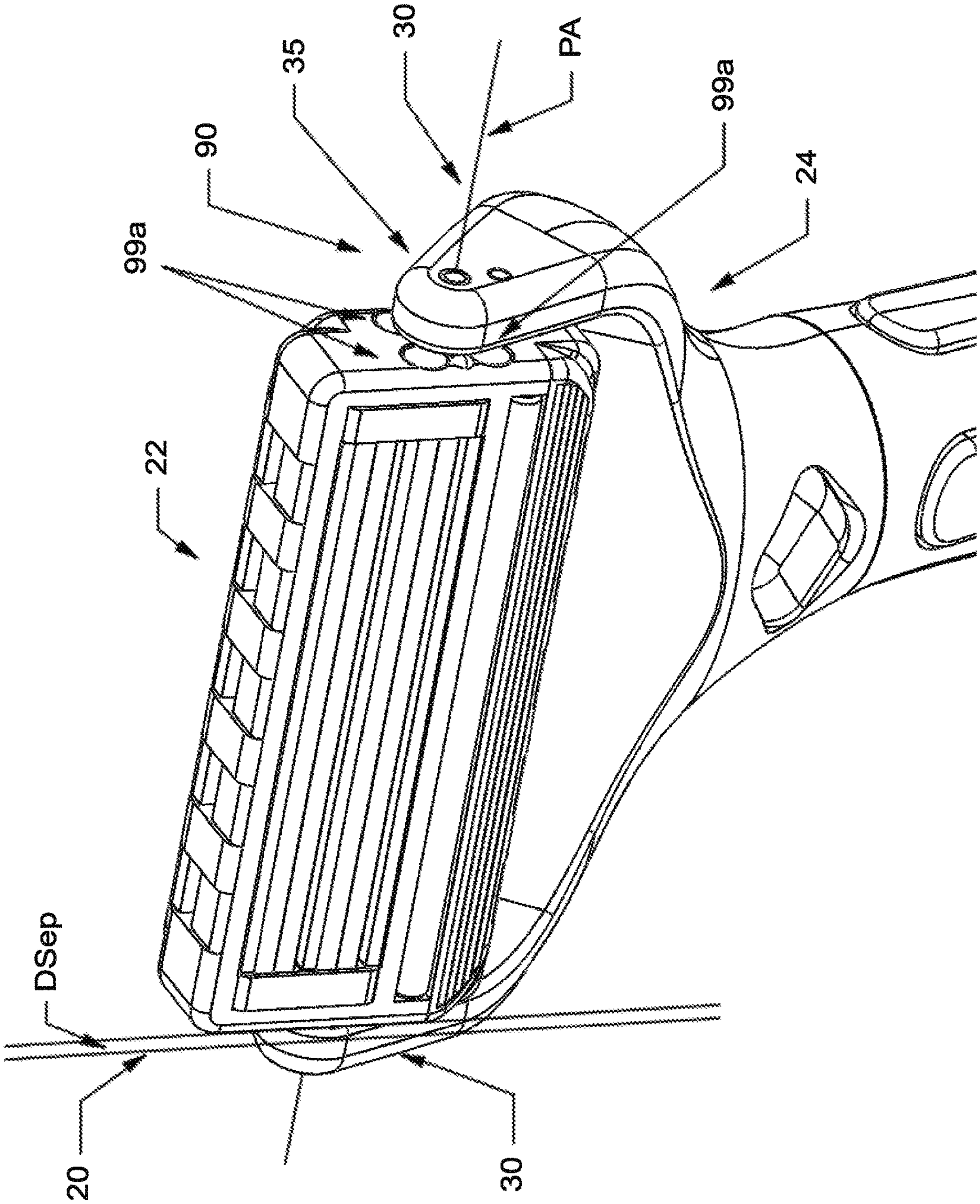
Figure 59A:
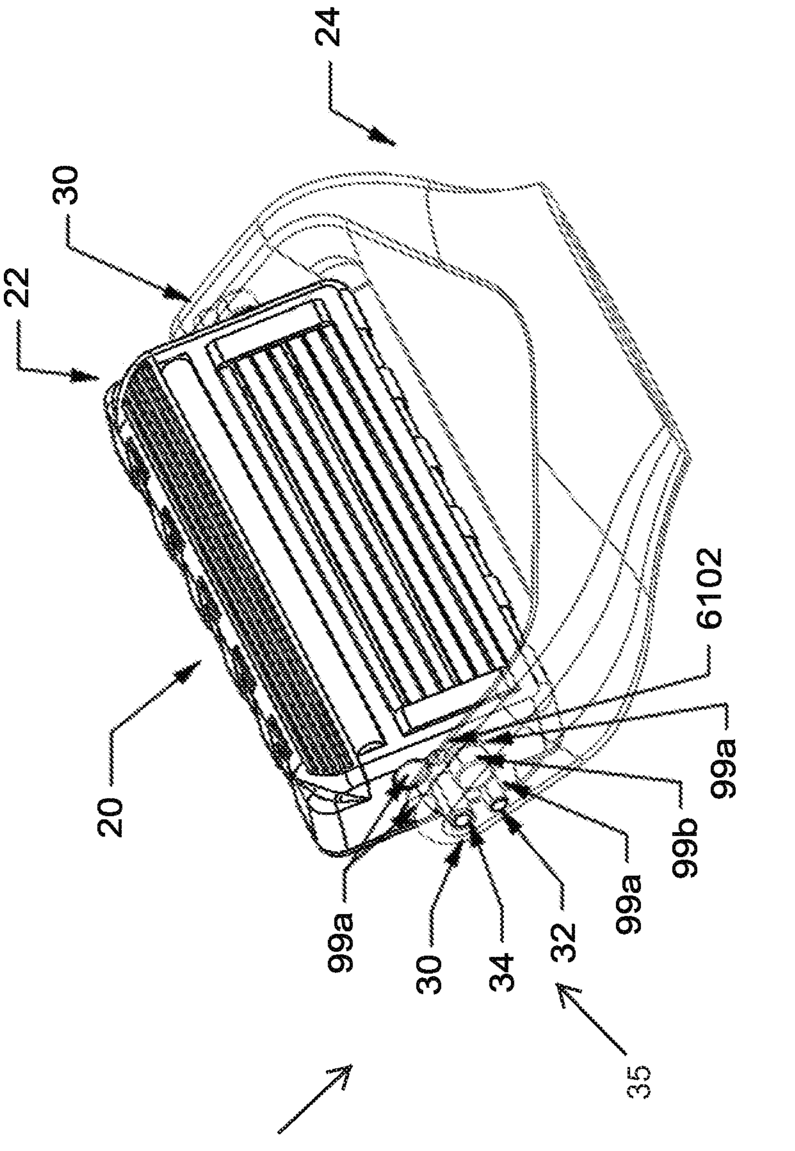
Figure 59B:
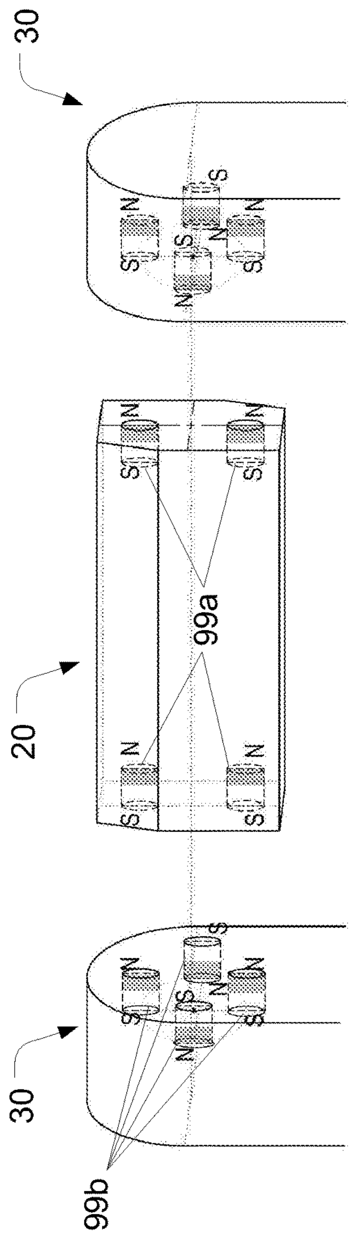
Figure 59C:
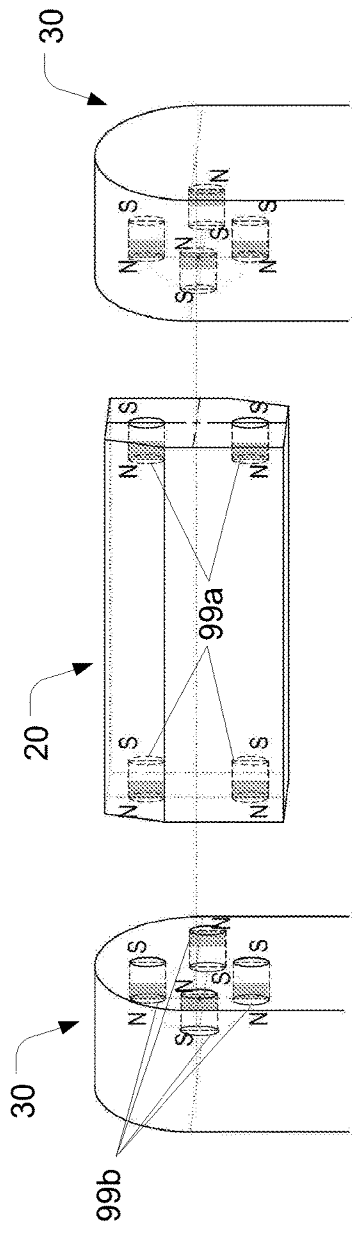
Figure 59D:
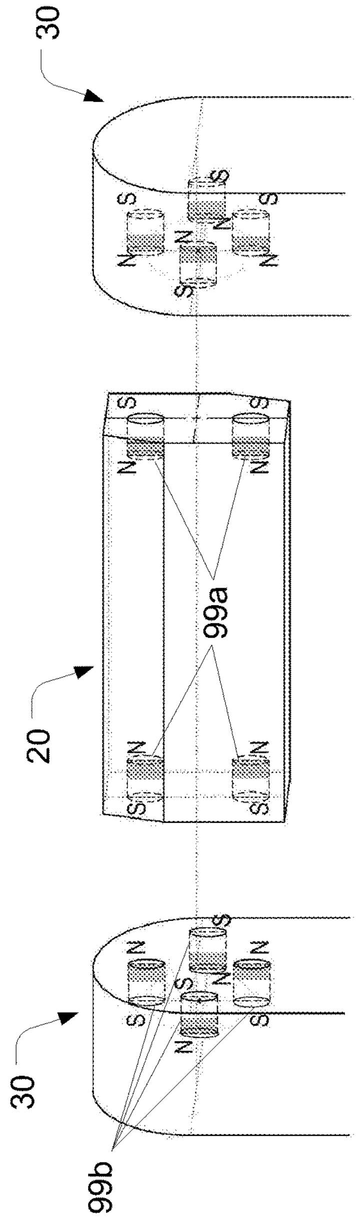
Figure 60:
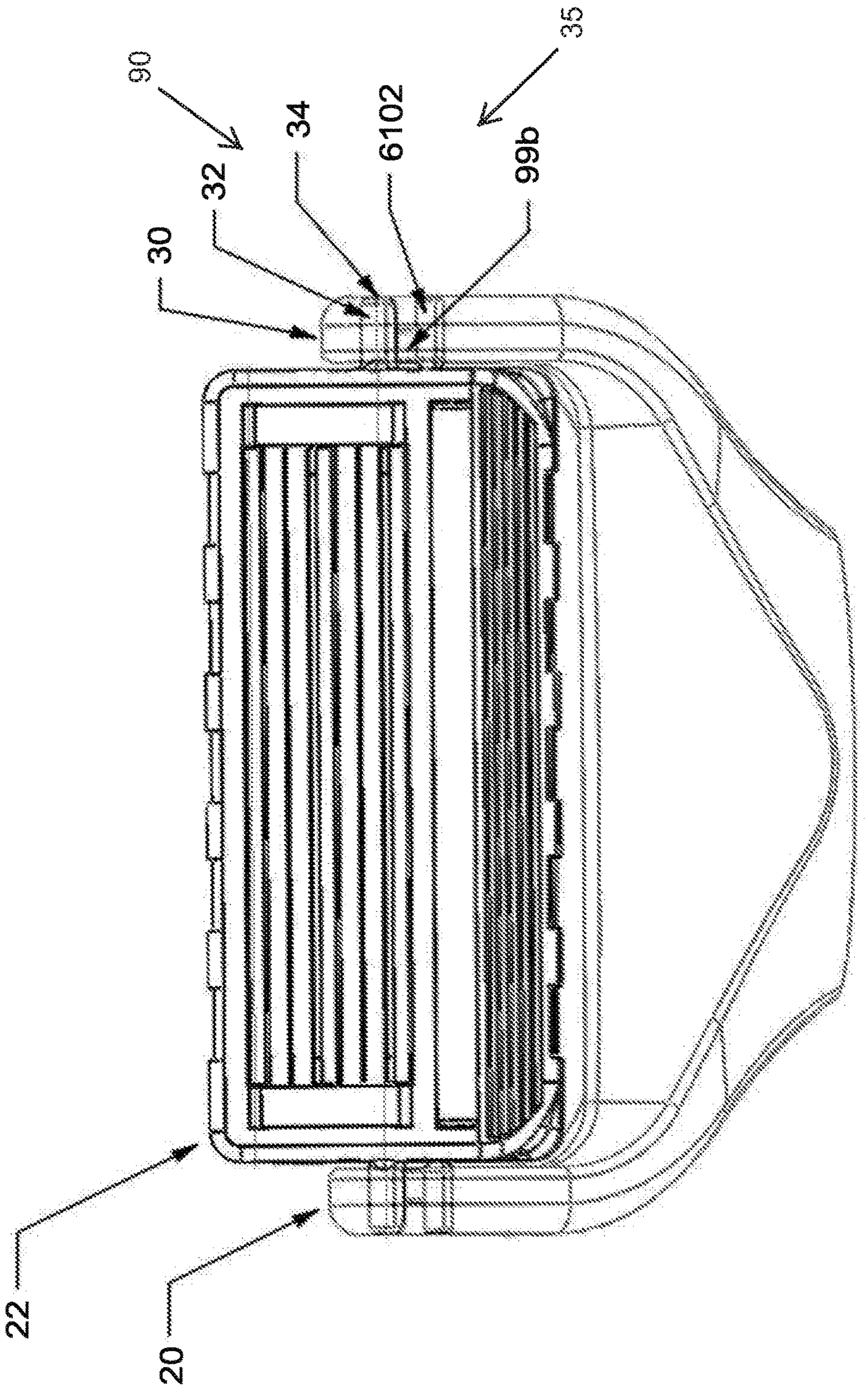
Figure 61:
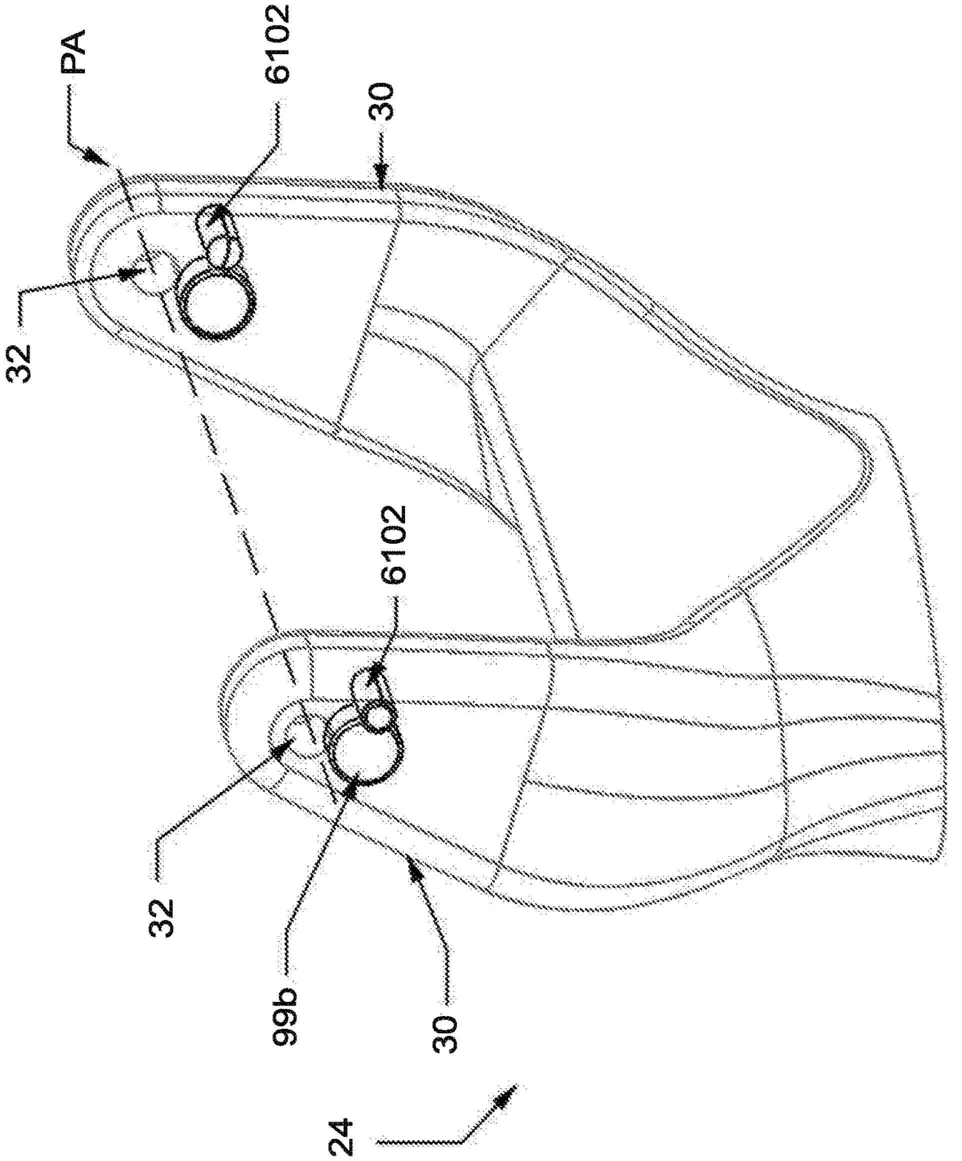
Figure 62:
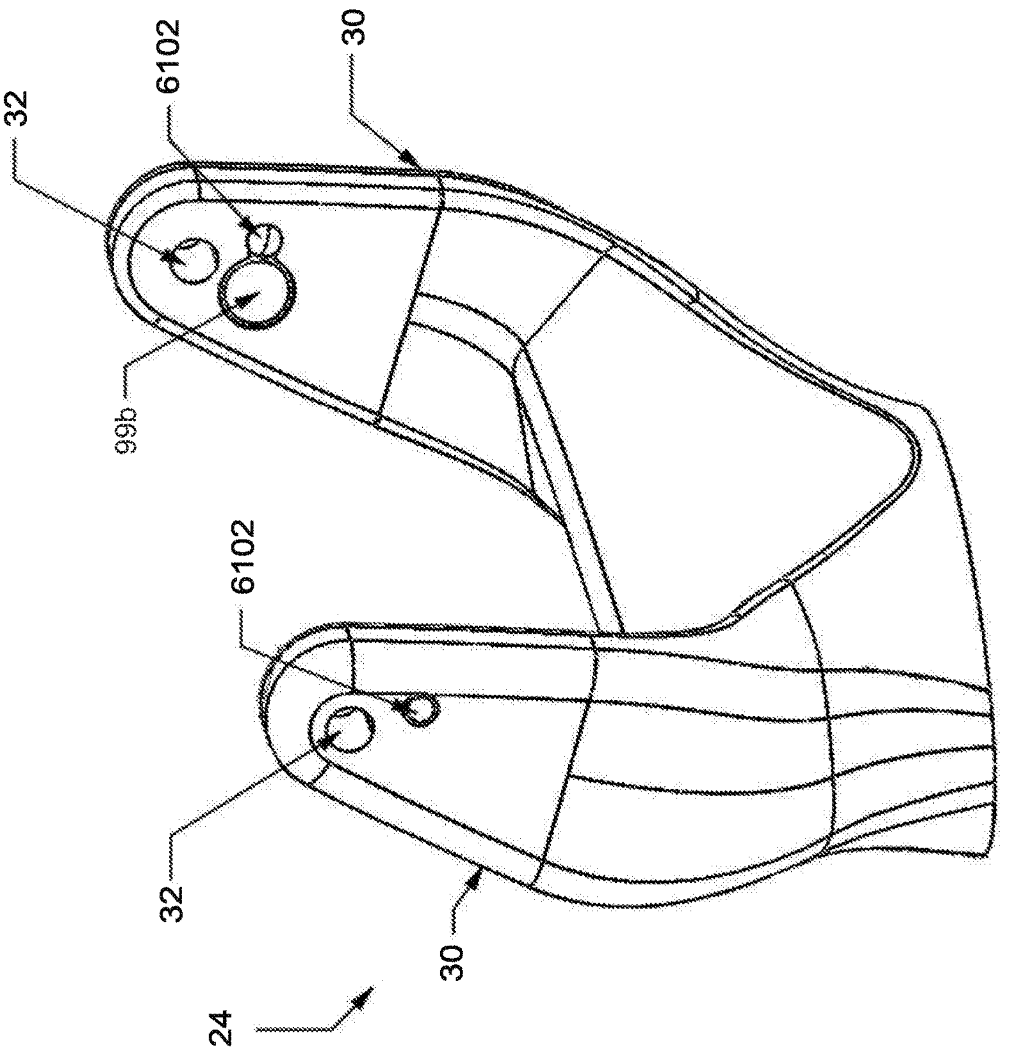
Figure 63:
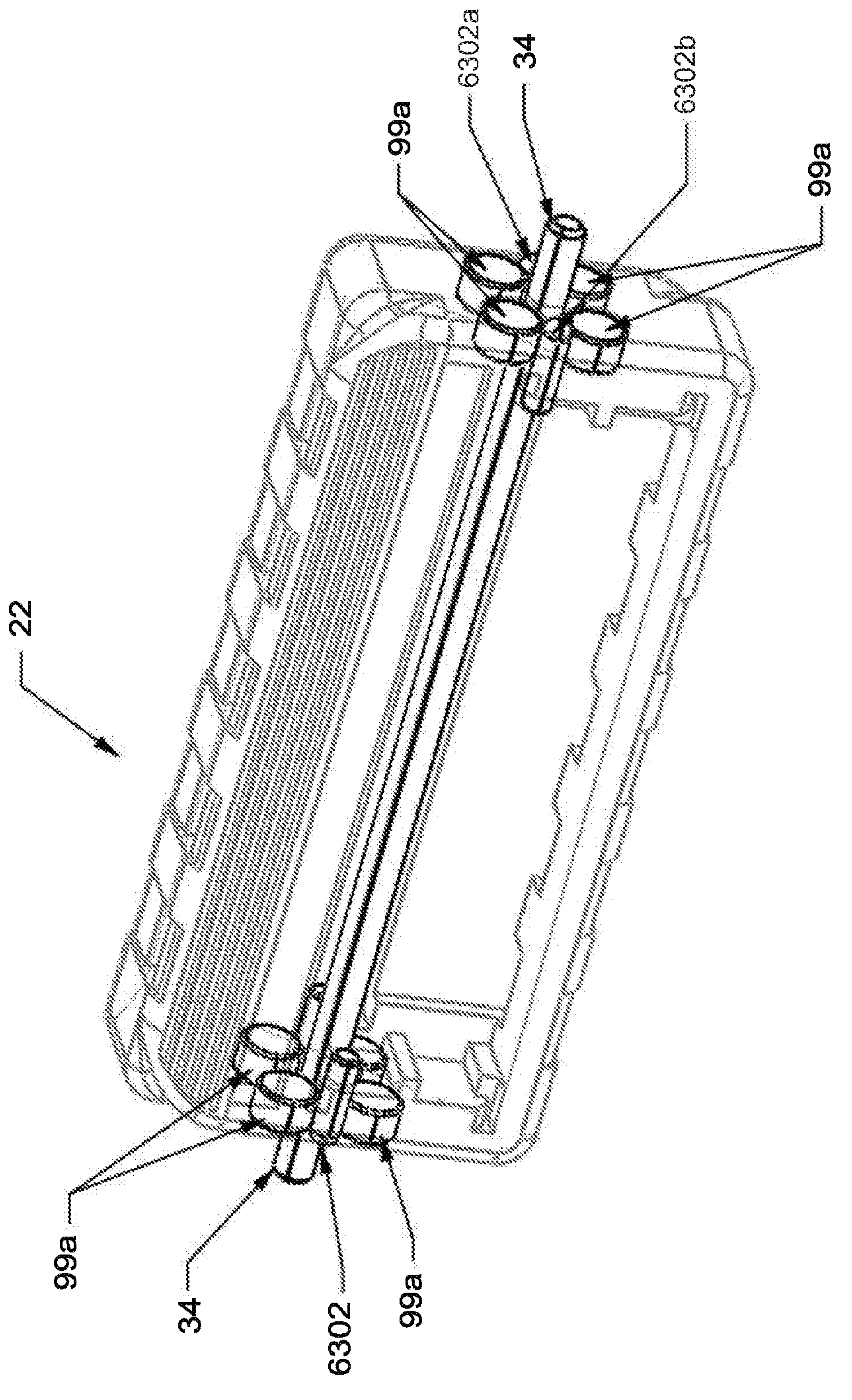
Figure 64:
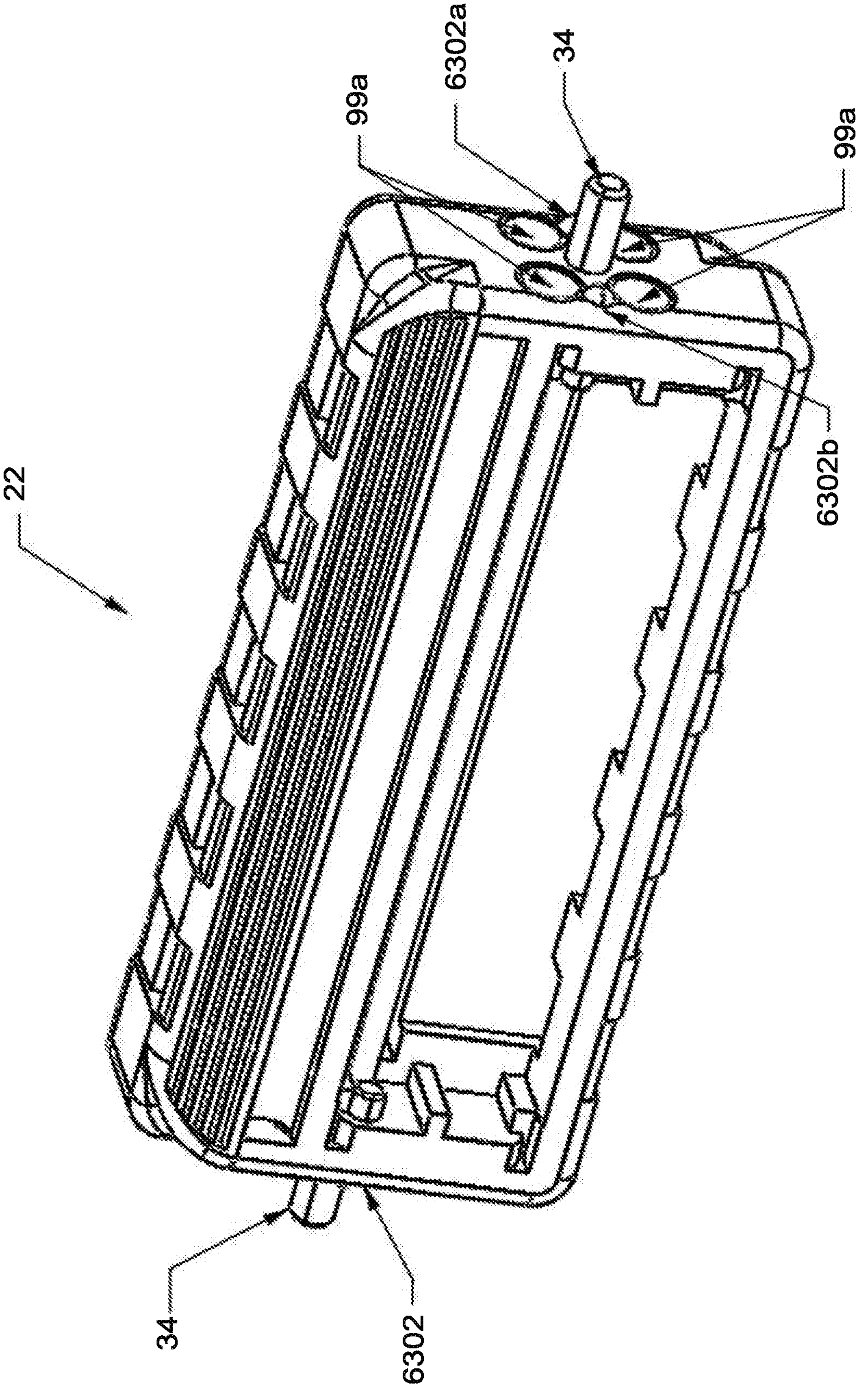
Figure 65:
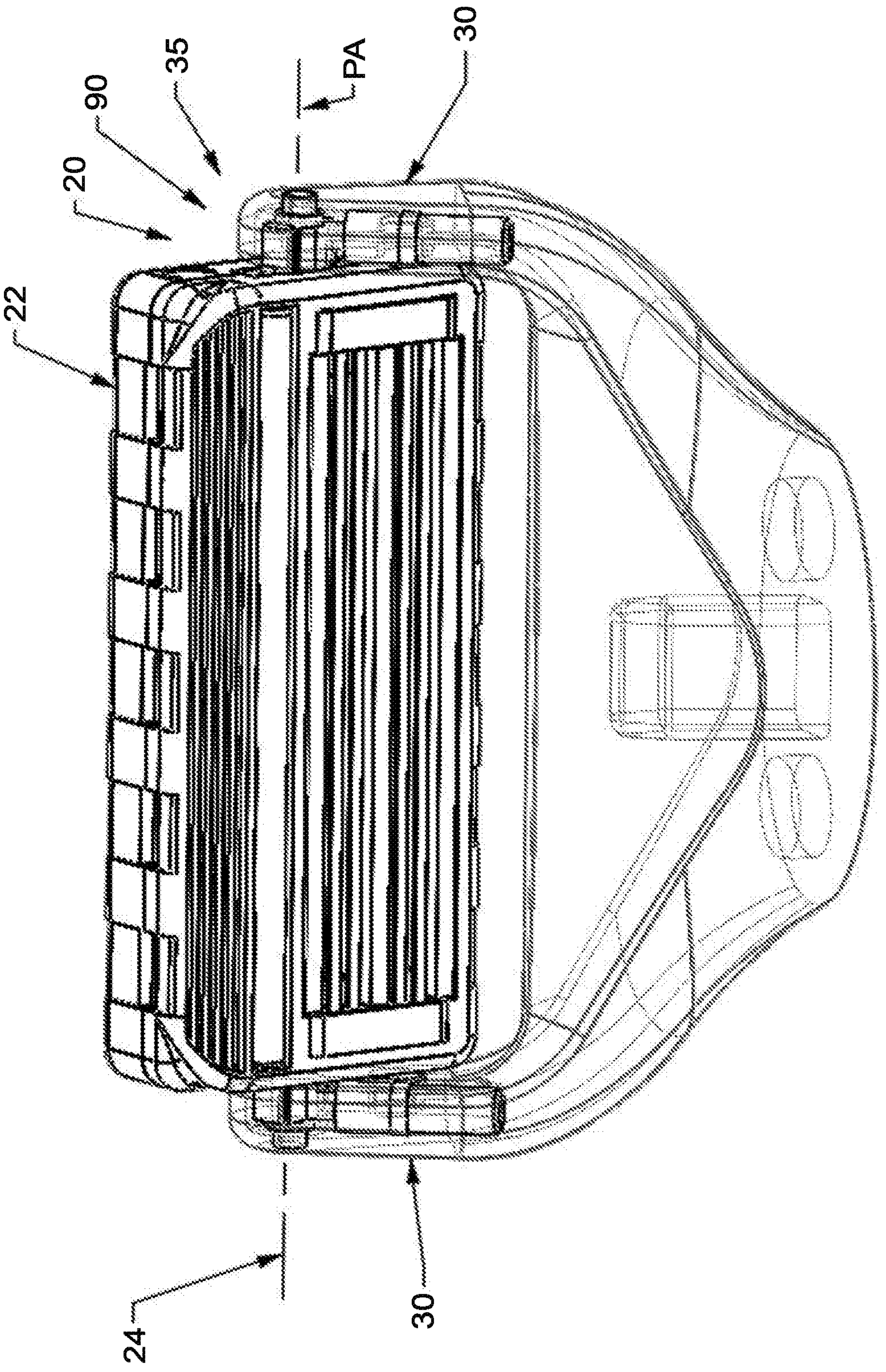
Figure 66:
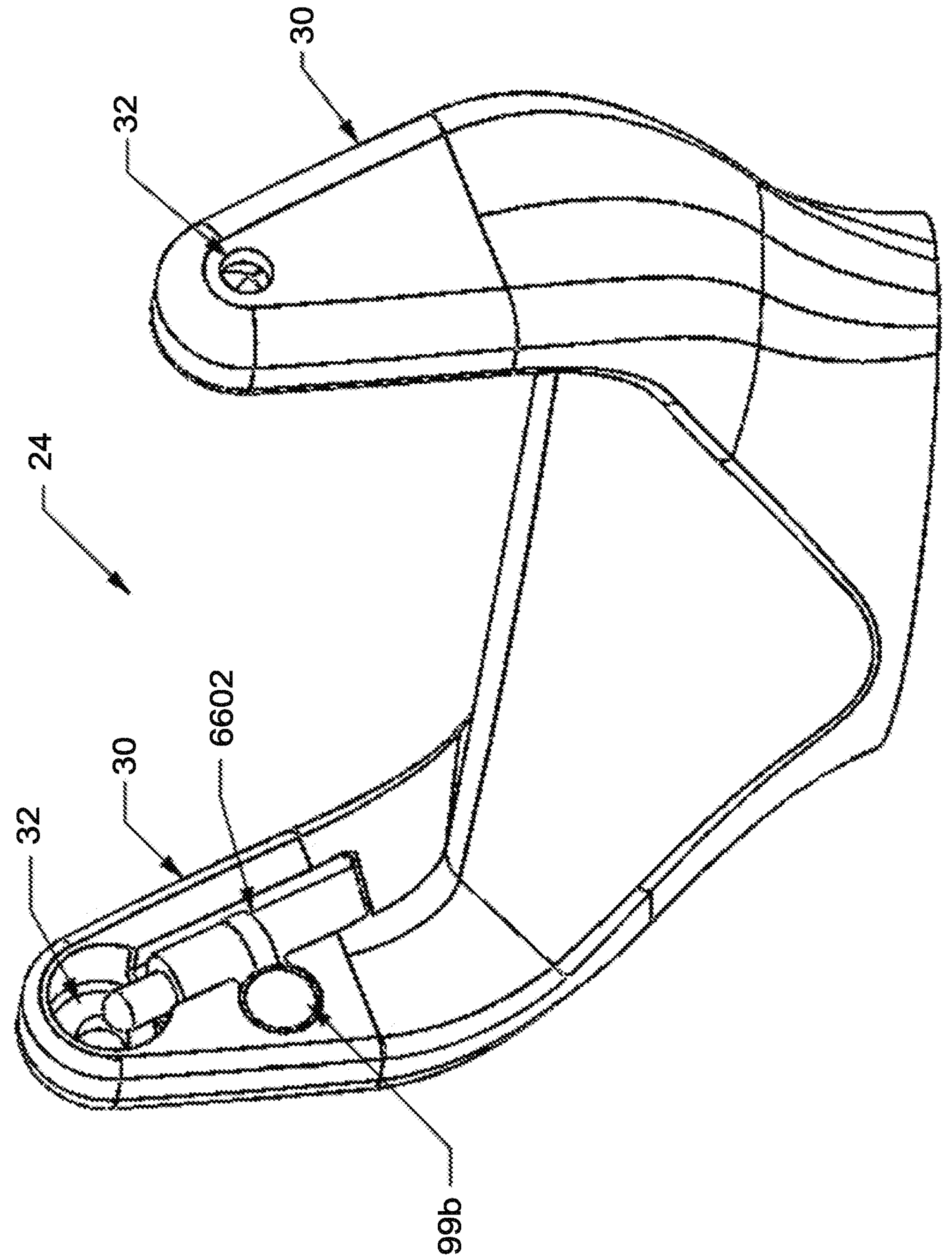
Figure 67:
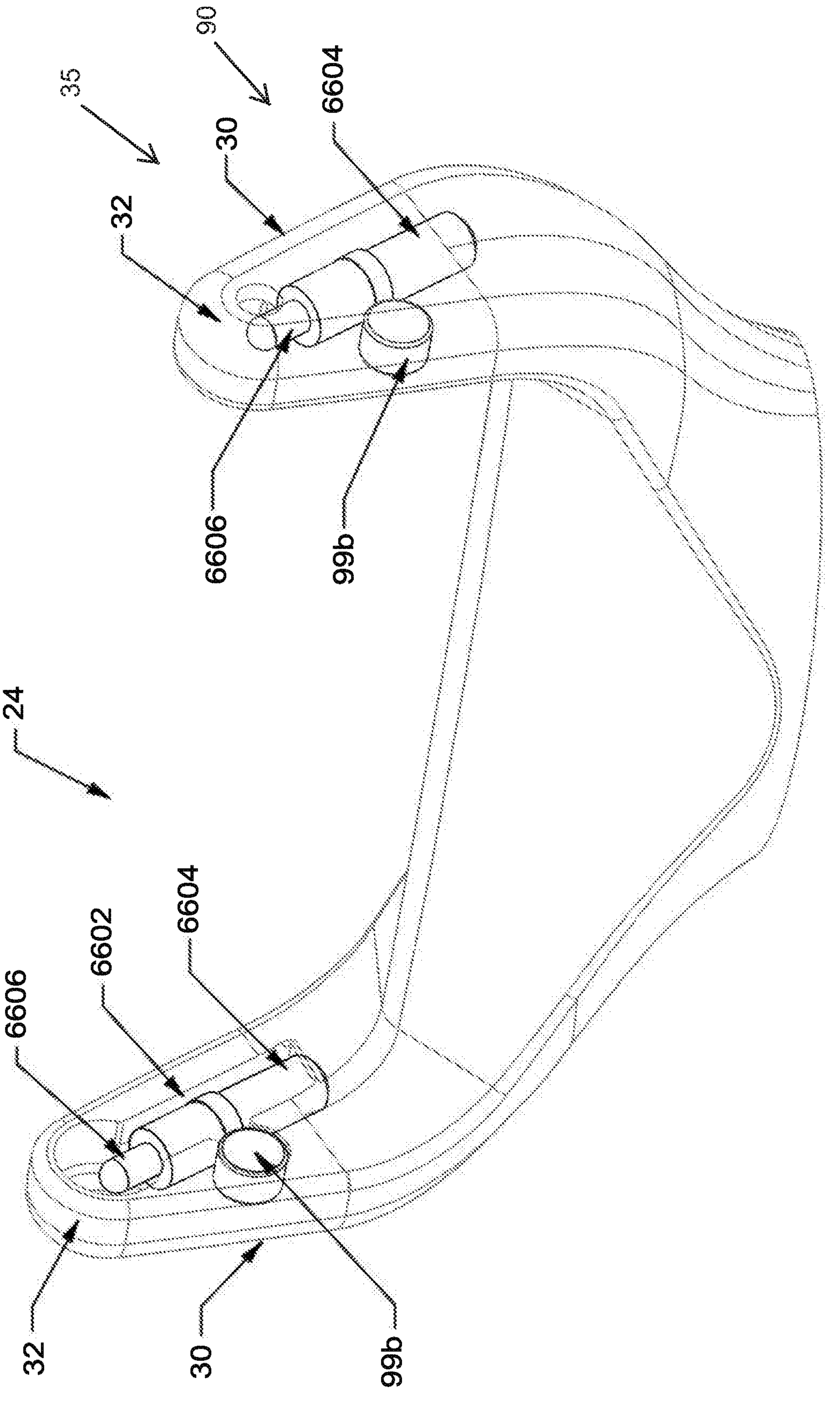
Figure 68:
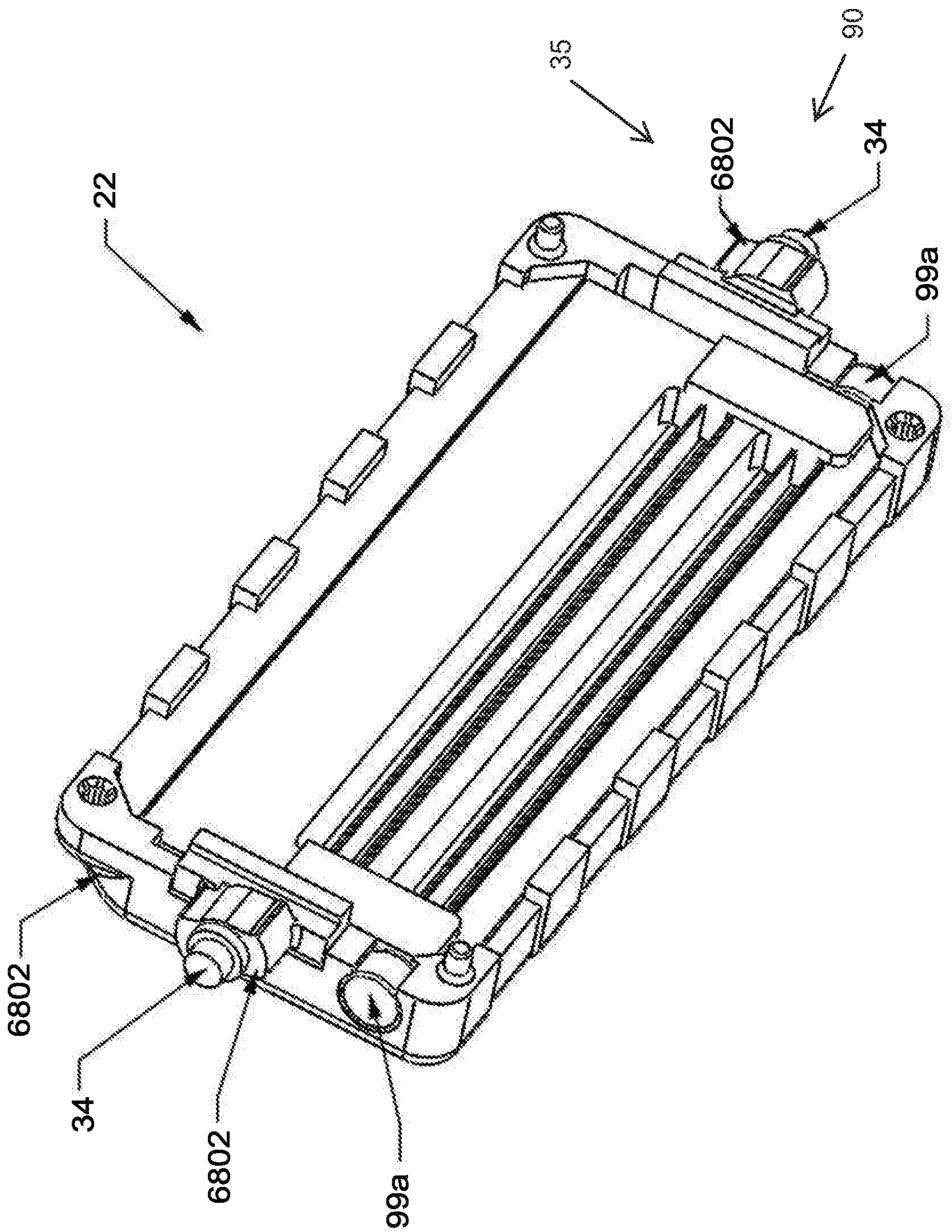
Figure 69:
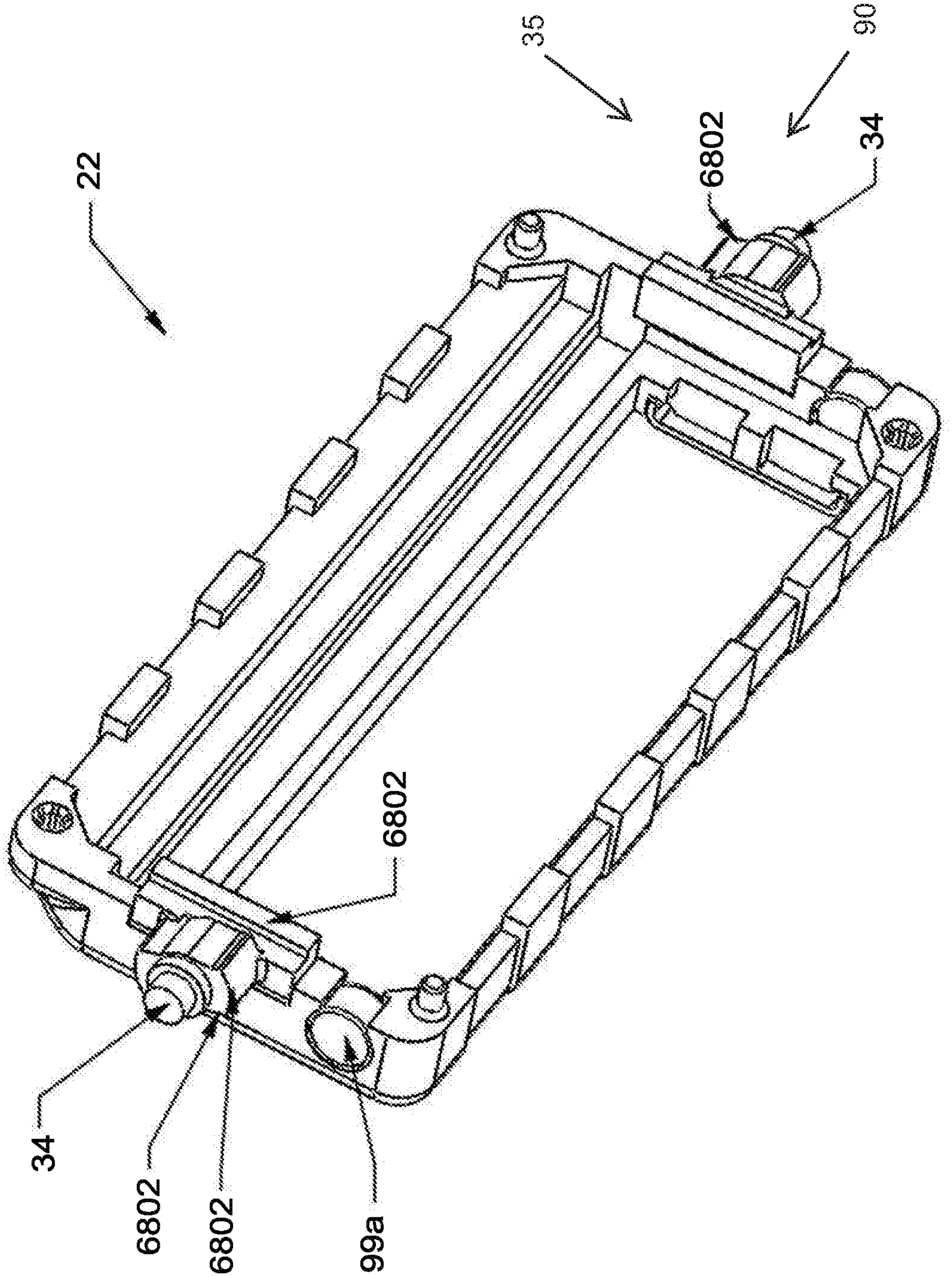
Figure 70:
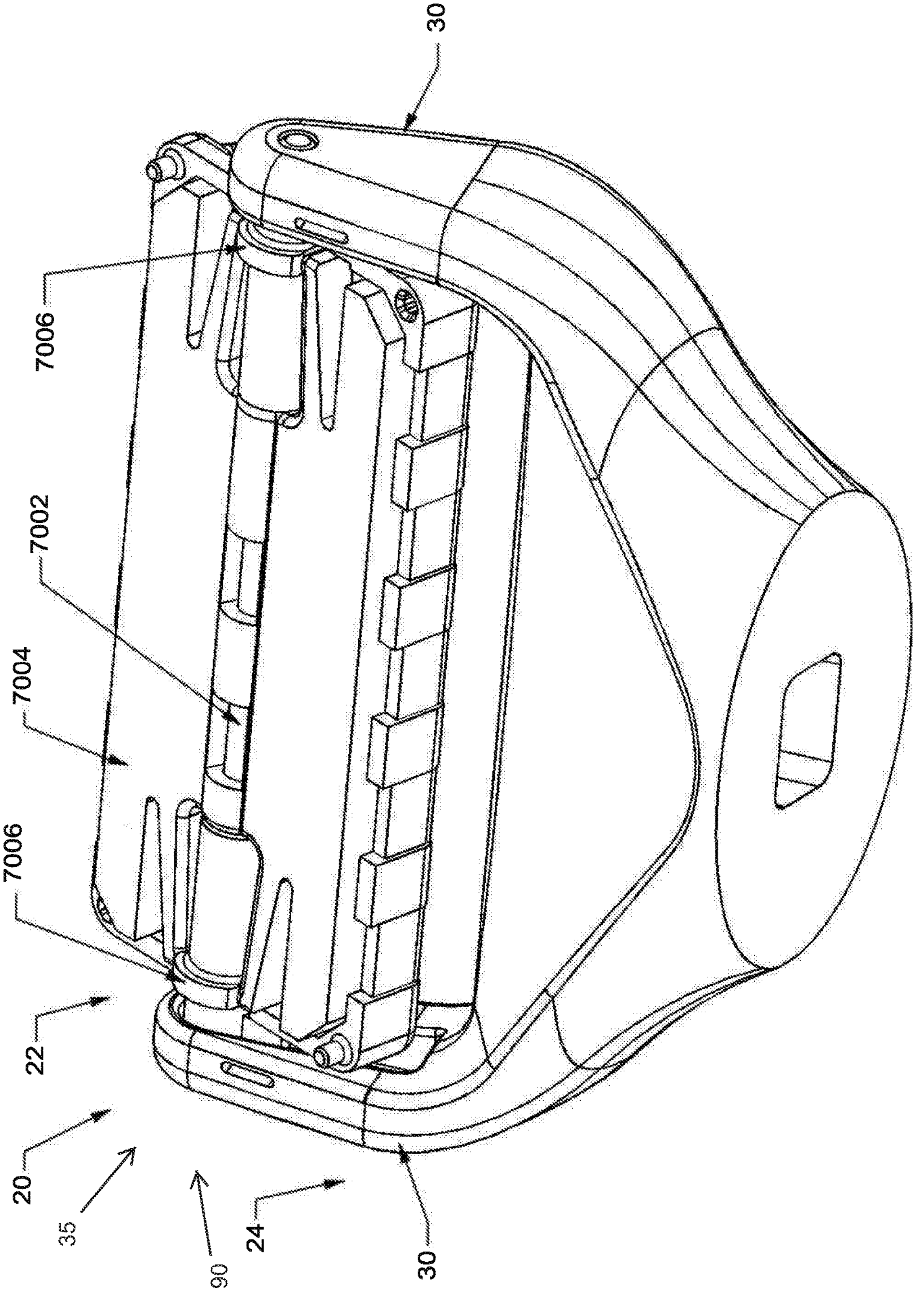
Figure 71:
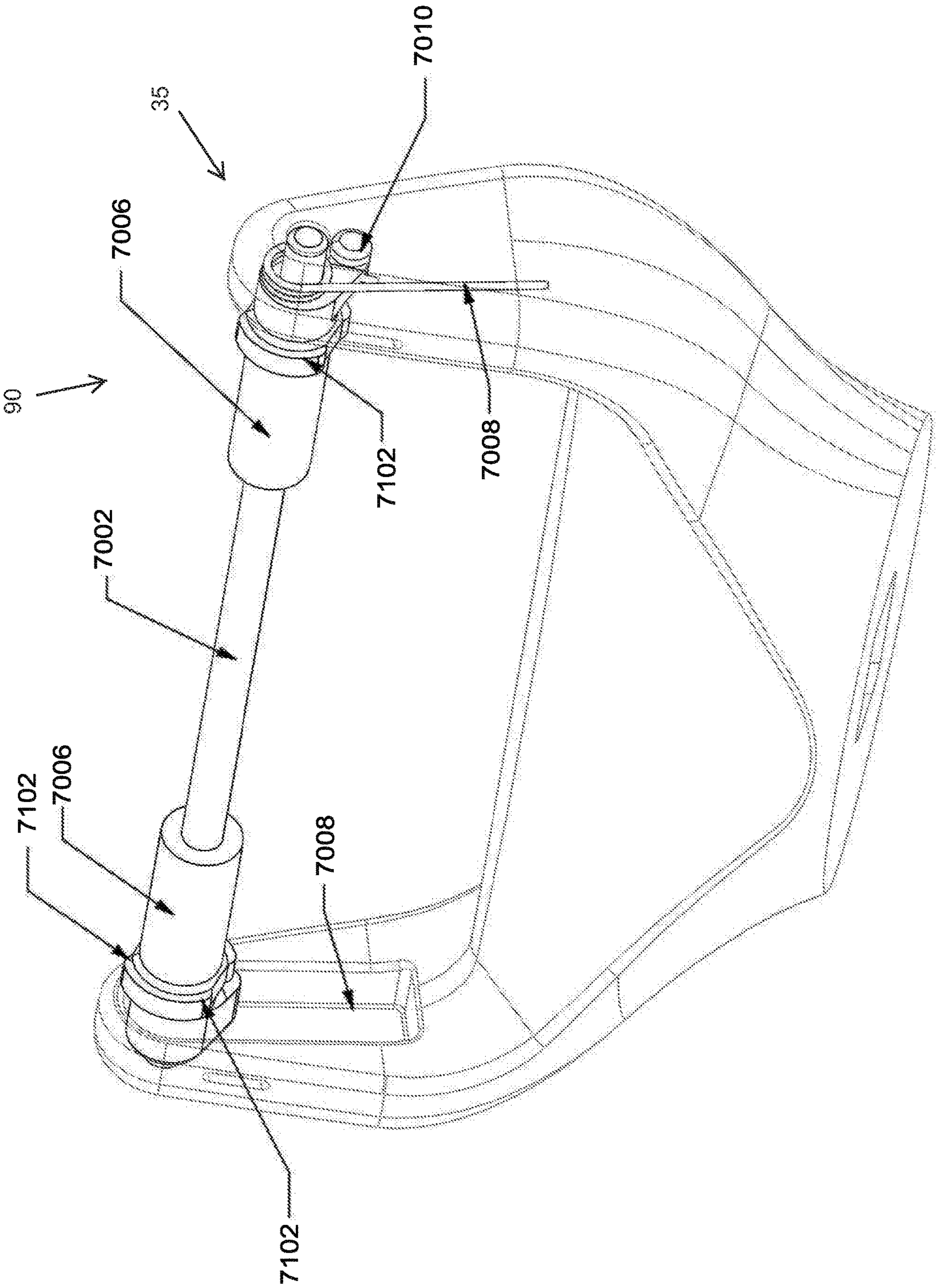
Figure 72:
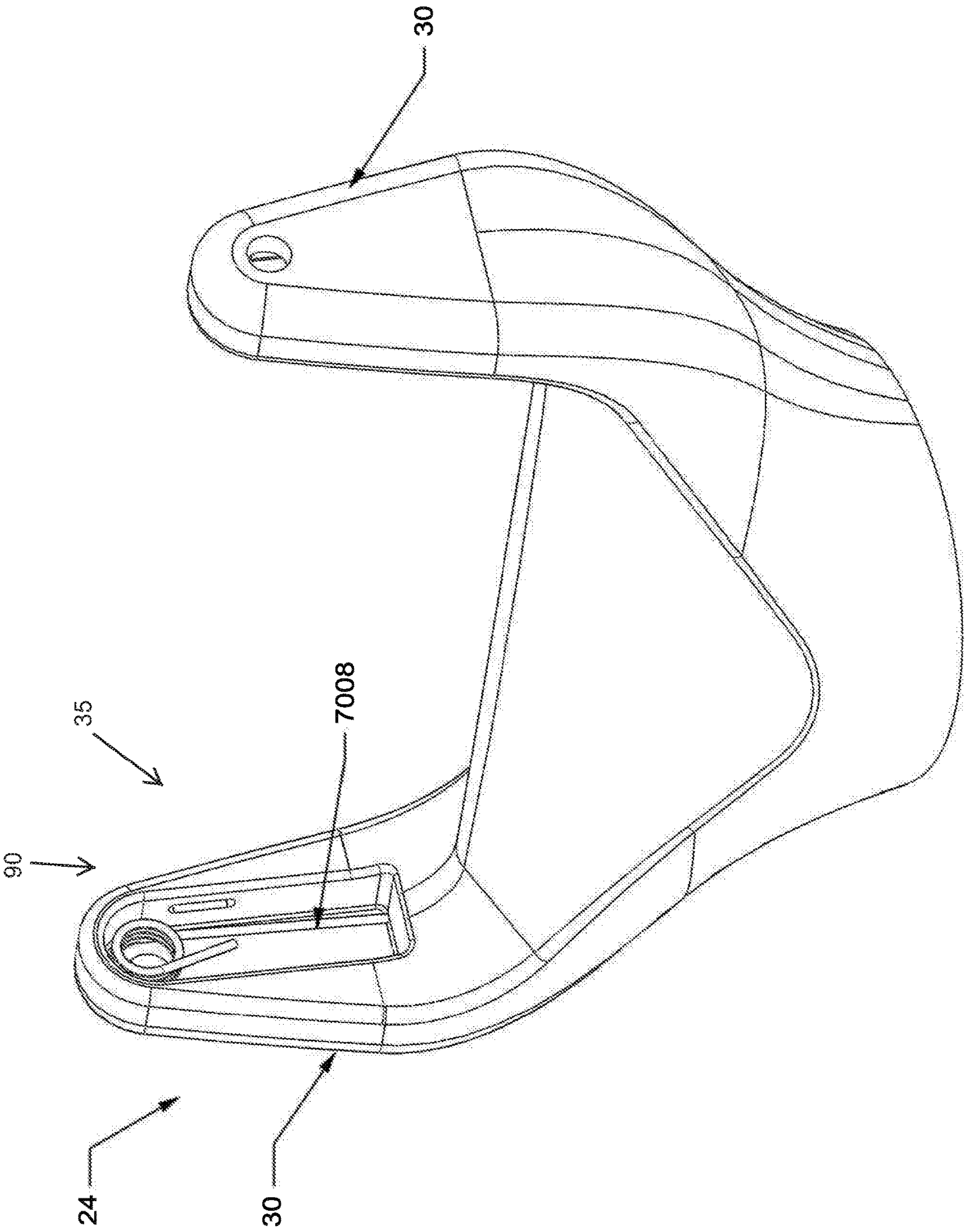
Figure 73:
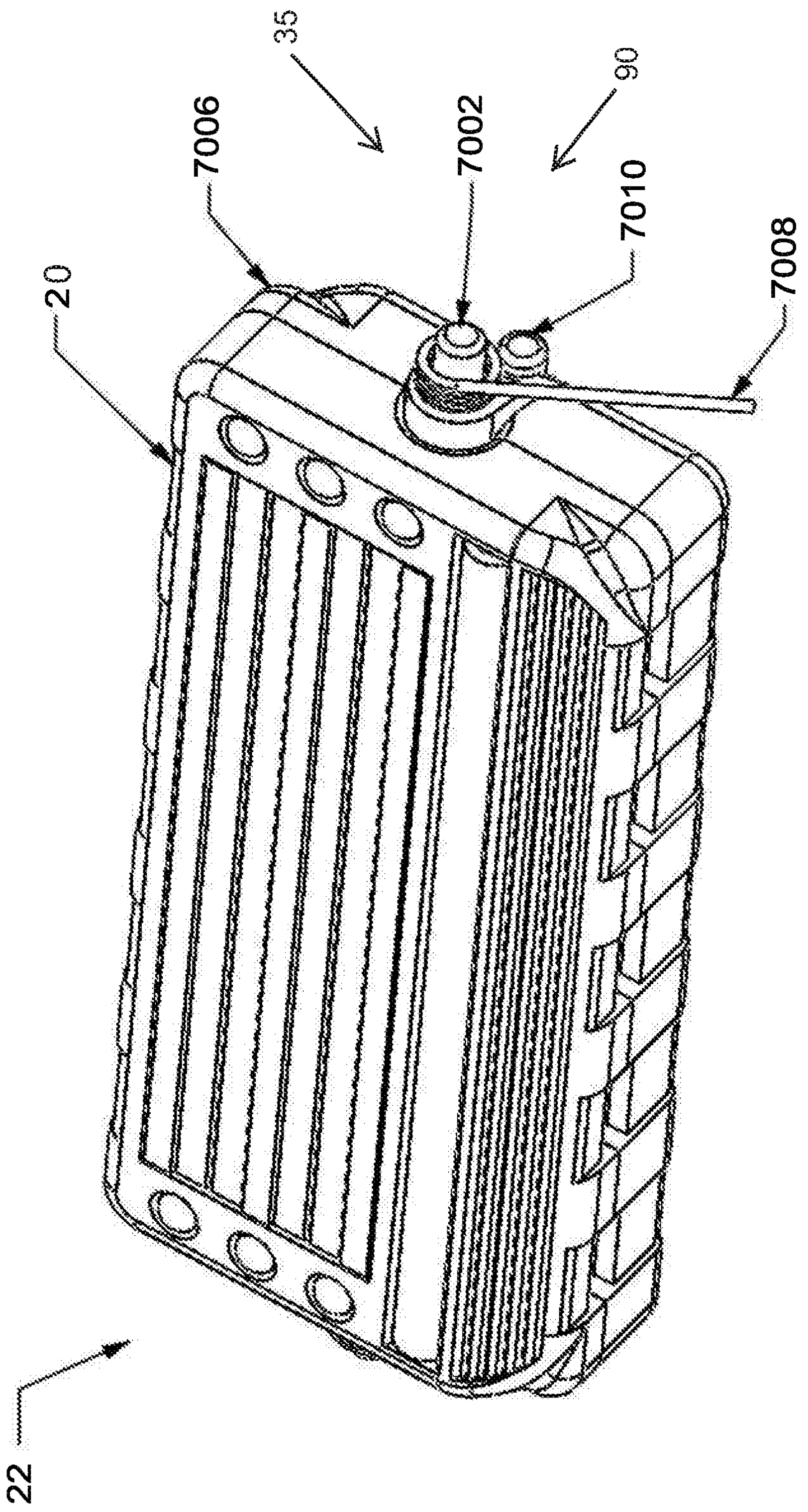
Figure 74:
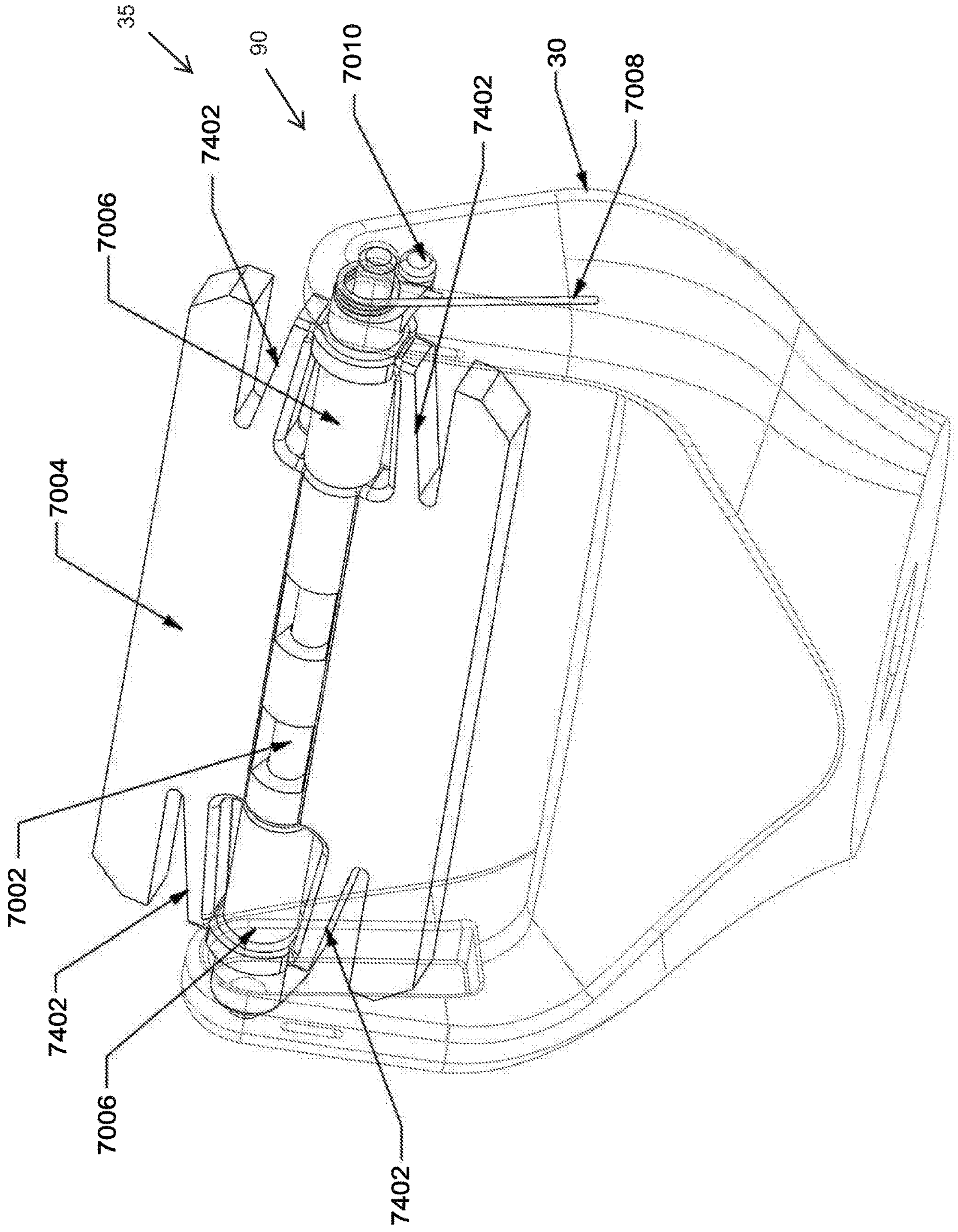
Figure 75:
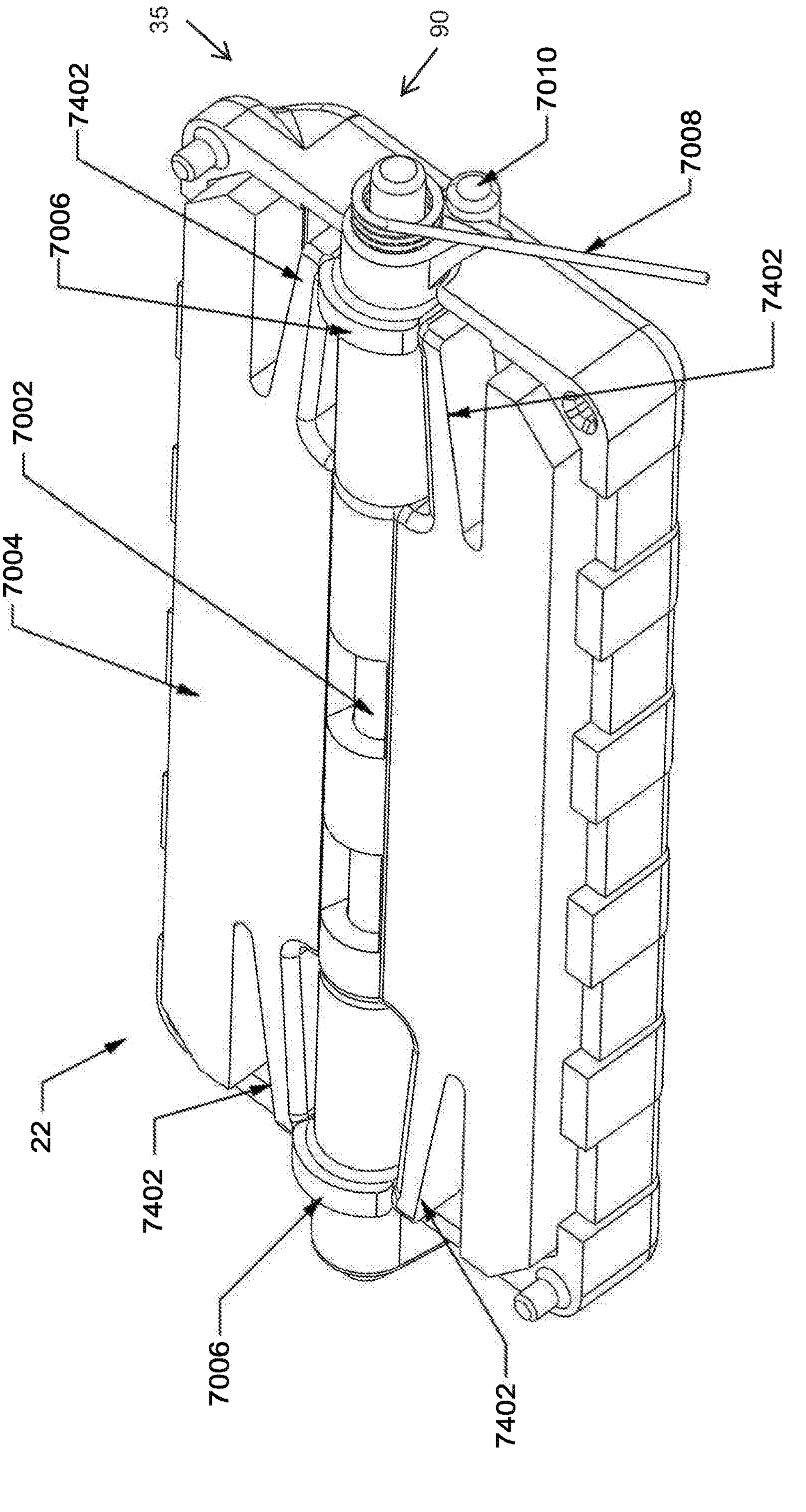
Figure 76:
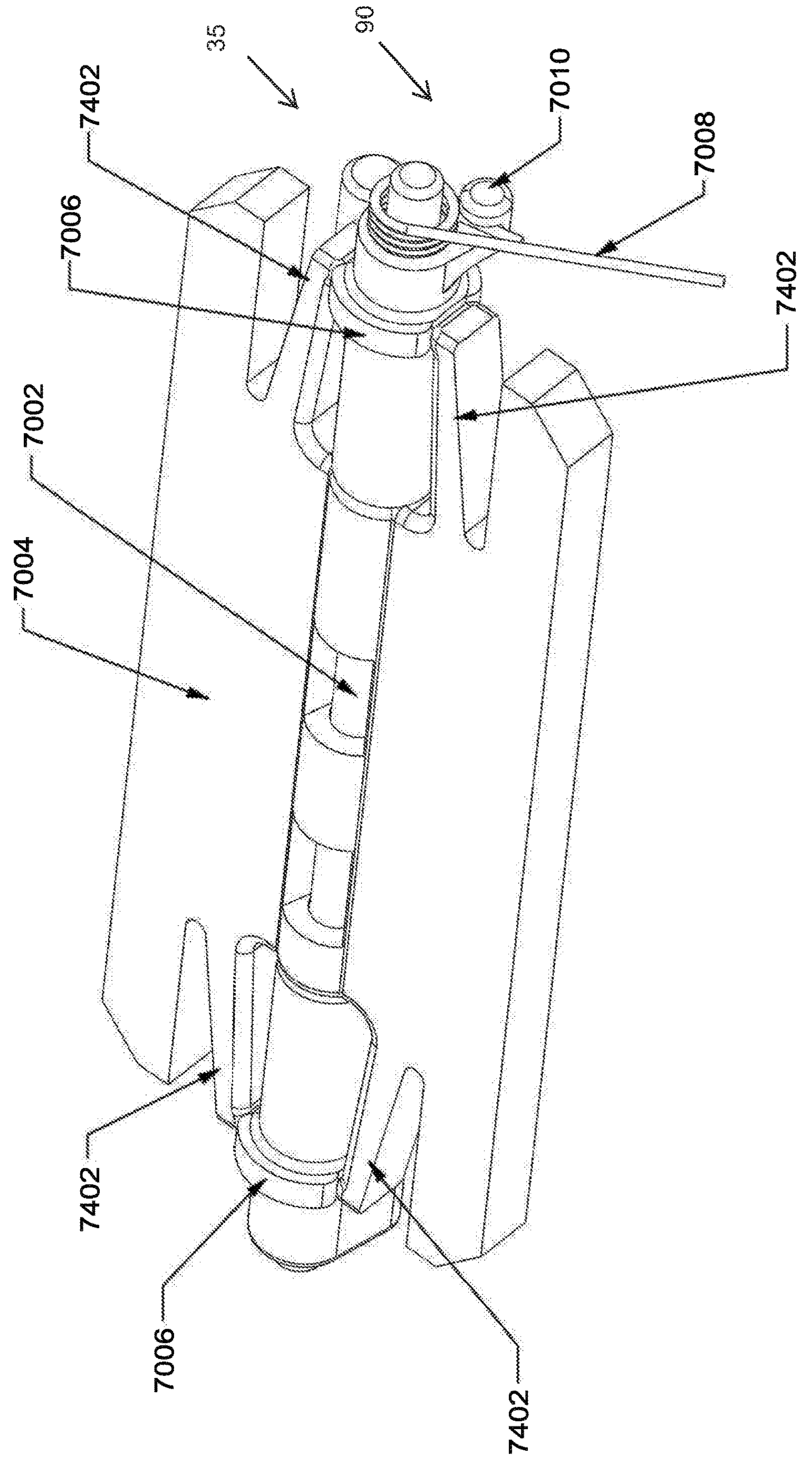
Figure 77:
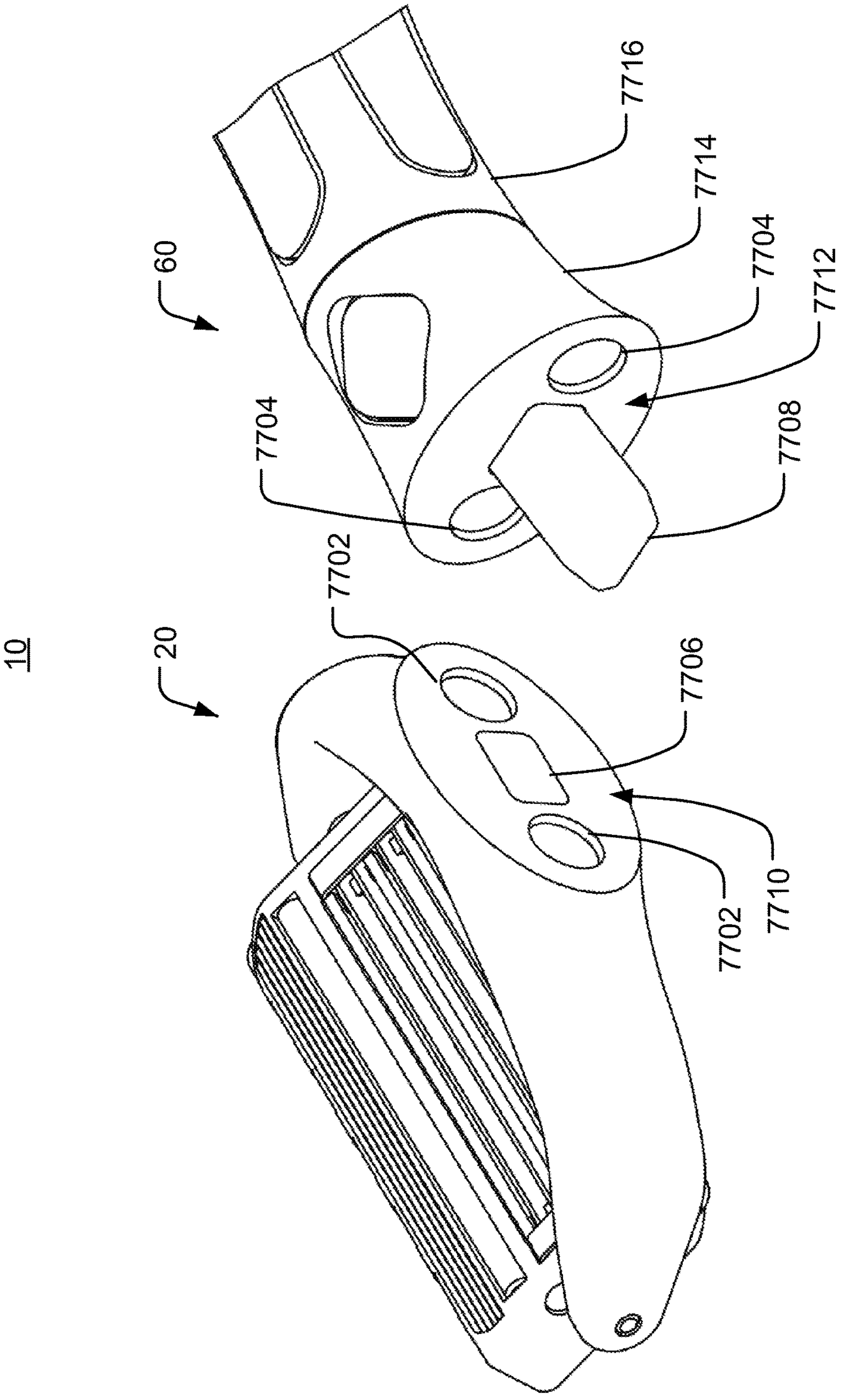
Figure 78:
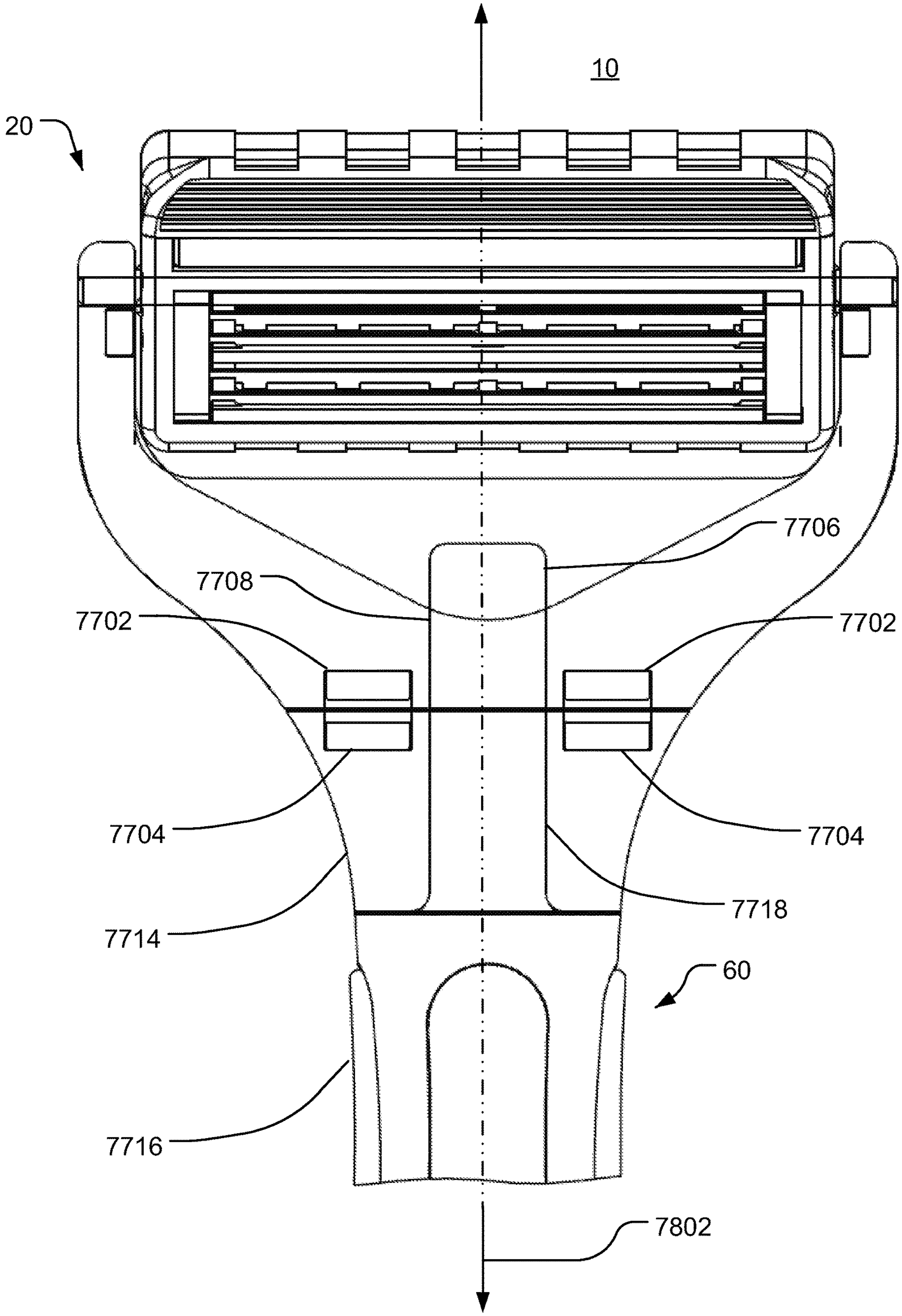
Figure 79:
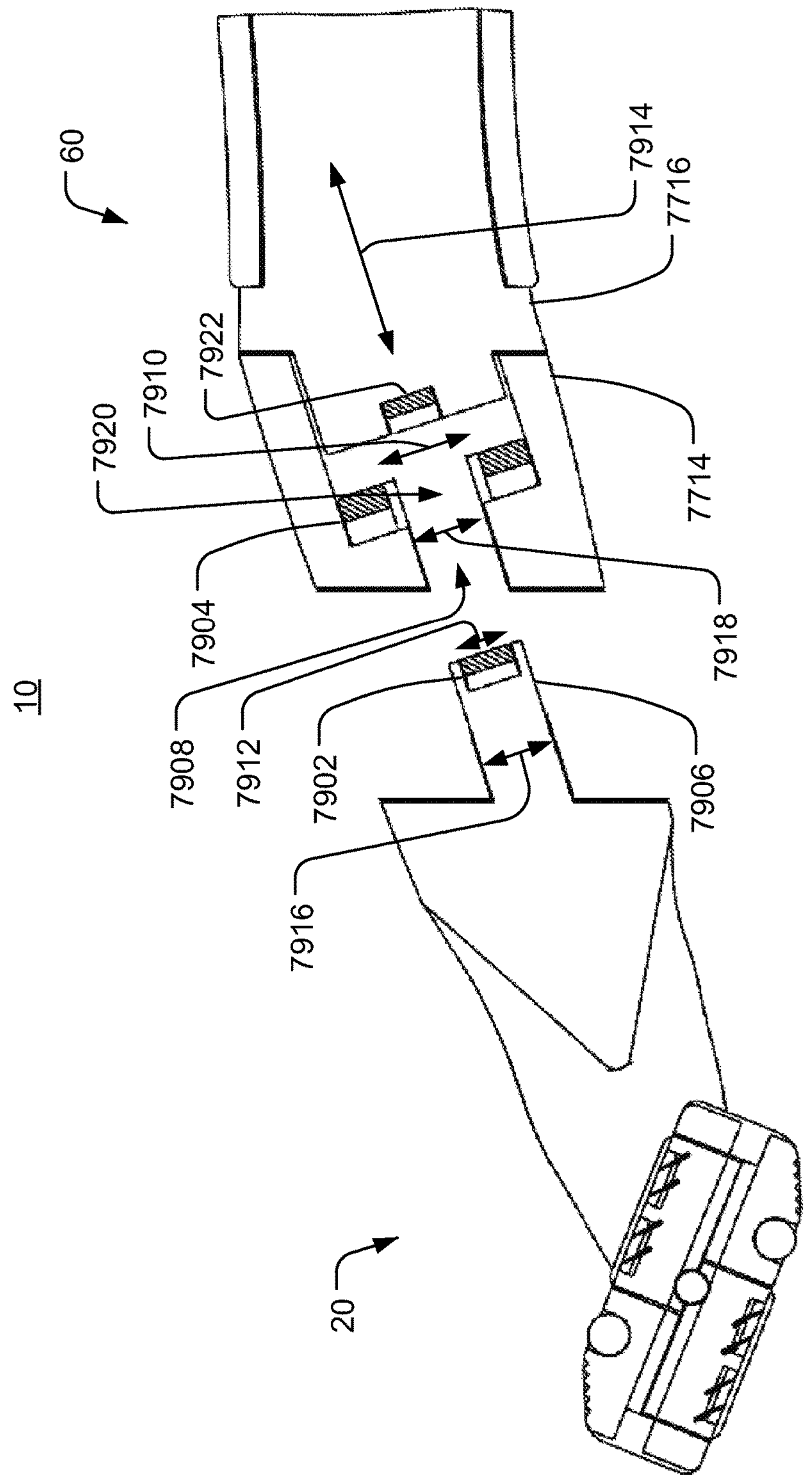
Figure 80:
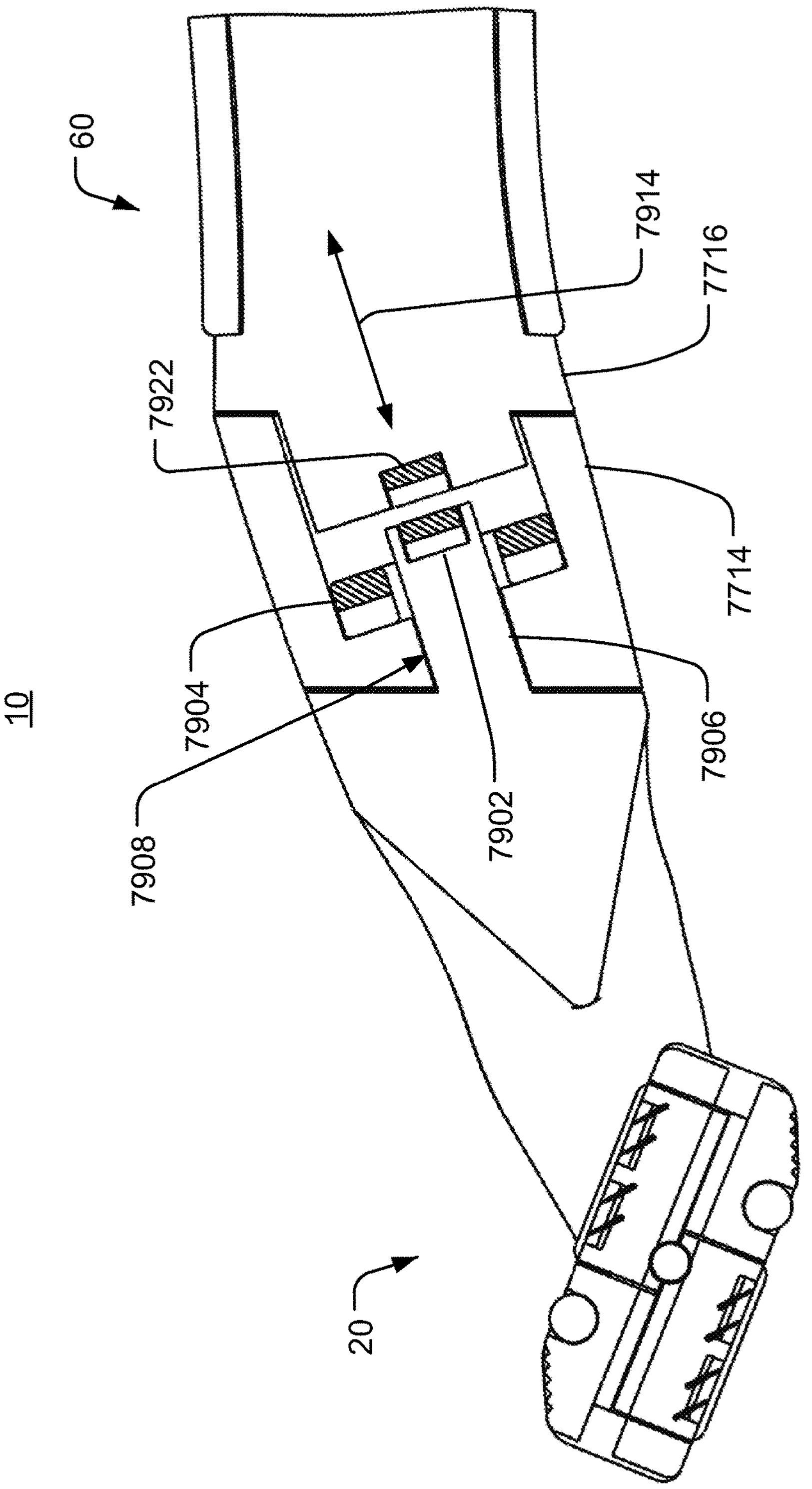
Figure 81A:
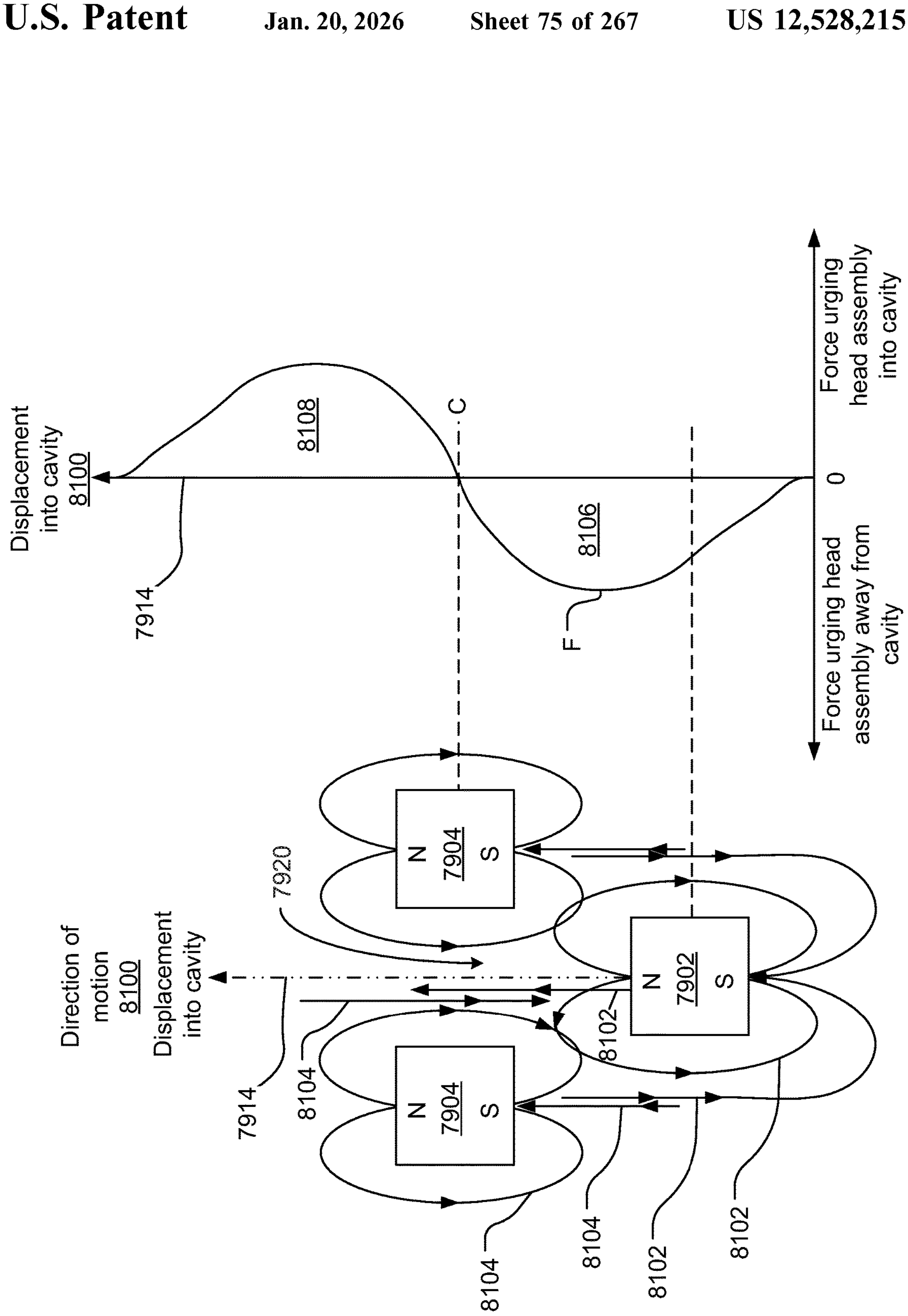
Figure 81B:
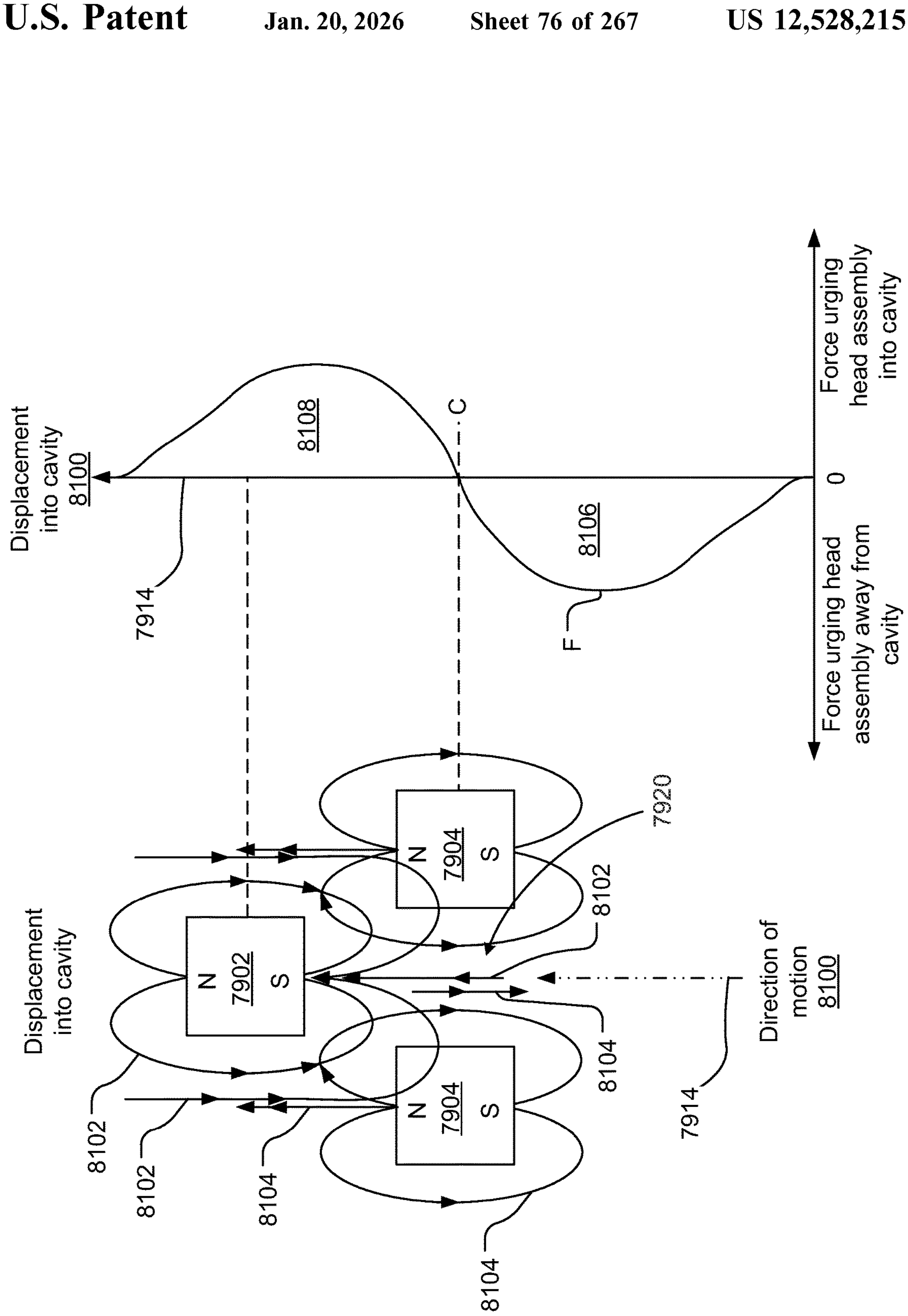
Figure 82:
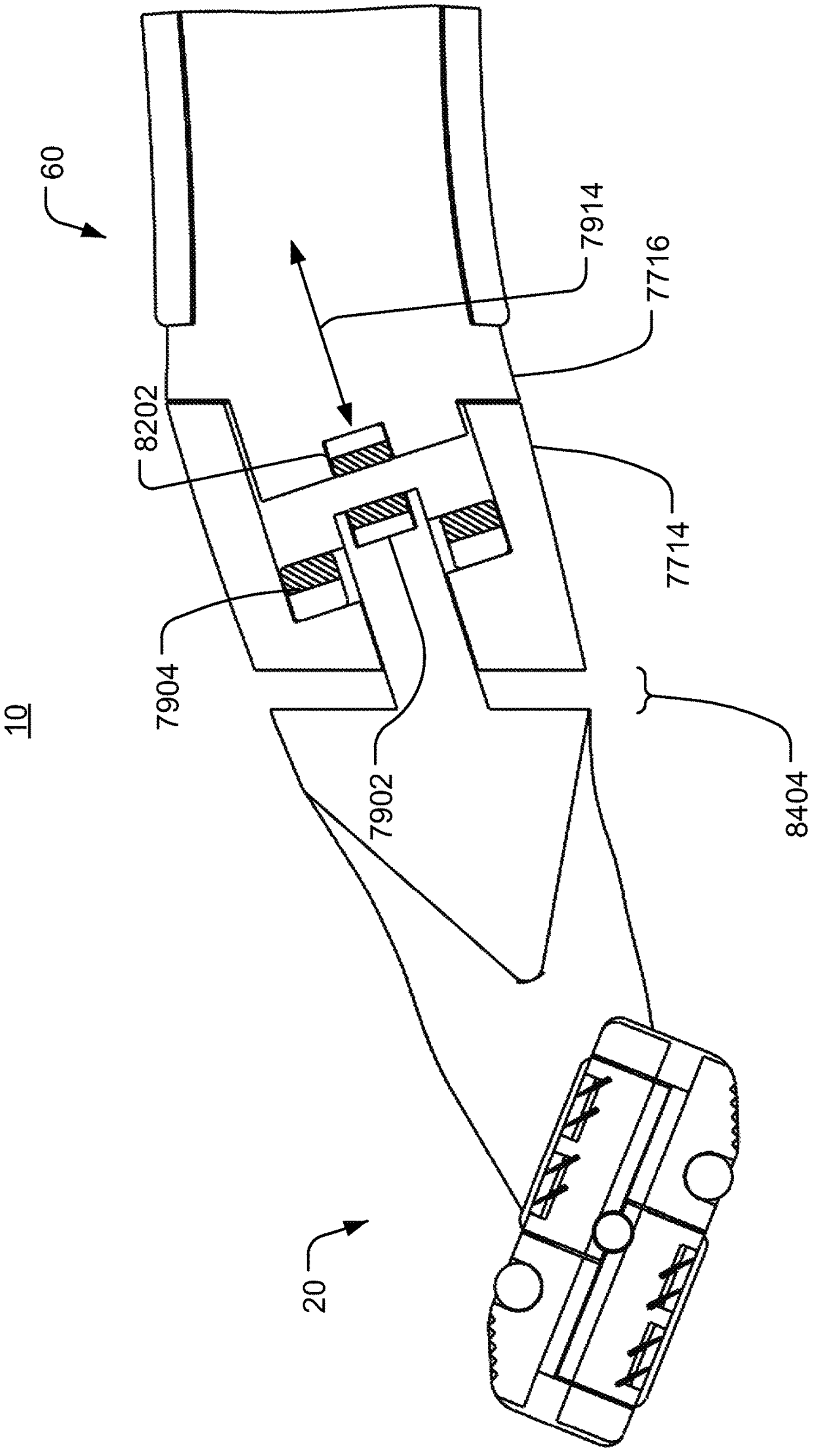
Figure 83:
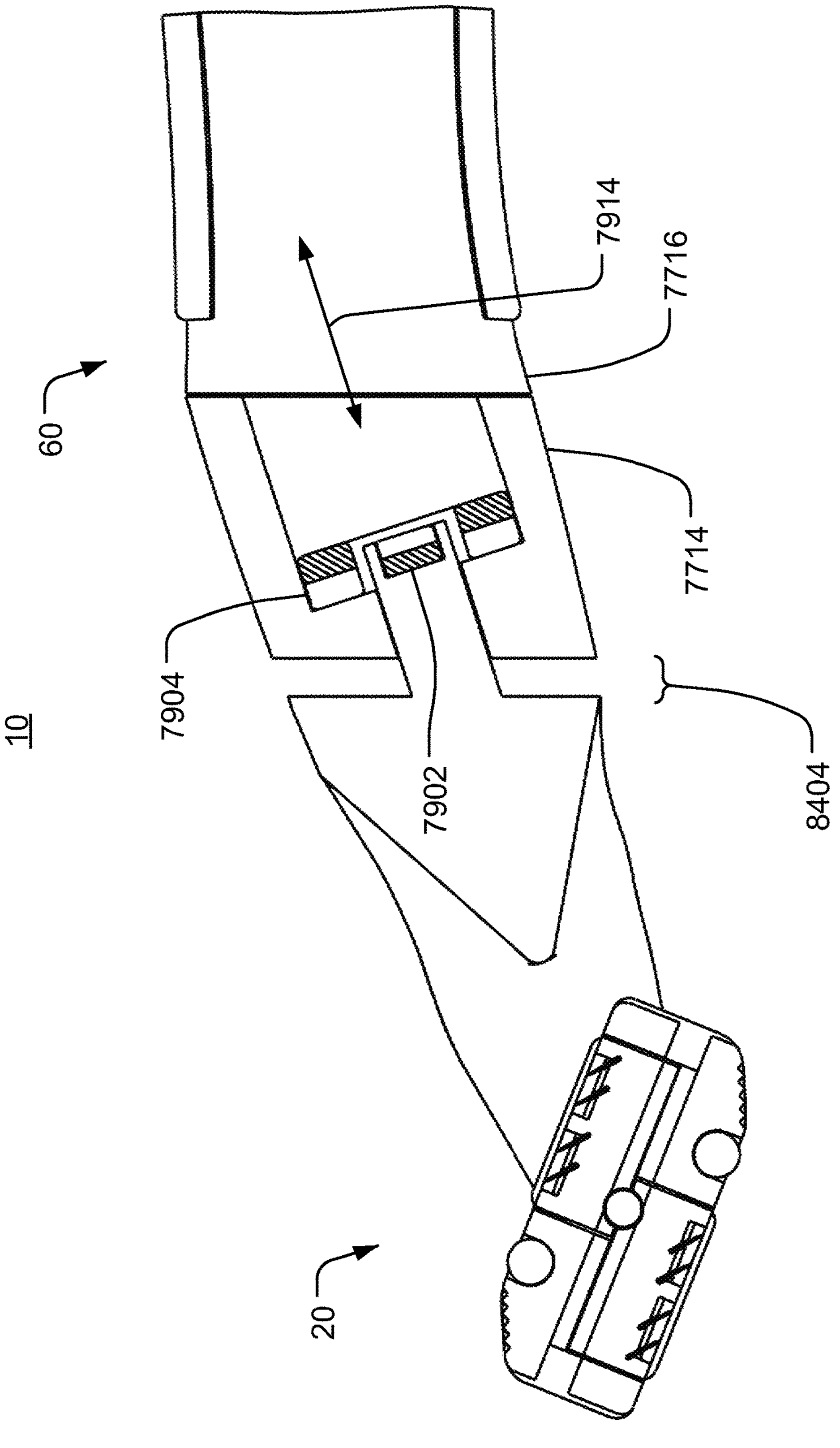
Figure 84:
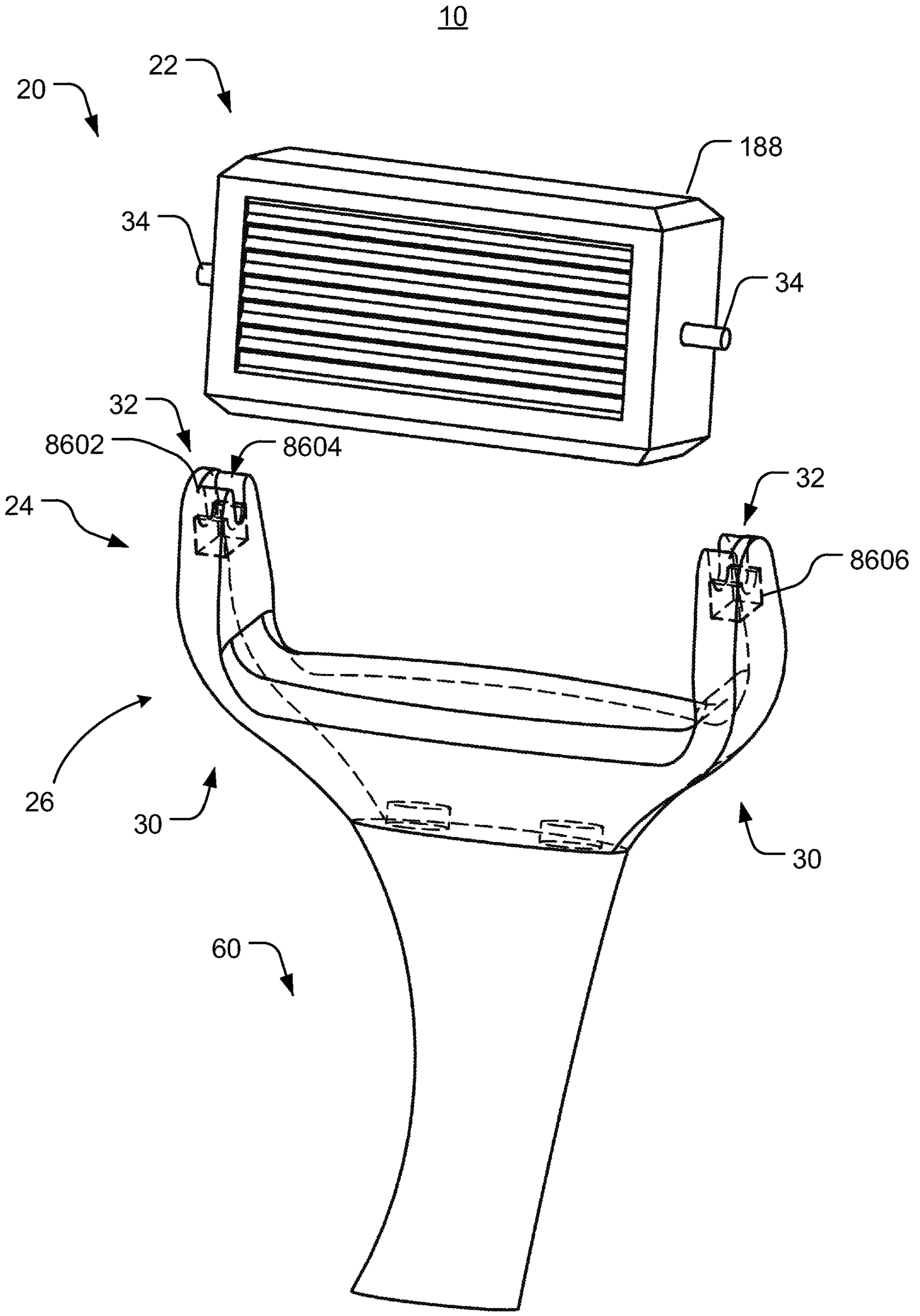
Figure 85:
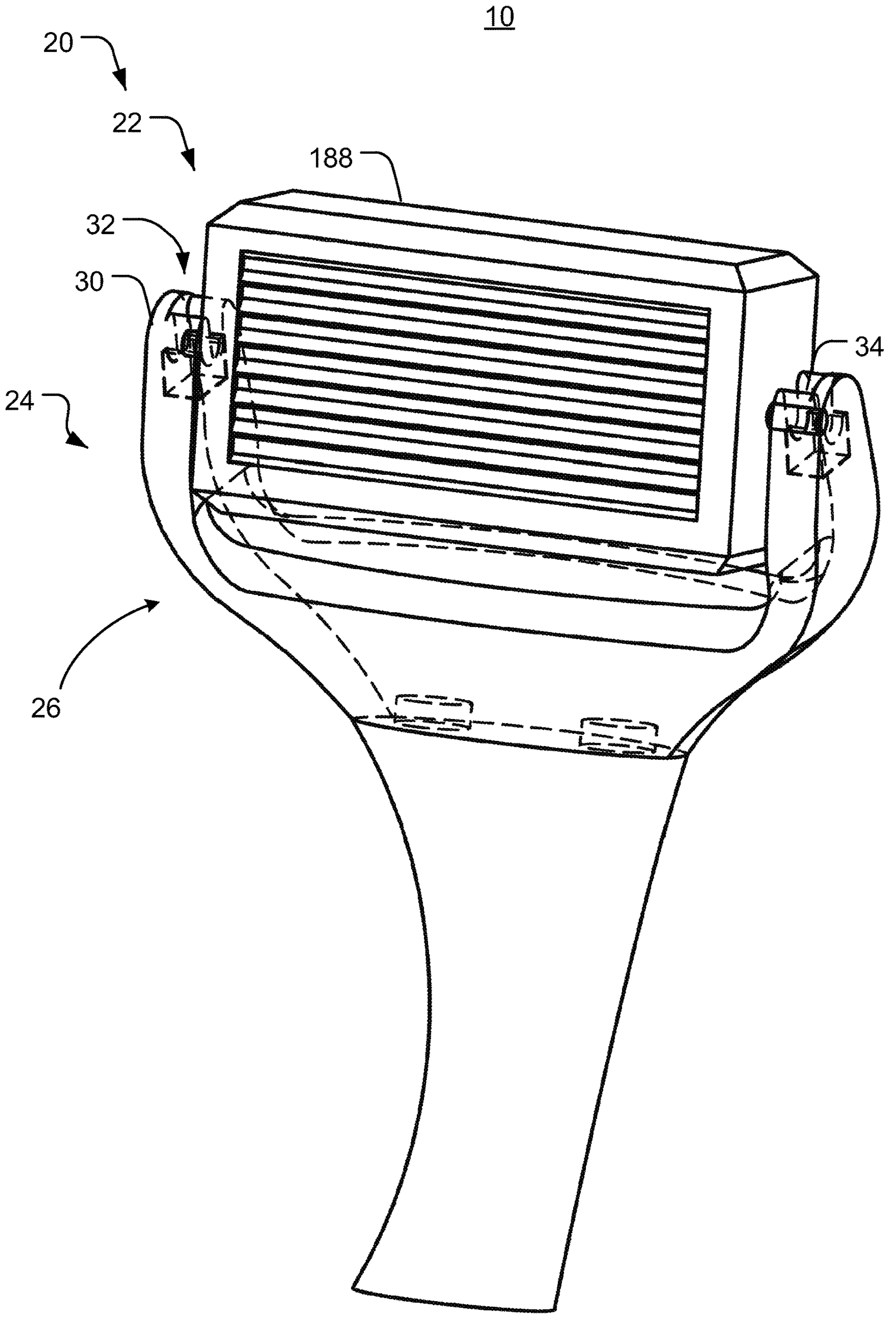
Figure 86:
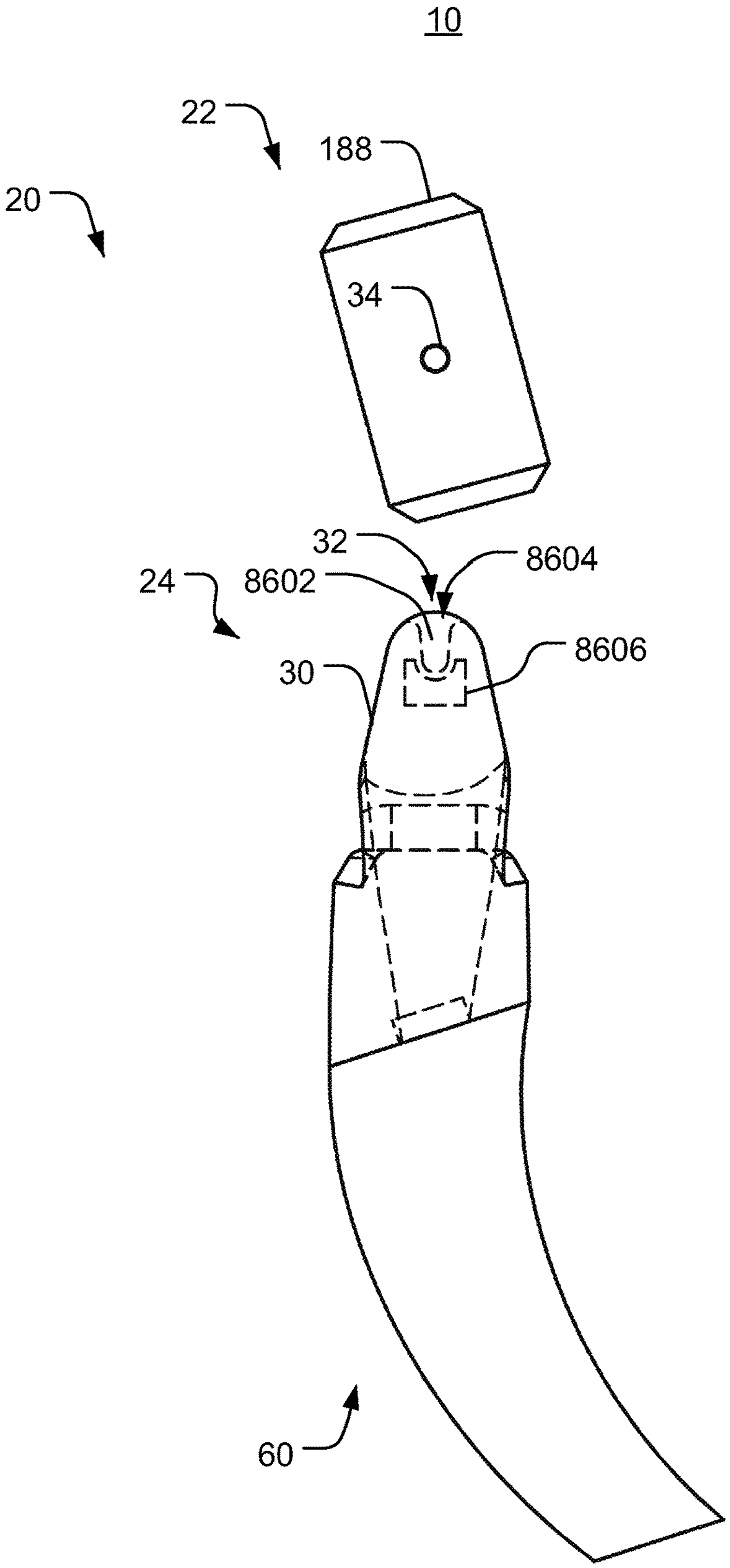
Figure 87:
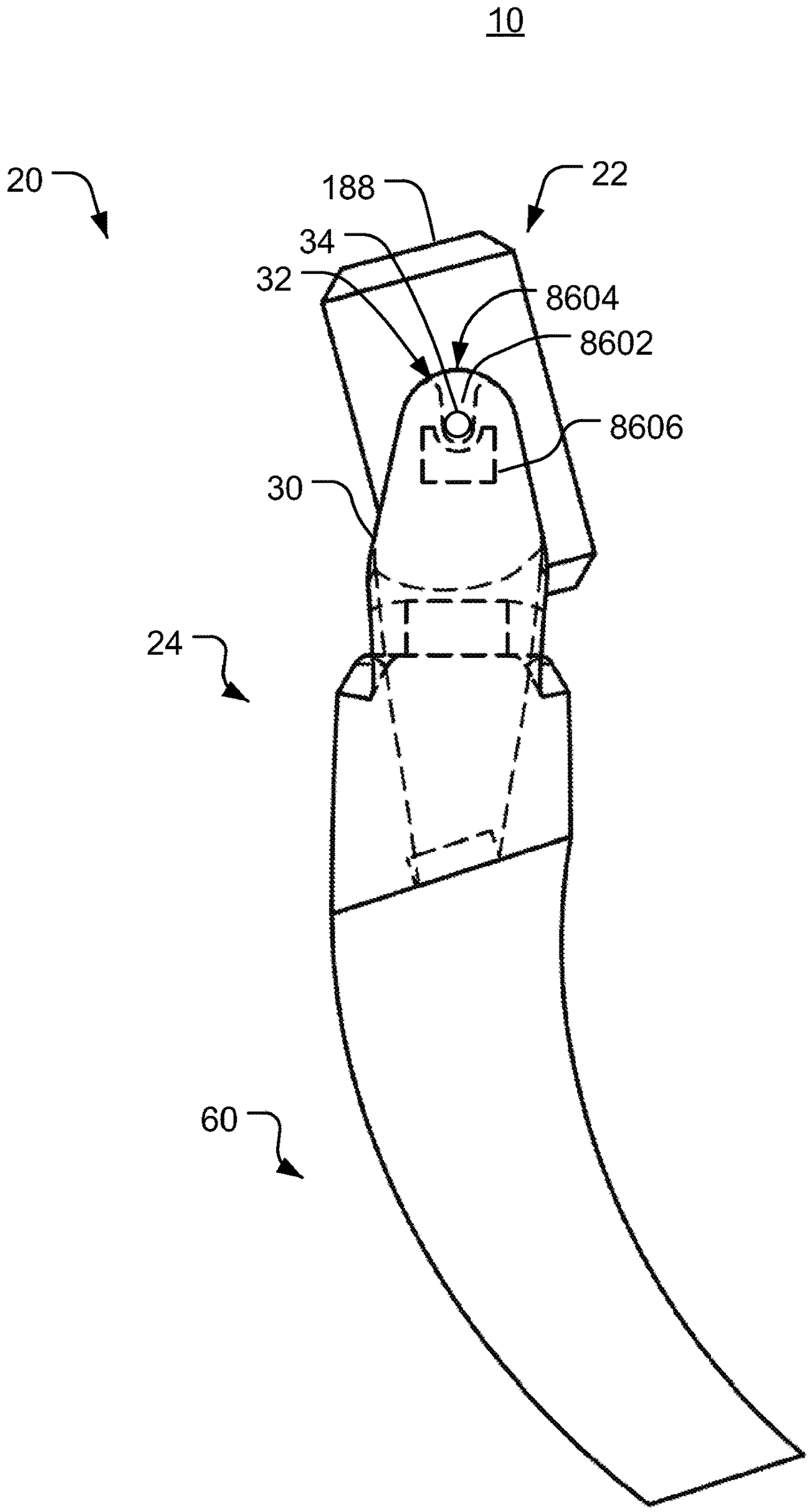
Figure 88:
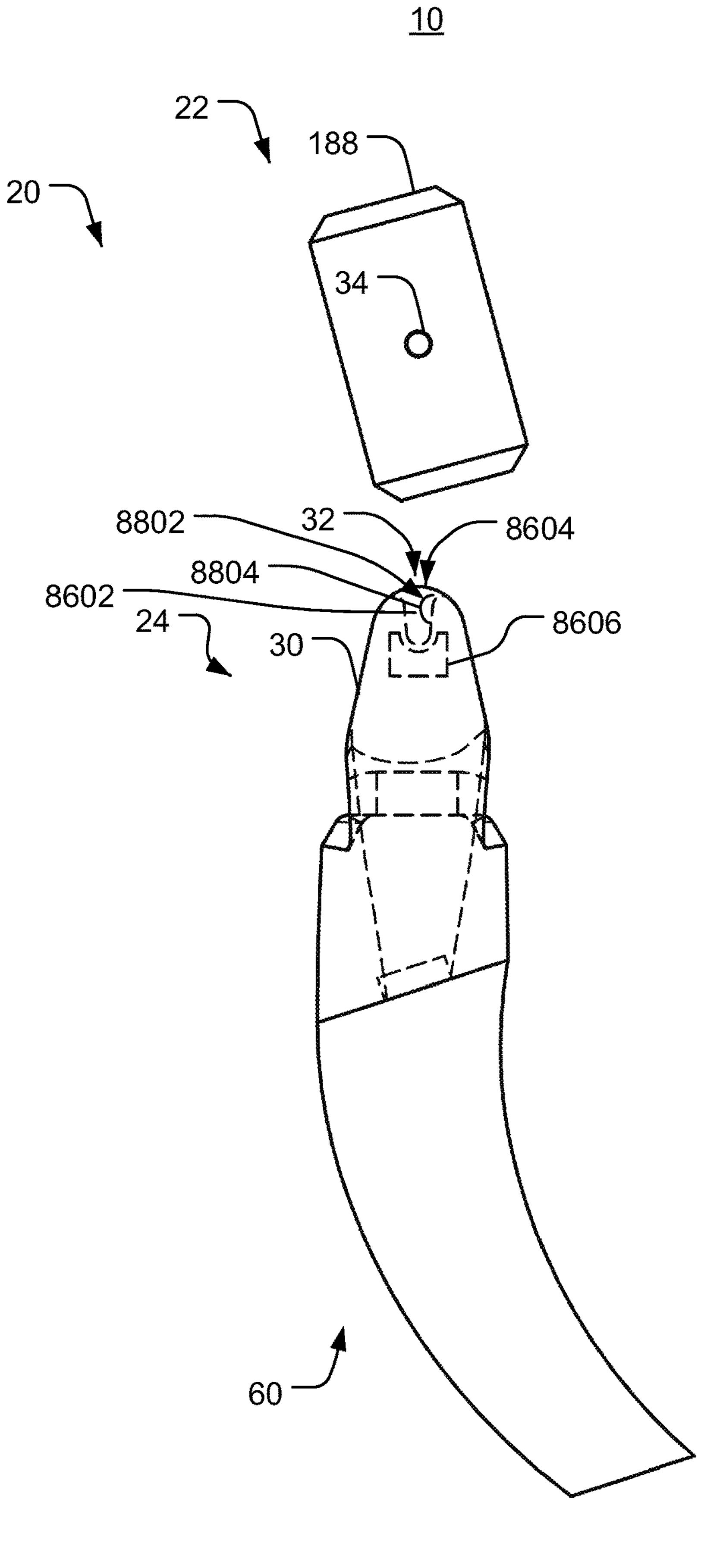
Figure 89:
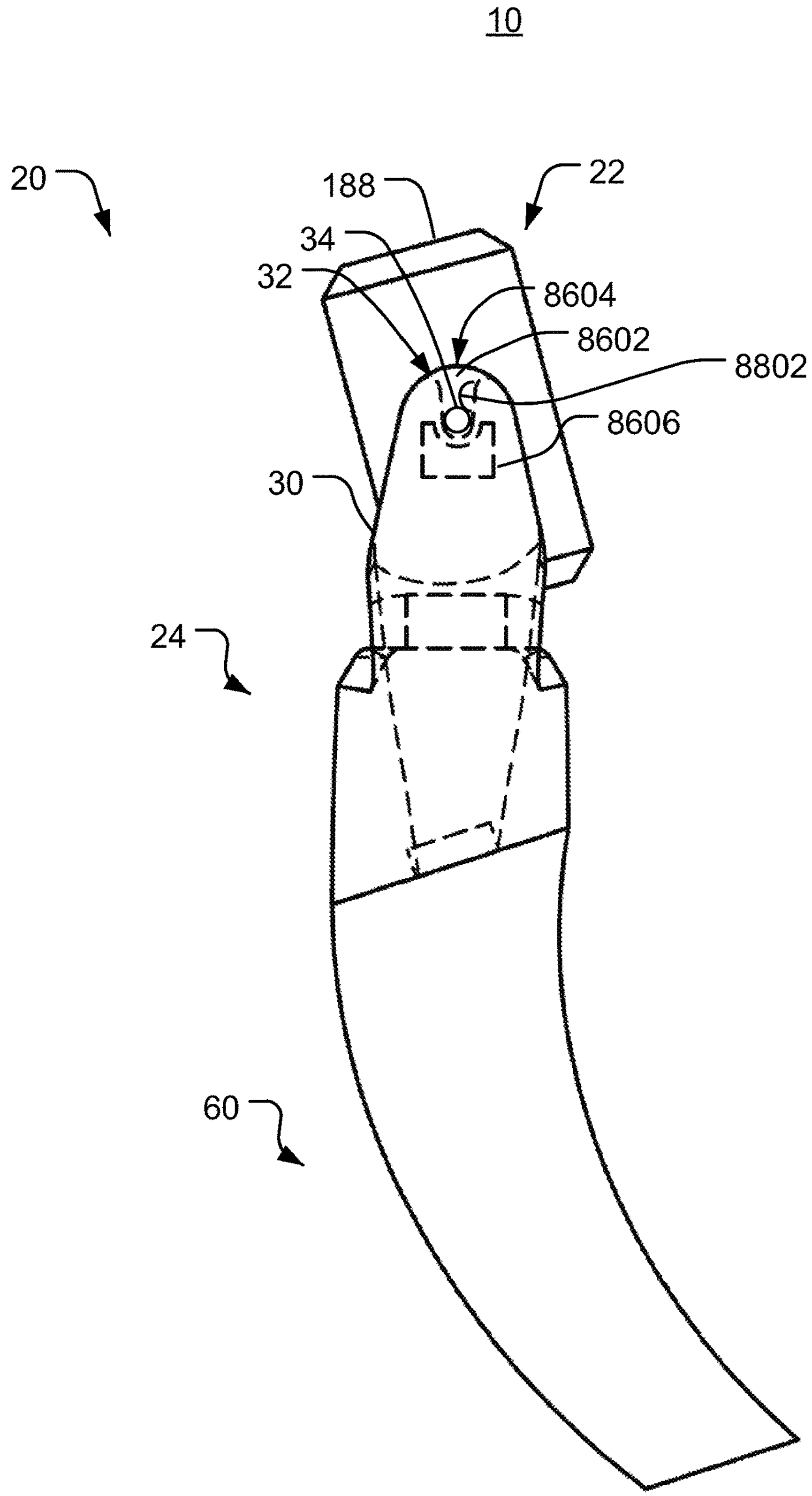
Figure 92:
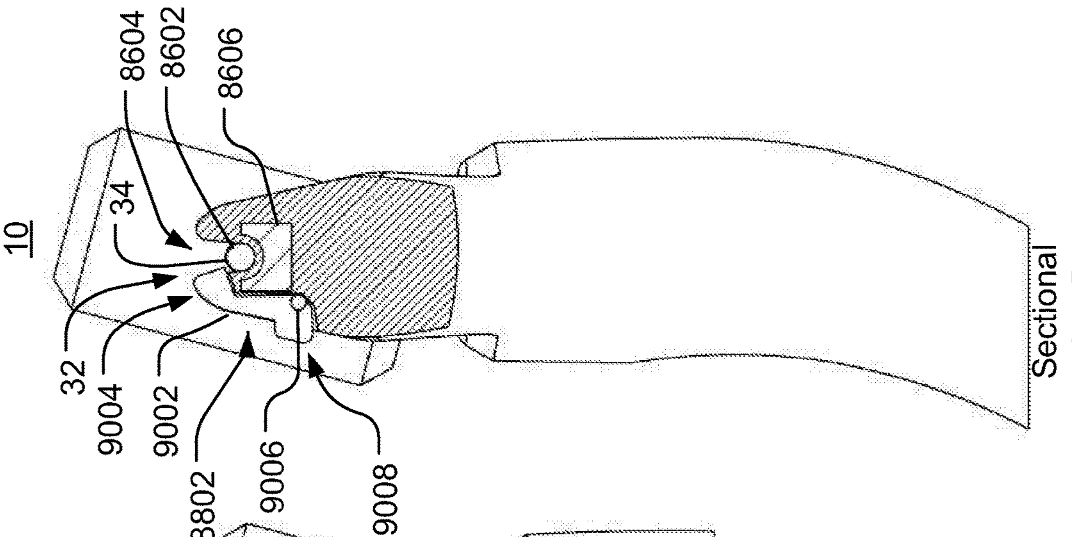
Figure 91:
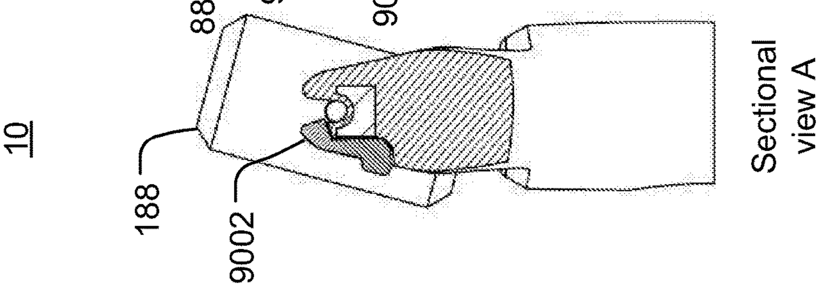
Figure 90:
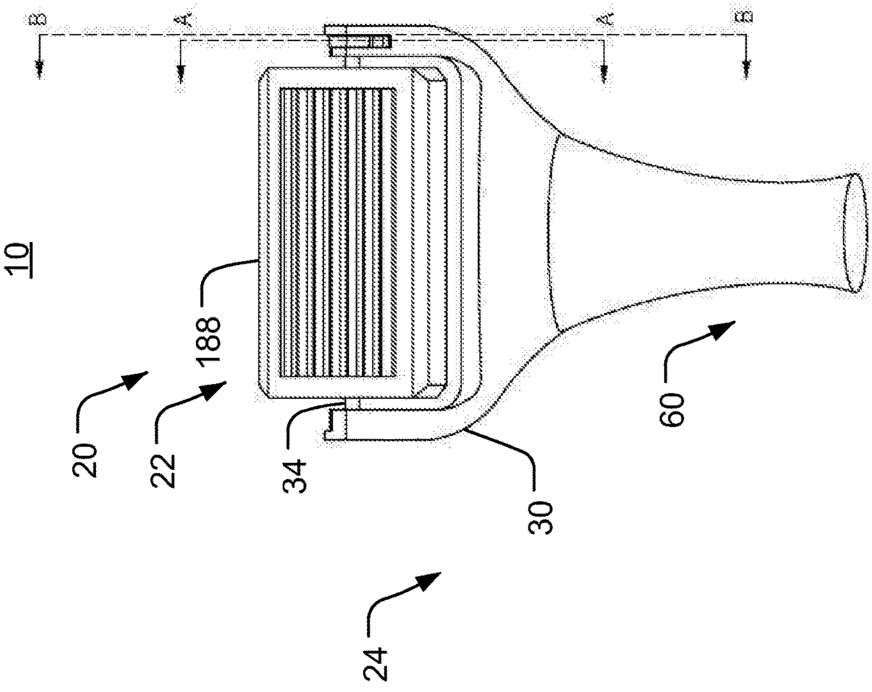
Figure 93:
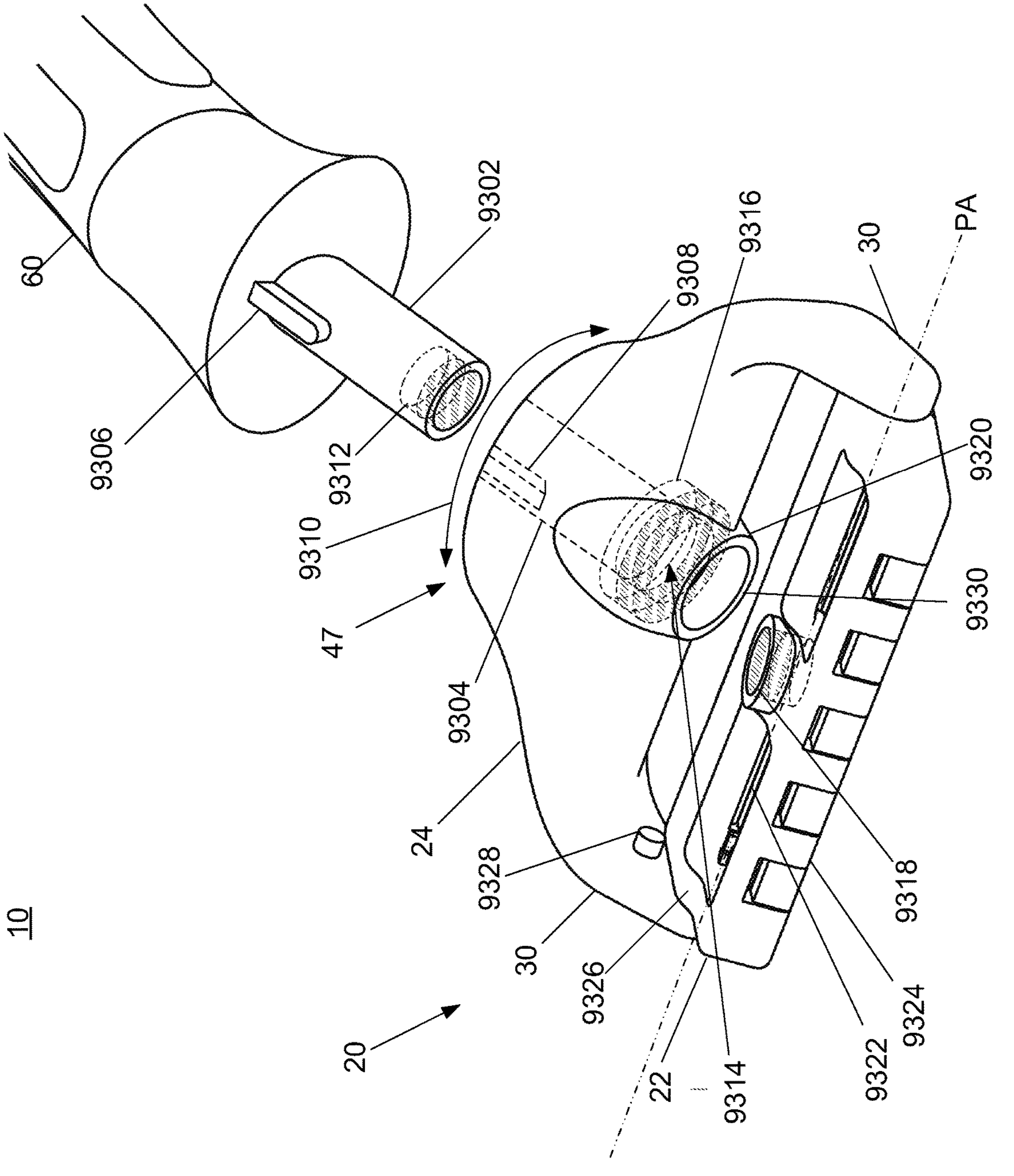
Figure 94:
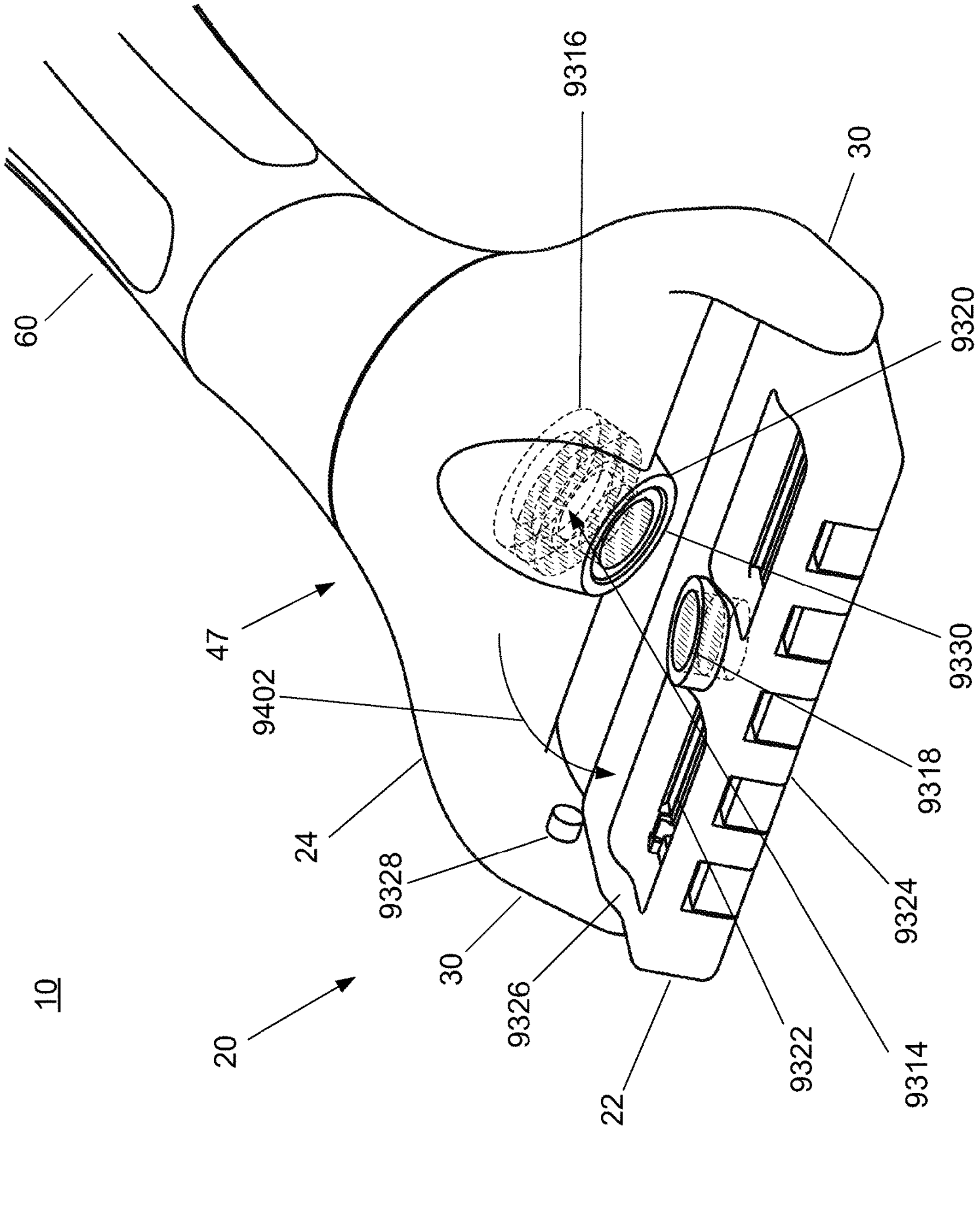
Figure 95:
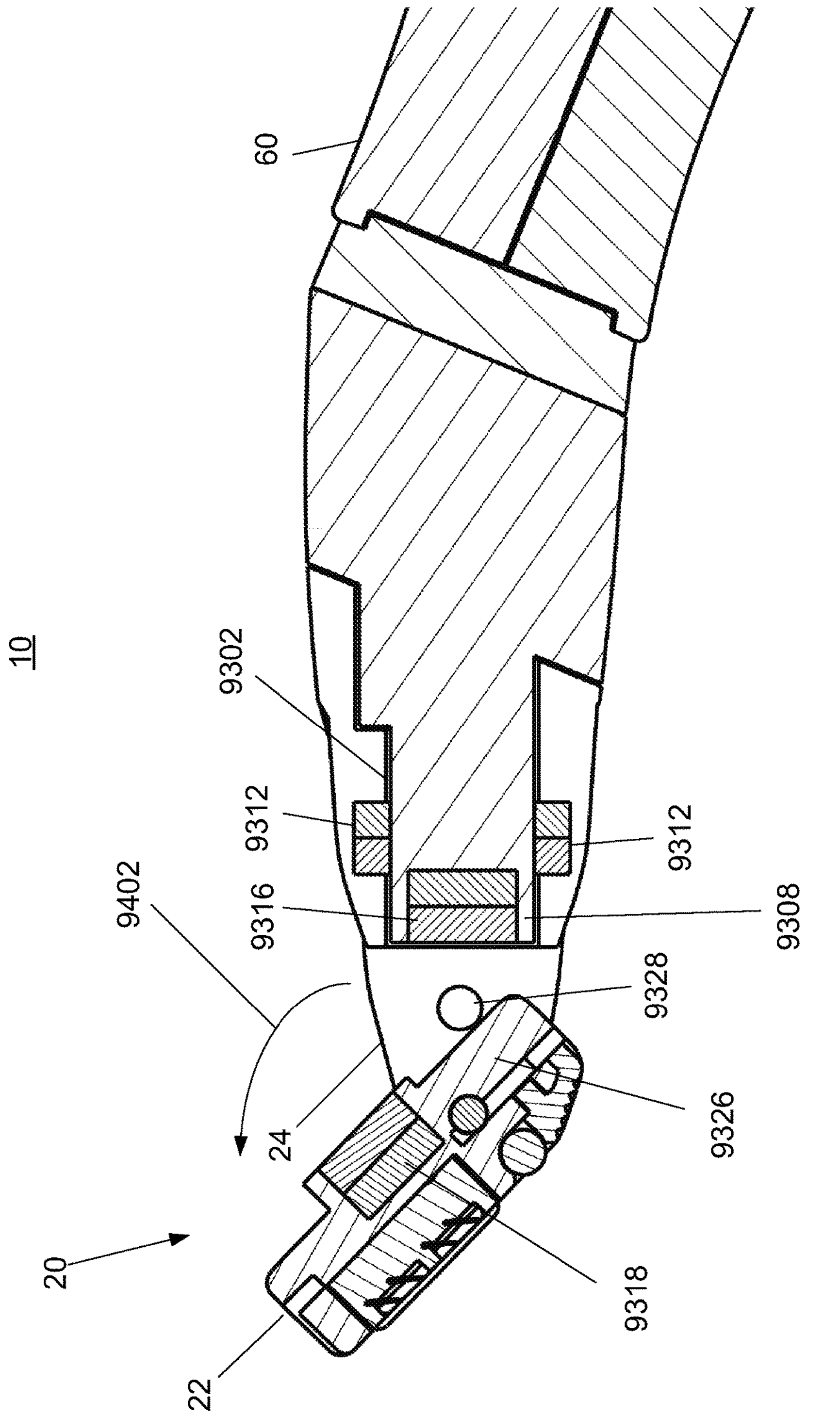
Figure 96:
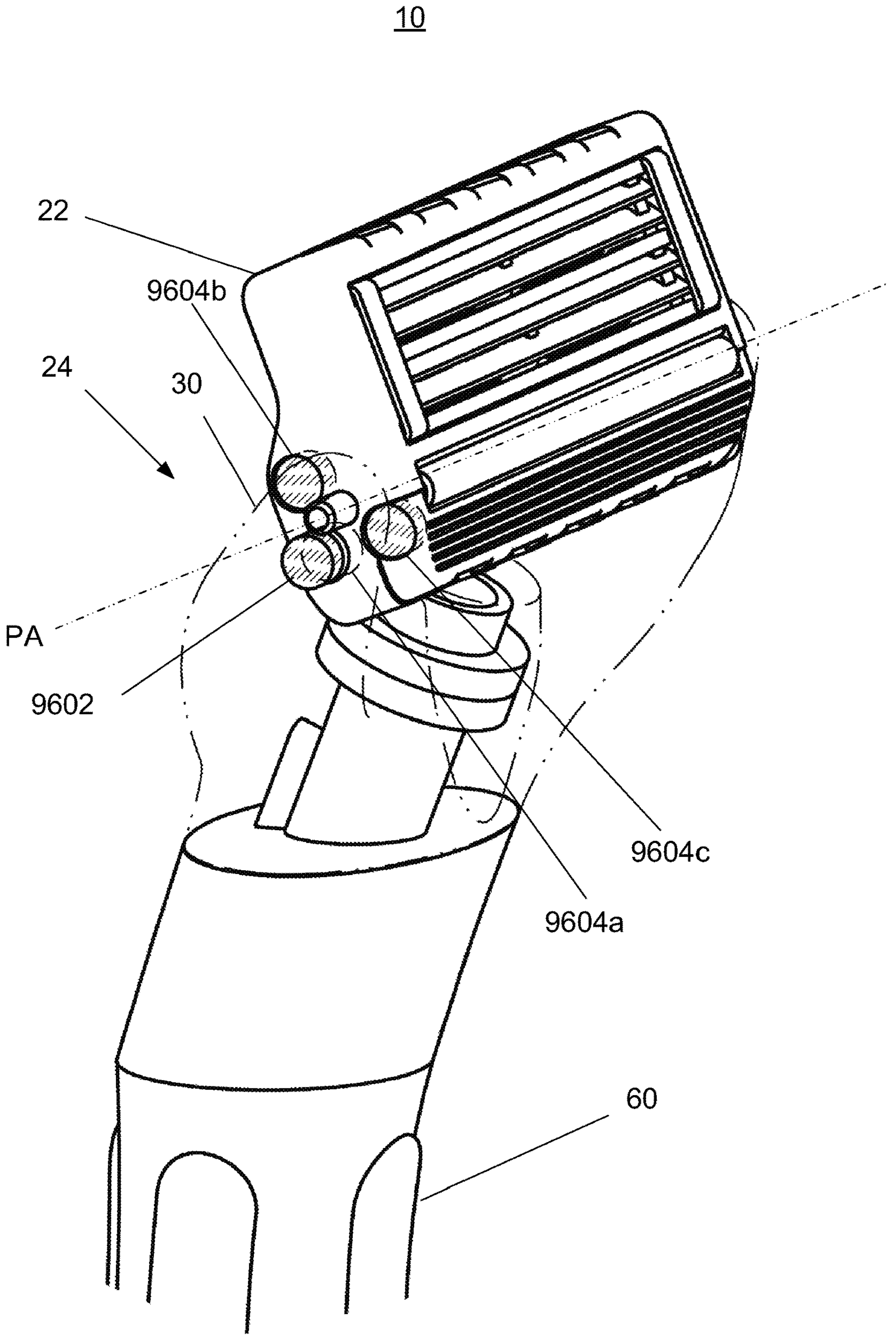
Figure 97:
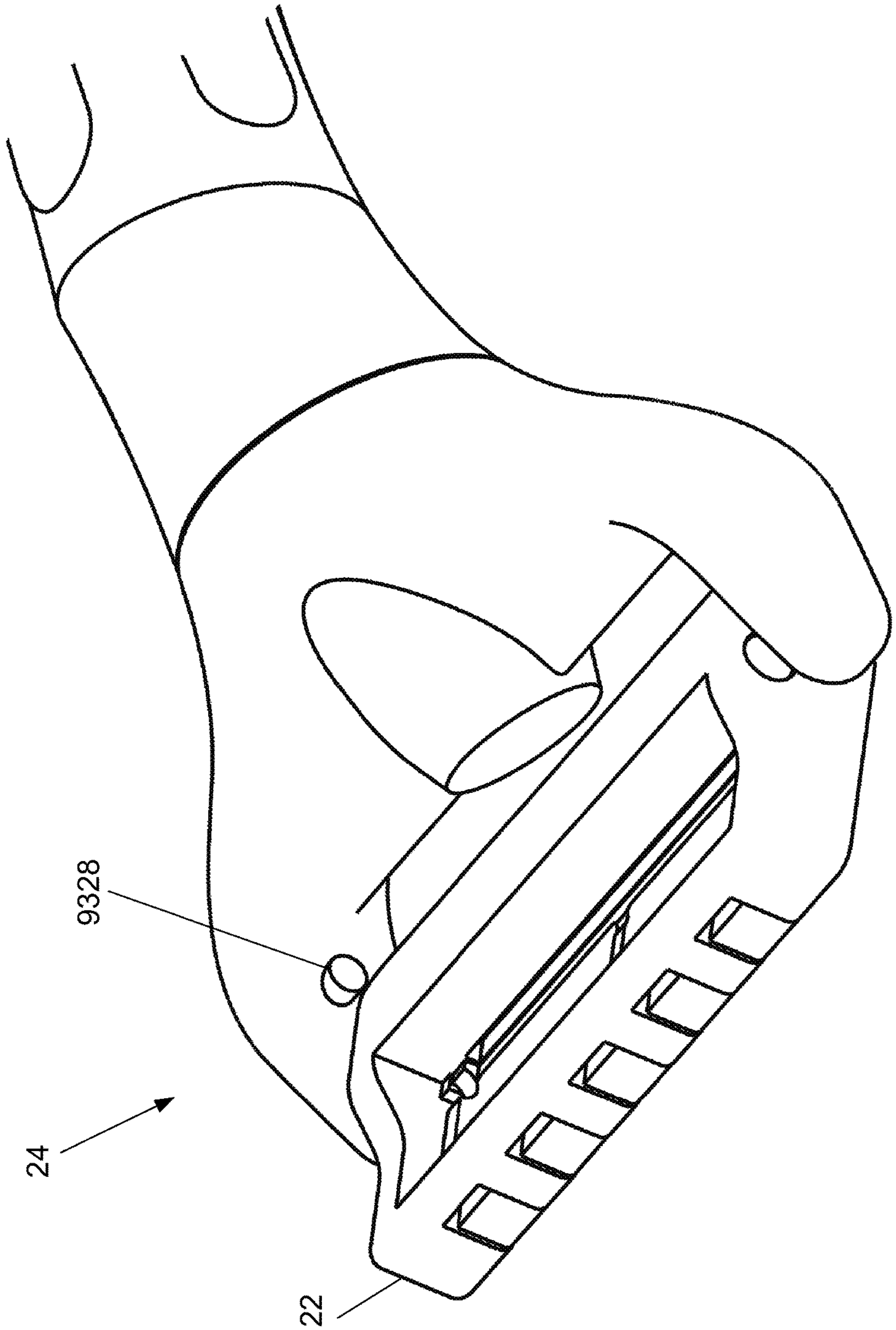
Figure 98:
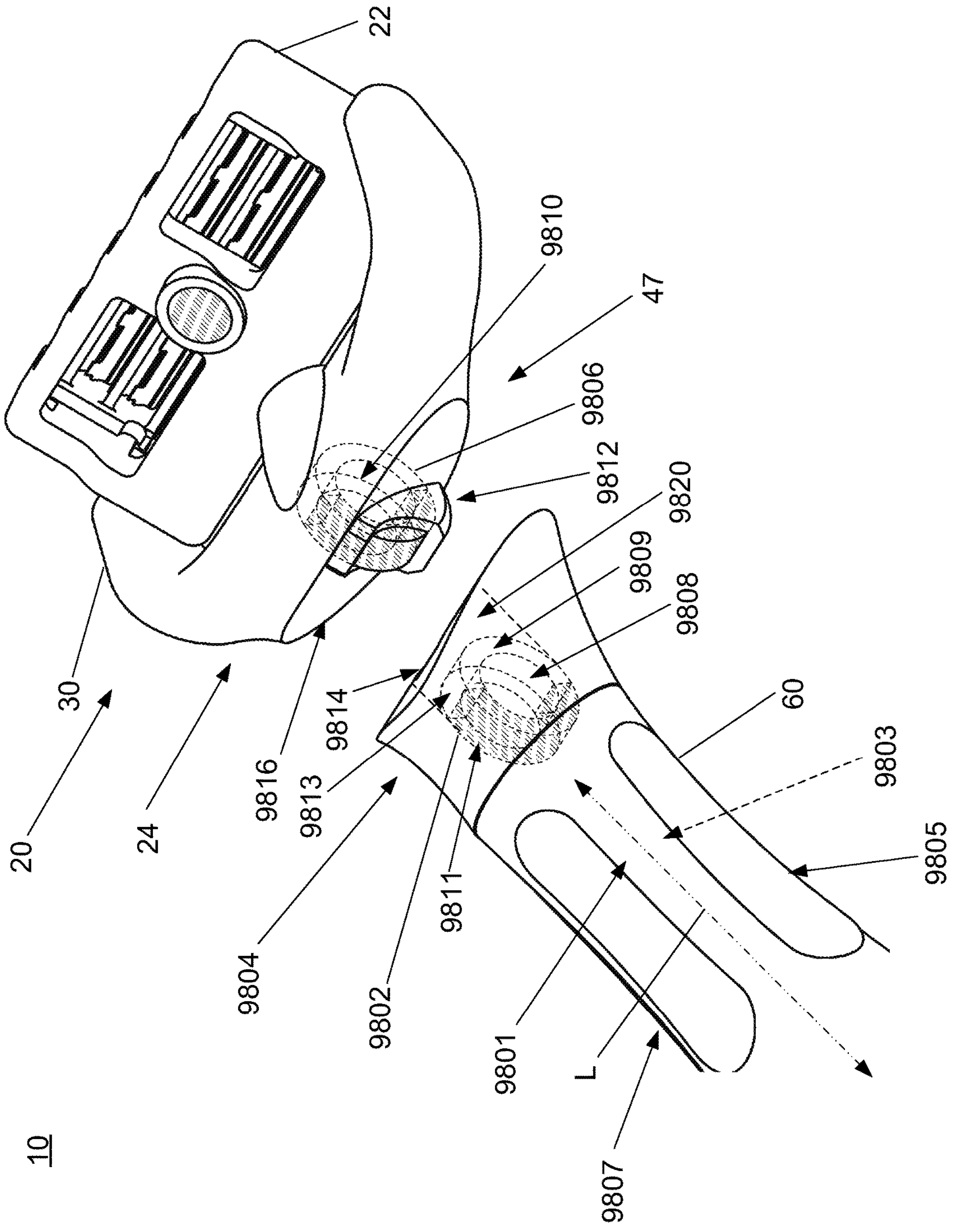
Figure 99:
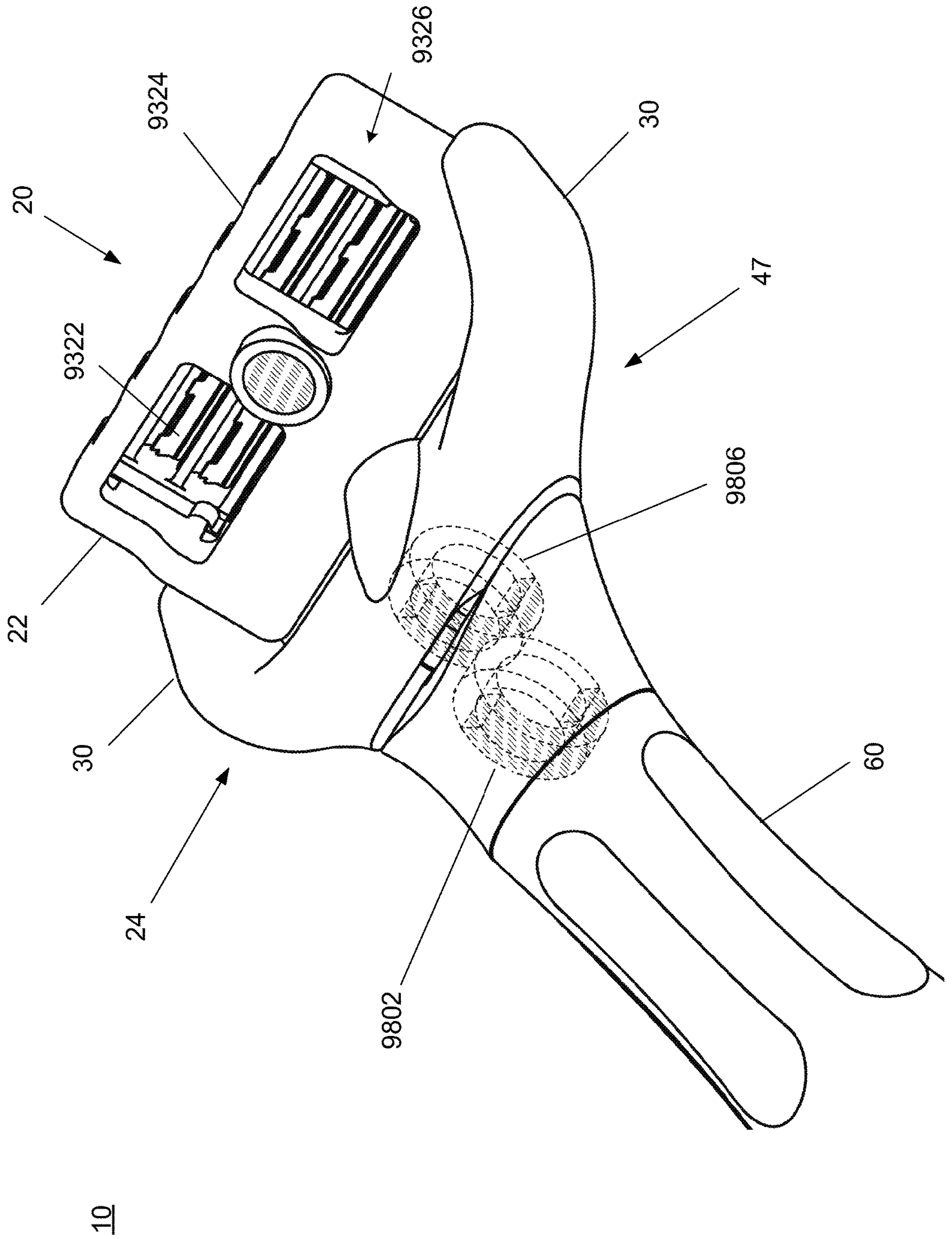
Figure 100:
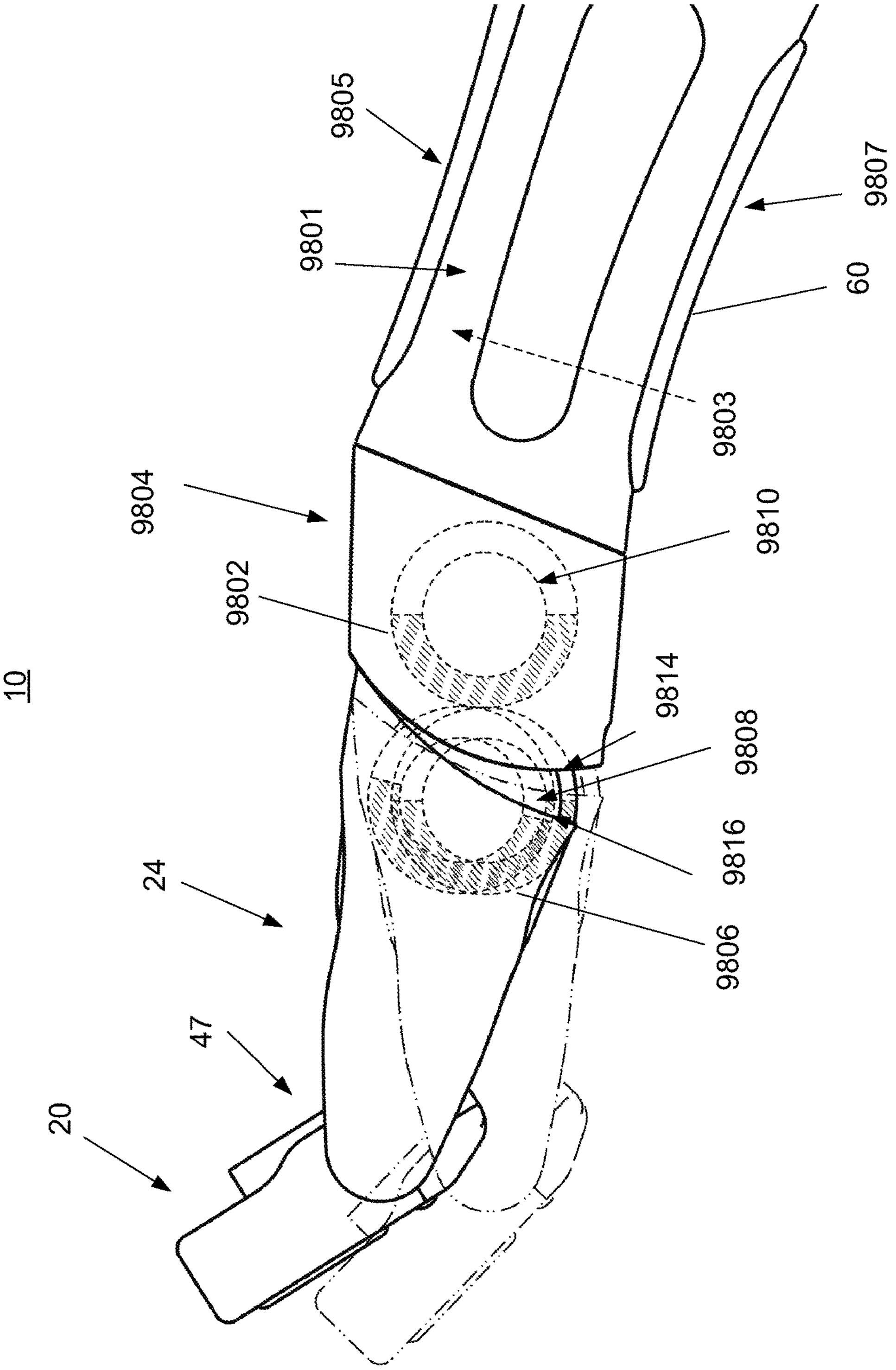
Figure 101:
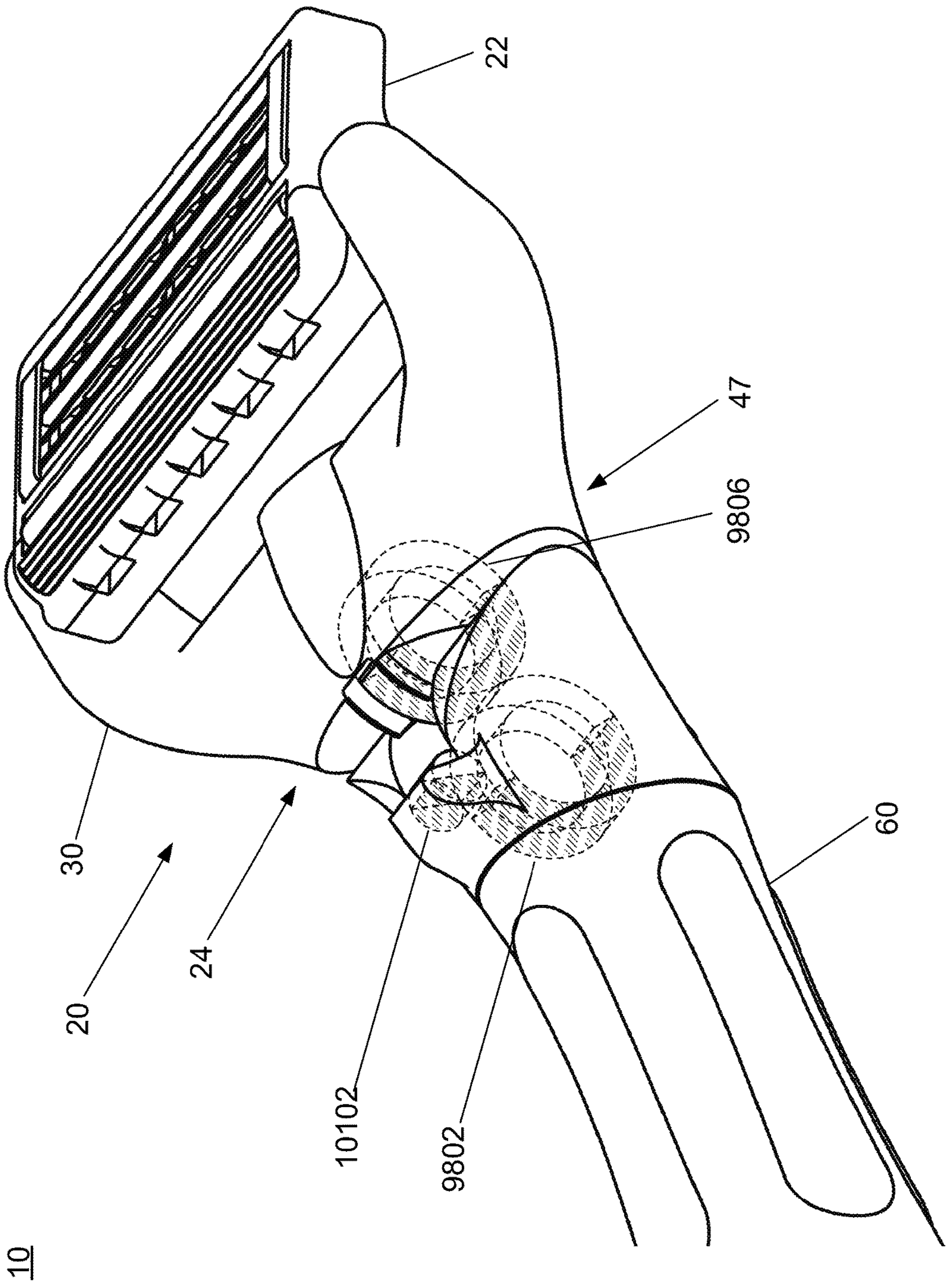
Figure 102:
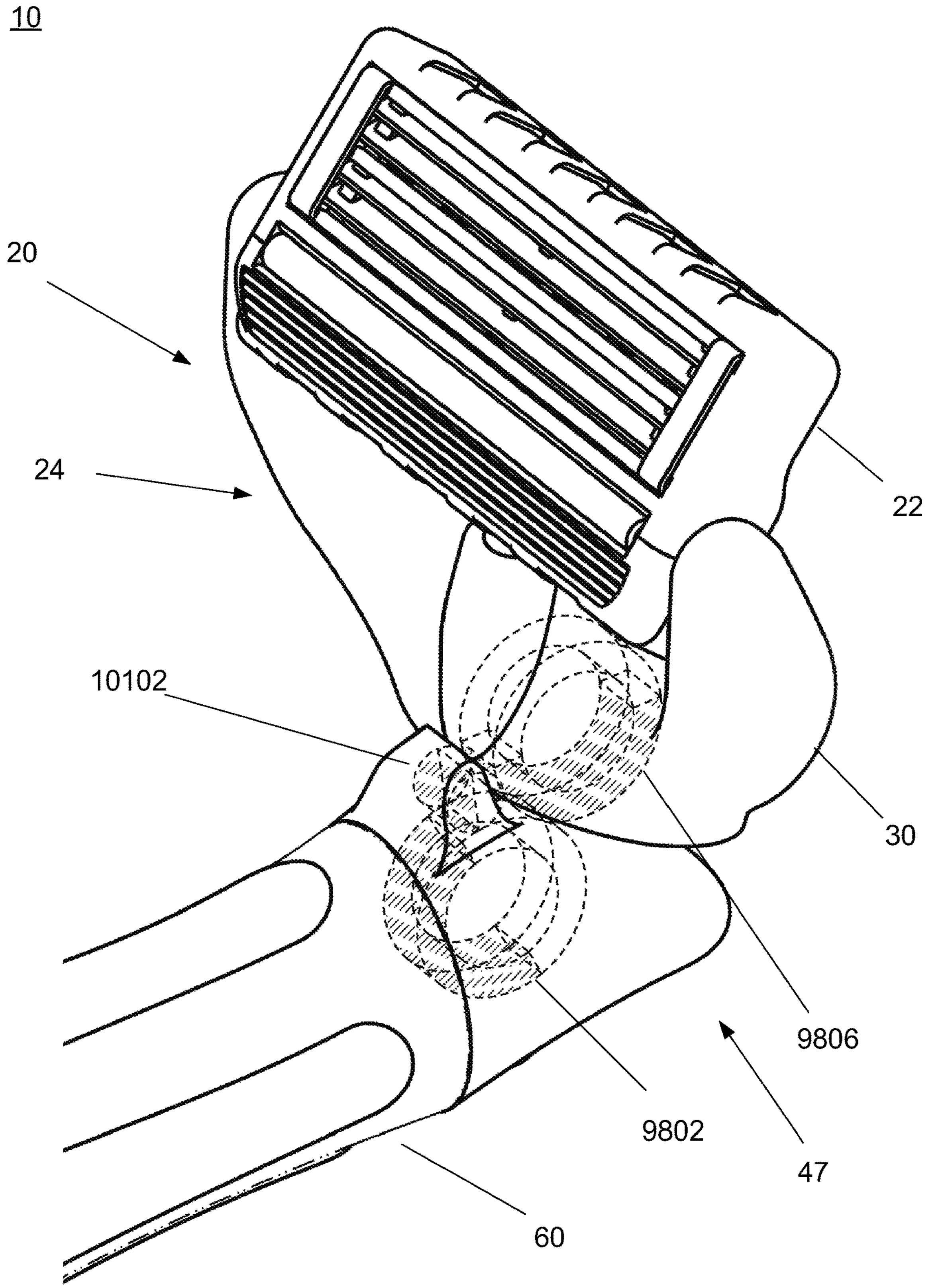
Figure 103:
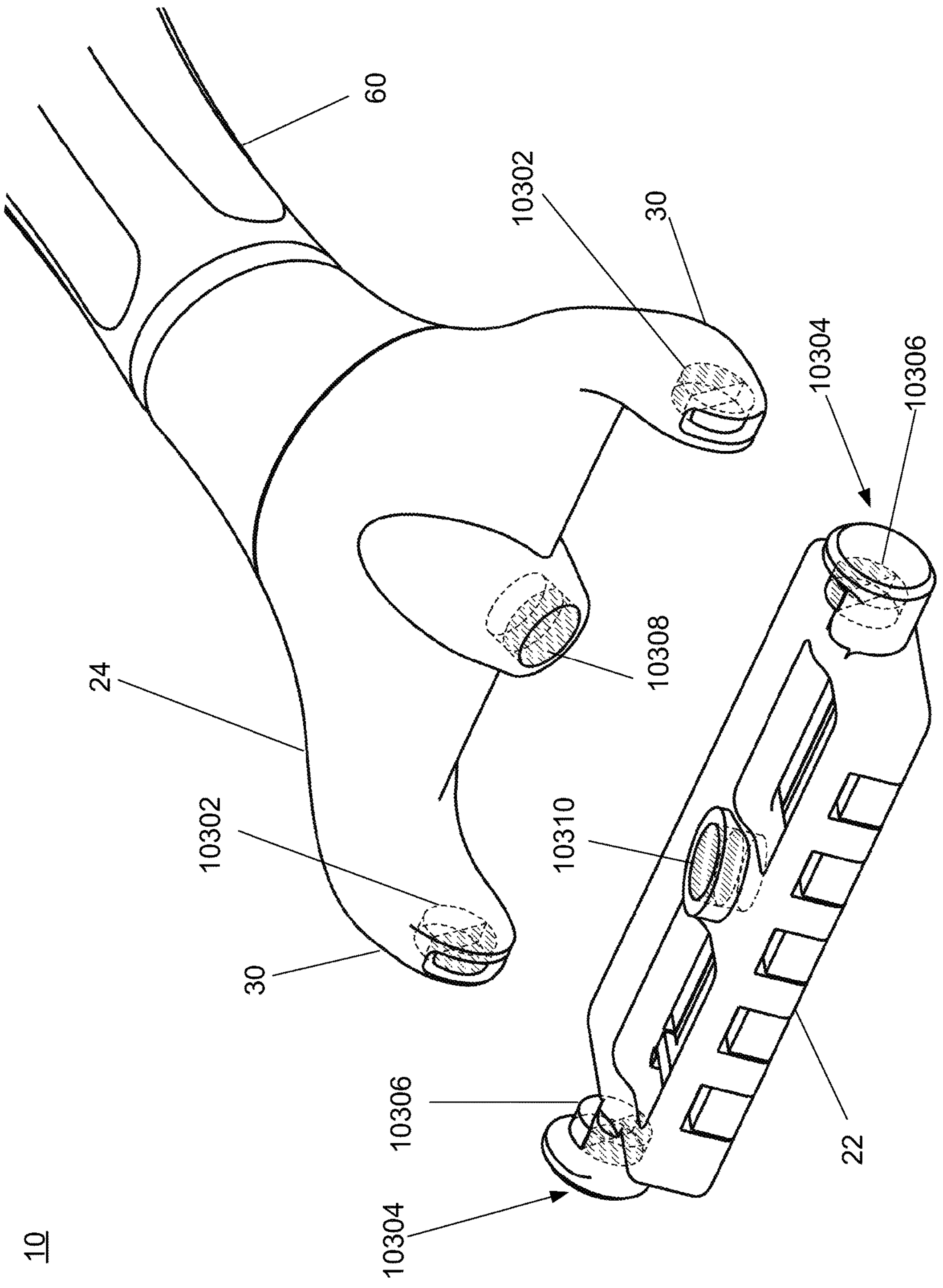
Figure 104:
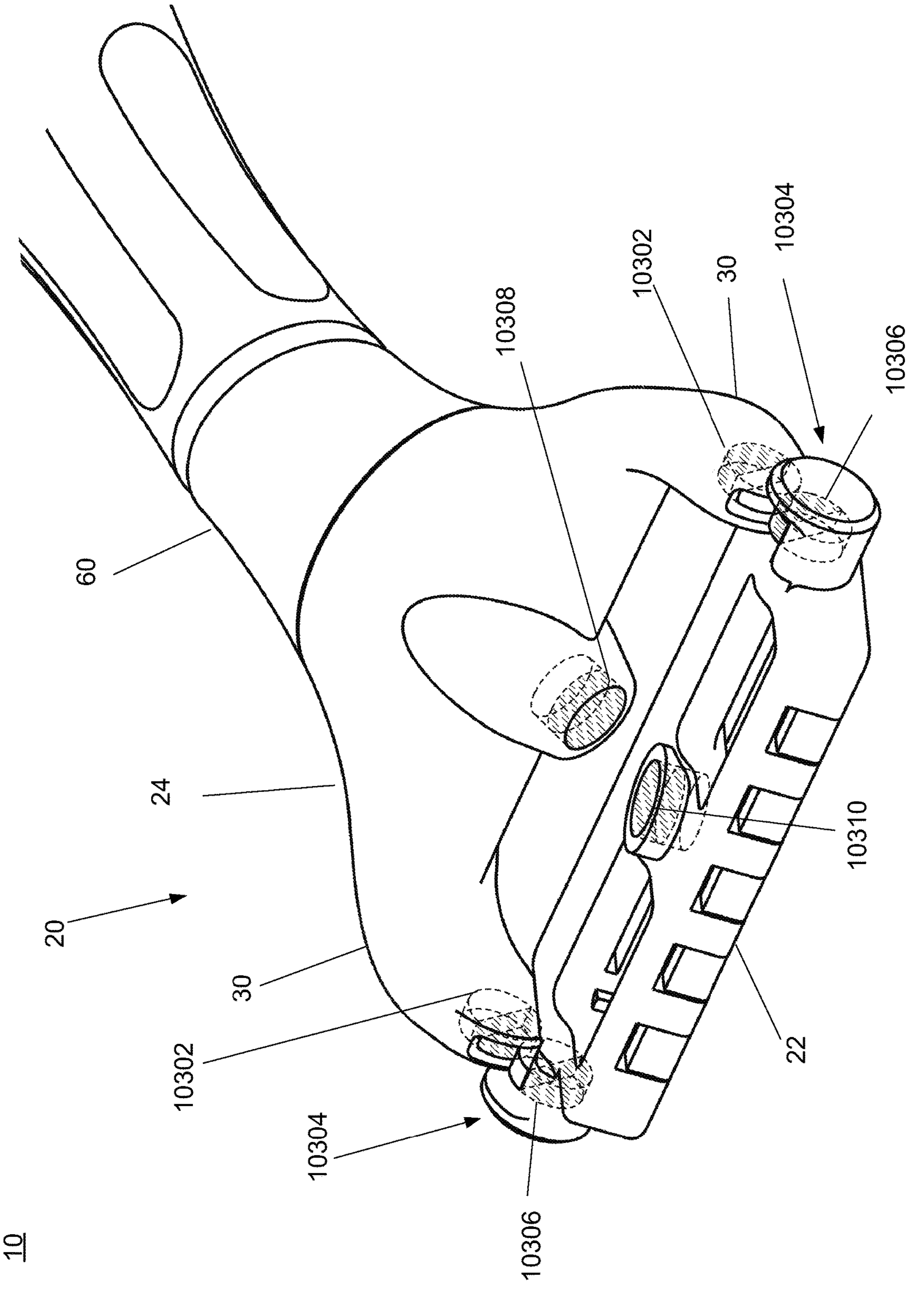
Figure 105:
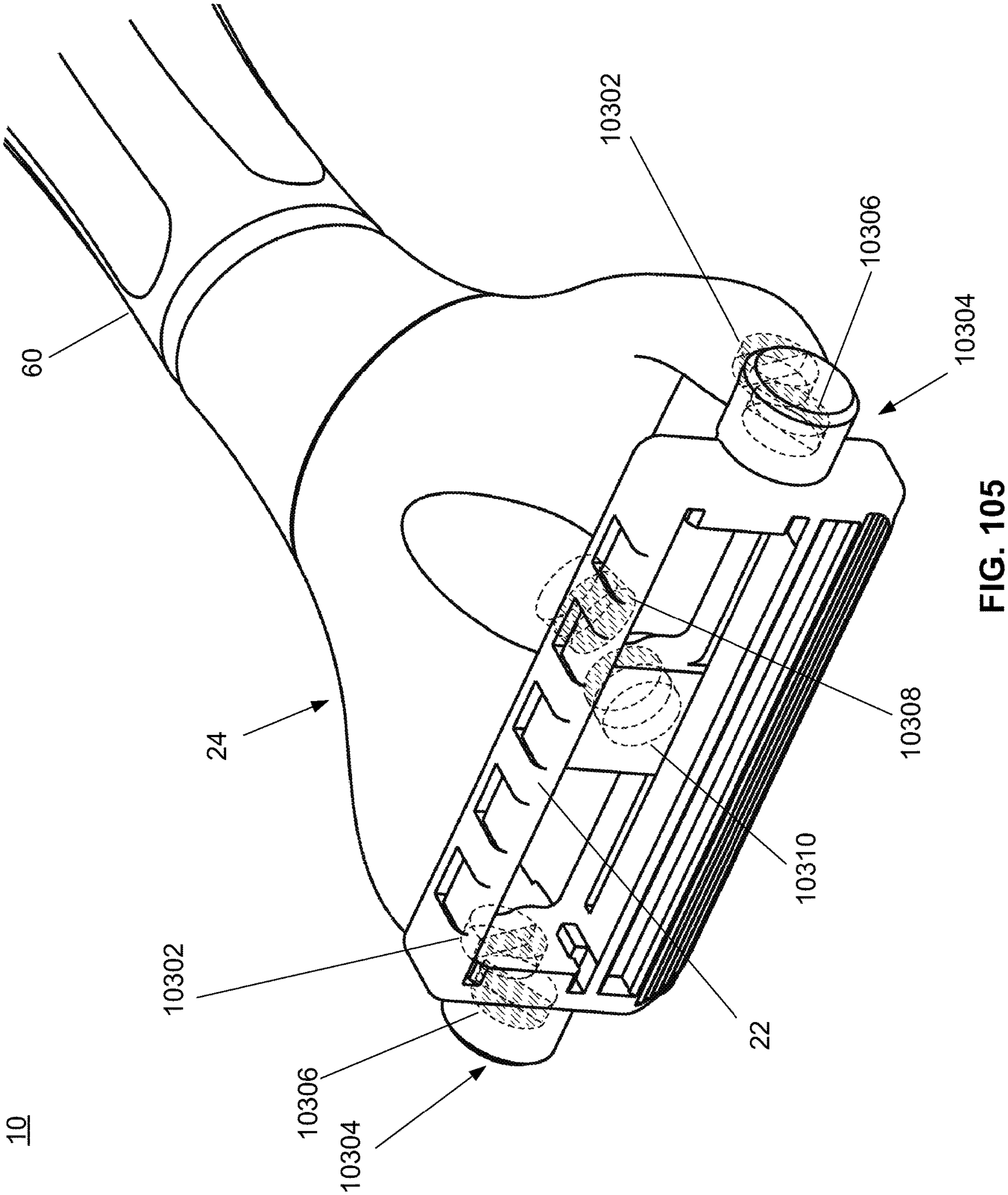
Figure 106:
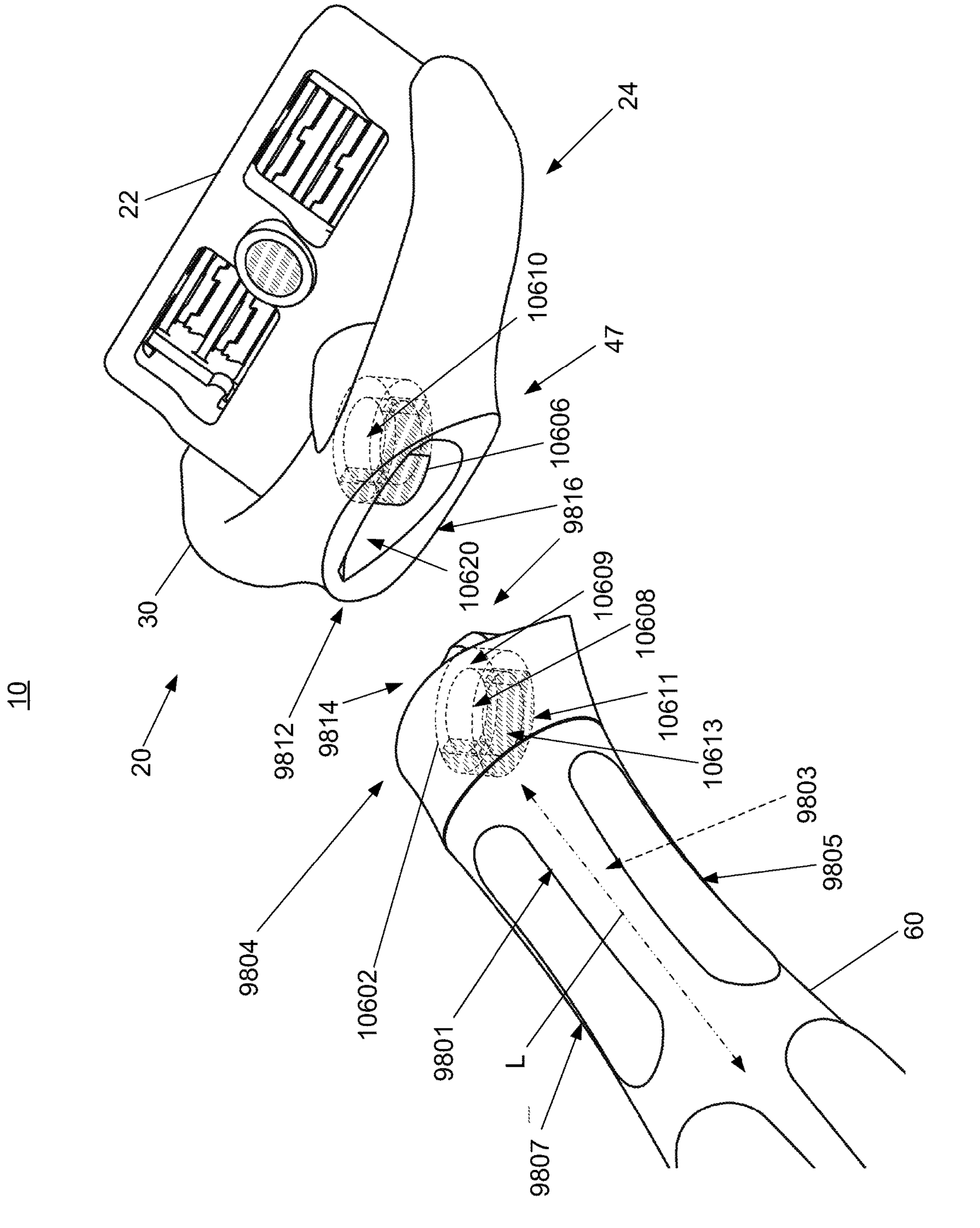
Figure 107:
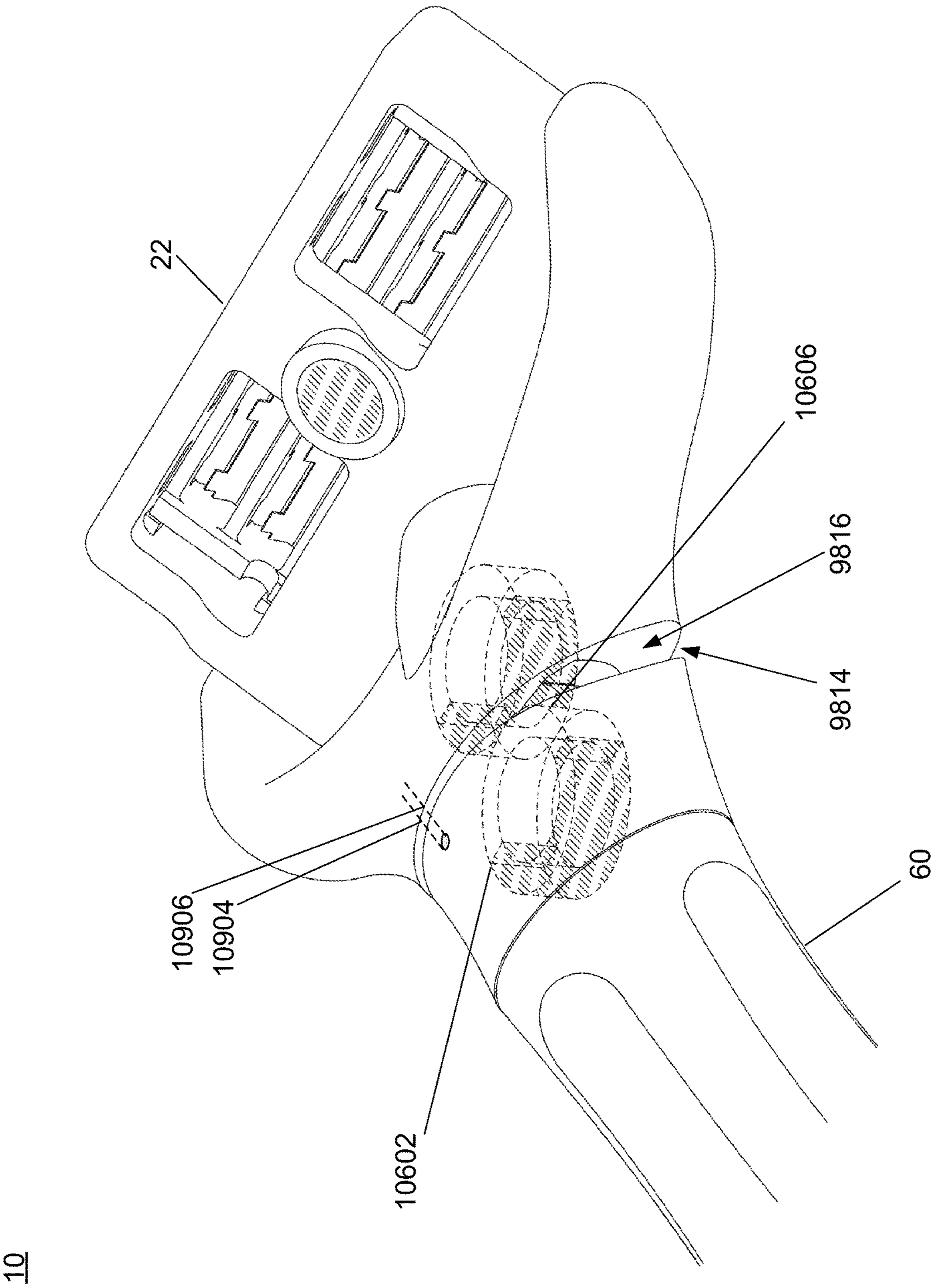
Figure 108:
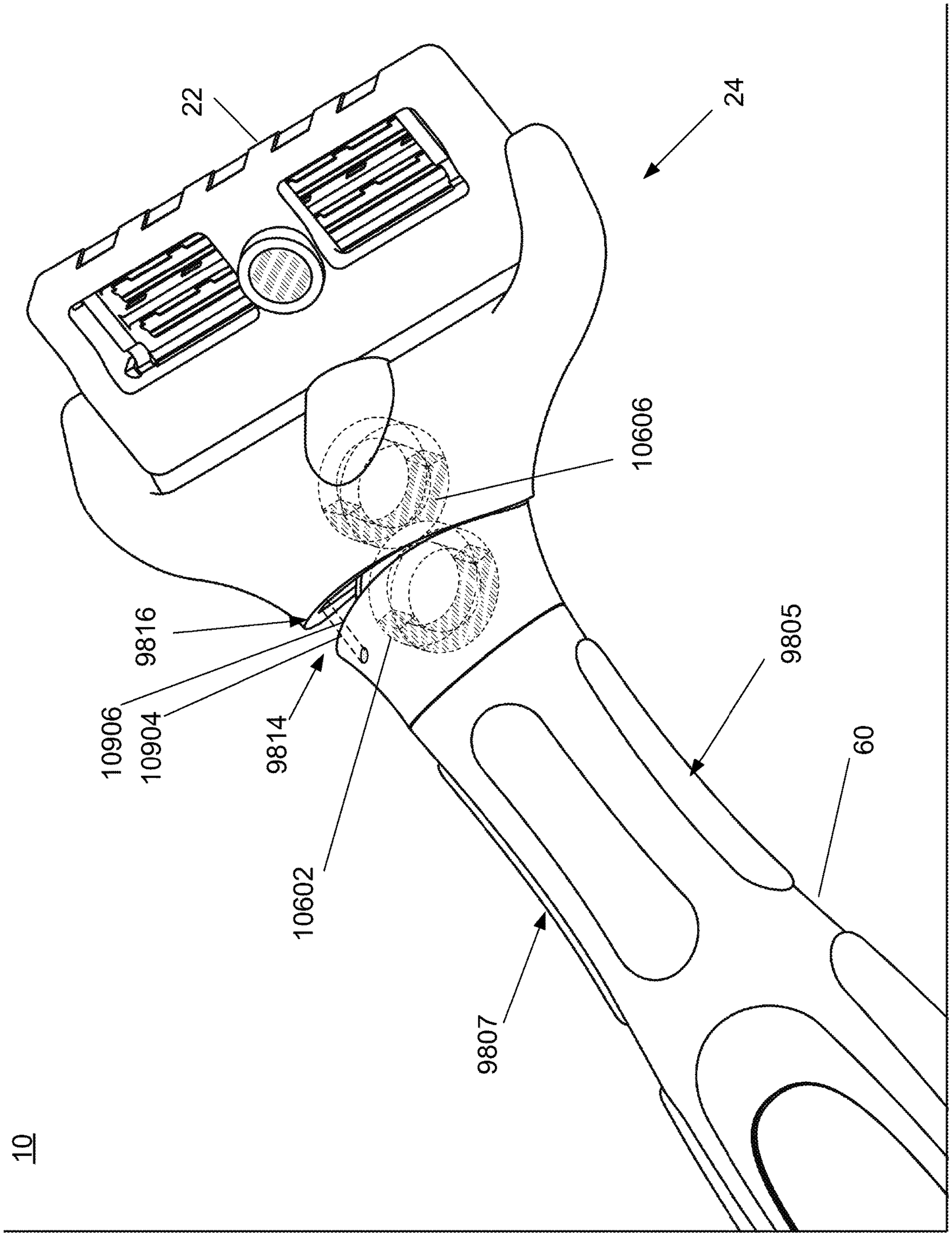
Figure 109:
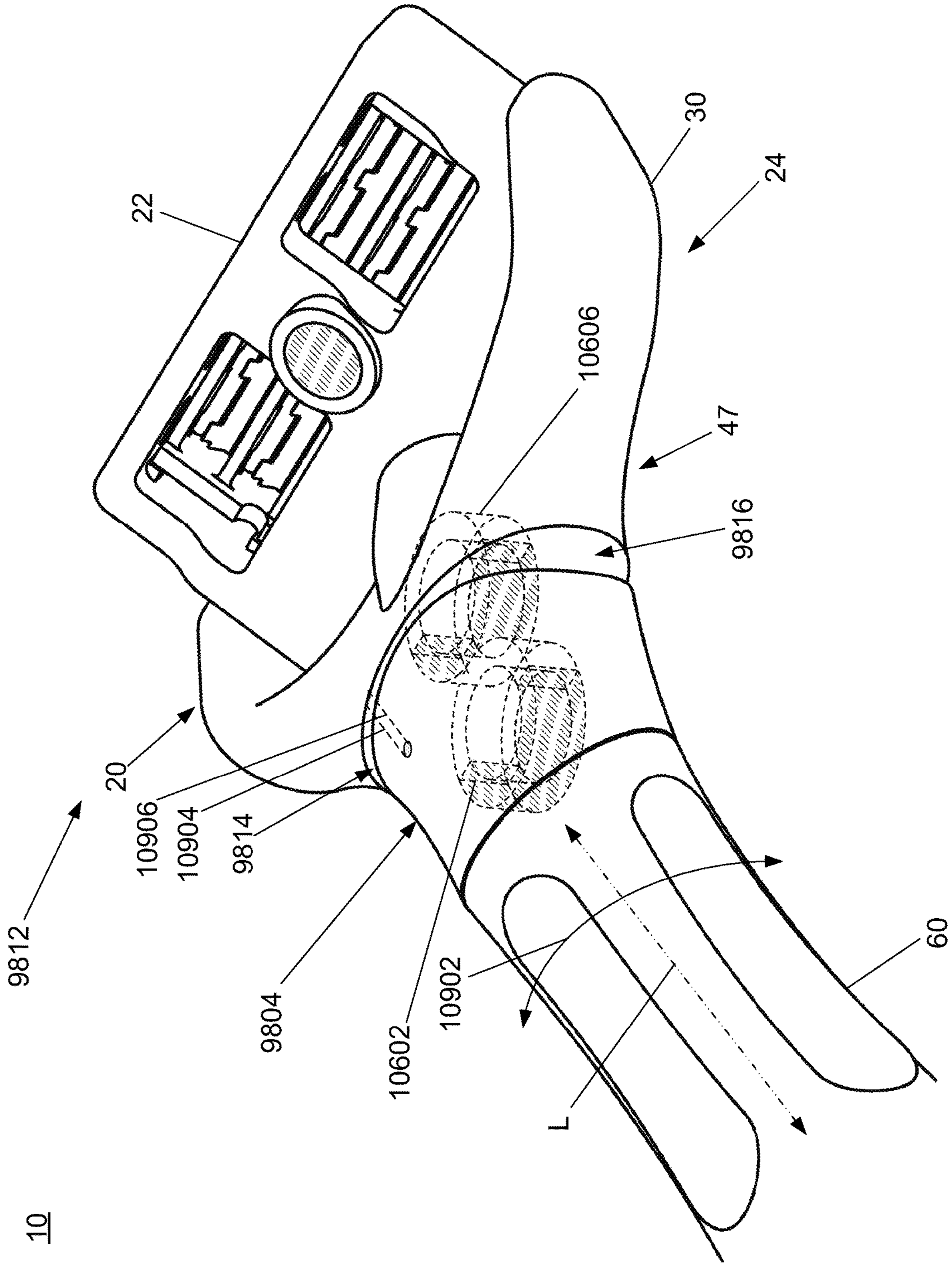
Figure 110:
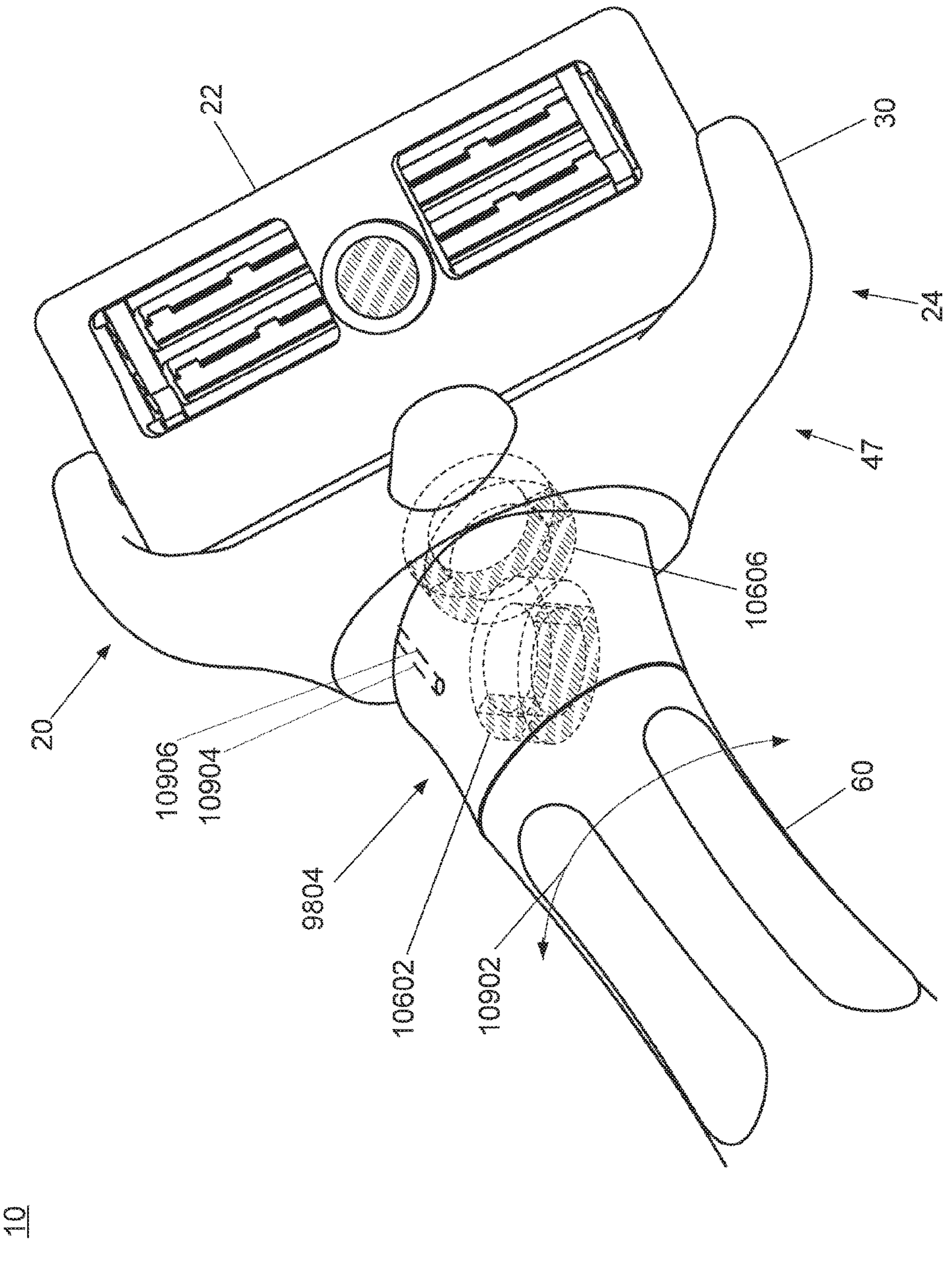
Figure 111:
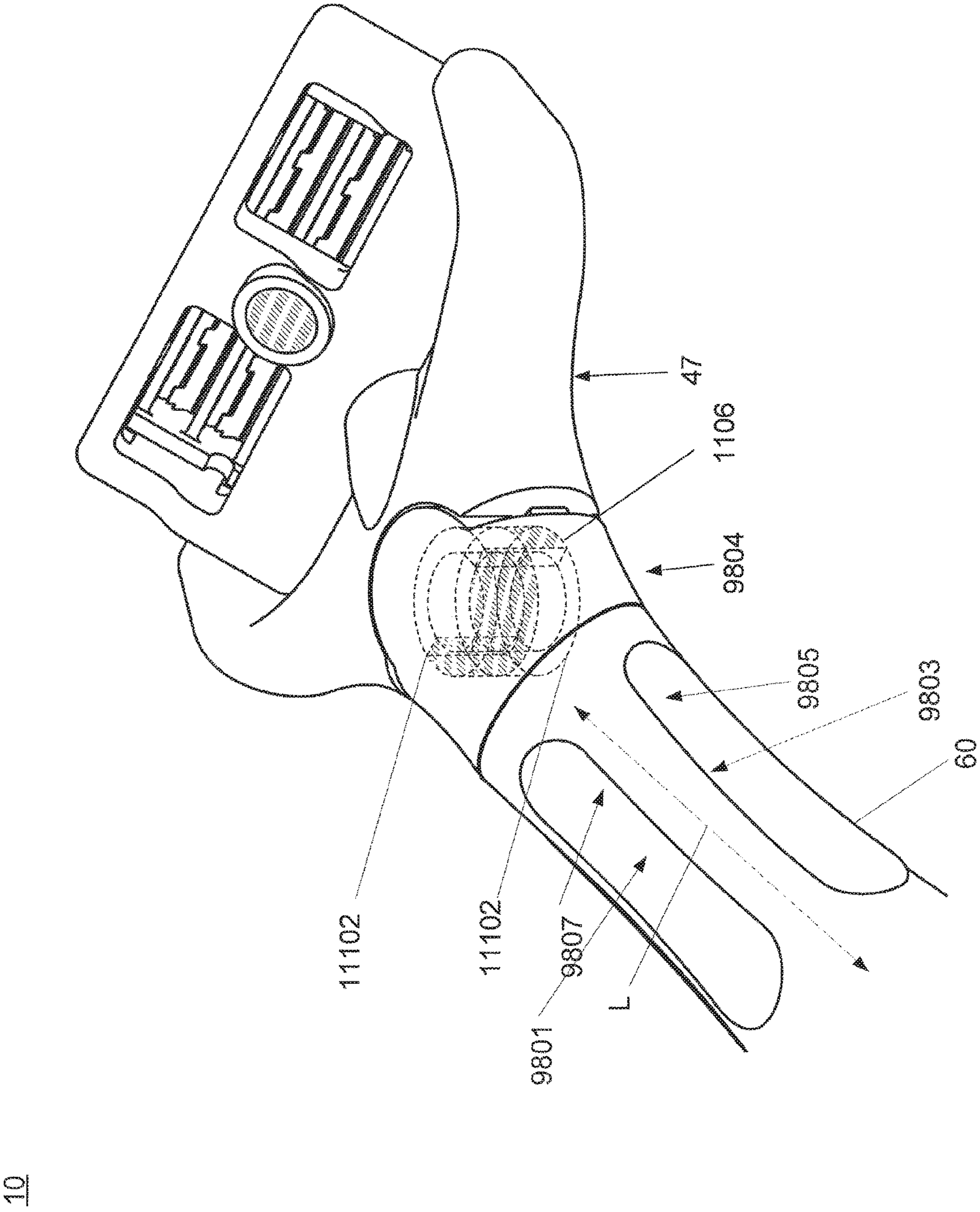
Figure 112:
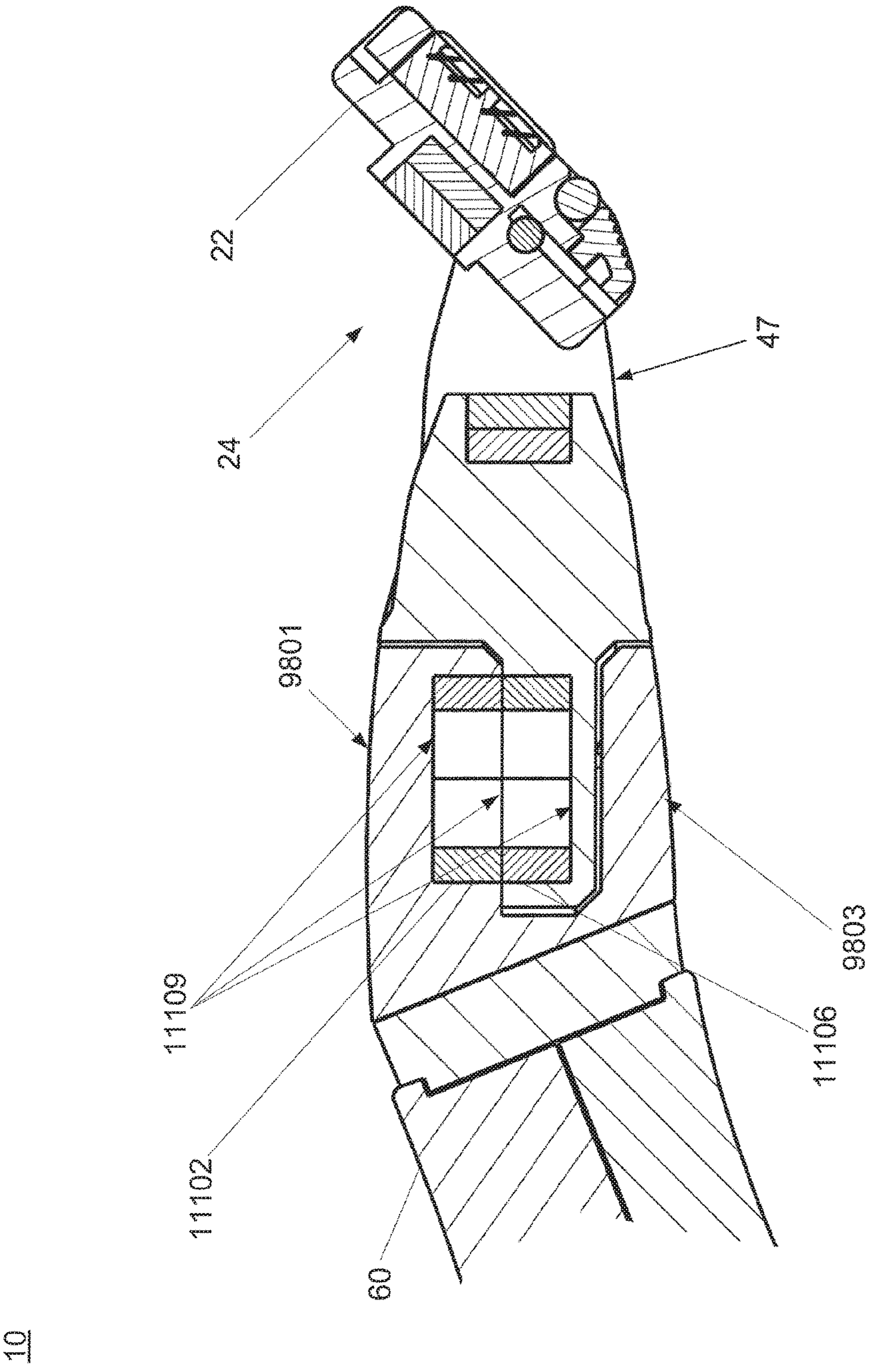
Figure 113:
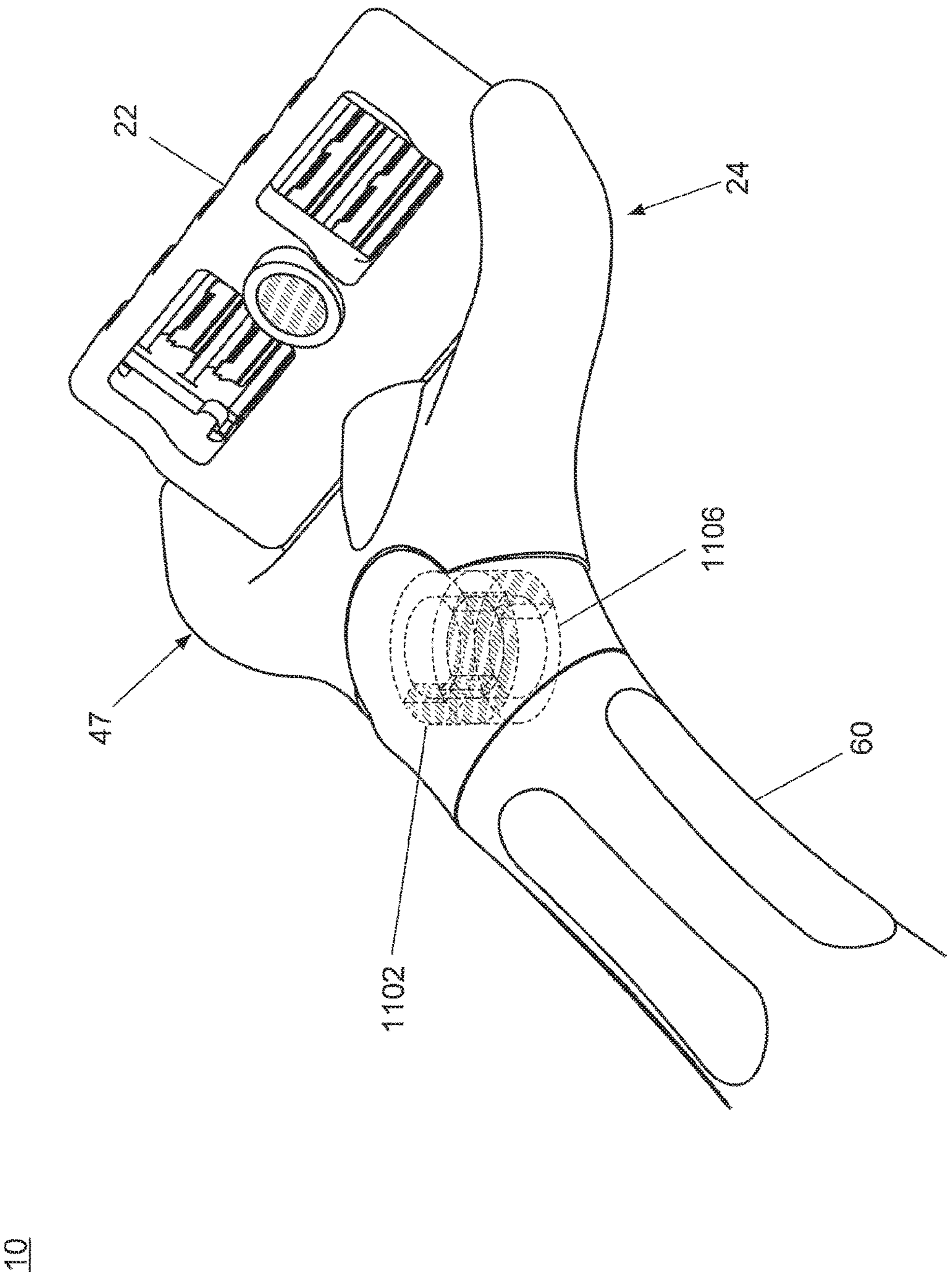
Figure 114:
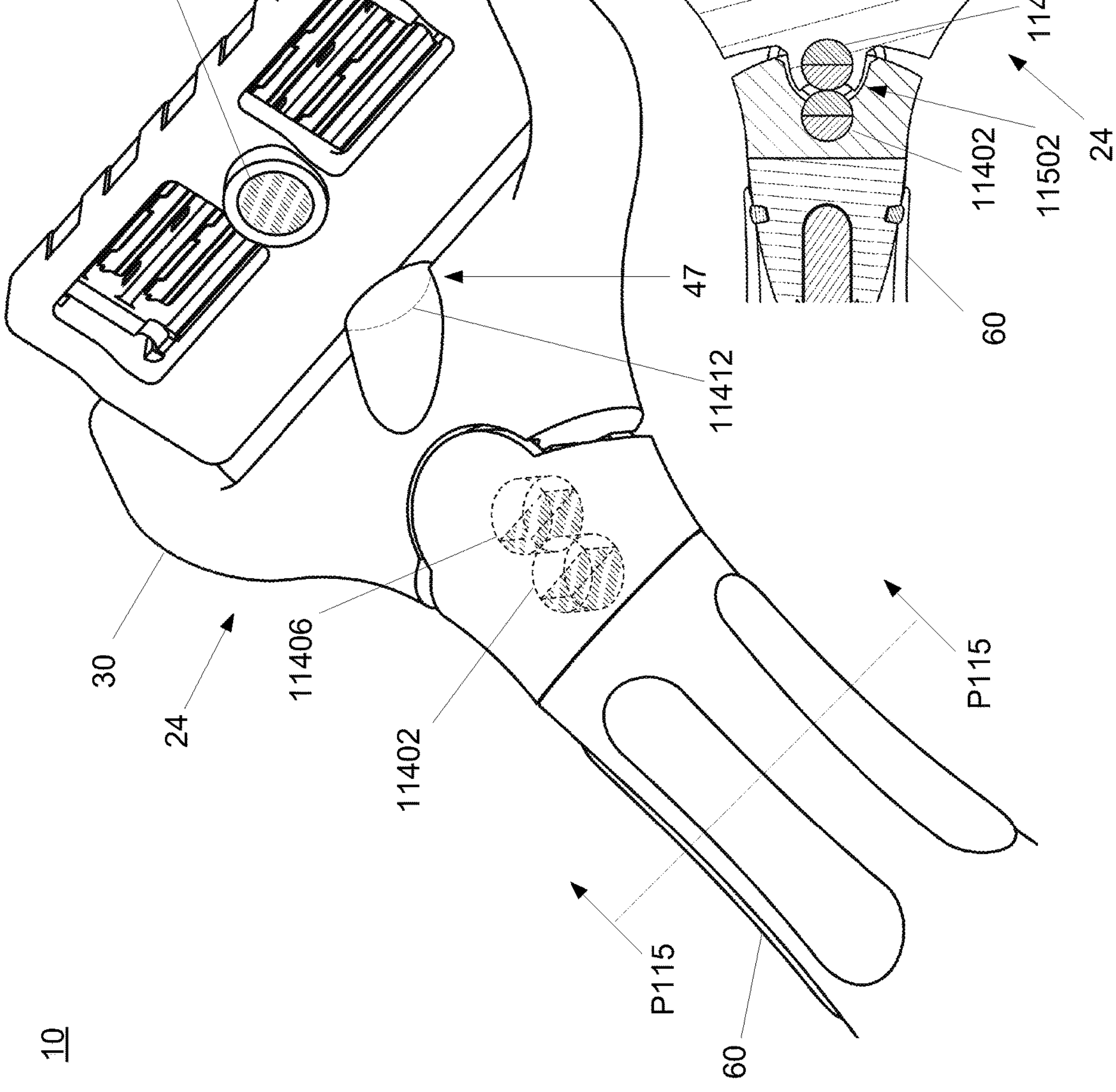
Figure 115:
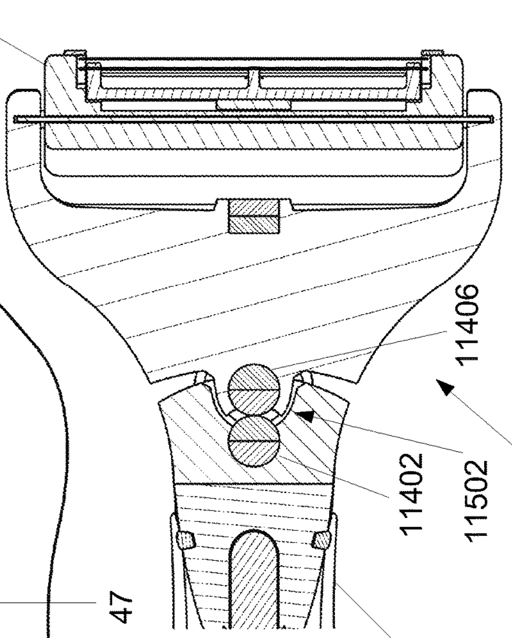
Figure 116:
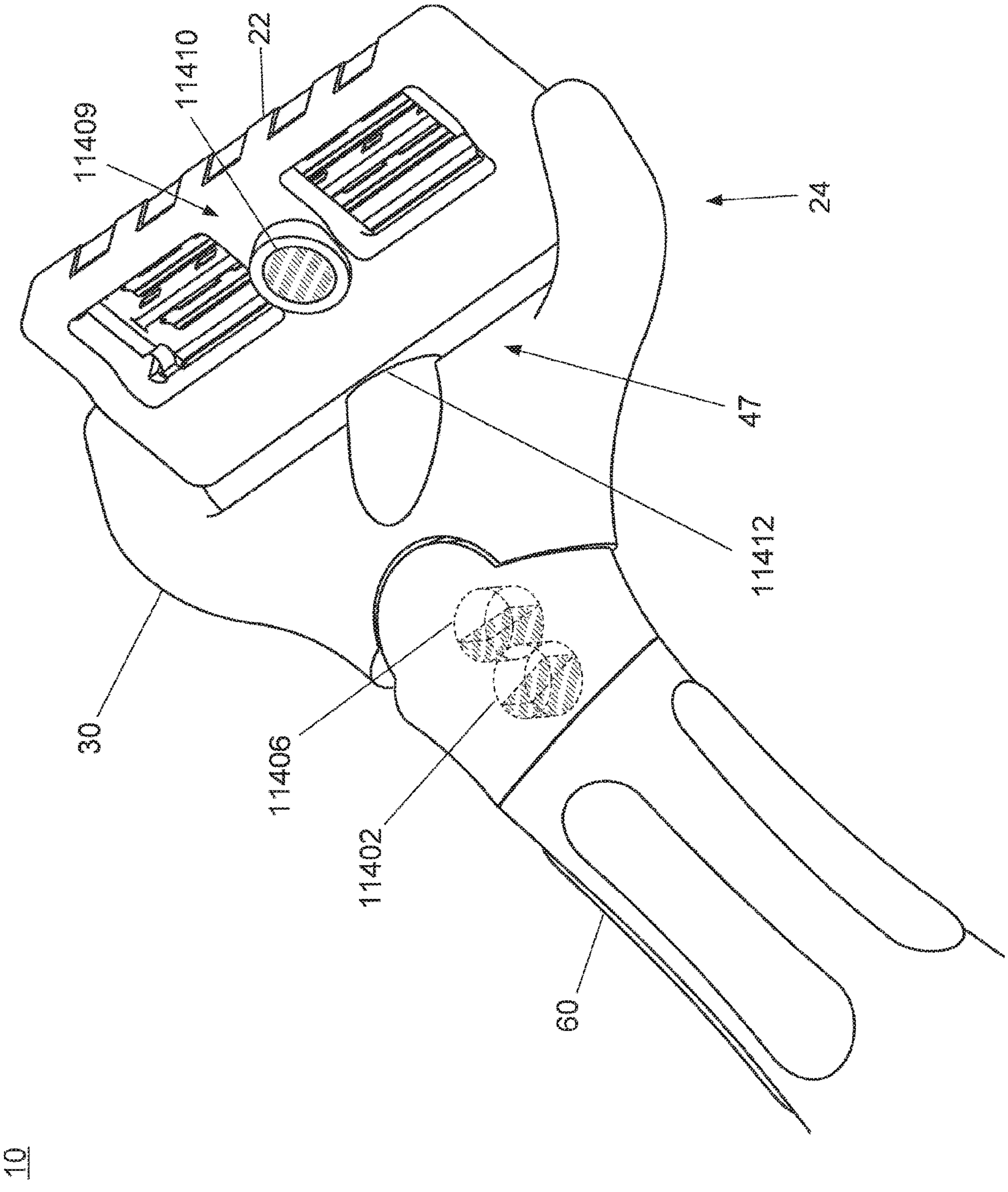
Figure 117:
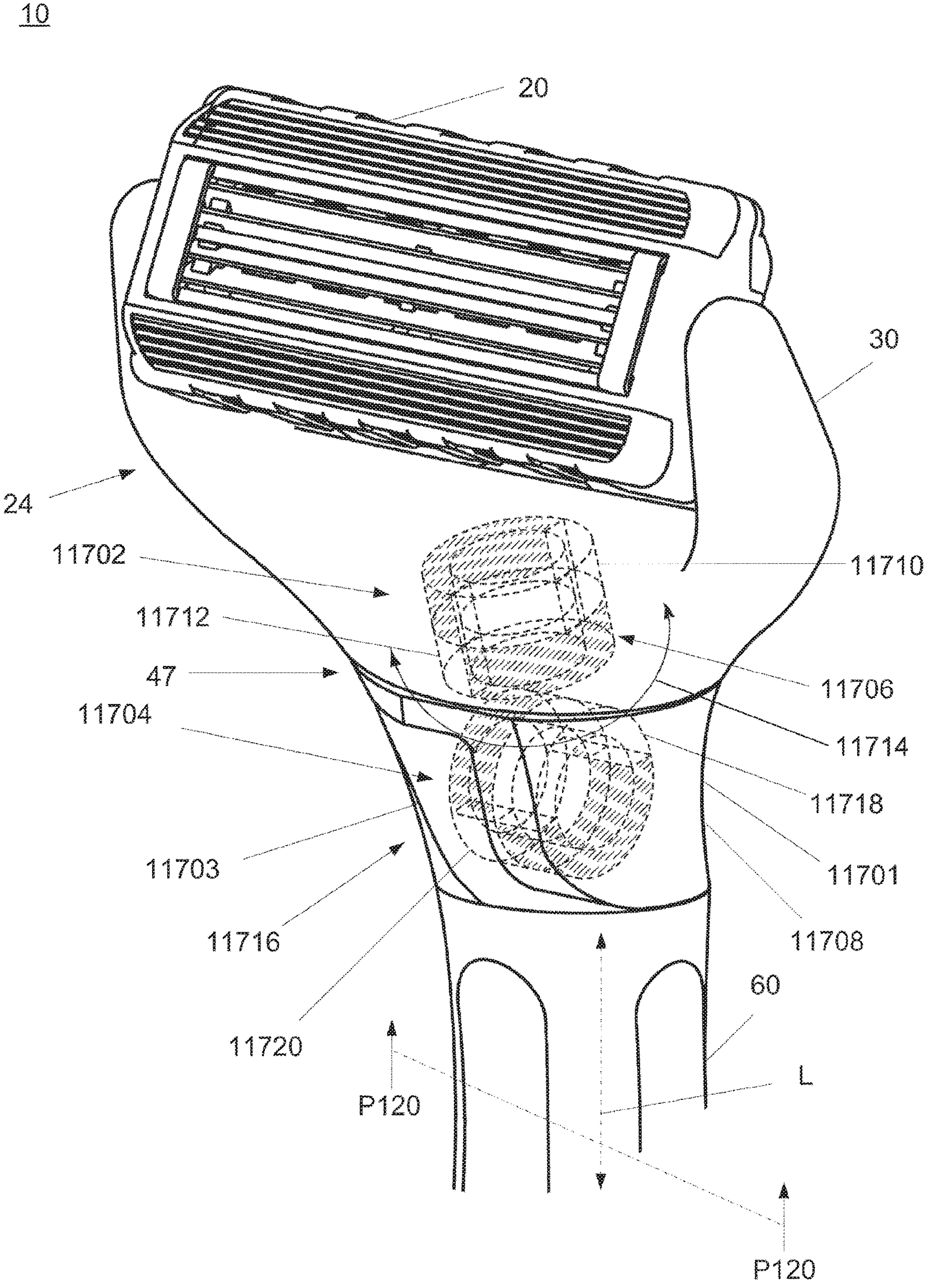
Figure 118:
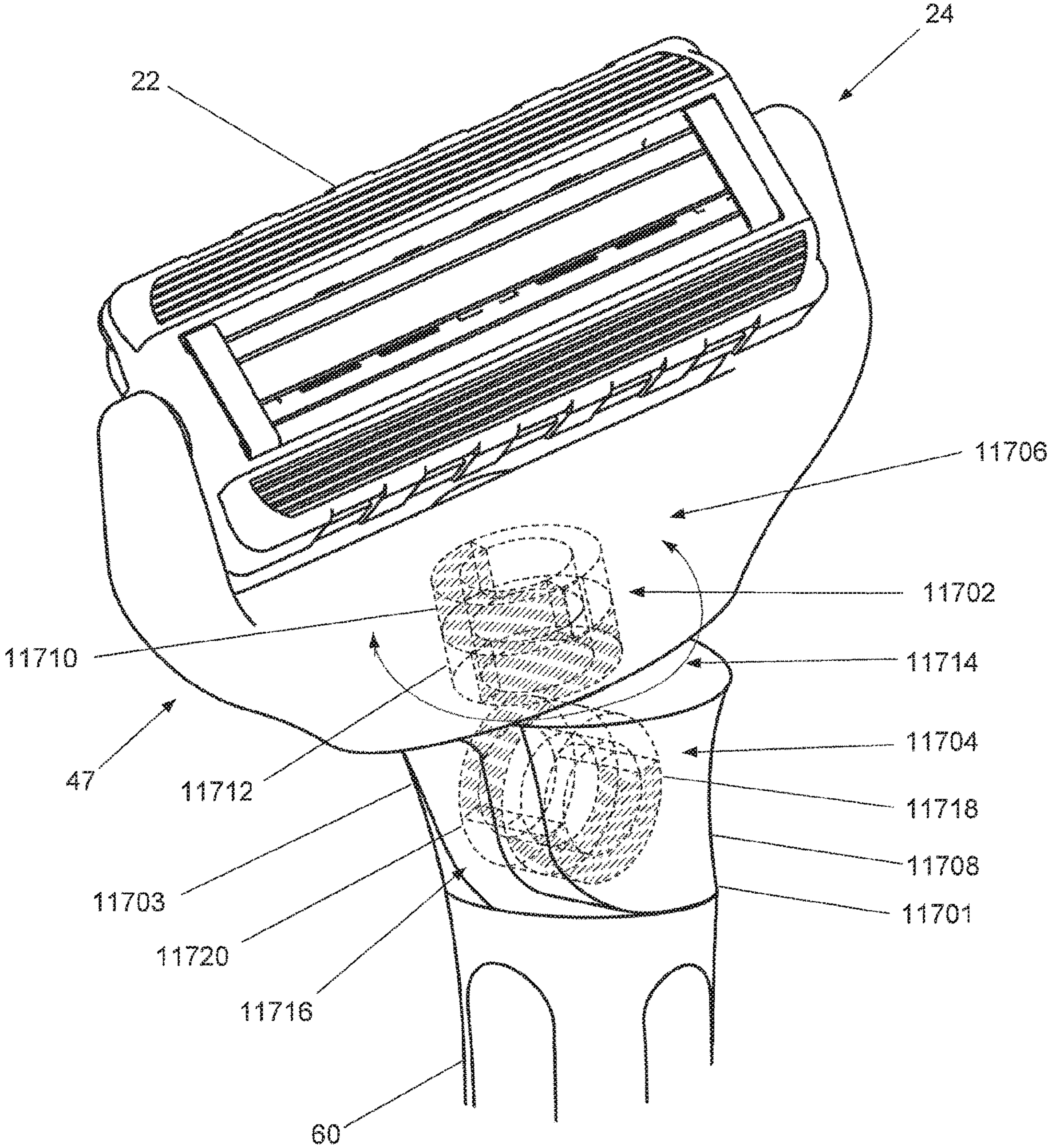
Figure 119:
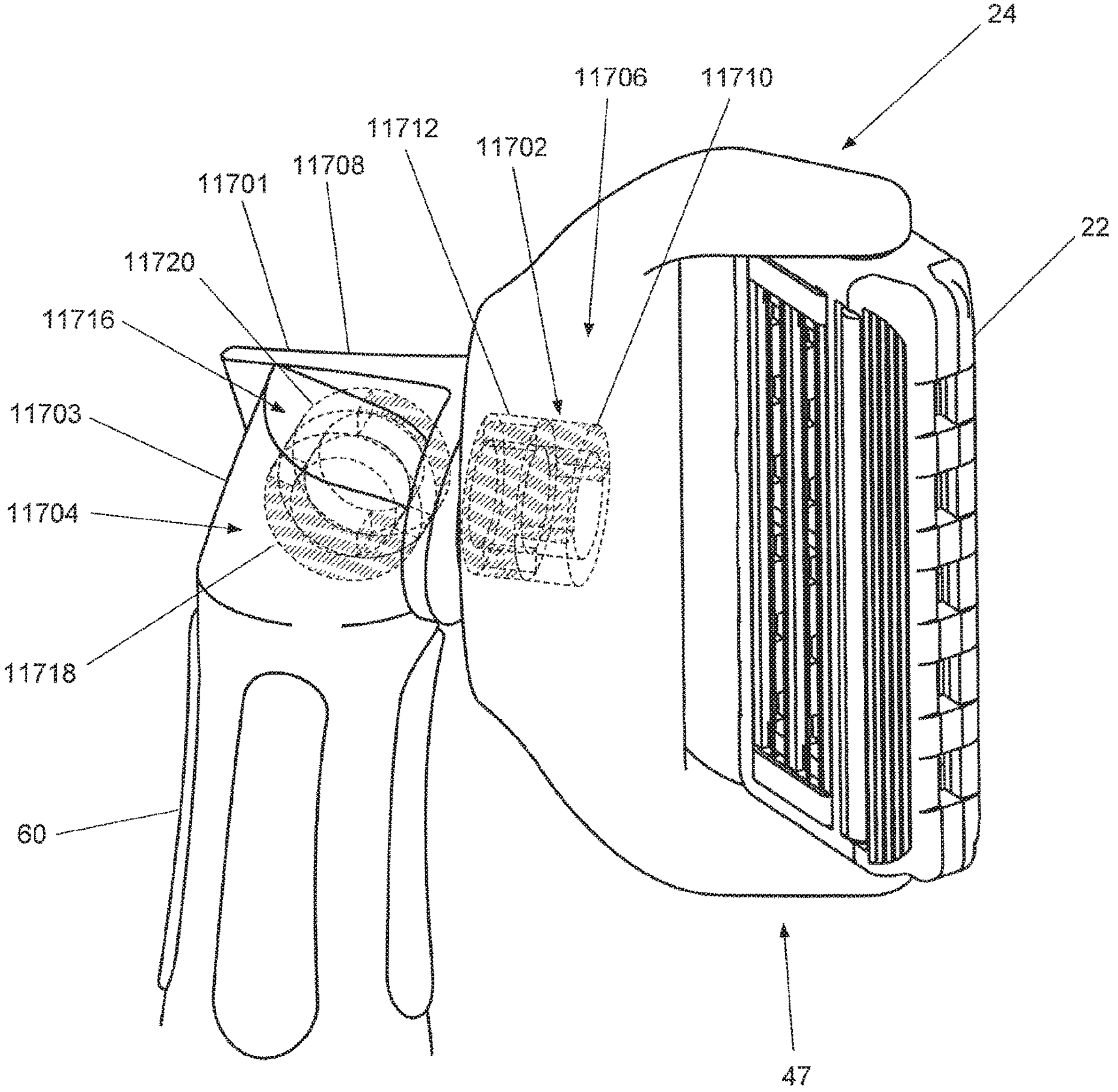
Figure 120:
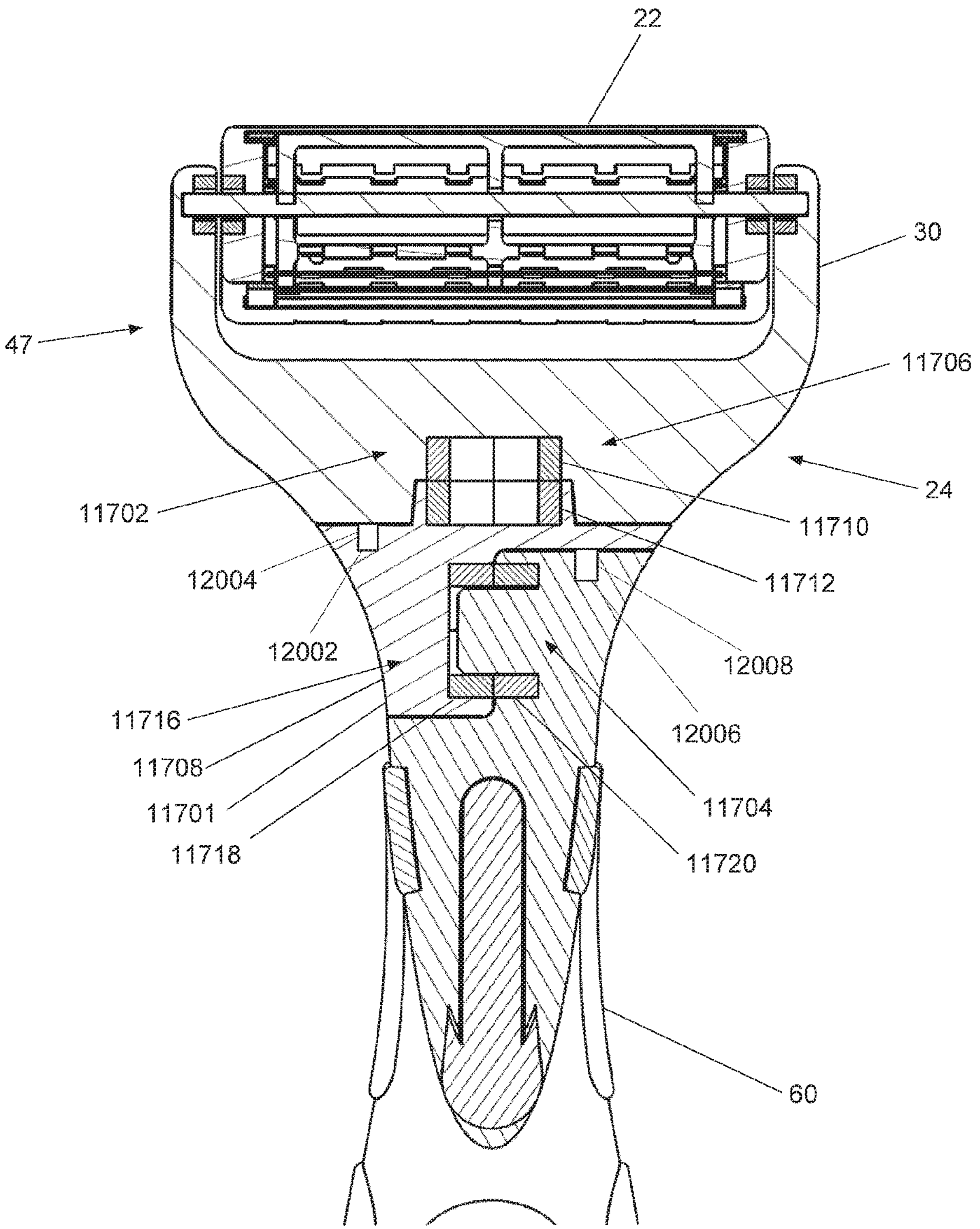
Figure 121:
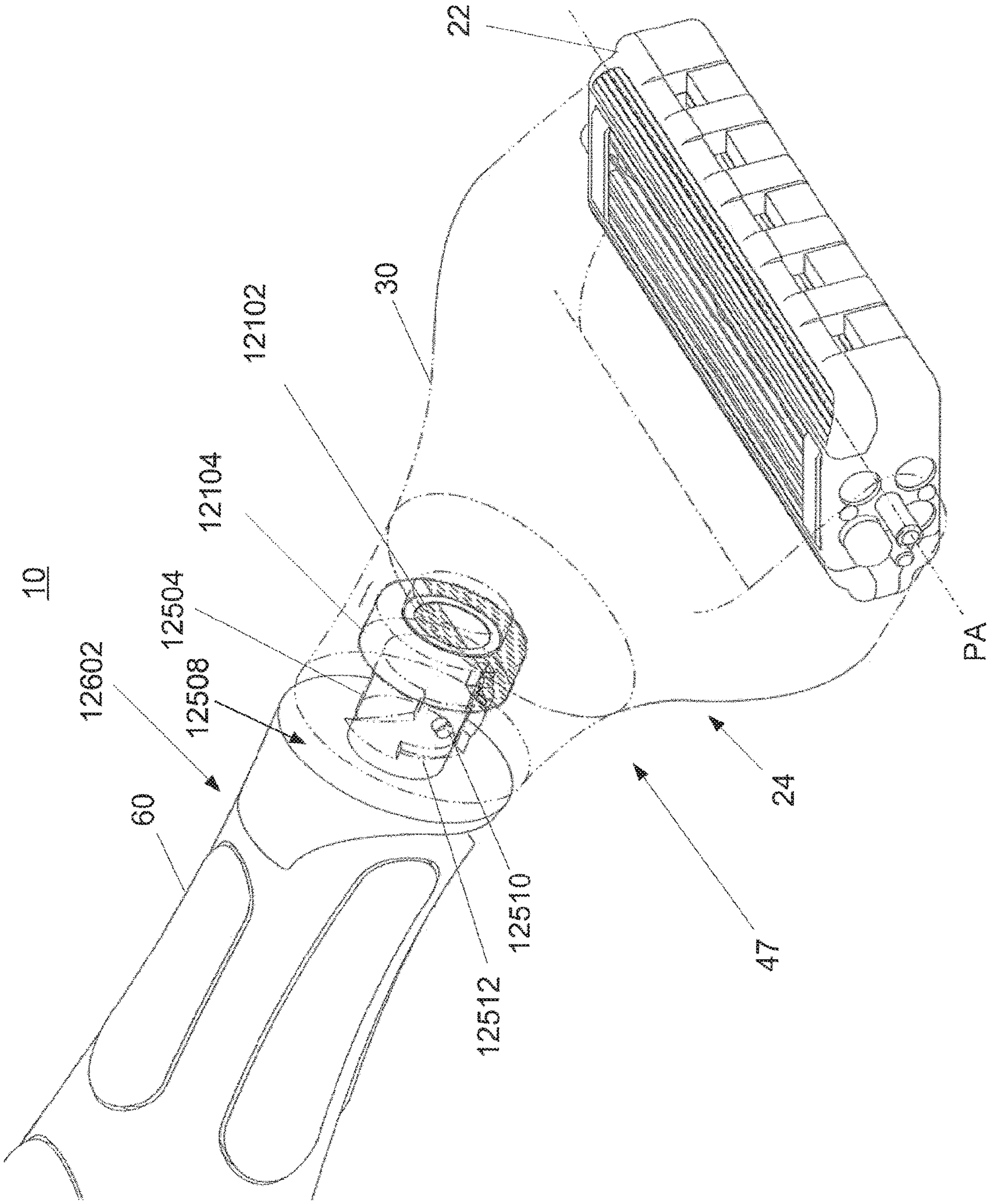
Figure 122:
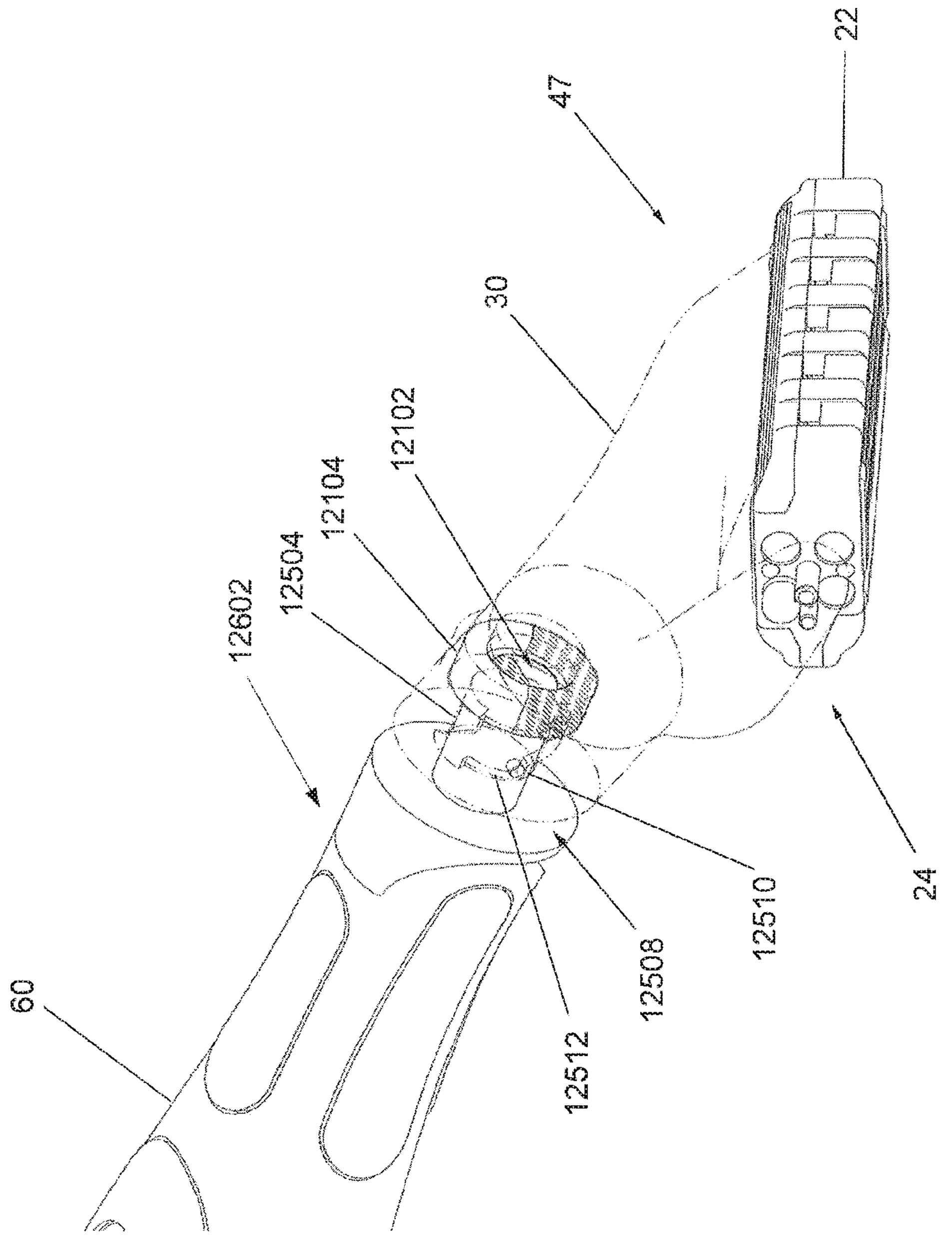
Figure 123:
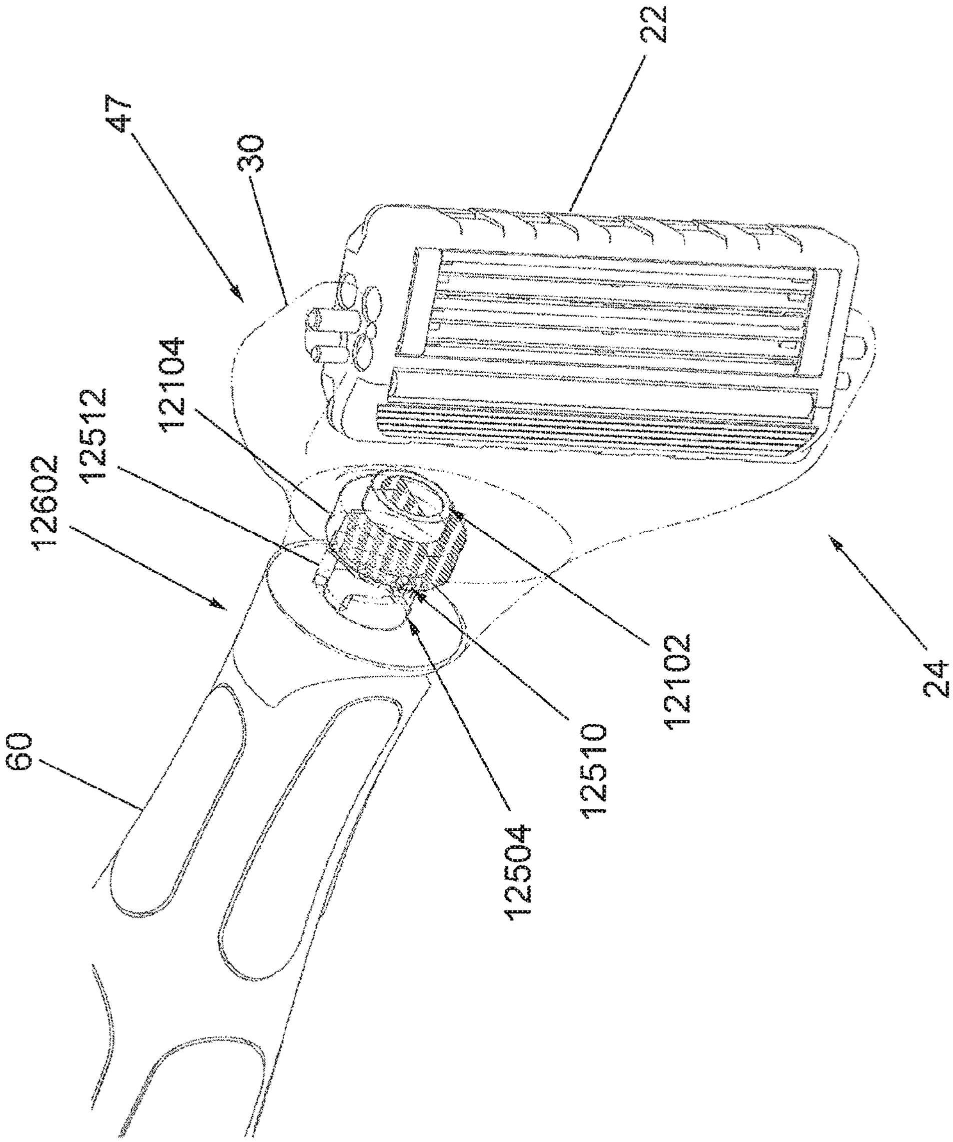
Figure 124:
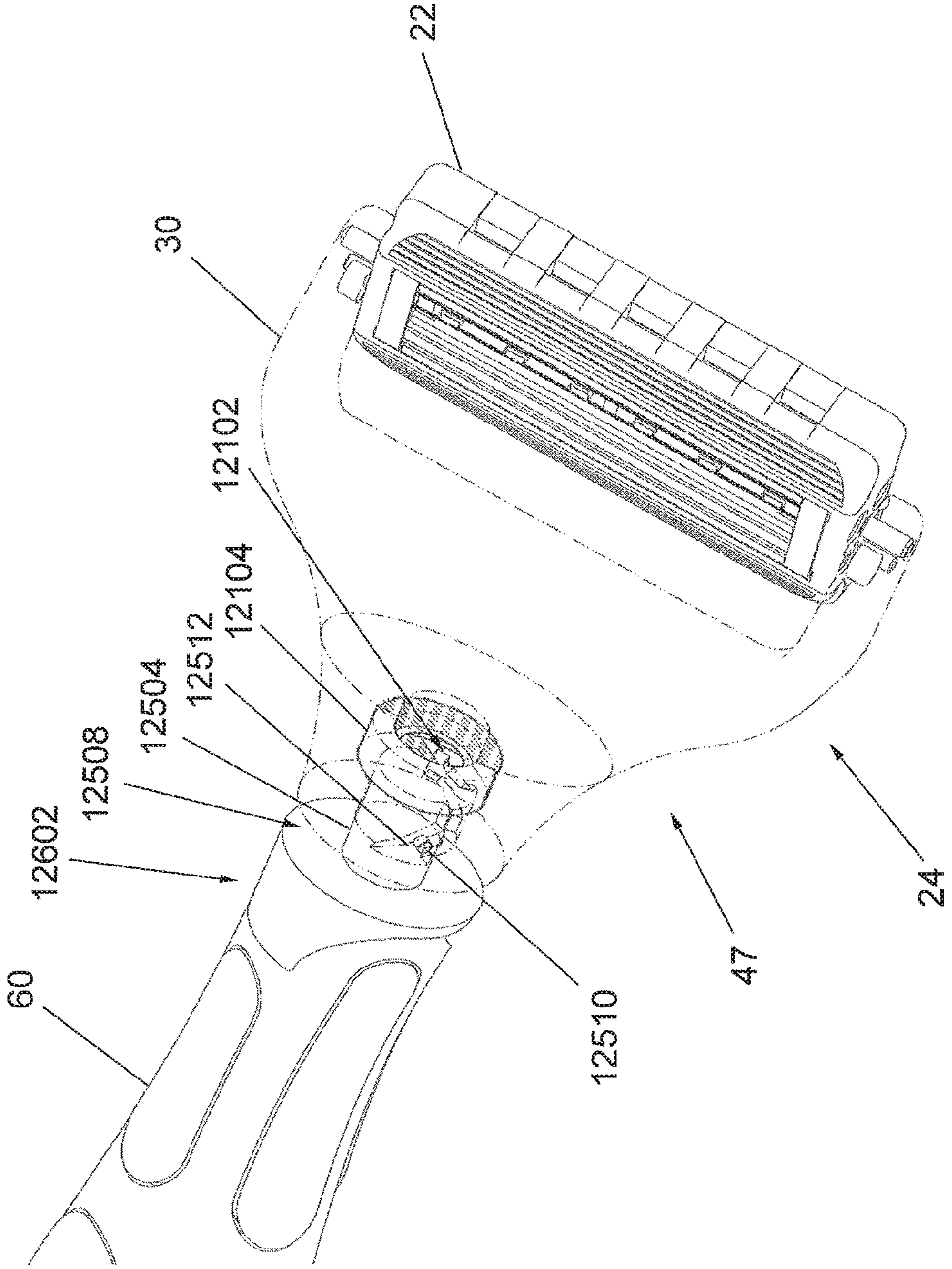
Figures 125A, 125B:
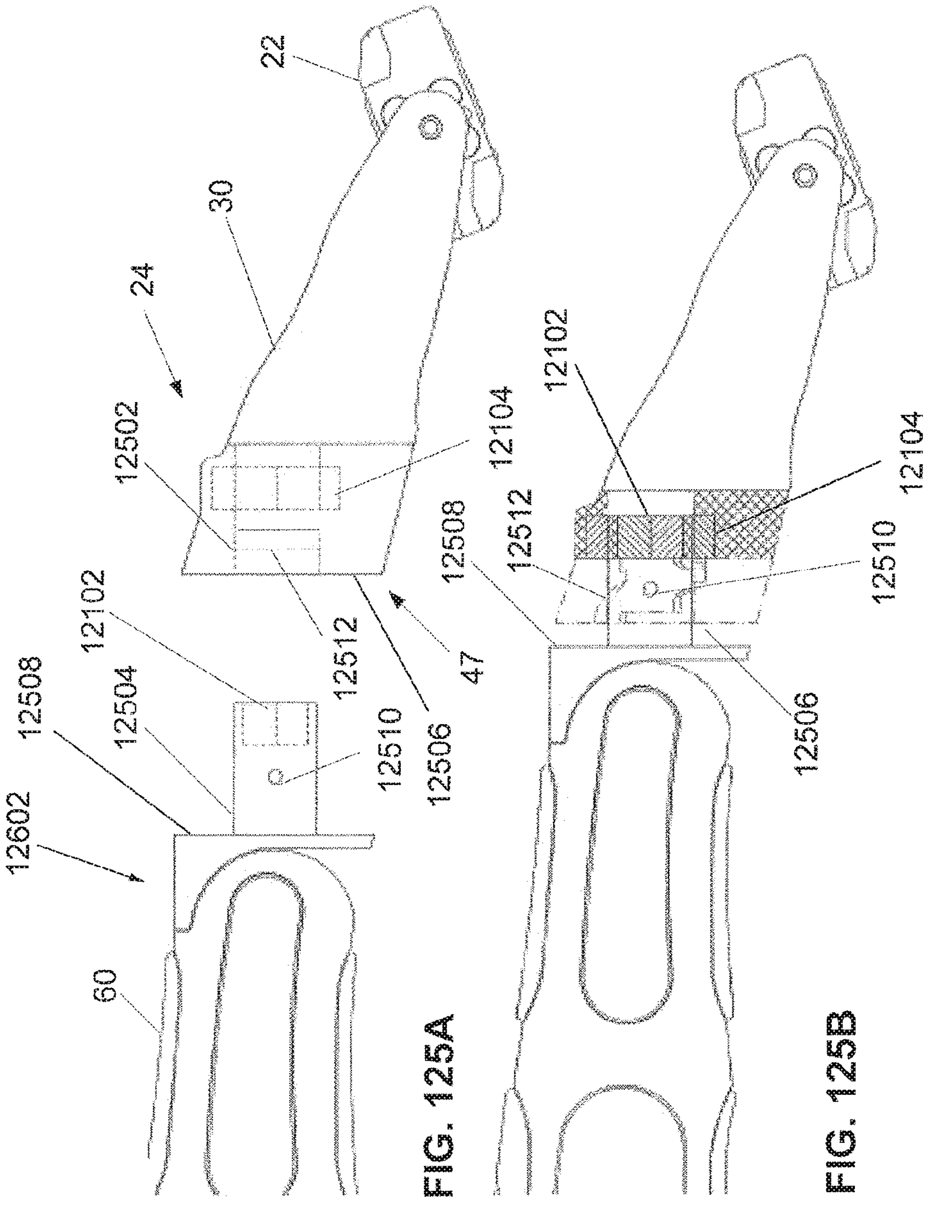
Figure 125E:
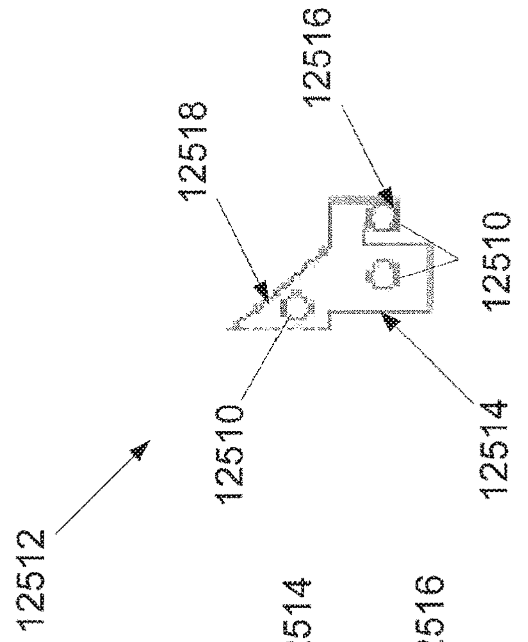
Figure 125D:
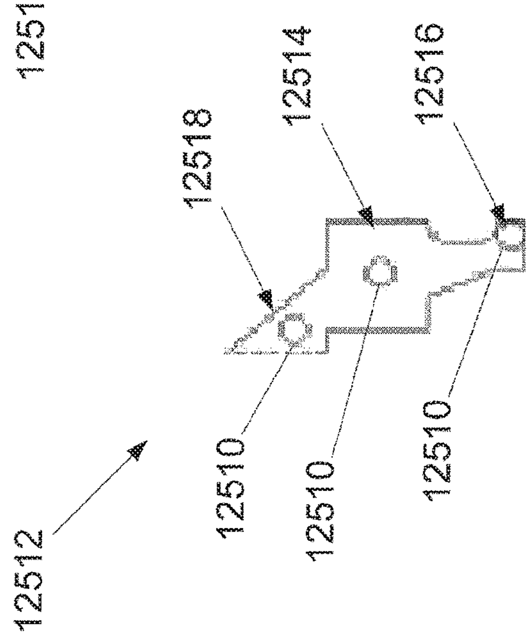
Figure 125C:
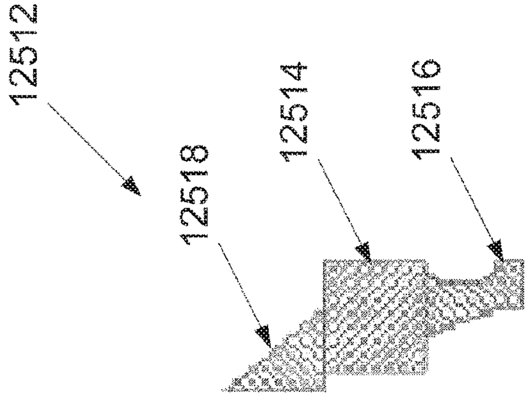
Figure 126:
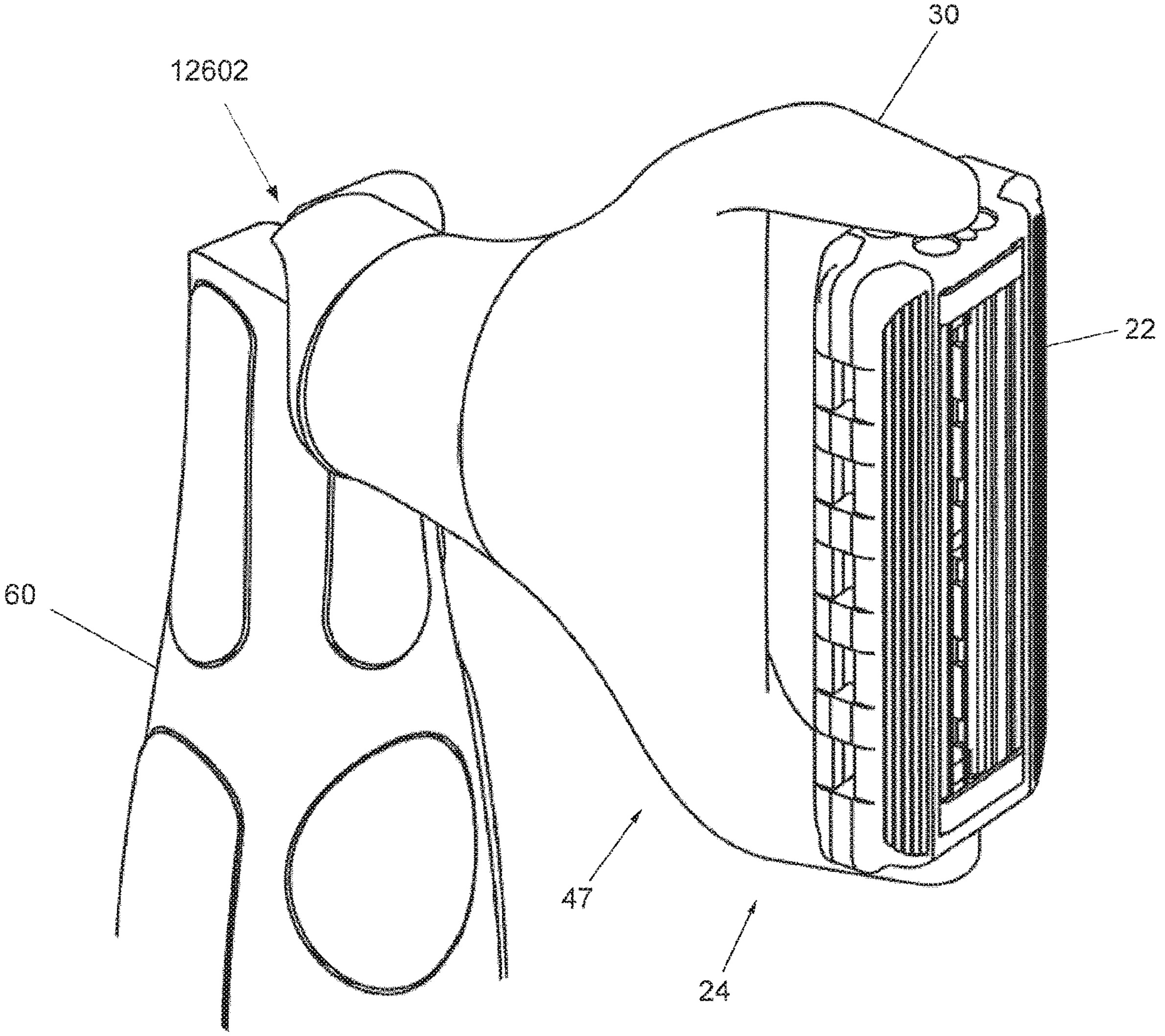
Figure 127:
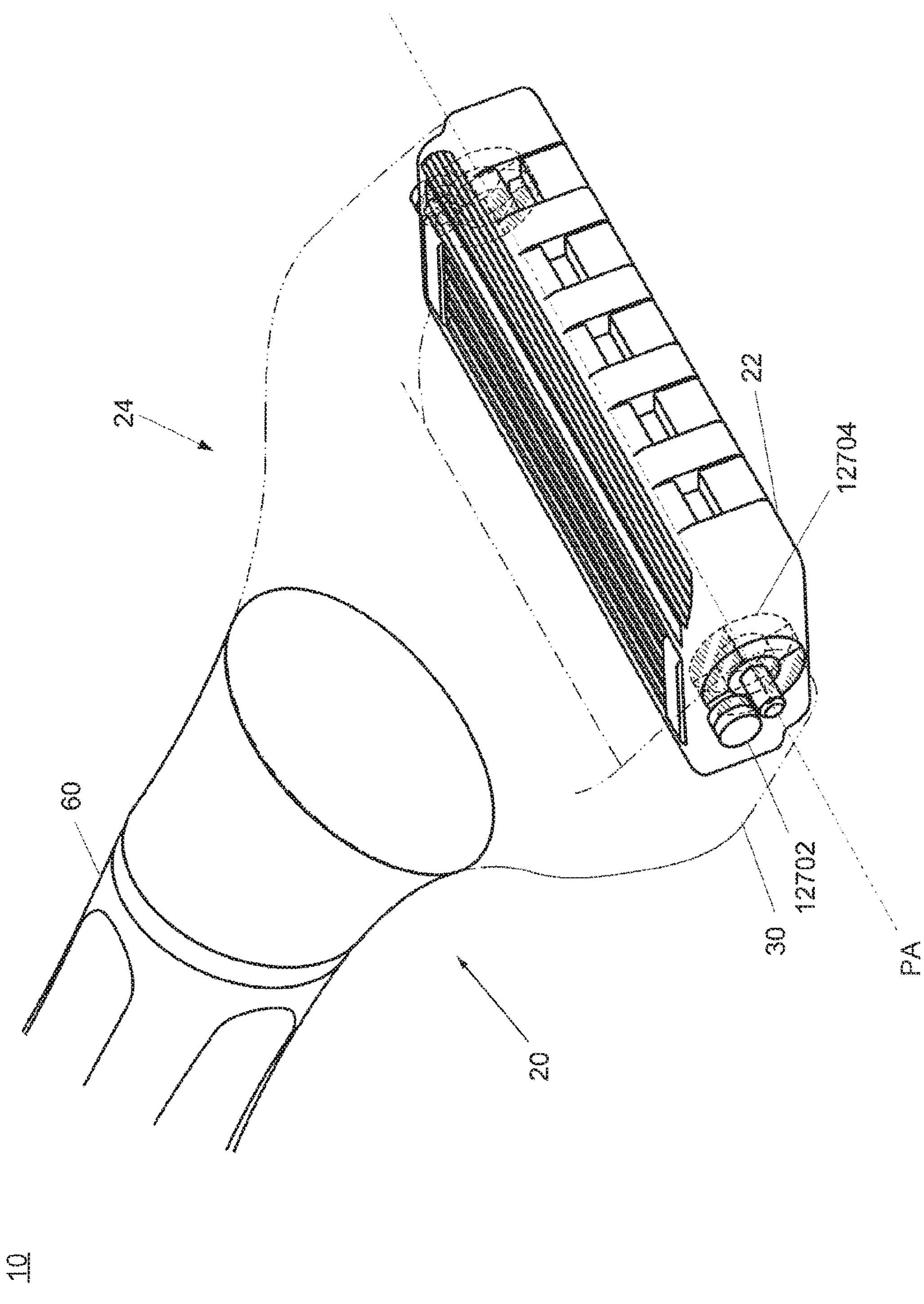
Figure 128:
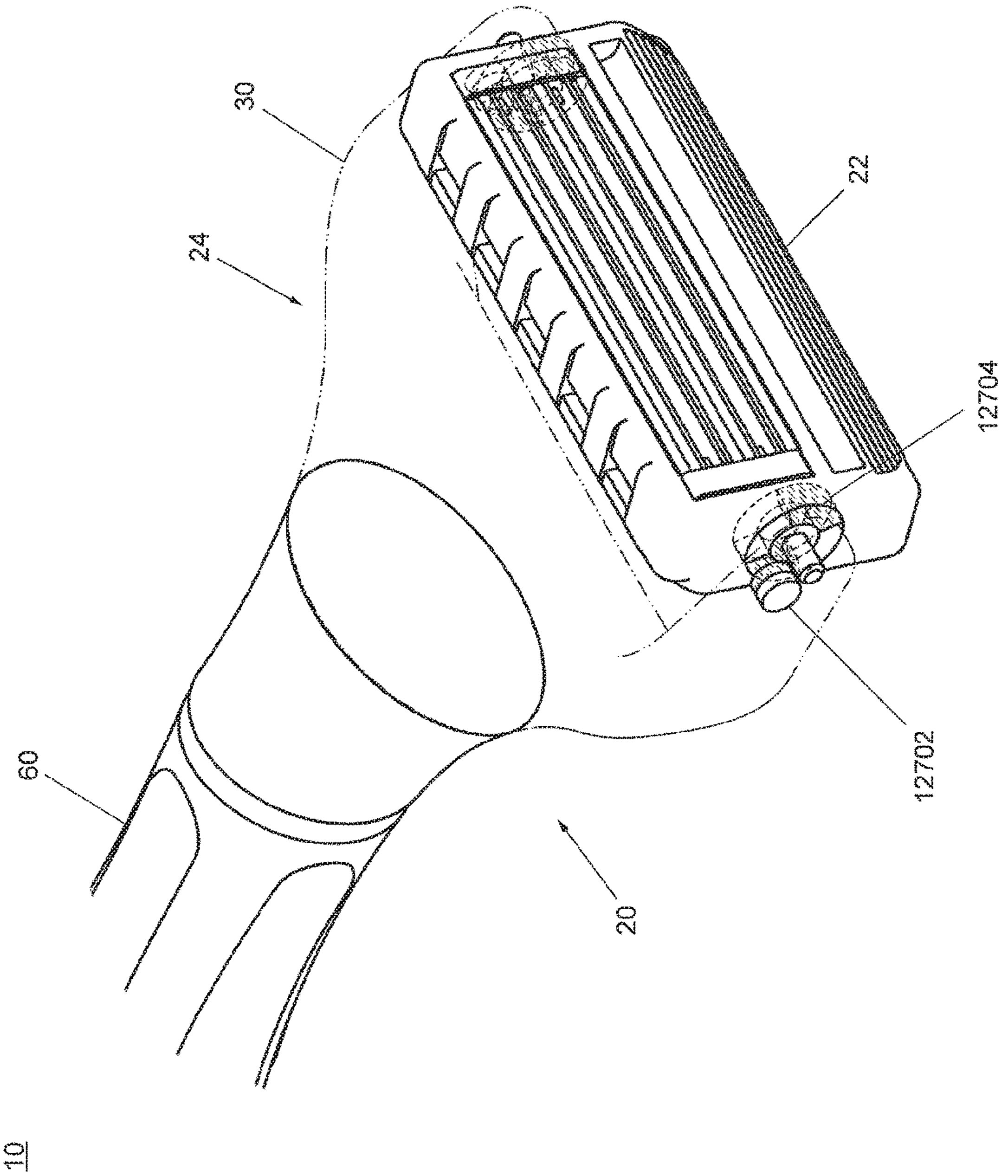
Figure 129:
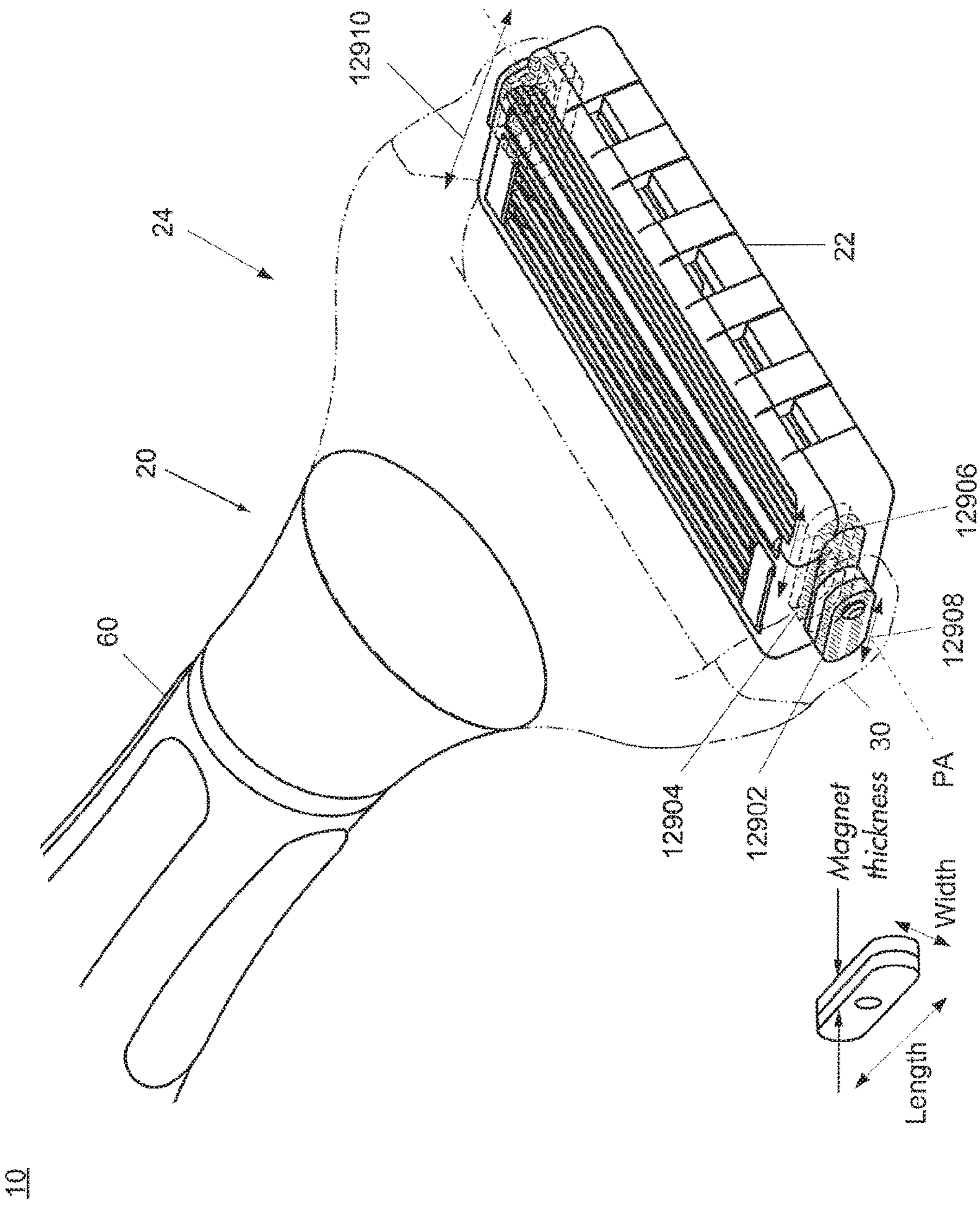
Figure 130:
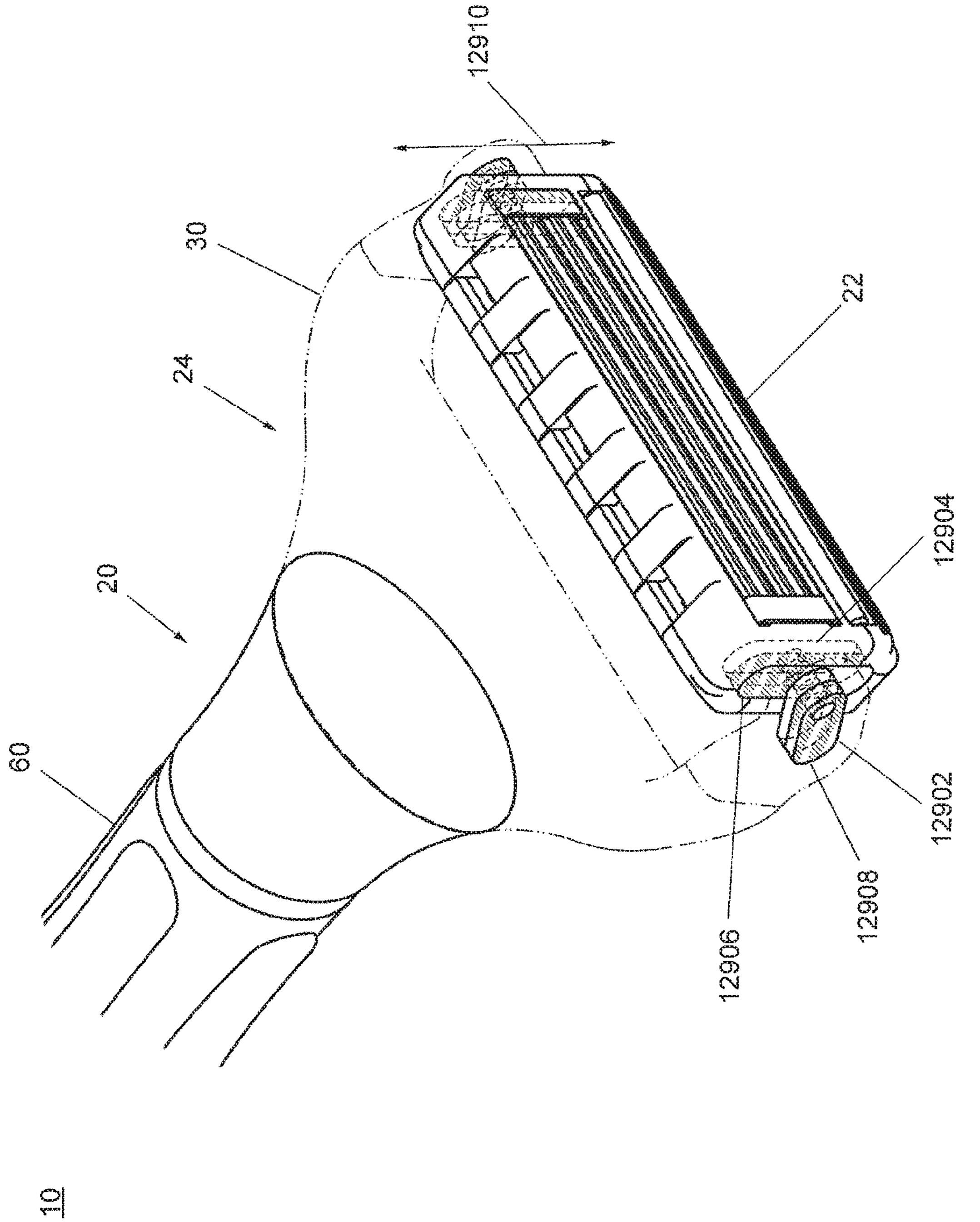
Figure 131:
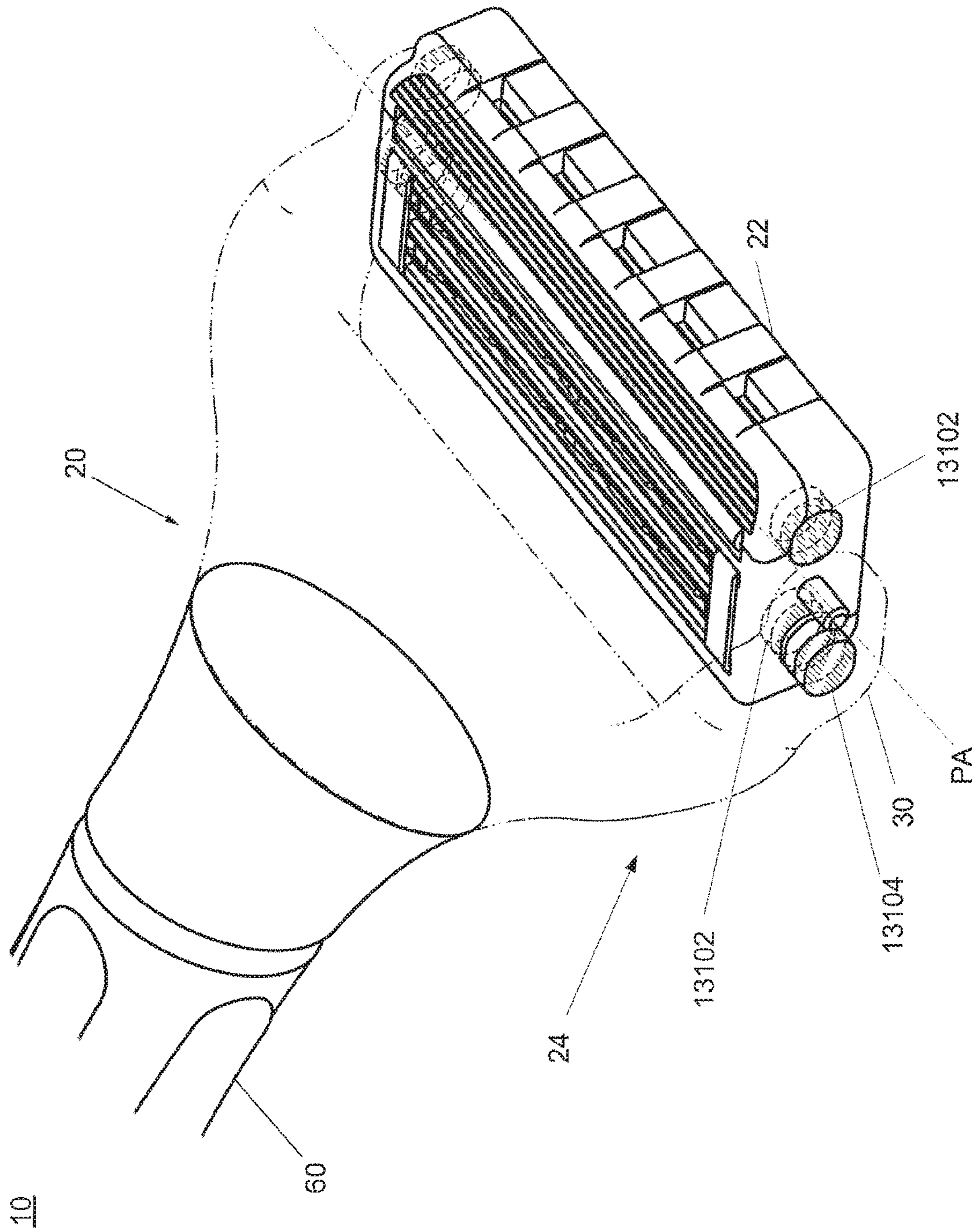
Figure 132:
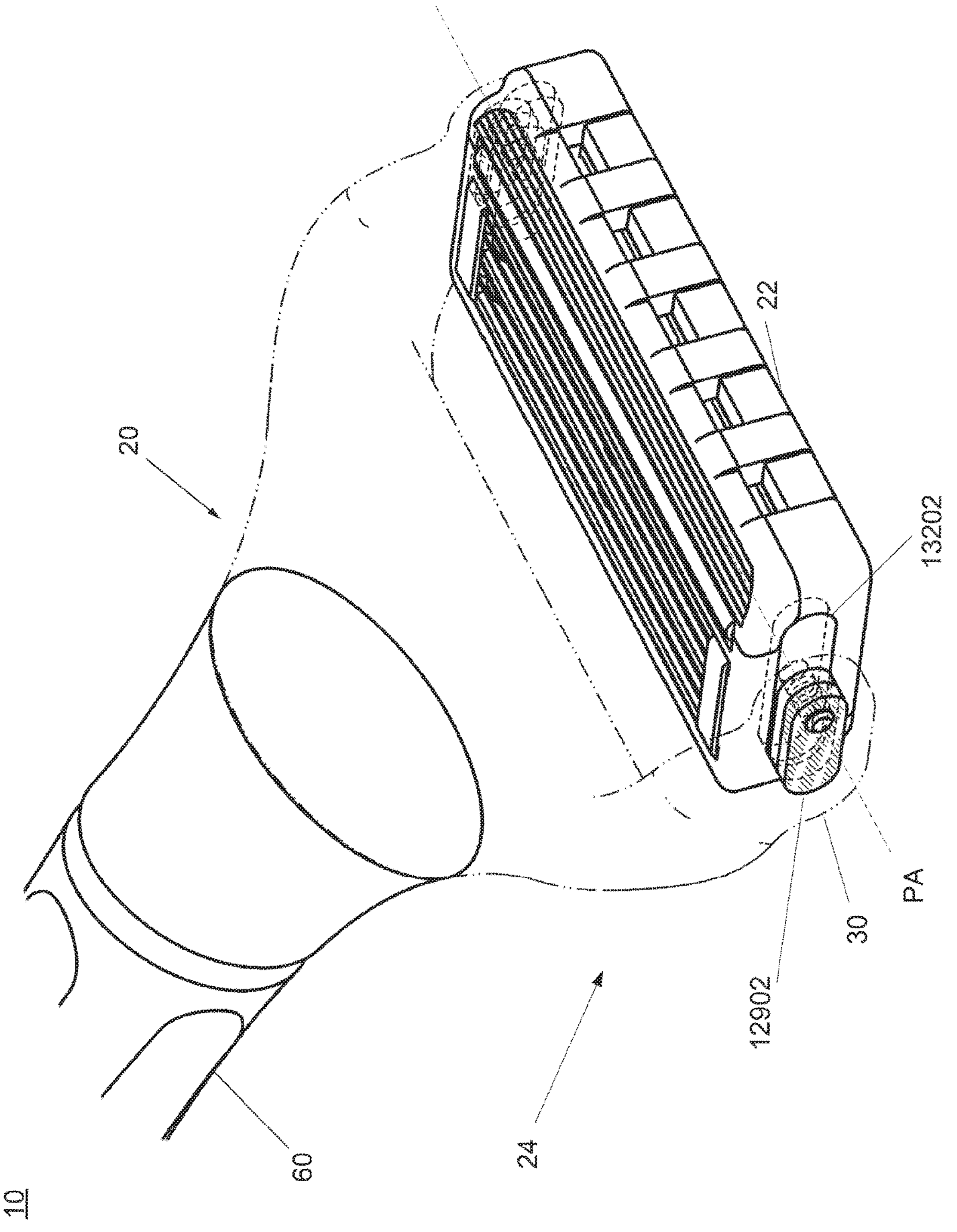
Figure 133:
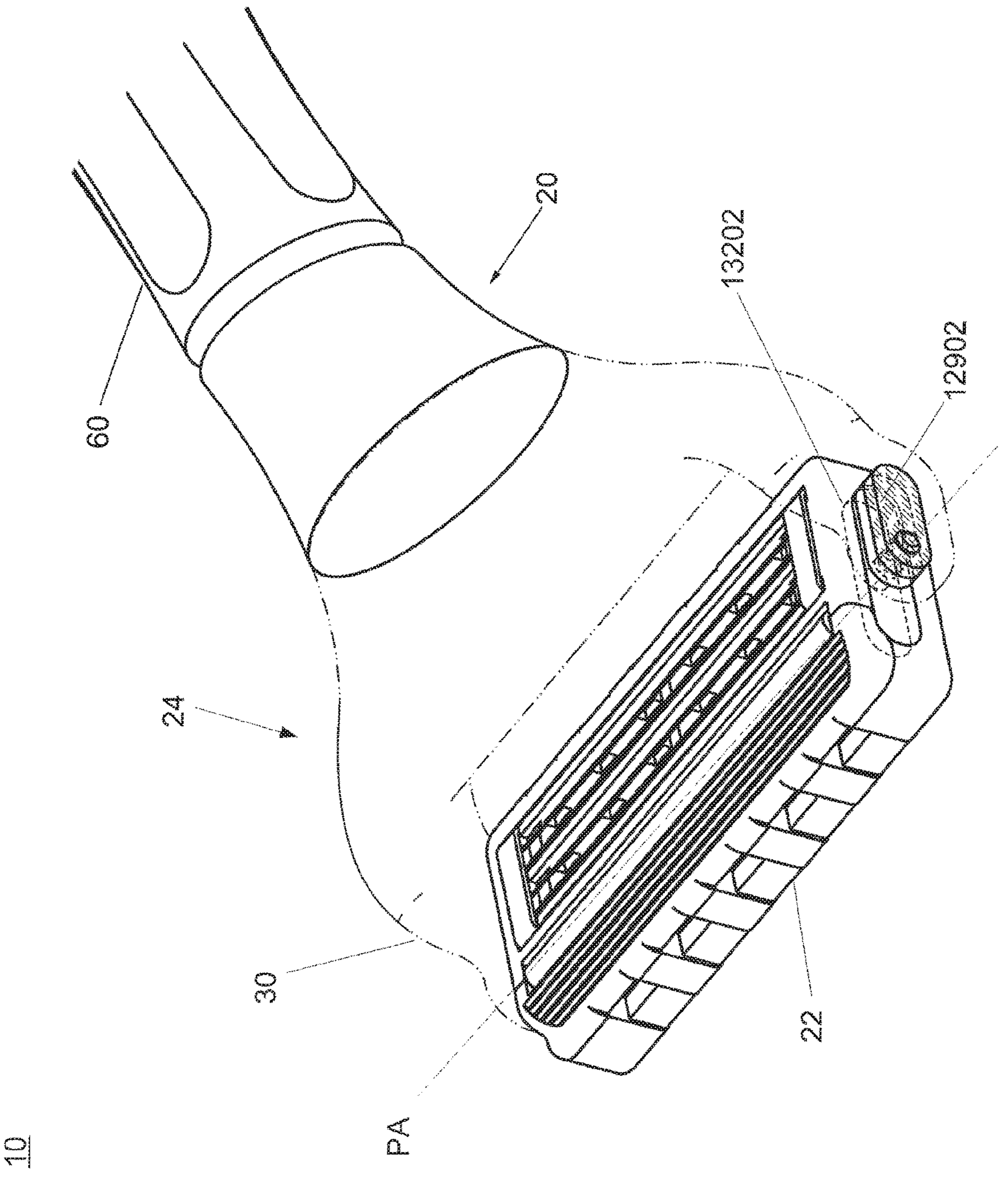
Figure 134:
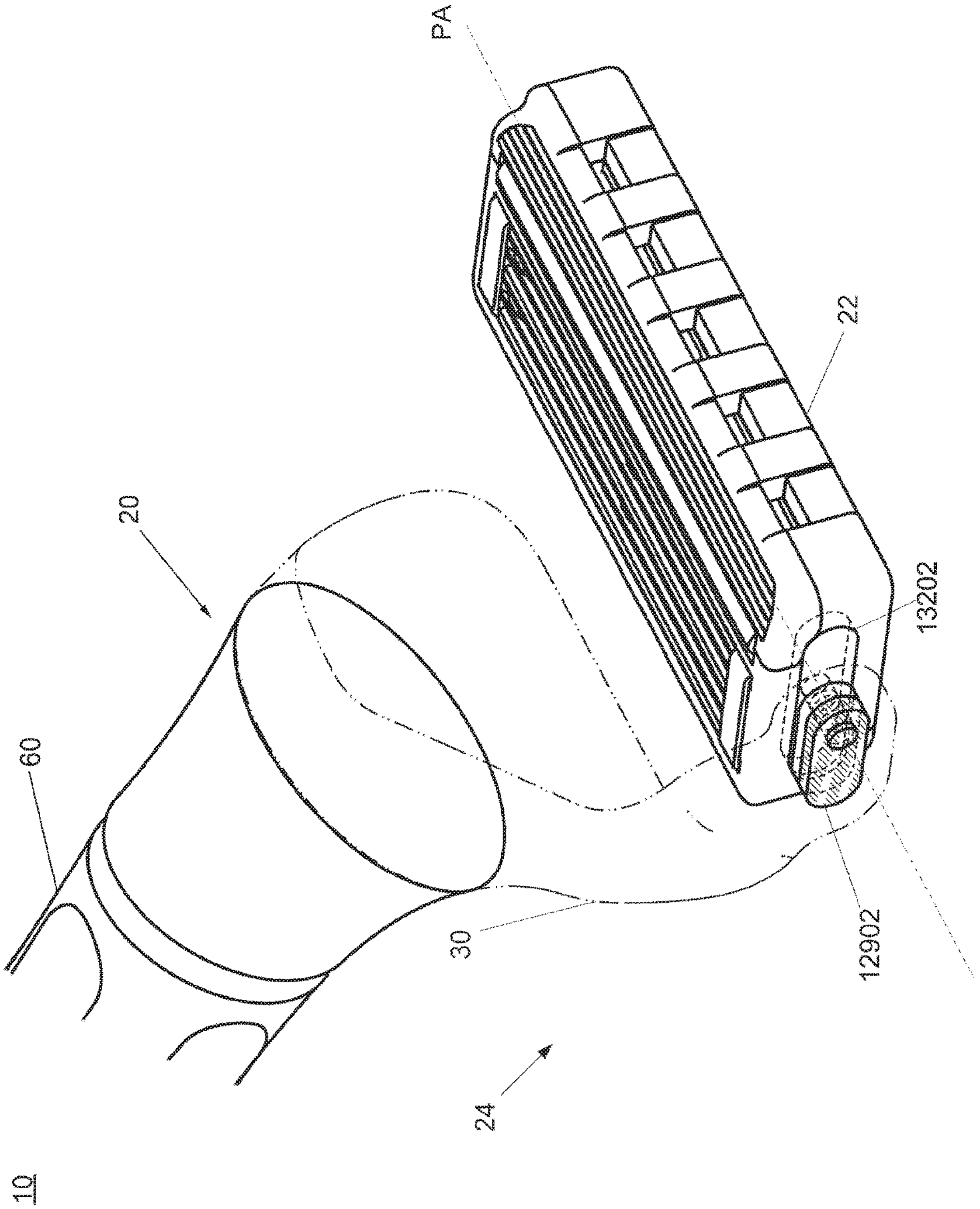
Figure 135:
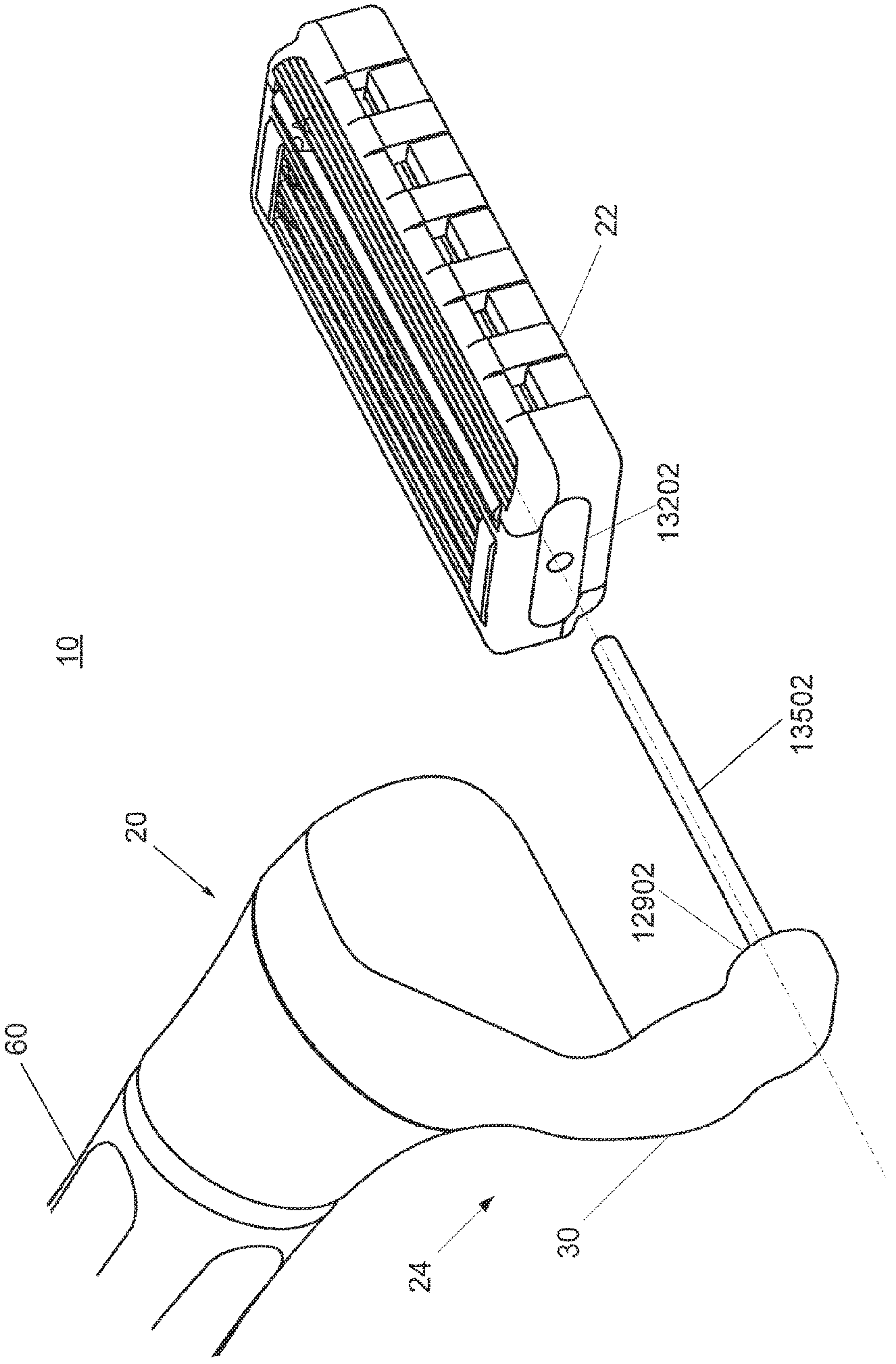
Figure 136:
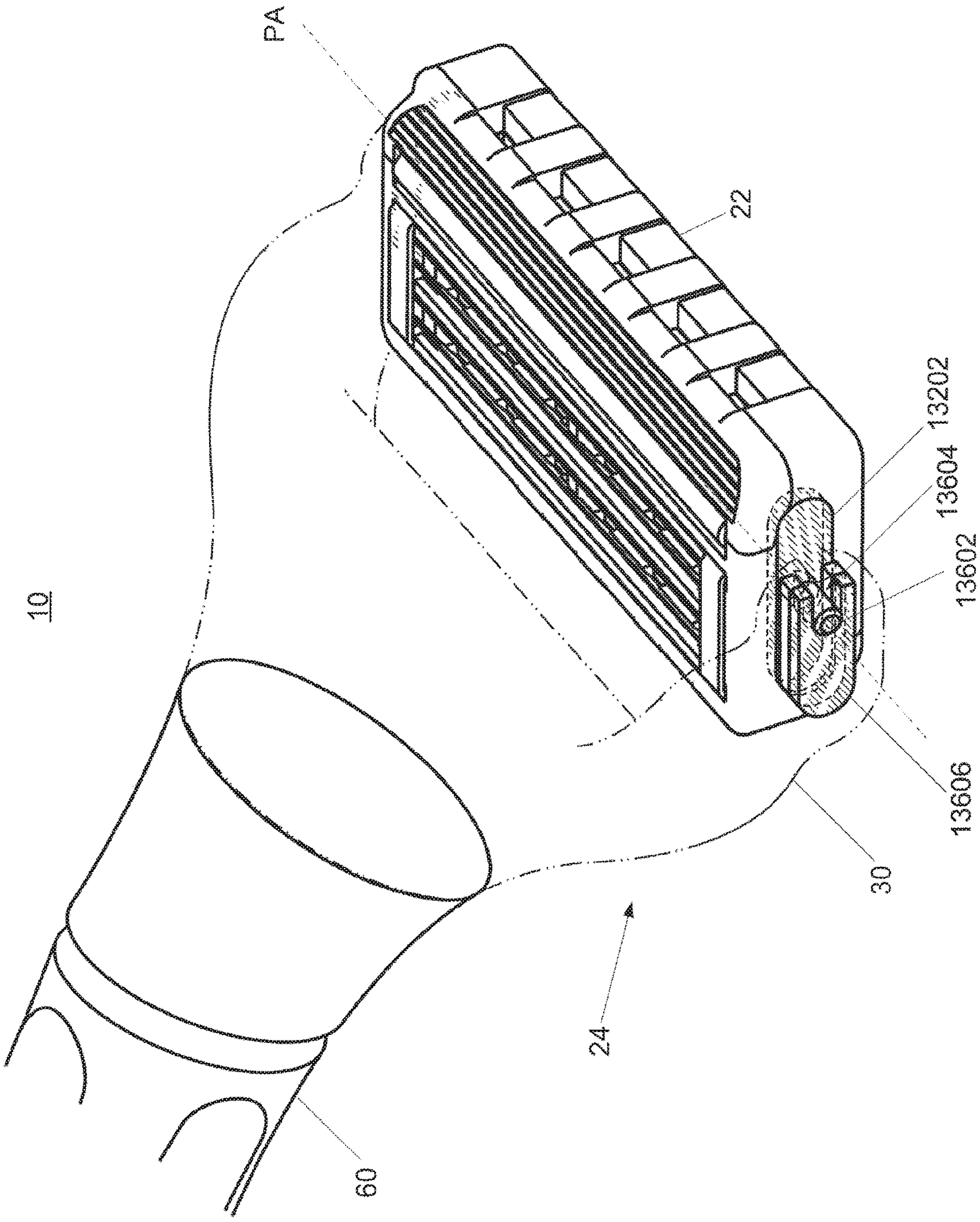
Figure 137:
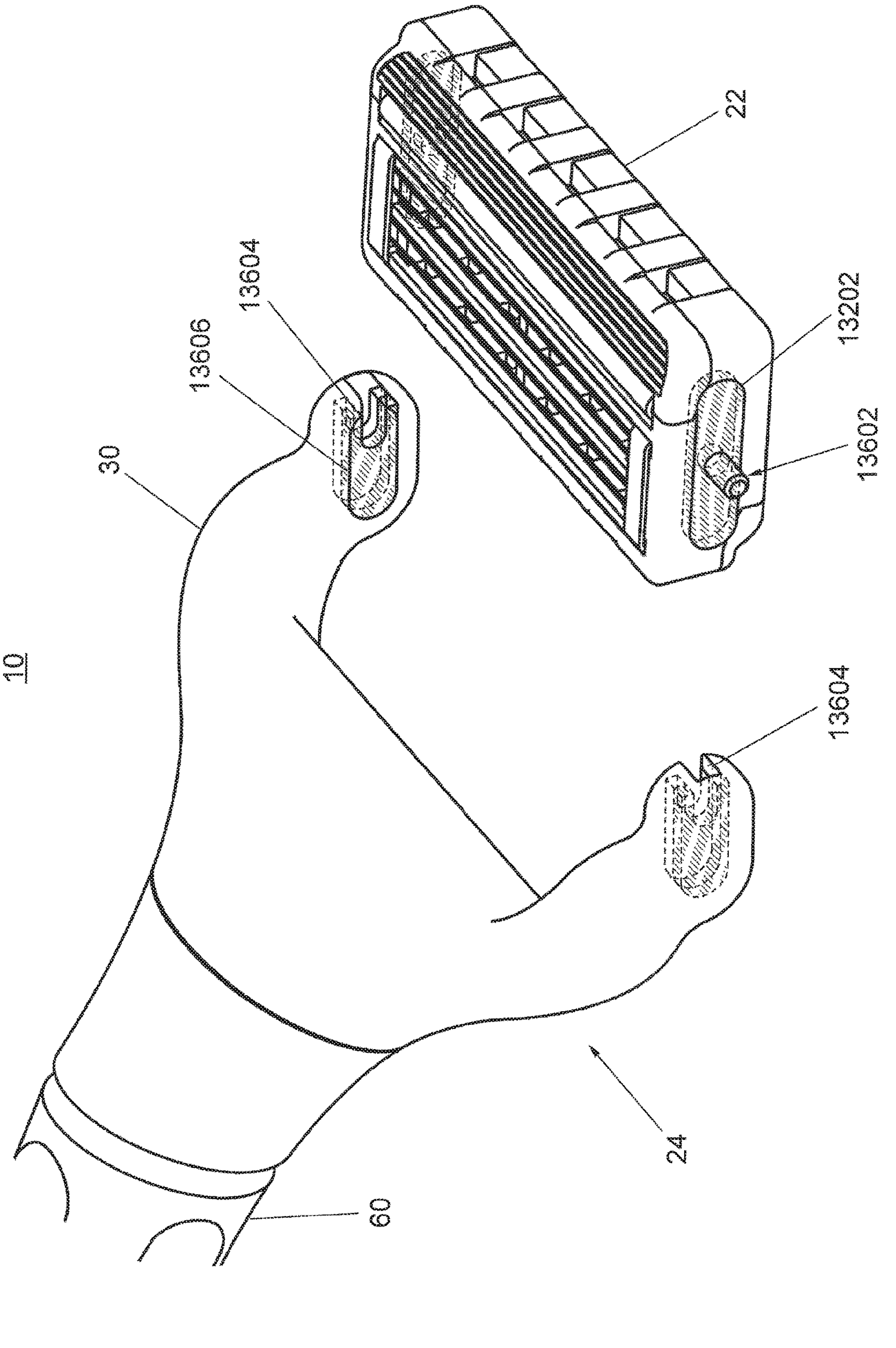
Figure 138:
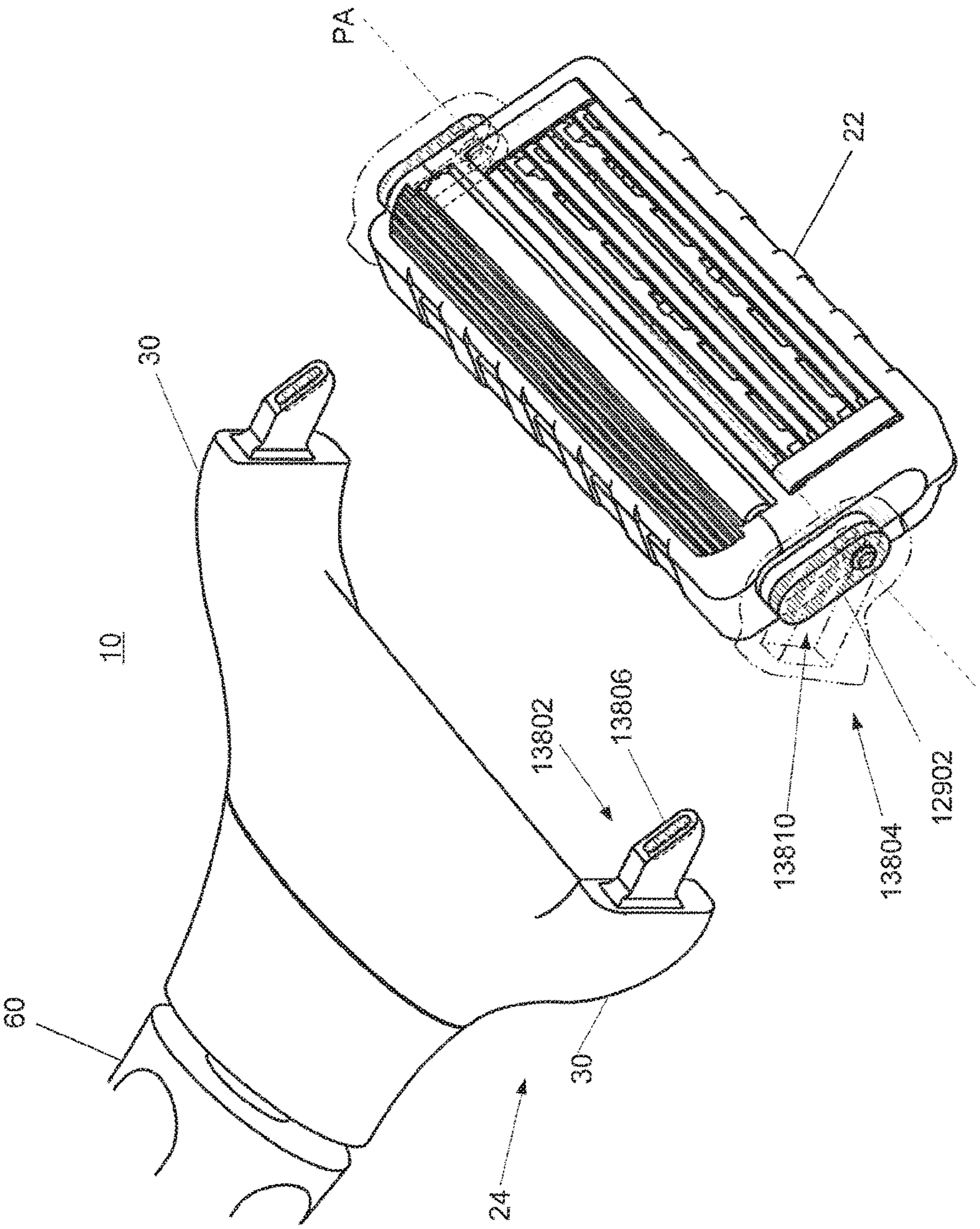
Figure 139:
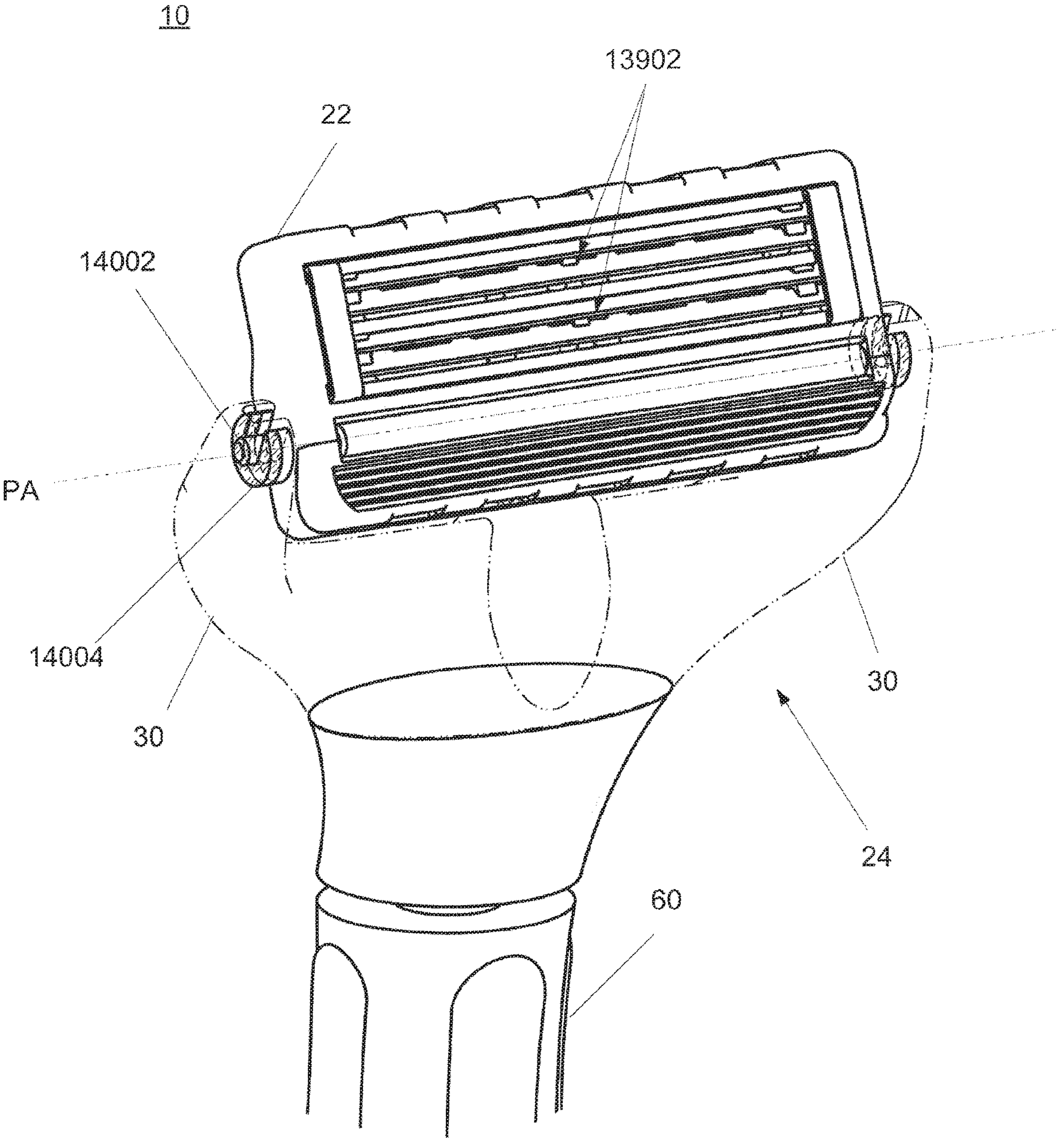
Figure 140:
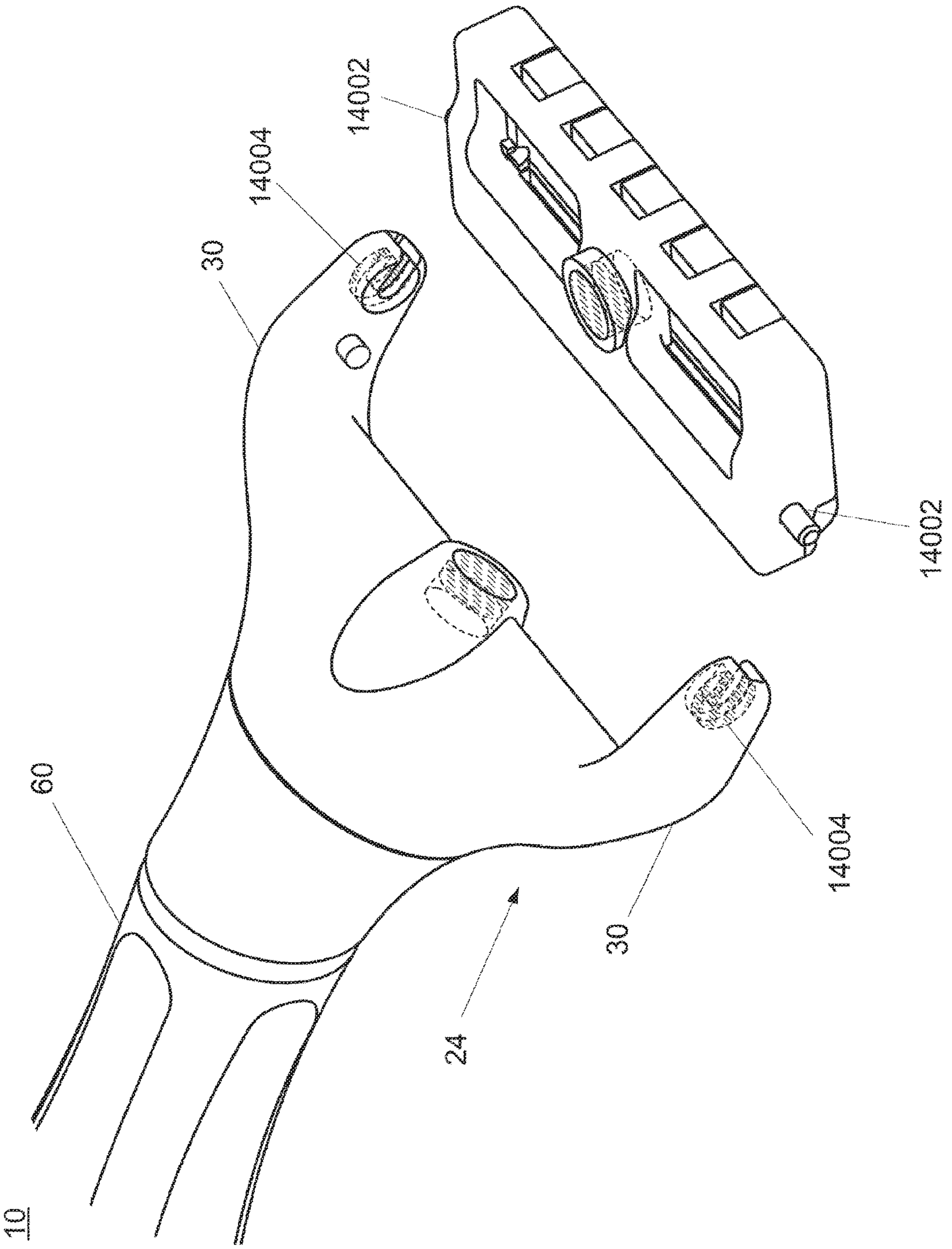
Figure 141:
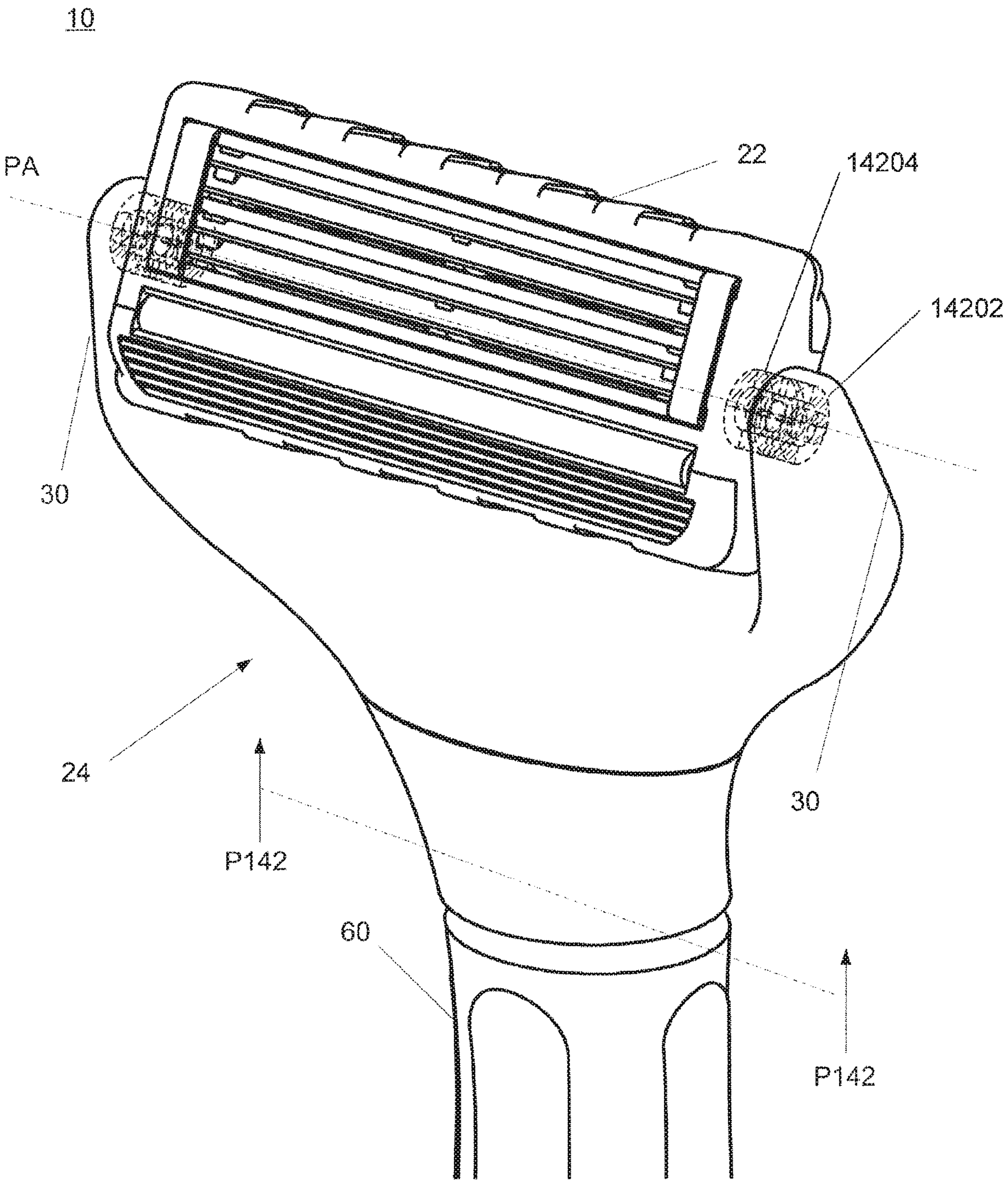
Figure 142:
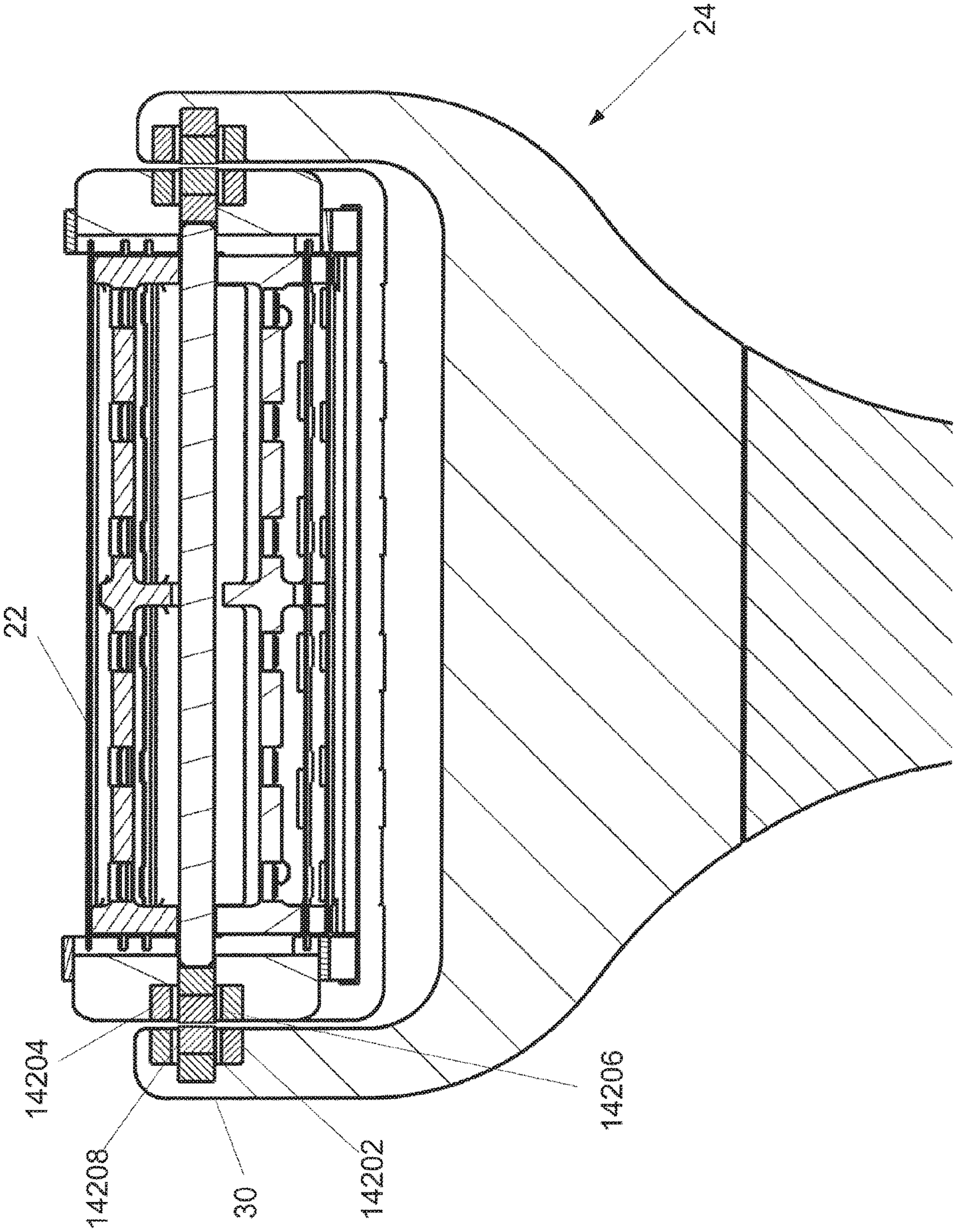
Figure 143:
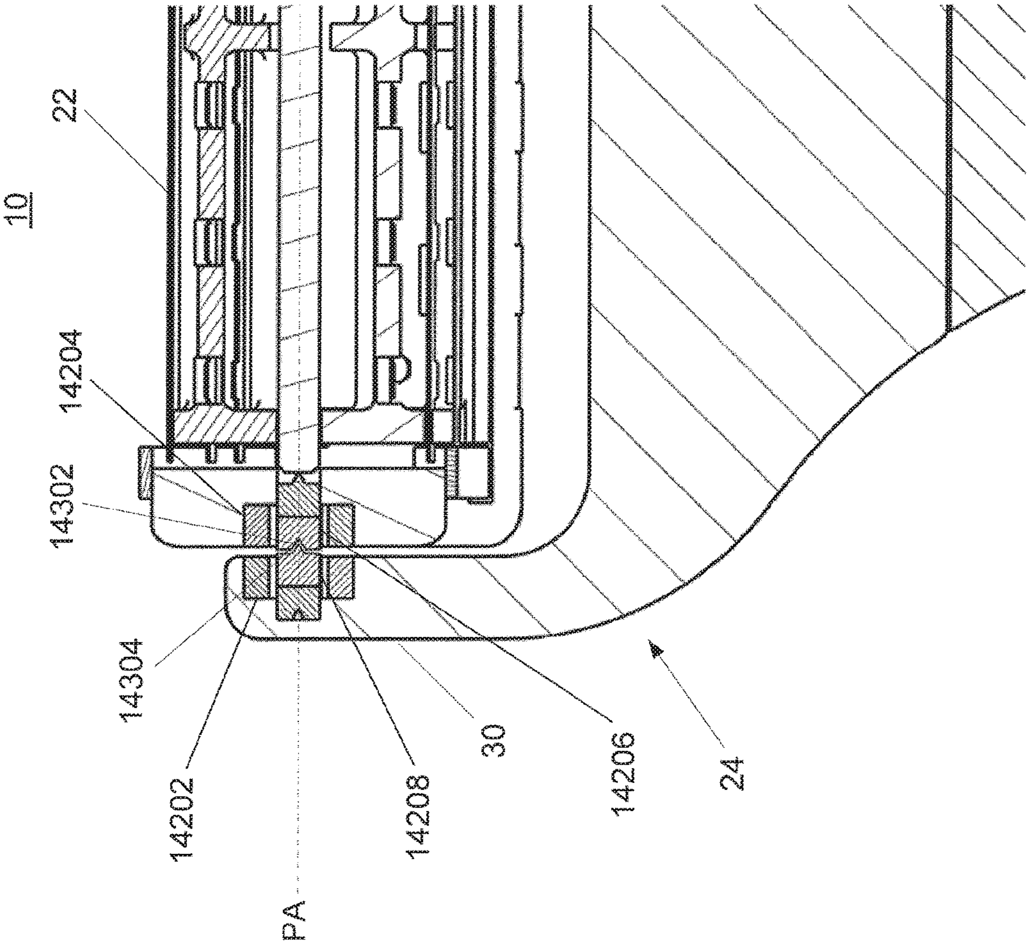
Figure 144D:
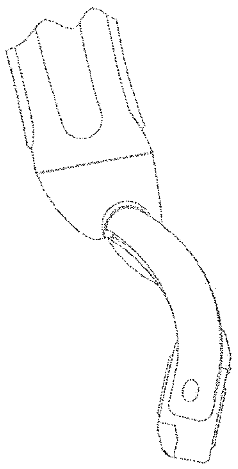
Figure 144E:
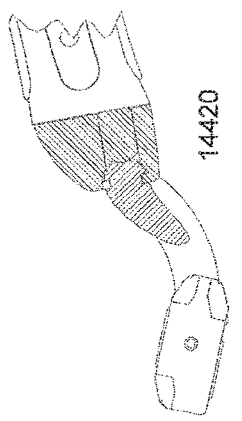
Figure 144C:
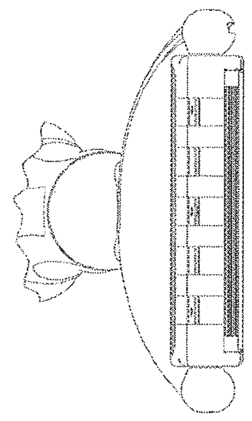
Figure 144B:
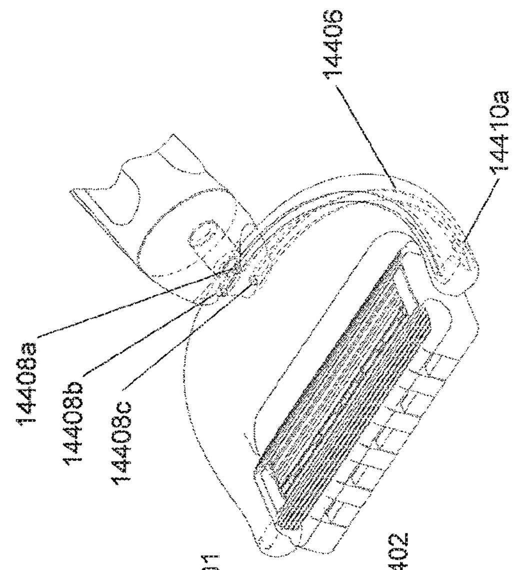
Figure 144A:
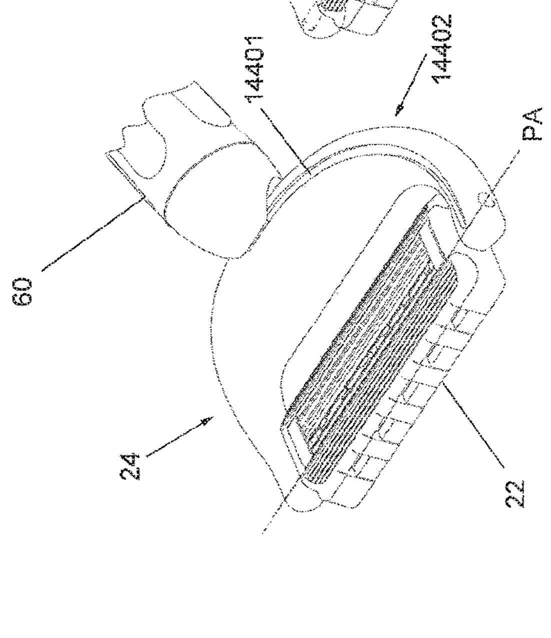
Figure 145D:
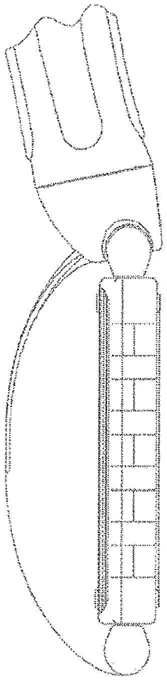
Figure 145E:
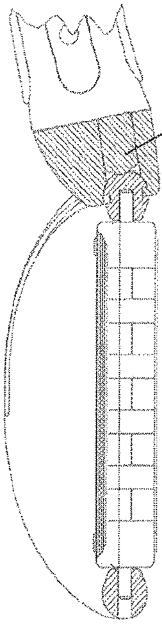
Figure 145B:
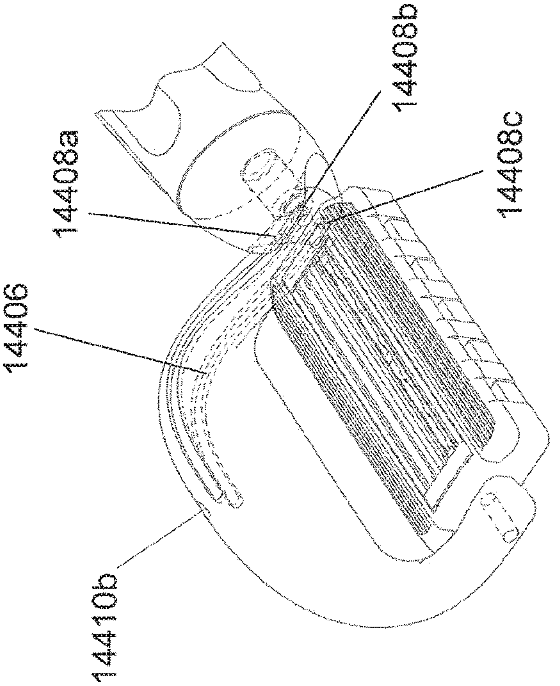
Figure 145C:
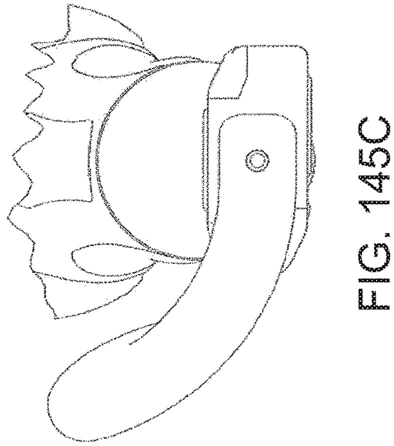
Figure 145A:
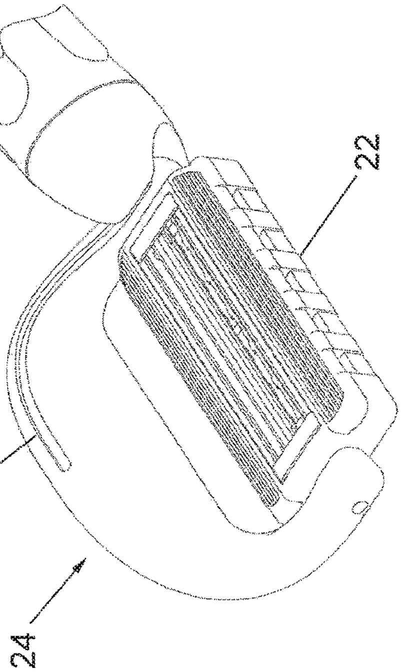
Figure 146C:
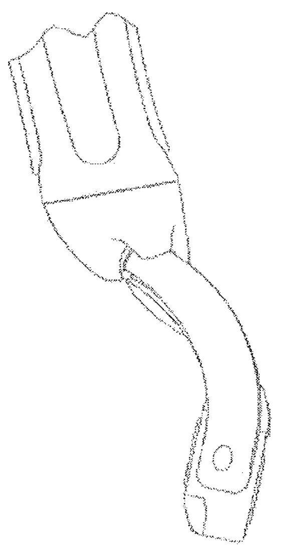
Figure 146B:
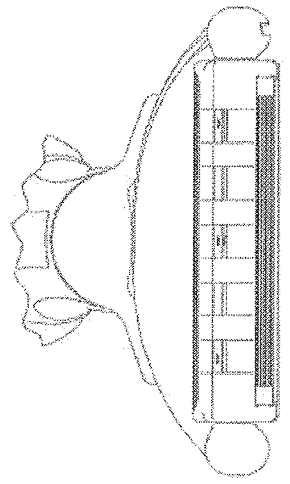
Figure 146A:
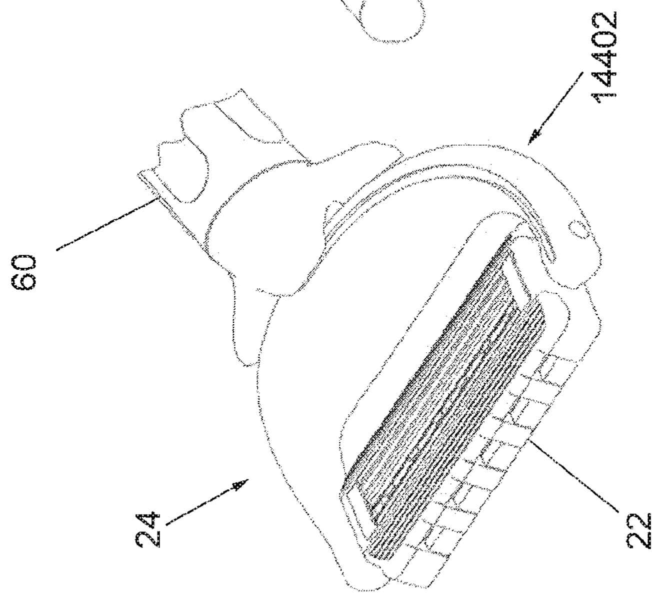
Figure 147:
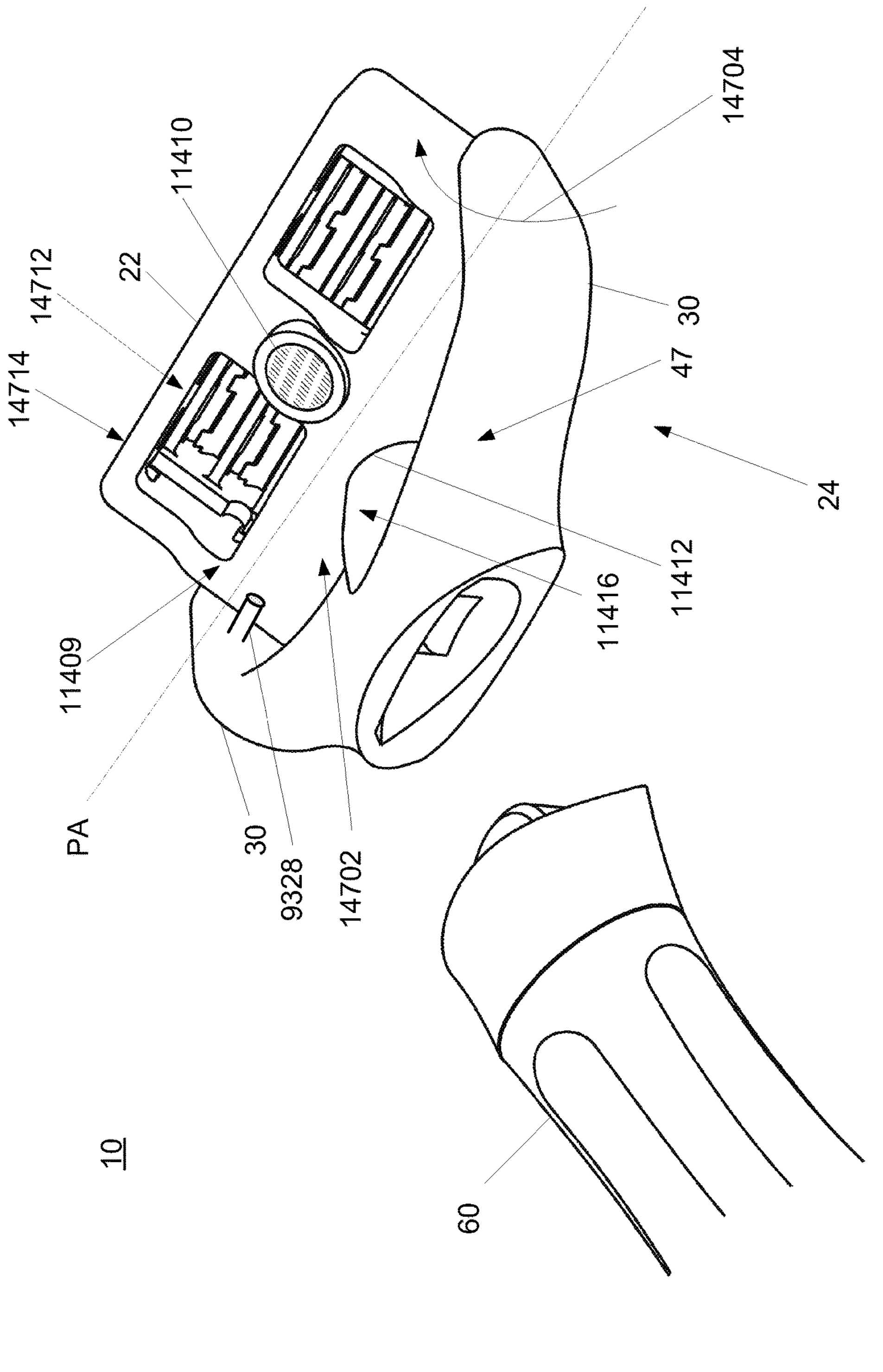
Figure 148:
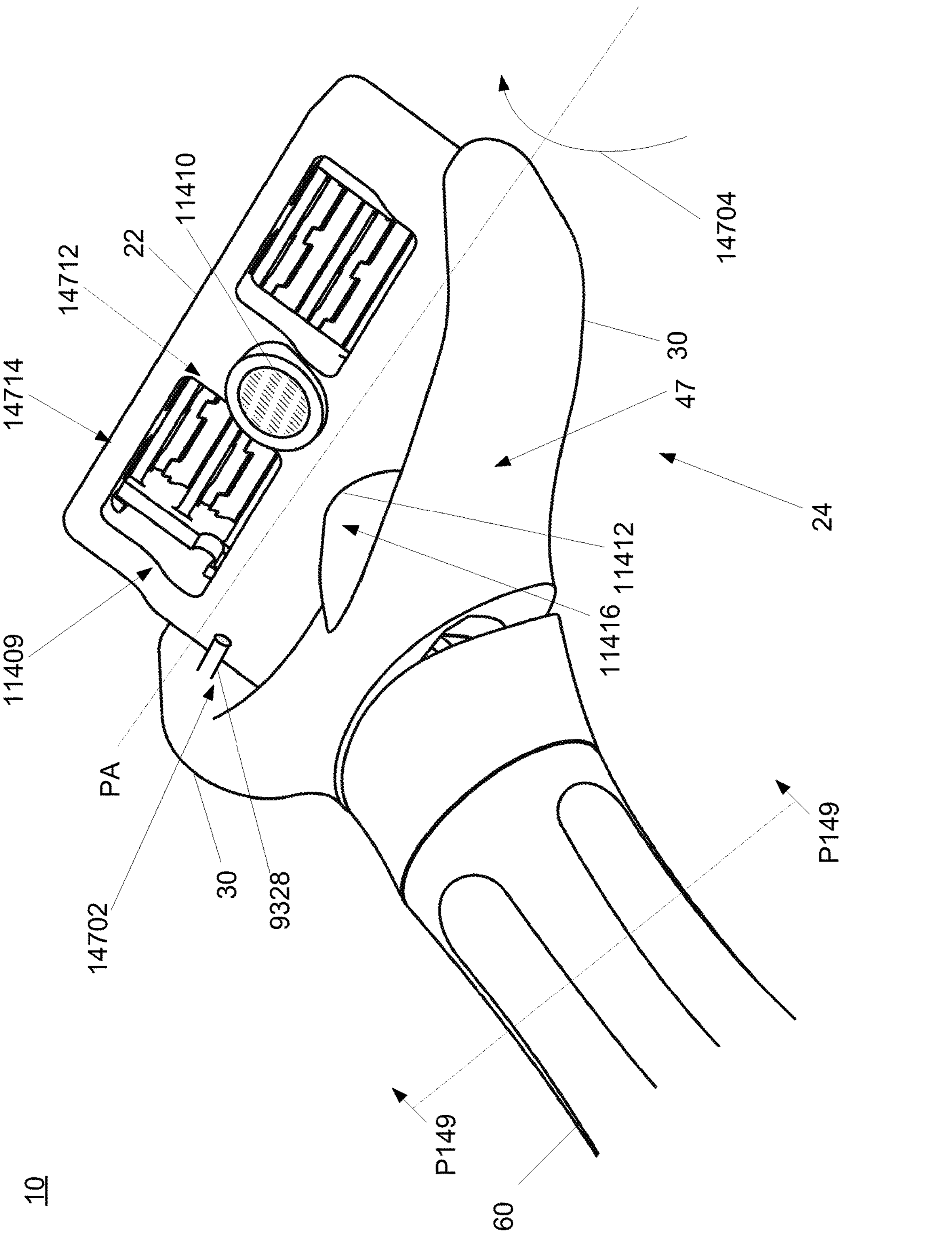
Figure 149:
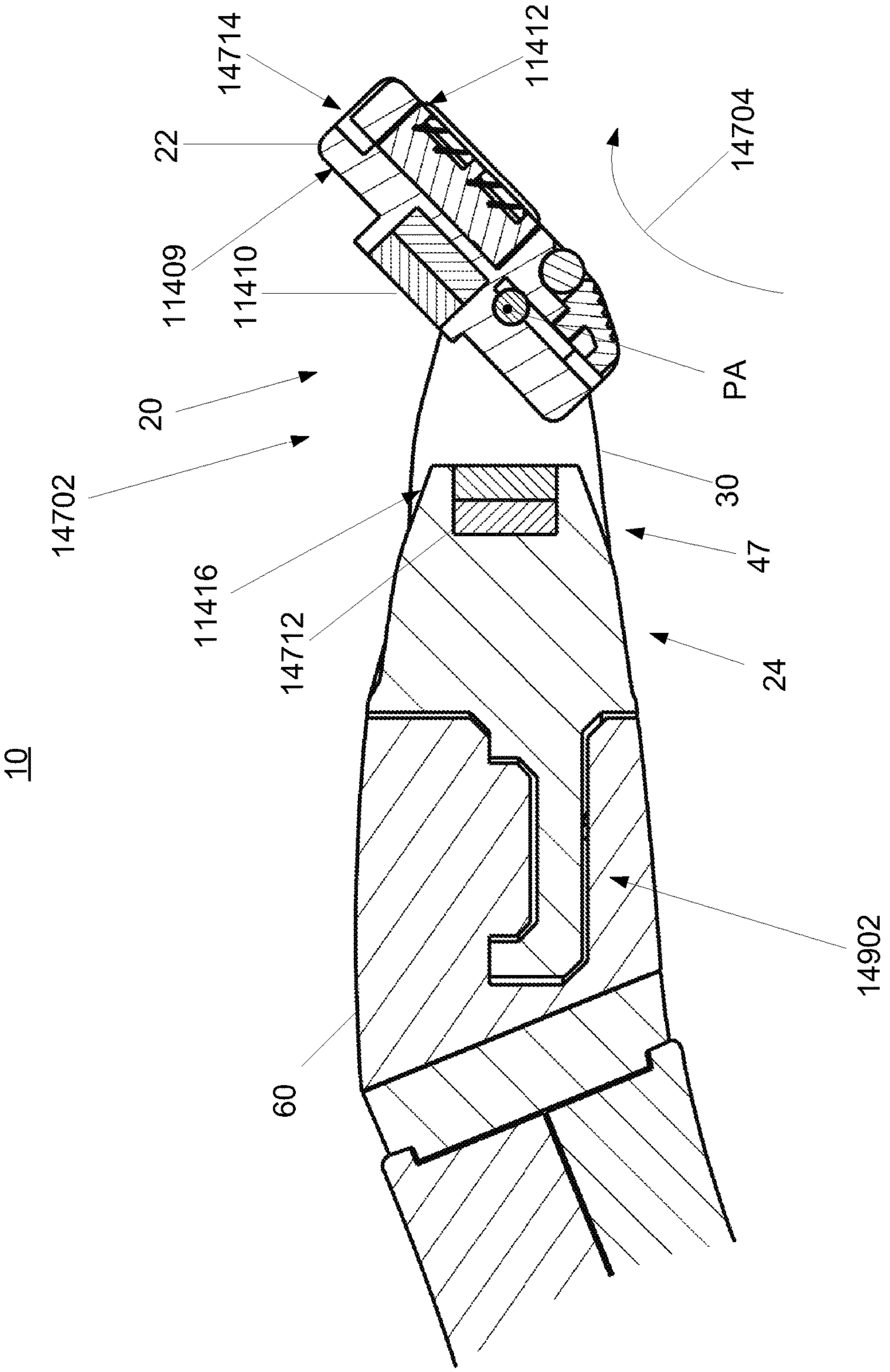
Figure 150:
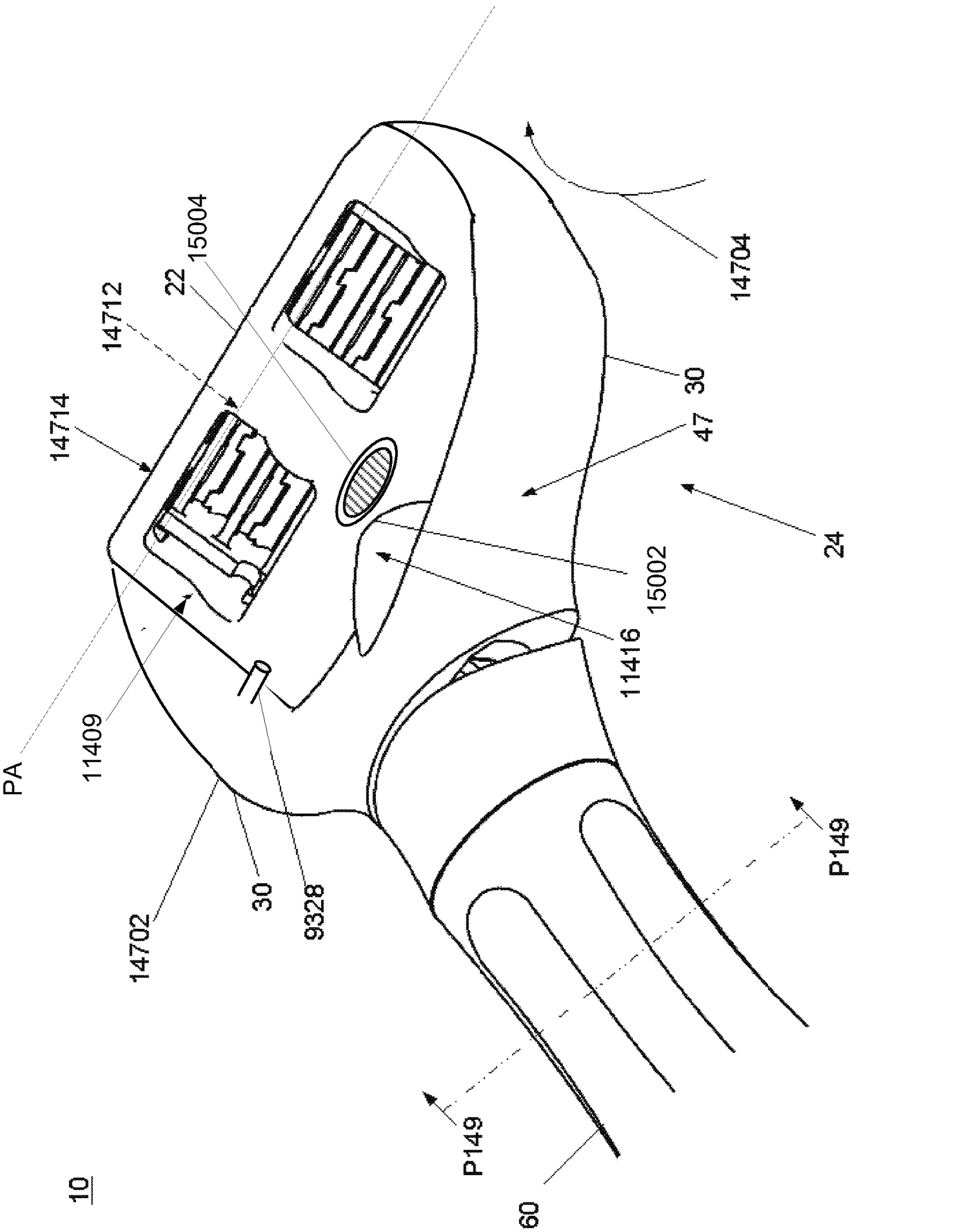
Figure 151:
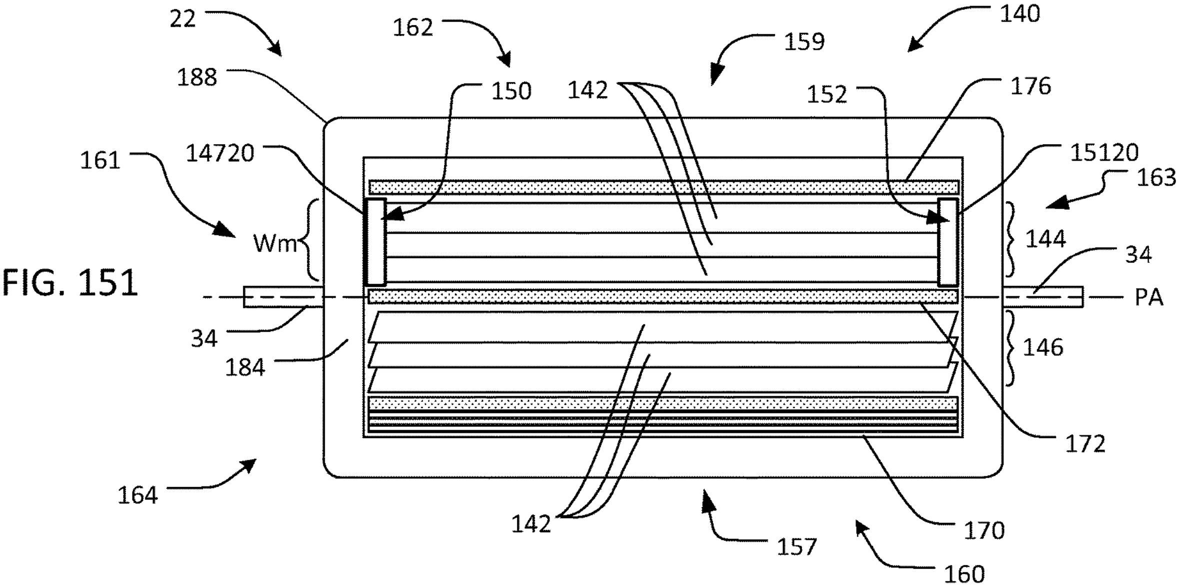
Figure 152:
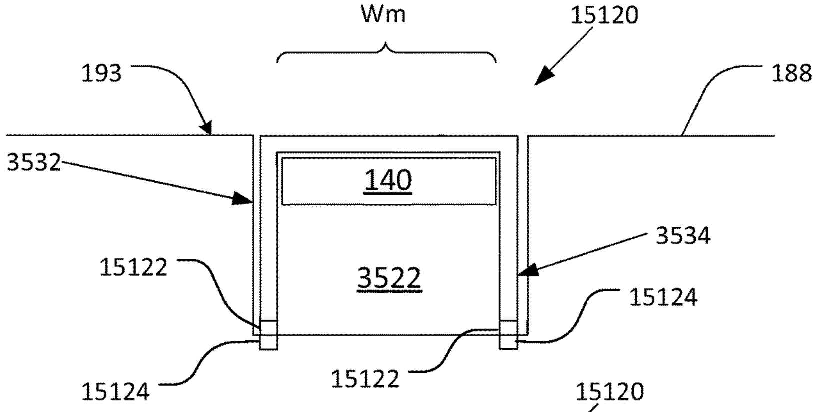
Figure 153A:
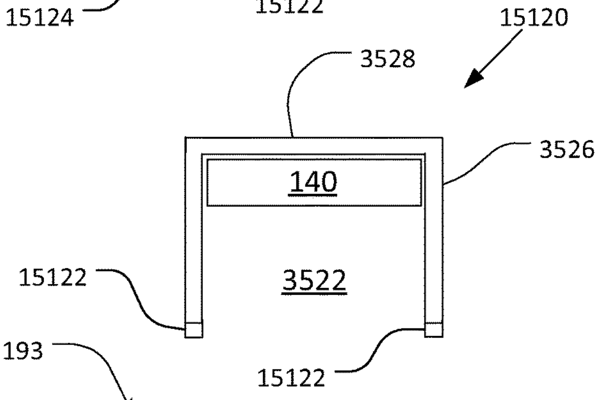
Figure 153B:
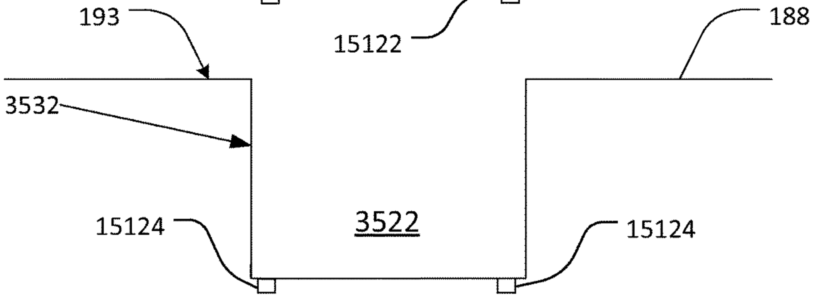
Figure 154:
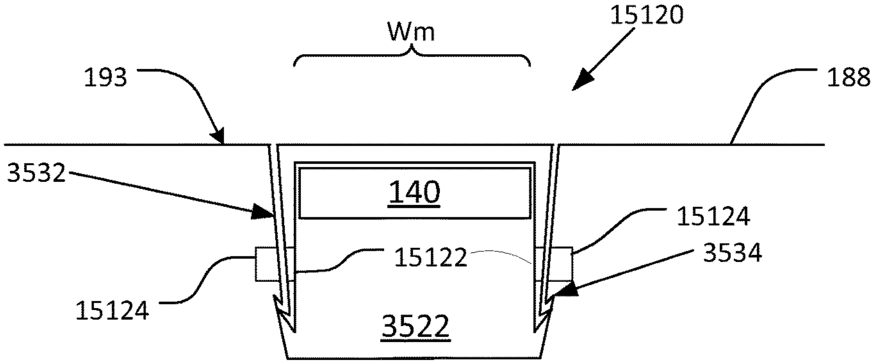
Figure 155A:
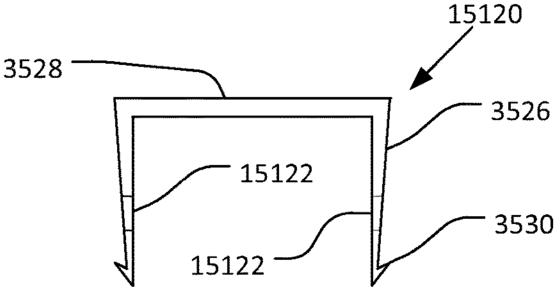
Figure 155B:
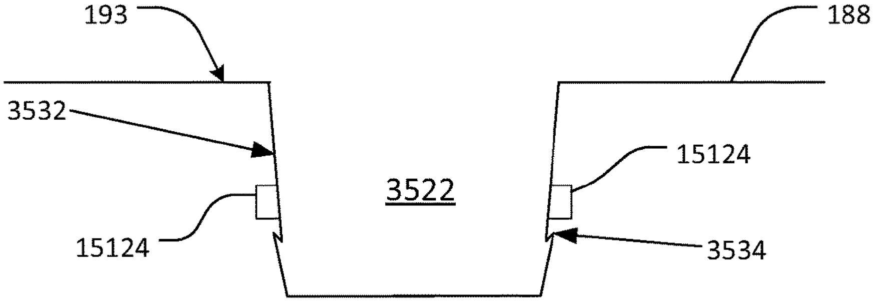
Figure 156:
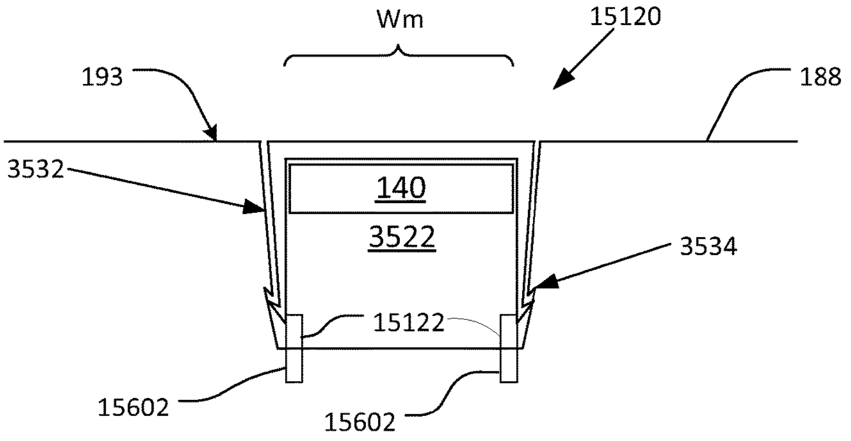
Figure 157A:
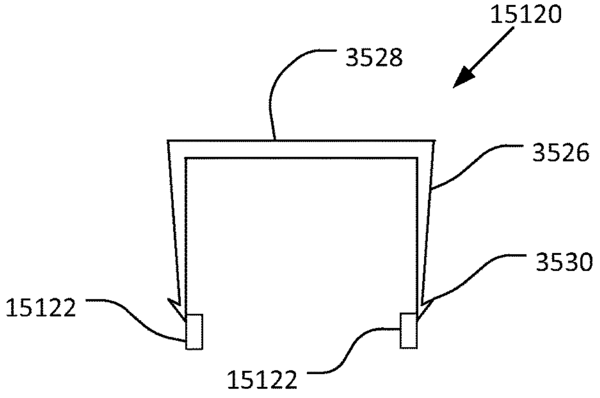
Figure 157B:
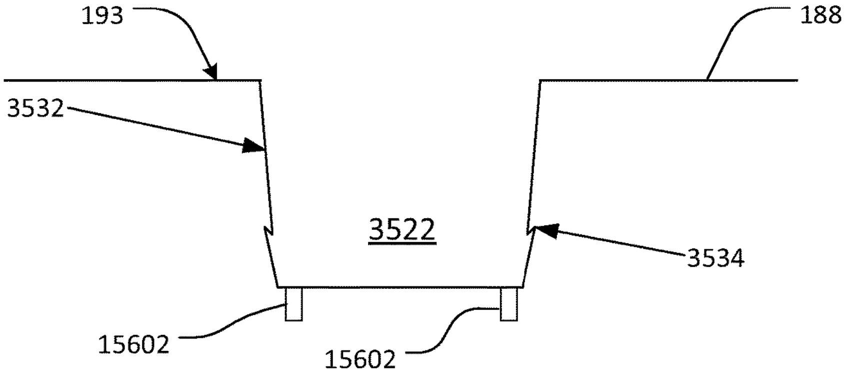
Figure 158:
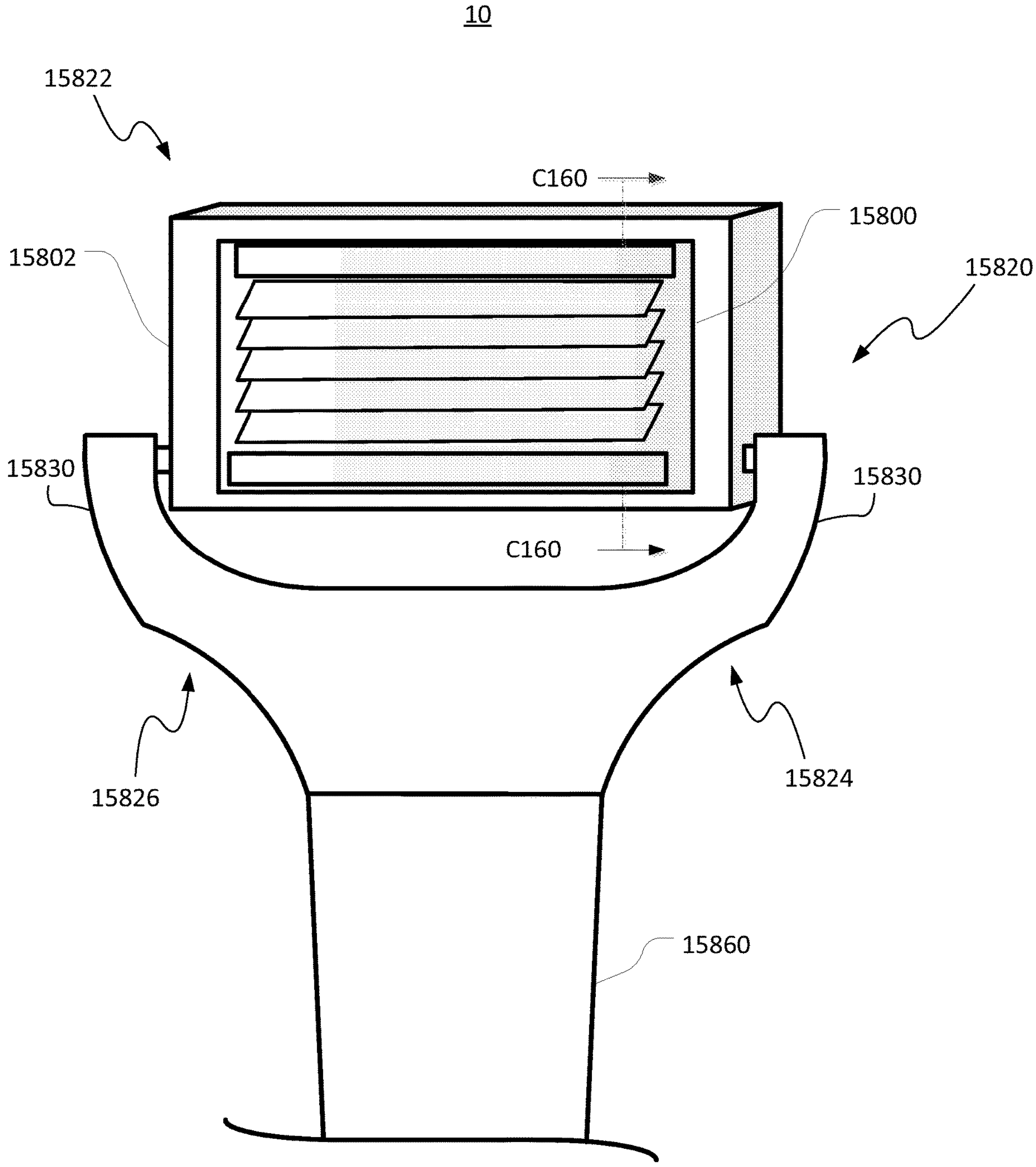
Figure 159:
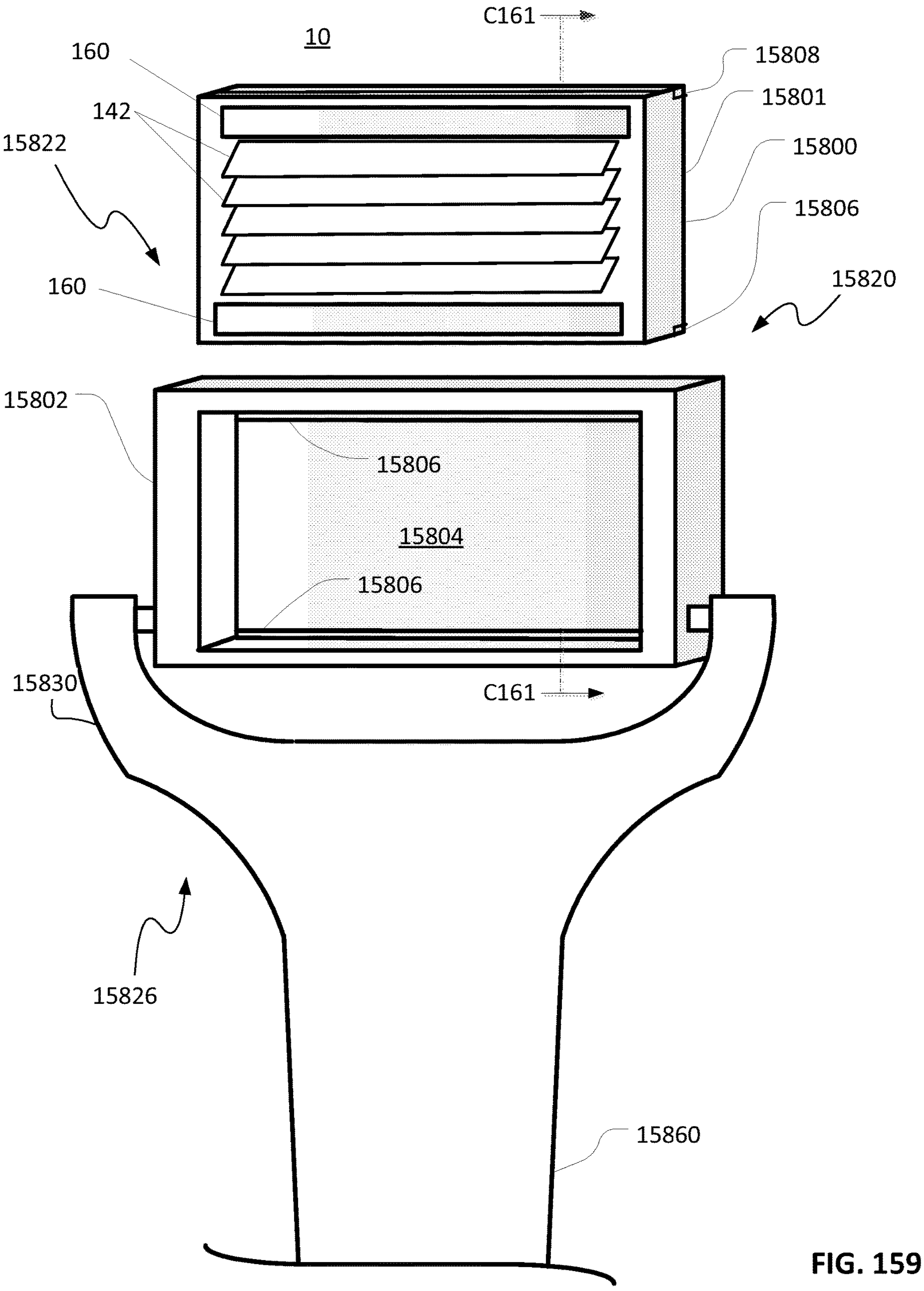
Figure 162:
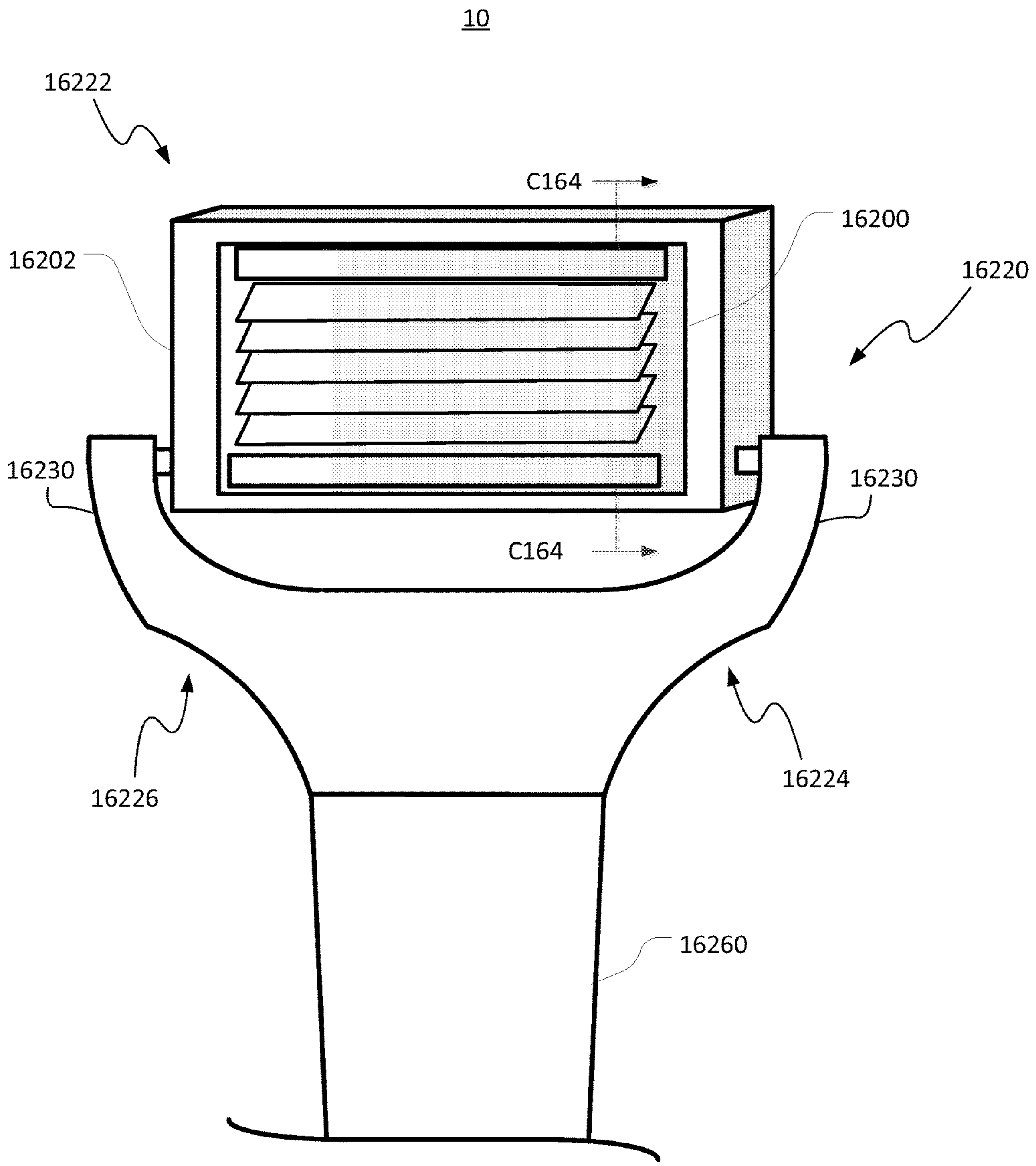
Figure 163:
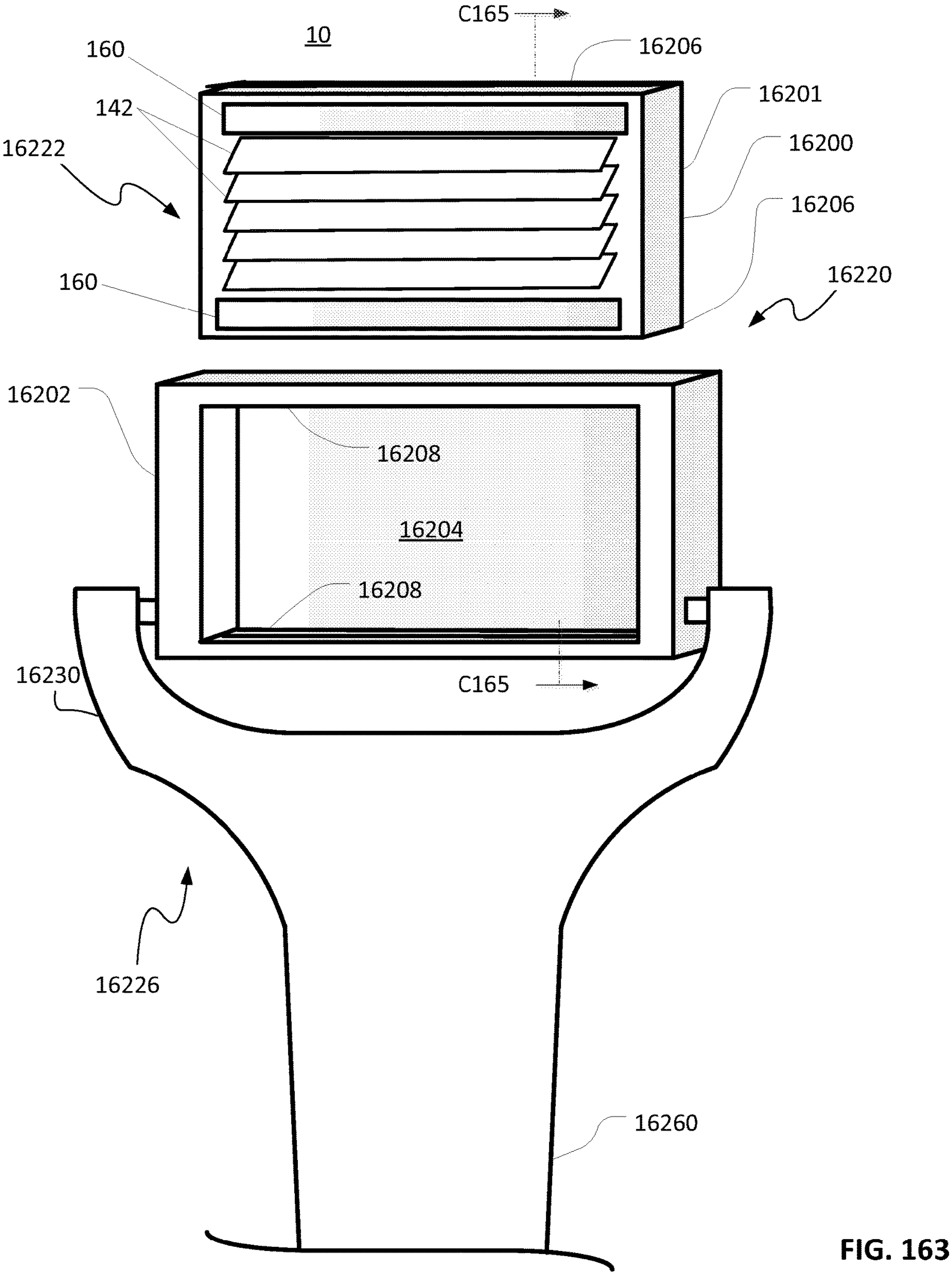
Figure 166:
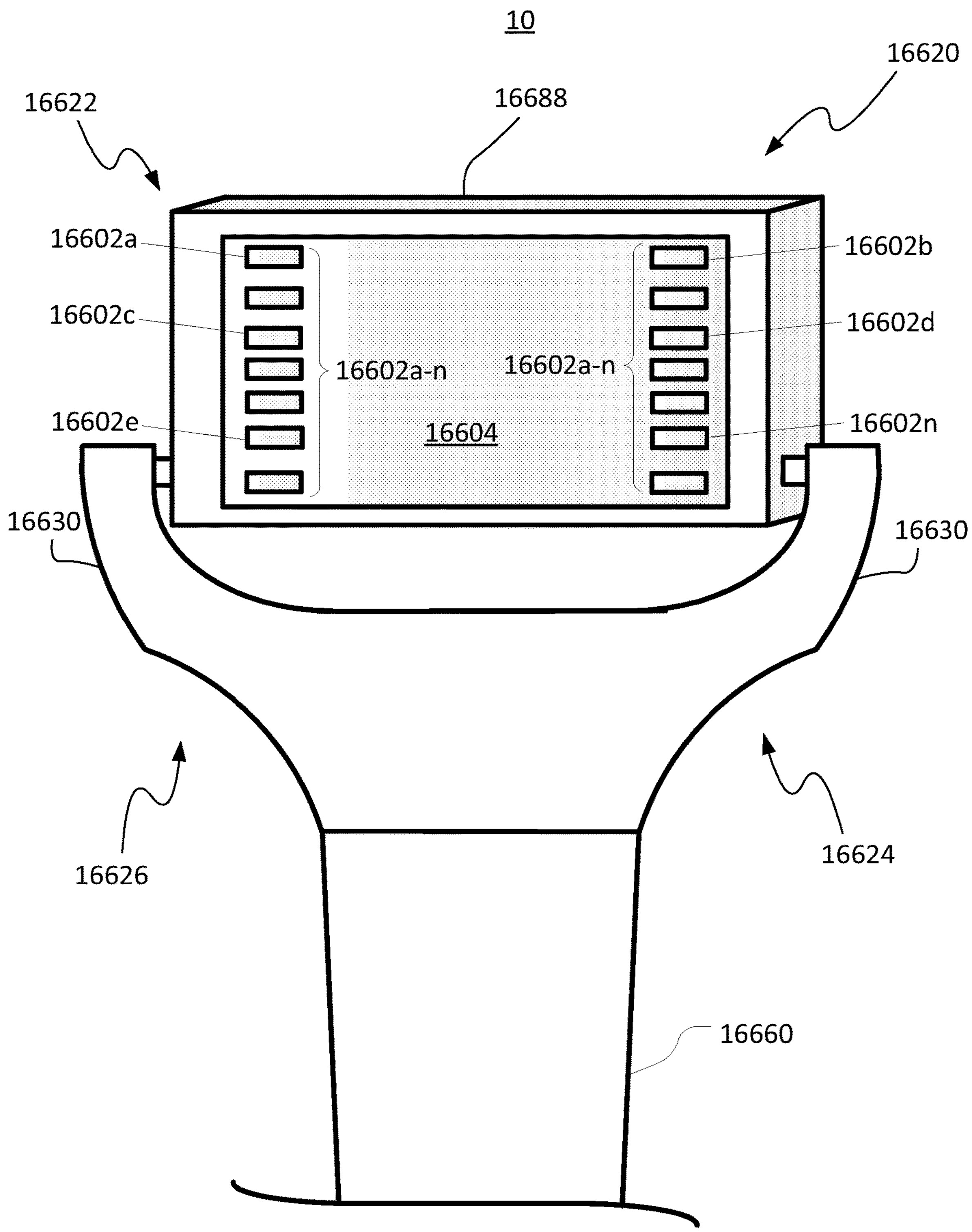
Figure 167:
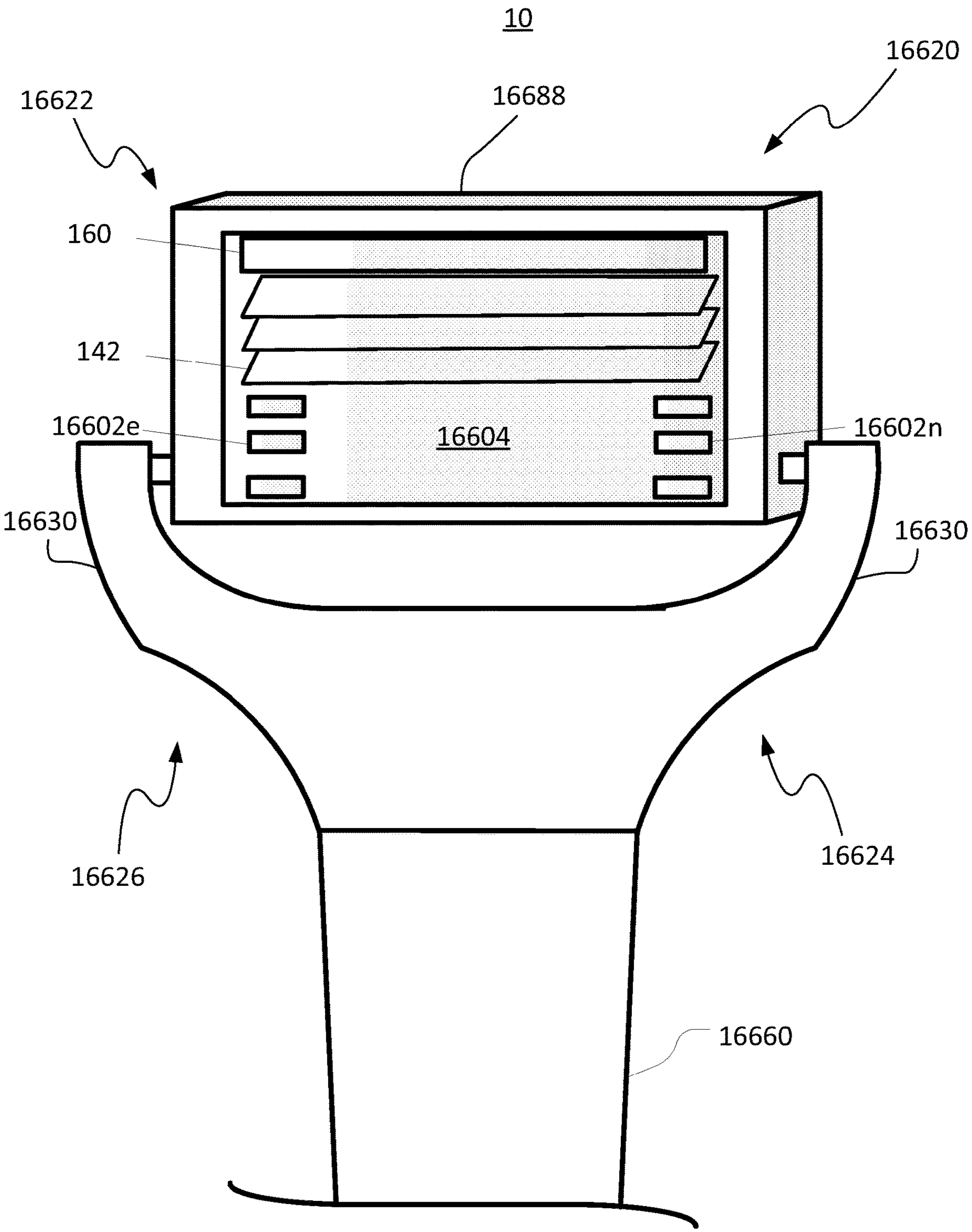
Figure 168:
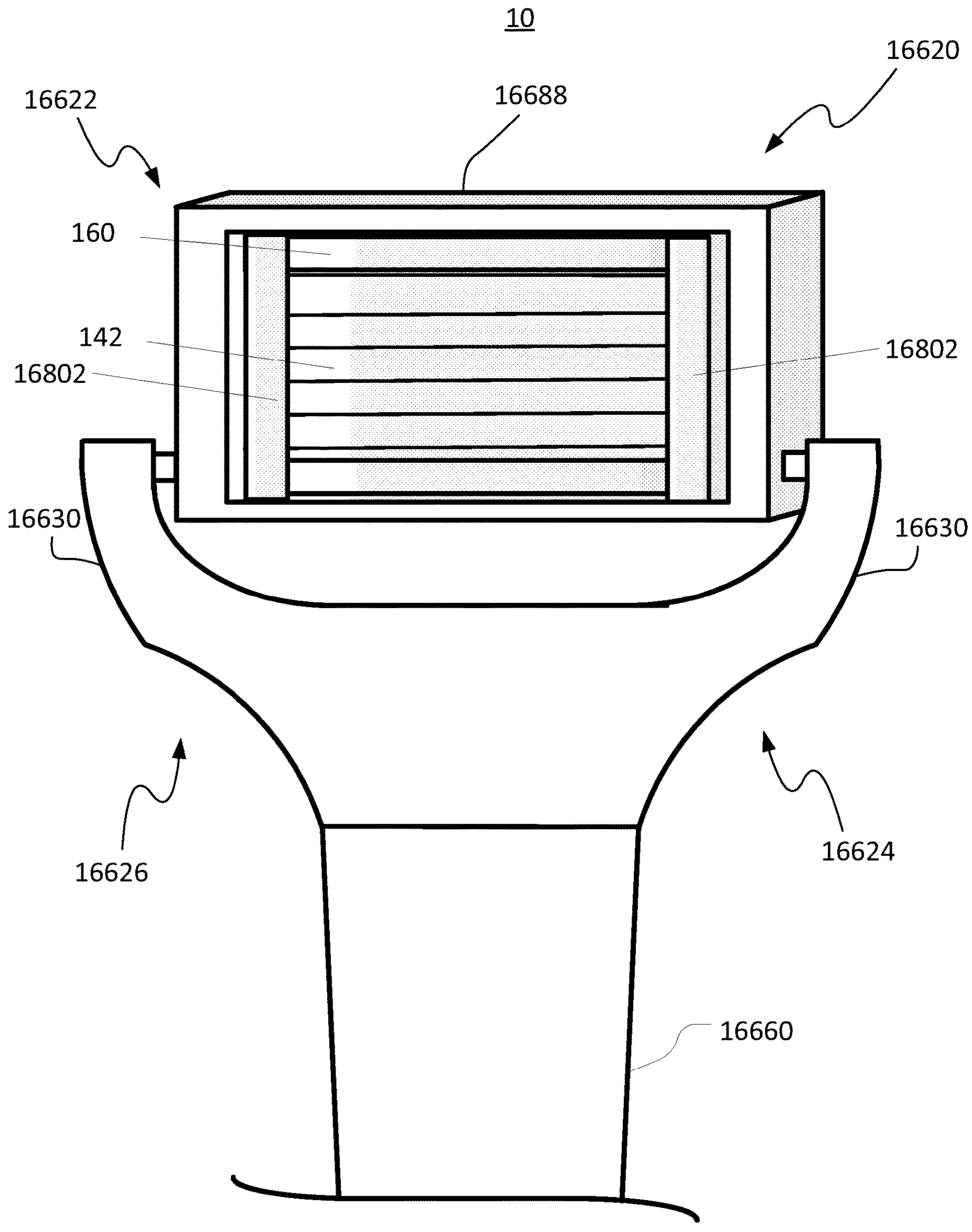
Figure 169:
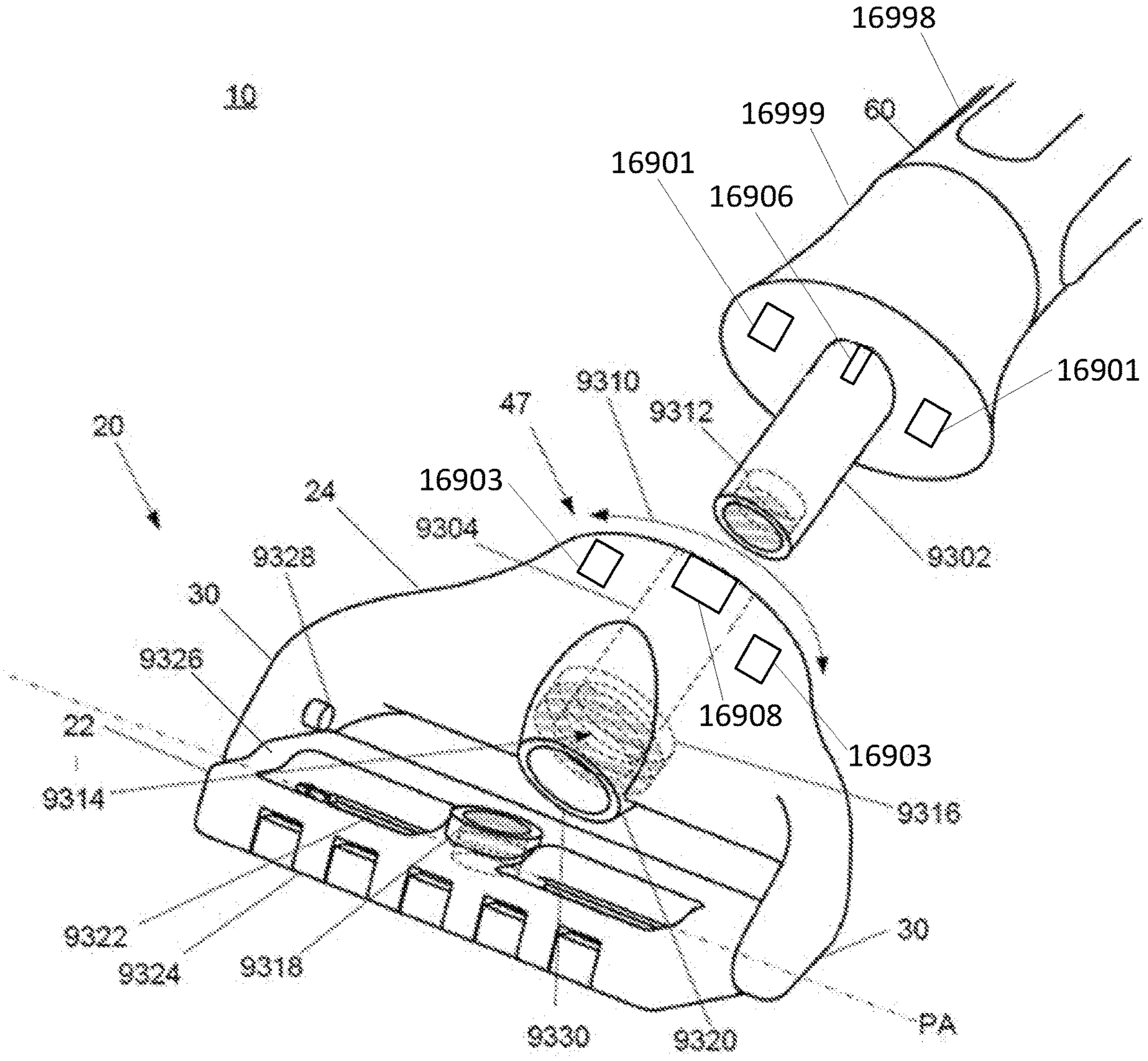
Figure 170:
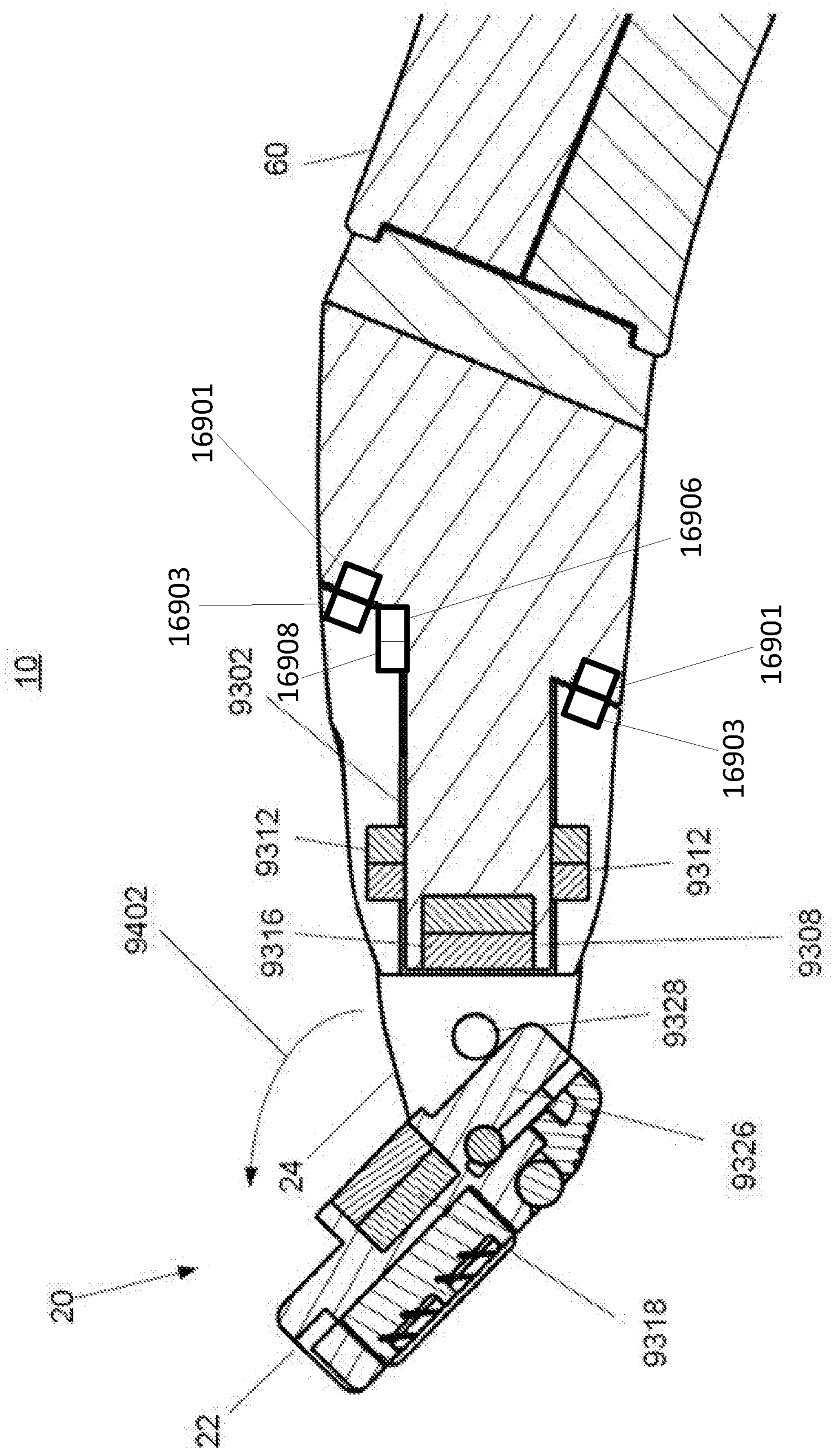
Figure 171:
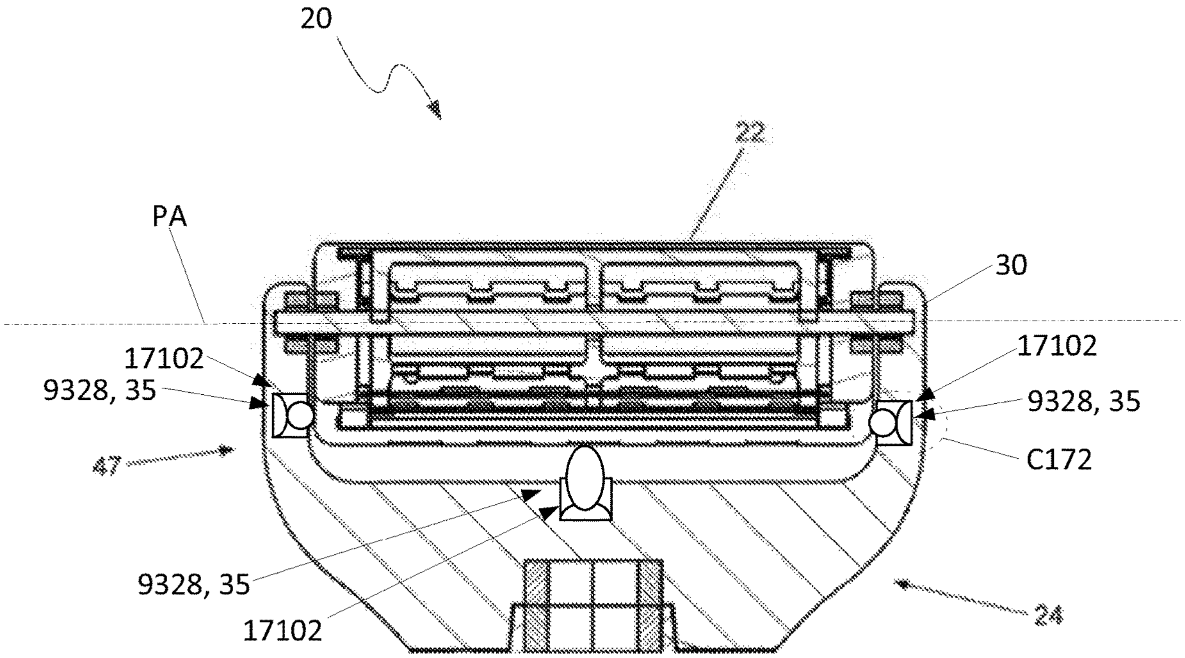
Figure 172:
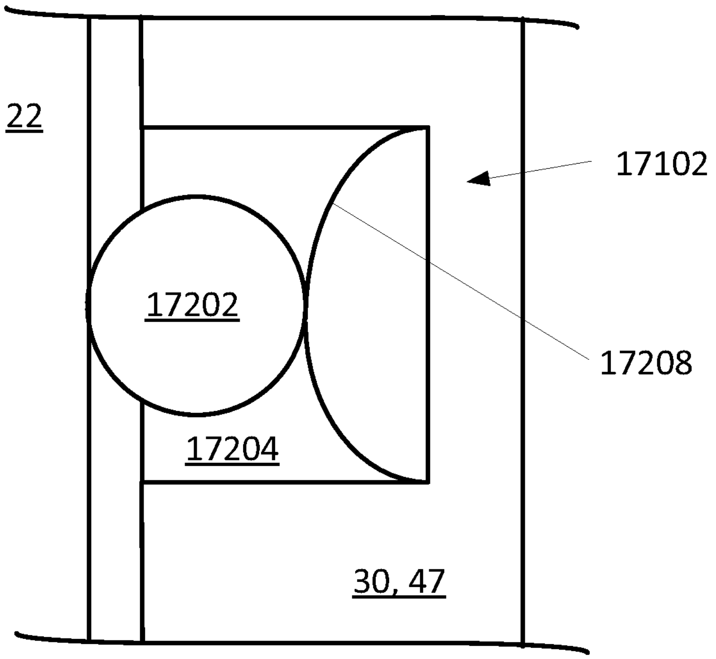
Figure 173:
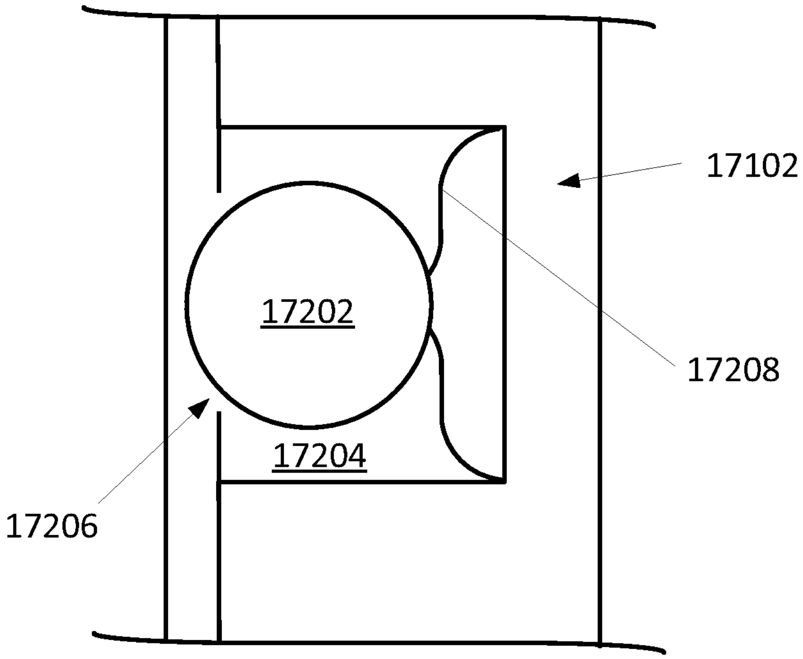
Figure 174:
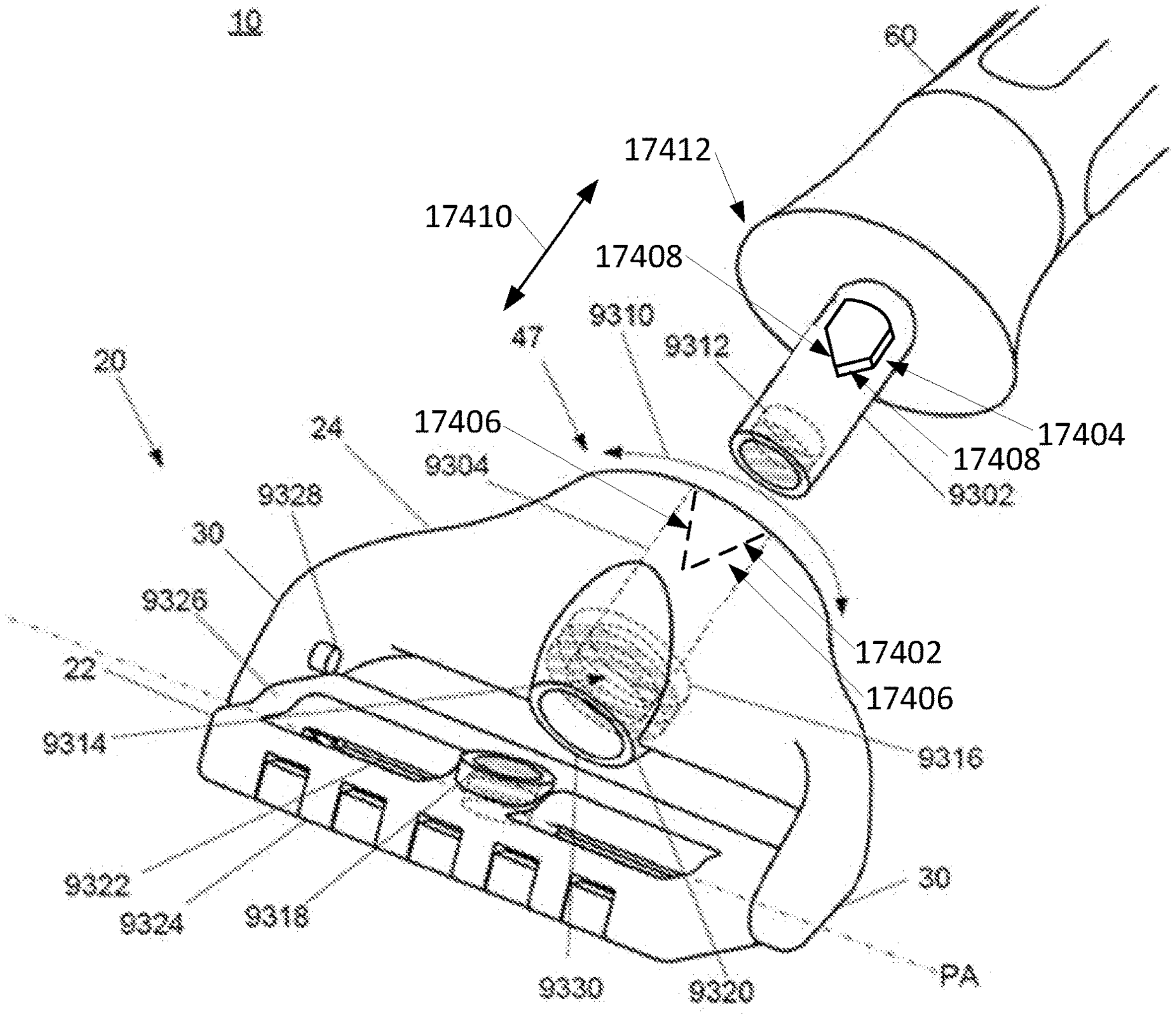
Figure 175:
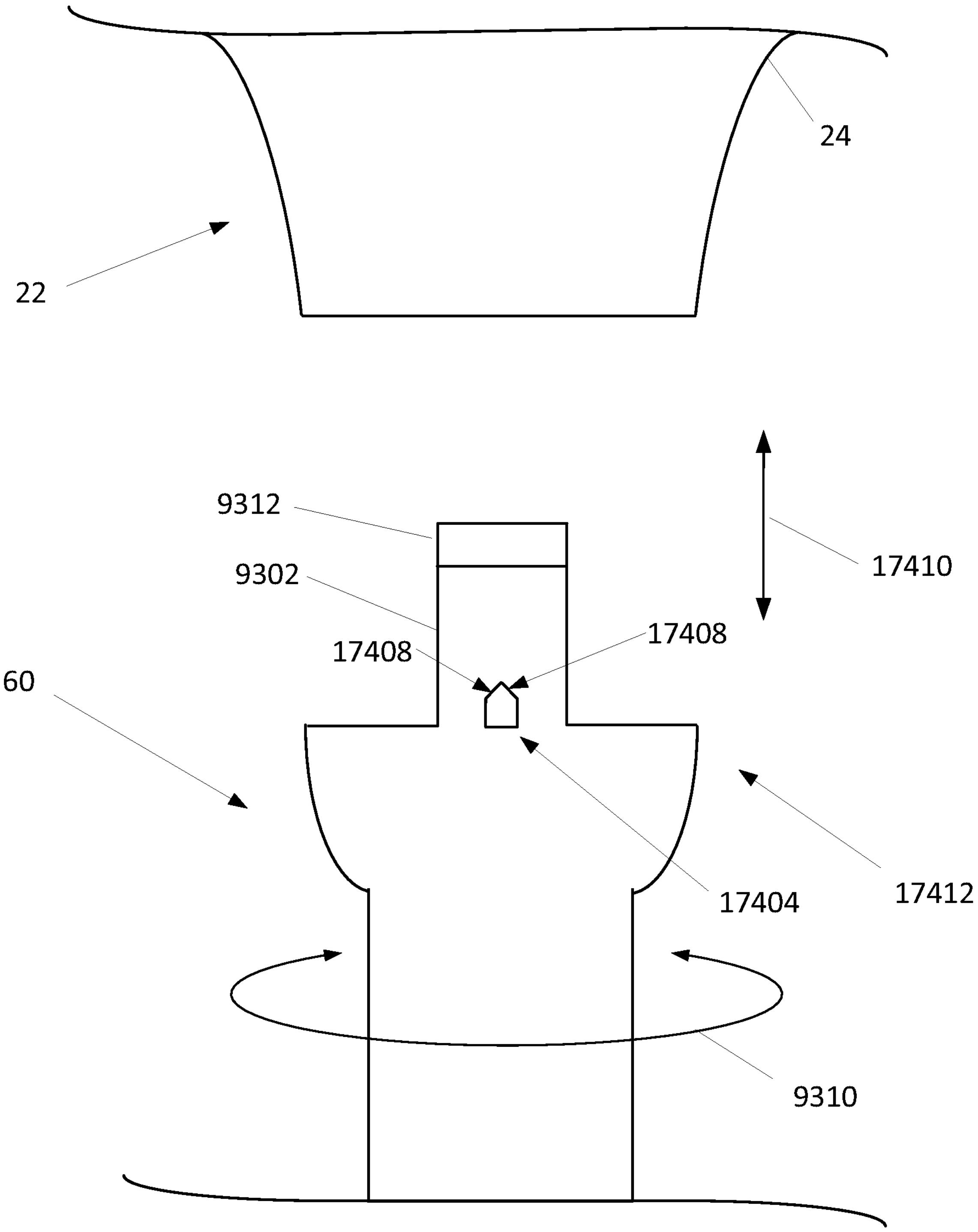
Figure 176:
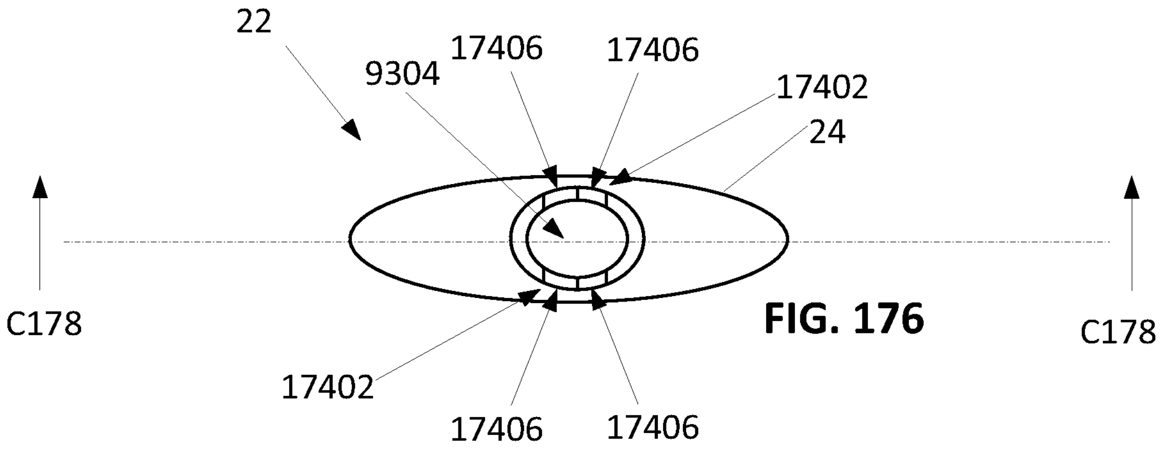
Figure 177:
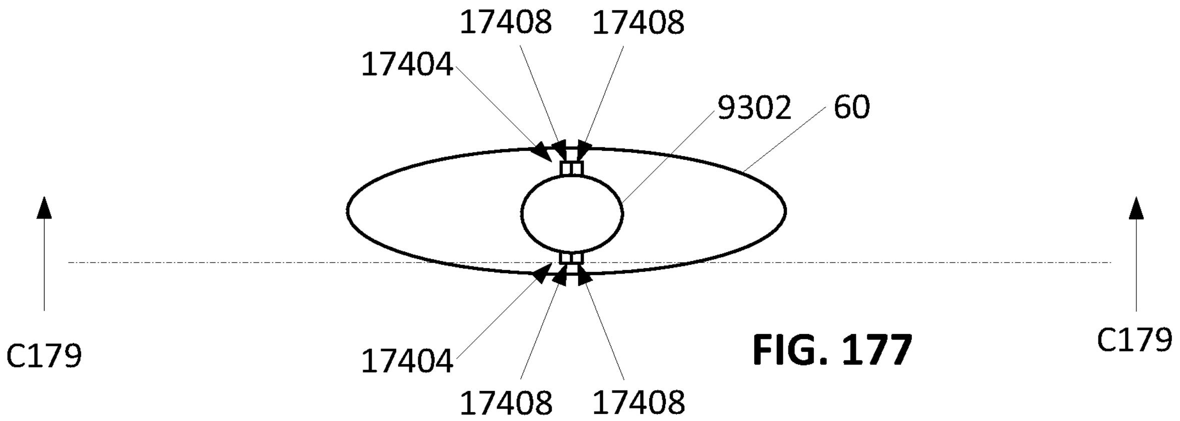
Figure 178:
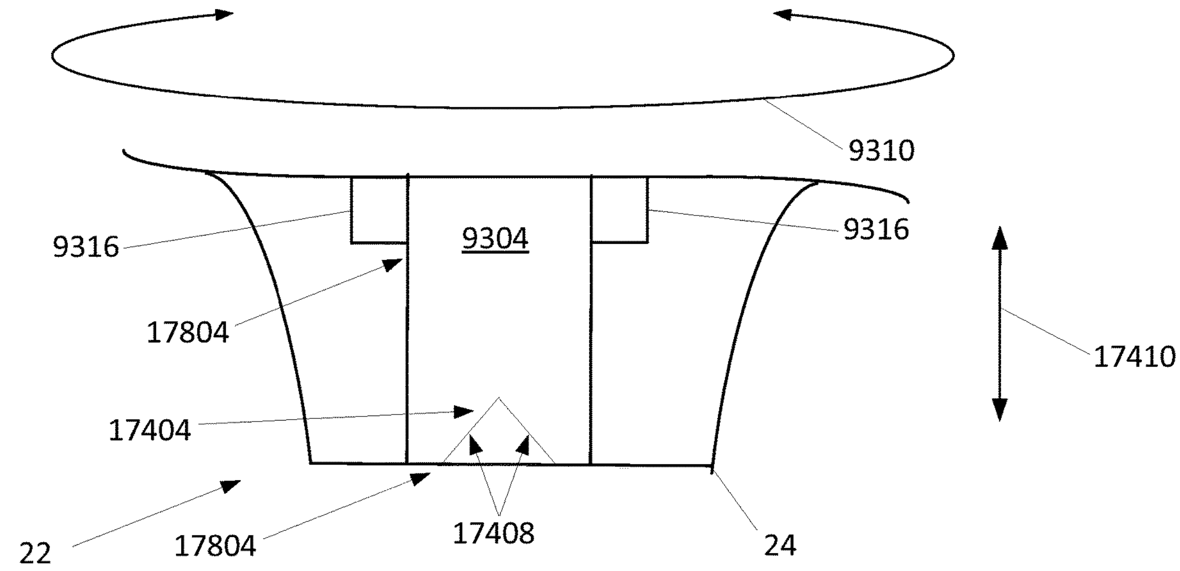
Figure 179:
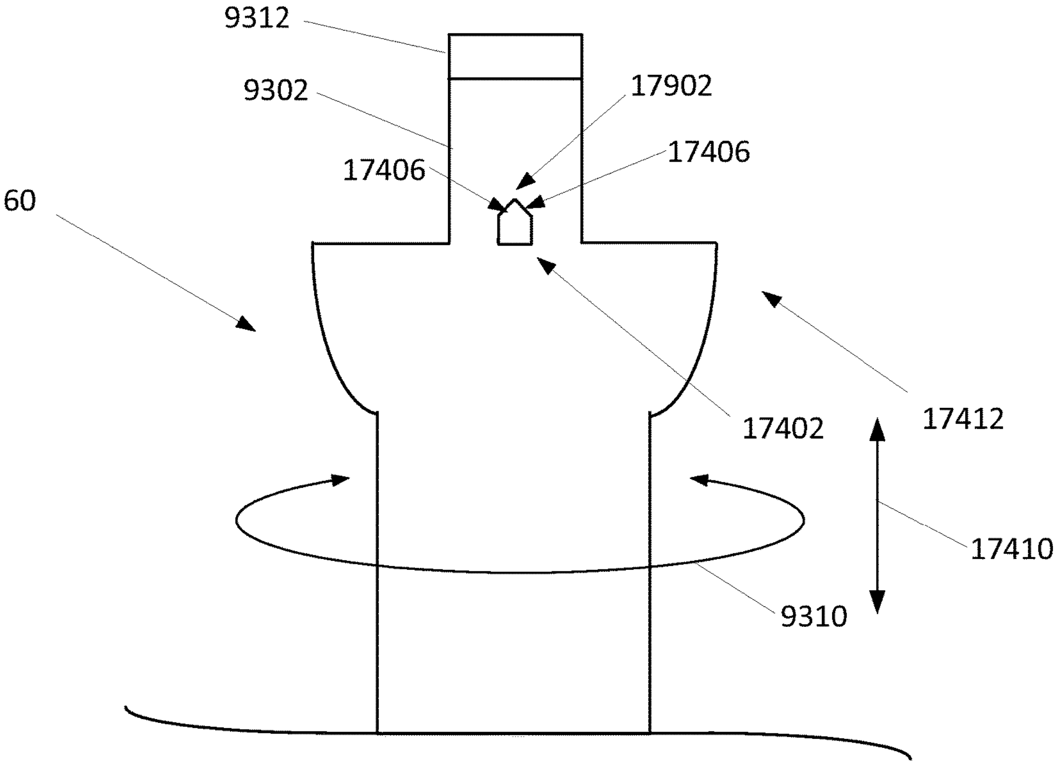
Figure 180:
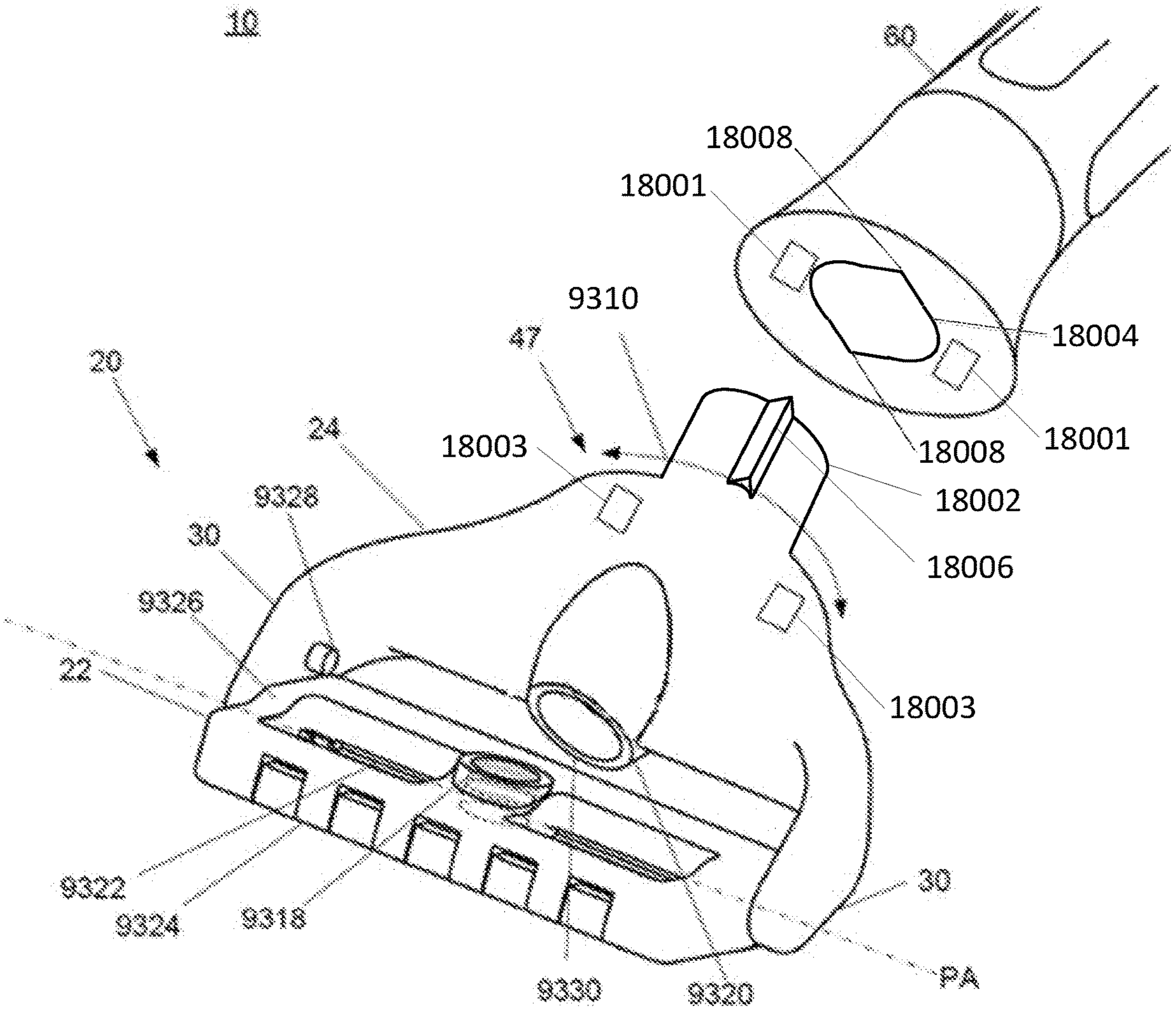
Figure 181:
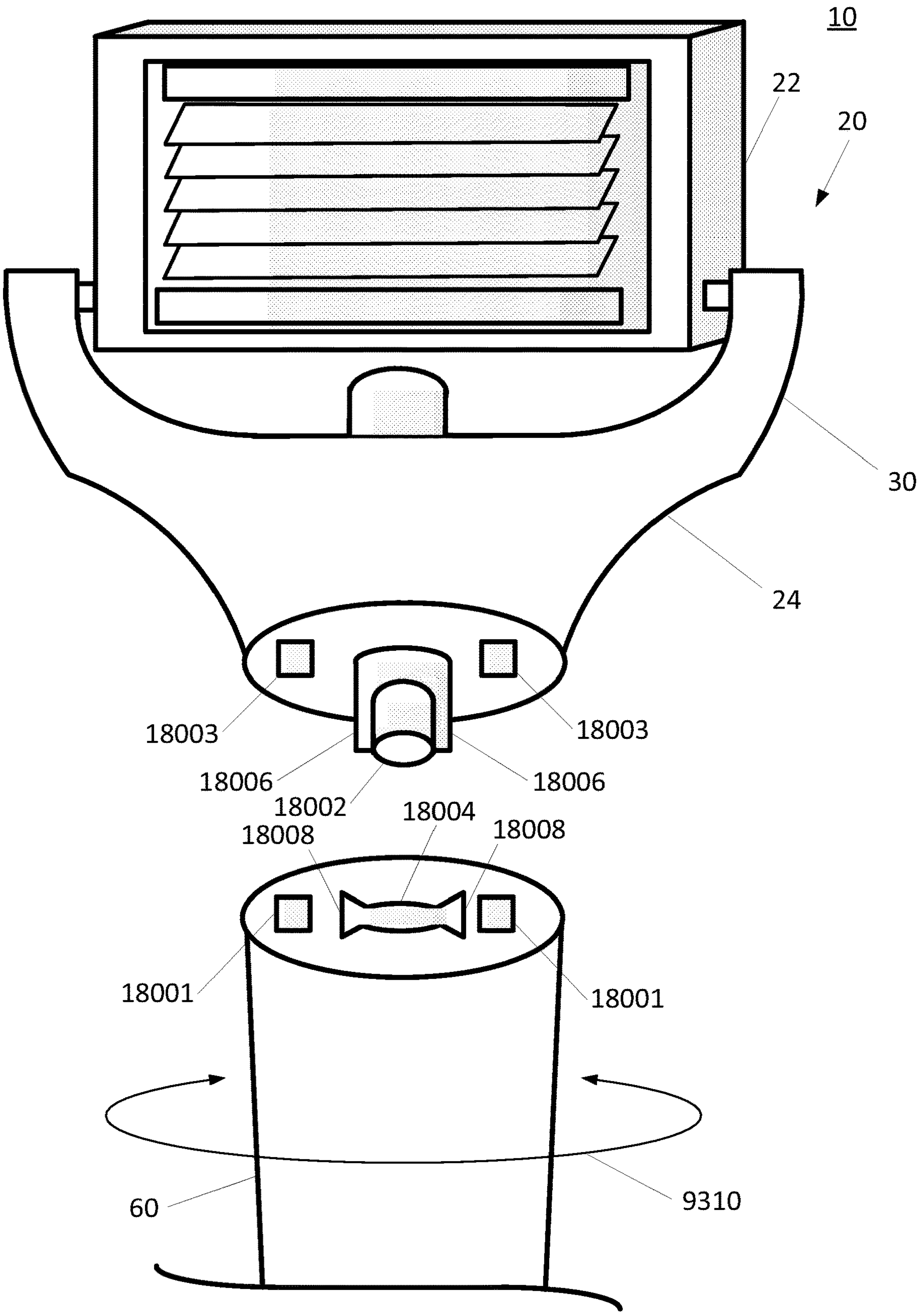
Figure 182:
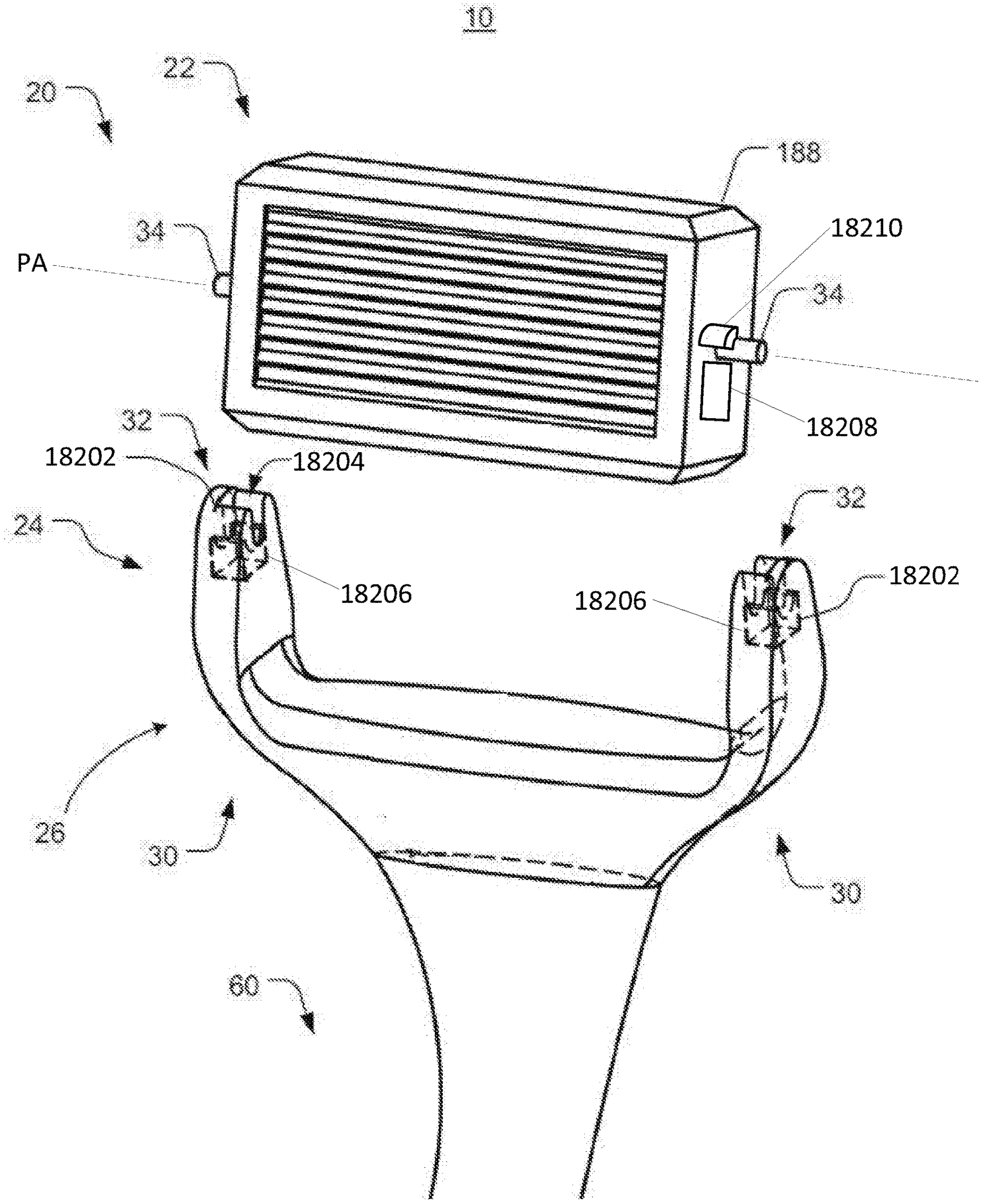
Figure 183:
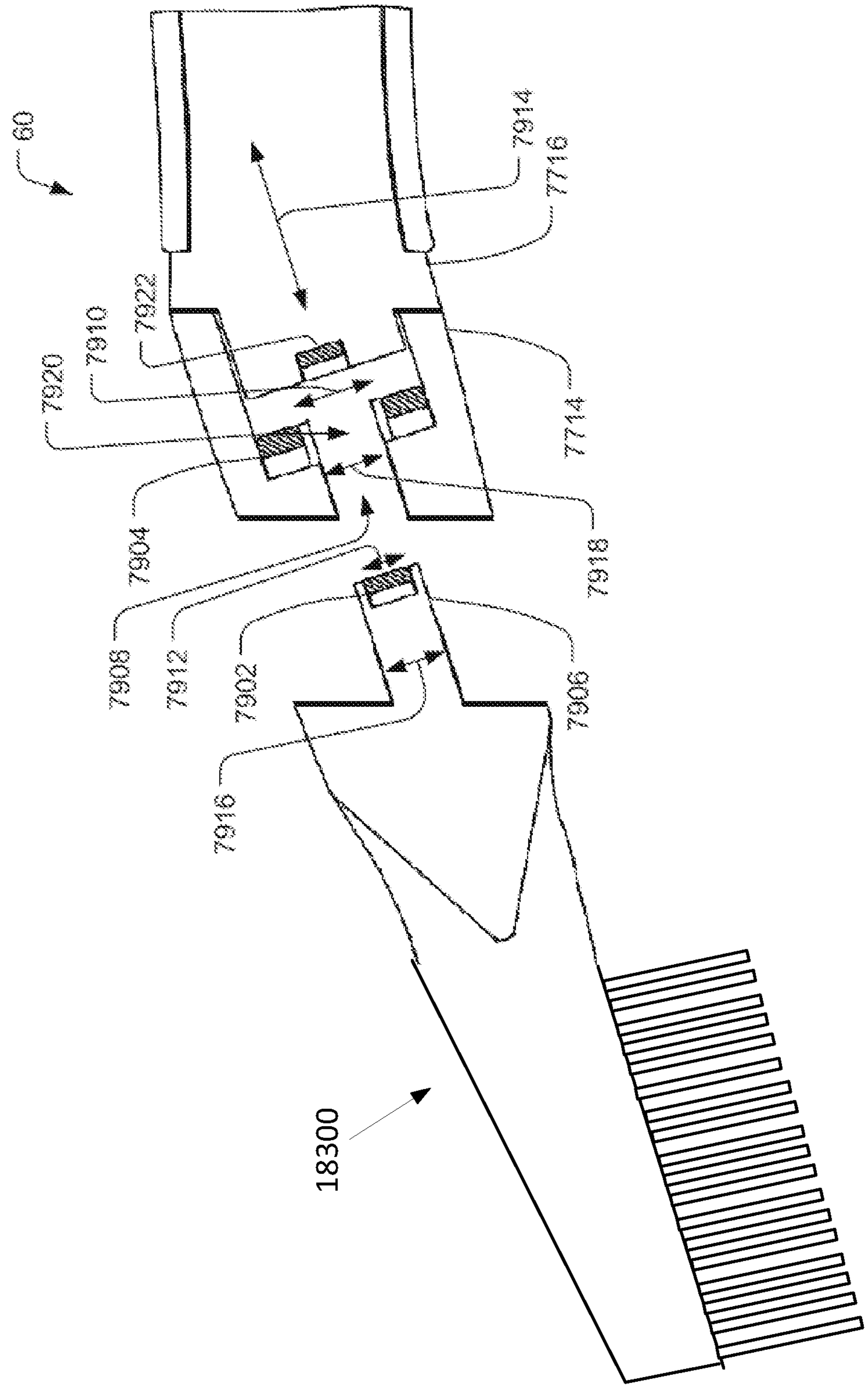
Figure 184:
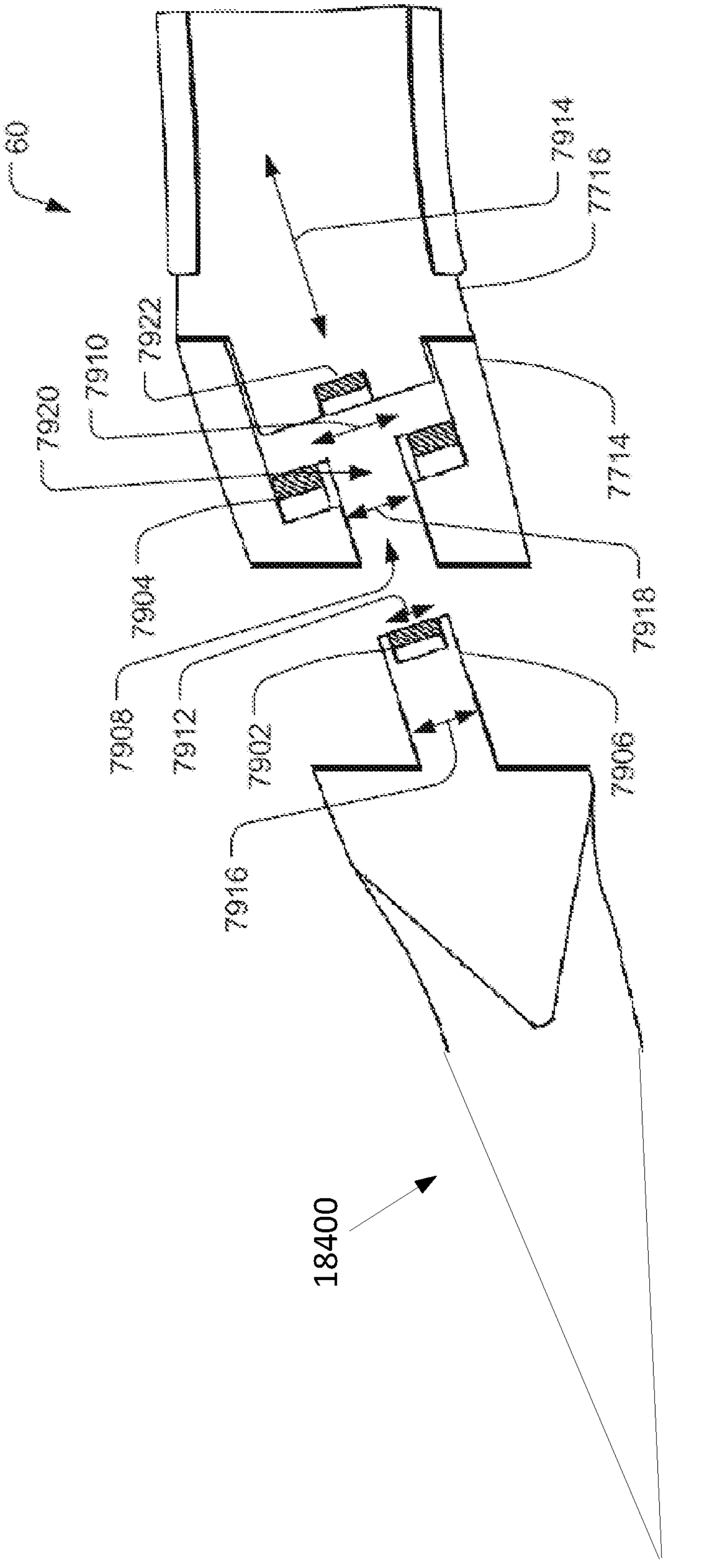
Figure 185:
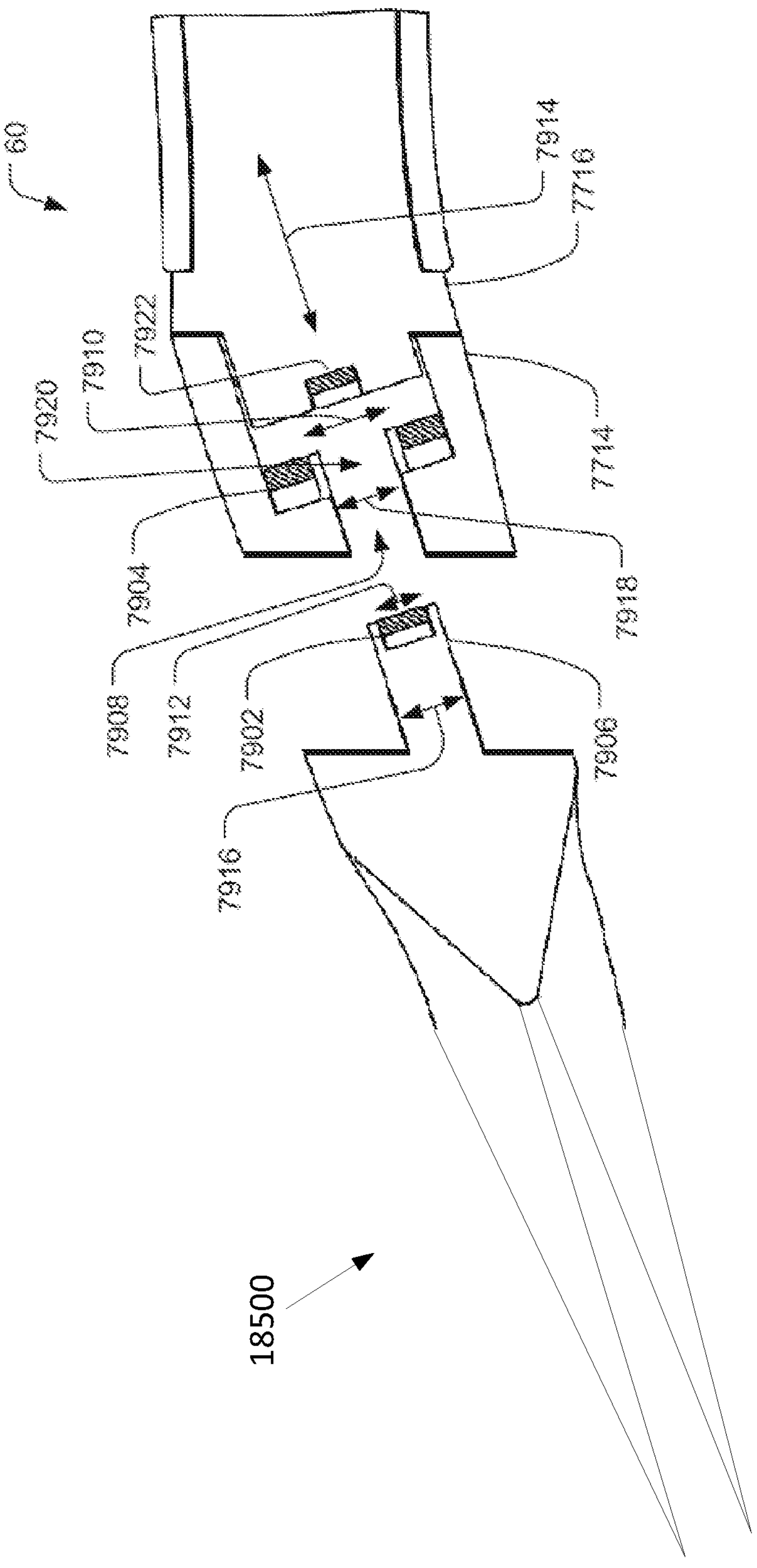
Figure 186:
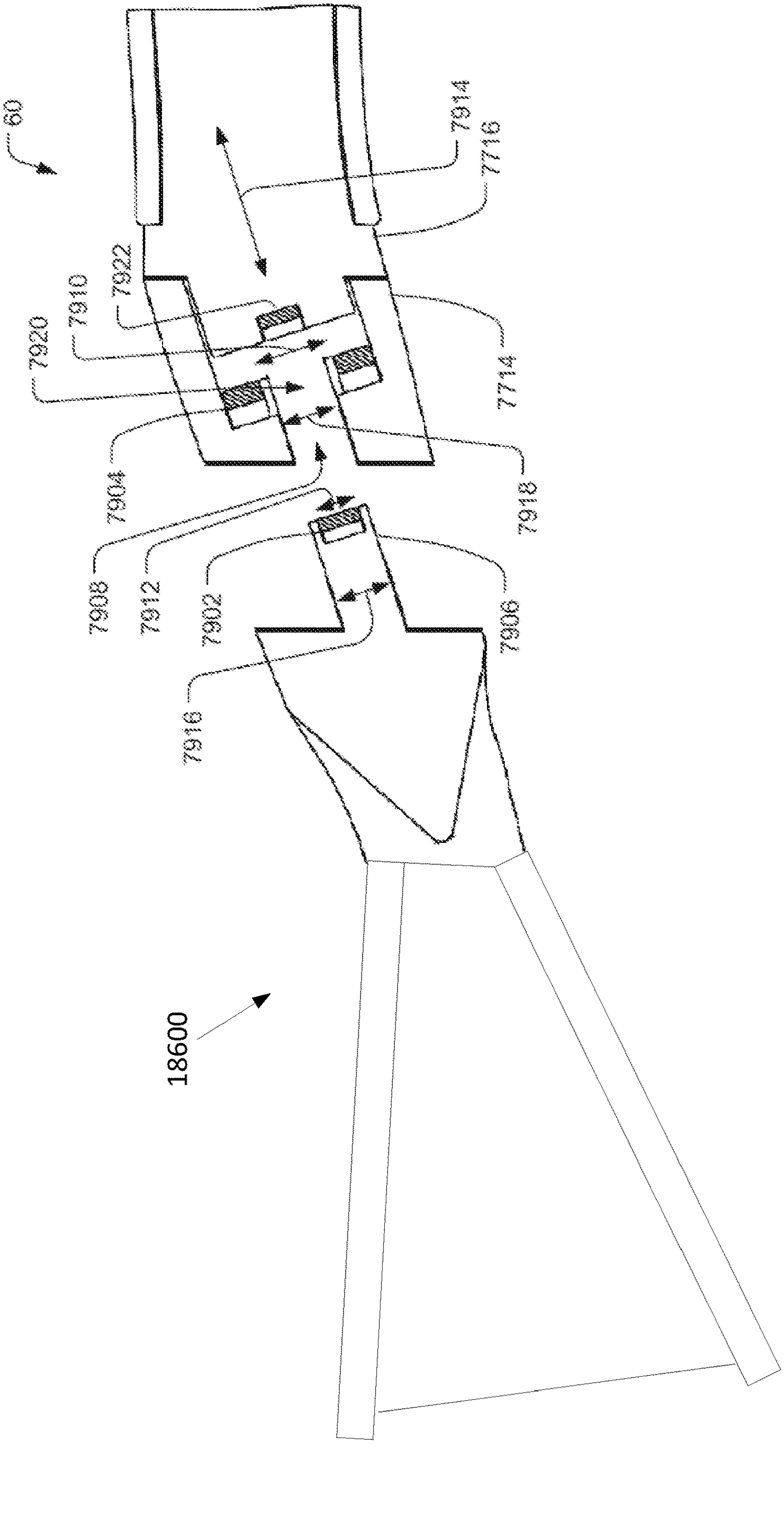

FIG. 18 generally illustrates one embodiment of a blade cartridge including a resistive pivot mechanism consistent with the present disclosure;

FIG. 19 generally illustrates one embodiment of a resistive pivot mechanism taken along lines 19-19 of FIG. 18 consistent with the present disclosure;

FIG. 20 generally illustrates one embodiment of a resistive pivot mechanism taken along lines 20-20 of FIG. 19 consistent with the present disclosure;

FIG. 21 generally illustrates another embodiment of a resistive pivot mechanism similar to those of FIGS. 19 and 20;

FIG. 22 generally illustrates another embodiment of a resistive pivot mechanism similar to those of FIGS. 19 and 20;

FIG. 23 generally illustrates another embodiment of a resistive pivot mechanism including a ballast mechanism consistent with the present disclosure;

FIG. 24 generally illustrates another embodiment of a resistive pivot mechanism including a ballast mechanism consistent with the present disclosure;

FIG. 25 illustrates one embodiment of a hinge and swivel mechanism consistent with the present disclosure;

FIG. 26 illustrates one embodiment of a hinge and swivel mechanism consistent with the present disclosure;

FIG. 27 illustrates one embodiment of a hinge and swivel mechanism consistent with the present disclosure;

FIG. 28 shows one embodiment of a blade cartridge centering mechanism;

FIG. 29 shows one embodiment of a blade cartridge centering mechanism consistent with FIG. 28;

FIG. 30A shows an enlarged front view of a blade cartridge according to one embodiment of the present disclosure;

FIG. 30B shows an enlarged front view of a blade cartridge according to another embodiment of the present disclosure;

FIG. 31 shows a cross-sectional view of a section of a blade cartridge including a retractable ball bearing according to one embodiment of the present disclosure;

FIG. 32 shows a cross-sectional view of a section of a blade cartridge including a retractable ball bearing according to another embodiment of the present disclosure;

FIG. 33 shows a cross-sectional view of a section of a blade cartridge including a retractable ball bearing according to another embodiment of the present disclosure;

FIG. 34 shows a cross-sectional view of a blade cartridge including self-lubricating retractable ball bearing/elongated ball bearing/roller pin according to another embodiment of the present disclosure;

FIG. 35A shows a cross-sectional view of a blade cartridge including self-lubricating retractable ball bearing/elongated ball bearing/roller pin according to another embodiment of the present disclosure;

FIG. 35B shows a cross-sectional view of a blade cartridge including self-lubricating retractable ball bearing/elongated ball bearing/roller pin according to another embodiment of the present disclosure;

FIG. 35C shows a retention clip for securing a ball bearing within the blade cartridge;

FIG. 35D shows a retention clip for securing a ball bearing within the blade cartridge;

FIG. 35E shows a retention clip for securing a ball bearing within the blade cartridge;

FIG. 35F shows a blade retention clip for securing one or more razor blades within the blade cartridge;

FIG. 35G shows a blade retention clip for securing one or more razor blades within the blade cartridge;

FIG. 35H shows a blade retention clip for securing one or more razor blades within the blade cartridge;

FIG. 36 shows an enlarged front view of a blade cartridge according to another embodiment of the present disclosure;

FIG. 37 shows an enlarged front view of a blade cartridge according to another embodiment of the present disclosure;

FIG. 38 shows an end view of yet another embodiment of a blade cartridge consistent with the present disclosure;

FIG. 39 is an end perspective view of the blade cartridge consistent with FIG. 38;

FIG. 40 shows an end view of one embodiment of a pivot pin/cylinder that may be used with one embodiment of a resistive pivot mechanism in conjunction with the blade cartridge of FIGS. 38 and 39;

FIG. 41 shows a further view consistent with FIGS. 38-40;

FIG. 42 shows a further view consistent with FIGS. 38-40;

FIG. 43 shows a further view consistent with FIGS. 38-40;

FIG. 44 shows a further view consistent with FIGS. 38-40;

FIG. 45 shows a further view consistent with FIGS. 38-40;

FIG. 46 shows an additional view of a razor consistent with FIGS. 25-27;

FIG. 47 shows an additional view of a razor consistent with FIGS. 25-27;

FIG. 48 shows an additional view of a razor consistent with FIGS. 25-27;

FIG. 49 shows an additional view of a razor consistent with FIGS. 25-27;

FIG. 50 shows an additional view of a blade cartridge consistent with the present disclosure;

FIG. 51 shows an additional view of a blade cartridge consistent with the present disclosure;

FIG. 52 shows an additional view of a blade cartridge consistent with the present disclosure;

FIG. 53 shows another view of a razor consistent with the present disclosure;

FIG. 54 shows one embodiment of a razor having a resistive swing mechanism consistent with the present disclosure;

FIG. 55 shows a perspective view of another shaving device including another embodiment of a resistive pivot mechanism consistent with the present disclosure;

FIG. 56 shows a side view of the shaving device of FIG. 55 with the resistive pivot mechanism;

FIG. 57 shows a close-up side view of the shaving device of FIG. 55;

FIG. 58 shows another embodiment of a resistive pivot mechanism;

FIG. 59A shows the resistive pivot mechanism of FIG. 58 wherein the blade cartridge support member is partially transparent;

FIG. 59B shows one arrangement the blade cartridge magnets and the blade cartridge support member magnets;

FIG. 59C shows another arrangement the blade cartridge magnets and the blade cartridge support member magnets;

FIG. 59D shows yet another arrangement the blade cartridge magnets and the blade cartridge support member magnets;

FIG. 60 shows another view of the resistive pivot mechanism of FIG. 59A;

FIG. 61 shows another view of the blade cartridge support member of FIG. 58 wherein the blade cartridge support member is partially transparent;

FIG. 62 shows another view of the blade cartridge support member of FIG. 61 wherein the blade cartridge support member is solid;

FIG. 63 shows another view of the blade cartridge of FIG. 58 wherein the blade cartridge is partially transparent;

FIG. 64 shows another view of the blade cartridge of FIG. 63 wherein the blade cartridge is partially solid;

FIG. 65 shows another embodiment of a resistive pivot mechanism;

FIG. 66 shows the resistive pivot mechanism of FIG. 65 wherein the blade cartridge support member is solid;

FIG. 67 shows the resistive pivot mechanism of FIG. 65 wherein the blade cartridge support member is partially transparent;

FIG. 68 shows a cross-sectional view of the blade cartridge of FIG. 65;

FIG. 69 shows another cross-sectional view of the blade cartridge of FIG. 65;

FIG. 70 shows a cross-sectional view of another embodiment of a resistive pivot mechanism;

FIG. 71 shows the resistive pivot mechanism of FIG. 70 wherein the blade cartridge support member is partially transparent along with an axle and cams;

FIG. 72 shows another view of the blade cartridge support member of FIG. 71 without the axle and cams;

FIG. 73 shows another view of the blade cartridge of FIG. 70 wherein the blade cartridge support member is partially solid;

FIG. 74 shows another view of the resistive pivot mechanism of FIG. 70 wherein the blade cartridge support member is partially transparent along with the axle, cams, and detent plate;

FIG. 75 shows a cross-sectional view of the blade cartridge of FIG. 70;

FIG. 76 shows another cross-sectional view of the blade cartridge of FIG. 70;

FIG. 77 shows one embodiment of a head assembly and a handle configured to be coupled together using one or more magnets in an unassembled state;

FIG. 78 generally illustrates the head assembly and the handle of FIG. 77 in an assembled state;

FIG. 79 shows a cross-sectional view of the head assembly and handle of FIG. 77 in an unassembled state;

FIG. 80 shows a cross-sectional view of the head assembly and handle of FIG. 77 in an assembled state;

FIG. 81A illustrates the magnetic force at different displacements into the cavity consistent with the magnetic coupling of FIGS. 77-80;

FIG. 81B illustrates the magnetic force at different displacements into the cavity consistent with the magnetic coupling of FIGS. 77-80;

FIG. 82 shows another embodiment of a magnetic connection between the head assembly and the handle;

FIG. 83 shows a further embodiment of a magnetic connection between the head assembly and the handle;

FIG. 84 shows one embodiment of a blade cartridge connection mechanism for securing a blade cartridge to a blade cartridge support member in an unassembled state;

FIG. 85 shows the blade cartridge connection mechanism of FIG. 84 in an assembled state;

FIG. 86 shows a cross-sectional view of the blade cartridge connection mechanism of FIG. 84 in an unassembled state;

FIG. 87 shows a cross-sectional view of the blade cartridge connection mechanism of FIG. 84 in an assembled state;

FIG. 88 shows one embodiment of a blade cartridge retentioner for securing a blade cartridge to a blade cartridge support member in an unassembled state;

FIG. 89 shows the blade cartridge retentioner of FIG. 88 in an assembled state;

FIG. 90 another embodiment of a blade cartridge retentioner for securing a blade cartridge to a blade cartridge support member in an assembled state;

FIG. 91 shows a cross-section of the blade cartridge retentioner of FIG. 90 taken along lines A-A;

FIG. 92 shows a cross-section of the blade cartridge retentioner of FIG. 90 taken along lines B-B;

FIG. 93 another embodiment of a resistive pivot mechanism and/or a connection mechanism for coupling blade cartridge to the handle in an unassembled state;

FIG. 94 shows the resistive pivot mechanism and/or connection mechanism of FIG. 93 in an assembled state;

FIG. 95 shows a cross-section of the blade cartridge retentioner of FIG. 93;

FIG. 96 shows another resistive pivot mechanism and/or connection mechanism of in an assembled state;

FIG. 97 shows one embodiment of a hard stop/ISP protrusion;

FIG. 98 shows an embodiment of two or more diametrically magnetized (DM) magnets for coupling two components;

FIG. 99 shows an embodiment of two or more diametrically magnetized (DM) magnets for coupling two components;

FIG. 100 shows an embodiment of two or more diametrically magnetized (DM) magnets for coupling two components;

FIG. 101 shows another embodiment of two or more diametrically magnetized (DM) magnets for coupling two components in a first position;

FIG. 102 shows the two or more diametrically magnetized (DM) magnets for coupling two components of FIG. 101 in a second position;

FIG. 103 shows a further embodiment utilizing DM magnets;

FIG. 104 shows a further embodiment utilizing DM magnets;

FIG. 105 shows a further embodiment utilizing DM magnets;

FIG. 106 shows an embodiment of two or more DM magnets that allow lateral movement of the blade cartridge support member/blade cartridge relative to the handle;

FIG. 107 shows an embodiment of two or more DM magnets that allow lateral movement of the blade cartridge support member/blade cartridge relative to the handle;

FIG. 108 shows an embodiment of two or more DM magnets that allow lateral movement of the blade cartridge support member/blade cartridge relative to the handle;

FIG. 109 shows a further embodiment featuring two or more DM magnets;

FIG. 110 shows a further embodiment featuring two or more DM magnets;

FIG. 111 shows yet a further embodiment featuring two or more DM magnets;

FIG. 112 shows yet a further embodiment featuring two or more DM magnets;

FIG. 113 shows yet a further embodiment featuring two or more DM magnets;

FIG. 114 shows an additional embodiment featuring two or more DM magnets;

FIG. 115 shows an additional embodiment featuring two or more DM magnets;

FIG. 116 shows an additional embodiment featuring two or more DM magnets;

FIG. 117 shows an embodiment of multiple pairs of DM magnets to securely attach two components while also allowing the components to rotate about multiple axes relative to each other while tending to return to a predetermined rest position, and can be separated manually;

FIG. 118 shows an embodiment of multiple pairs of DM magnets to securely attach two components while also allowing the components to rotate about multiple axes relative to each other while tending to return to a predetermined rest position, and can be separated manually;

FIG. 119 shows an embodiment of multiple pairs of DM magnets to securely attach two components while also allowing the components to rotate about multiple axes relative to each other while tending to return to a predetermined rest position, and can be separated manually;

FIG. 120 shows an embodiment of multiple pairs of DM magnets to securely attach two components while also allowing the components to rotate about multiple axes relative to each other while tending to return to a predetermined rest position, and can be separated manually;

FIG. 121 shows an embodiment of a razor having at least two concentric, diametrically magnetized magnets to achieve a floating effect between two parts of the razor that allows motion in two degrees of freedom (angular and axial);

FIG. 122 shows an embodiment of a razor having at least two concentric, diametrically magnetized magnets to achieve a floating effect between two parts of the razor that allows motion in two degrees of freedom (angular and axial);

FIG. 123 shows an embodiment of a razor having at least two concentric, diametrically magnetized magnets to achieve a floating effect between two parts of the razor that allows motion in two degrees of freedom (angular and axial);

FIG. 124 shows an embodiment of a razor having at least two concentric, diametrically magnetized magnets to achieve a floating effect between two parts of the razor that allows motion in two degrees of freedom (angular and axial);

FIG. 125A shows an embodiment of a razor having at least two concentric, diametrically magnetized magnets to achieve a floating effect between two parts of the razor that allows motion in two degrees of freedom (angular and axial);

FIG. 125B shows an embodiment of a razor having at least two concentric, diametrically magnetized magnets to achieve a floating effect between two parts of the razor that allows motion in two degrees of freedom (angular and axial);

FIG. 125C shows an embodiment of lockout and/or ejection chamber or groove;

FIG. 125D shows the embodiment of lockout and/or ejection chamber or groove of FIG. 125C;

FIG. 125E shows an embodiment of lockout and/or ejection chamber or groove;

FIG. 126 shows one embodiment of a razor having a mechanical pivot to align the blade cartridge in a “Body Mode”;

FIG. 127 shows an embodiment of a razor including magnets to position and control a rotating blade cartridge within support member;

FIG. 128 shows an embodiment of a razor including magnets to position and control a rotating blade cartridge within support member;

FIG. 129 shows an additional embodiment of a resistive pivot mechanism;

FIG. 130 shows another embodiment of a resistive pivot mechanism;

FIG. 131 shows yet another embodiment of a razor having a resistive pivot mechanism;

FIG. 132 shows a further embodiment of a razor having a resistive pivot mechanism;

FIG. 133 shows a further embodiment of a razor having a resistive pivot mechanism having only one arm magnet;

FIG. 134 shows an embodiment similar to FIG. 132 that has been modified to remove the arm that does not include a magnet;

FIG. 135 shows an embodiment similar to FIG. 132 that has been modified to remove the arm that does not include a magnet;

FIG. 136 shows an embodiment of a variation of the embodiment of FIGS. 129-130 wherein the pivot axle is fixed to the blade cartridge rather than the arm, and passageways/grooves/slots are provided in the arm and/or magnets to allow the blade cartridge and axle to be removed from the arm;

FIG. 137 shows an embodiment of a variation of the embodiment of FIGS. 129-130 wherein the pivot axle is fixed to the blade cartridge rather than the arm, and passageways/grooves/slots are provided in the arm and/or magnets to allow the blade cartridge and axle to be removed from the arm;

FIG. 138 shows a further embodiment of a razor having a resistive pivot mechanism;

FIG. 139 shows one embodiment of a razor which includes nanotube sheets, strips or threads incorporated into the disposable head assembly;

FIG. 140 shows embodiment of a resistive pivot mechanism and a coupling mechanism;

FIG. 141 shows an embodiment of pivotably coupling the blade cartridge to the blade cartridge support member using a plurality of magnets;

FIG. 142 shows an embodiment of pivotally coupling the blade cartridge to the blade cartridge support member using a plurality of magnets;

FIG. 143 shows one embodiment wherein the repelling magnets optionally include mating features;

FIG. 144A shows another embodiment of a razor that may be selectively arranged in either “Face Mode” and “Body Mode”;

FIG. 144B shows another embodiment of a razor that may be selectively arranged in either “Face Mode” and “Body Mode”;

FIG. 144C shows another embodiment of a razor that may be selectively arranged in either “Face Mode” and “Body Mode”;

FIG. 144D shows another embodiment of a razor that may be selectively arranged in either “Face Mode” and “Body Mode”;

FIG. 144E shows another embodiment of a razor that may be selectively arranged in either “Face Mode” and “Body Mode”;

FIG. 145A shows another embodiment of a razor that may be selectively arranged in either “Face Mode” and “Body Mode”;

FIG. 145B shows another embodiment of a razor that may be selectively arranged in either “Face Mode” and “Body Mode”;

FIG. 145C shows another embodiment of a razor that may be selectively arranged in either “Face Mode” and “Body Mode”;

FIG. 145D shows another embodiment of a razor that may be selectively arranged in either “Face Mode” and “Body Mode”;

FIG. 145E shows another embodiment of a razor that may be selectively arranged in either “Face Mode” and “Body Mode”;

FIG. 146A shows another embodiment of a razor that may be selectively arranged in either “Face Mode” and “Body Mode”;

FIG. 146B shows another embodiment of a razor that may be selectively arranged in either “Face Mode” and “Body Mode”;

FIG. 146C shows another embodiment of a razor that may be selectively arranged in either “Face Mode” and “Body Mode”;

FIG. 147 shows one embodiment of a magnetic biasing system for urging a blade cartridge to an initial starting position (ISP);

FIG. 148 shows one embodiment of a magnetic biasing system for urging a blade cartridge to an initial starting position (ISP);

FIG. 149 shows one embodiment of a magnetic biasing system for urging a blade cartridge to an initial starting position (ISP);

FIG. 150 shows another embodiment of a magnetic biasing system for urging a blade cartridge to an ISP;

FIG. 151 shows an embodiment of a magnetic retainer clip;

FIG. 152 shows an embodiment of a magnetic retainer clip;

FIG. 153A shows an embodiment of a magnetic retainer clip;

FIG. 153B shows an embodiment of a magnetic retainer clip;

FIG. 154 shows an embodiment of a magnetic retainer clip;

FIG. 155A shows an embodiment of a magnetic retainer clip;

FIG. 155B shows an embodiment of a magnetic retainer clip;

FIG. 156 shows an embodiment of a magnetic retainer clip;

FIG. 157A shows an embodiment of a magnetic retainer clip;

FIG. 157B shows an embodiment of a magnetic retainer clip;

FIG. 158 shows an embodiment of a replaceable blade assemblies;

FIG. 159 shows an embodiment of a replaceable blade assemblies;

FIG. 160 shows an embodiment of a replaceable blade assemblies;

FIG. 161 shows an embodiment of a replaceable blade assemblies;

FIG. 162 shows an embodiment of a replaceable blade assemblies;

FIG. 163 shows an embodiment of a replaceable blade assemblies;

FIG. 164 shows an embodiment of a replaceable blade assemblies;

FIG. 165 shows an embodiment of a replaceable blade assemblies;

FIG. 166 shows an embodiment of a razor blades and/or shaving aids that are secured to a blade cartridge using magnets;

FIG. 167 shows an embodiment of a razor blades and/or shaving aids that are secured to a blade cartridge using magnets;

FIG. 168 shows an embodiment of a razor blades and/or shaving aids that are secured to a blade cartridge using magnets;

FIG. 169 shows another embodiment of a connection system between blade cartridge and the handle;

FIG. 170 shows another embodiment of a connection system between blade cartridge and the handle;

FIG. 171 shows one embodiment of a head assembly comprising a blade cartridge biased limiter;

FIG. 172 generally illustrates region C172 of FIG. 171 including the blade cartridge biased limiter in an extended position;

FIG. 173 generally illustrates region C172 of FIG. 171 including the blade cartridge biased limiter in a retracted position;

FIG. 174 shows another embodiment of a connection system between blade cartridge and the handle;

FIG. 175 shows another embodiment of a connection system between blade cartridge and the handle;

FIG. 176 shows another embodiment of a connection system between blade cartridge and the handle;

FIG. 177 shows another embodiment of a connection system between blade cartridge and the handle;

FIG. 178 shows another embodiment of a connection system between blade cartridge and the handle;

FIG. 179 shows another embodiment of a connection system between blade cartridge and the handle;

FIG. 180 shows a further embodiment of a connection system between blade cartridge and the handle;

FIG. 181 shows a further embodiment of a connection system between blade cartridge and the handle;

FIG. 182 shows yet another embodiment of a connection system between blade cartridge and the handle;

FIG. 183 shows an embodiment of a connection system between the handle and various personal hygiene devices;

FIG. 184 shows an embodiment of a connection system between the handle and various personal hygiene devices;

FIG. 185 shows an embodiment of a connection system between the handle and various personal hygiene devices;

FIG. 186 shows an embodiment of a connection system between the handle and various personal hygiene devices.

Figure 187:
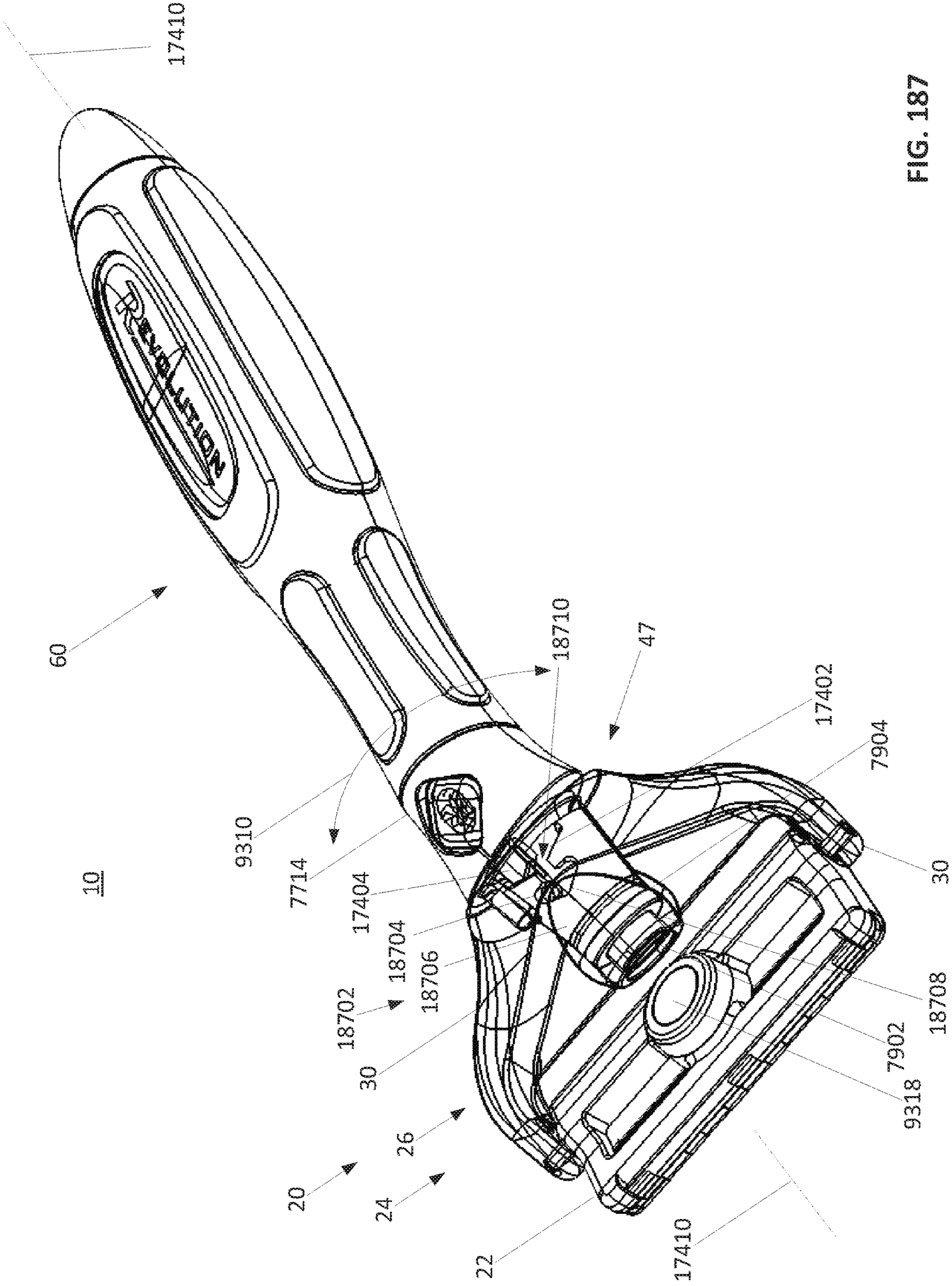
Figure 188:
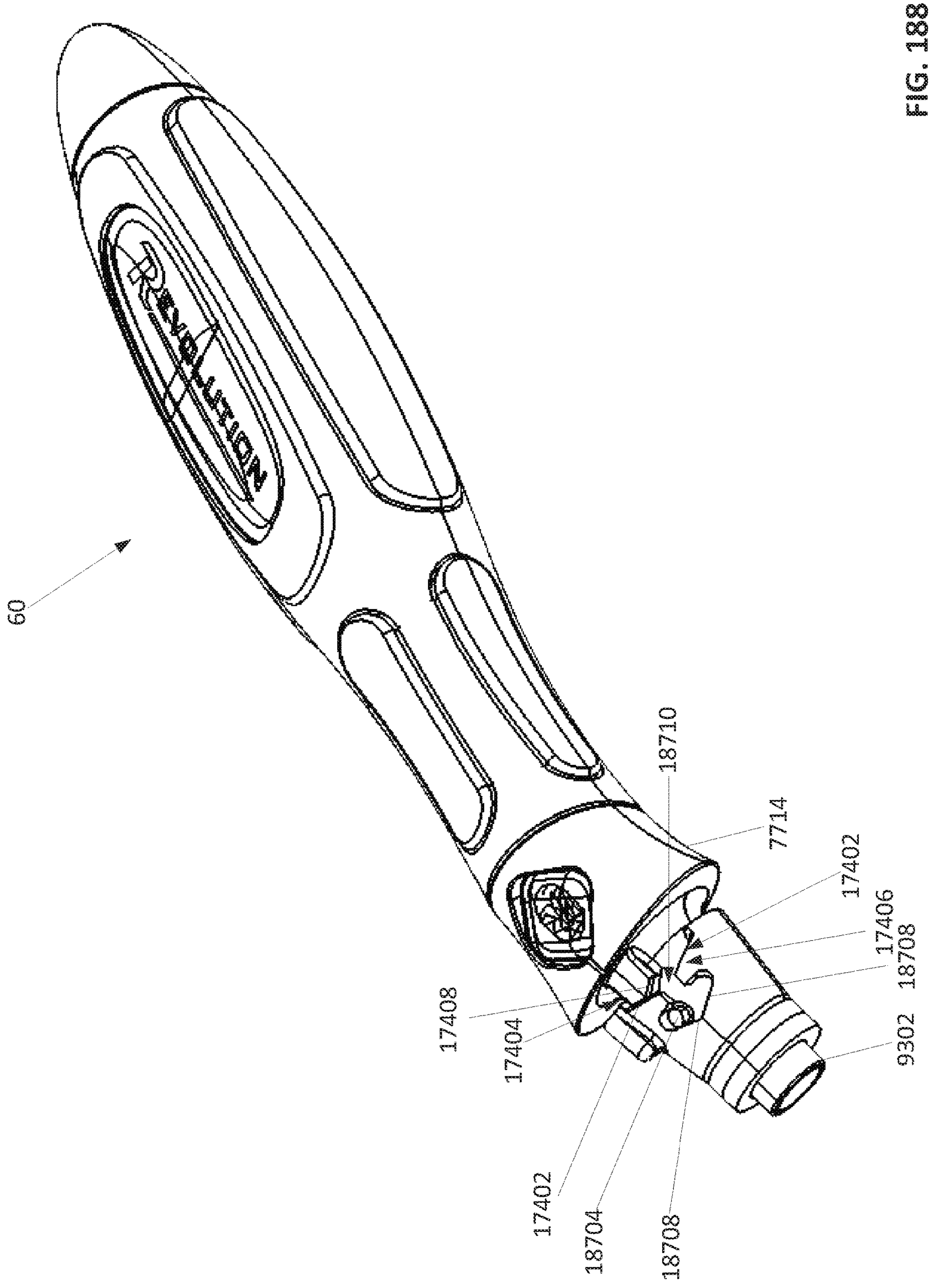
Figure 189:
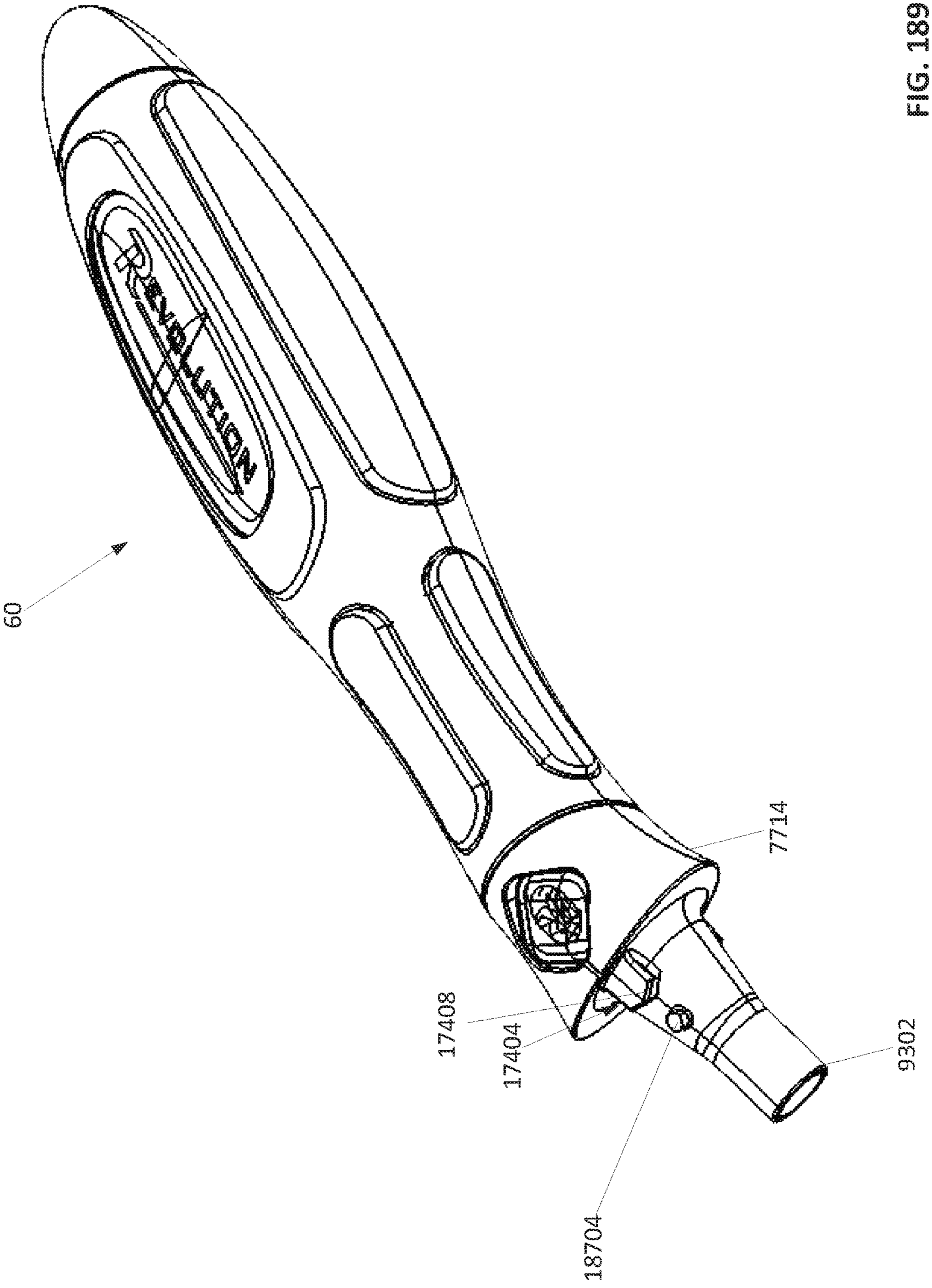
Figure 190:
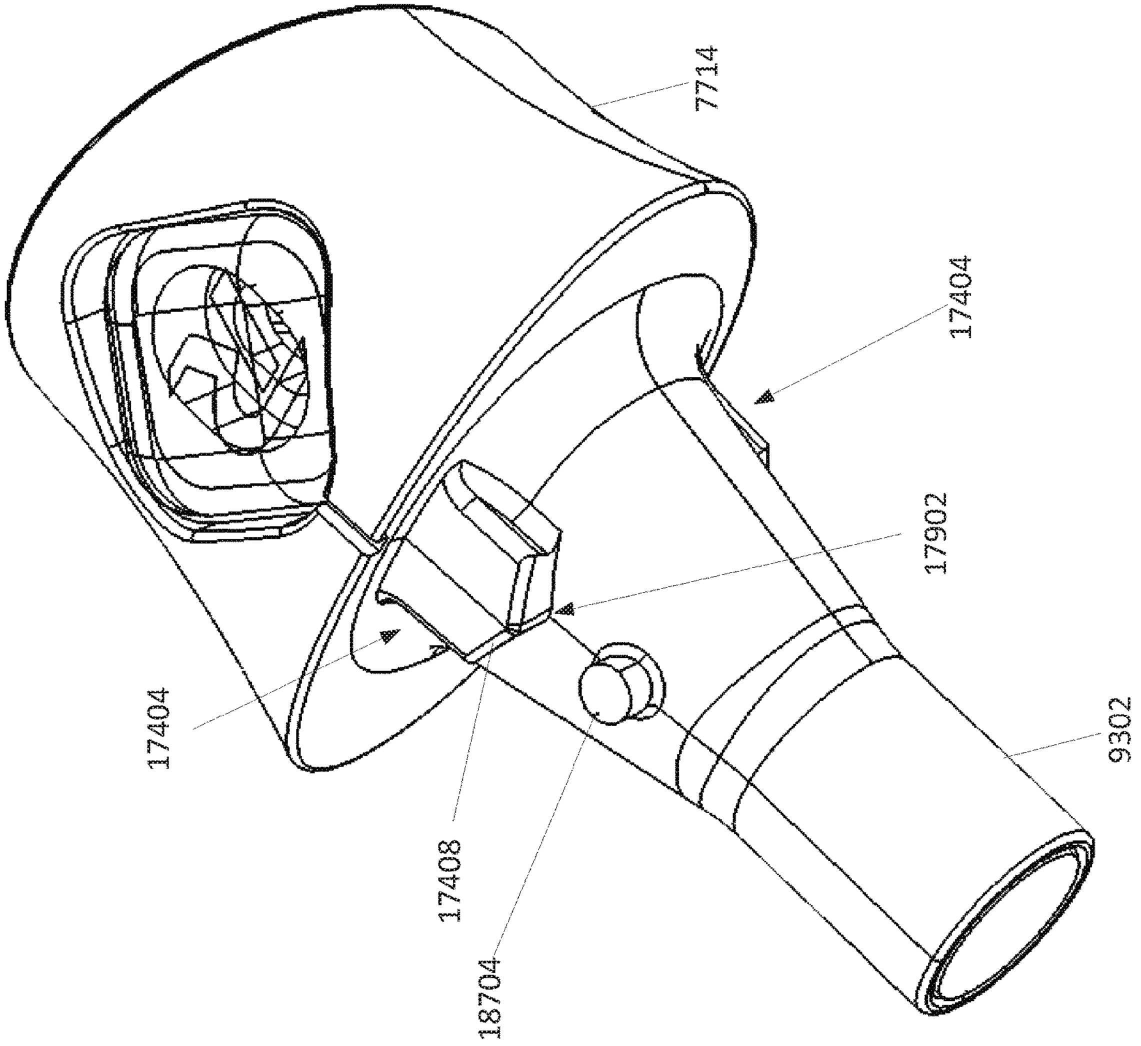
Figure 191:
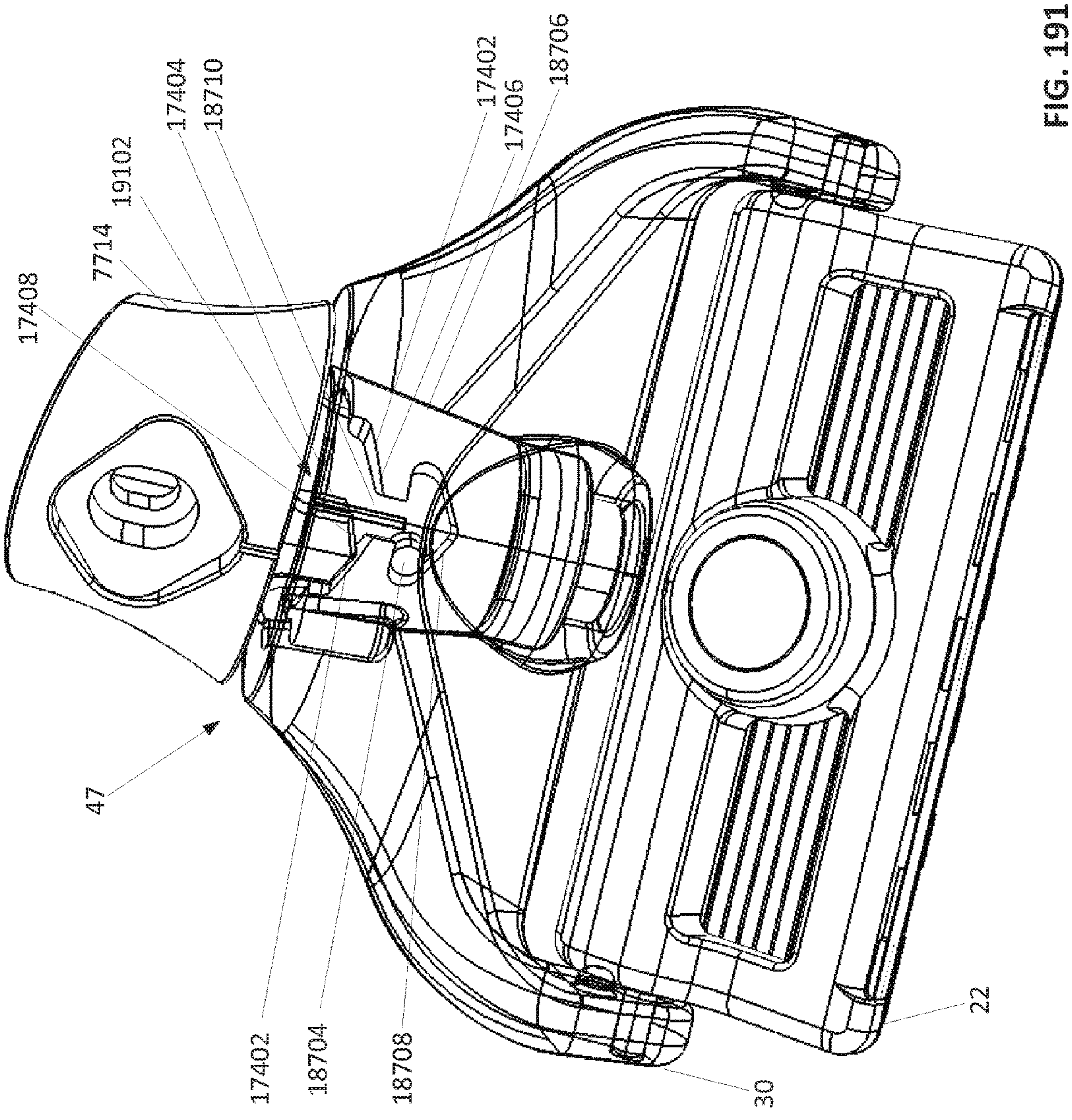
Figure 192:
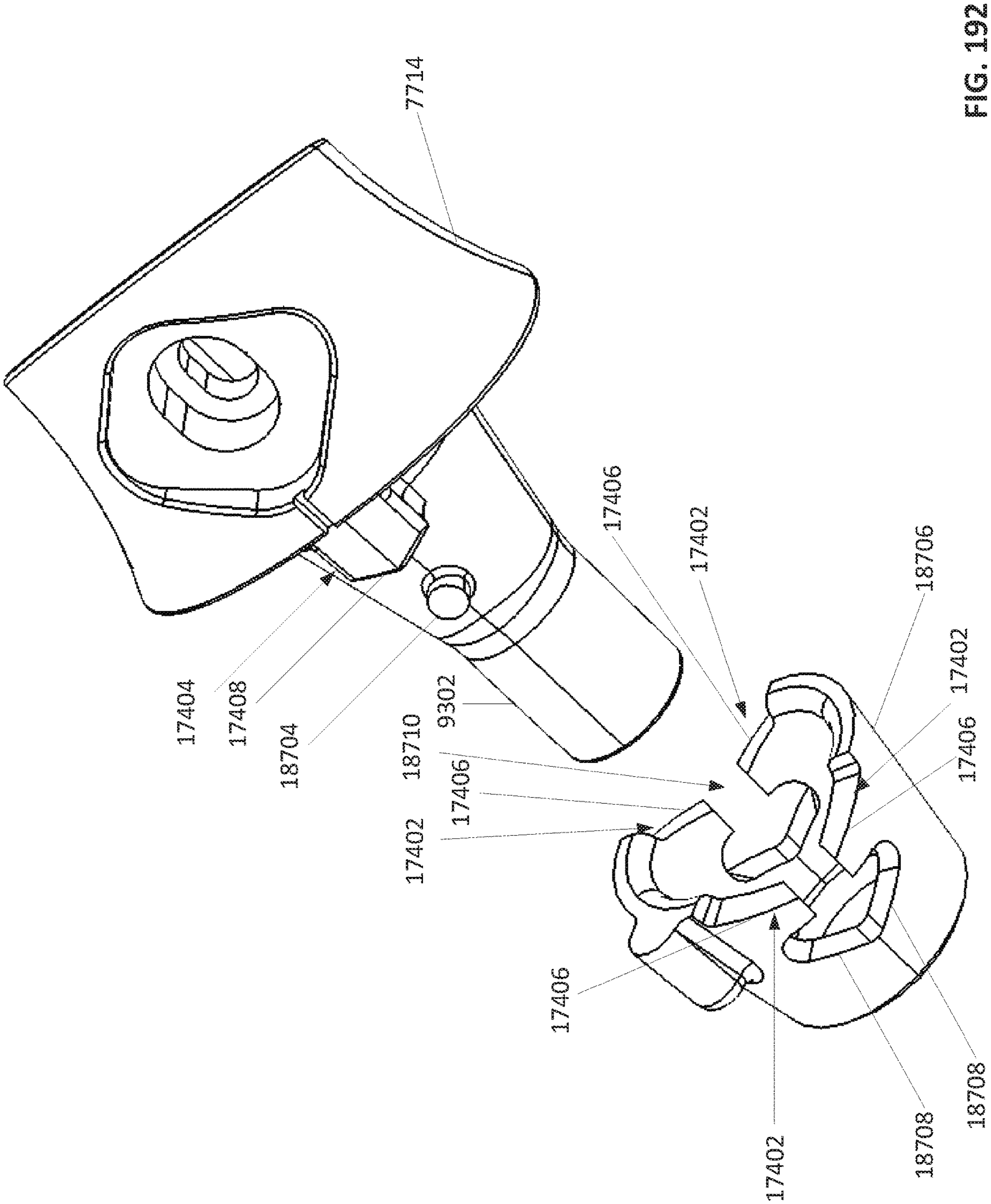
Figure 193:
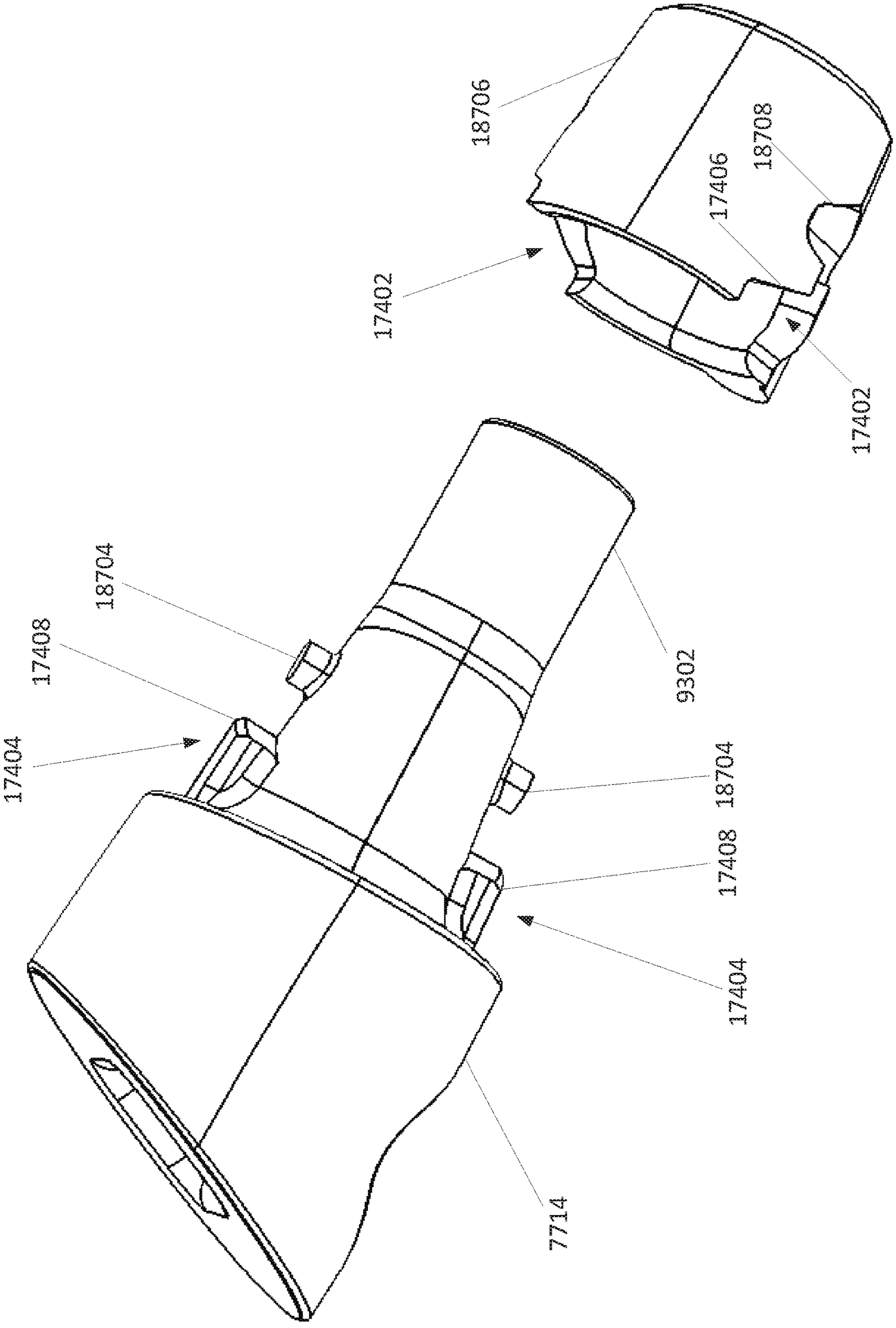
Figure 194:
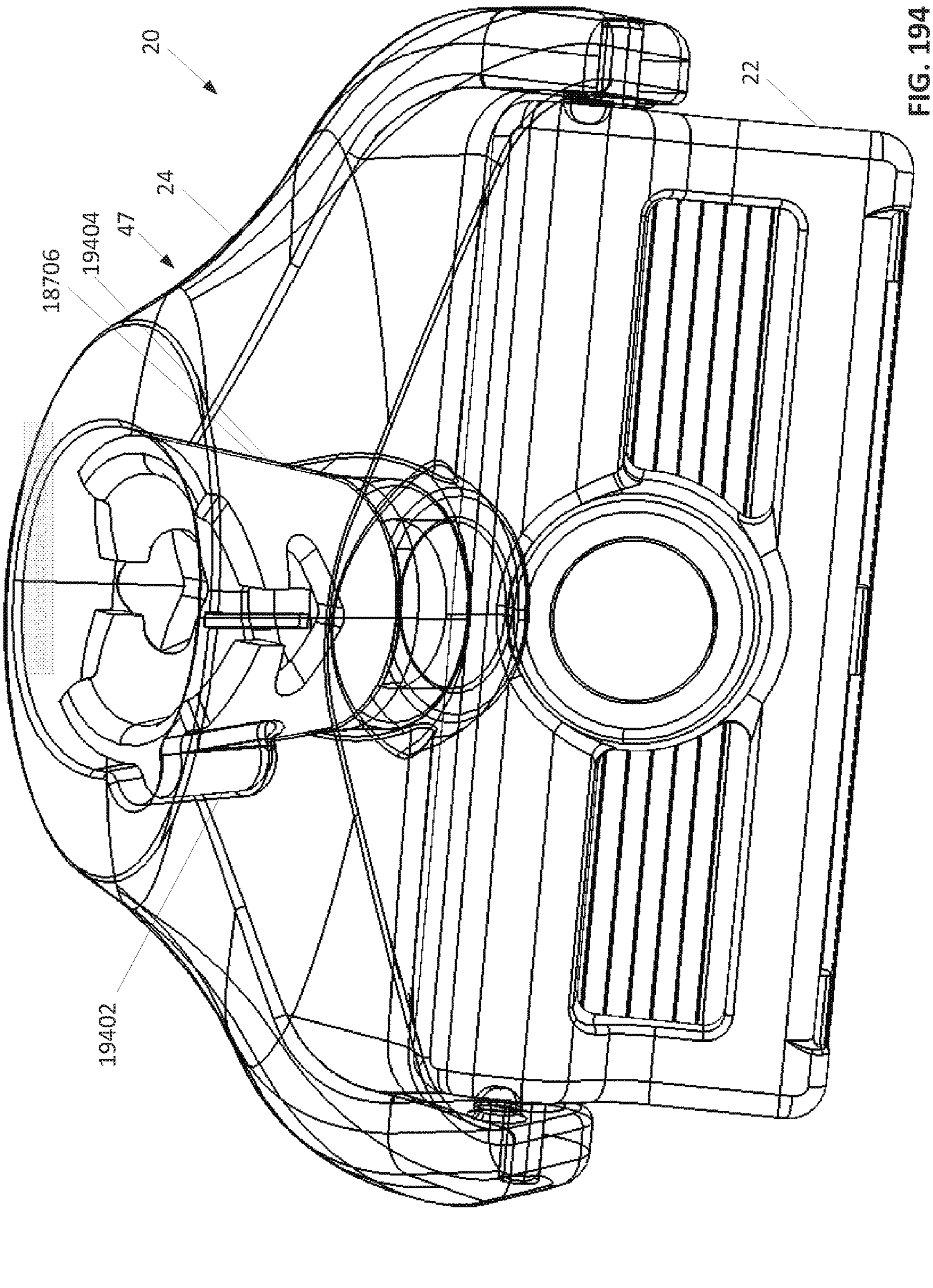
Figure 195:
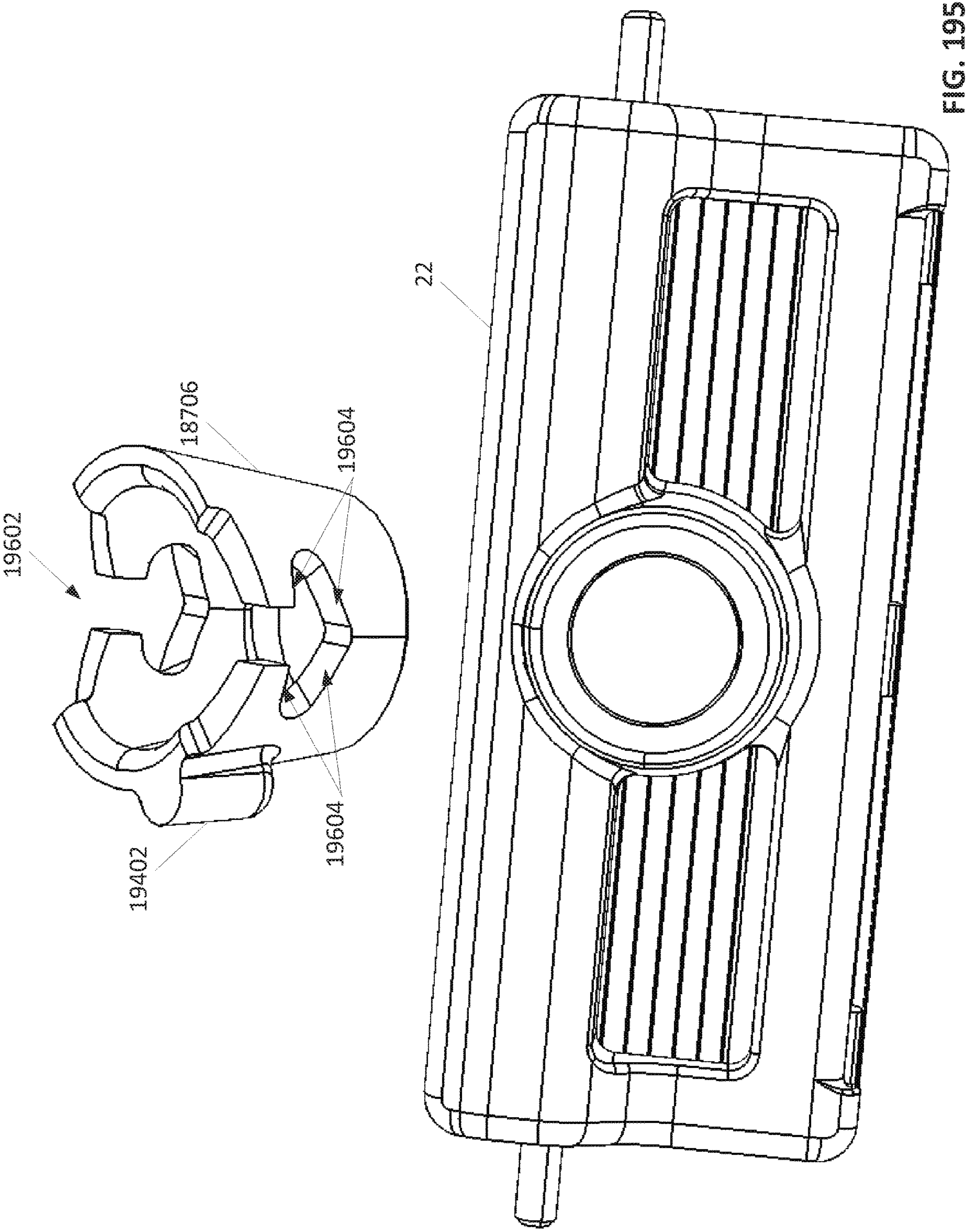
Figure 196:
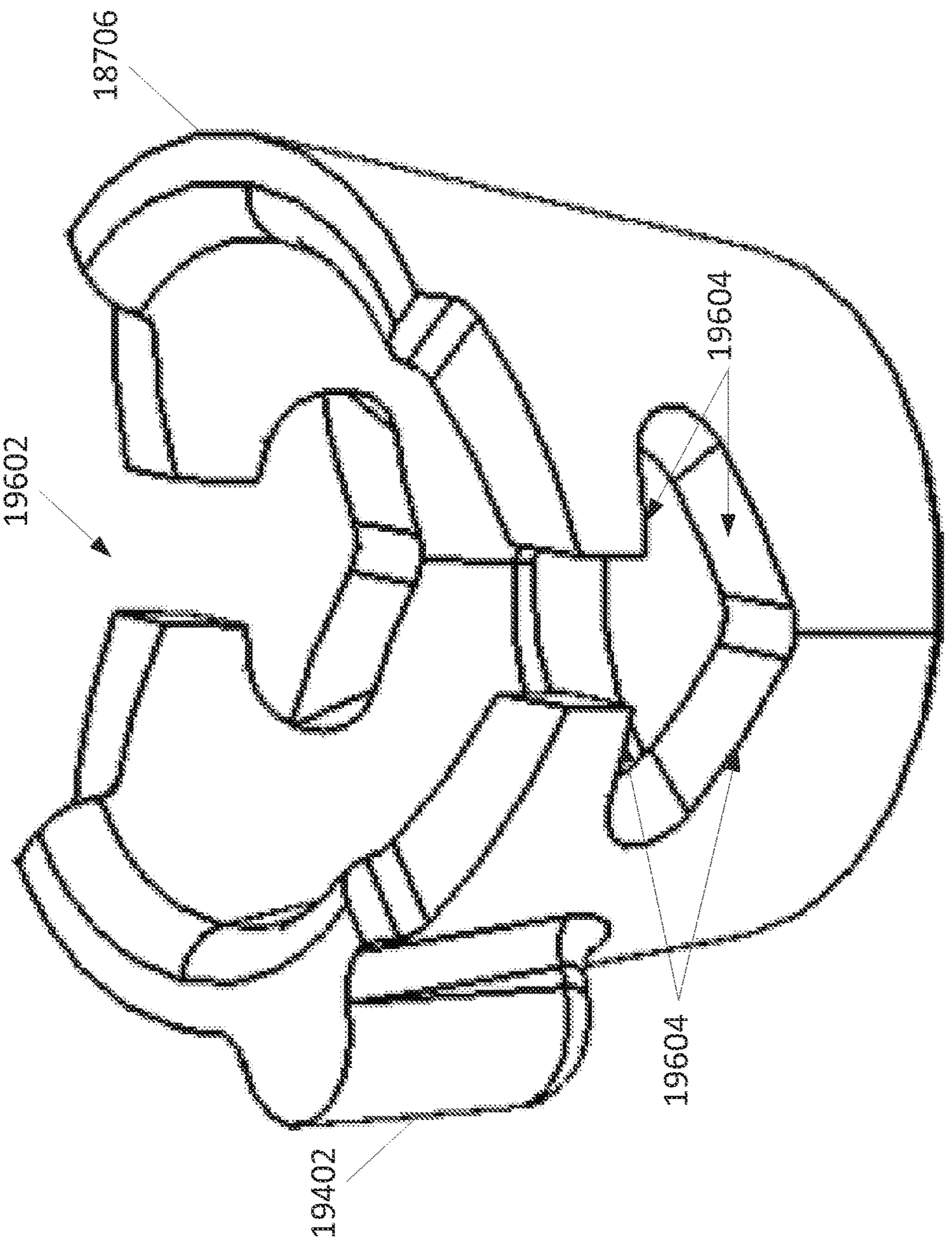
Figure 198:
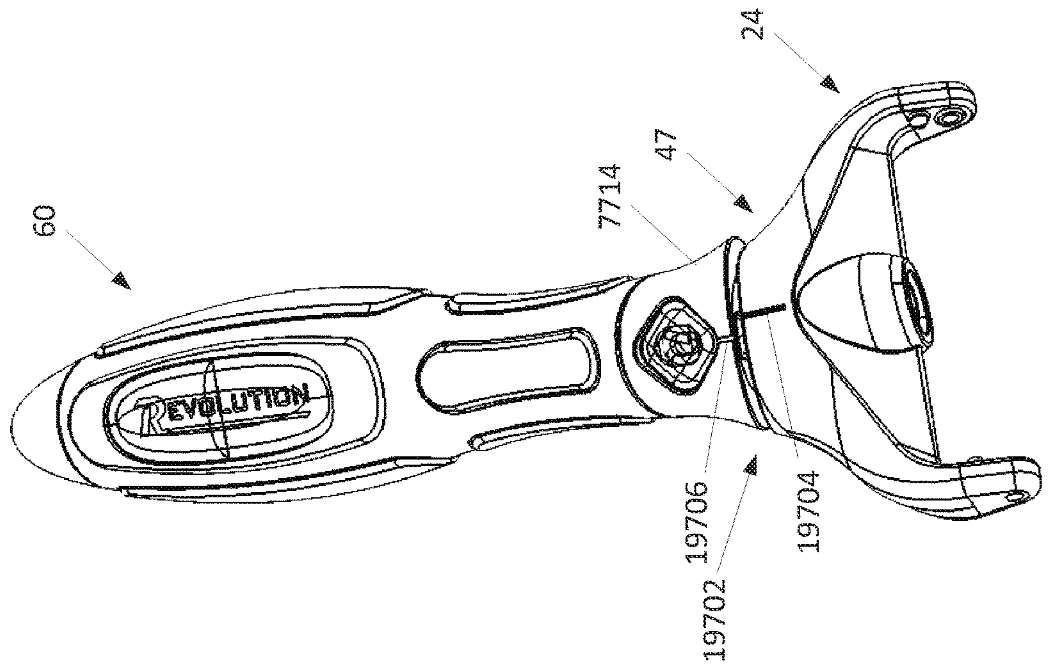
Figure 197:
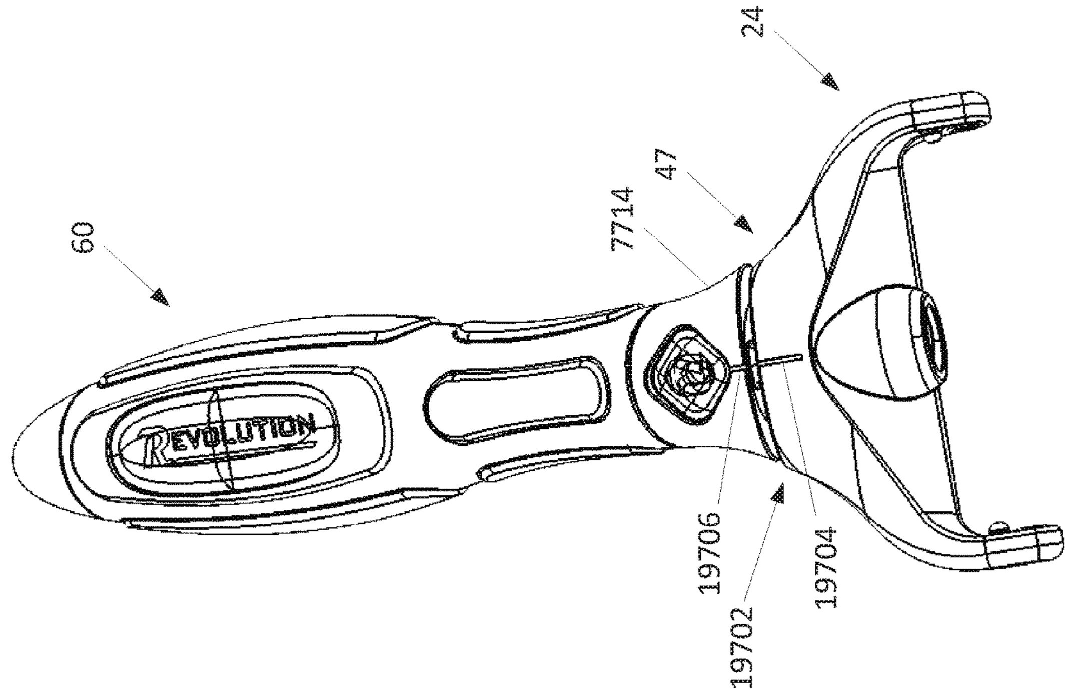
Figure 199:
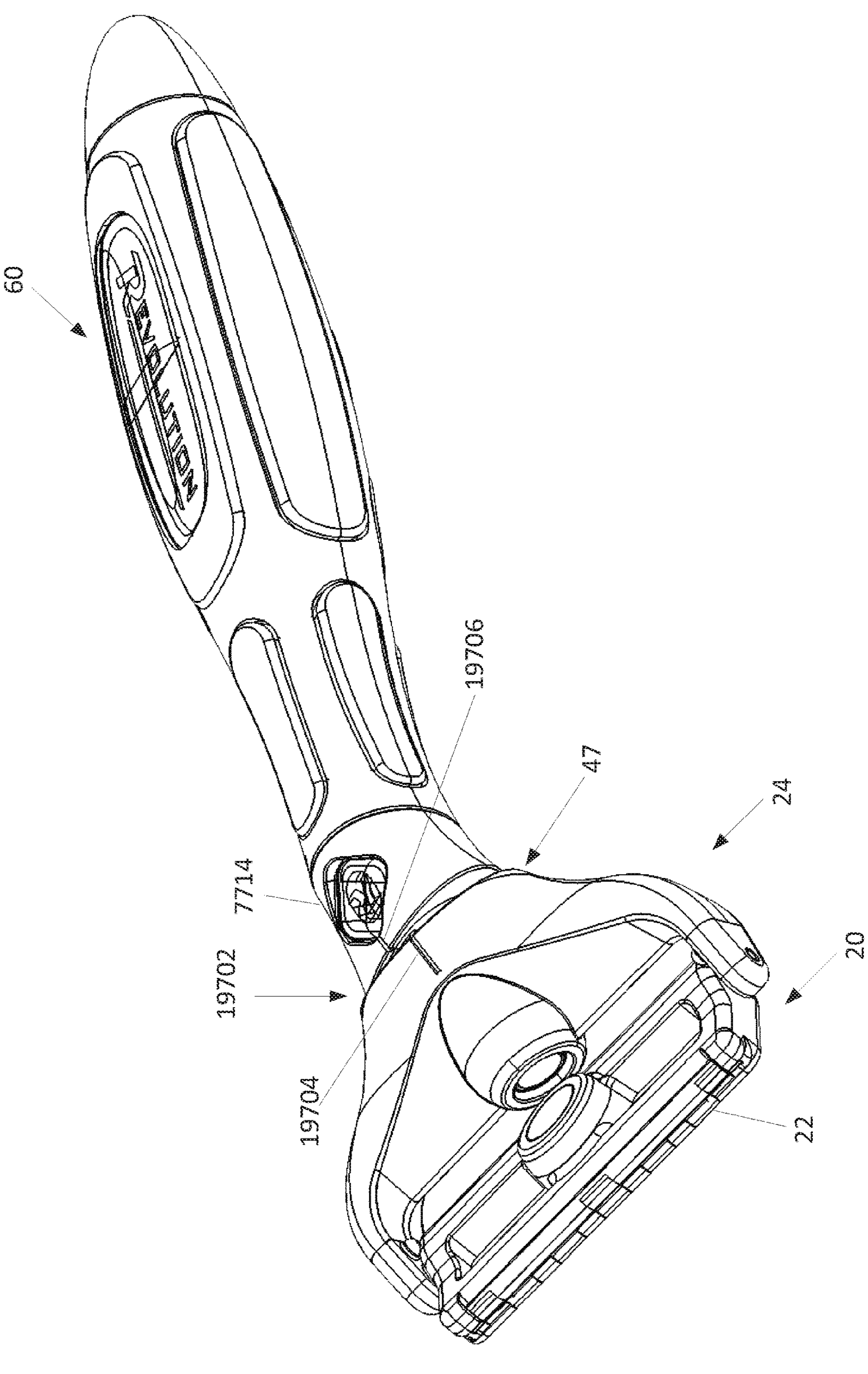
Figure 200:
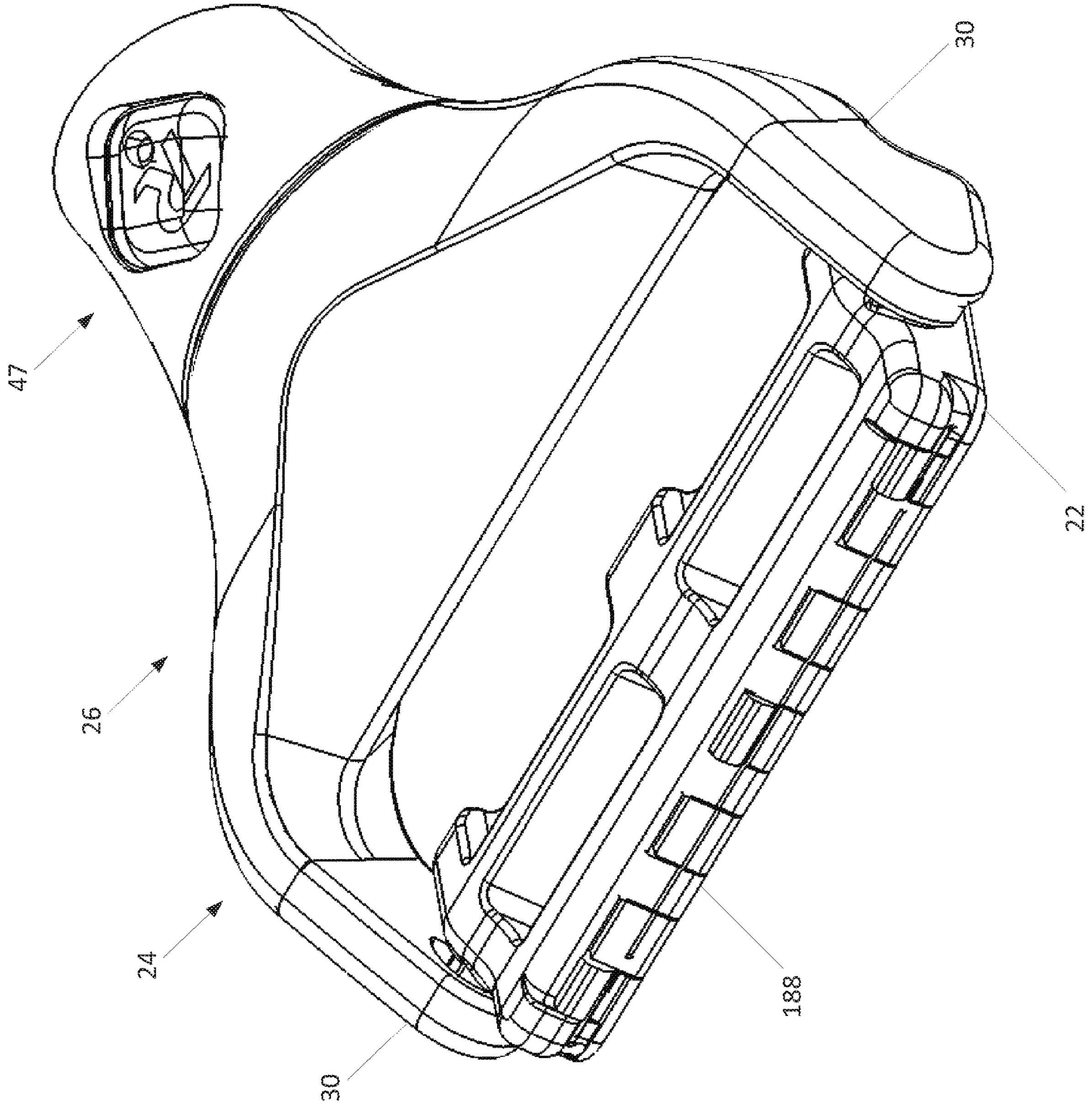
Figure 201:
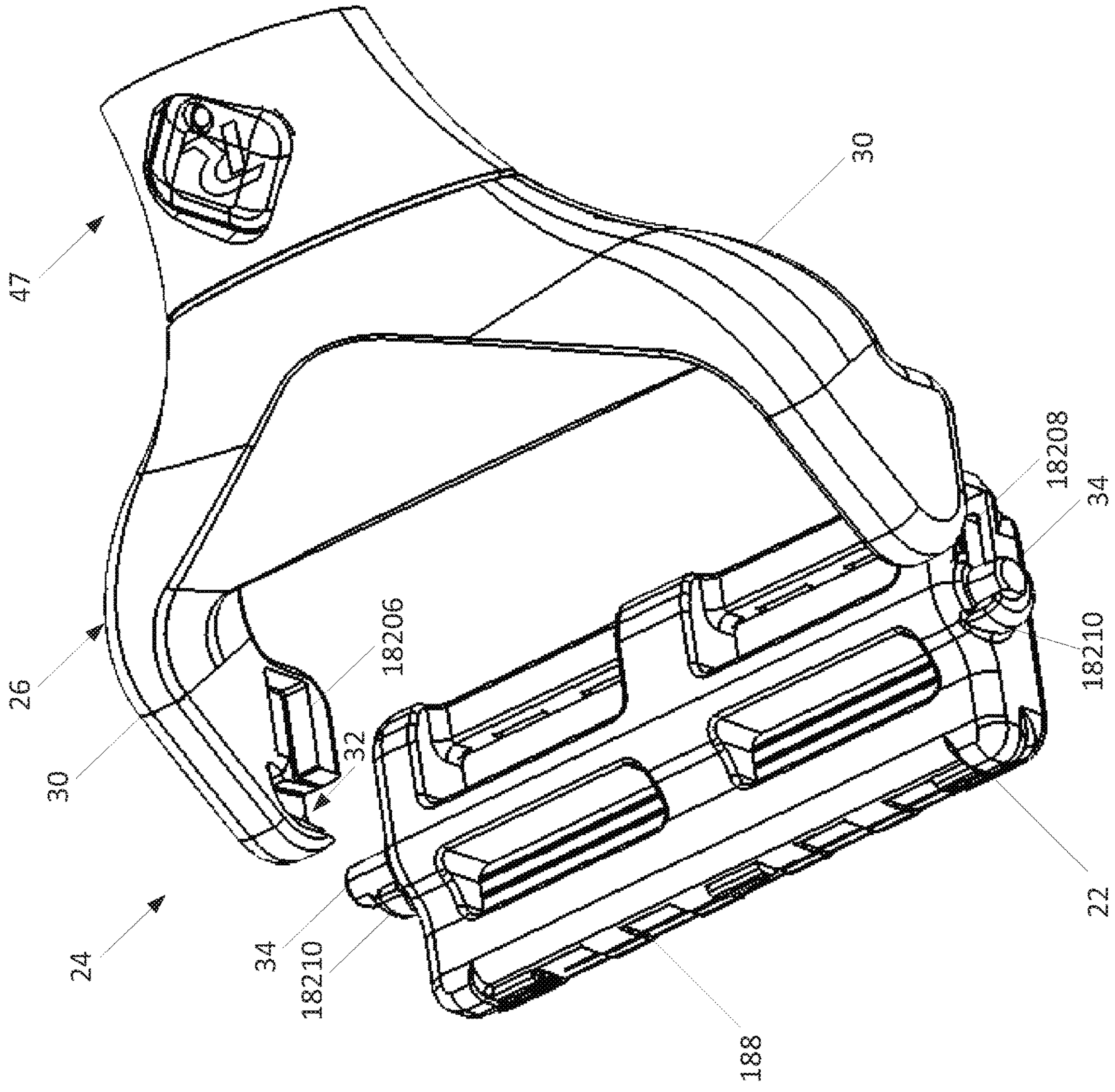
Figure 202:
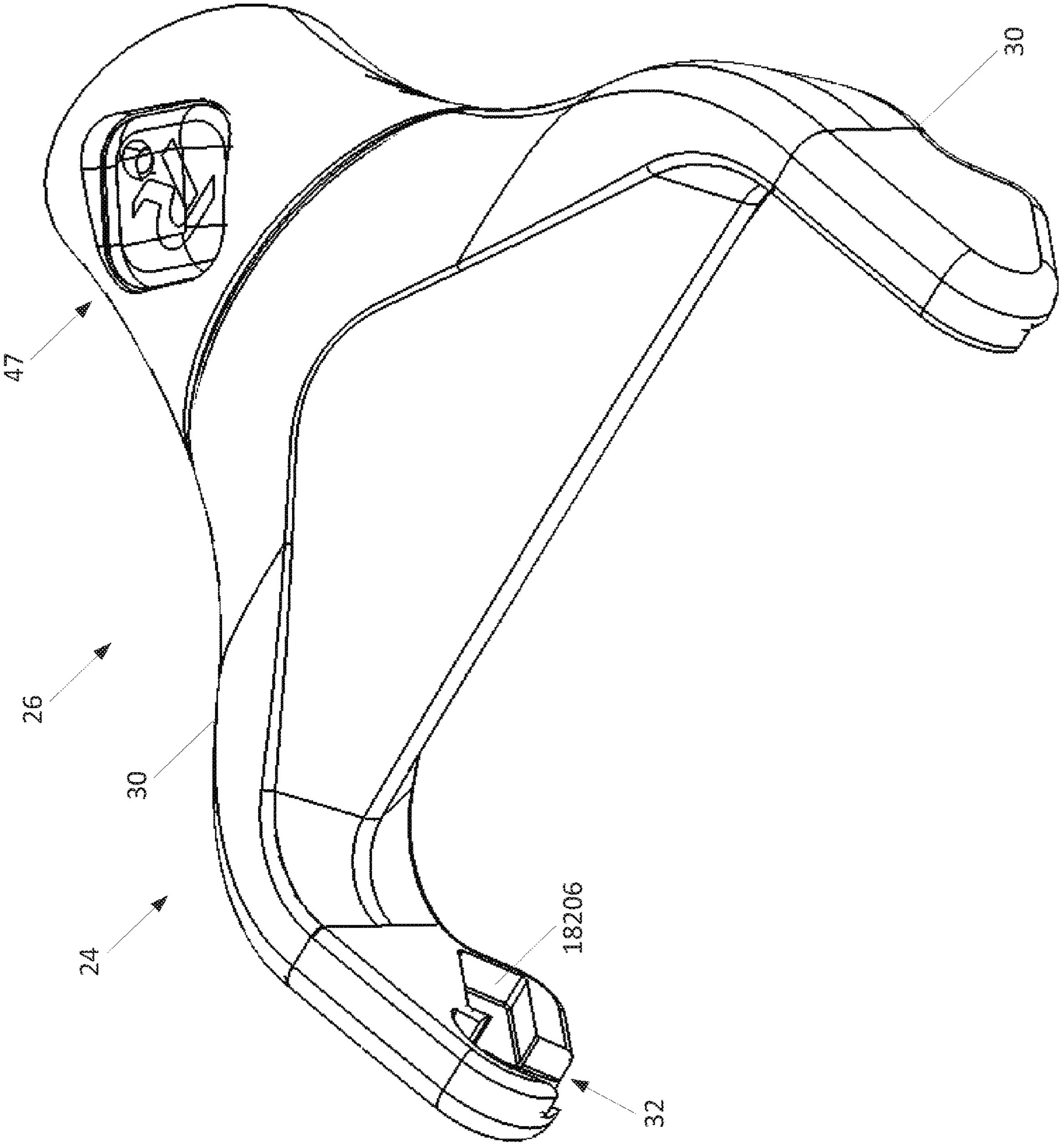
Figure 203:
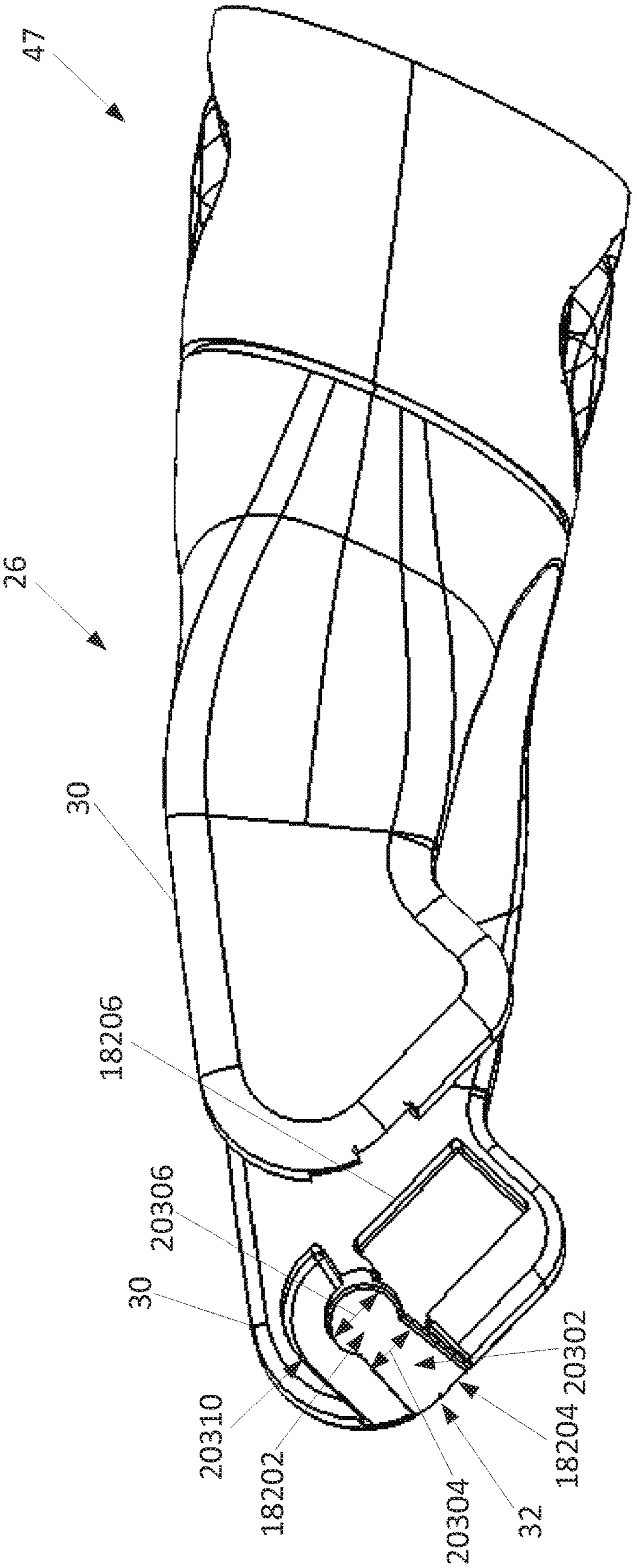
Figure 204:
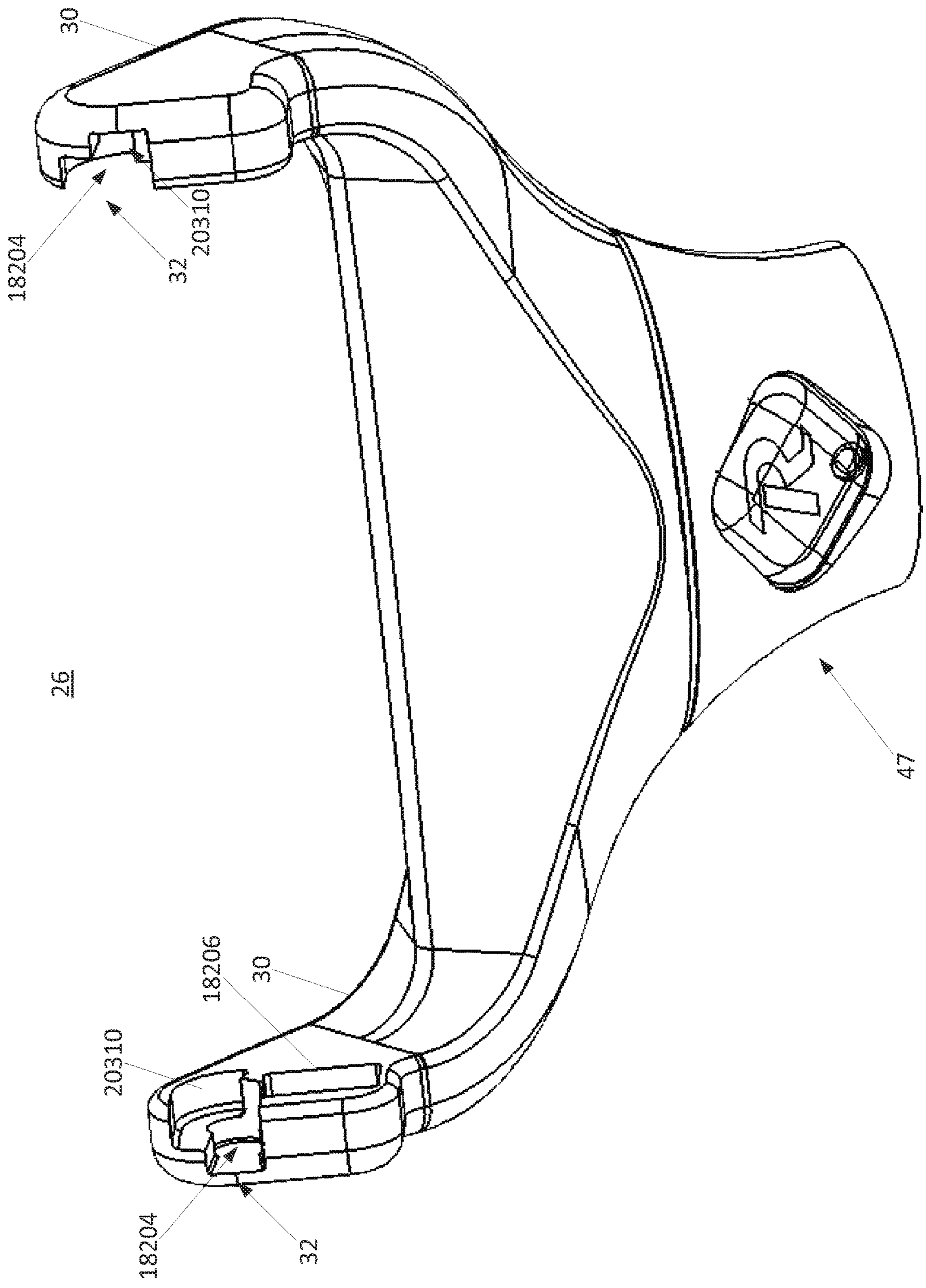
Figure 205:
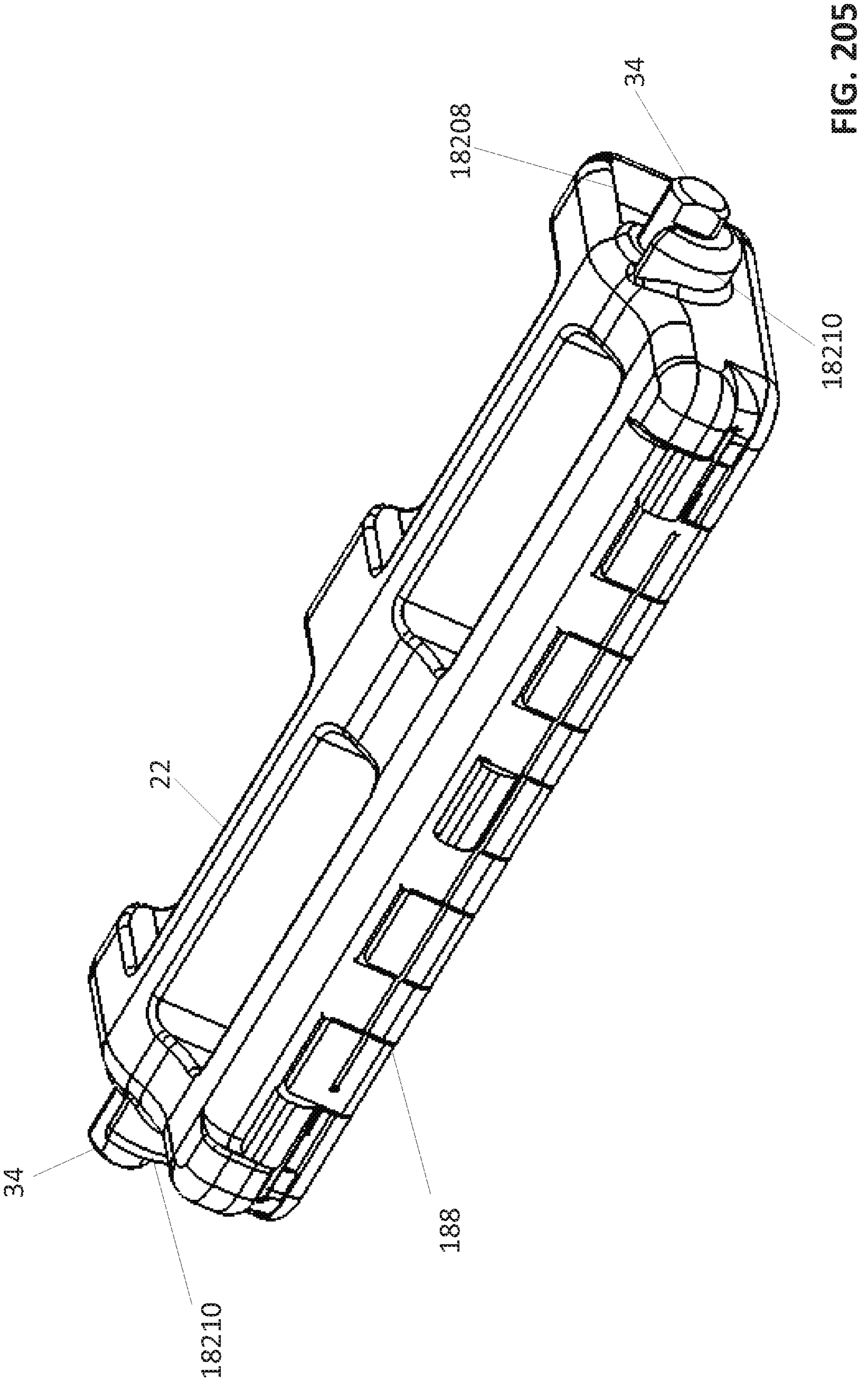
Figure 206:
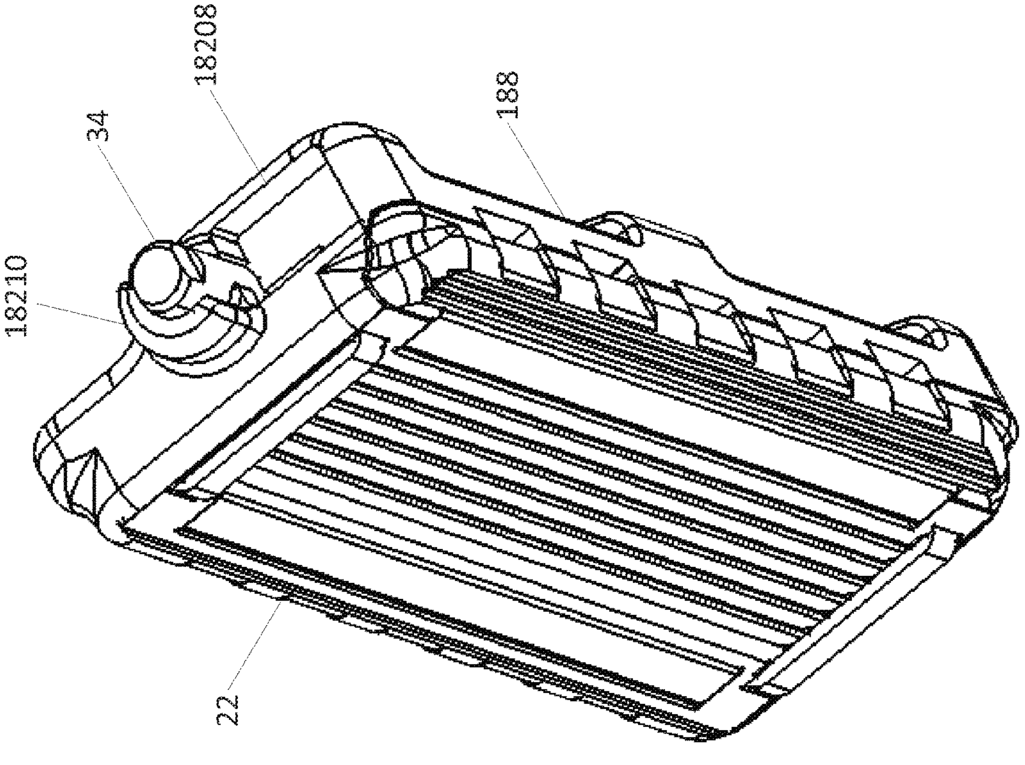
Figure 207:
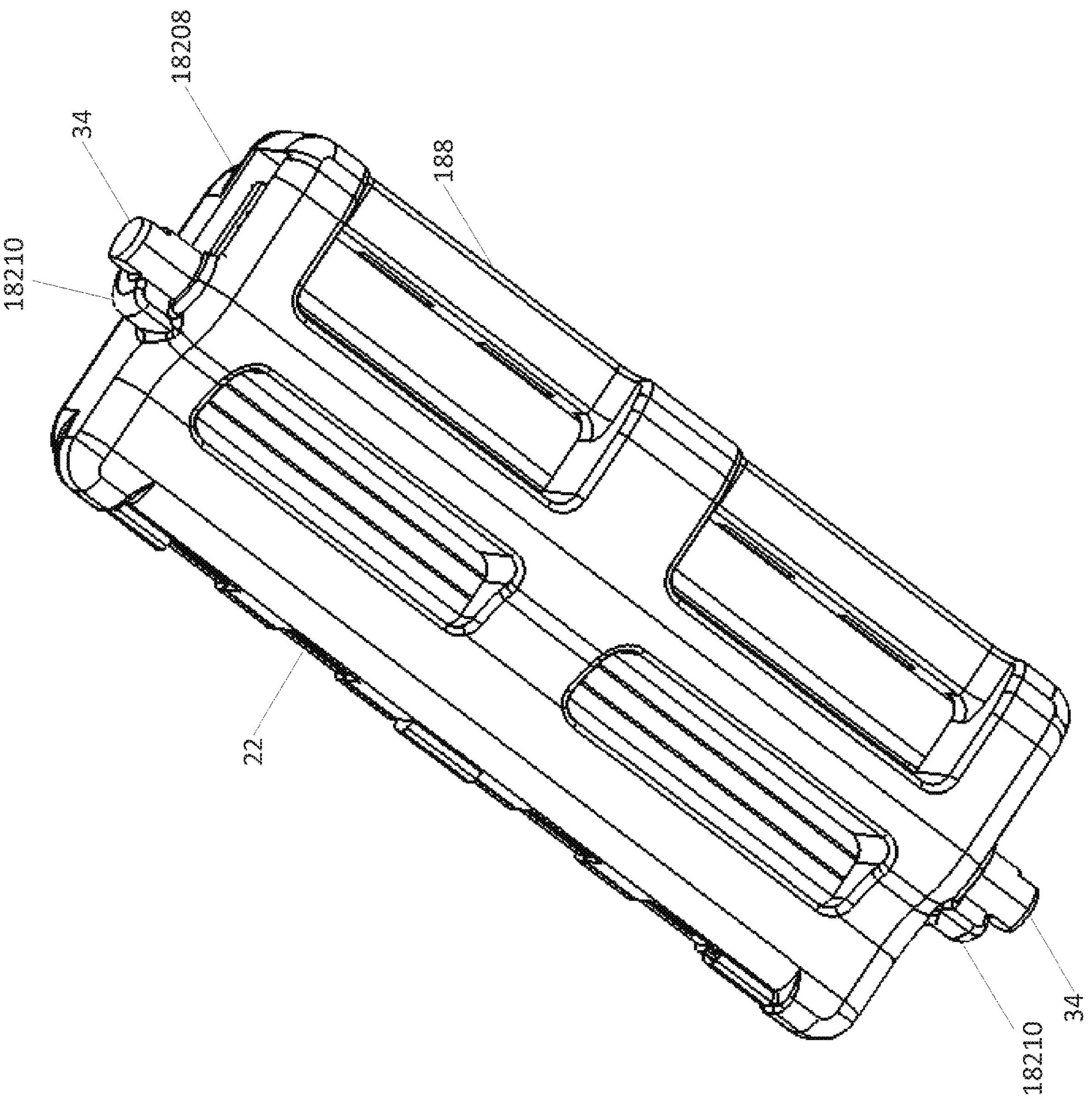
Figure 208:
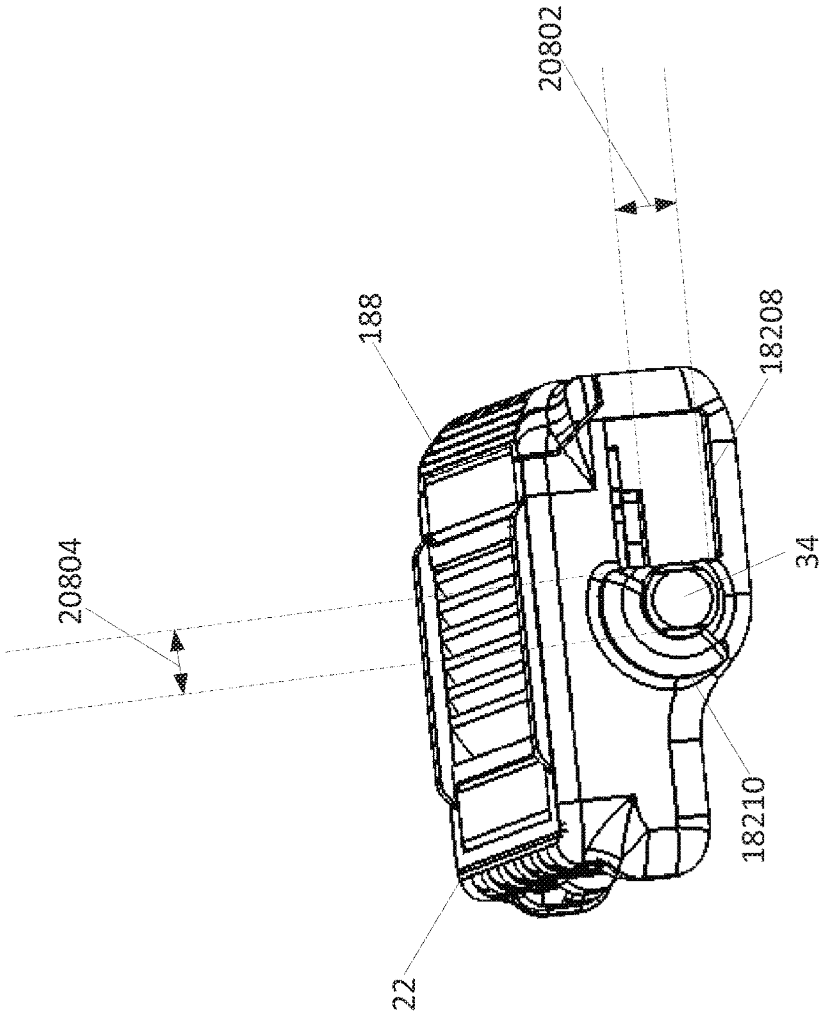
Figure 209:
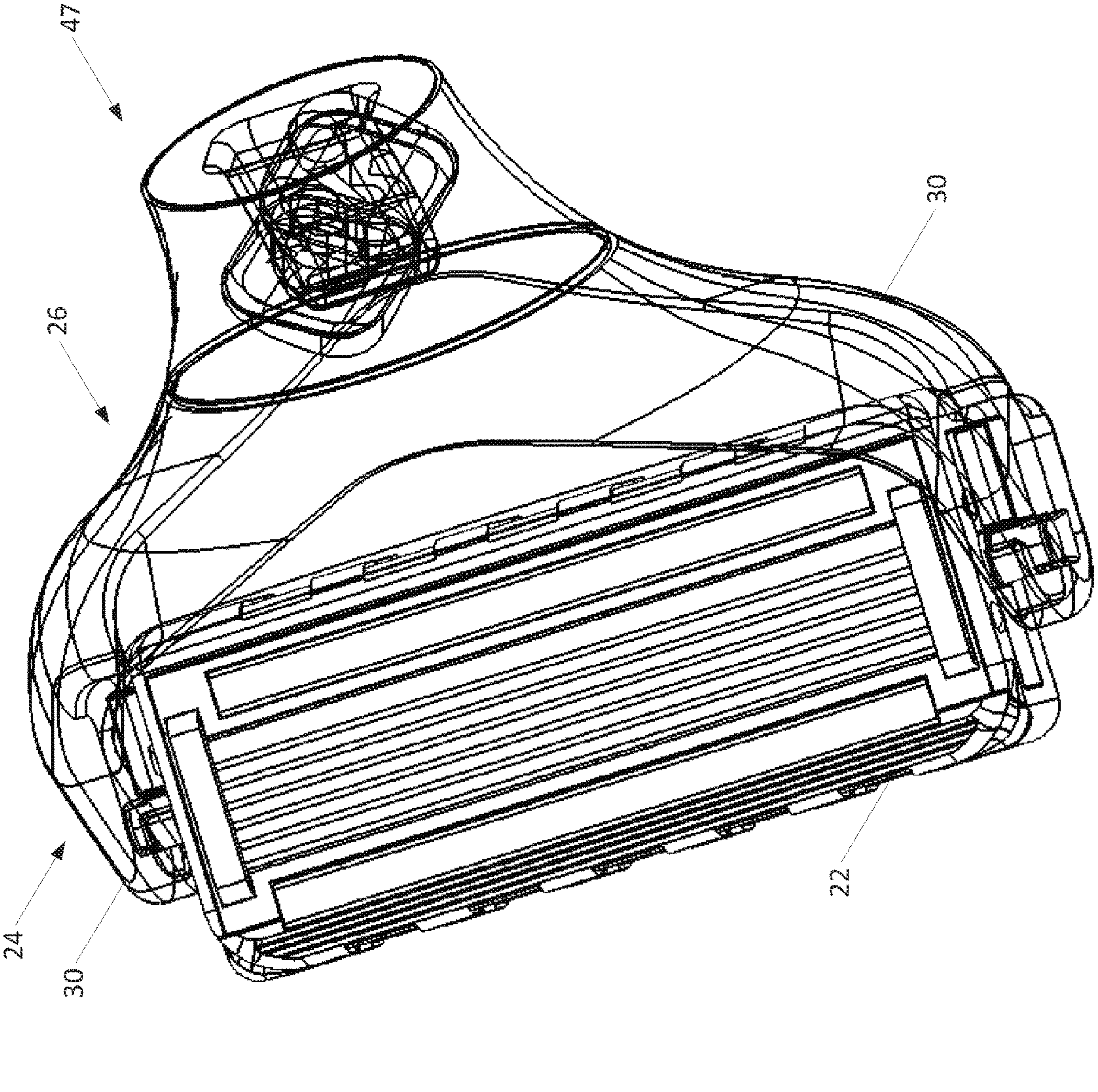
Figure 210:
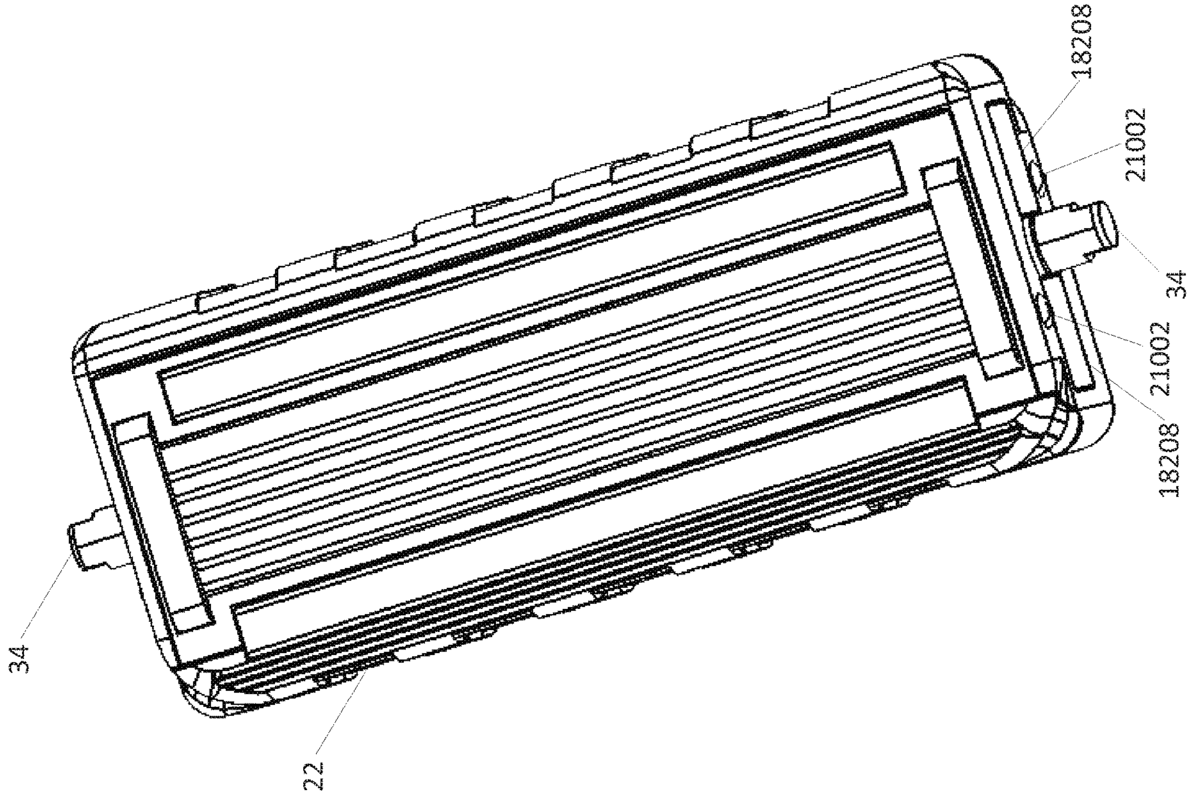
Figure 211:
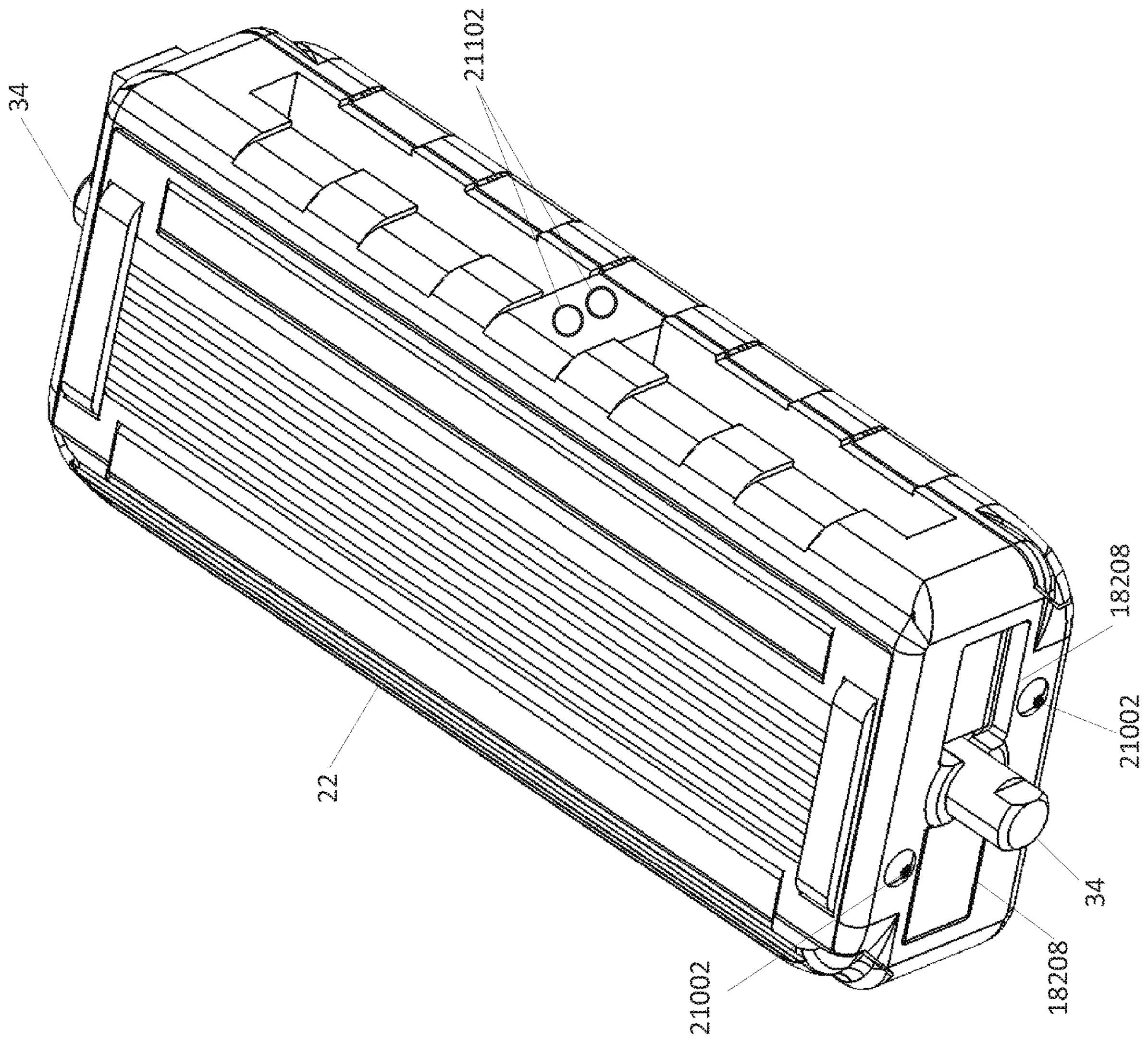
Figure 212:
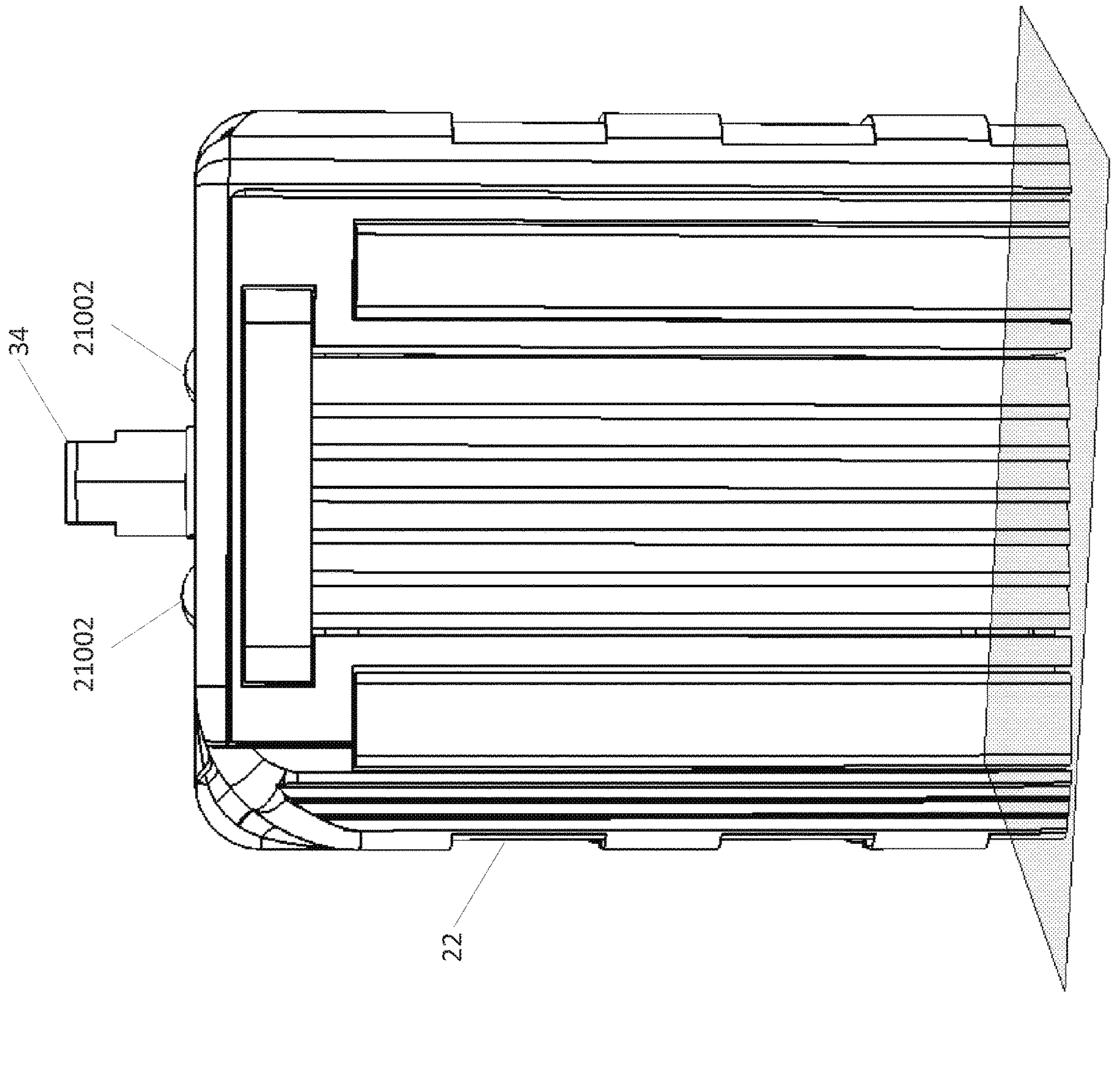
Figure 213:
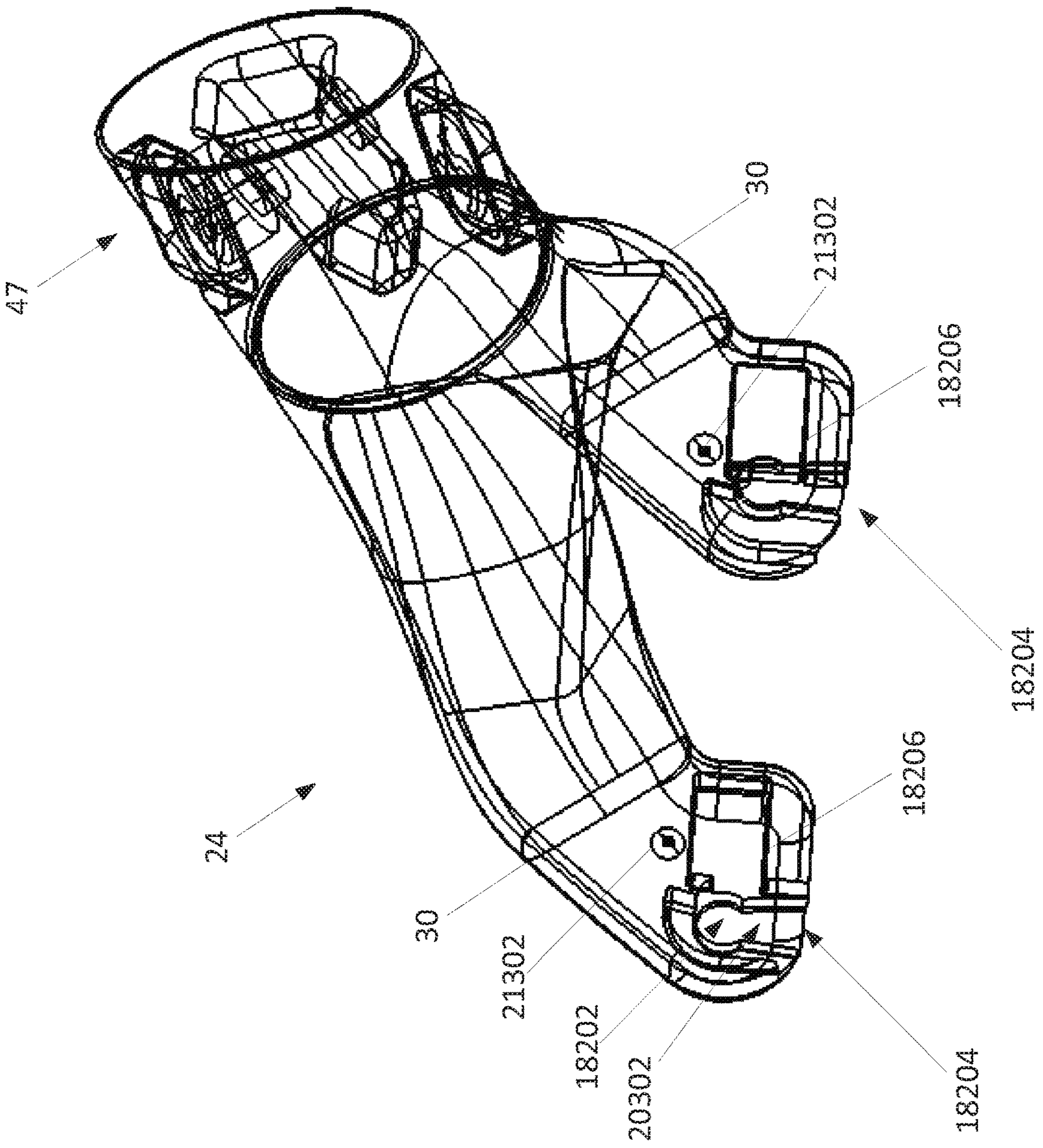
Figure 214:
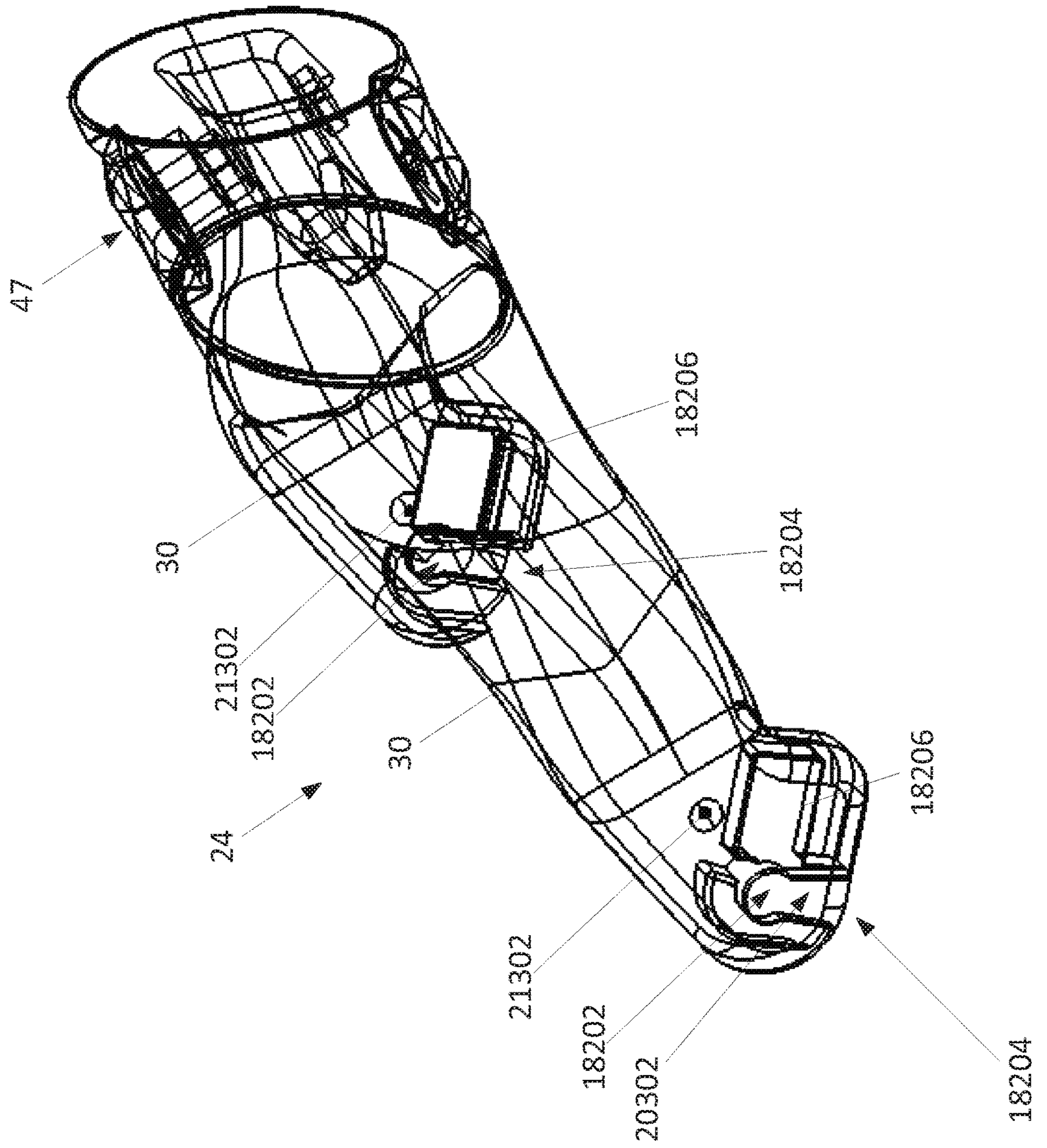
Figure 215:
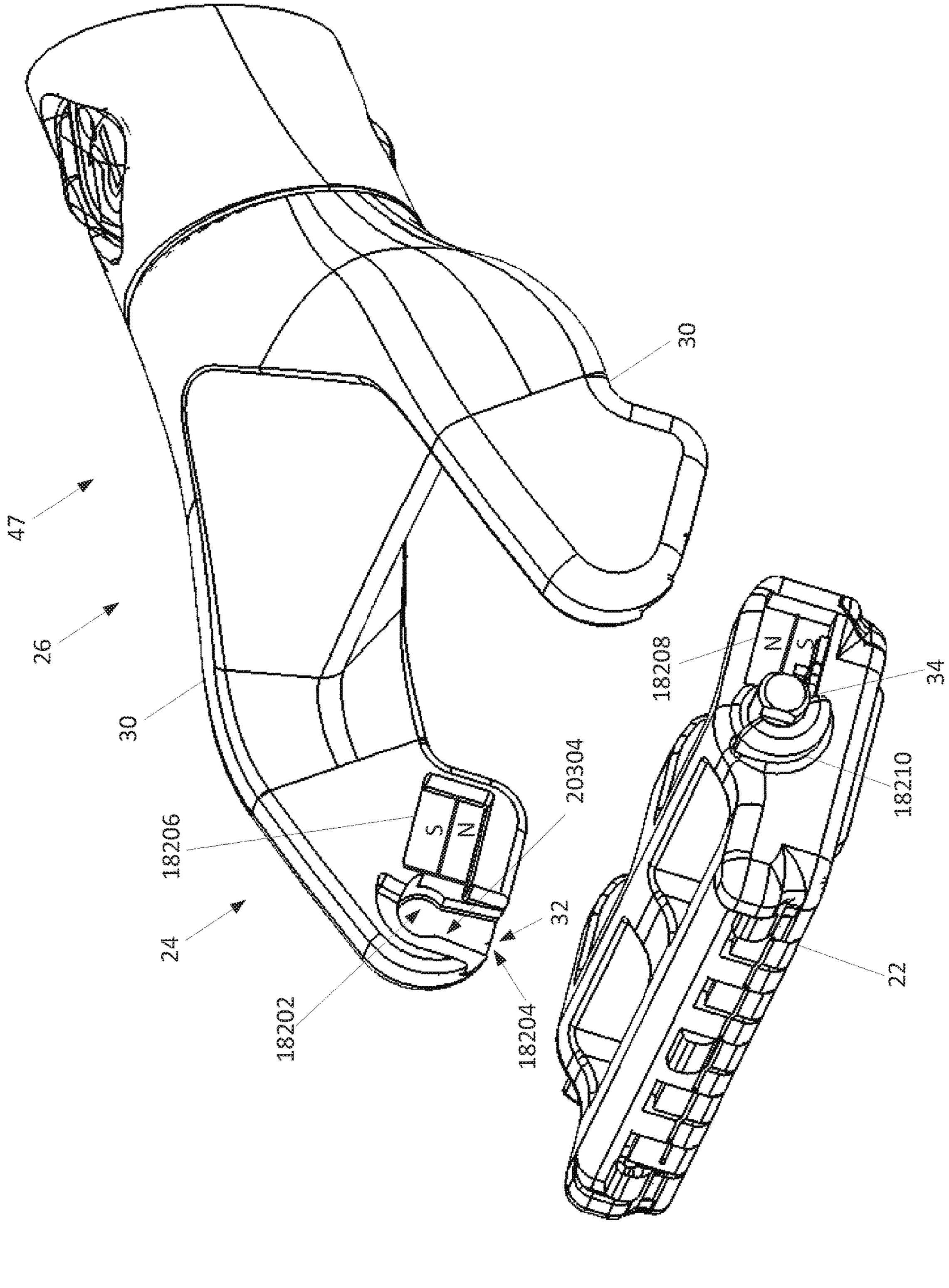
Figure 216:
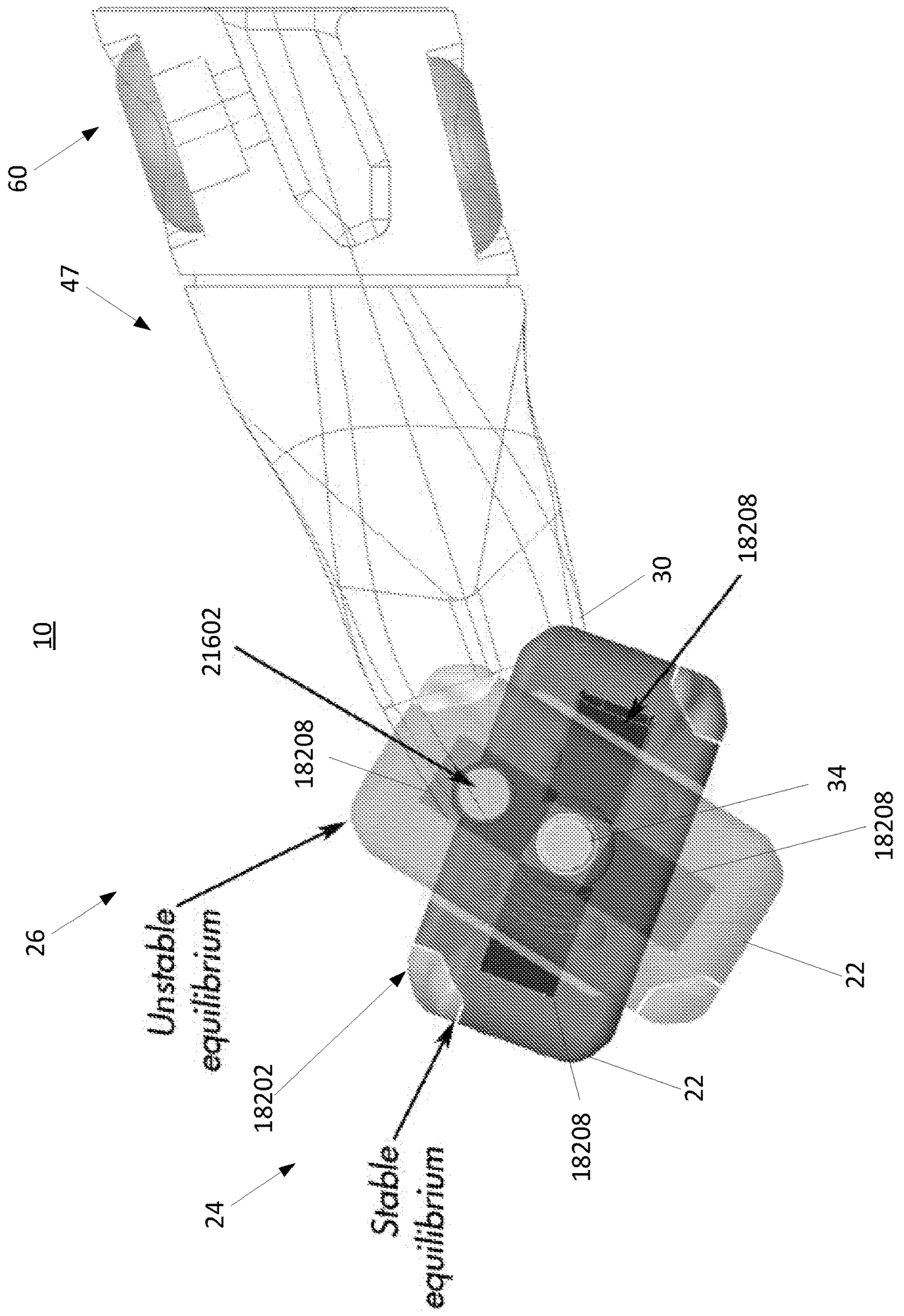
Figure 217:
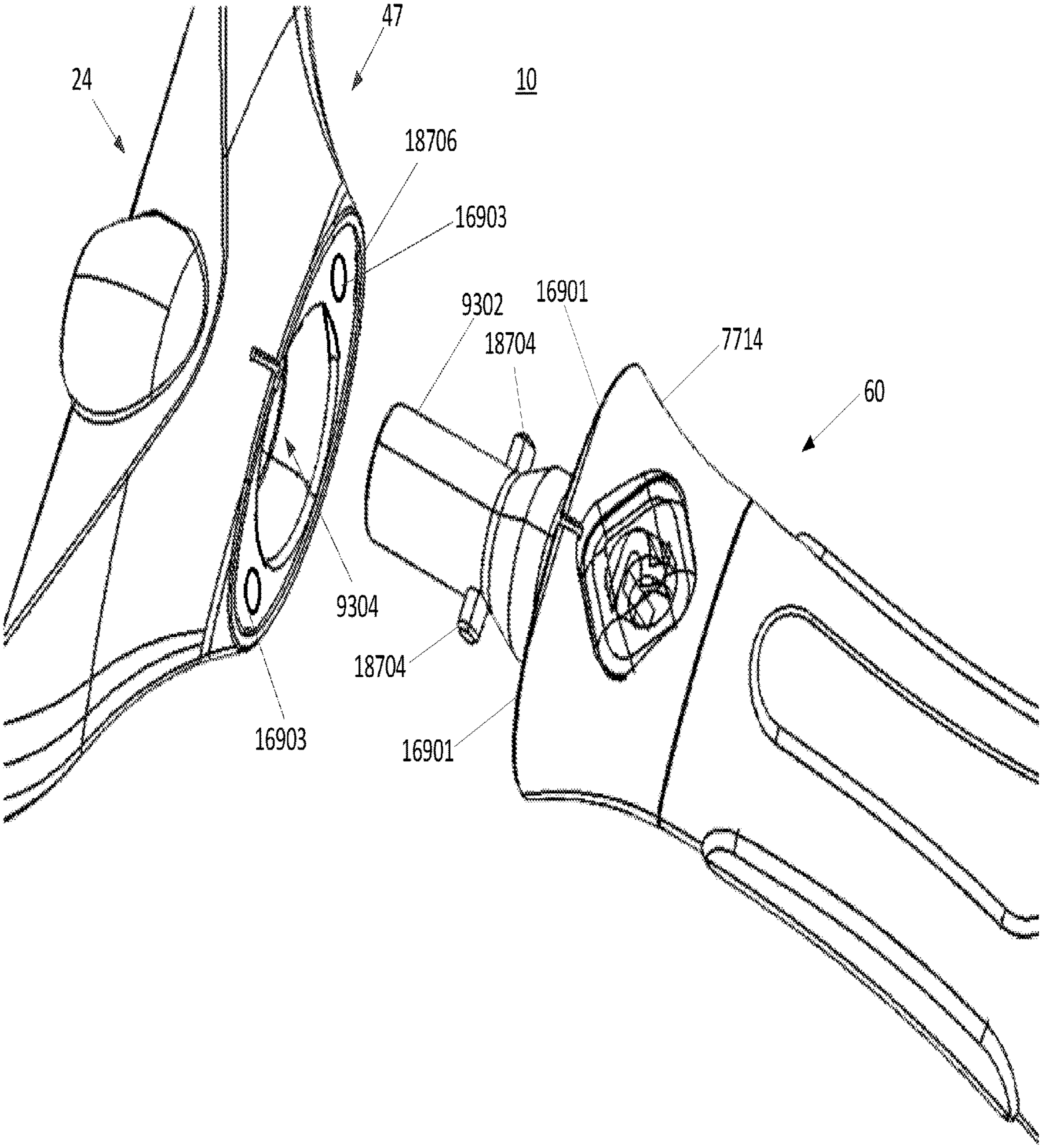
Figure 218:
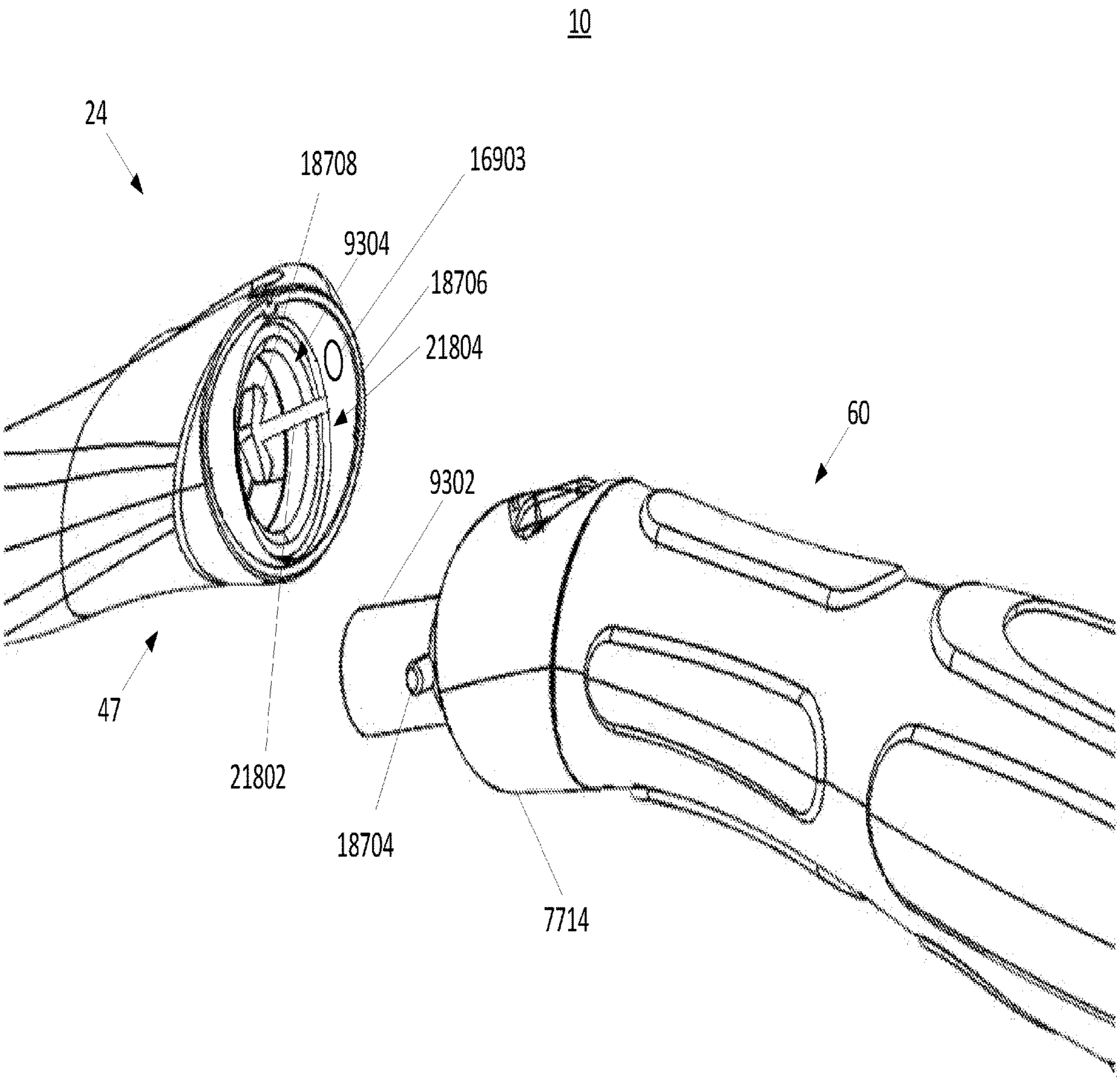
Figure 219:
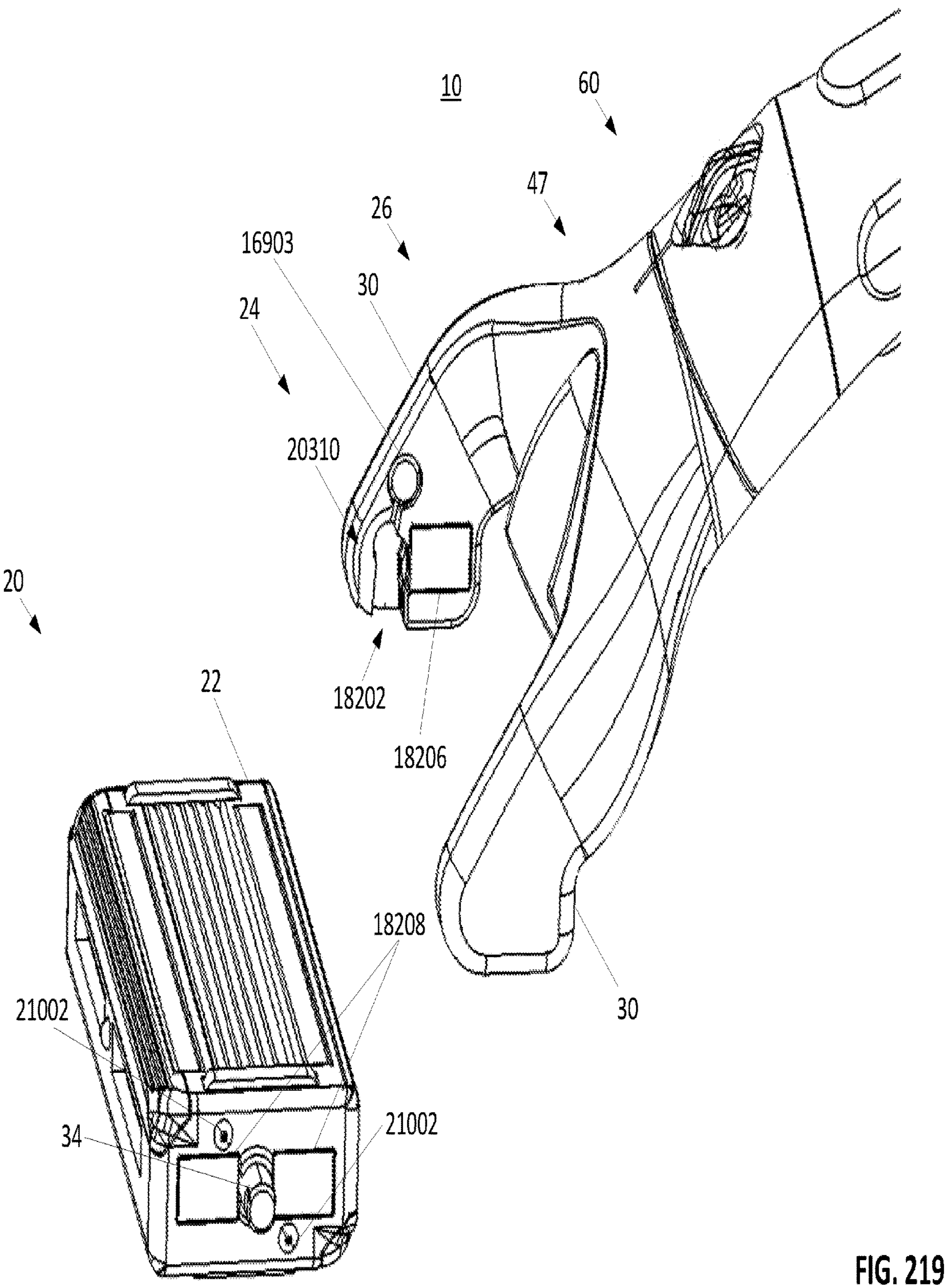
Figure 220:
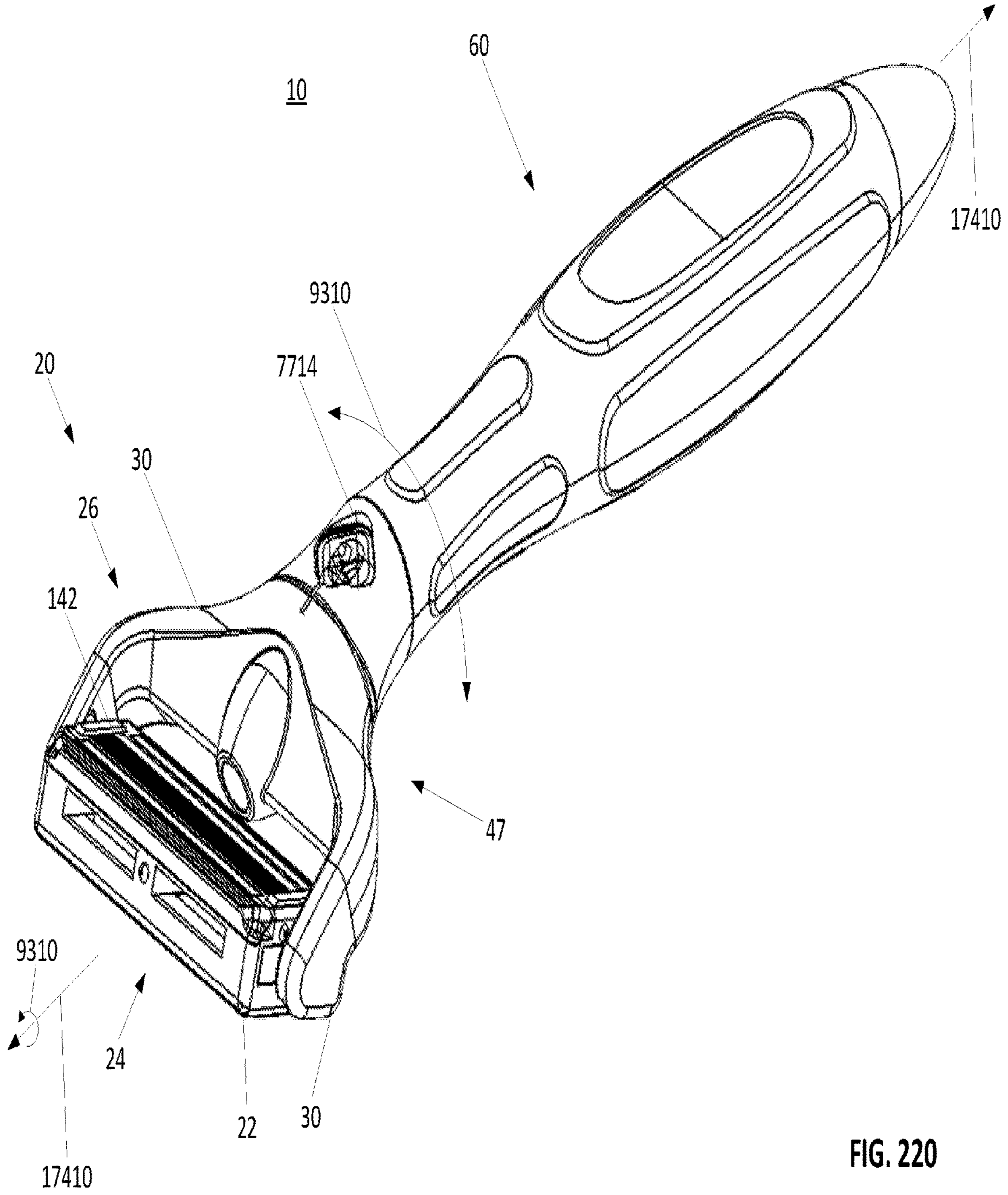
Figure 221:
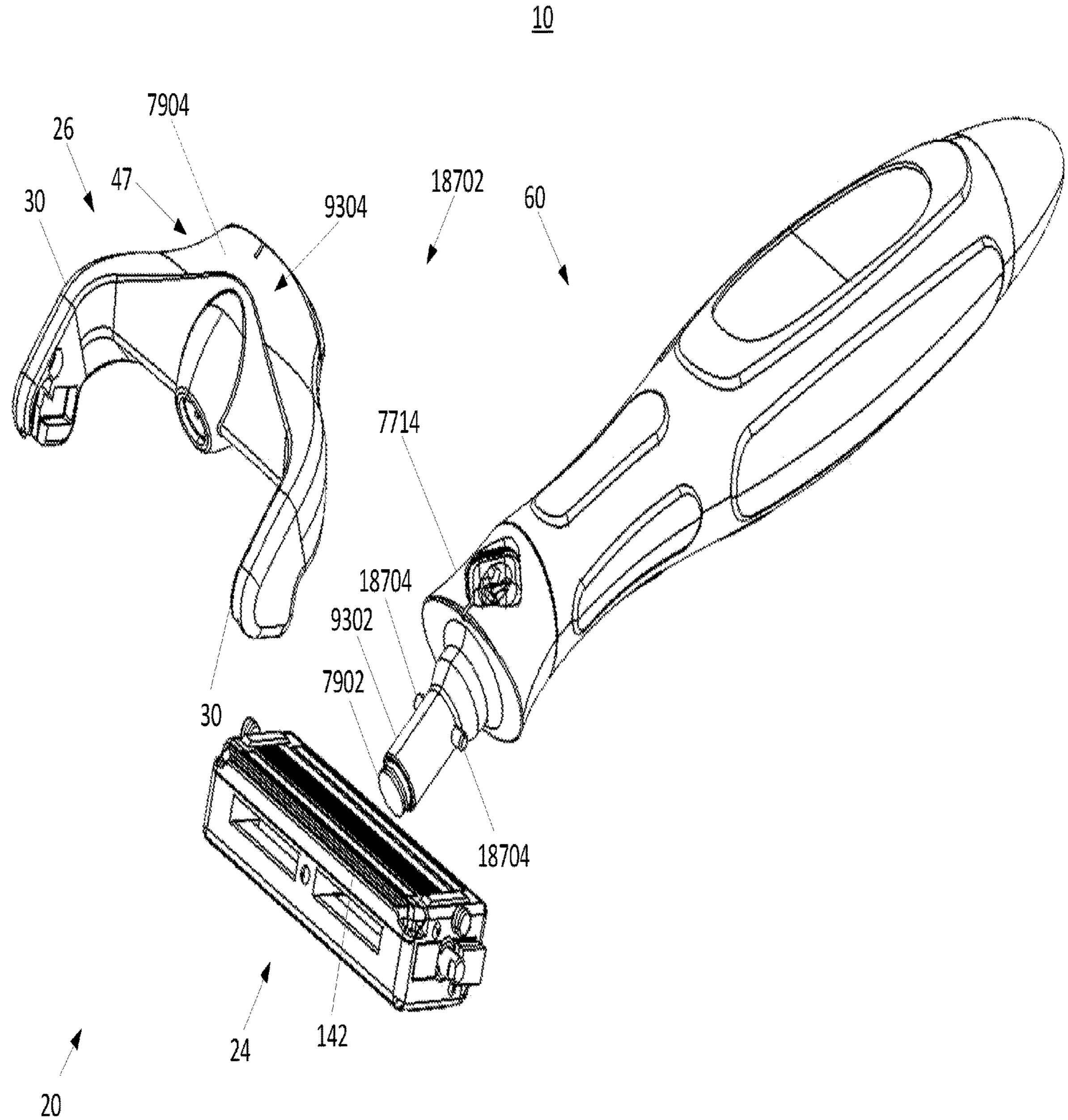
Figure 222:
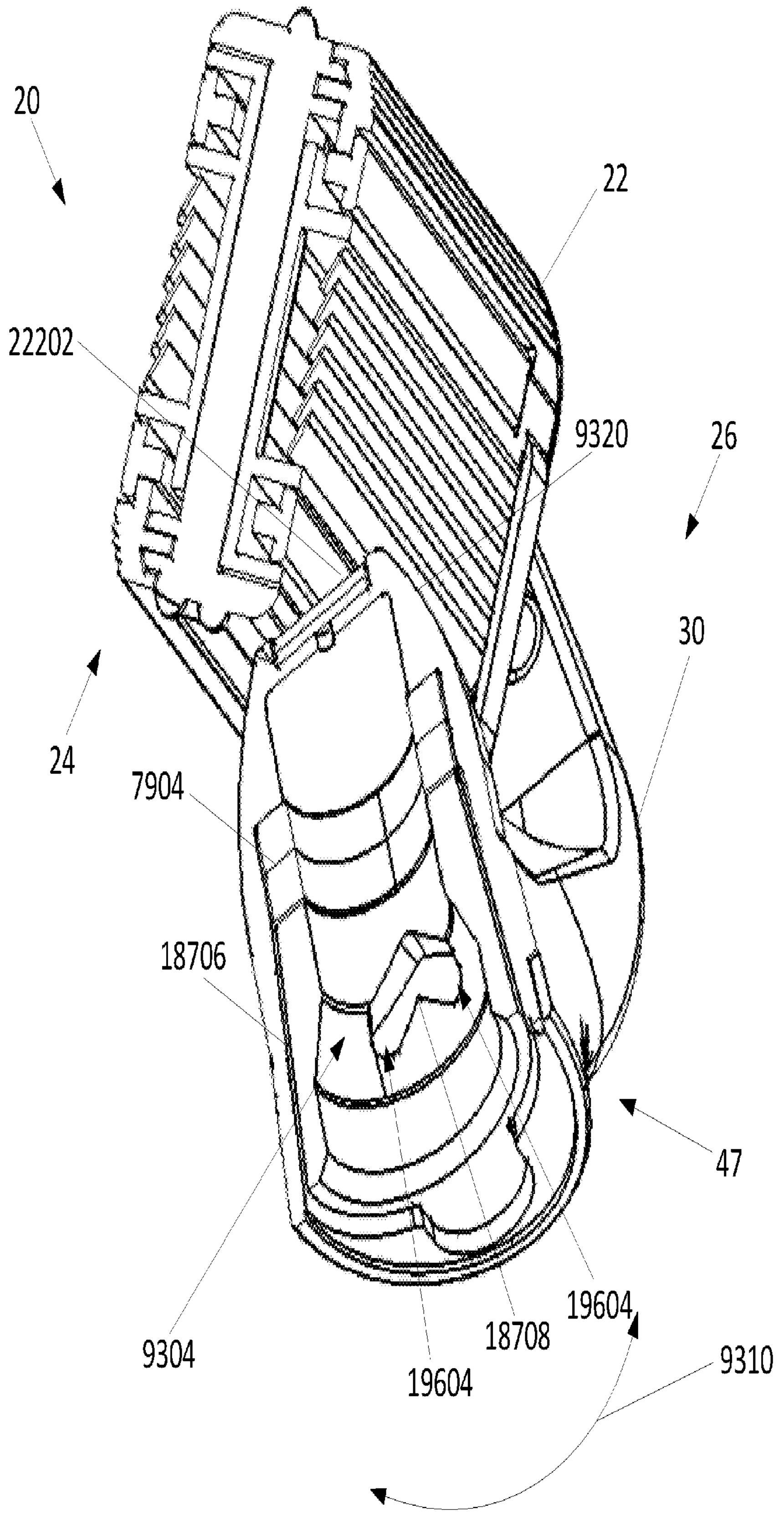
Figure 223:
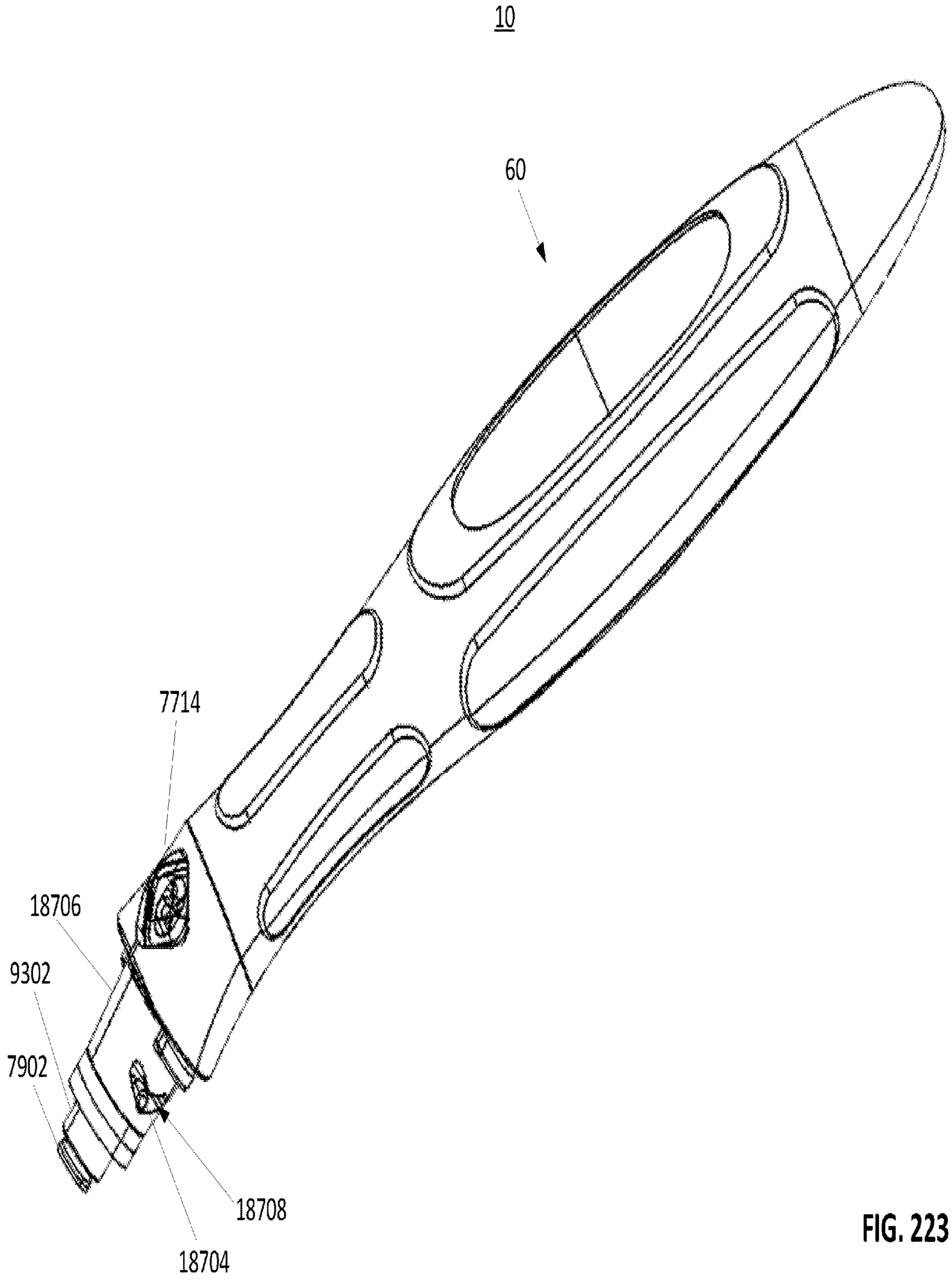
Figure 224:
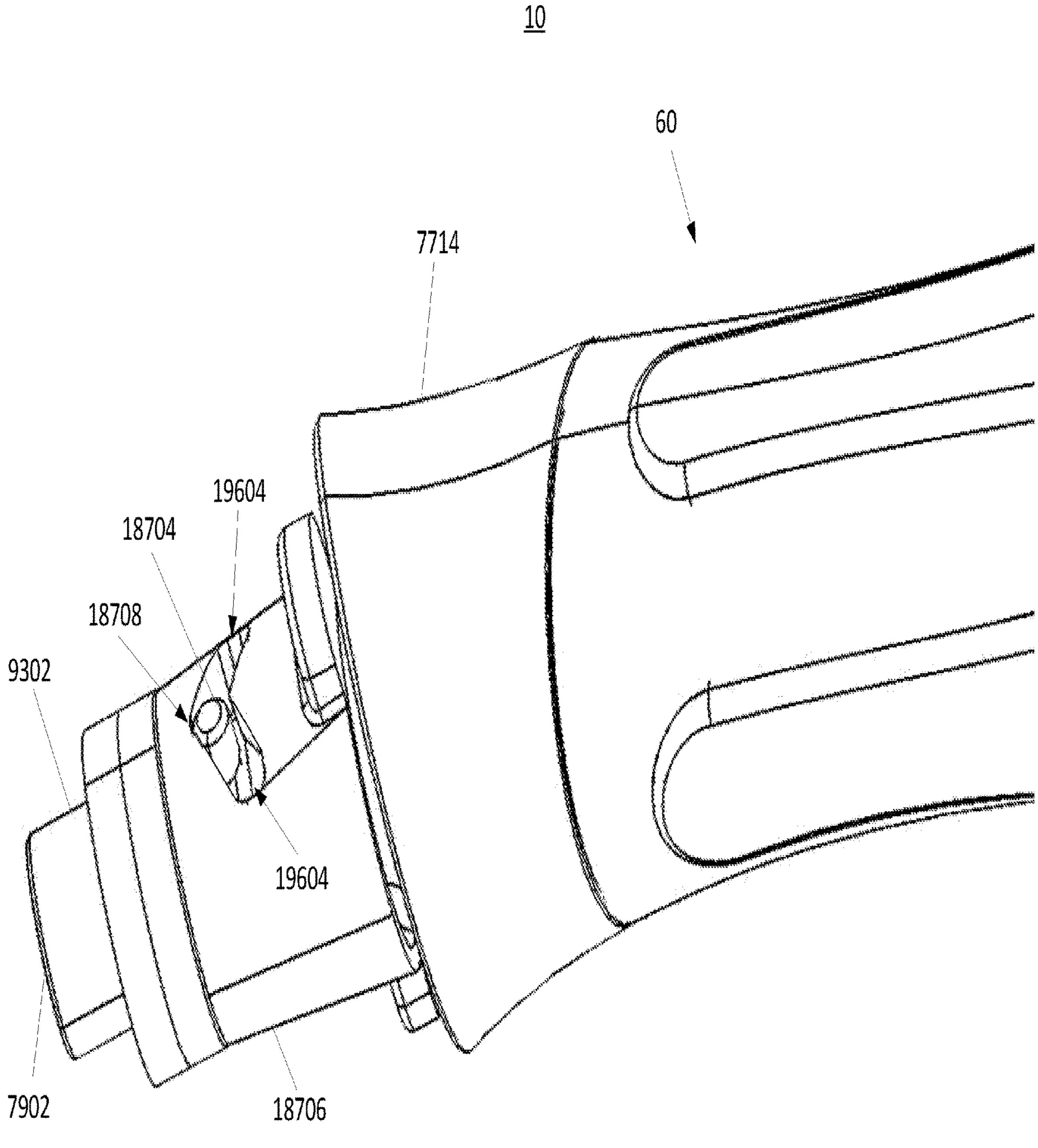
Figure 225:
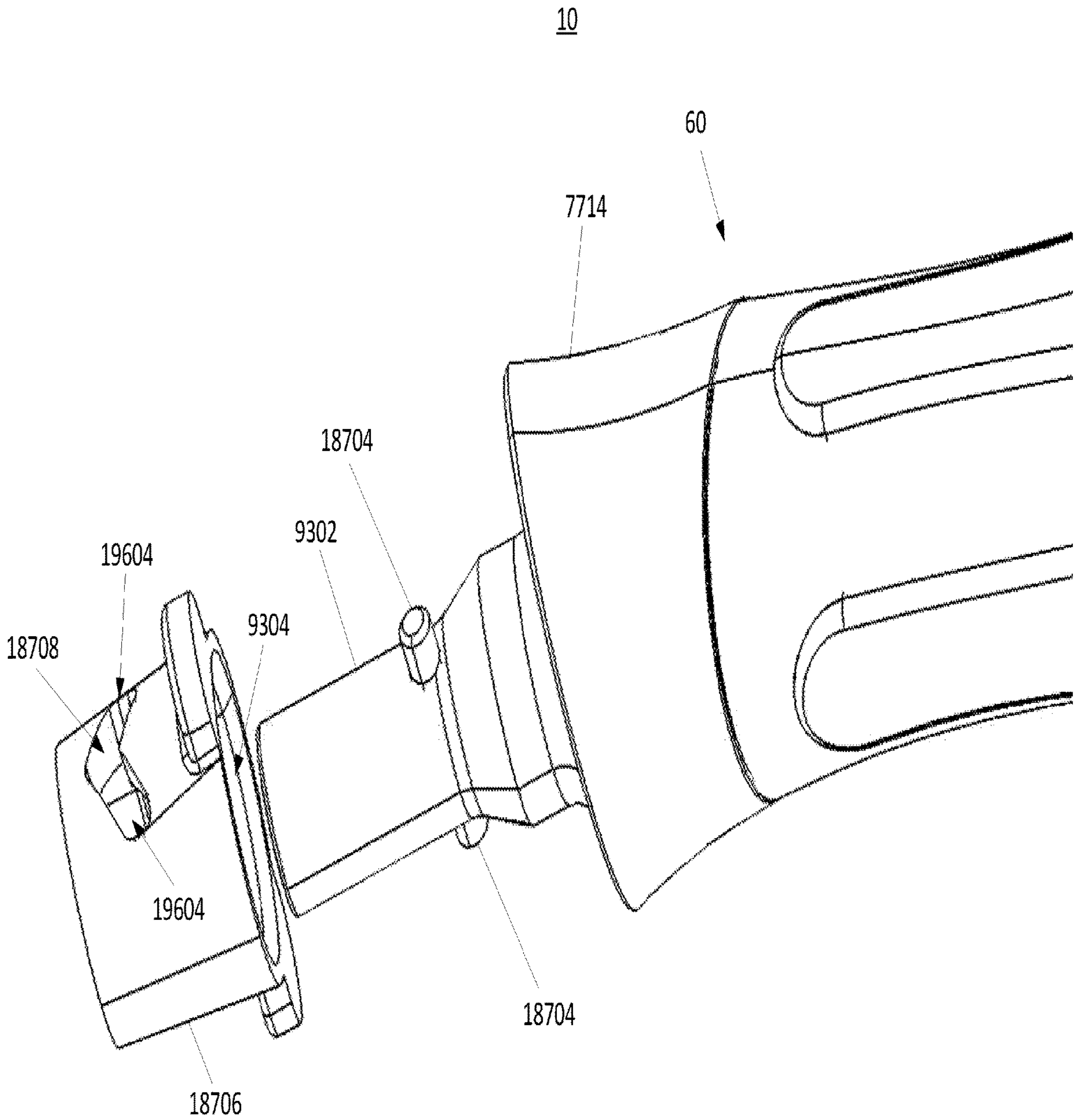
Figure 226:
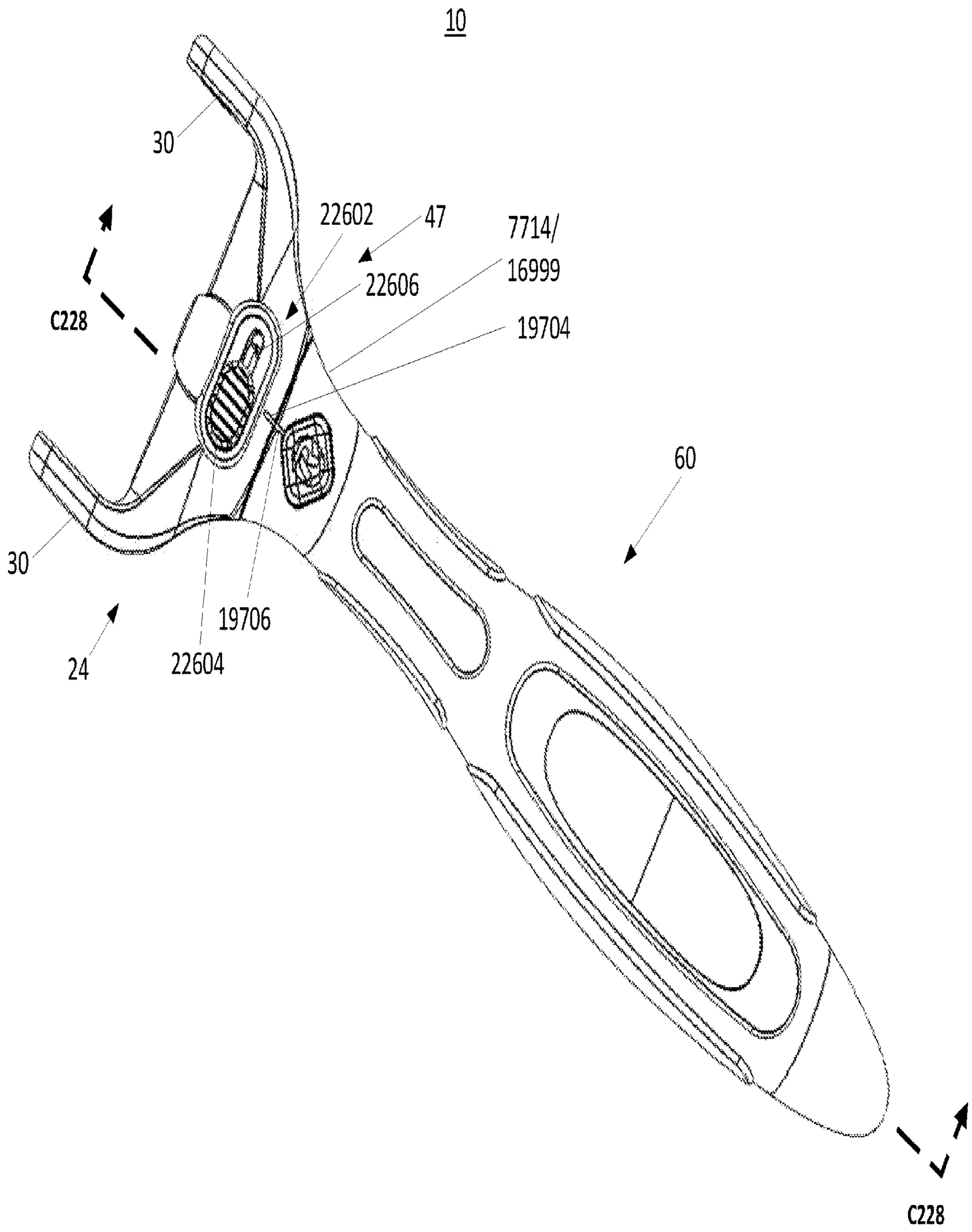
Figure 227:
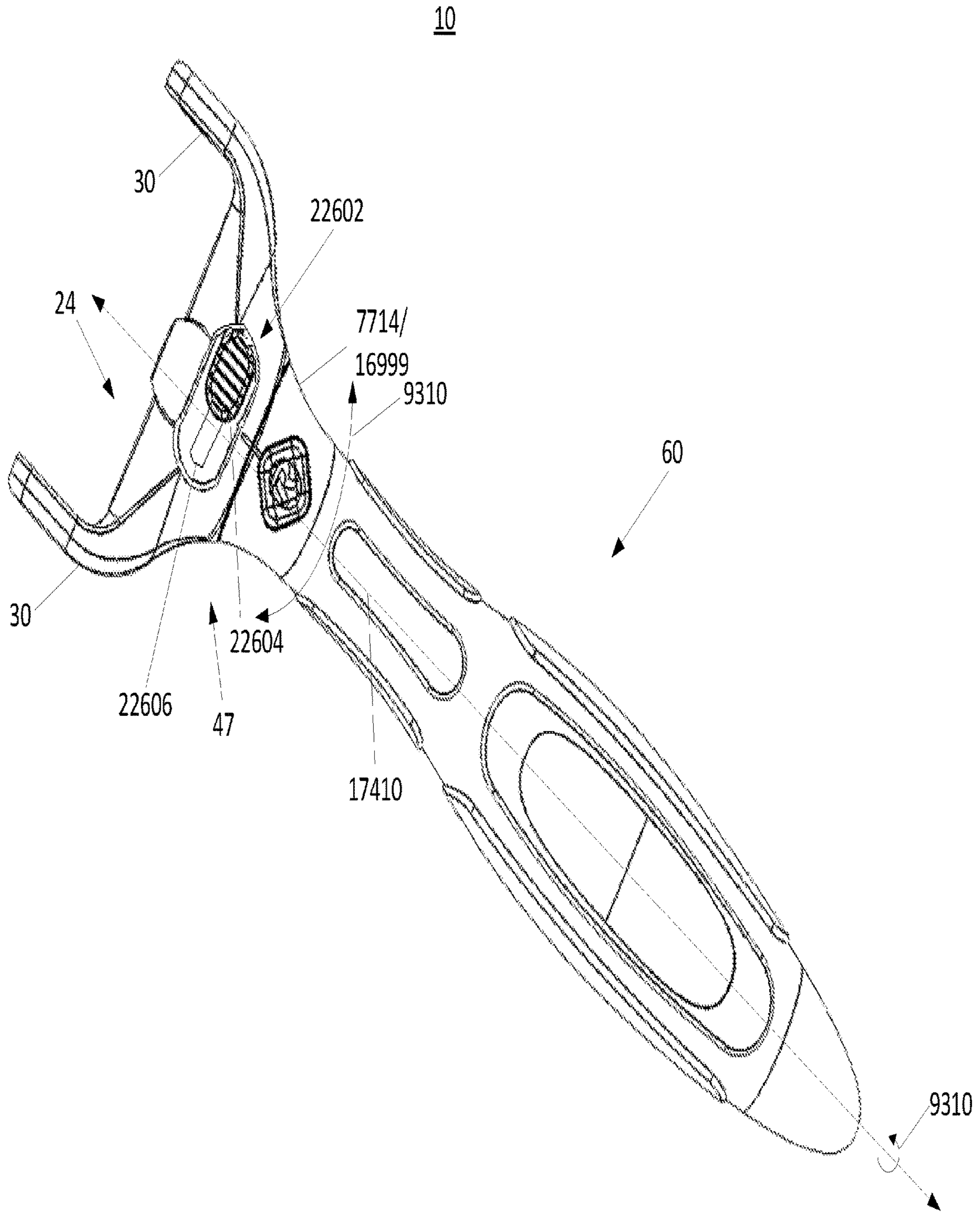
Figure 228:
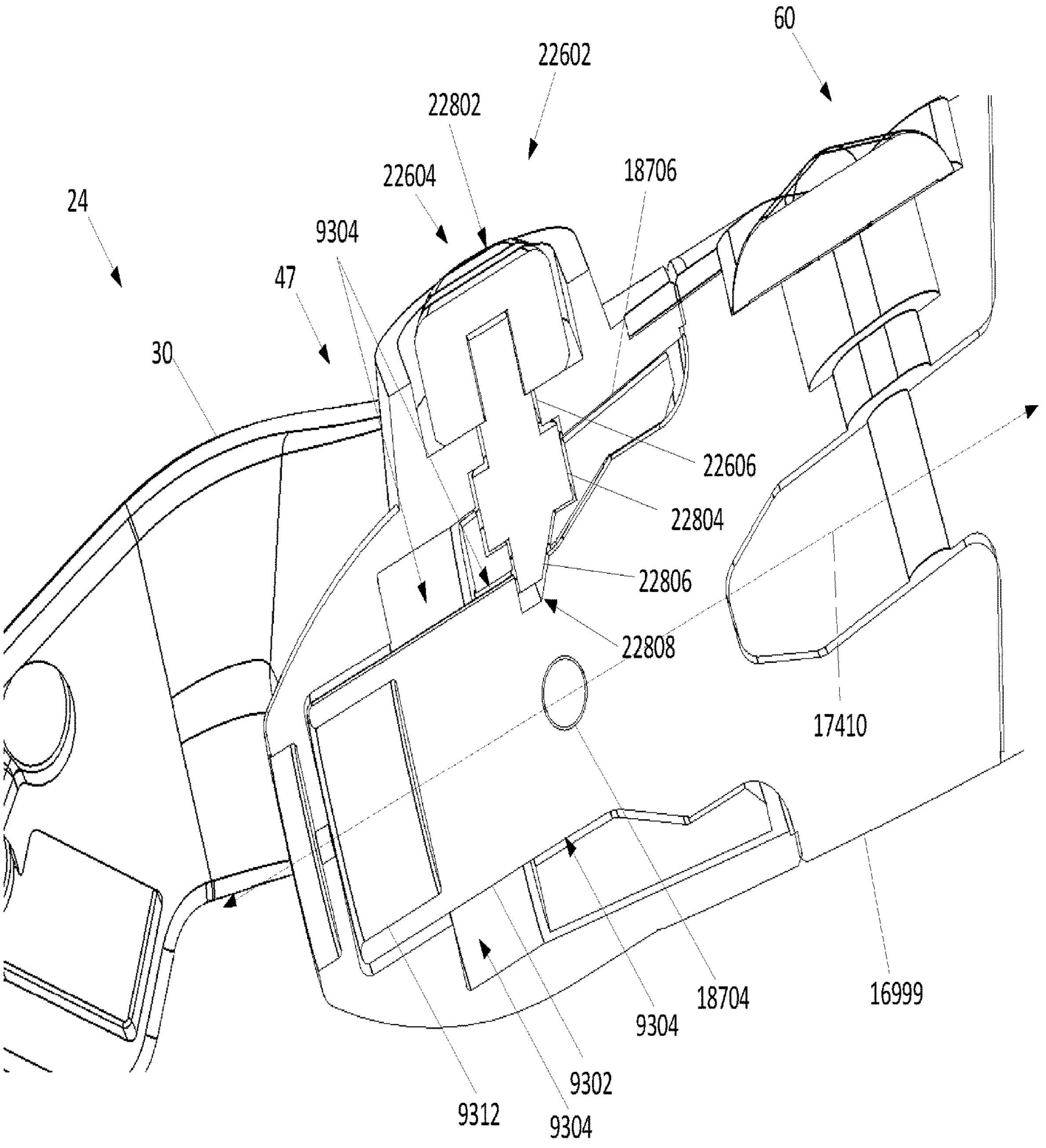
Figure 229:
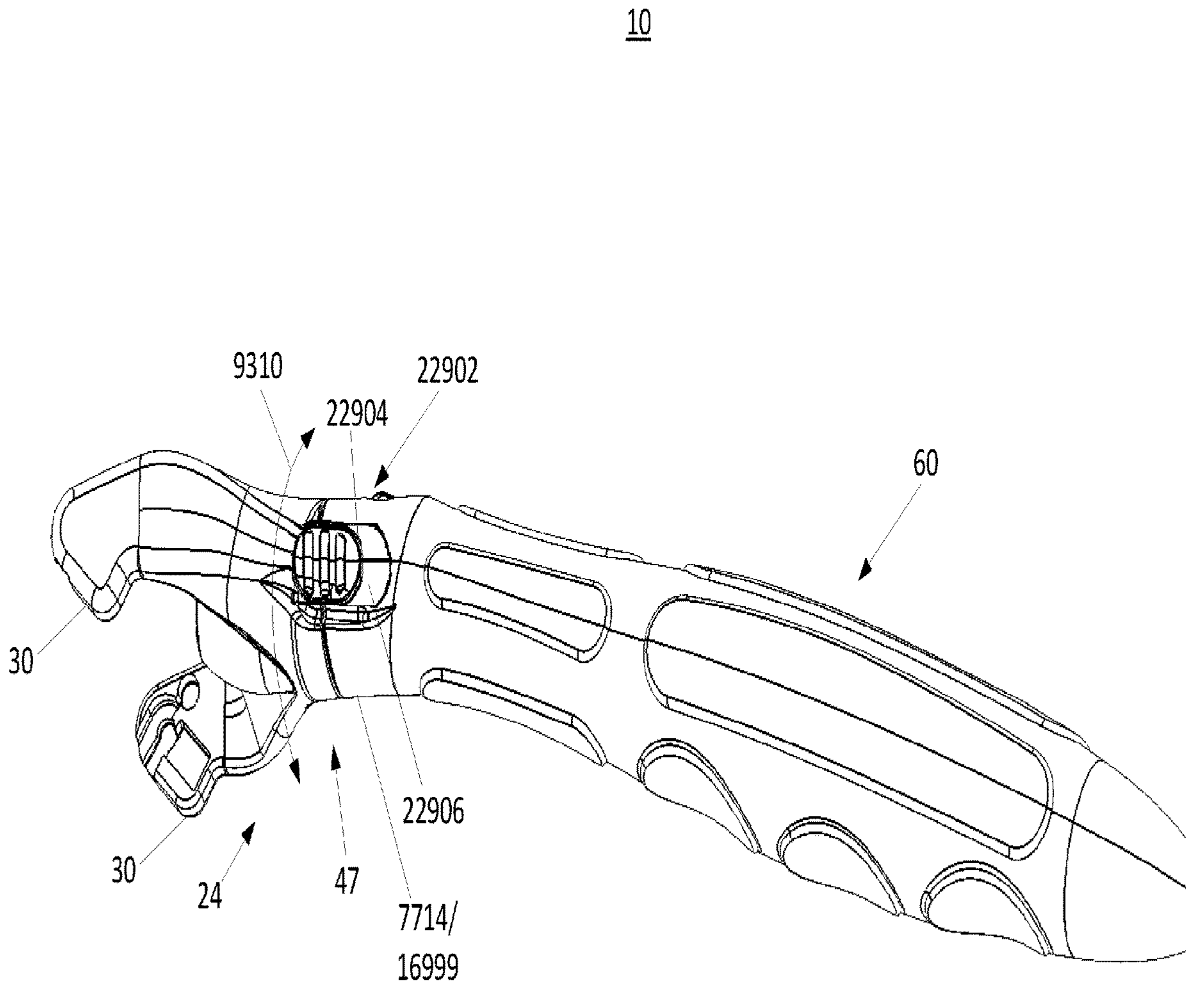
Figure 230:
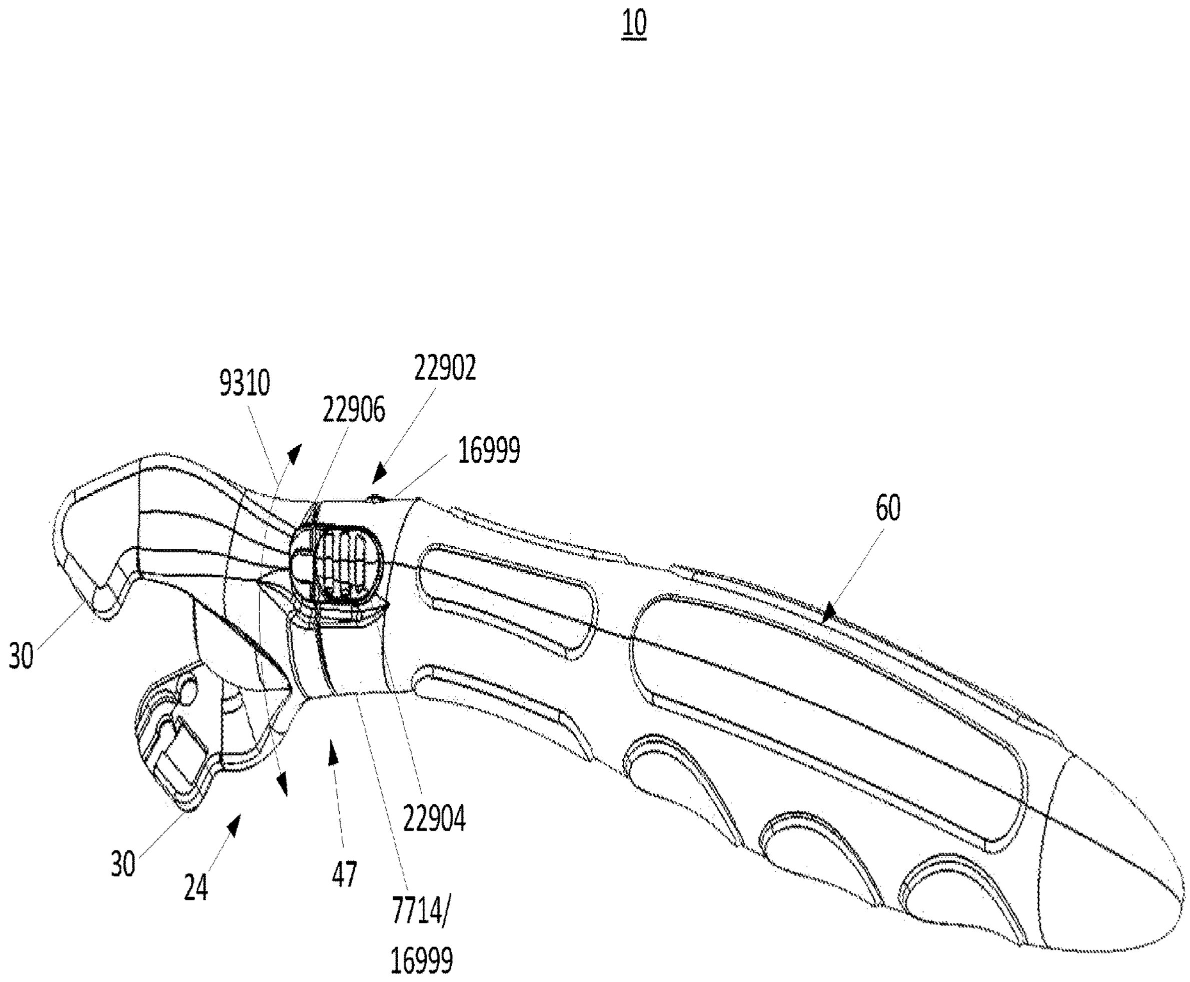
Figure 231:
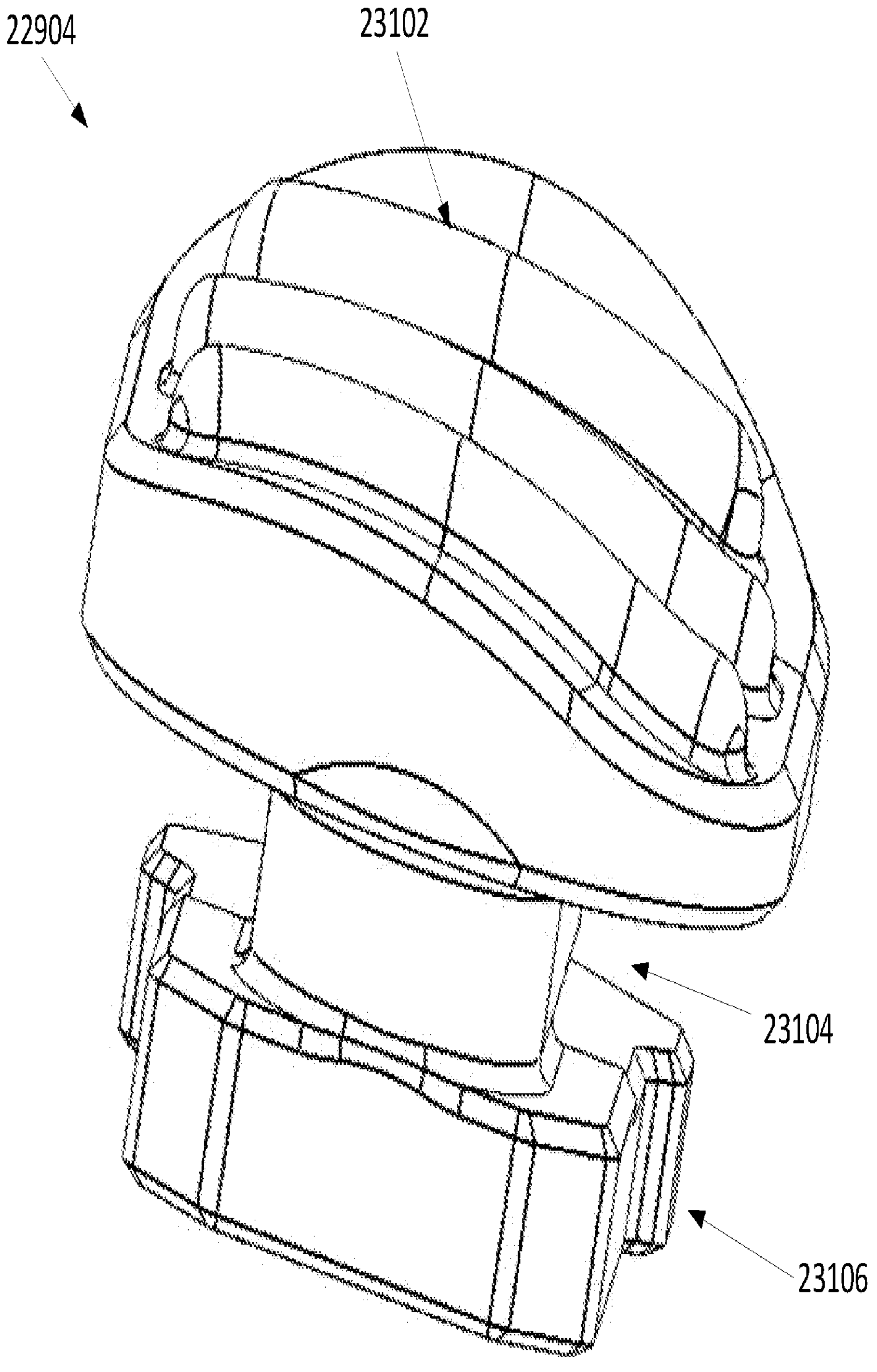
Figure 232:
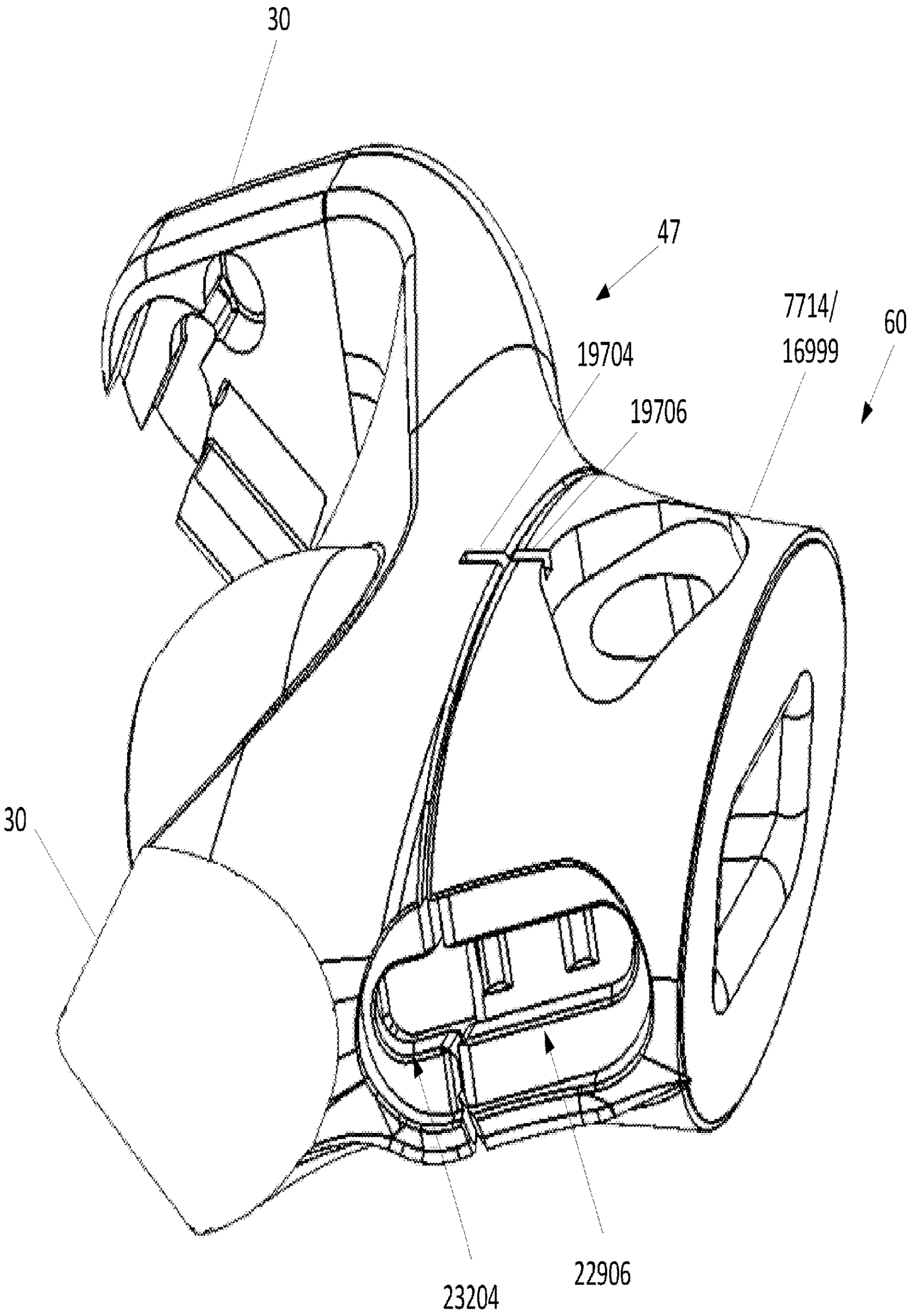
Figure 233:
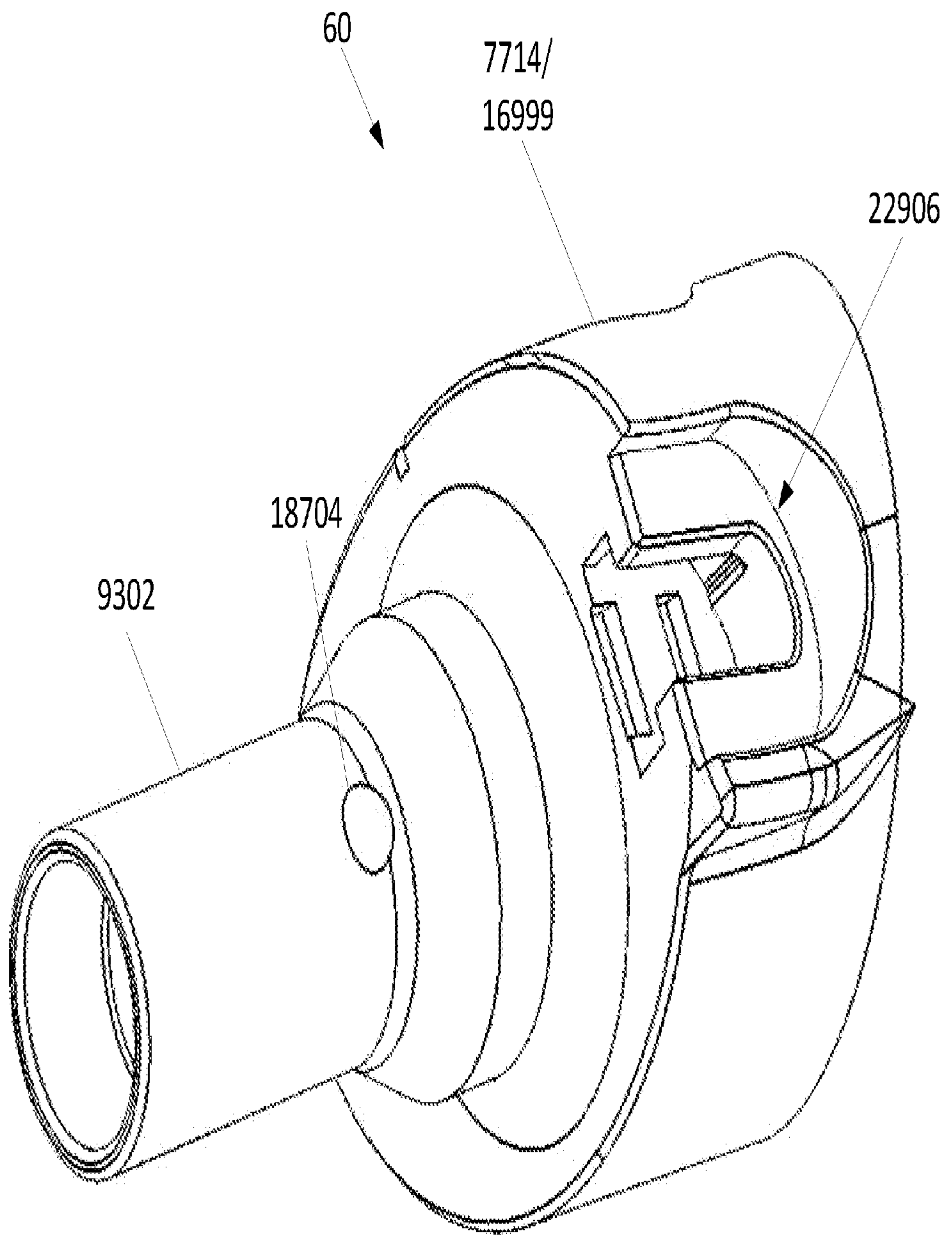
Figure 234:
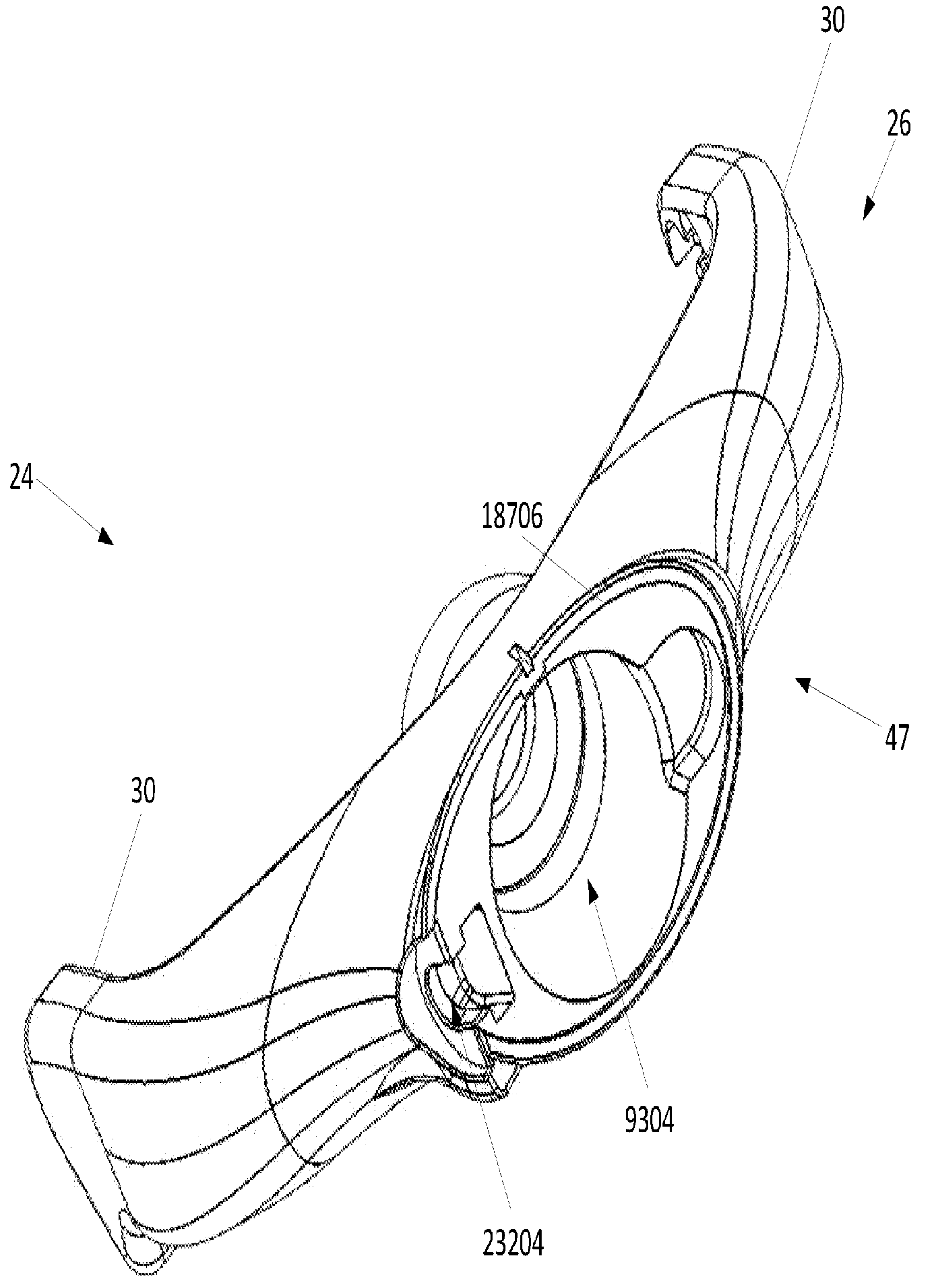
Figure 235:
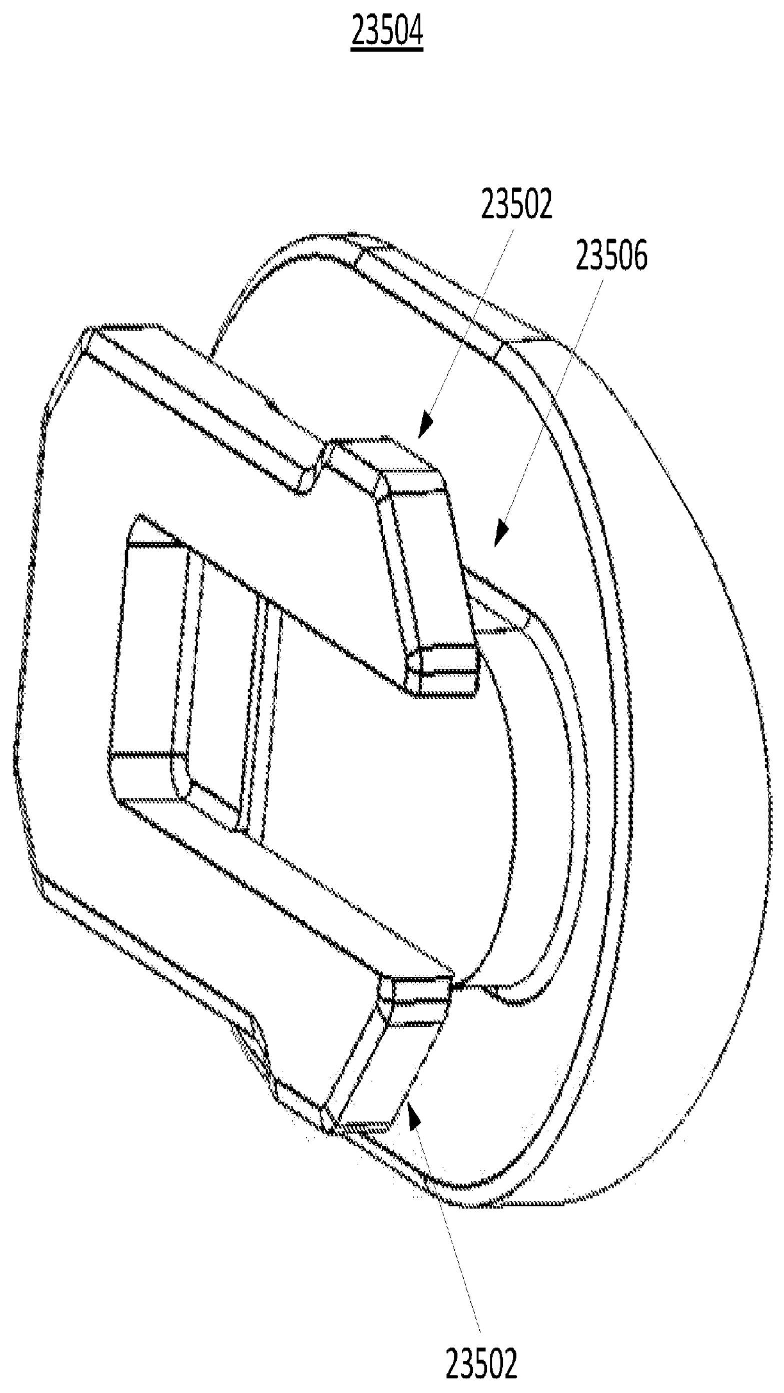
Figure 236:
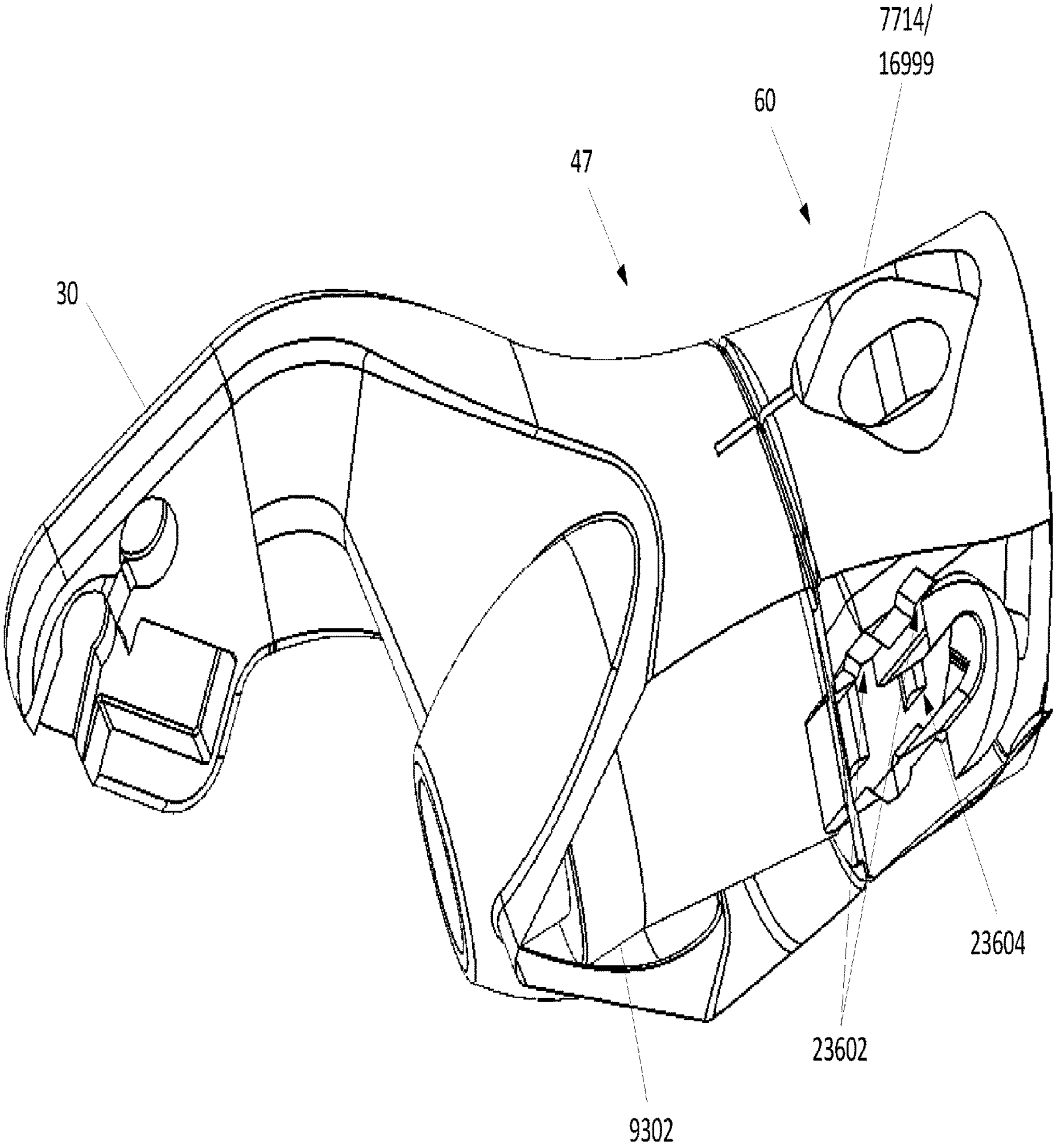
Figure 237:
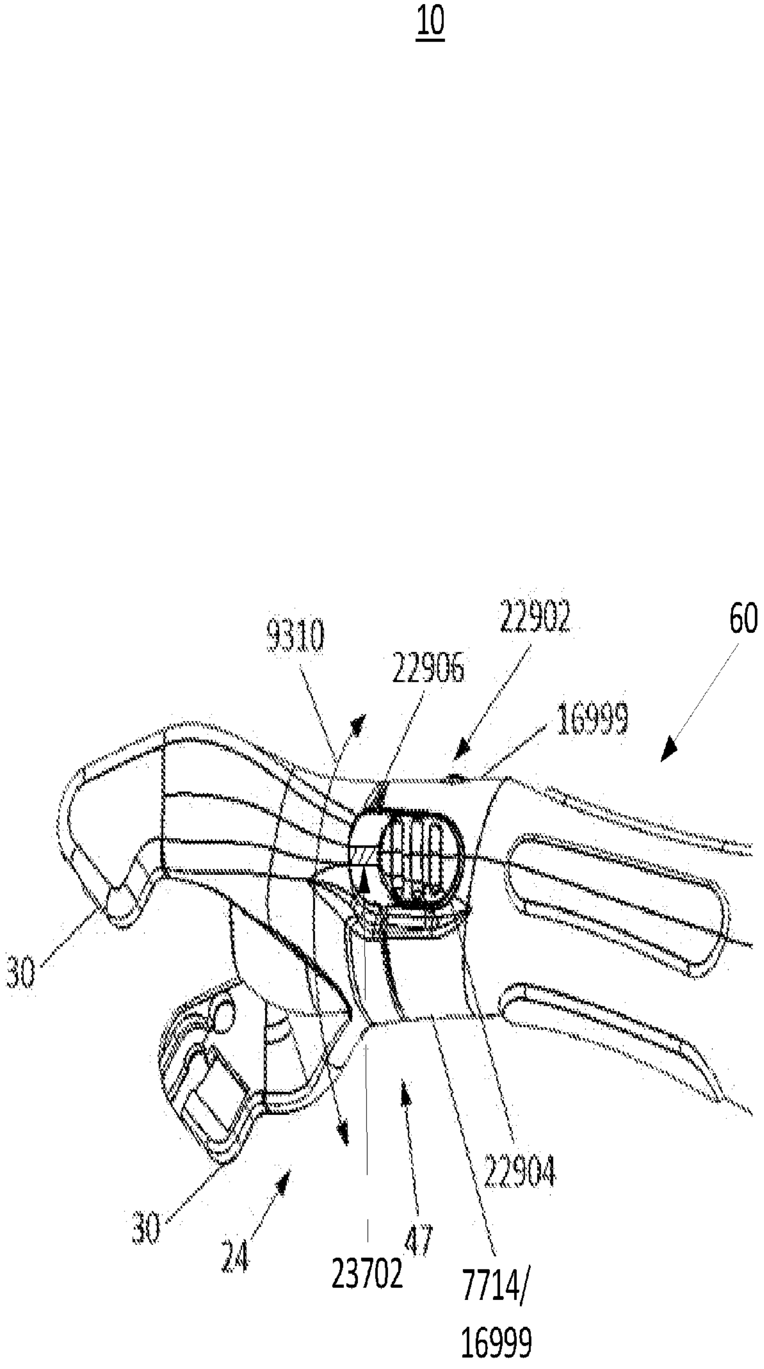
Figure 238:
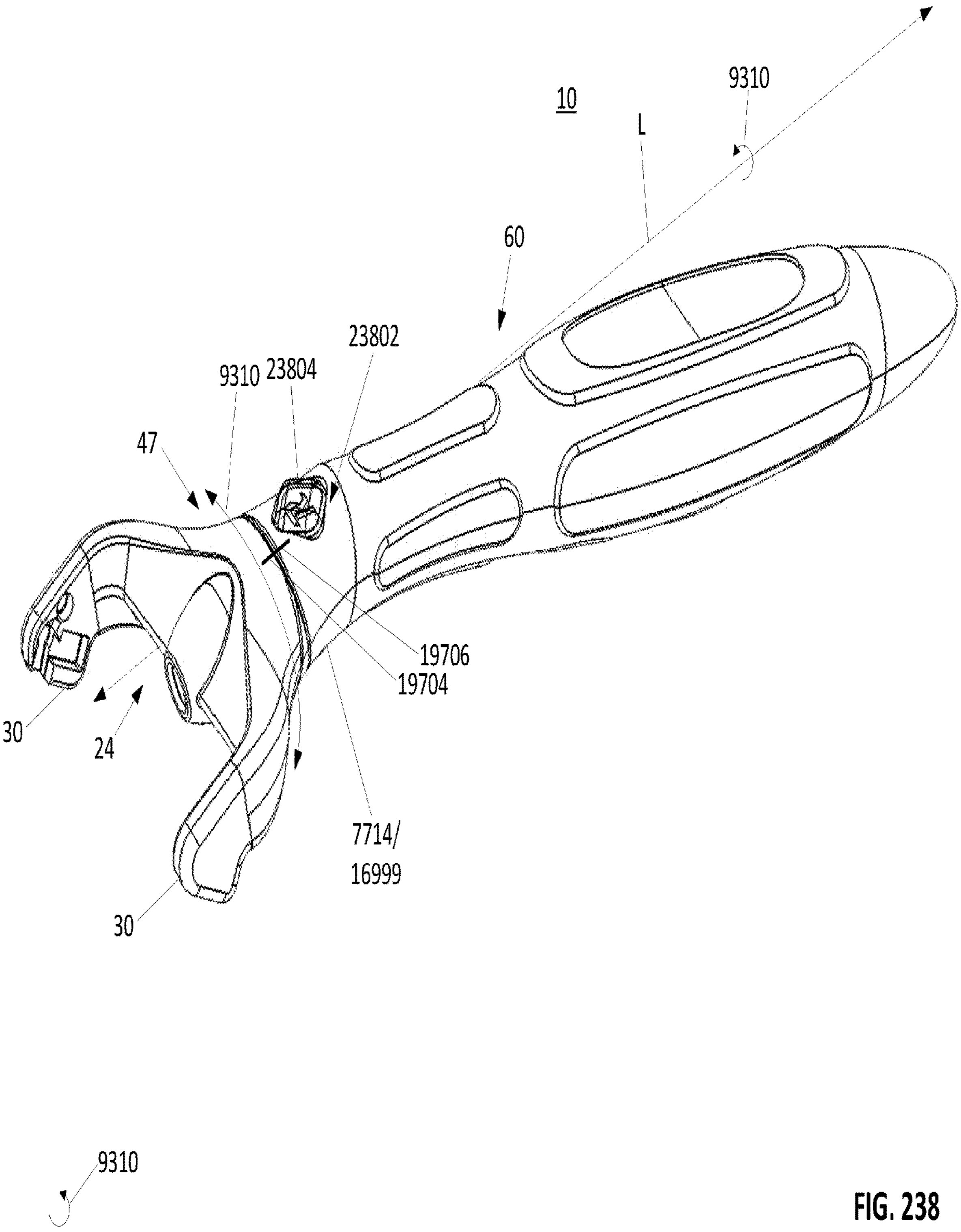
Figure 239:
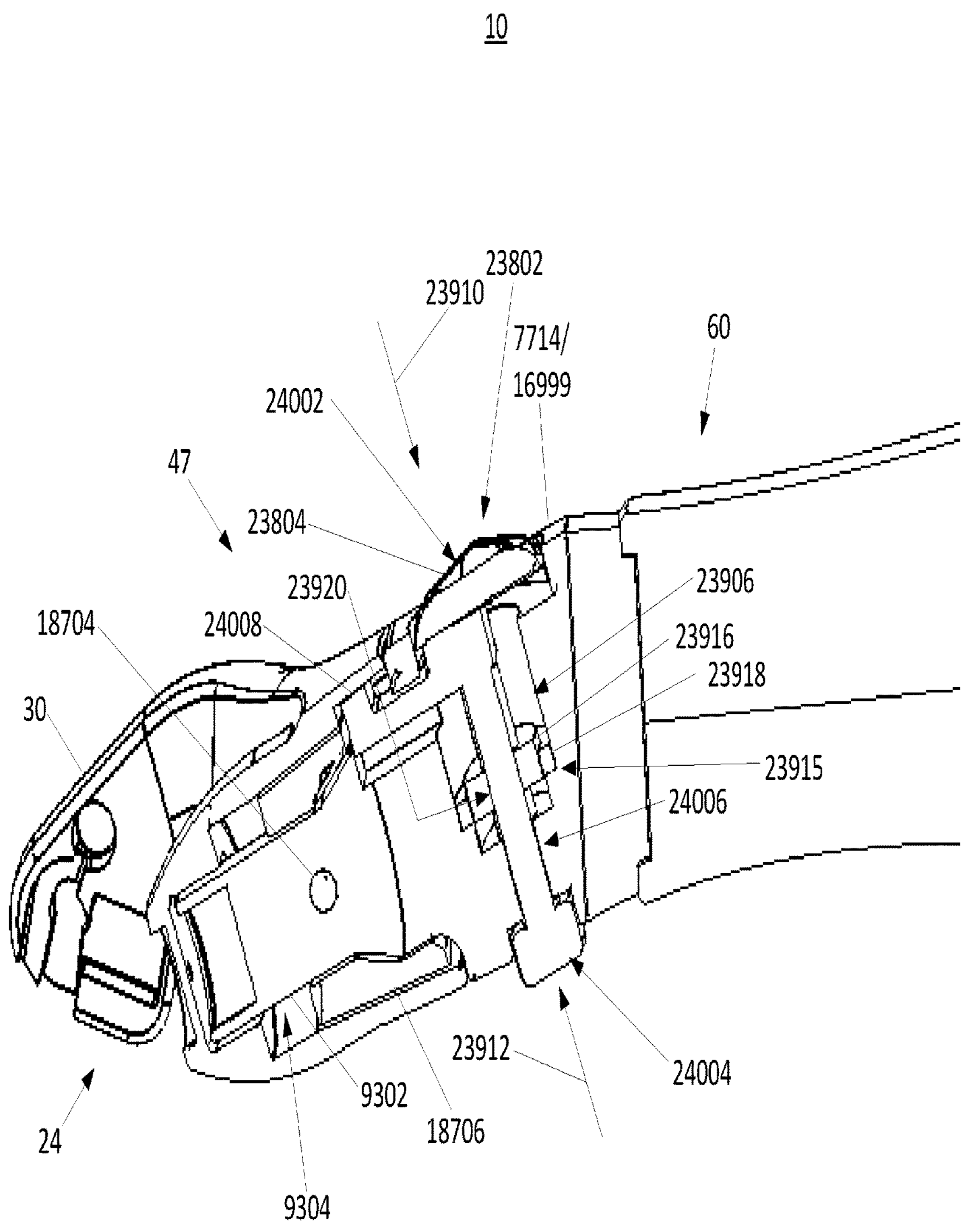
Figure 240:
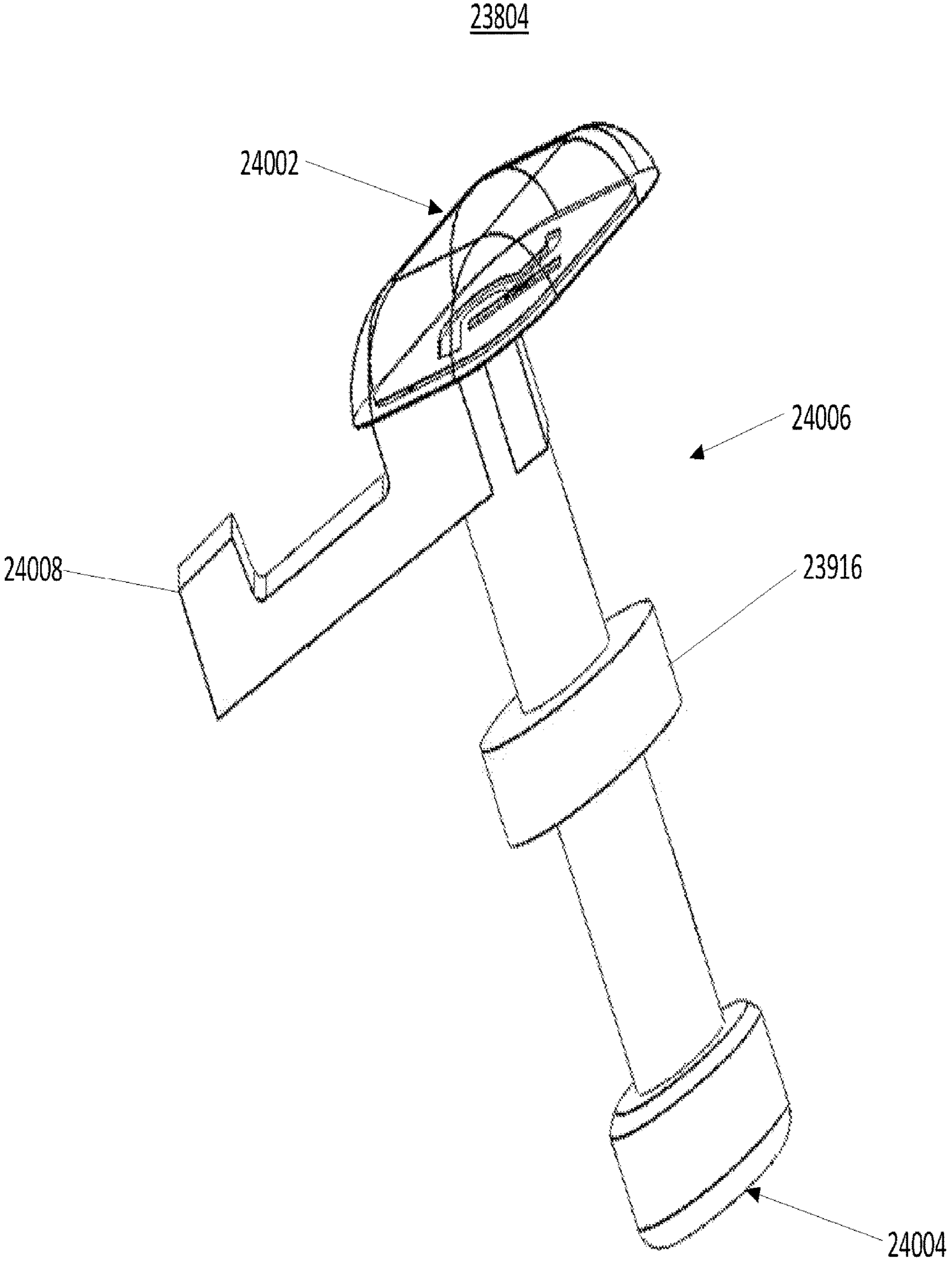
Figure 241:
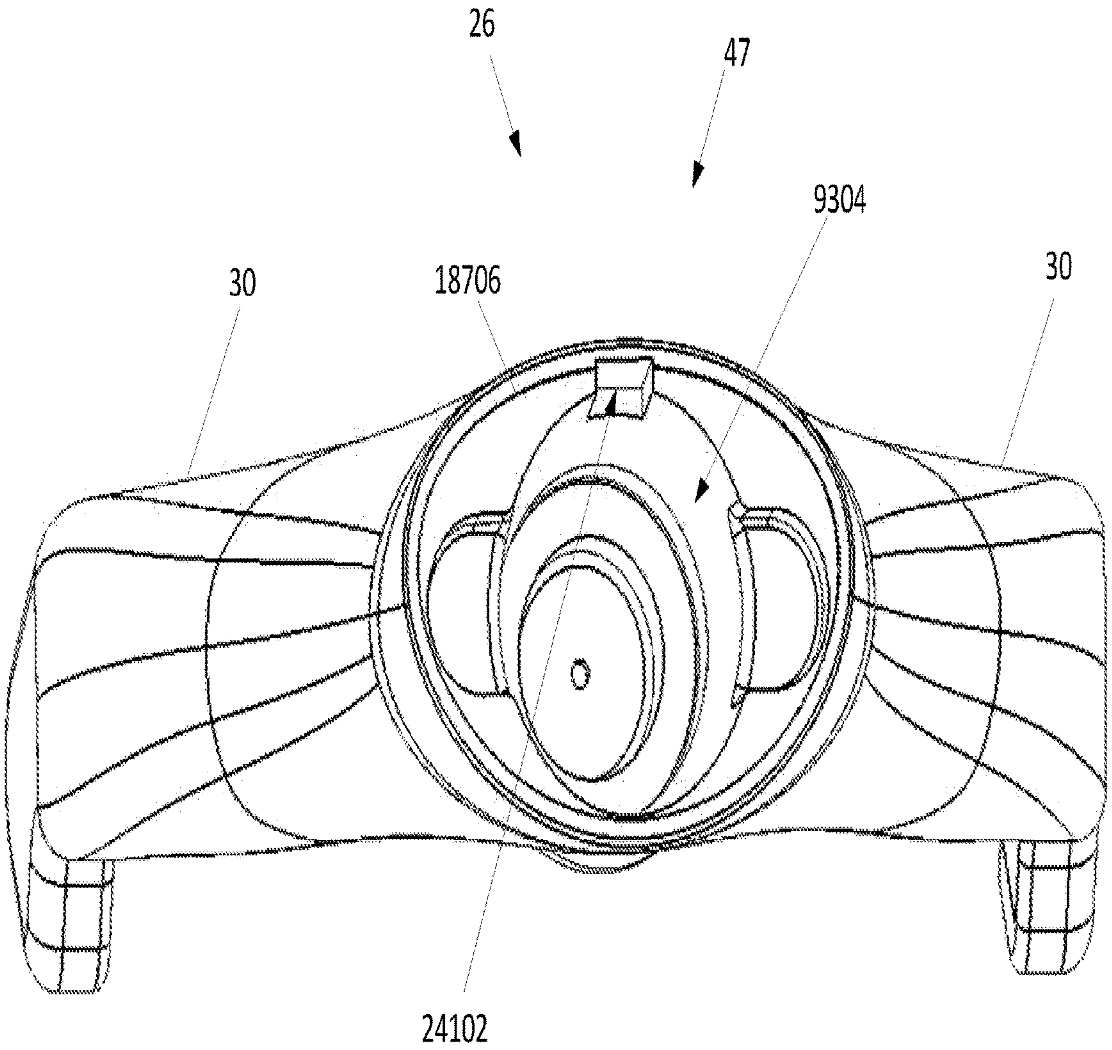
Figure 242:
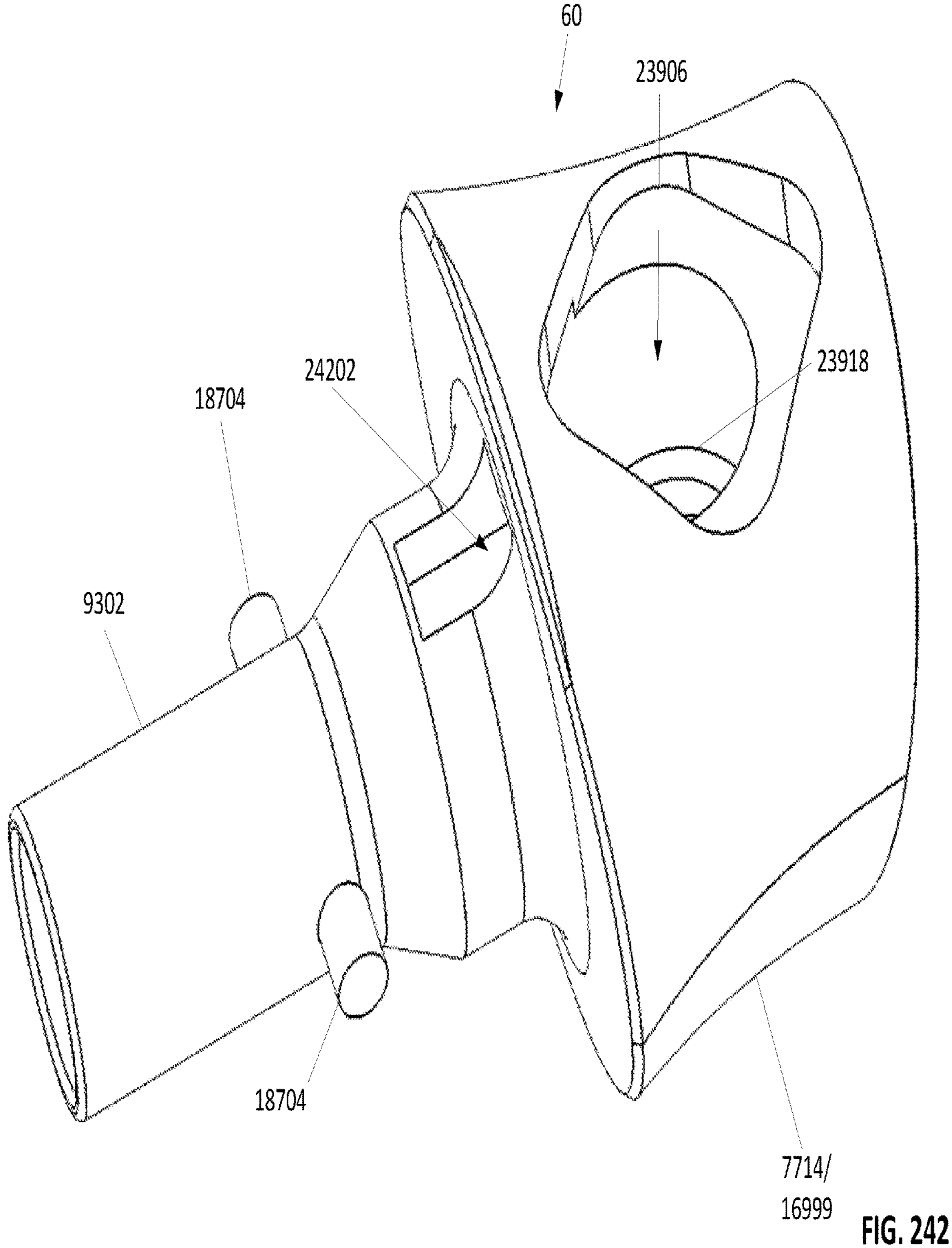
Figure 243:
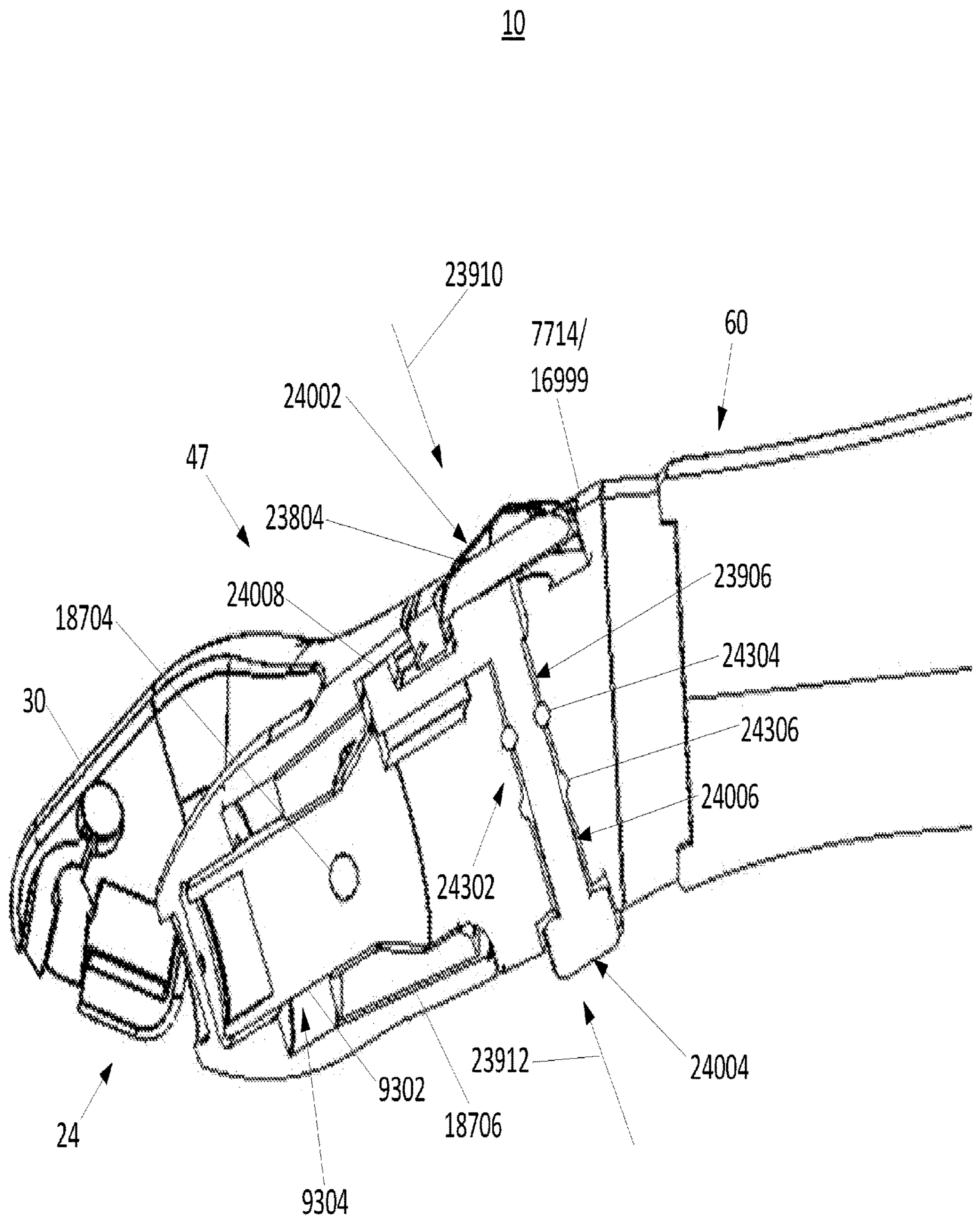
Figure 244:
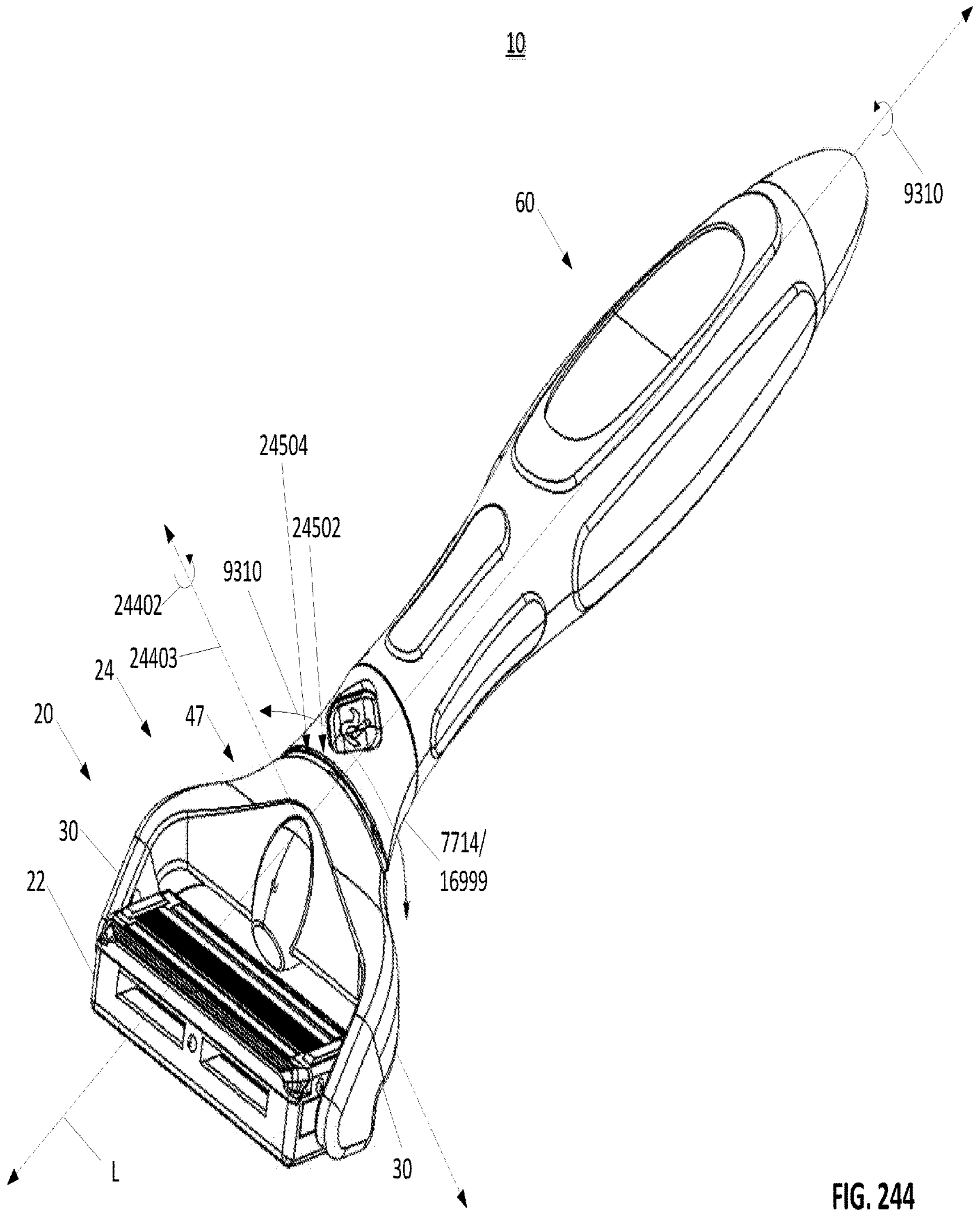
Figure 245:
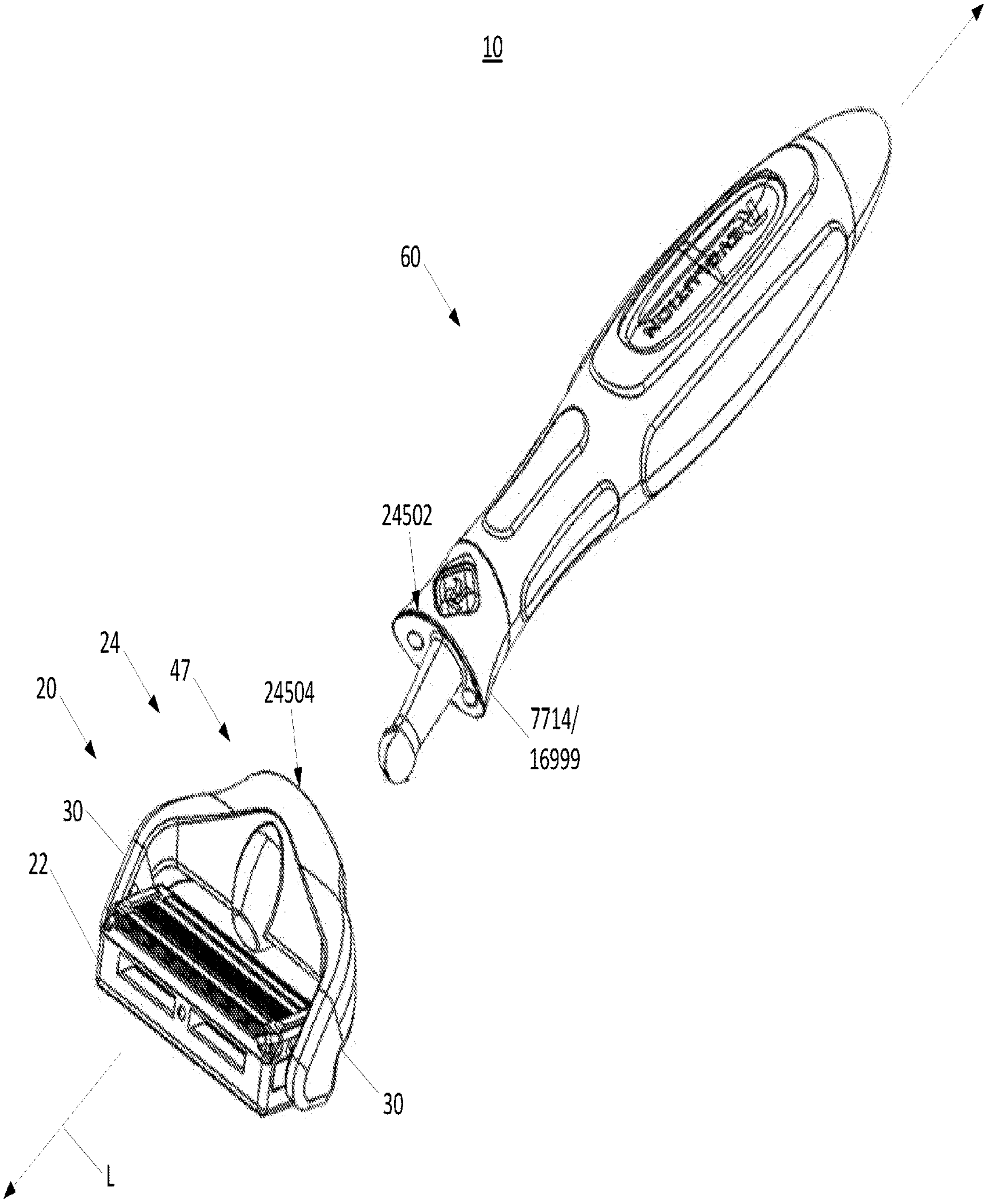
Figure 246:
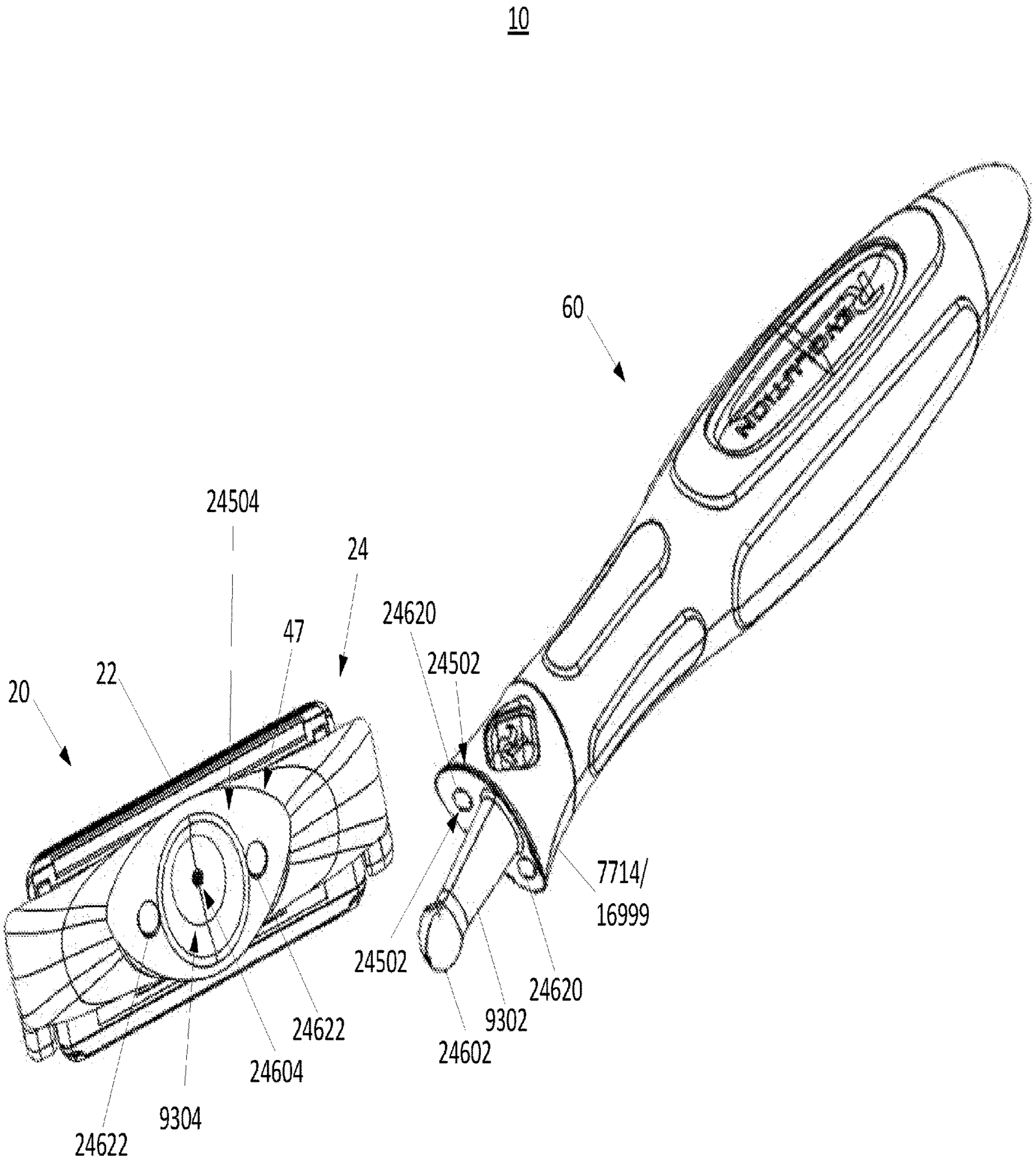
Figure 247:
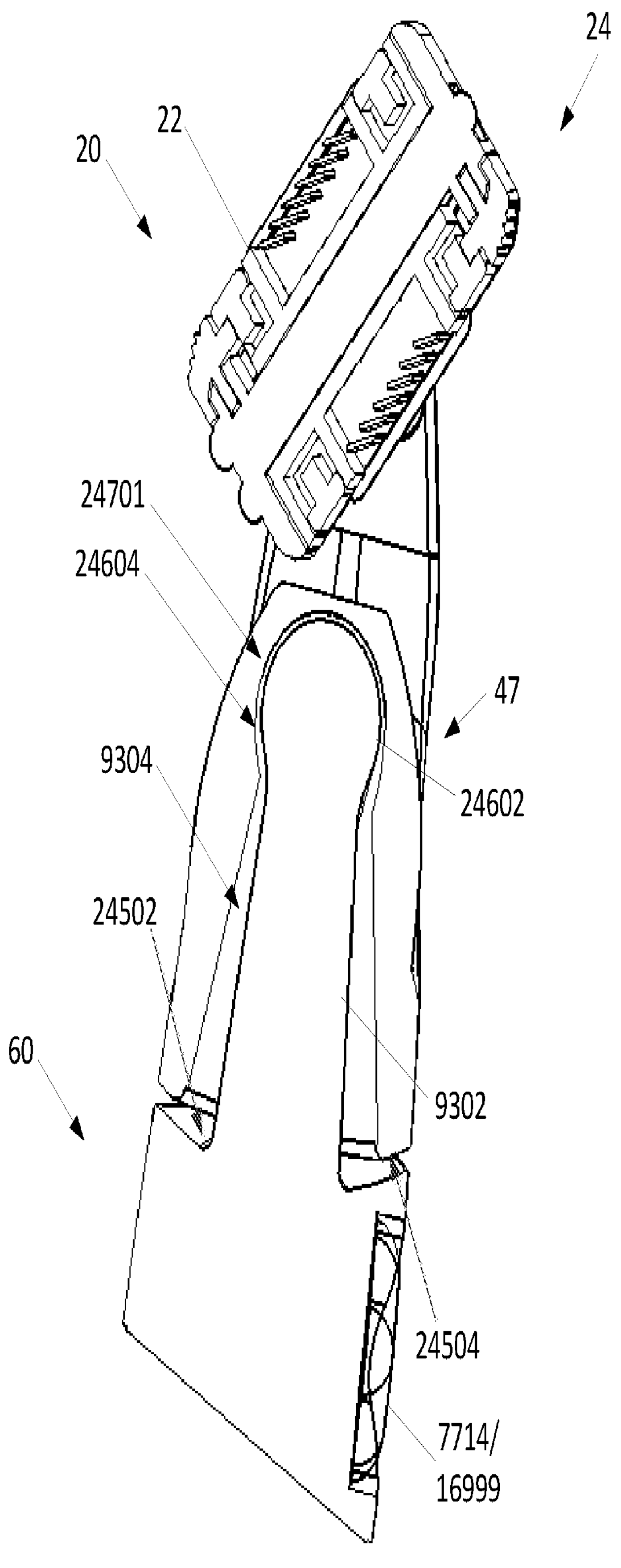
Figure 248:
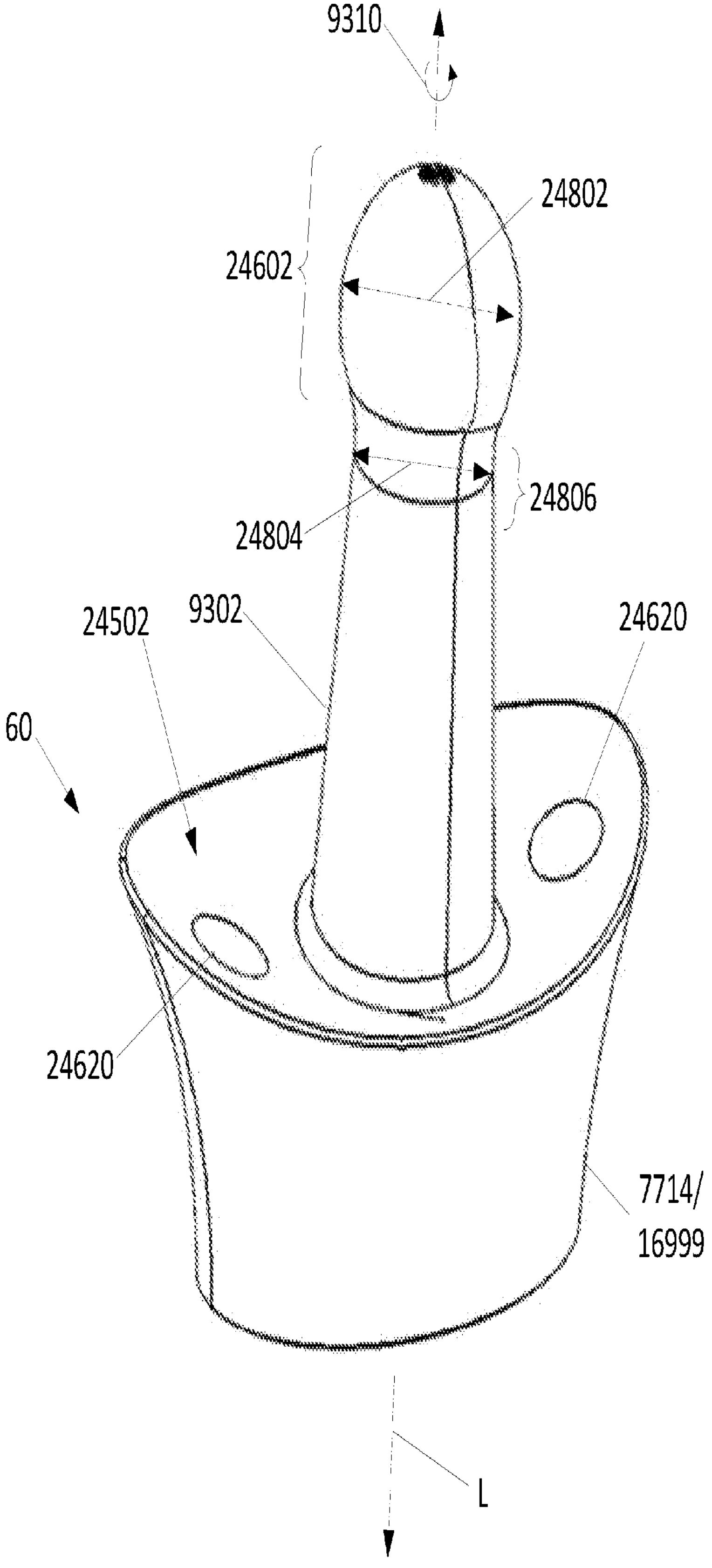
Figure 249:
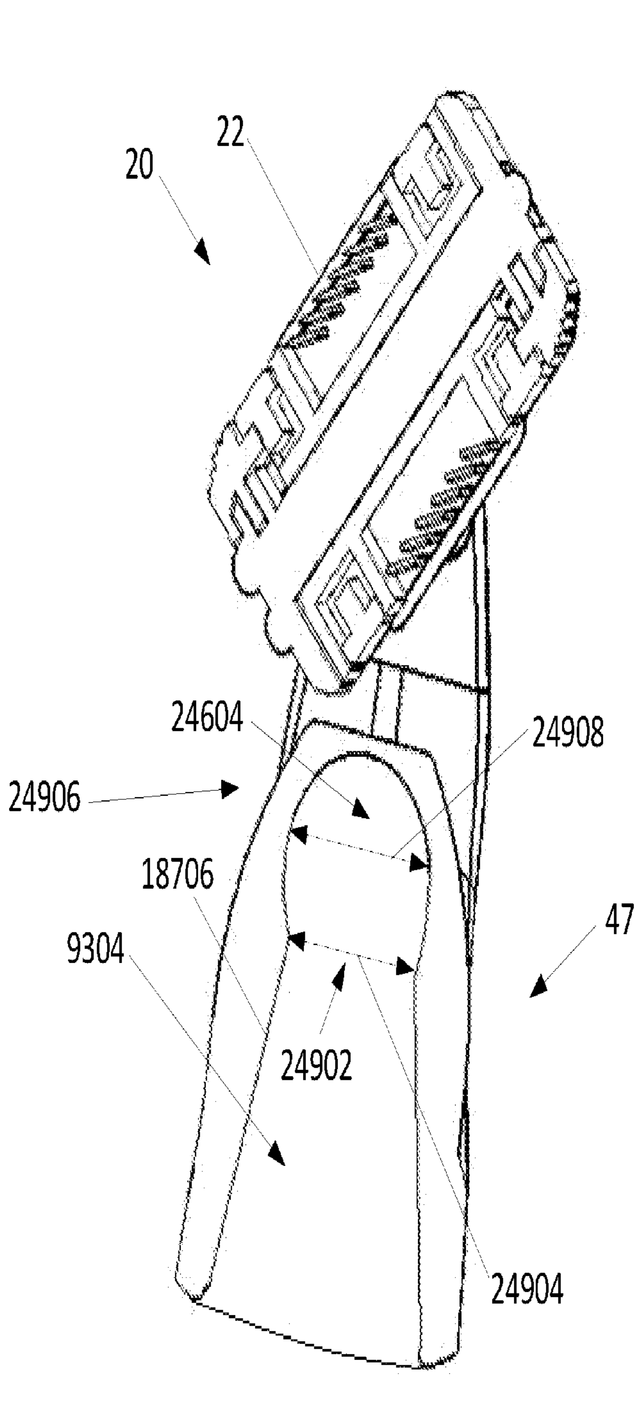
Figure 250:
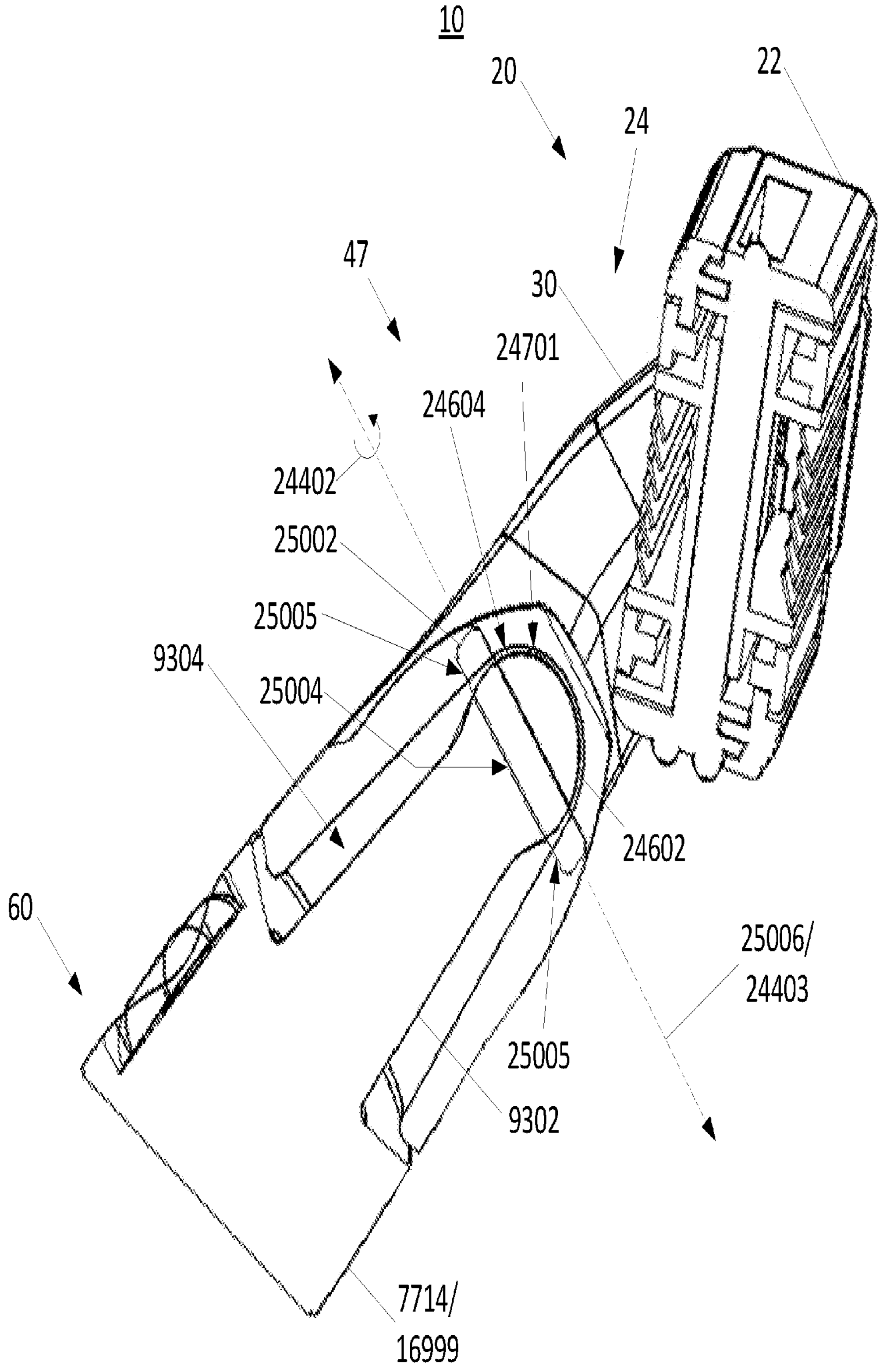
Figure 251:
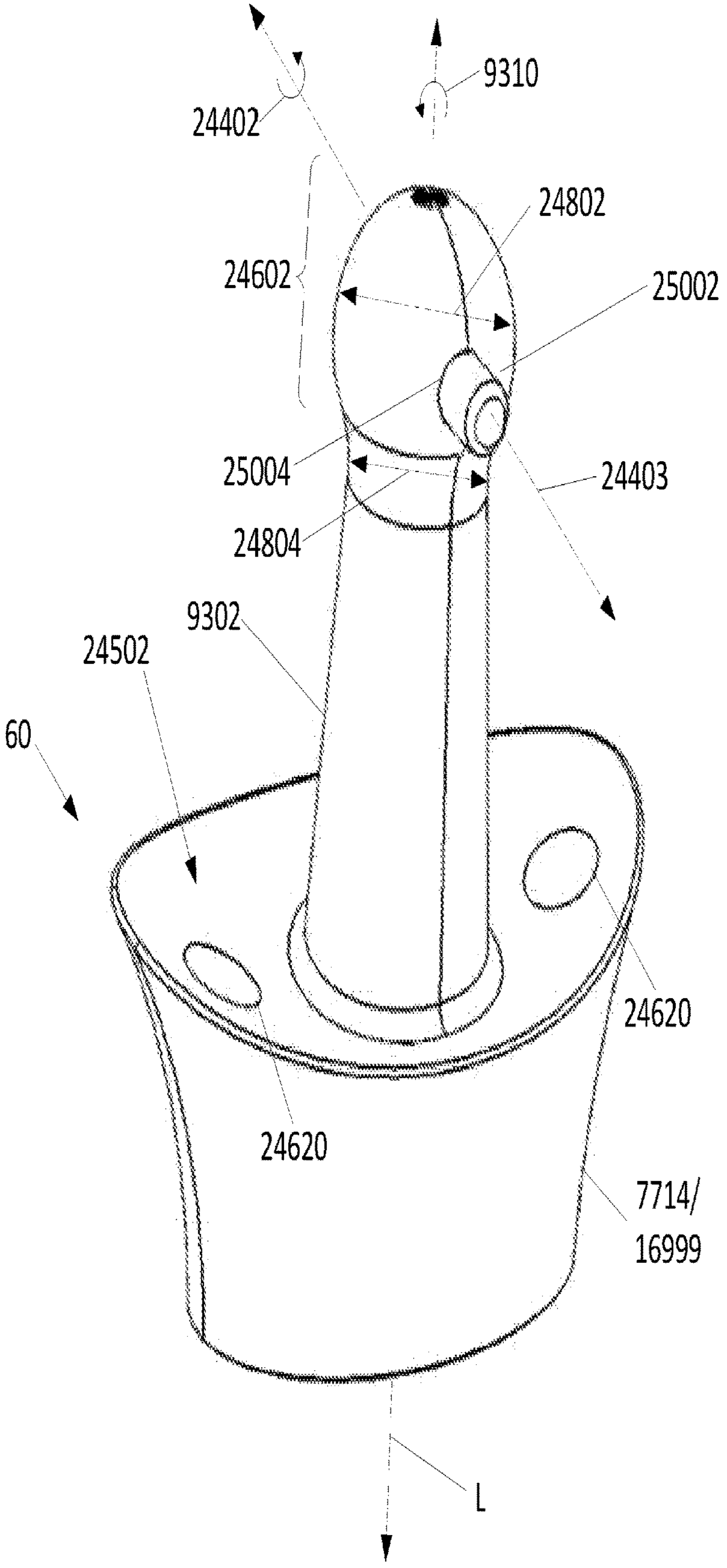
Figure 252:
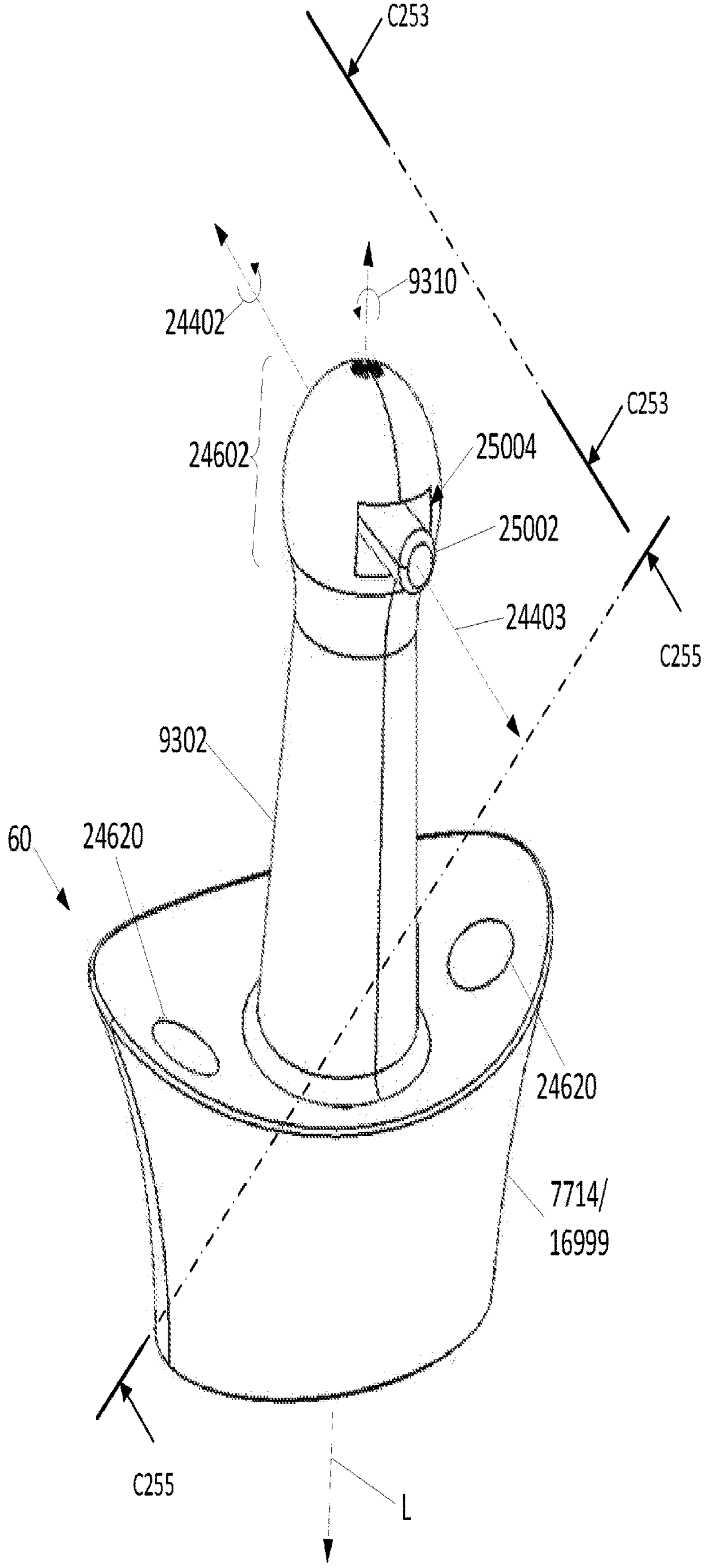
Figure 253:
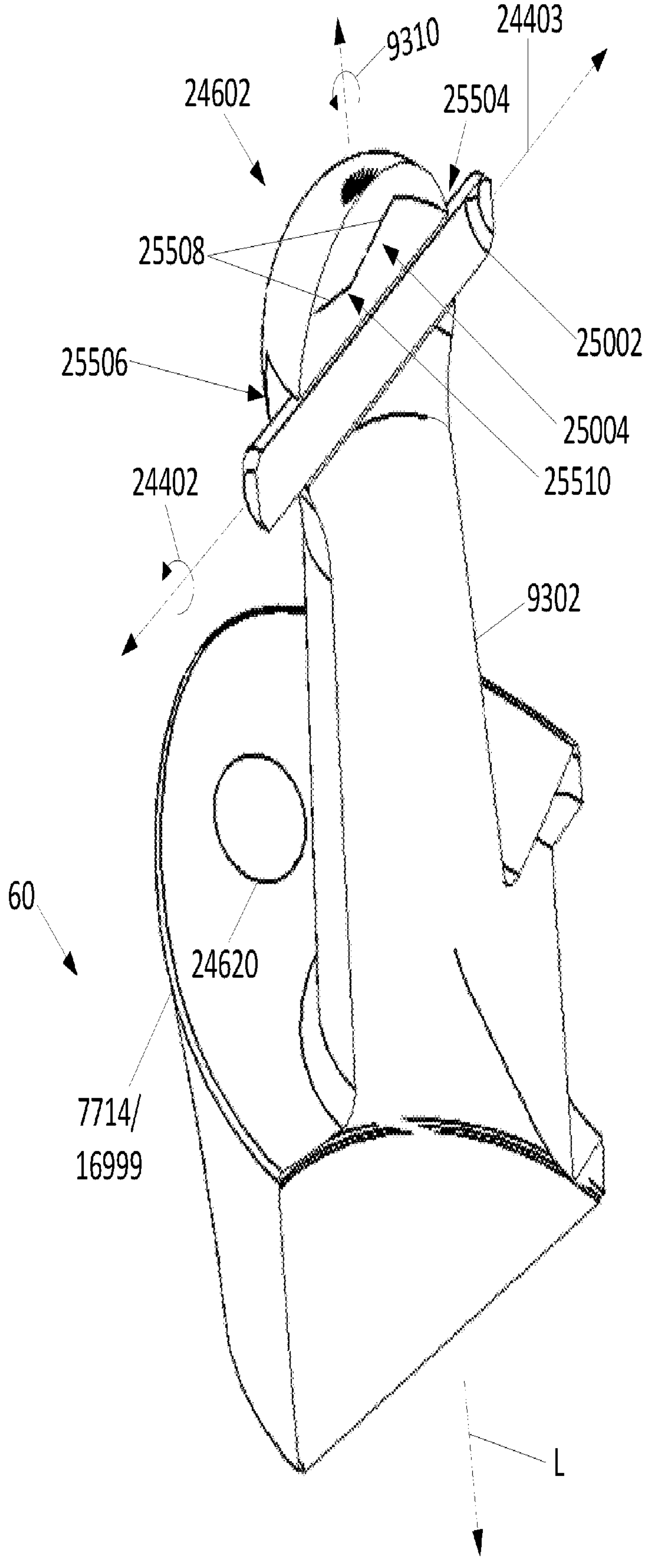
Figure 254:
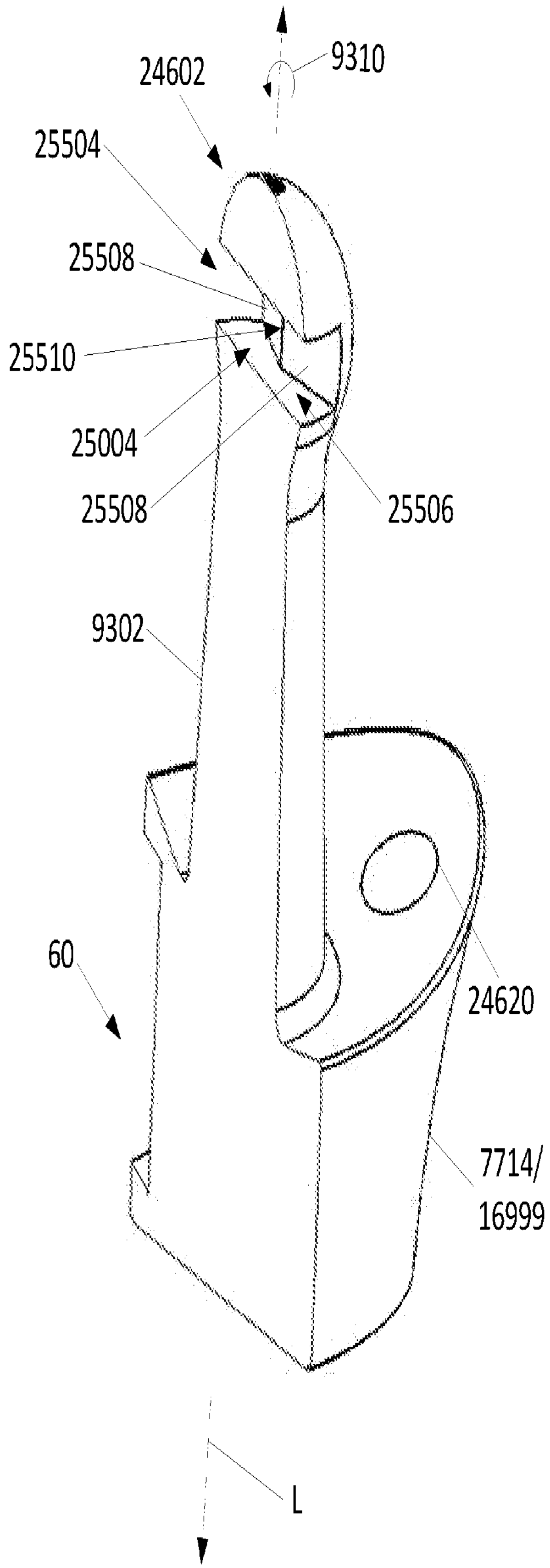
Figure 255:
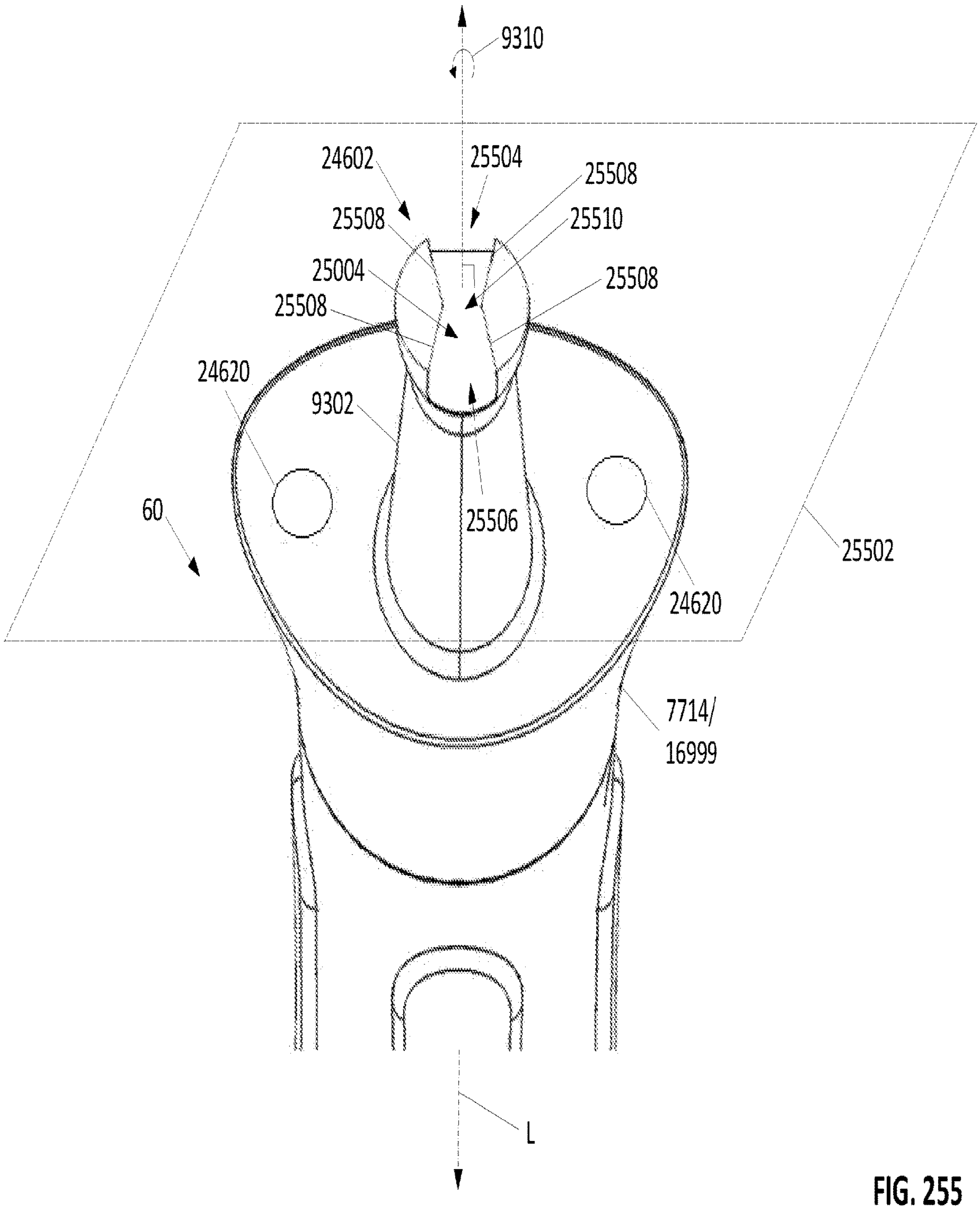
Figure 256:
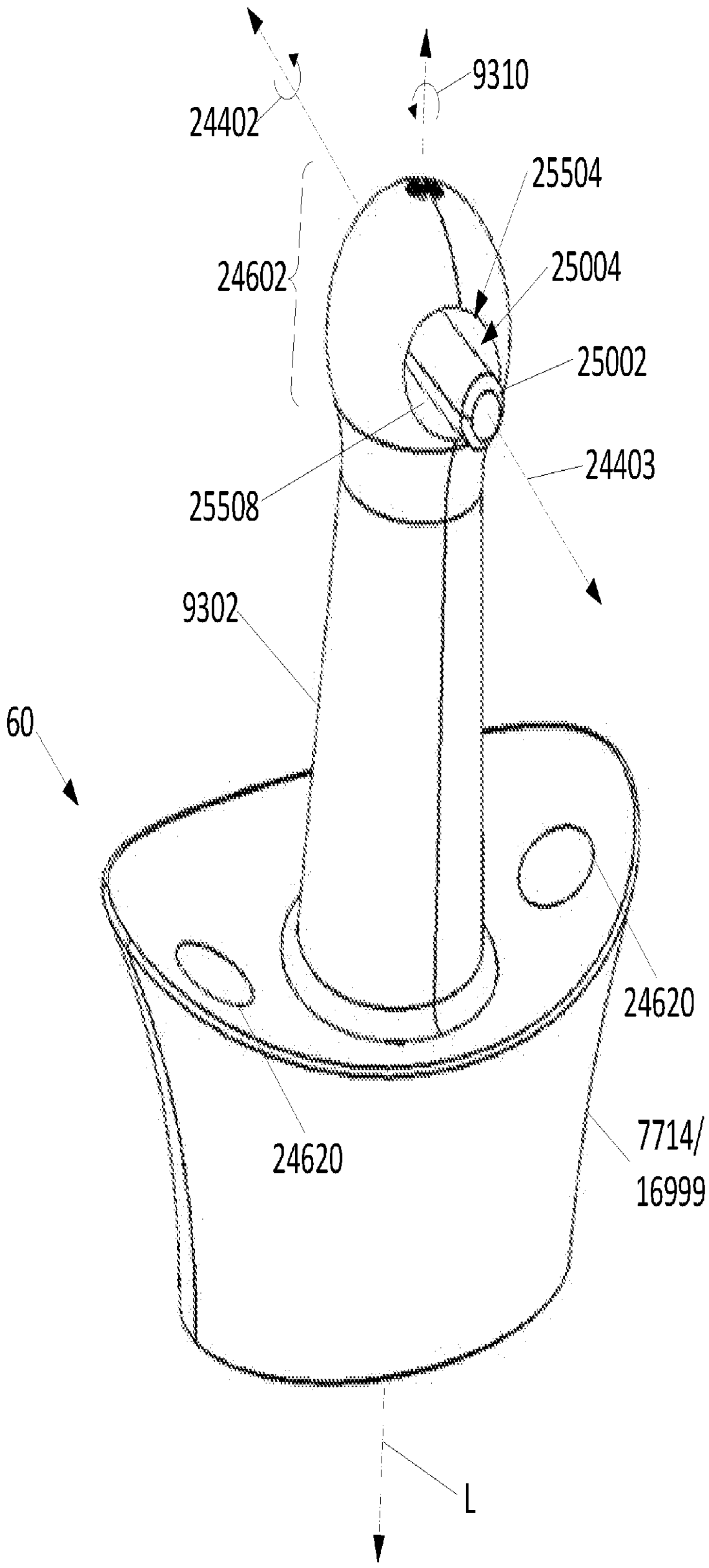
Figure 257:
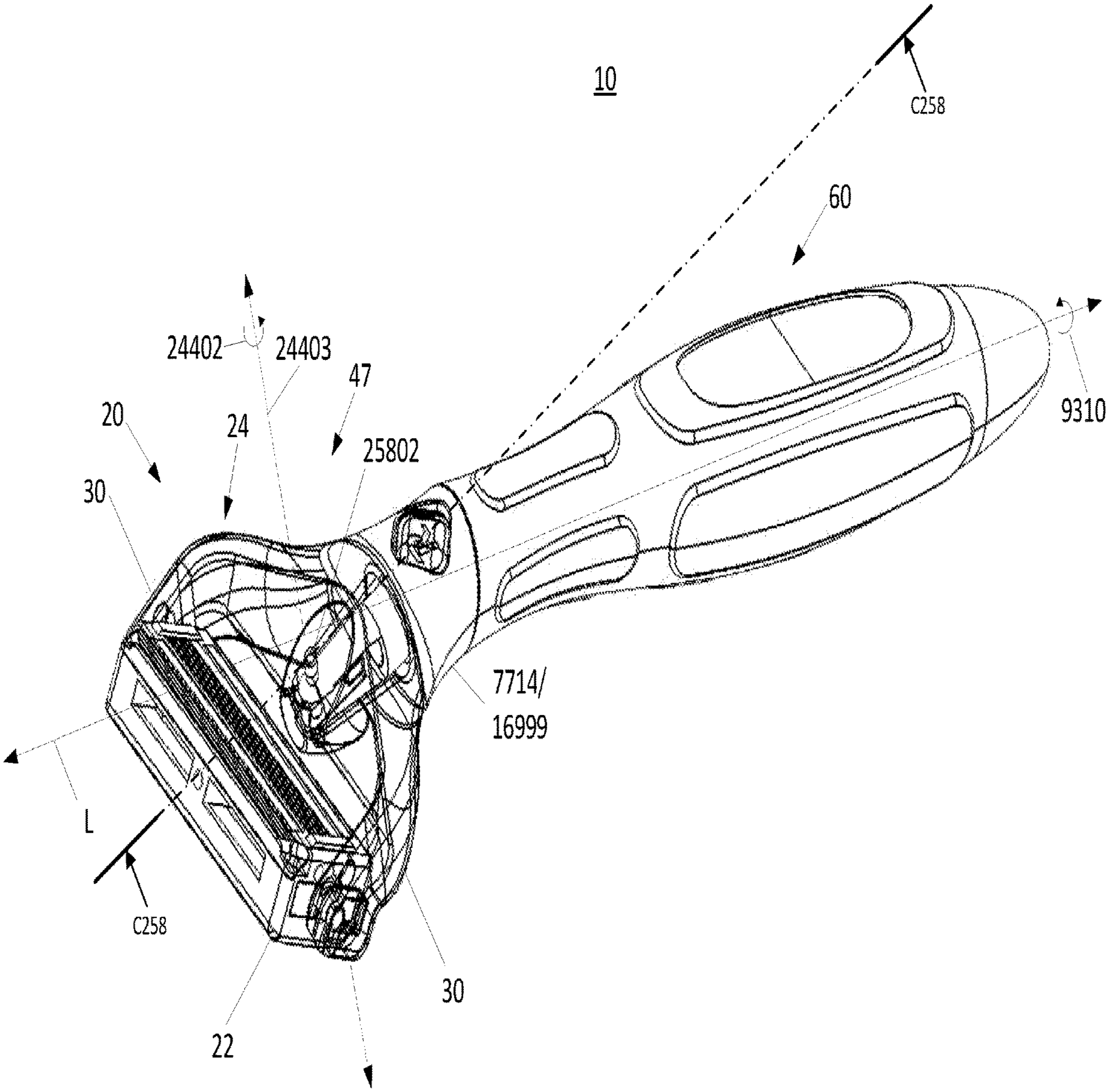
Figure 258:
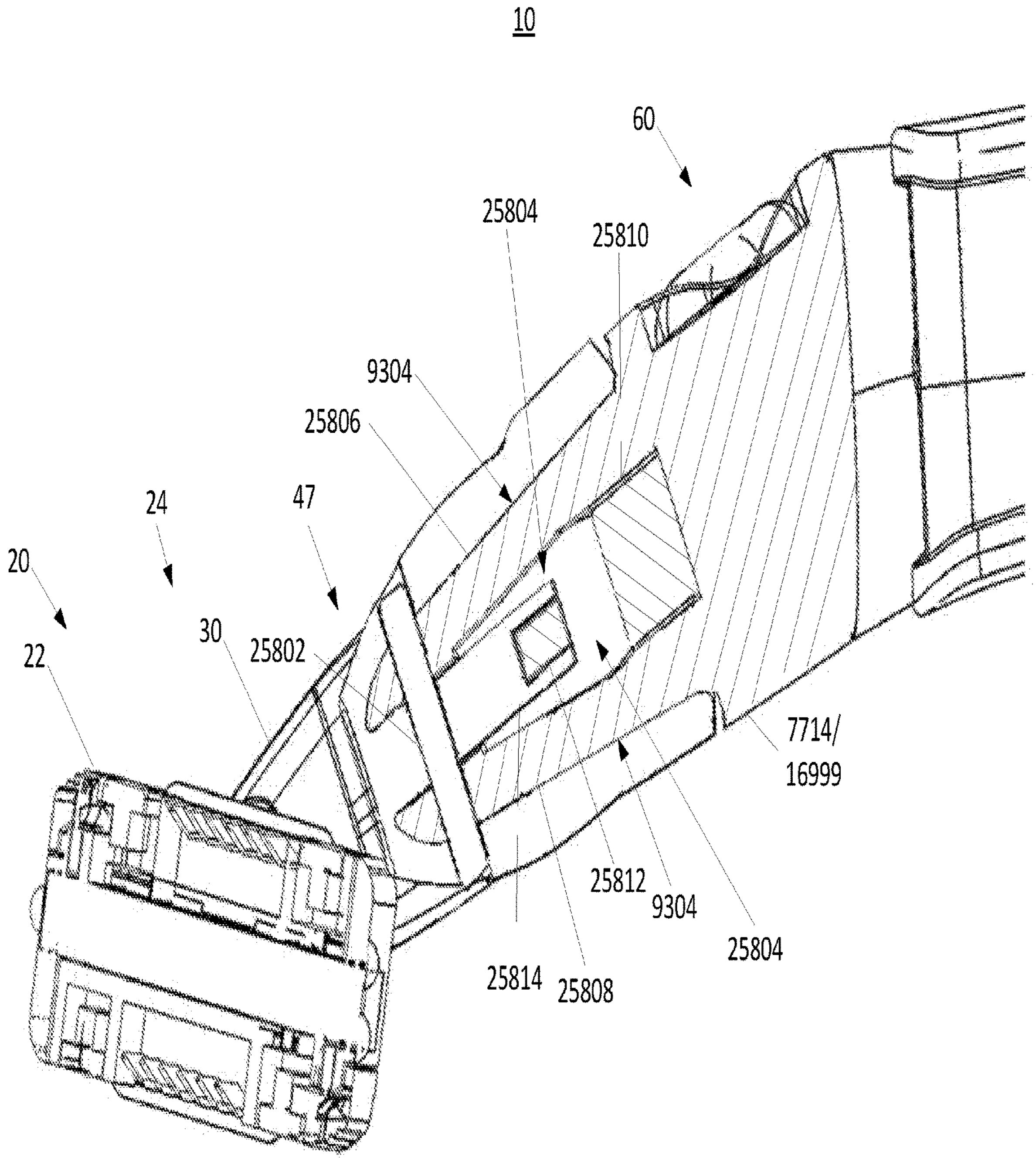
Figure 259:
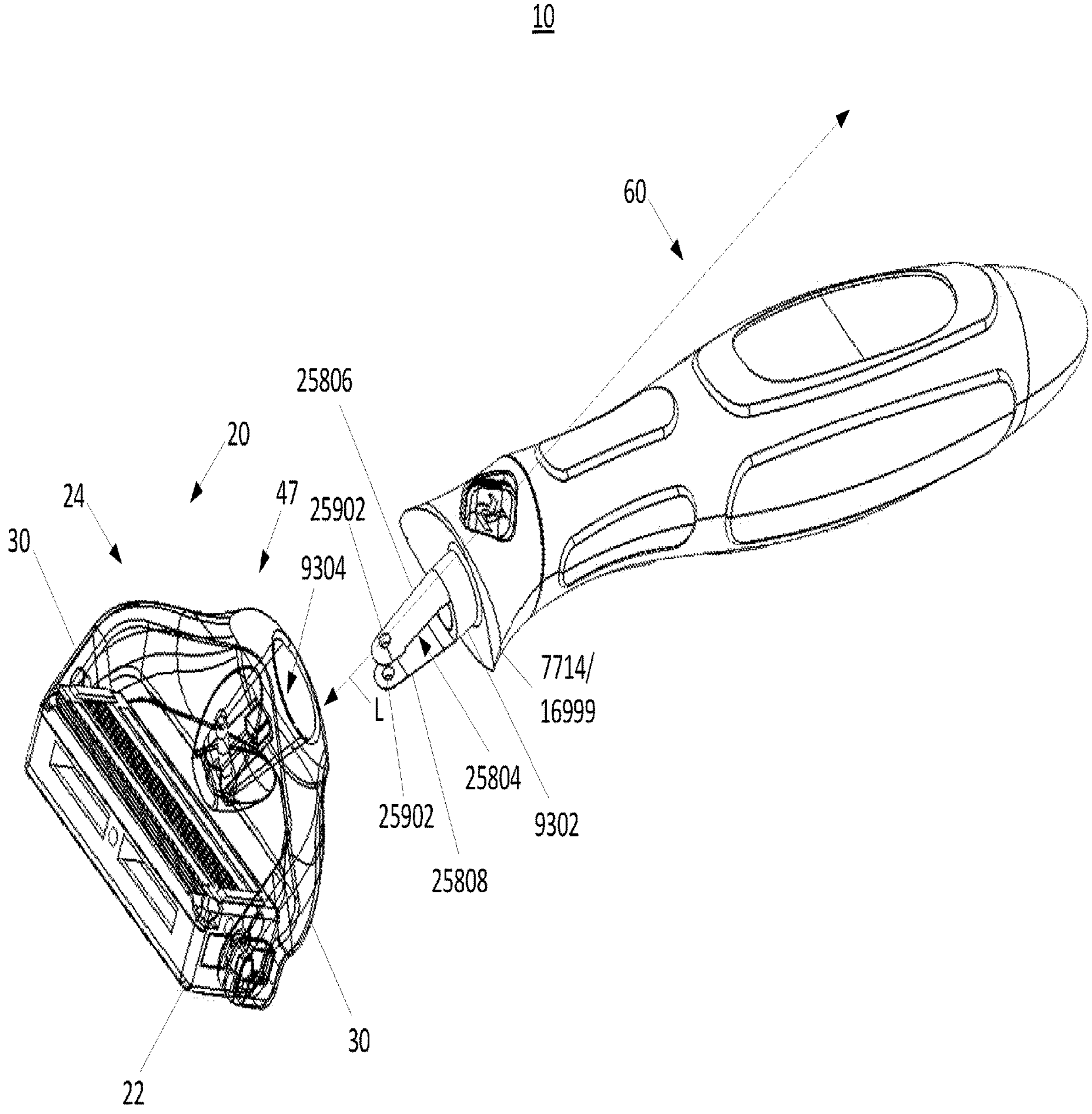
Figure 260:
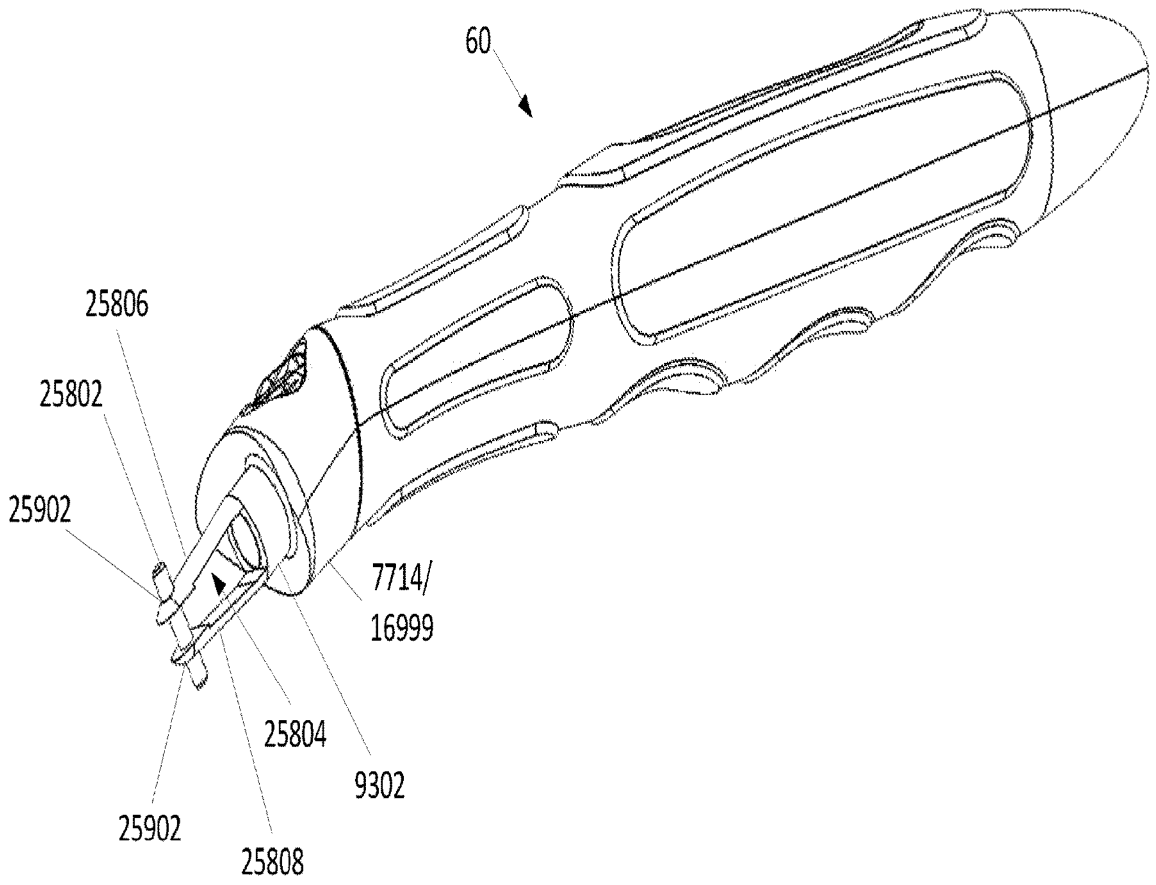
Figure 261:
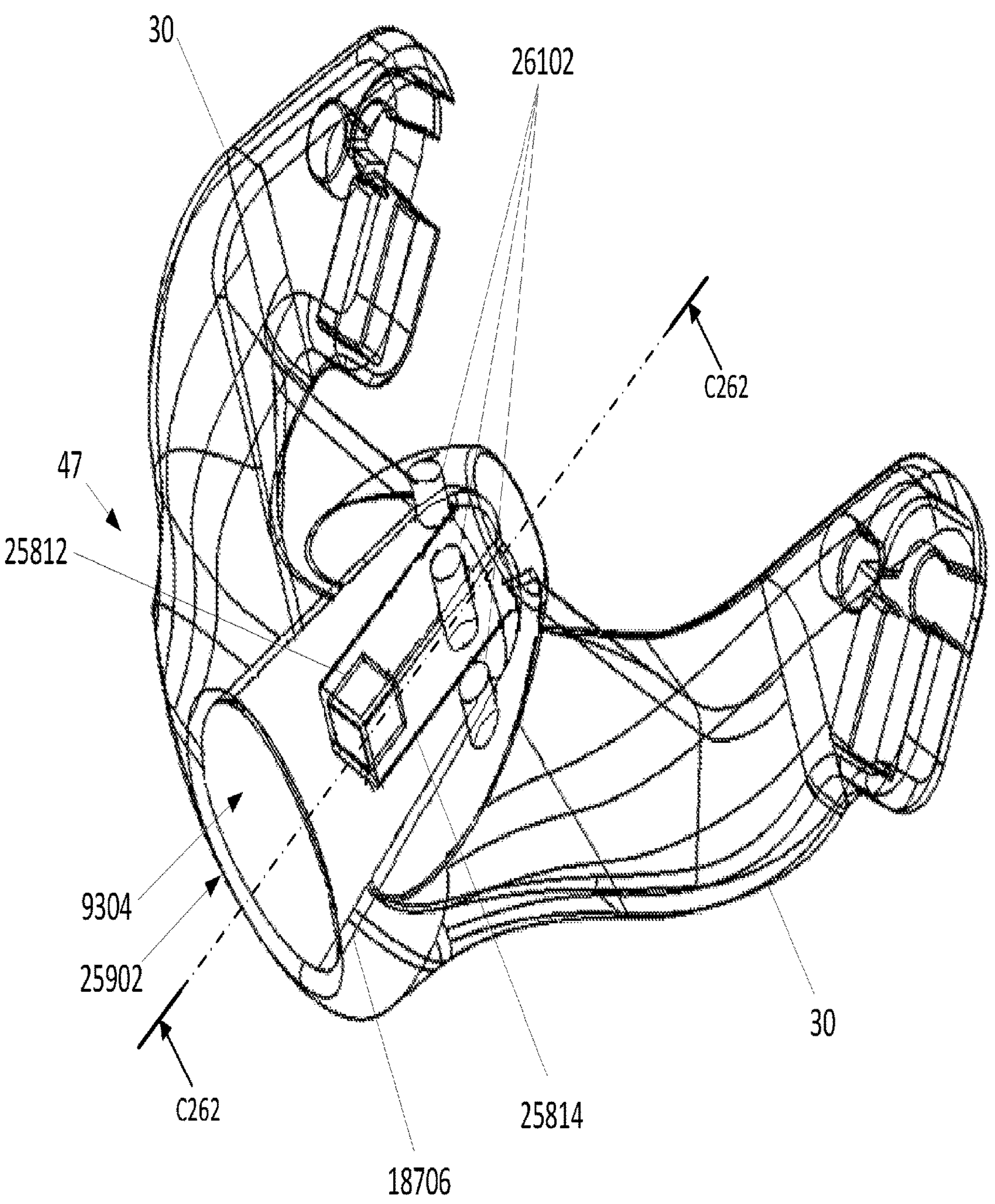
Figure 262:
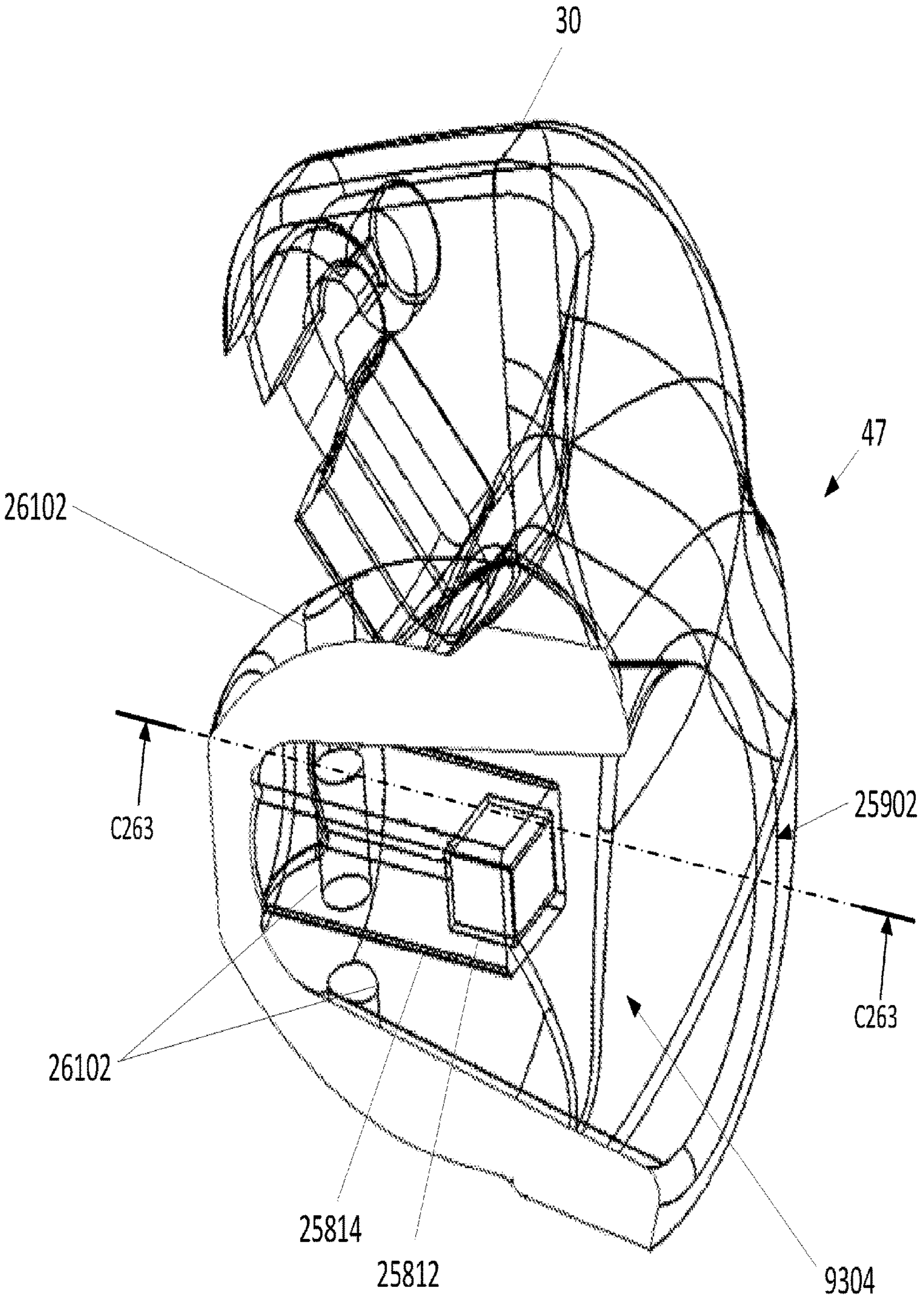
Figure 263:
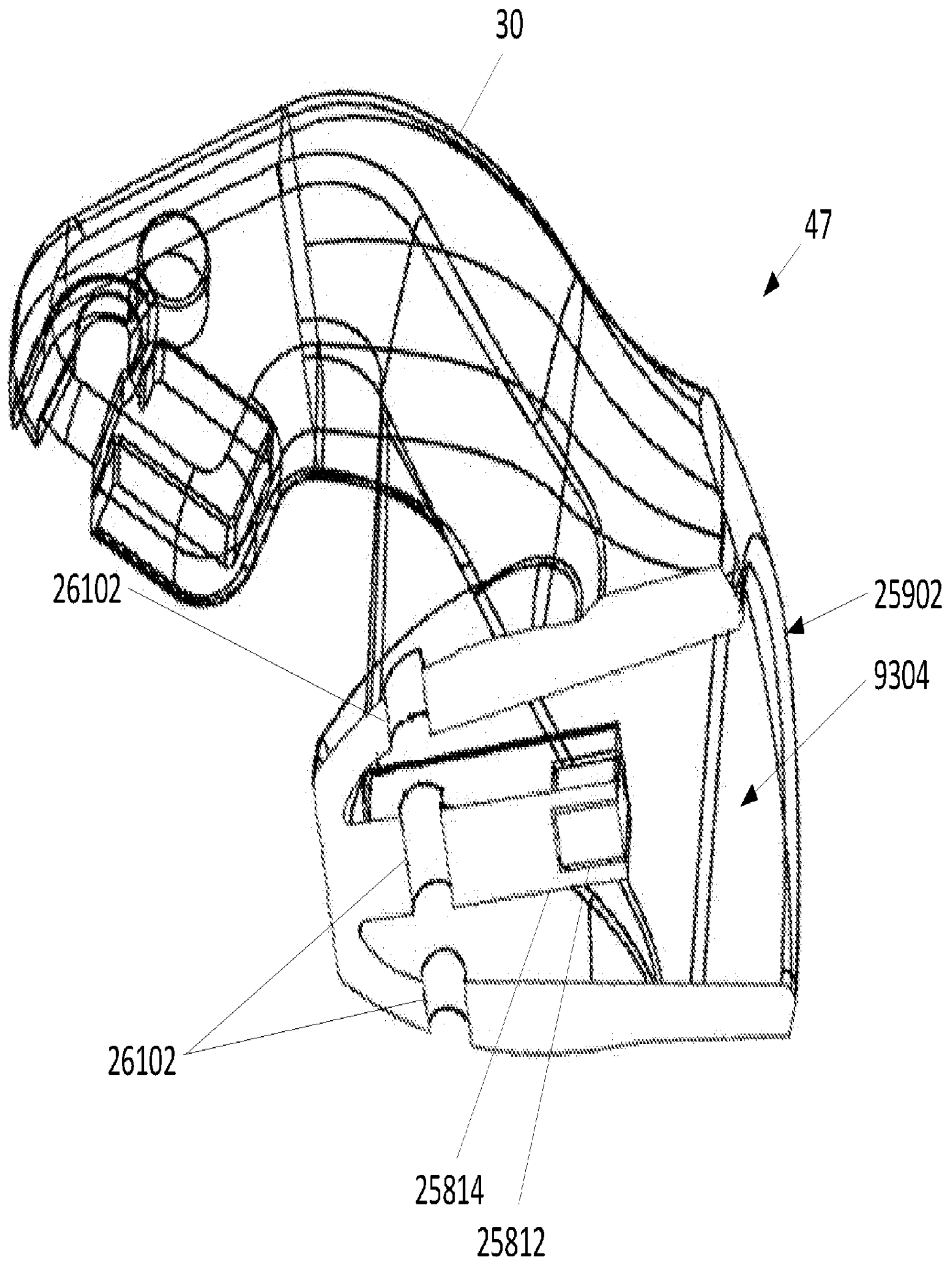
Figure 264:
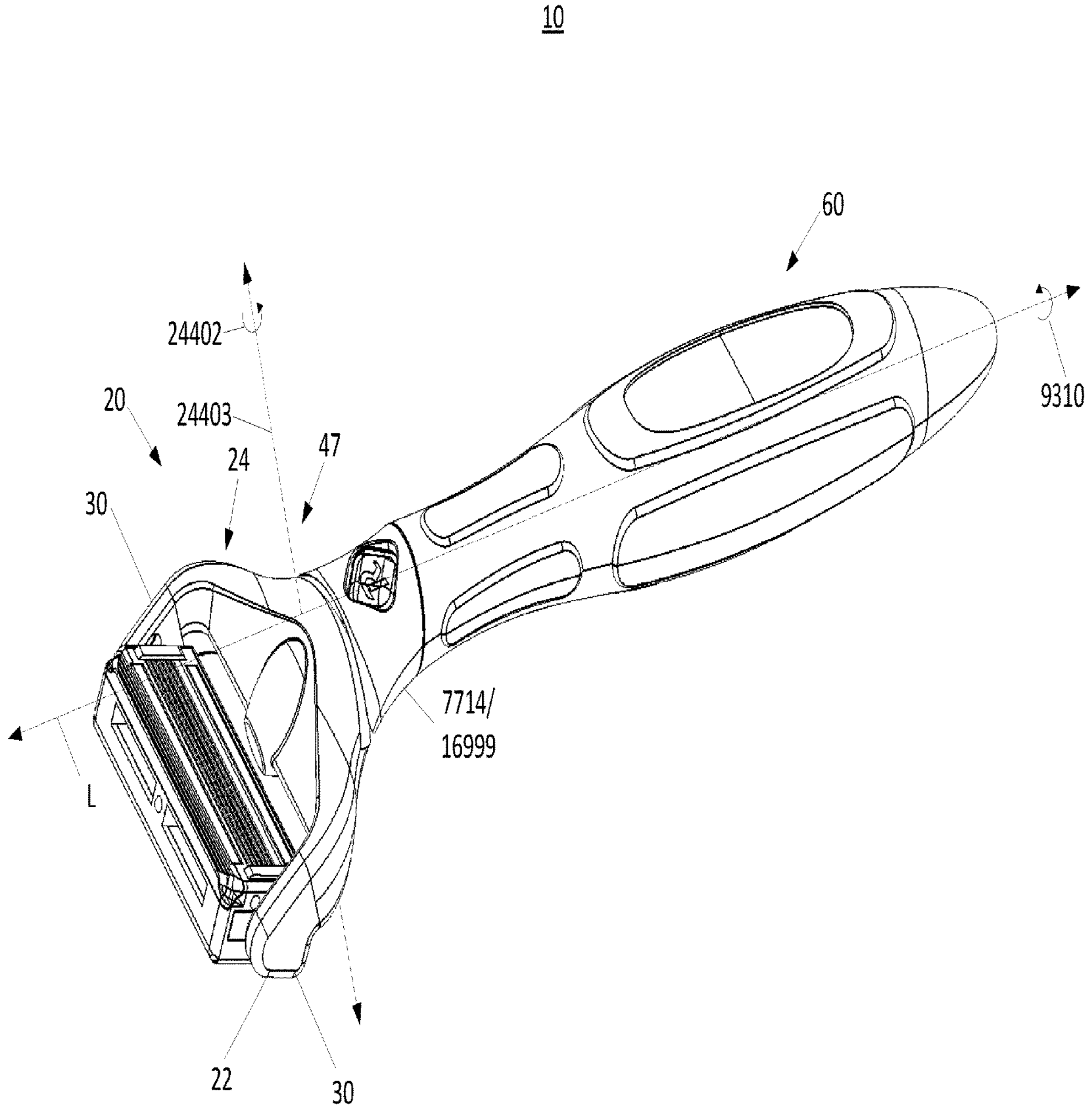
Figure 265:
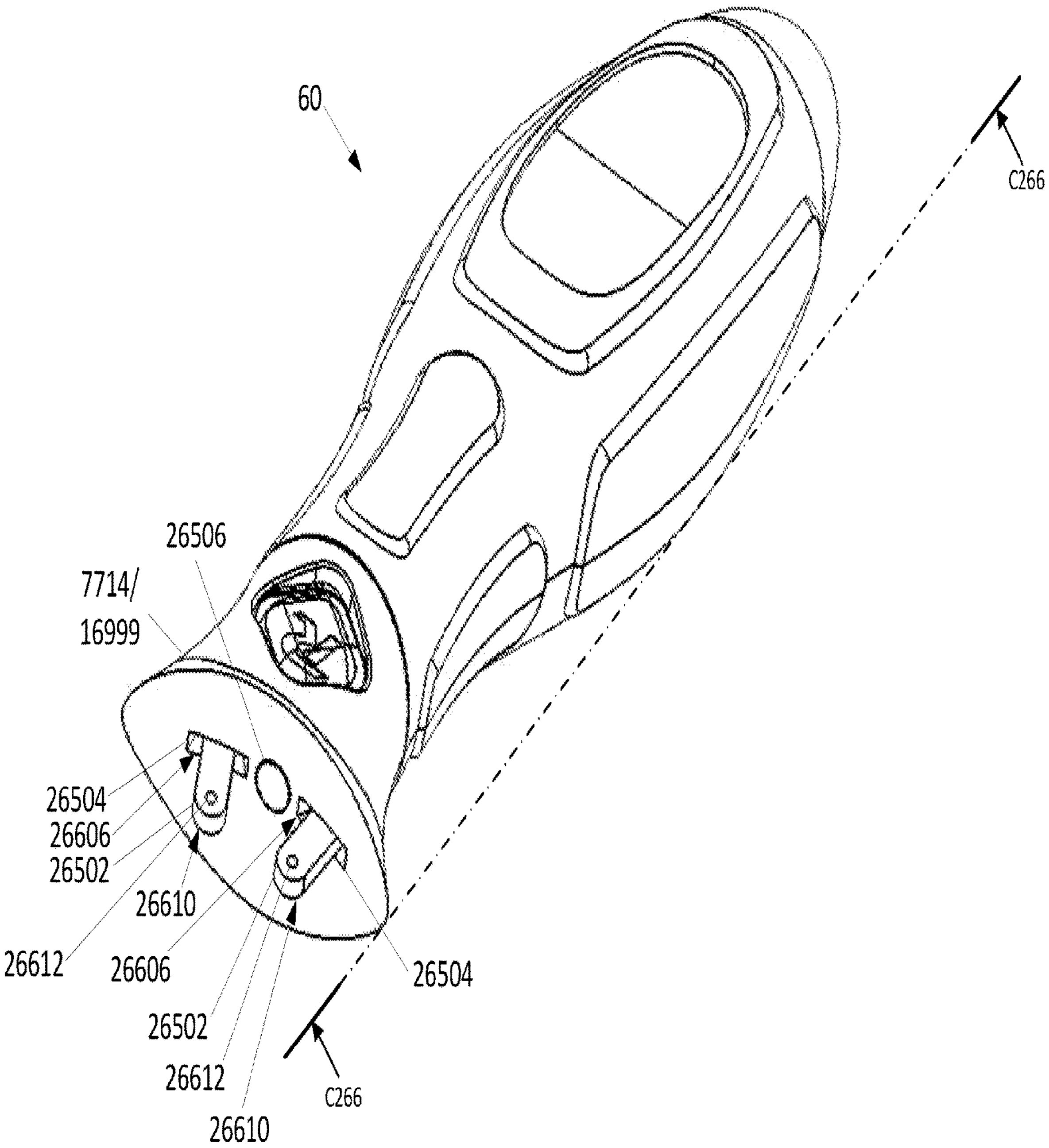
Figure 266:
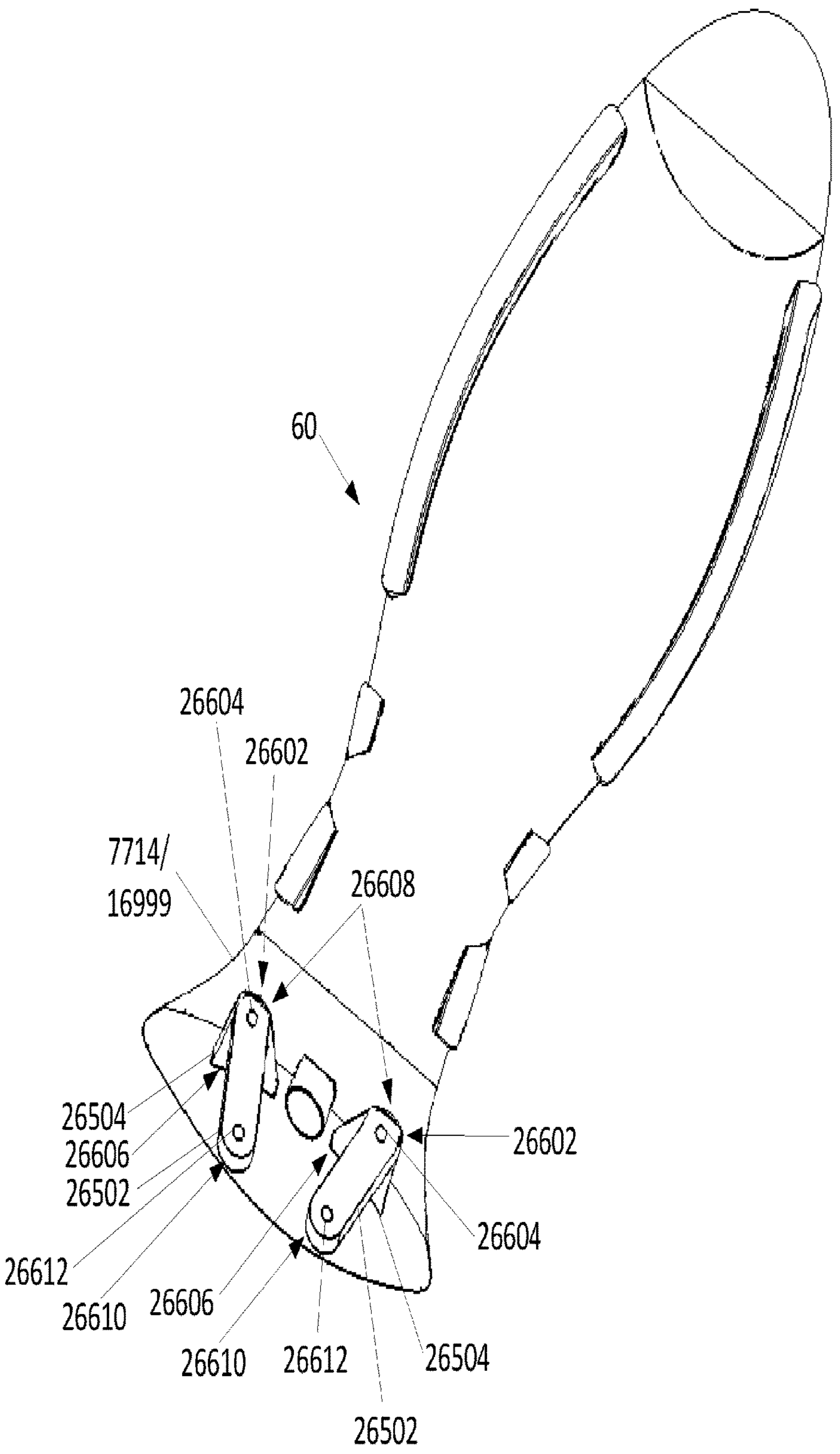
Figure 267:
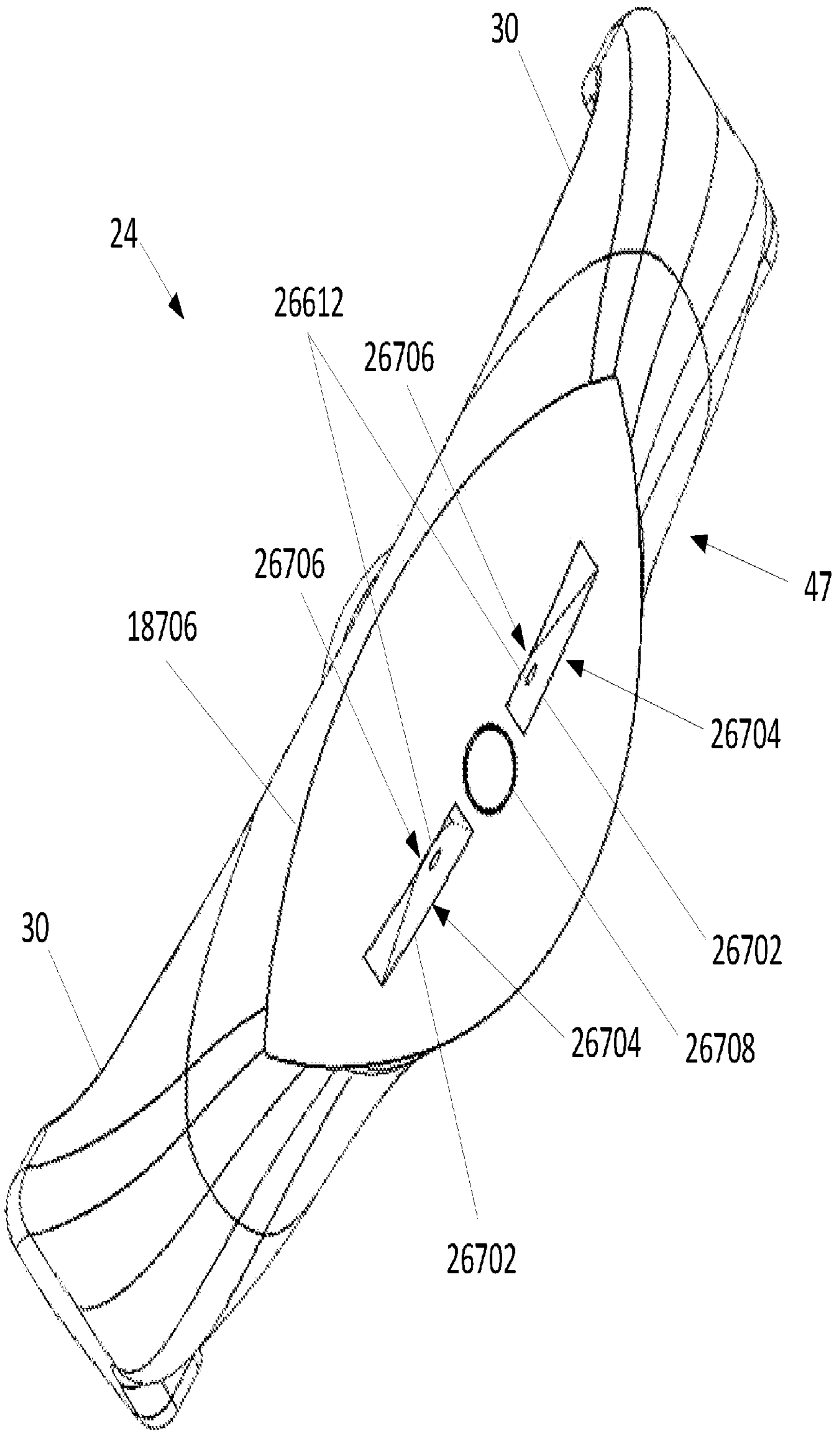
Figure 268:
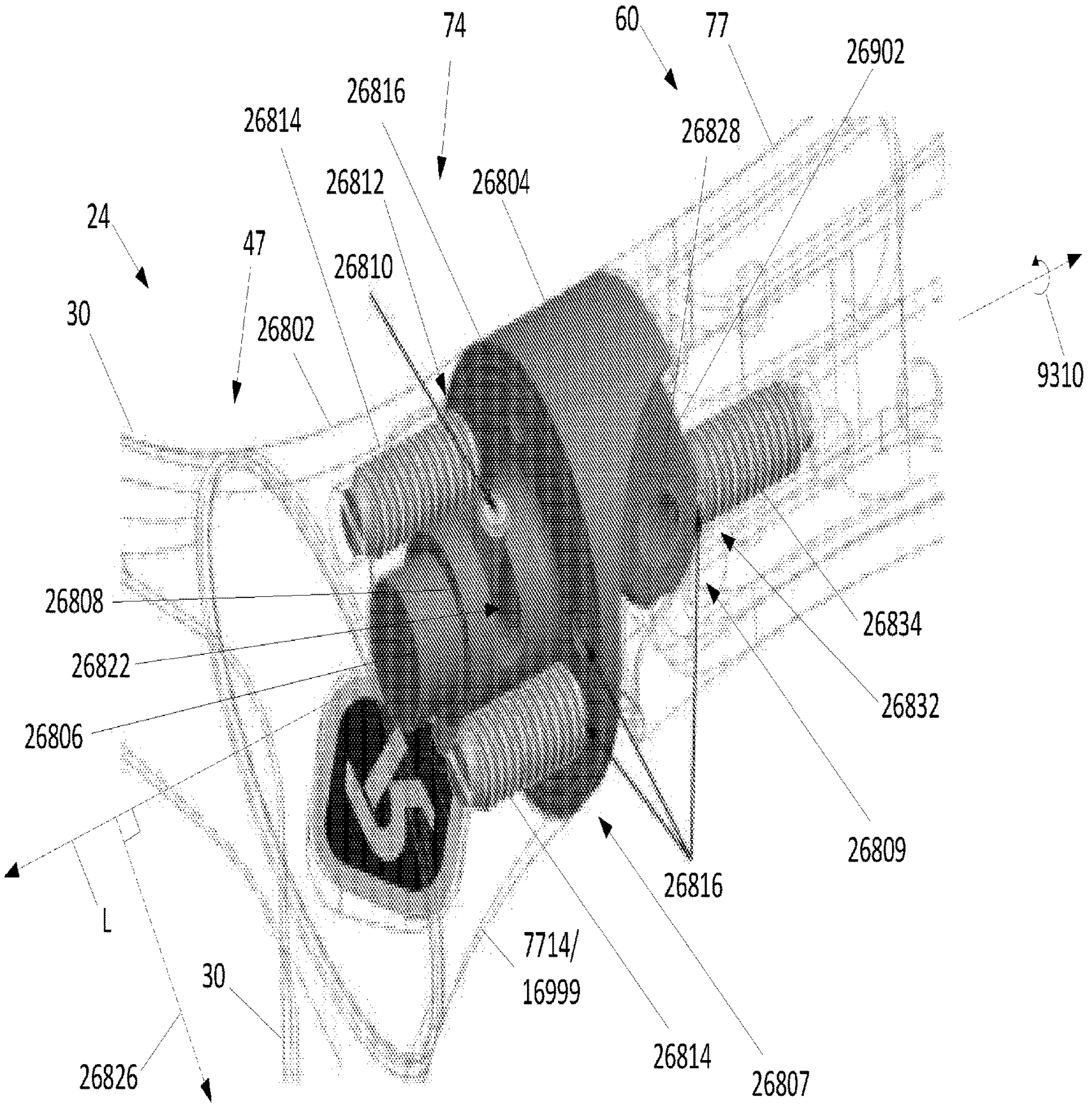
Figure 269:
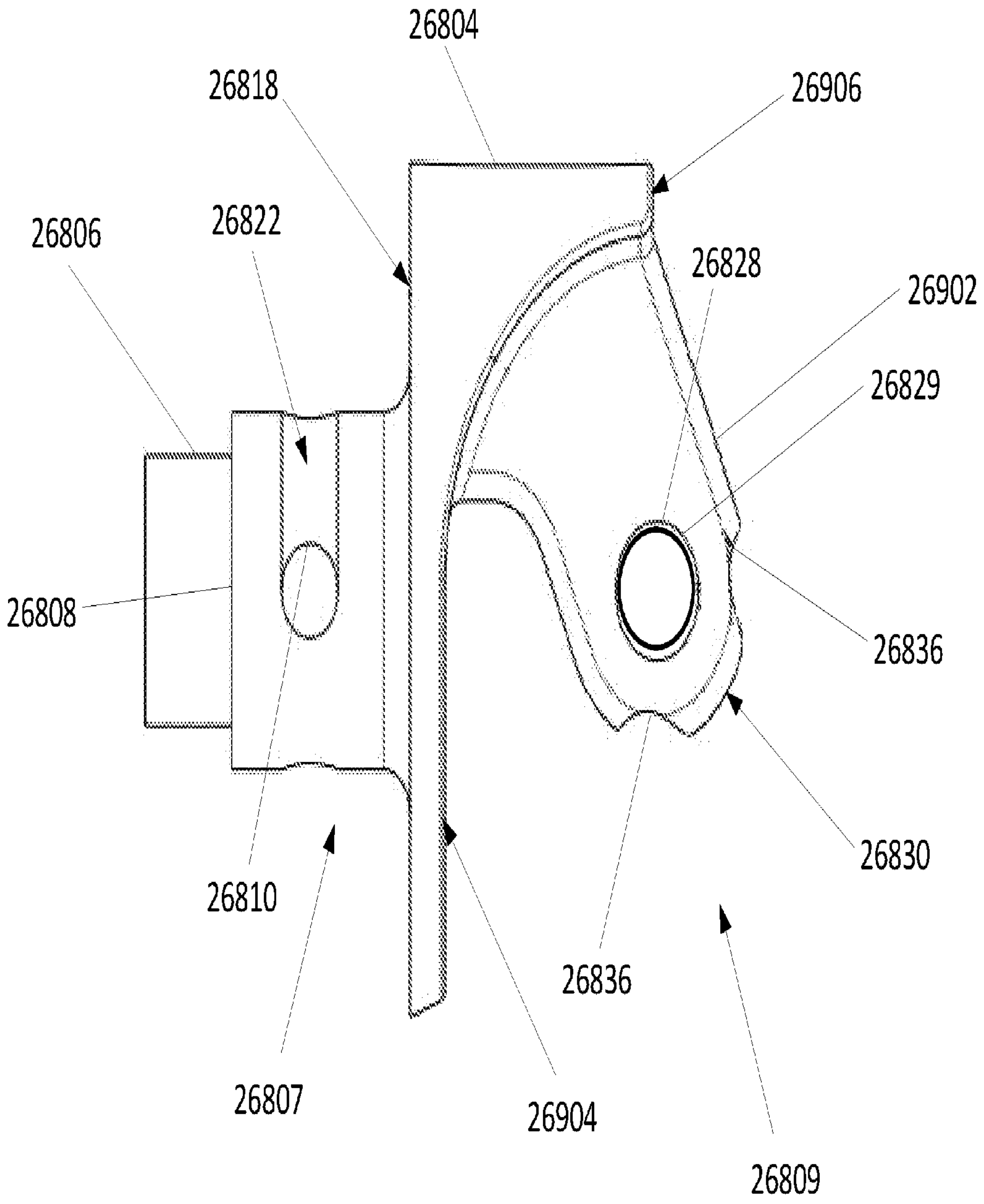
Figure 270:
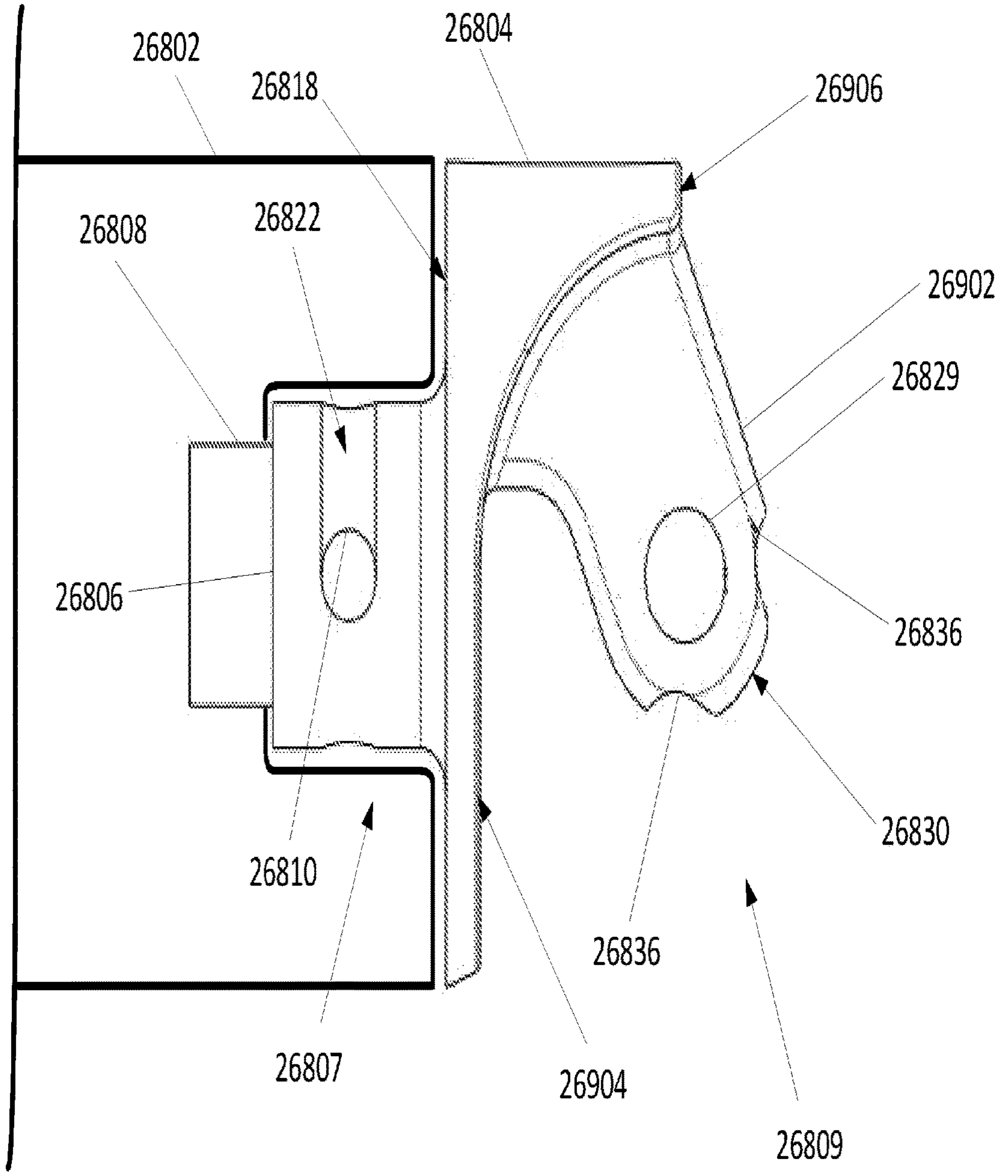
Figure 271:
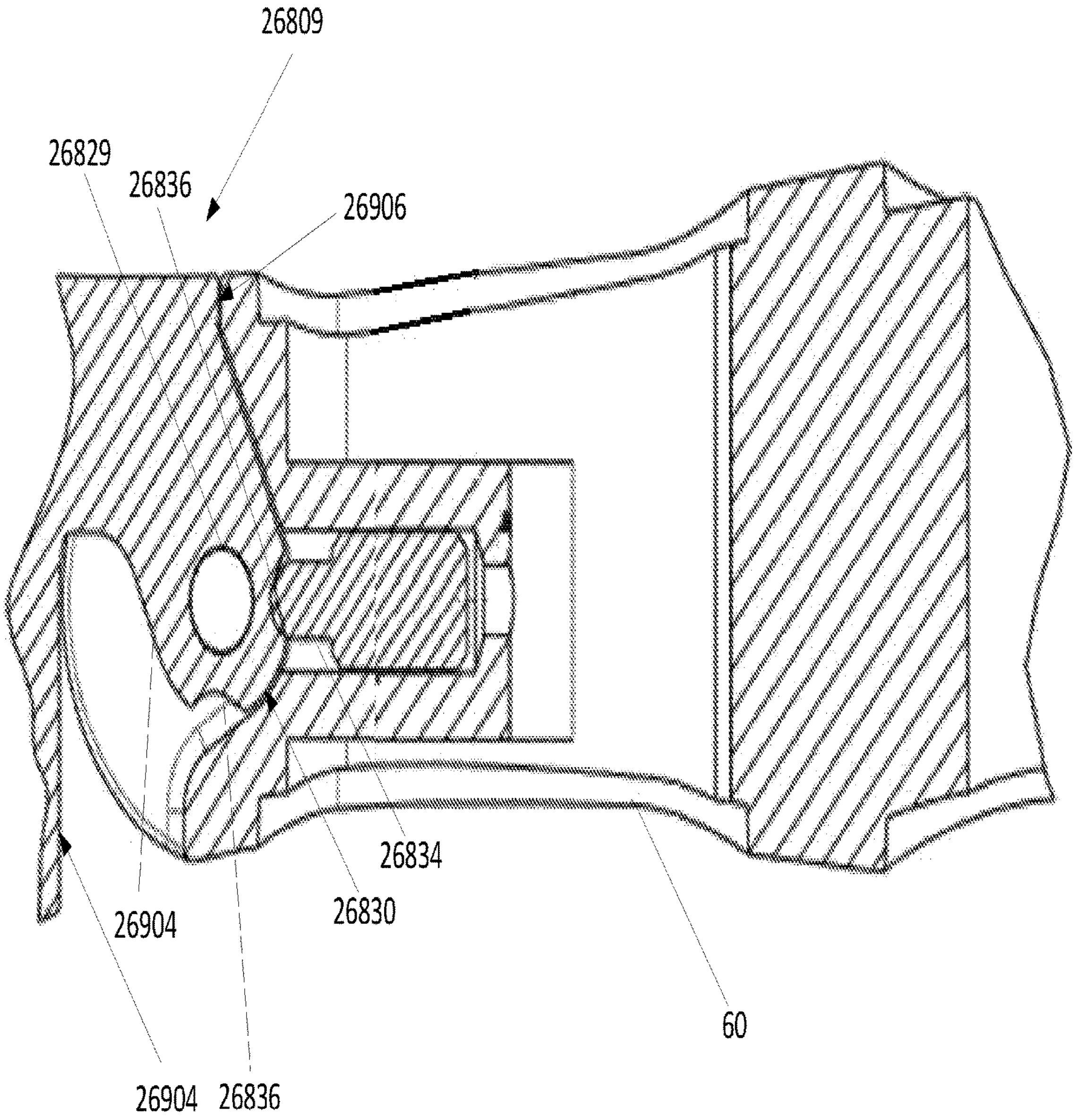
Figure 272:
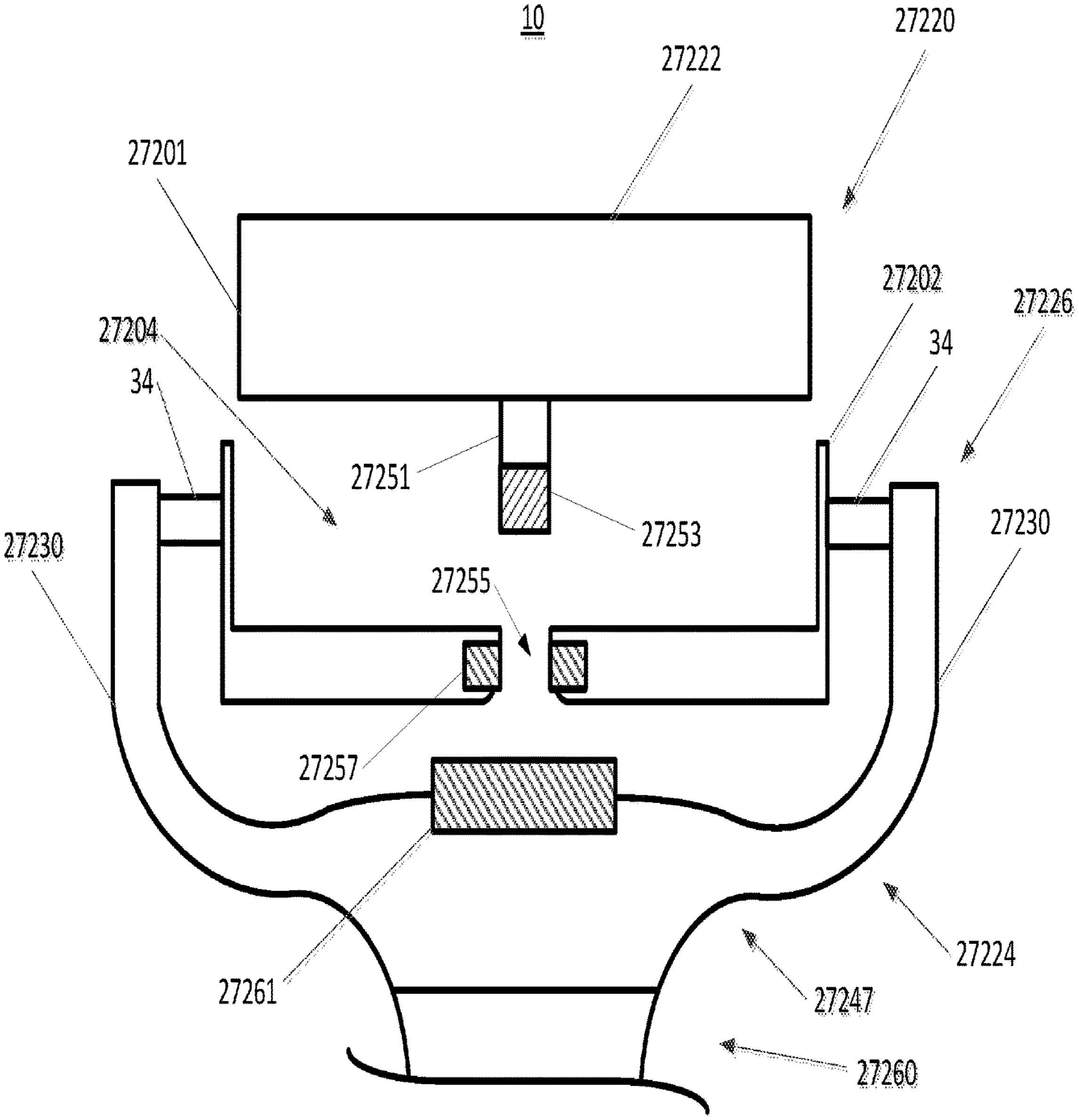
Figure 273:
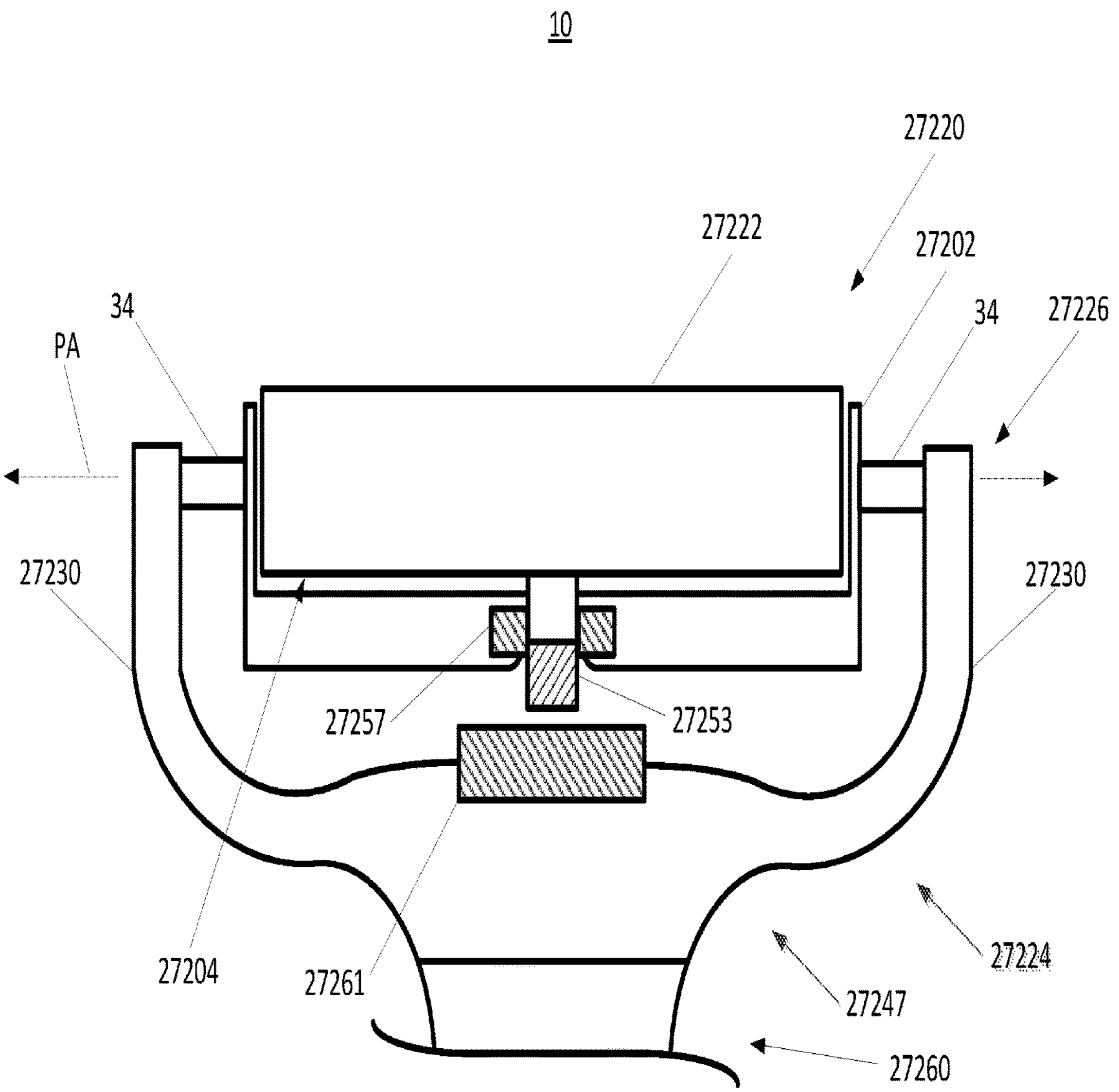

FIG. 187 shows one embodiment of a shaving device having a twist connection between the handle and the blade cartridge support member;

FIG. 188 shows a partial view of one embodiment of the handle and yoke insert of the shaving device of FIG. 187;

FIG. 189 shows one embodiment of a handle of the shaving device of FIG. 187;

FIG. 190 is another view of the handle of the shaving device of FIG. 189;

FIG. 191 shows one embodiment of the handle and head assembly of the shaving device of FIG. 187;

FIG. 192 is an exploded view of one embodiment of the handle and the yoke insert of the shaving device of FIG. 188;

FIG. 193 is another exploded view of the handle and the yoke insert of FIG. 192;

FIG. 194 is another view of the handle and the yoke insert of the shaving device of FIG. 192;

FIG. 195 is an exploded view of one embodiment of the blade cartridge and the yoke insert of the shaving device of FIG. 188;

FIG. 196 is another view of the yoke insert of the shaving device of FIG. 188;

FIG. 197 is a perspective view of a shaving device having a twist connection between the handle and the blade cartridge support member further including an alignment feature in a first position;

FIG. 198 is a perspective view of the shaving device of FIG. 197 including the alignment feature in a second position;

FIG. 199 is another view of the shaving device of FIG. 198 including the alignment feature in the second position;

FIG. 200 shows a view of a shaving device having connection mechanism between the arms of the blade cartridge support member and the blade cartridge;

FIG. 201 shows the shaving device of FIG. 200 in an unassembled state;

FIG. 202 shows one embodiment the blade cartridge support member of FIG. 200;

FIG. 203 is a side perspective view of the blade cartridge support member of FIG. 202;

FIG. 204 is a bottom perspective view of the blade cartridge support member of FIG. 202;

FIG. 205 is a side perspective view of the blade cartridge of FIG. 200;

FIG. 206 is an end perspective view of the blade cartridge of FIG. 205;

FIG. 207 is a top perspective view of the blade cartridge of FIG. 205;

FIG. 208 is an end view of the blade cartridge of FIG. 205;

FIG. 209 shows a view of another shaving device having connection mechanism between the arms of the blade cartridge support member and the blade cartridge;

FIG. 210 is a top perspective view of one embodiment of the blade cartridge of FIG. 209;

FIG. 211 is a side perspective view of the blade cartridge of FIG. 210;

FIG. 212 is a partial end view of the blade cartridge of FIG. 210;

FIG. 213 shows one embodiment the blade cartridge support member of FIG. 209;

FIG. 214 is a perspective view of the blade cartridge support member of FIG. 213;

FIG. 215 shows a variation of the connections mechanisms of FIGS. 200-214;

FIG. 216 shows a variation of the connections mechanisms of 209-214;

FIG. 217 shows an exploded view of an embodiment of a blade retention mechanism;

FIG. 218 shows another exploded view of the blade retention mechanism of FIG. 217;

FIG. 219 shows an exploded view of an embodiment of a shaving device including unstable equilibrium magnets;

FIG. 220 shows another embodiment of a shaving device in an assembled state;

FIG. 221 shows an exploded view of the shaving device of FIG. 220;

FIG. 222 shows a cross-sectional view of the blade cartridge support member of FIG. 220;

FIG. 223 shows an exploded view of the handle and the yoke insert of FIG. 220;

FIG. 224 shows a close up of the handle and the yoke insert of FIG. 223;

FIG. 225 shows an exploded view of the retention post and retention slots or groves;

FIG. 226 shows one embodiment of a blade cartridge support member lockout in a locked position;

FIG. 227 shows one embodiment of the blade cartridge support member lockout of FIG. 226 in an unlocked position;

FIG. 228 shows a cross-sectional view of a portion of the shaving device of FIG. 226 taken along lines C228-C228;

FIG. 229 shows one embodiment of a blade cartridge support member lockout in a locked position;

FIG. 230 shows one embodiment of the blade cartridge support member lockout of FIG. 229 in an unlocked position;

FIG. 231 shows a close-up of one embodiment of the slider switch of FIG. 229;

FIG. 232 shows a cross-sectional view of a portion of the blade cartridge support member of FIG. 229;

FIG. 233 shows an end perspective view of a portion of the handle of FIG. 229;

FIG. 234 shows an end view of the blade cartridge support member of FIG. 229;

FIG. 235 shows one embodiment of a slider switch catch;

FIG. 236 shows one embodiment of a corresponding slider channels, grooves and/or slots;

FIG. 237 shows one embodiment of a slider biasing device;

FIG. 238 shows another embodiment of a blade cartridge support member lockout;

FIG. 239 shows a cross-sectional view of the blade cartridge support member lockout of FIG. 238;

FIG. 240 shows a close-up of one embodiment of the slider switch of FIG. 238;

FIG. 241 shows an end view of the blade cartridge support member of FIG. 238;

FIG. 242 shows a close-up of one embodiment of the slider channels, grooves and/or slots;

FIG. 243 shows another embodiment of a blade cartridge support member lockout in an assembled state;

FIG. 244 shows another embodiment of a shaving device in an assembled state;

FIG. 245 shows the shaving device of FIG. 244 in an exploded state;

FIG. 246 shows the shaving device of FIG. 244 in an exploded state;

FIG. 247 shows a cross-sectional view of the shaving device of FIG. 244;

FIG. 248 shows a close-up of the handle of the shaving device of FIG. 244;

FIG. 249 shows a cross-sectional view of the blade cartridge support member of the shaving device of FIG. 244;

FIG. 250 shows a cross-sectional view of one embodiment of an enlarged ball/head secured within a ball socket/cavity by way of one or more pins;

FIG. 251 shows a close-up of the enlarged ball/head of FIG. 250;

FIG. 252 shows a close-up of another embodiment of the enlarged ball/head;

FIG. 253 shows a cross-sectional view of the enlarged ball/head and pin of FIG. 252;

FIG. 254 shows a cross-sectional view of the enlarged ball/head of FIG. 252 without the pin;

FIG. 255 shows another cross-sectional view of the enlarged ball/head of FIG. 252 without the pin;

FIG. 256 shows a close-up of a further embodiment of the enlarged ball/head;

FIG. 257 generally illustrates one embodiment of an assembled shaving device;

FIG. 258 generally illustrates a cross-sectional view of FIG. 257 taken along lines C258-C258;

FIG. 259 generally illustrates one embodiment of an unassembled shaving device of FIG. 257;

FIG. 260 generally illustrates a side view of one embodiment of a handle and pendulum pin of the shaving device of FIG. 257;

FIG. 261 generally illustrates a perspective view of one embodiment of a blade cartridge assembly of the shaving device of FIG. 257;

FIG. 262 generally illustrates a cross-sectional view the blade cartridge of FIG. 261 taken along lines C262-C262;

FIG. 263 generally illustrates a cross-sectional view the blade cartridge of FIG. 262 taken along lines C263-C263;

FIG. 264 shows another embodiment of a shaving device having a blade cartridge support member configured to move (e.g., pivot and/or rotate) relative to the handle;

FIG. 265 shows an end view of the handle of FIG. 264;

FIG. 266 shows a cross-sectional view of the handle of FIG. 266 taken along lines C266-C266;

FIG. 267 shows an end view of the blade cartridge support member of FIG. 264;

FIG. 268 shows another embodiment of the shaving device having a hinge;

FIG. 269 shows one embodiment of a hinge component of FIG. 268;

FIG. 270 shows one embodiment of the hinge component and combined collar/yoke of FIG. 268;

FIG. 271 shows a cross-sectional view of a portion of the handle and the hinge component of FIG. 268;

FIG. 272 generally illustrates one embodiment of the shaving device in an exploded, unassembled state;

FIG. 273 generally illustrates the shaving device of FIG. 272 in an assembled state.

Figure 274:
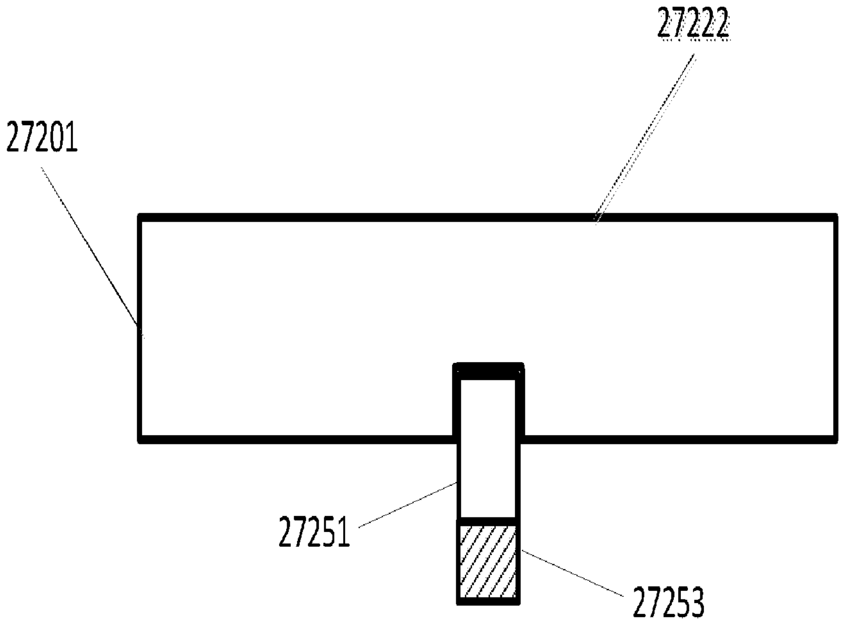
Figure 275:
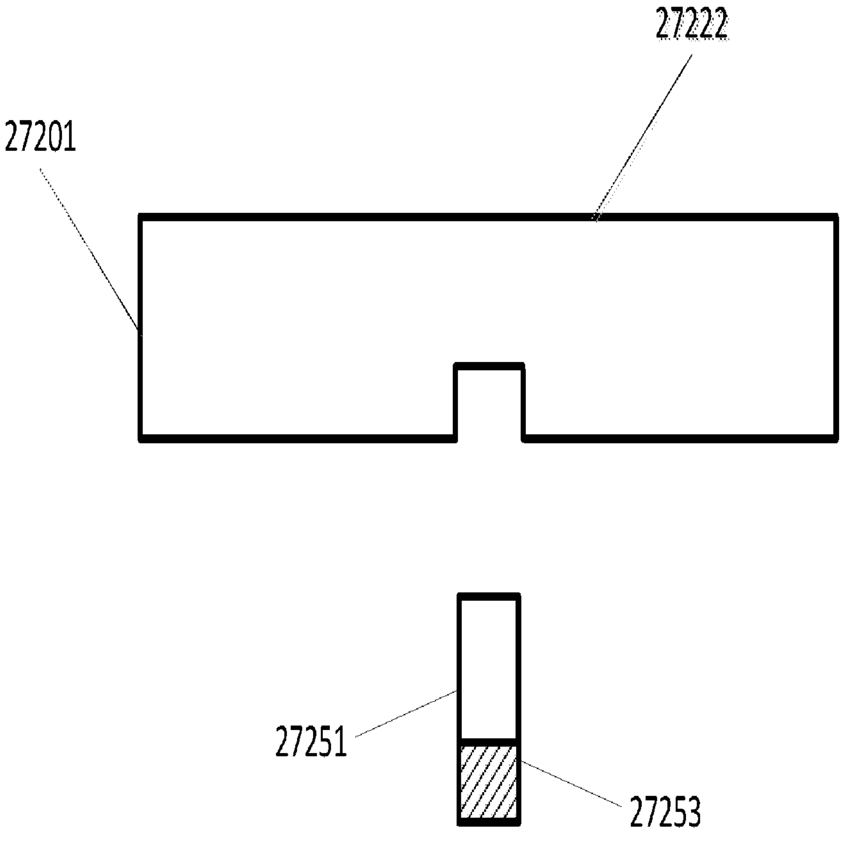
Figure 276:
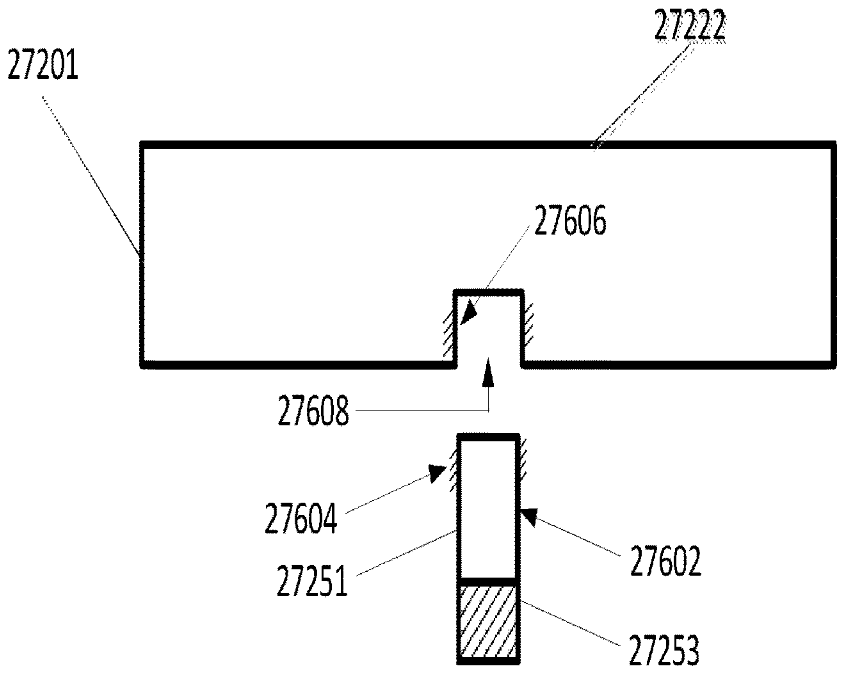
Figure 277:
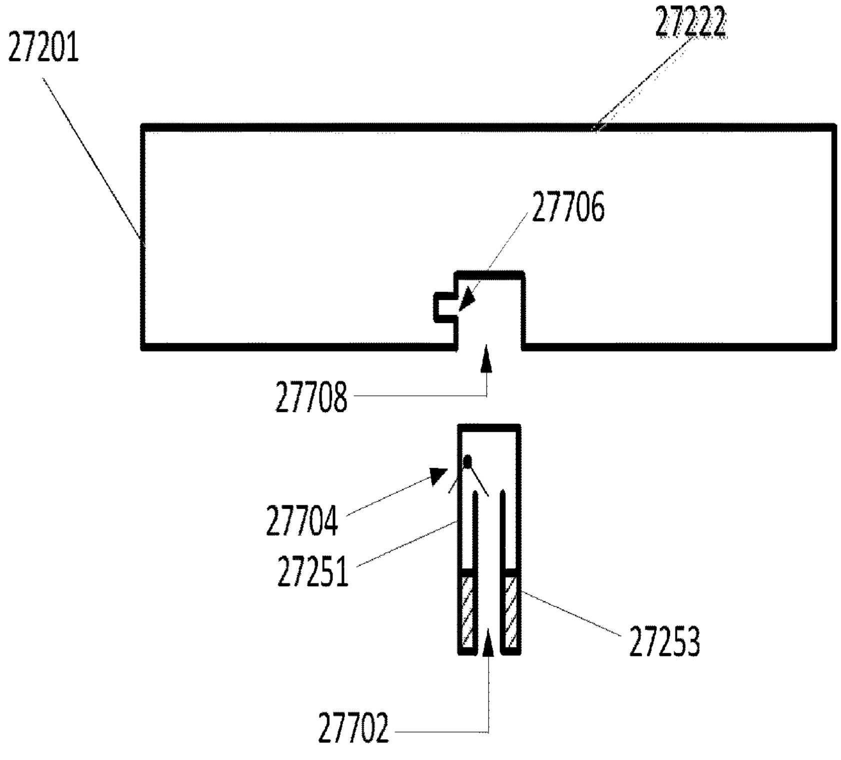
Figure 278:
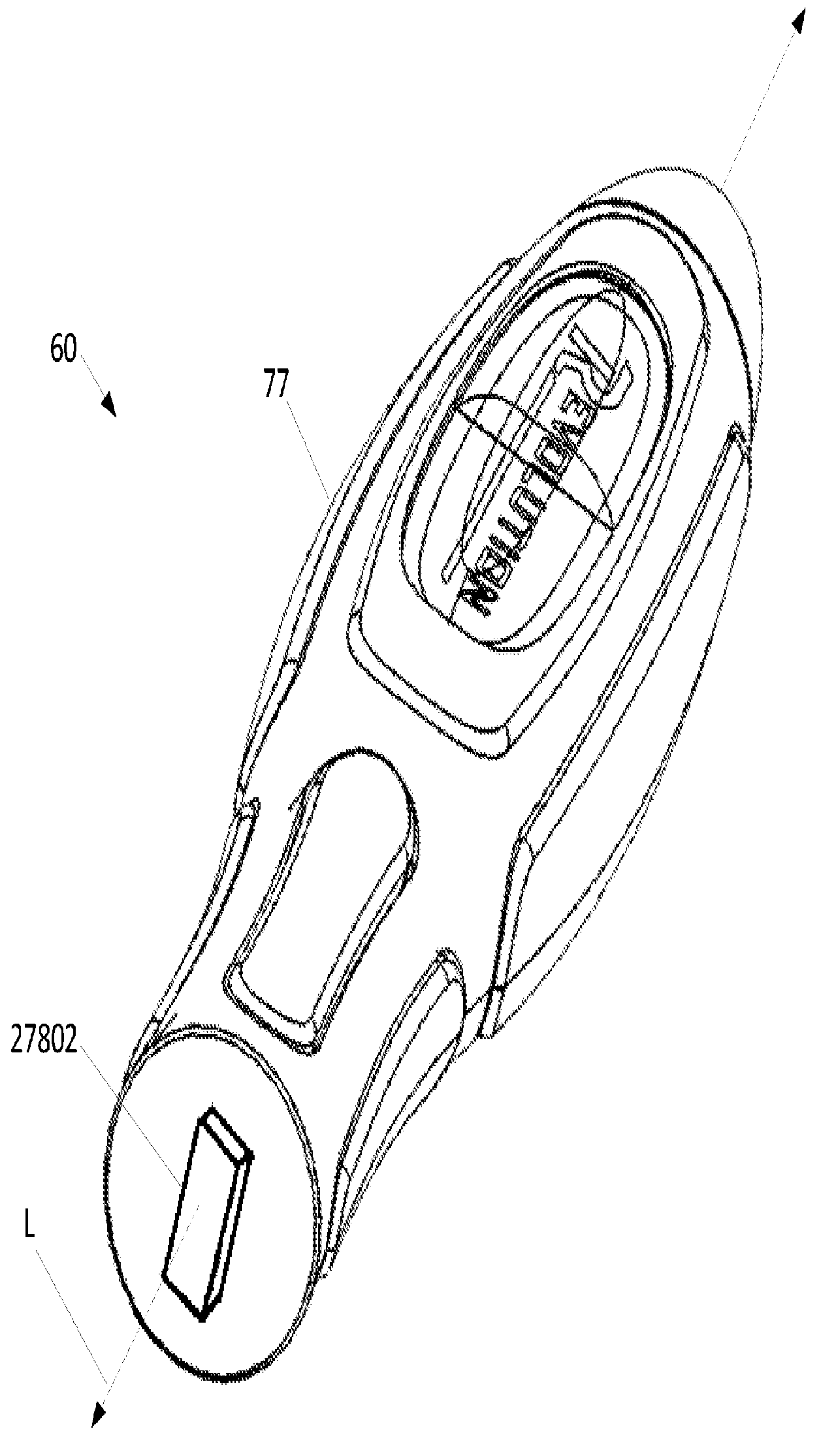
Figure 279:
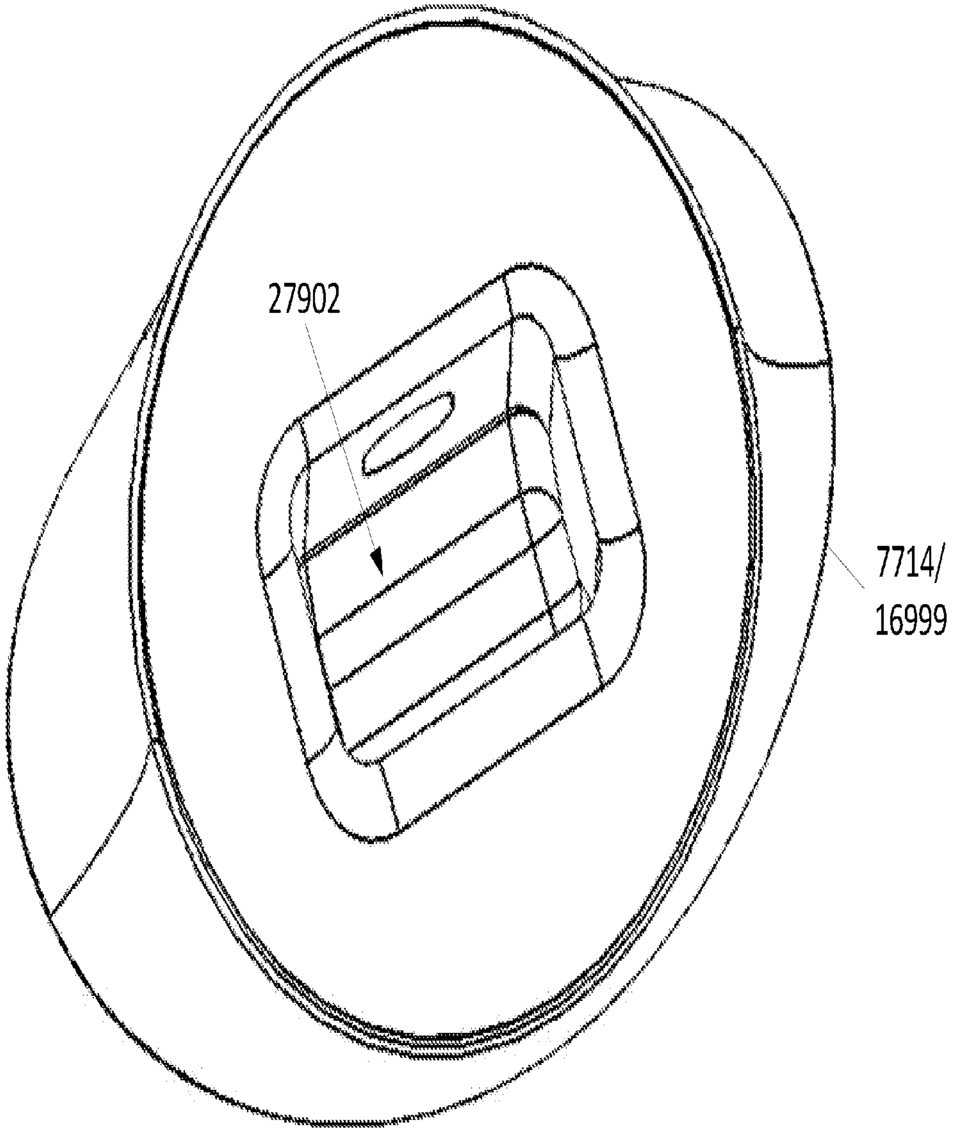
Figure 280:
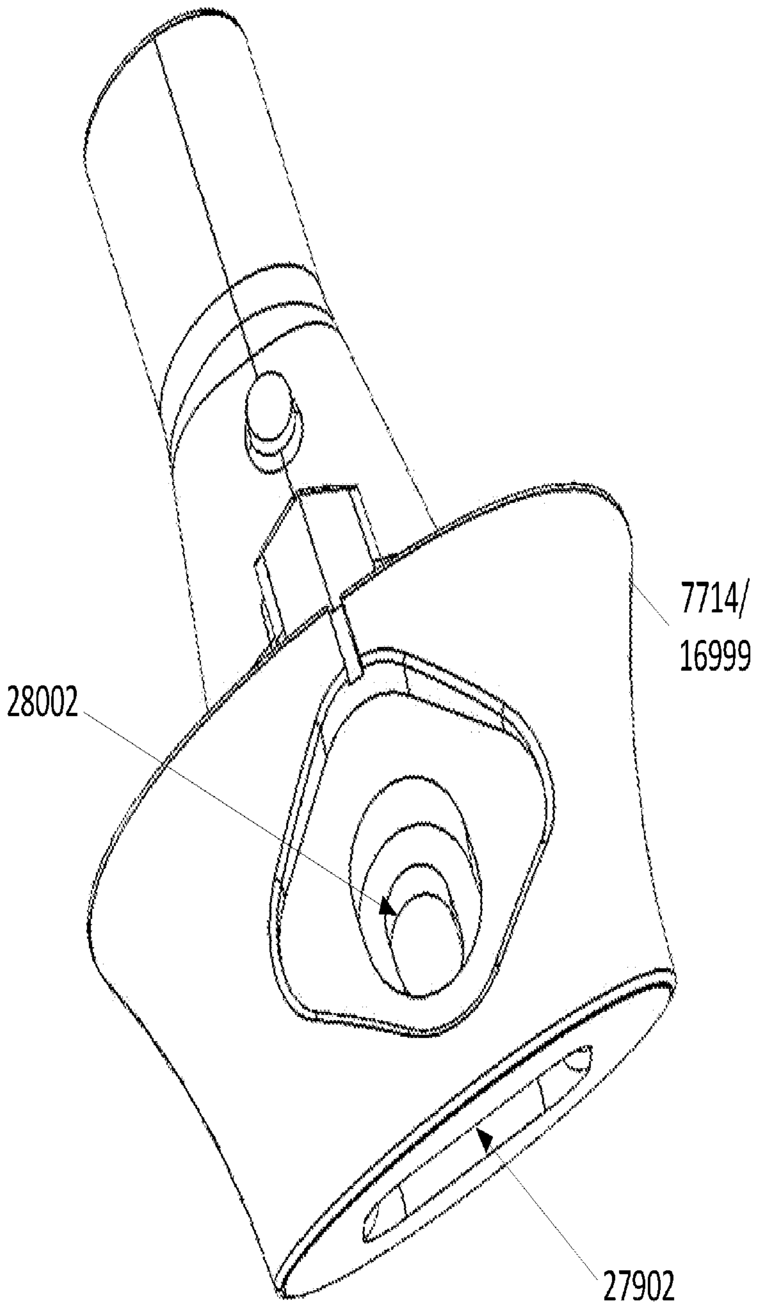
Figure 281:
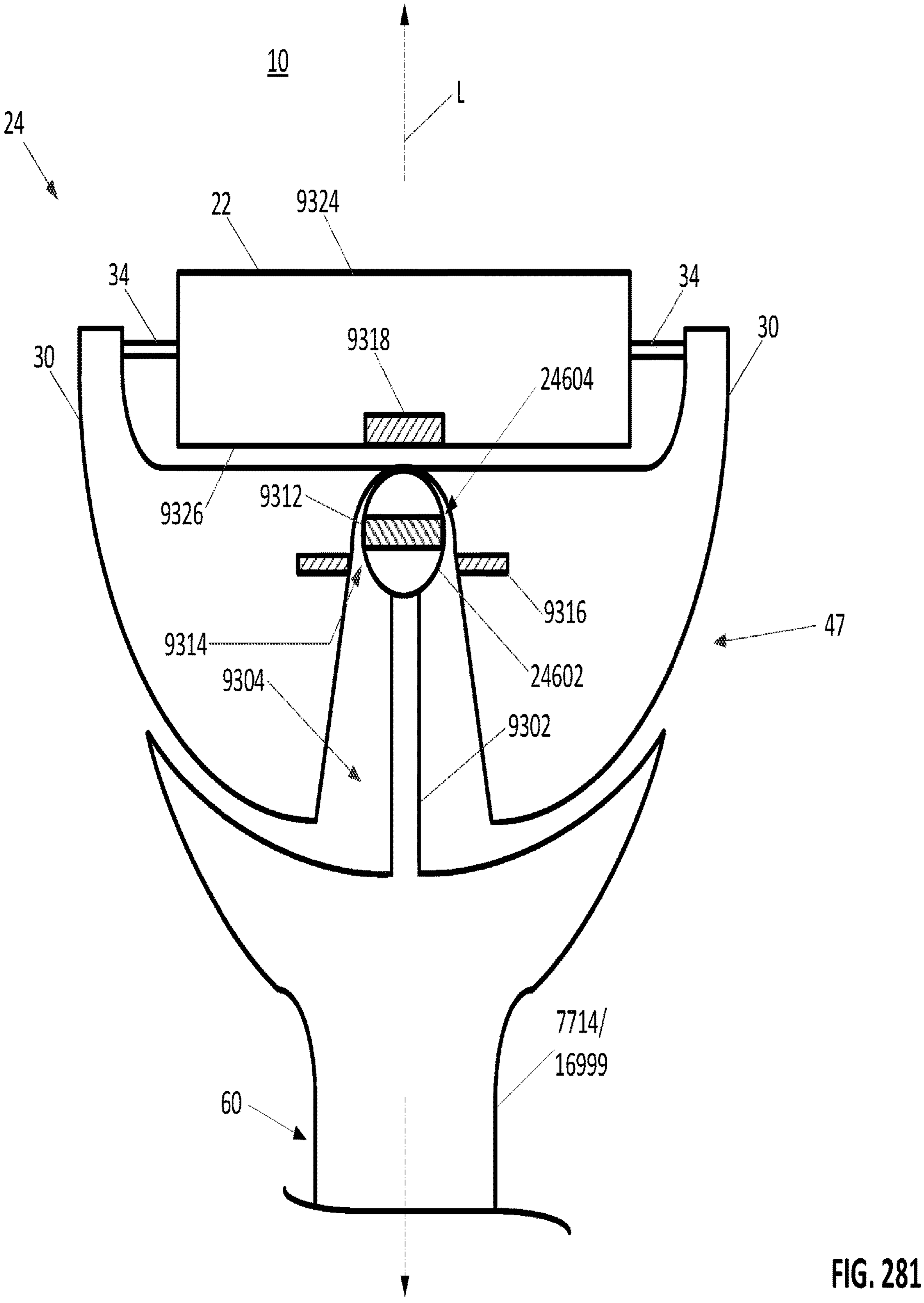
Figure 282:
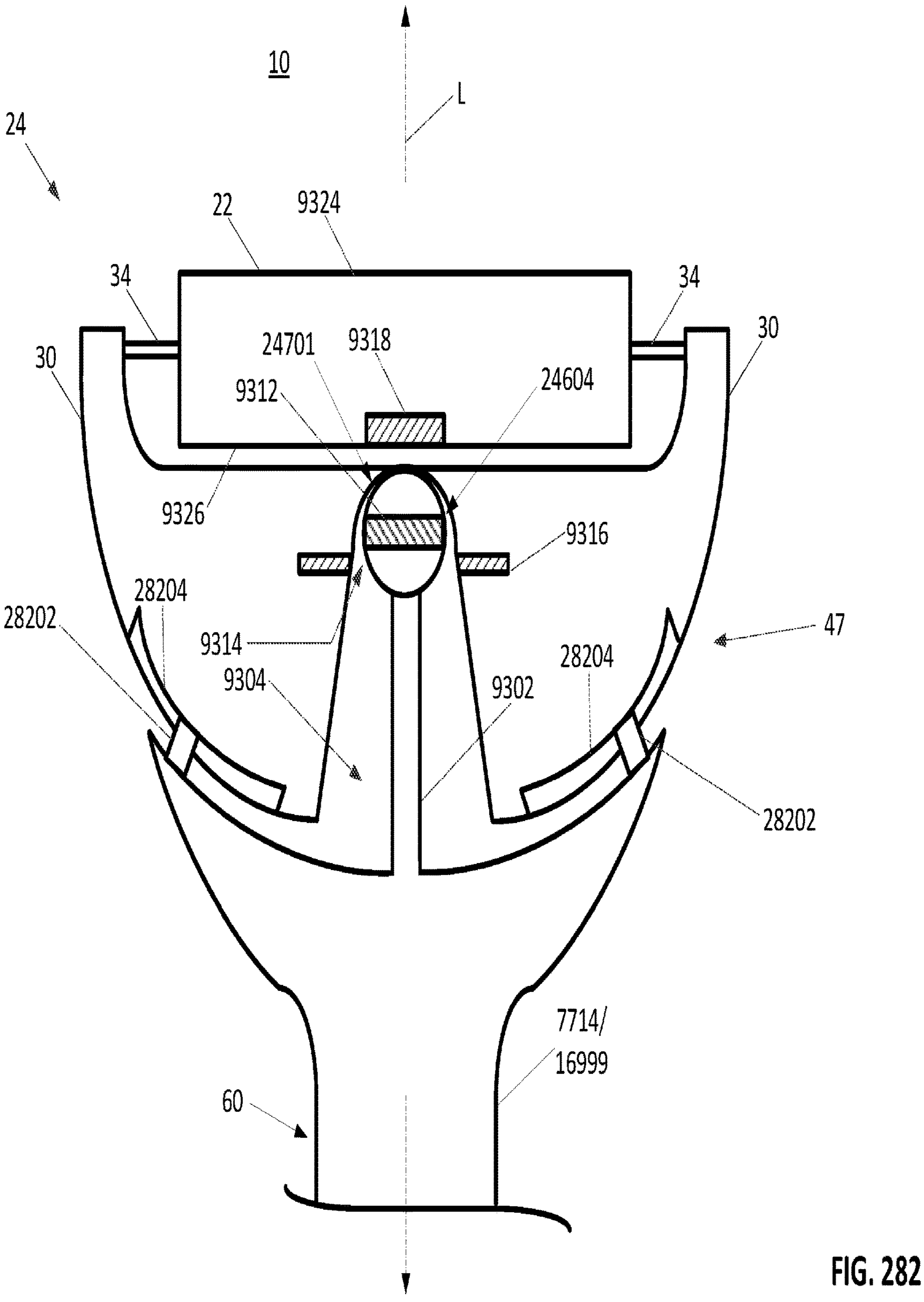
Figure 283:
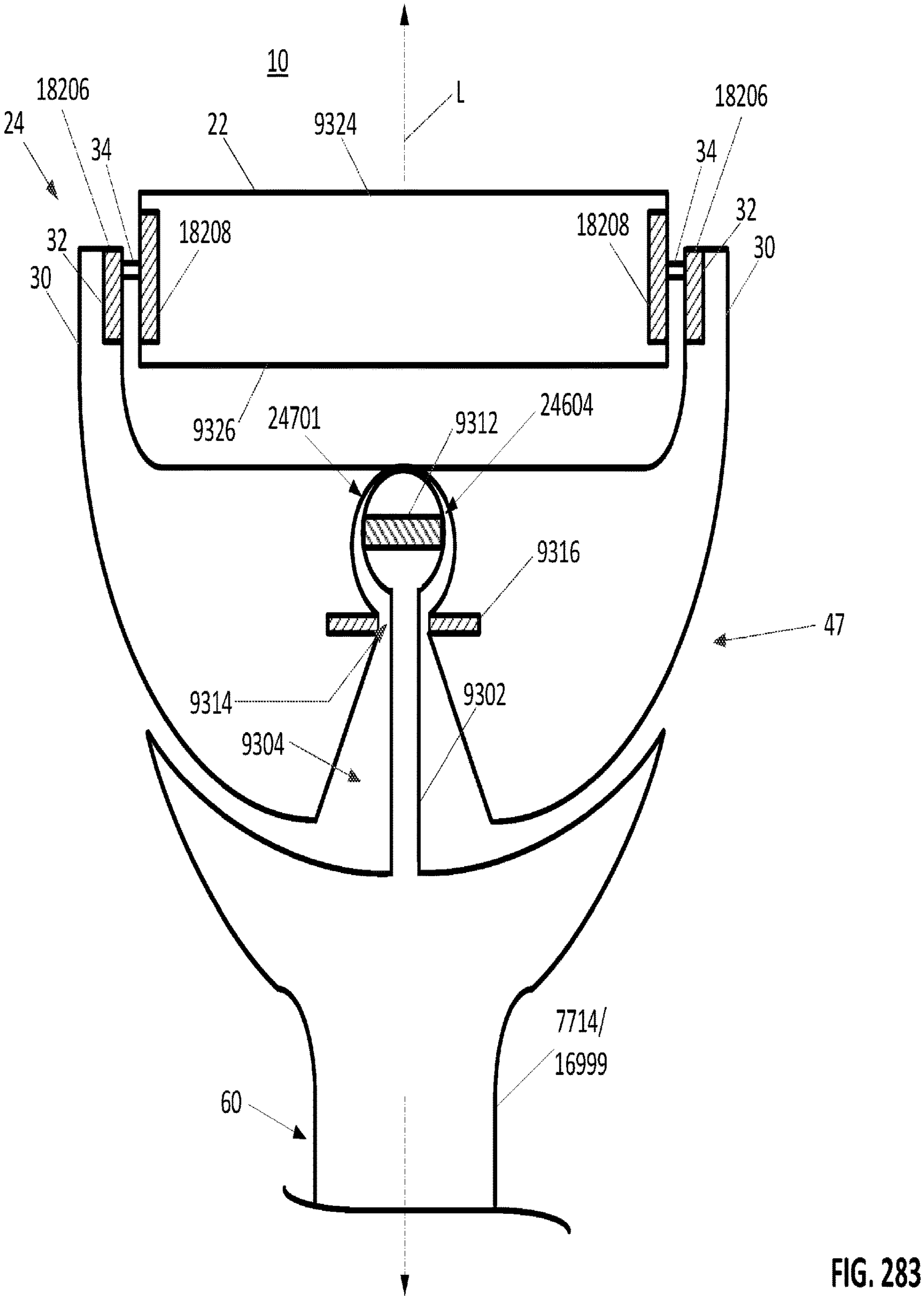
Figure 284:
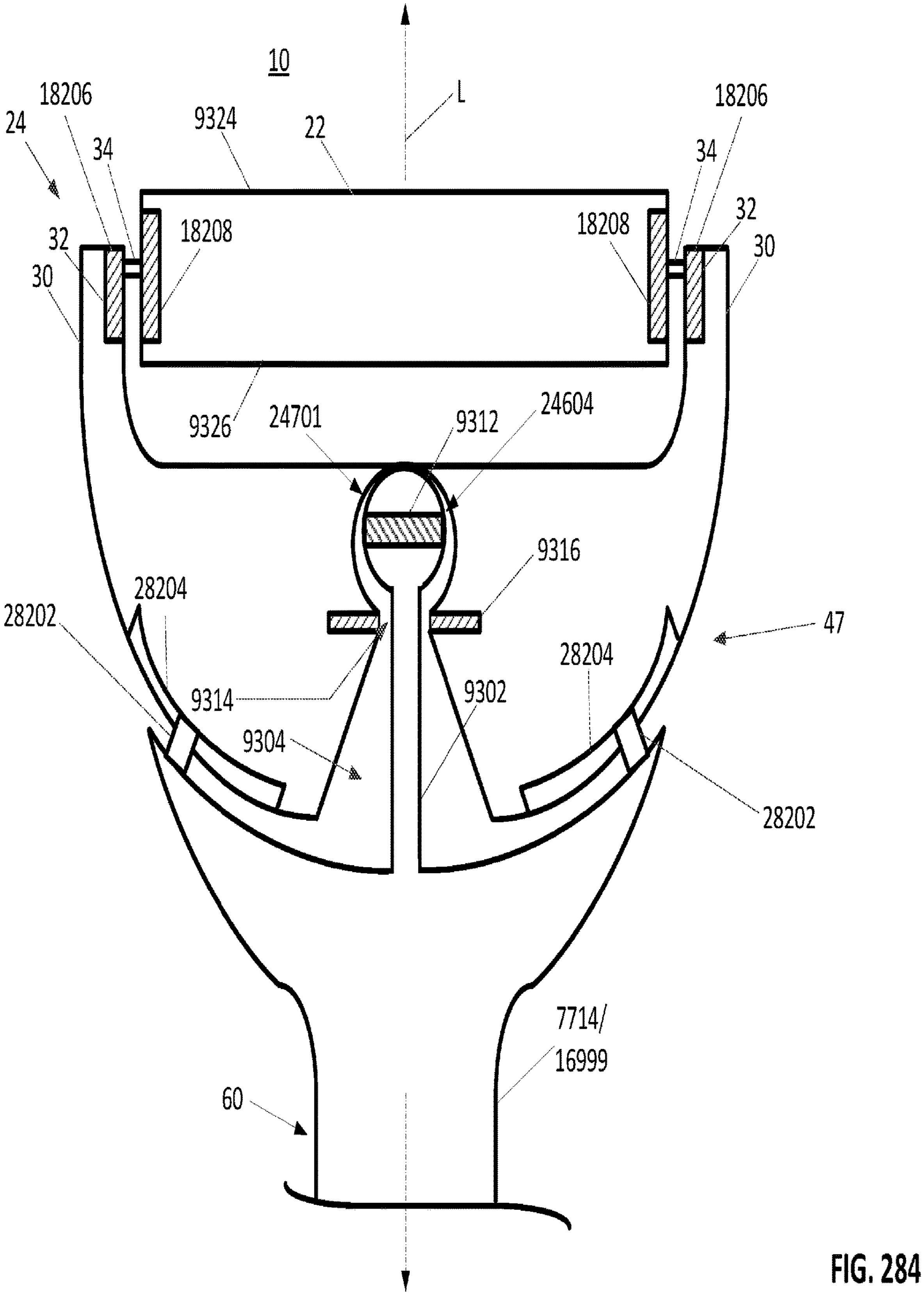

FIG. 274 shows another embodiment of the replaceable blade assembly wherein the blade assembly post is removably coupled to the replaceable blade assembly body in an assembled state;

FIG. 275 shows the replaceable blade assembly of FIG. 274 in an assembled state;

FIG. 276 shows another embodiment of the replaceable blade assembly of FIG. 274 in with a threaded connection;

FIG. 277 shows another embodiment of the replaceable blade assembly of FIG. 274 in with a snap connection;

FIG. 278 shows an end view of one embodiment of the shaft portion of a handle for forming a connection with a collar;

FIG. 279 shows an end view of one embodiment of the collar for forming a connection with the shaft portion of a handle of FIG. 278;

FIG. 280 shows a top view of the collar of FIG. 279;

FIG. 281 shows a cross-sectional view of another embodiment of a shaving device;

FIG. 282 shows a cross-sectional view of the shaving device of FIG. 281 including movement limiters;

FIG. 283 shows a cross-sectional view of a further embodiment of a shaving device;

FIG. 284 shows a cross-sectional view of the shaving device of FIG. 283 including movement limiters.

Figure 285:
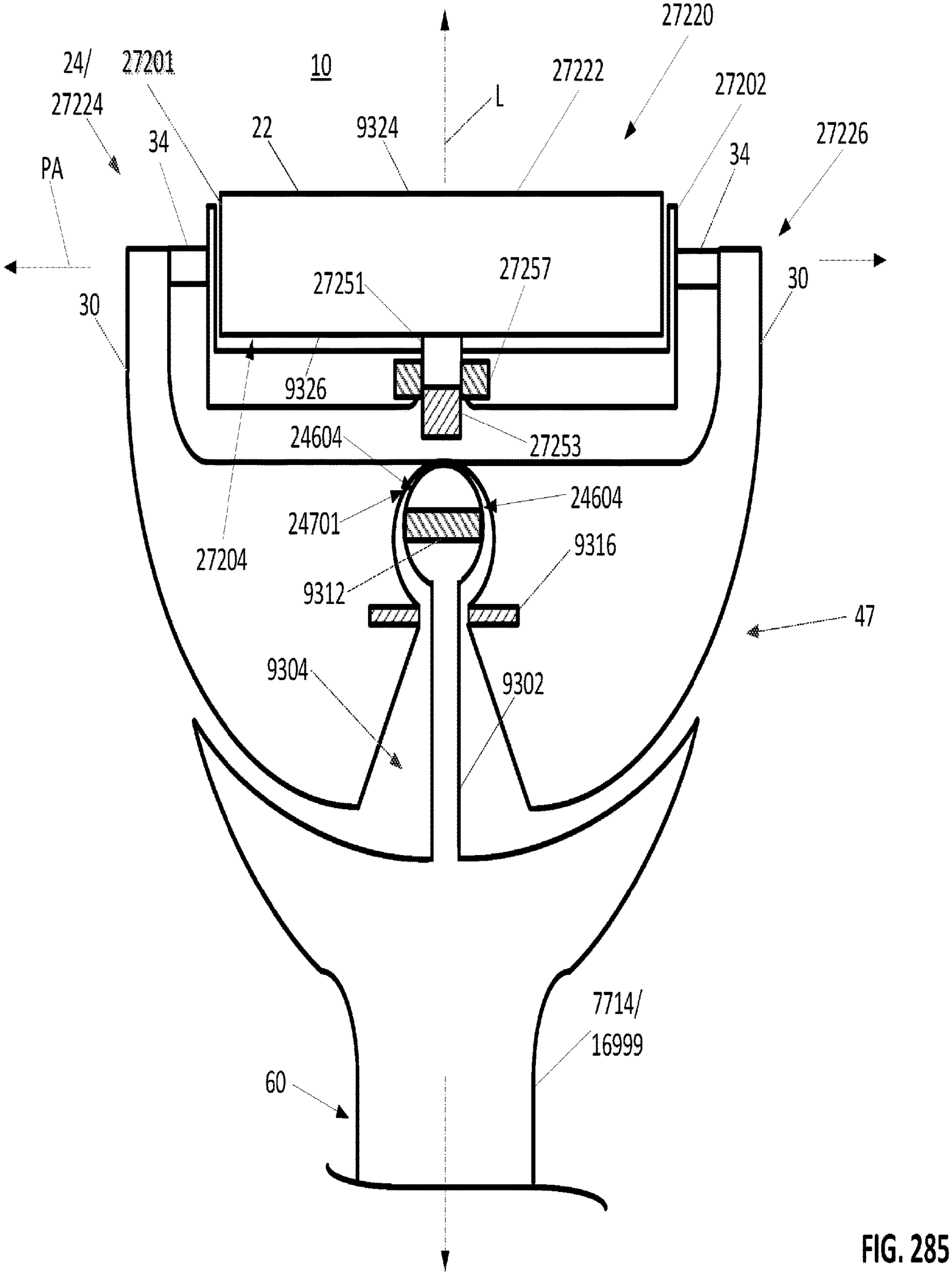
Figure 286:
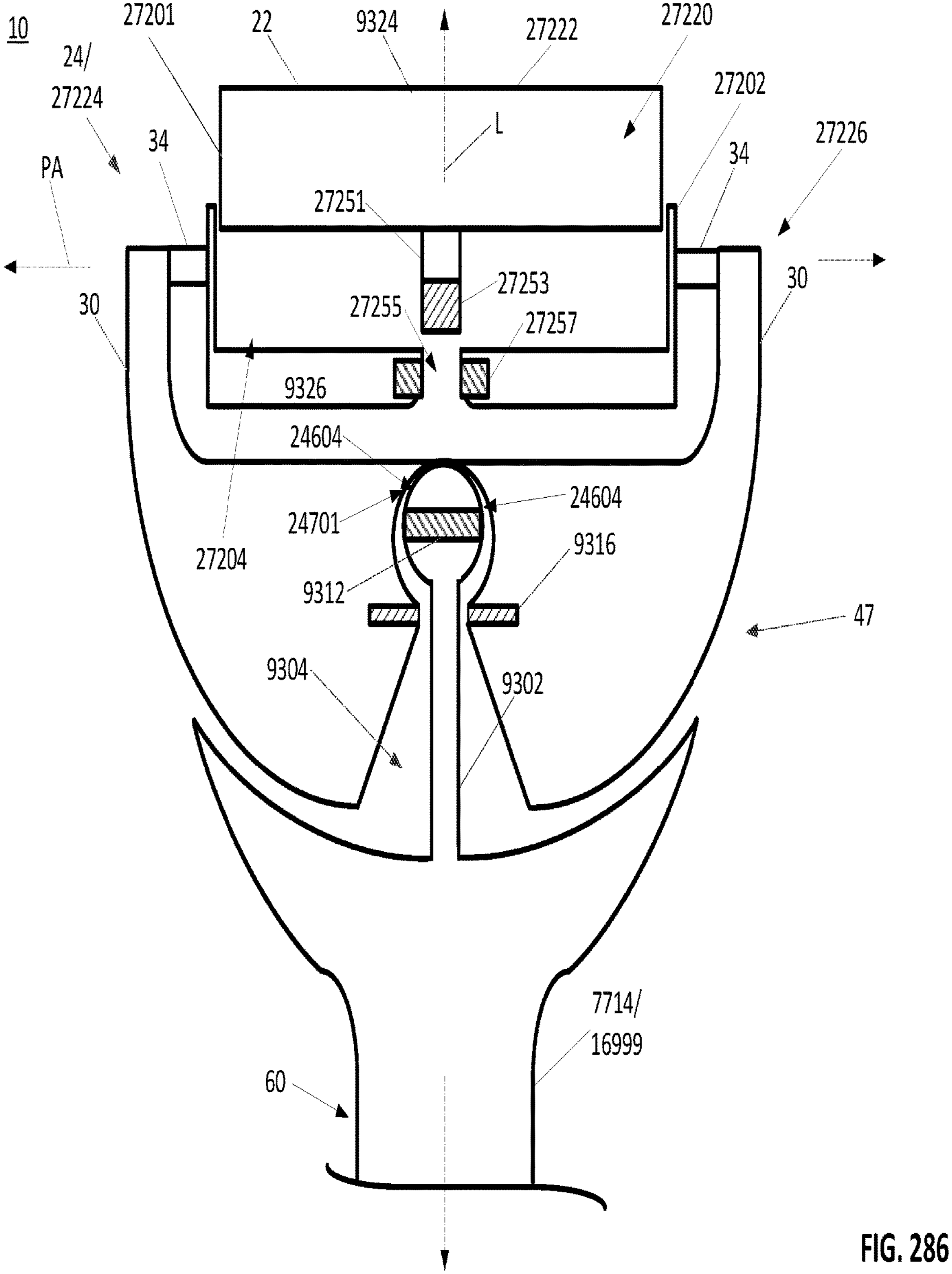

FIG. 285 shows a further embodiment of a shaving device in an assembled state; and FIG. 286 shows the shaving device of FIG. 285 in an unassembled state.

It should be appreciated that the above descriptions of the drawings are for illustrative purposes only and must therefore be read in view of the detailed description below. Not all of the features in the above description of the drawings must be in any particular embodiment(s) of the of the drawings, other features not listed in the above description of the drawings are also described that may be included with or without the above described features of the drawings, and the features described in of drawings/detailed description may be combined and/or modified in view of other features described in other drawings.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to the figures, FIGS. 1-4 show a personal, manual (i.e. non-powered) shaving device 10 according to one embodiment of the present disclosure, which is particularly useful for shaving human hair. As shown, shaving device 10 comprises a disposable head assembly 20 to shave the hair of a user of shaving device 10, as well as a handle 60 to hold and manipulate the shaving device 10.

Figure 1A:
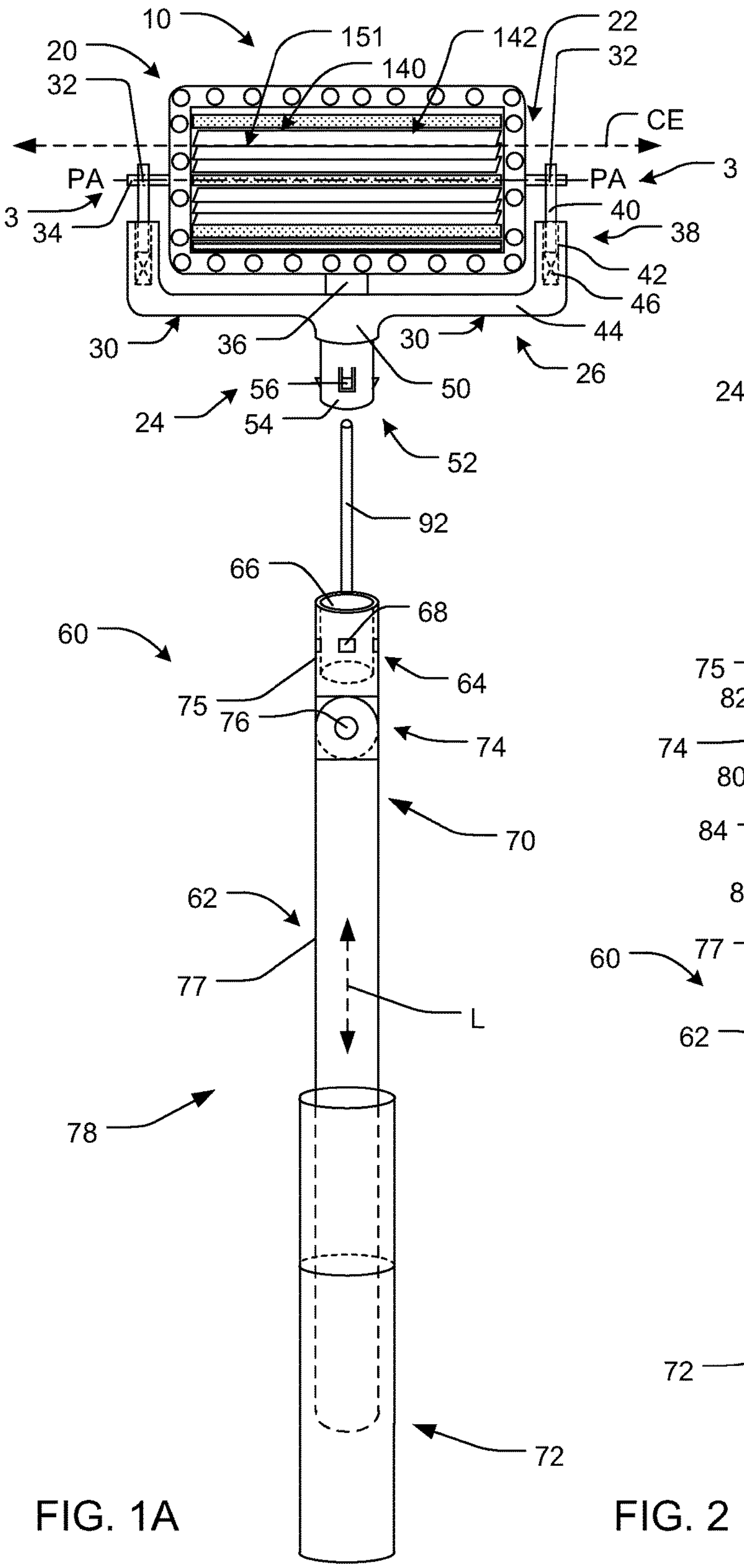
FIG. 1A shows a front view of a partially assembled shaving device consistent with one embodiment of the present disclosure.

As best shown by FIG. 1A, the disposable head assembly 20 comprises a blade cartridge 22 and a blade cartridge support member 24. As shown, blade cartridge support member 24 comprises a generally U-shaped cartridge support frame 26. U-shaped cartridge support frame 26 comprises two generally curved support arms 30. For example, the support arms 30 may have a generally C-shape or L-shape.

To facilitate pivotable attachment of blade cartridge 22 to the blade cartridge support member 24 and subsequent use thereof, the blade cartridge 22 and the blade cartridge support member 24 may include one or more hinges or pivot assemblies 3 that allows the blade cartridge 22 to rotate about a pivot axis PA (e.g., about a direction generally perpendicular to the longitudinal axis L of the handle 60.) As described herein, the hinge or pivot assembly 3 may be configured to allow the blade cartridge 22 to rotate approximately 180 degrees about pivot axis PA such that a front side 140 and rear side 156 of the blade cartridge 22 may be used. According to one embodiment, the hinge or pivot assembly 3 may be configured to allow the blade cartridge 22 to rotate approximately 360 degrees about pivot axis PA.

For example, the hinge or pivot assembly 3 may include a pivot receptacle 32 (e.g., in the form of a through-hole) disposed in each support arm 30 of the blade cartridge support member 24 (e.g., but not limited to, a distal section 40 of the support arms 30), each of which receives a pivot pin/cylinder 34 located on opposing lateral sides of the blade cartridge 22. The pivot pins/cylinders 34 may extend generally outwardly from the lateral sides of the blade cartridge 22. With the foregoing arrangement, the blade cartridge 22 is arranged between the support arms 30 and supported by each support arm 30 at a pivot connection (assembly), and the blade cartridge 22 is able to rotate about the pivot axis PA at any angle, up to and including 360° degrees. It should be appreciated that the location of one or more of the pivot receptacles 32 and the pivot pins 34 may be switched (e.g., one or more of the pivot receptacles 32 may be located in the blade cartridge 22 and one or more of the pivot pins 34 may extend outwardly from the support arms 30 of the blade cartridge support member 24)

In order to cushion use of blade cartridge 22 while shaving, one or more of the support arms 30 may include a cushioning mechanism 38. As shown, a second (distal) section 40 of each support arm 30 is configured to slide within a receptacle 42 (e.g., a slotted recess) of a first (proximal) section 44 of each support arm 30. Each receptacle 42 may include a compression (e.g., coil) spring or biasing device 46 at the bottom thereof. As used herein, proximal and distal may be understood relative to the user of shaving device 10.

In the foregoing manner, the biasing device 46 of the cushioning mechanism 38 may compress in response to a downward force placed on blade cartridge 22, with such compression biasing against the downward force. In doing so, such compression may absorb/dampen the downward force to cushion use of the blade cartridge 22. Furthermore, since the cushioning mechanism 38 of each support arm 30 is independent of one another, the cushioning mechanism 38 may enable each lateral end of the blade cartridge 22 to move and/or be cushioned independently. It should be understood that in other embodiments of shaving device 10, the blade cartridge support member 24 may not include a cushioning mechanism 38.

The head assembly 20 may be selectively detachably connectable to the handle 60 by the user. As may be appreciated, any mechanism for selectively coupling the blade cartridge support member 24 to the handle 60 may be used. For example, the blade cartridge support member 24 may include a support hub 50, which may be centrally disposed between the two support arms 30. The support hub 50 includes a mechanical connection element 52 which mechanically connects the blade cartridge support member 24 to a mechanical connection element 64 of elongated shaft 62 of handle 60.

Figure 2:
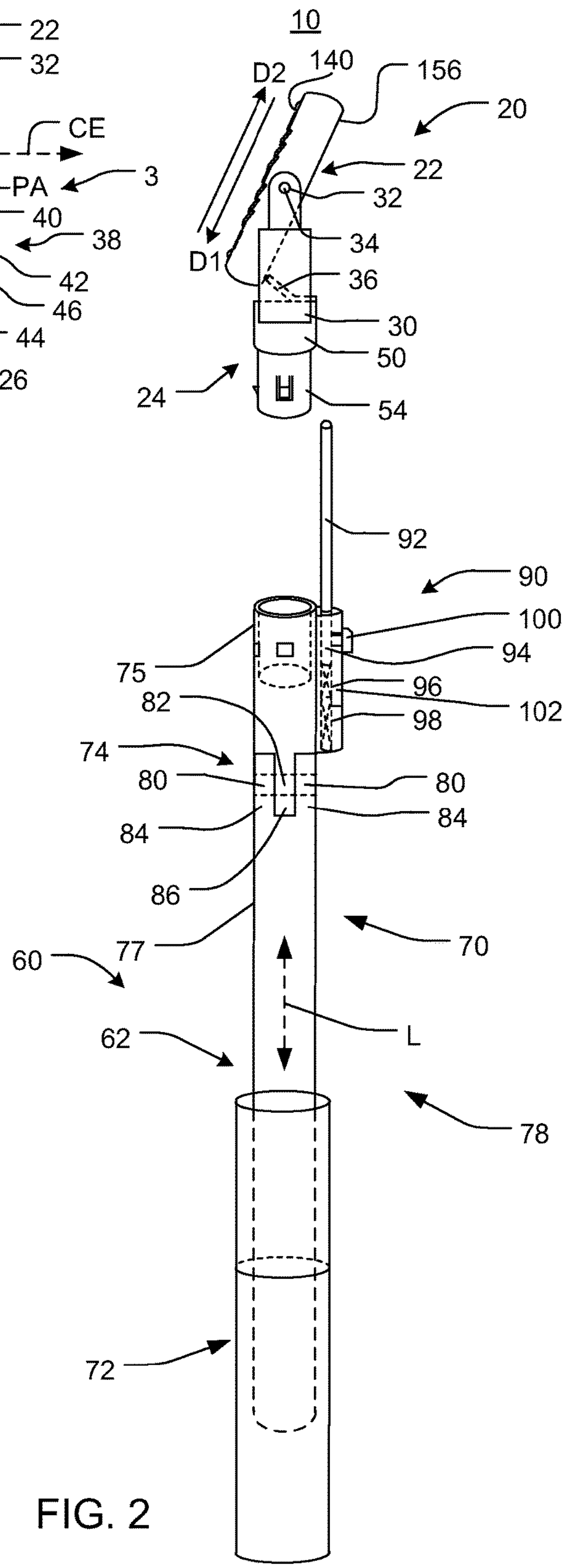
FIG. 2 shows a side view of the partially assembled shaving device of FIG. 1A.

For example, as shown by FIGS. 1A and 2, one embodiment of a connection element 52 of the blade cartridge support member 24 comprises a hollow (tubular) cylindrical shank 54 which is configured to fit within a cylindrical recess 66 of connection element 64 of handle 60. In order to provide a positive mechanical connection, cylindrical shank 54 includes a plurality of deformable (cantilevered and/or spring loaded) engagement tabs 56 which engage within engagement apertures 68. The deformable (cantilevered and/or spring loaded) engagement tabs 56 may, in one embodiment, be configured to be moved out of engagement with the engagement apertures 68 upon depressing of an actuation button 100 and/or by manually depressing each individual engagement tab with the user's hands/fingers.

Once the engagement tabs 56 are engaged within the engagement apertures 68, the head assembly 20 and handle 60 may be generally inhibited from separating from one another. Thereafter (e.g., after the useful life of the blade cartridge 22), the head assembly 20 and handle may be detached from one another by depressing the engagement tabs 56 inward (e.g., by depressing a button or the like disposed on the handle 60 and/or the disposable head assembly 20 and/or by manually depressing each engagement tab with the user's hands/fingers), and pulling the cylindrical shank 54 of the blade cartridge support member 24 out of the cylindrical recess 66 of the handle 60. The used head assembly 20/blade cartridge 22 may then be replaced with a fresh head assembly 20/blade cartridge 22. Thus, as may be understood the head assembly 20 is selectively detachably connectable to the handle 60 by the user.

Figure 5:
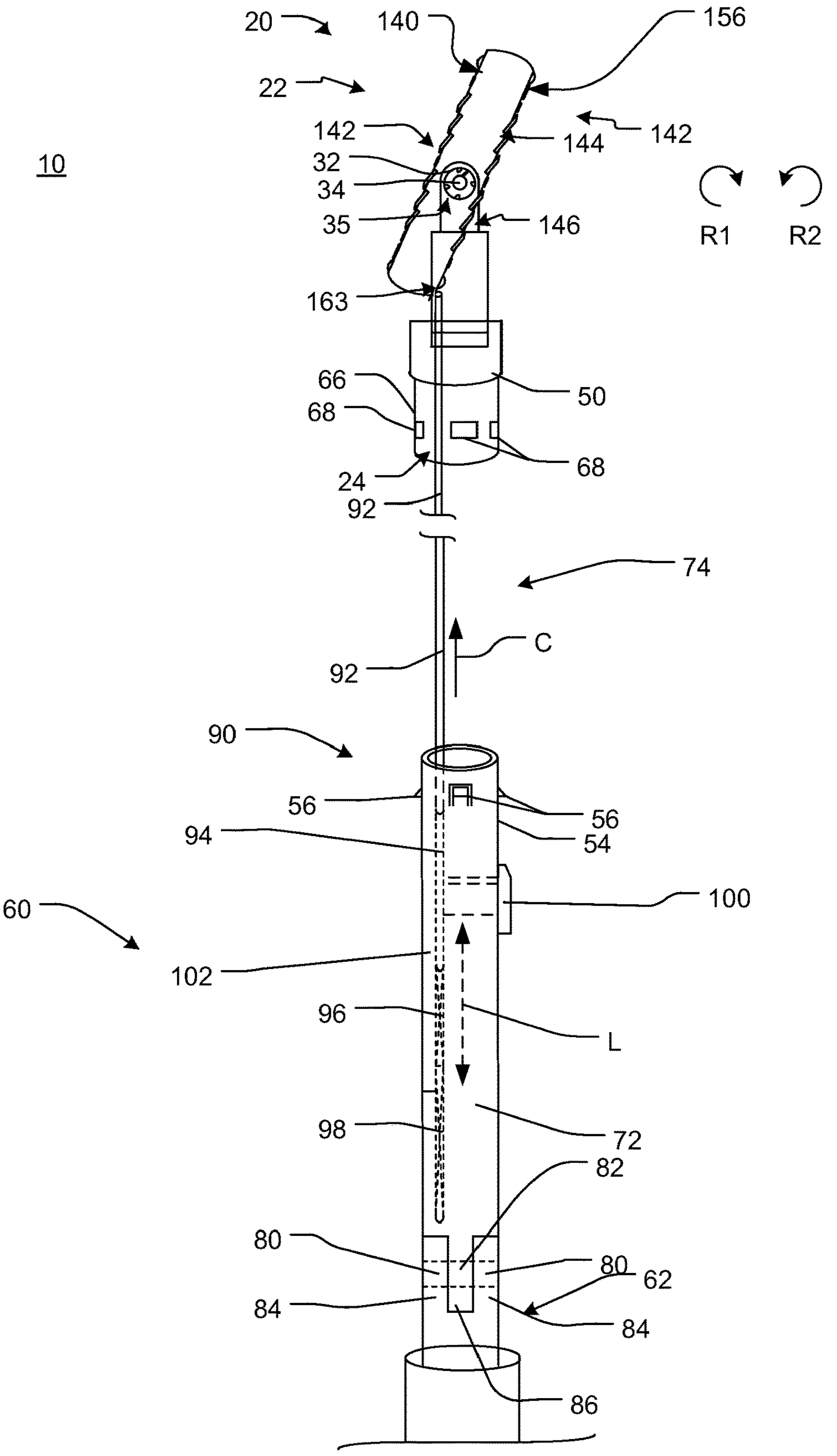
FIG. 5 shows another embodiment of the shaving device.

Although the shank 54 and recess 66 are shown as part of the blade cartridge support member 24 and the handle 60, respectively, it should be appreciated that the arrangement of the shank 54 and recess 66 may be switched (e.g., the shank 54 and recess 66 may be part of the handle 60 and the blade cartridge support member 24, respectively, see, for example, FIG. 5). Additionally, while the deformable (cantilevered and/or spring loaded) engagement tabs 56 and the engagement apertures 68 are shown as part of the shank 54 and recess 66, respectively, it should be appreciated that the arrangement of the deformable (cantilevered and/or spring loaded) engagement tabs 56 and the engagement apertures 68 may be switched (e.g., the deformable (cantilevered and/or spring loaded) engagement tabs 56 and the engagement apertures 68 may be part of the recess 66 and the shank 54, respectively). Again, it should be appreciated that the connection element 52 is not limited to arrangement illustrated and/or described herein unless specifically claimed as such, and that any connection element 52 that allows a user to selectively releasably couple the head assembly 20 to the handle 60 may be used.

The handle 60 (FIGS. 1A-1C) may optionally include one or more hinges 74 configured to allow the head assembly 20 to be selectively rotated relative to a portion of the handle 60 such that the orientation of the head assembly 20 (e.g., a longitudinal axis H of the head assembly 20) relative to the handle 60 (e.g., the longitudinal axis L of the handle 60) may be adjusted by the user. The hinge 74 may be positioned substantially anywhere along the length of the handle 60, but may be positioned proximate to a first (proximal) region of the handle 60 as generally illustrated.

Figure 1B:
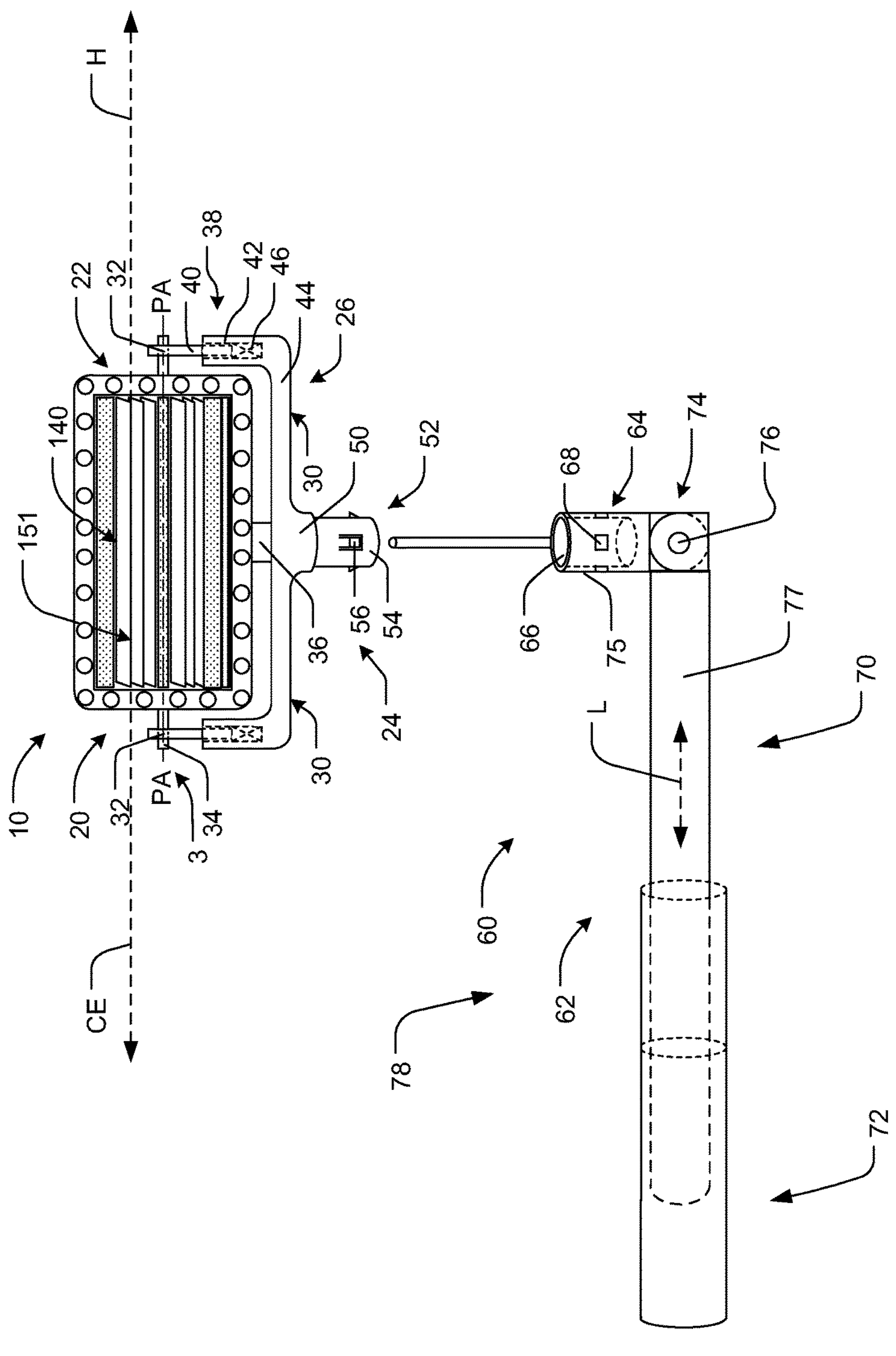
FIG. 1B shows a front view of a partially assembled shaving device of FIG. 1A with one embodiment of a hinge illustrating the head assembly generally parallel to the handle.
Figure 1C:
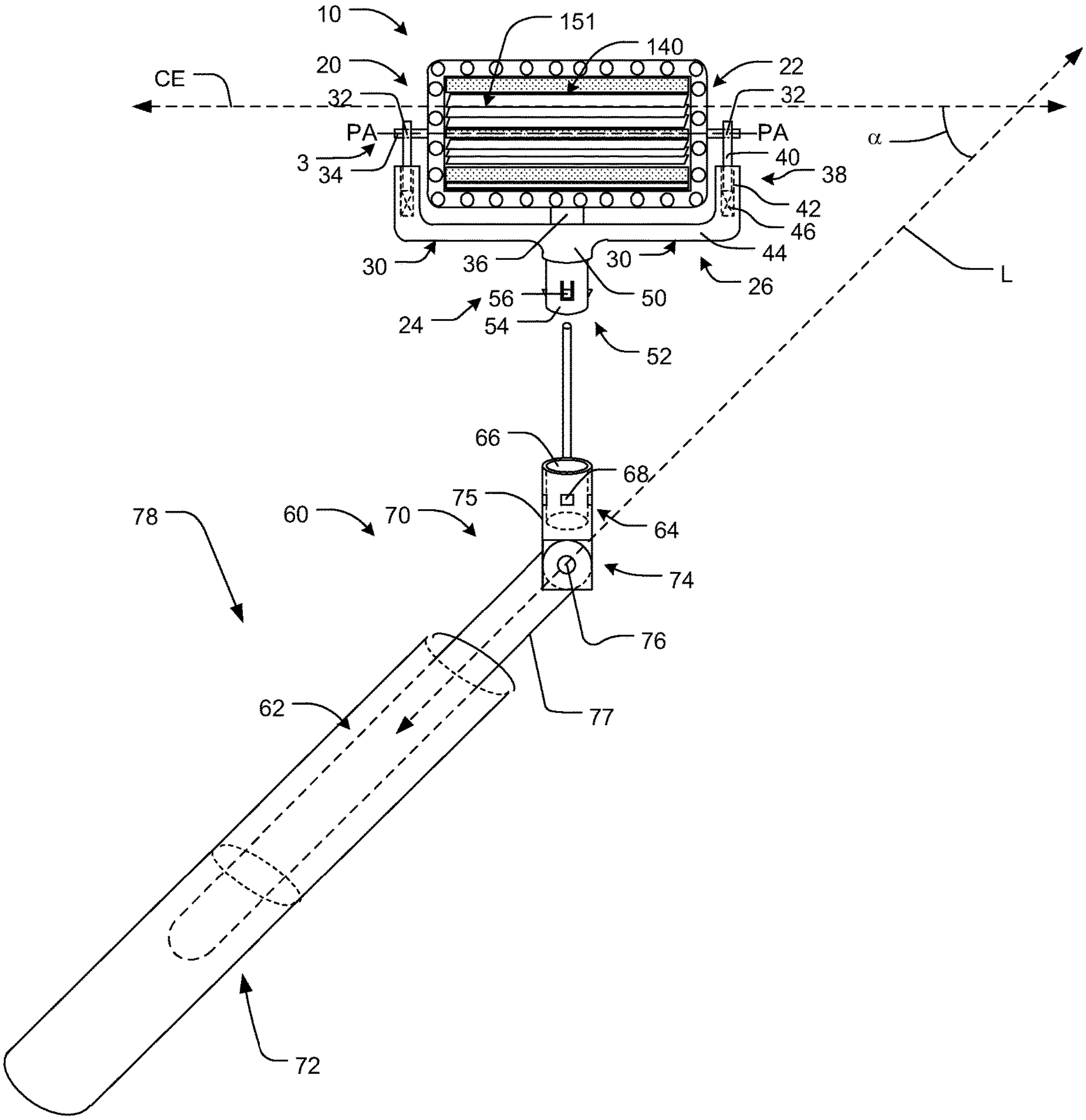
FIG. 1C shows a front view of a partially assembled shaving device of FIG. 1A with one embodiment of a hinge illustrating the head assembly at an angle $\alpha$ relative to the handle.

With reference to FIG. 1A, it may be appreciated that the cutting edge axis CE of the cutting edge 151 of one or more of the razor blades 142 of the head assembly 20 is aligned generally perpendicular (e.g., generally transverse/90 degrees) relative to the longitudinal axis L of the handle 60. As described herein (e.g., as generally illustrated in FIGS. 1B and 1C), the hinge 74 may be configured to allow the user to selectively rotate the head assembly 20 about a pivot point of the handle 60 such that the cutting edge axis CE of the cutting edge 151 of one or more of the razor blades 142 of the head assembly 20 is aligned at an angle $\alpha$ (see, for example, FIG. 1C) other than transverse/perpendicular/90 degrees relative to the longitudinal axis L of the handle 60. For example, FIG. 1B generally illustrates the cutting edge axis CE of the cutting edge 151 of one or more of the razor blades 142 of the head assembly 20 being generally parallel to the longitudinal axis L of the handle 60 while FIG. 1C generally illustrates the cutting edge axis CE of the cutting edge 151 of one or more of the razor blades 142 of the head assembly 20 at an angle $\alpha$ less than 90 degrees, for example, between 0 and less than 90 degrees, relative to the longitudinal axis L of the handle 60.

One embodiment of a hinge 74 consistent with the present disclosure is generally illustrated in FIGS. 1A and 2. The hinge 74 may include a hinge pin 76 that extends through receptacles 80, 82 of overlapping joint portions 84, 86 (see FIG. 2) of a first (proximal) shaft portion 75 and a second (distal) shaft portion 77 of the handle 60. In addition to enabling the first (proximal) elongated shaft section 75 and the second elongated (distal) shaft section 77 to rotate relative to one another, hinge pin 76 may also inhibit the first (proximal) shaft portion 75 and the second (distal) shaft portion 77 from separating relative to one another. The hinge 74 may optionally include a locking mechanism (e.g., but not limited to, a locking pawl, ratchet mechanism, or the like) configured to allow the user to generally lock or fix the relative position of the head assembly 20 relative to the handle 60.

It should be appreciated that the hinge 74 may also be configured to allow the user to selectively rotate the head assembly 20 about a pivot point of the handle 60 such that the cutting edge axis CE of the cutting edge 151 of one or more of the razor blades 142 of the head assembly 20 remains substantially transverse/perpendicular/90 degrees relative to the longitudinal axis L of the handle 60. For example, the arrangement of the hinge pin 76 and receptacles 80, 82 may be rotated approximately 90 degrees about the longitudinal axis L of the handle 60 from the arrangement illustrated in FIGS. 1A-1C.

The handle 60 may also optionally include an elongated shaft 62. The elongated shaft 62 optionally includes a telescoping handle extension 78 including a first and a least a second shaft section 70, 72 configured to telescopically slide relative to one another such that the overall length of the handle 60 may be adjusted by the user. It should be understood that one or more of the shaft sections 70, 72 may also optionally include one or more hinges 74 as described herein. It should also be understood that in other embodiments of shaving device 10, the elongated shaft 62 may be formed of a single section and not include the hinge 74, and the telescoping handle extension 78 may be eliminated.

Figure 3:
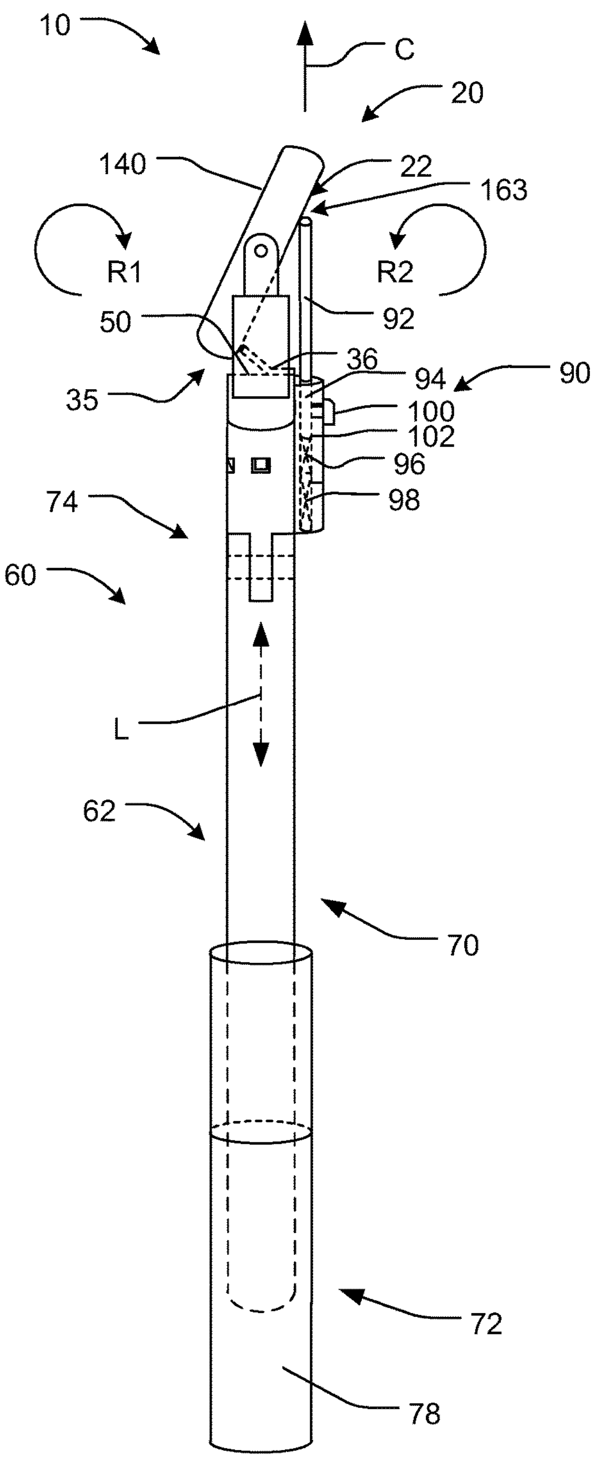
FIG. 3 shows a side view of the shaving device of FIG. 1A as fully assembled with a pivot biasing mechanism extended.
Figure 4:
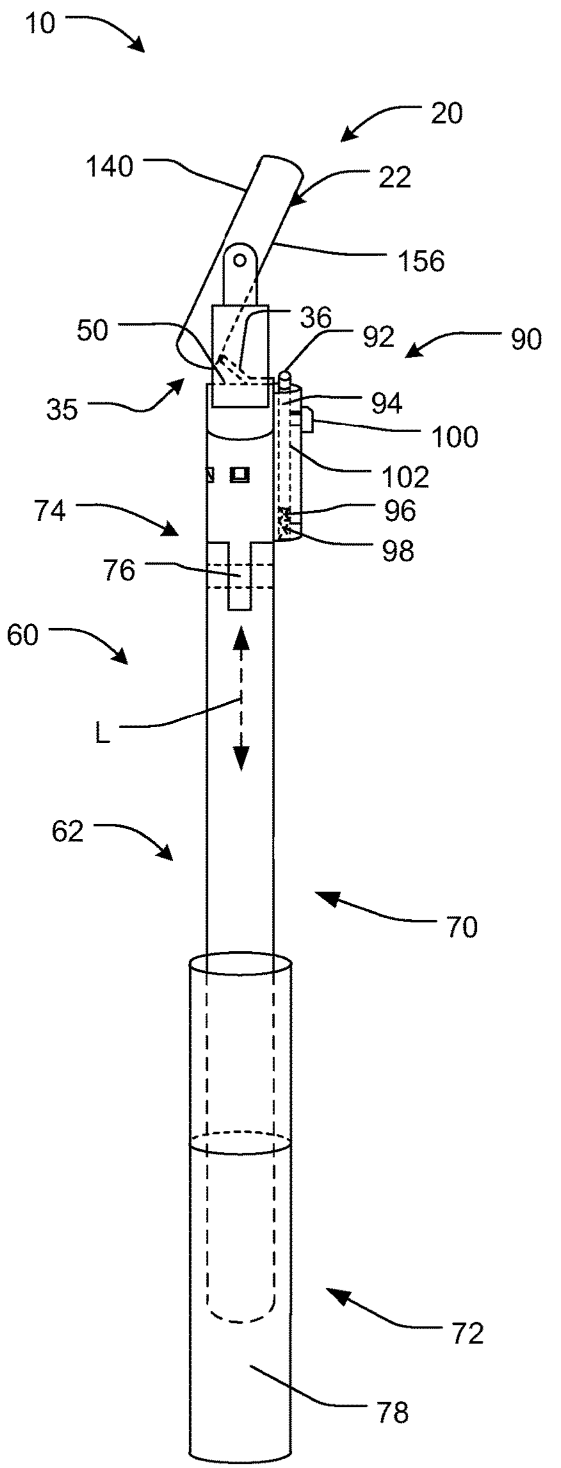
FIG. 4 shows a side view of the shaving device of FIG. 1A as fully assembled with a pivot biasing mechanism retracted.
Figure 6A:
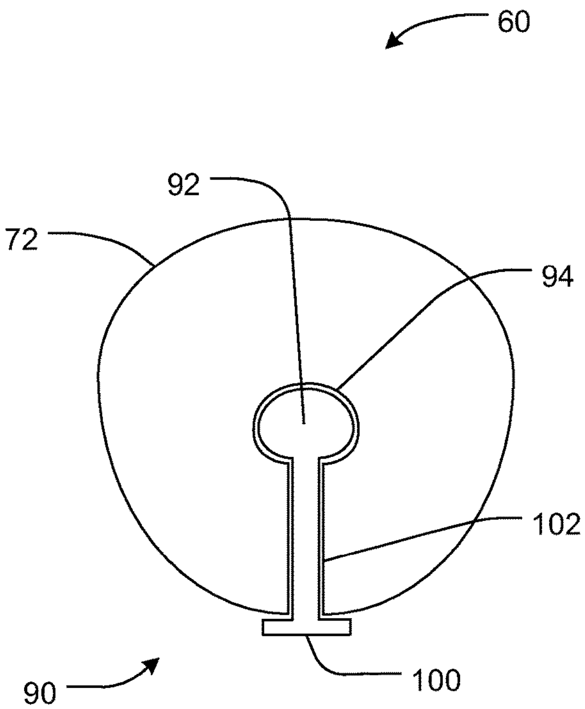
FIG. 6A shows a cross-sectional view taken through the handle of the shaving device of FIG. 6B taken along lines 6-6.
Figure 6B:
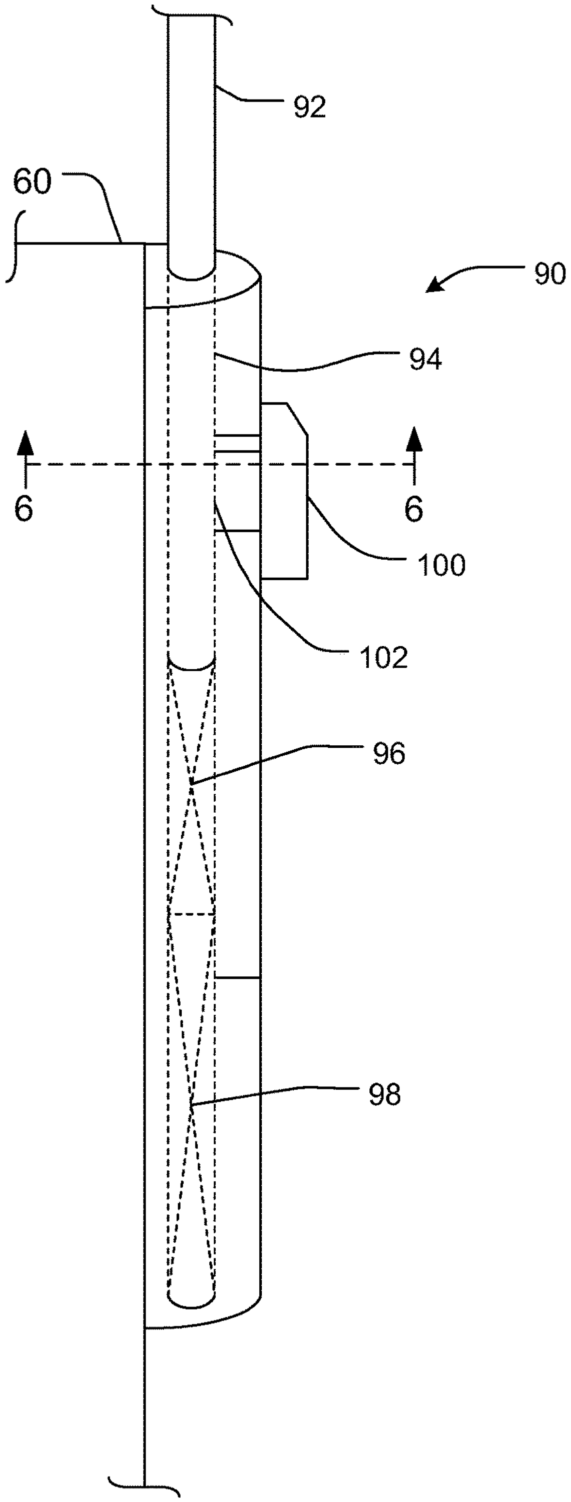
FIG. 6B shows a close-up of one embodiment of a blade cartridge pivot biasing mechanism.

With reference to FIGS. 3-5, the shaving device 10 (e.g., the handle 60) may optionally include one or more blade cartridge pivot biasing mechanisms 90 to control the rotation of the blade cartridge 22 about a pivot axis PA in a direction relative to blade cartridge support member 24. Pivot biasing mechanism 90 may include one or more elongated cylindrical rods 92 which slide within cylindrical recess 94 of handle 60. The elongated cylindrical rod 92 may be biased generally in the direction of arrow C (i.e., generally towards the blade cartridge 22 as generally illustrated in FIGS. 3 and 5). For example, the handle 60 may include a cylindrical recess 94 (best seen in FIGS. 6A and 6B) having one or more biasing devices (e.g., springs or the like) configured to urge the elongated cylindrical rod 92 generally in the direction of arrow C. In one embodiment, a first biasing device 96 (e.g., a coil spring or the like) may be disposed within the cylindrical recess 94 beneath cylindrical rod 92, and optionally a second biasing device 98 (e.g., a coil spring or the like) may also be disposed within the cylindrical recess 94 beneath the first biasing device 96. The second biasing device 98 may have a greater spring (force) constant than the first biasing device 96.

As may be appreciated, the blade cartridge 22 may pivot about pivot axis PA in rotation direction R1 and R2 during use of shaving device 10 as the blade cartridge 22 follows the contour of the skin surface being shaved. During such time, the distal end (e.g., spherical distal end) of cylindrical rod 92 makes contact with a rear side 156 of the blade cartridge 22 (i.e., the surface of the blade cartridge 22 generally opposite of the surface being used to during shaving) to urge the blade cartridge 22 to pivot about the pivot axis PA. As explained herein, the blade cartridge 22 may optionally include razor blades 142 on both the front side 140 and rear side 156. In such a case, the distal end of rod 92 may be configured to contact the blade cartridge 22 in an area 163 other than where the razor blades 142 are located.

According to one embodiment (FIGS. 3 and 4), the rod 92 may contact the blade cartridge 22 at a location above the pivot axis PA, and the pivot biasing mechanism 90 may urge the blade cartridge 22 in the opposite direction (e.g., in the direction R2). Alternatively, the rod 92 may contact the blade cartridge 22 at a location below the pivot axis PA as generally illustrated in FIG. 5, and the pivot biasing mechanism 90 may urge the blade cartridge 22 in the direction R1. As such, depending on where the biasing rod 92 contacts the blade cartridge (i.e., above the pivot axis PA in FIGS. 3-4 or below the pivot axis PA in FIG. 5), the pivot biasing mechanism 90 may urge the blade cartridge 22 generally in direction R2 (in FIGS. 3-4) or direction R1 (in FIG. 5) and may generally inhibit rotation of the blade cartridge 22 in the opposite direction of (e.g., R1 in FIG. 3-4 or R2 in FIG. 5) beyond a certain/predetermined point (degree of rotation) once the spring(s) 96, 98 bottom out.

Additionally, as explained in greater detail herein, in at least one embodiment, blade cartridge 22 may be configured to rotate approximately 180 degrees or more about the pivot axis PA such that the user can select either the front or rear surfaces 140, 156 of the blade cartridge 22. For example, the blade cartridge 22 may include shaving (razor) blades on both the front side 140 and rear side 156 thereof (see, for example, FIG. 5 or 8). Alternatively (or in addition), the blade cartridge 22 may include shaving (razor) blades on the front side 140 and a mirror on the rear side 156.

According to one embodiment, the pivot biasing mechanism 90 may optionally include an actuation button 100. The actuation button 100 may be coupled to the rod 92 and may be configured to retract the rod 92 generally in the direction opposite to arrow C (see, for example, FIGS. 3 and 5) and out of the path of the blade cartridge as the blade cartridge 22 is rotated approximately 180 degrees (or more) about the pivot axis PA as generally illustrated in FIG. 4. For example, the actuation button 100 may travel in a guide track 102 (FIGS. 6A and 6B) provided by an elongated slot formed in the handle 60. The user may urge the actuation button 100 in the direction generally opposite of arrow C to retract rod 92 with sufficient force to compress the biasing device(s) 96, 98, thereby allowing the cylindrical rod 92 to retract far enough (e.g., generally in the direction opposite of arrow C and generally away from the blade cartridge 22) such that blade cartridge 22 may be rotated approximately 180 degrees (or more) about the pivot axis PA, for example, in the direction generally opposite the biasing direction of the rod 92 (e.g., direction R1 in FIGS. 3-4 and direction R2 in FIG. 5) without contacting rod 92. It should be appreciated that while the pivot biasing mechanism 90 is illustrated on the exterior of the handle 60 in FIGS. 6A and 6B, portions of the pivot biasing mechanism 90 may be located within an interior region of the handle 60 as generally illustrated herein.

According to another embodiment, the disposable head assembly 20 may optionally include one or more blade cartridge rotation limiters 35 configured to generally limit the range of rotation of the blade cartridge 22 relative to the handle 60 and/or blade cartridge support member 24 while using either the front or rear side 140, 156. The blade cartridge rotation limiters 35 may be configured to generally inhibit the blade cartridge 22 from pivoting about pivot axis PA beyond a certain/predetermined point (degree of rotation) in rotation direction R2 (in FIGS. 3-4) or rotation direction R1 (in FIG. 5). As such, the blade cartridge rotation limiter 35 may be configured to generally prevent rotation beyond a predetermined point.

With reference to FIG. 3, one embodiment of a blade cartridge rotation limiter 35 consistent with the present disclosure is generally illustrated. The blade cartridge rotation limiter 35 may include a resilient, deformable stop member or pawl 36 configured to contact against an opposite side of the blade cartridge 22 being used. For example, the deformable pawl 36 may contact an edge region of the blade cartridge 22 at a location below the pivot axis PA once the blade cartridge 22 pivots about pivot axis PA in rotation direction R2 beyond a certain/predetermined point (degree of rotation). While the deformable pawl 36 is illustrated extending outwardly from the support hub 50 and contacting a portion of the blade cartridge 22, it should be appreciated that this arrangement may be reverse. For example, the deformable pawl 36 may also be configured to extend outwardly from the blade cartridge 22 to contact a portion of the support hub 50.

In order to rotate the blade cartridge 22 approximately 180 degrees or more about the pivot axis PA, the pin 92 may be retracted as generally illustrated in FIG. 4 and the blade cartridge 22 may be rotated in the direction R1. As the blade cartridge 22 is rotated in direction R1, the blade cartridge 22 will contact the pawl 36. The pawl 36 (which may be formed of a polymer composition, such as an elastomer, or sheet metal) will deform downward (e.g., generally towards the hub 50 and/or support arms 30 of support frame 26) to allow the blade cartridge 22 to continue to rotate in direction R1. Once the blade cartridge 22 is past the pawl/resilient deformable stop member 36, the stop member 36 will return to its initial position, and inhibit the blade cartridge 22 from rotating backwards in rotation direction R2. This resilient deformable stop member 36 permits the blade cartridge 22 to be rotated in one direction, but inhibits the blade cartridge 22 from rotating in the opposite direction. Again (as noted above), while the pawl 36 is illustrated as extending from the support frame 26, the pawl 36 may extend from the blade cartridge 22 and may similarly resiliently deform as the blade cartridge 22 is rotated about the pivot axis PA.

With reference again to FIGS. 5 and 7, another embodiment of a blade cartridge rotation limiter 35 consistent with the present disclosure is generally illustrated. The blade cartridge rotation limiter 35 may include a resilient, deformable stop member or pawl 36 configured to contact against one or more of a plurality of teeth 37. In the embodiment illustrated in FIGS. 5 and 7, the pawl 36 extends generally radially outwardly from the pivot pin 34 and the teeth 37 extending generally radially inward from the pivot receptacles 32; however, it should be appreciated that the arrangement of the pawl 36 and the teeth 37 may be switched and that the pawl 36 may extend generally radially inwardly from the pivot receptacles 32 and the teeth 37 extend generally radially outwardly from the pivot pin 34.

Figure 7:
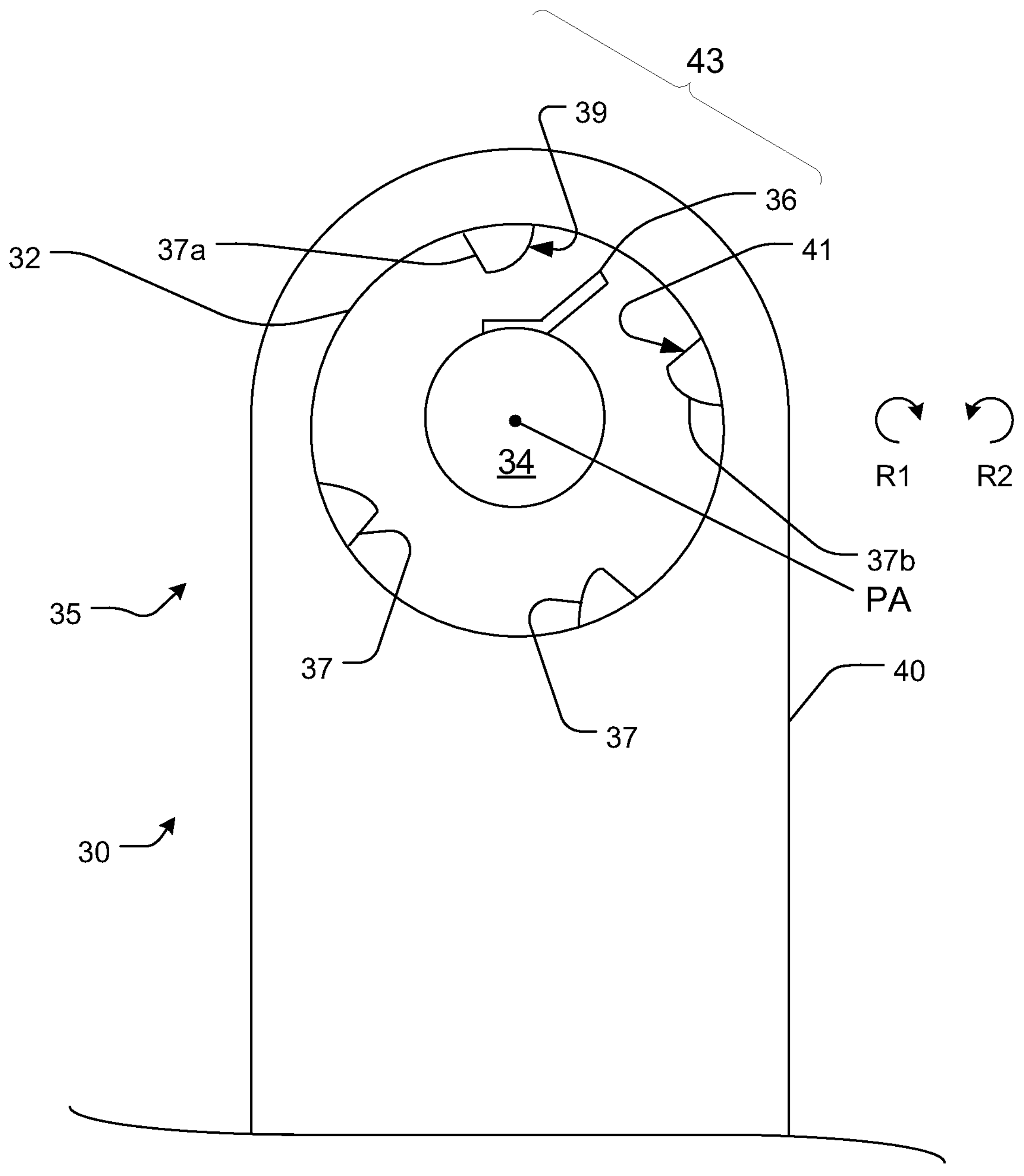
FIG. 7 shows one embodiment of a resistive pivot mechanism consistent with FIG. 5.

As best illustrated in FIG. 7, rotation of the pivot pin 34 in a first direction about the pivot axis PA (e.g., in direction R2 in the illustrated embodiment) may cause the pawl 36 to contact against a moderately sloped, tapered, curved, convex, concaved, and/or arcuate portion (e.g., first portion) 39 of a first tooth 37*a*, thereby causing the pawl 36 to resiliently deform out of the way of the first tooth 37*a* (e.g., deform generally radially inwardly in the illustrated embodiment) and allowing the pivot pin 34 to continue to rotate about the pivot axis PA in the first direction. Conversely, rotation of the pivot pin 34 in a second direction about the pivot axis PA (e.g., in direction R1 in the illustrated embodiment) may cause the pawl 36 to contact against a steeply sloped, upright, and/or generally vertical portion (e.g., second portion) 41 of a second tooth 37*b* (e.g., an adjacent tooth), thereby causing the pawl 36 to engage second portion 41 of the tooth 37*b* and generally preventing the pivot pin 34 from rotating about the pivot axis PA any further in the second direction beyond a predetermined point defined by the second tooth 37*b*. According to one embodiment, the pivot pin 34 may rotate about the pivot axis PA generally freely within a region 43 defined by two adjacent teeth (e.g., teeth 37*a*, 37*b*). The region 43 may also be considered to be a recess.

It should be appreciated that in any embodiment described herein, the spacing between the teeth may be larger and/or smaller than shown in the illustrations, which will permit a greater degree and/or smaller degree of rotation for the cartridge head.

The shaving razor 10 may optionally include a resistive pivot mechanism. The resistive pivot mechanism may be configured to allow the user to rotate the blade cartridge 22 about the pivot axis PA to select one of a plurality of sides/faces, and to allow the blade cartridge 22 to rotate within a predefined rotation range while at the selected blade/face position during normal use of the razor to conform to the user's skin contours. According to one embodiment, the resistive pivot mechanism may include a blade cartridge pivot biasing mechanism 90 (e.g., but not limited to, biasing pin 92) and/or a blade cartridge rotation limiter 35 (e.g., but not limited to, a pawl 36 and a plurality of teeth 37)). The biasing pin 92 may be configured to urge the blade cartridge 22 in the second direction (e.g., in the direction R1 in the illustrated embodiment) such that the pawl 36 contacts against the generally vertical portion 41 of the tooth 37*b*, thereby limiting the rotation of the blade cartridge 22 in the second direction (e.g., R1). The bias pin 92 may also generally prevent the blade cartridge 22 from rotating about the pivot axis PA beyond a predetermined point in the first direction (e.g., direction R2) unless the bias pin 92 is moved out of the way of the blade cartridge 22 as described herein.

With reference to FIGS. 5 and 7, a shaving force Fsu may be applied in the first direction (e.g., R2) by the user, which causes the blade cartridge 22 (and therefore the pivot pin/cylinder 34) to rotate in the first direction (e.g., R2) against the spring force of the biasing pin 92, and causing the pawl 36 to move away from the generally vertical portion 41 of the tooth 37*b*. Once force Fsu is reduced/removed, the force of the biasing pin 92 (e.g., resistive force Fres) causes the pivot pin/cylinder 34 to move back towards the initial starting position (e.g., wherein the pawl 36 is abutting against/contacting the generally vertical portion 41 of the tooth 37*b*).

To rotate the blade cartridge 22 to select a different face (e.g., either face 140 or face 156), the user may retract the bias pin 92 out of the path of the blade cartridge 22 as described herein, and may then rotate the blade cartridge 22 in the first direction (e.g., direction R2), thereby causing the pawl 36 to resiliently deform out of the way of the tooth 37*a* and allowing the pivot pin 34 to continue to rotate about the pivot axis PA in the first direction (e.g., R2). Once the user releases the biasing pin 92, the biasing pin 92 urges the blade cartridge 22 in the second direction (e.g., R1) until the pawl 36 contacts the generally vertical portion 41 of a tooth 37. As such, the rotation of the blade cartridge 22 about the pivot axis PA is generally limited to the region between the two teeth 37 adjacent to the pawl 36.

Again, it should be appreciated that the arrangement of the pawl 36 and teeth 37 with respect to the pivot pin 34 and the receptacle 32 may be switched, and as a result, the arrangement of the teeth 37 (i.e., the orientation of the first and second portions 39, 41) as well as the slope of the pawl 36 may be switched. Additionally, the arrangement of the teeth 37 (i.e., the orientation of the first and second portions 39, 41) as well as the slope of the pawl 36 may be switched depending on which direction (e.g., R1 or R2) the bias pin 92 is configured to urge the blade cartridge 22. For example, in the embodiment illustrated in FIGS. 5 and 7, the bias pin 92 is configured to urge the blade cartridge 22 in the second direction (e.g., direction R1). However, in other embodiments described herein (see, for example, FIGS. 3 and 8), the bias pin 92 is configured to urge the blade cartridge 22 in first direction (e.g., direction R2) and the orientation of the first and second portions 39, 41 of the teeth 37 as well as the slope of the pawl 36 may be switched from that shown in FIGS. 5 and 7.

Figure 8:
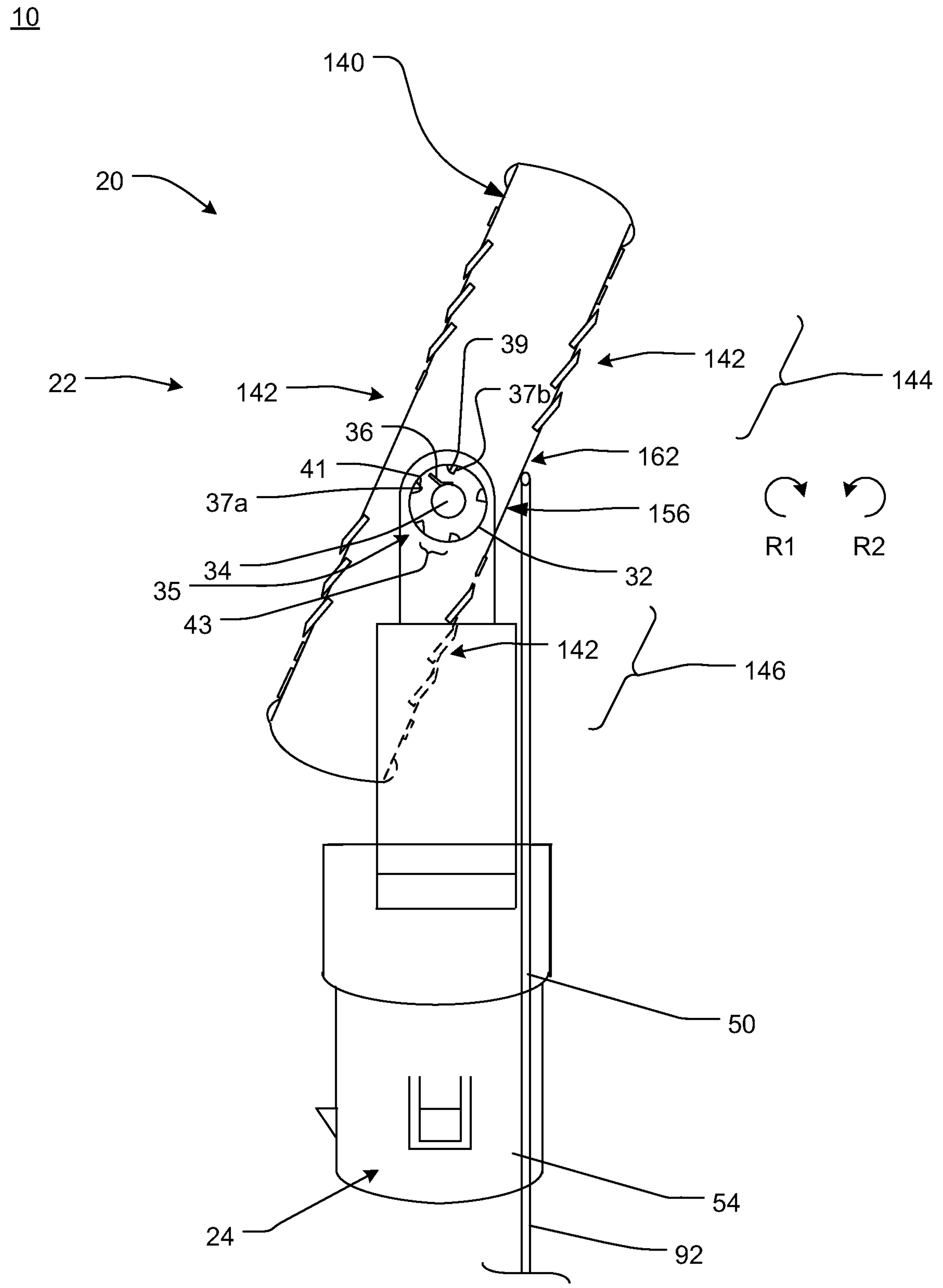
FIG. 8 shows another embodiment of a resistive pivot mechanism.

For example, with reference to FIG. 8, rotation of the pivot pin 34 in a first direction about the pivot axis PA (e.g., in direction R2 in the illustrated embodiment) may cause the pawl 36 to contact against a steeply sloped, upright, and/or generally vertical portion (e.g., second portion) 41 of a first tooth 37*a*, thereby causing the pawl 36 to engage second portion 41 of the first tooth 37*a* and generally preventing the pivot pin 34 from rotating about the pivot axis PA any further in the first direction (e.g., R2) beyond a predetermined point defined by the first tooth 37*a*. Conversely, rotation of the pivot pin 34 in a second direction about the pivot axis PA (e.g., in direction R1 in the illustrated embodiment) may cause the pawl 36 to contact against a moderately sloped, tapered, curved, convex, concaved, and/or arcuate portion (e.g., first portion) 39 of a second tooth 37*b* (e.g., an adjacent tooth), thereby causing the pawl 36 to resiliently deform out of the way of the second tooth 37*b* (e.g., deform generally radially inwardly in the illustrated embodiment) and allowing the pivot pin 34 to continue to rotate about the pivot axis PA in the second direction. According to one embodiment, the pivot pin 34 may rotate about the pivot axis PA generally freely within a region 43 defined by two adjacent teeth (e.g., teeth 37*a*, 37*b*).

The bias pin 92 may be configured to urge the blade cartridge 22 in the first direction (e.g., in the direction R2 in the illustrated embodiment) such that the pawl 36 contacts against the generally vertical portion 41 of the tooth 37*a*, thereby limiting the rotation of the blade cartridge 22 in the first direction (e.g., R2). The bias pin 92 may also generally prevent the blade cartridge 22 from rotating about the pivot axis PA beyond a predetermined point in the second direction (e.g., direction R1) unless the bias pin 92 is moved out of the way of the blade cartridge 22 as described herein.

During use of the razor 10, a shaving force Fsu may be applied in the second direction (e.g., R1) by the user, which causes the blade cartridge 22 (and therefore the pivot pin/cylinder 34) to rotate in the second direction (e.g., R1) against the spring force of the biasing pin 92, and causing the pawl 36 to move away from the generally vertical portion 41 of the tooth 37*a*. Once force Fsu is reduced/removed, the force of the biasing pin 92 (e.g., resistive force Fres of the biasing pin 92) causes the pivot pin/cylinder 34 to move back towards the initial starting position (e.g., wherein the pawl 36 is abutting against/contacting the generally vertical portion 41 of the tooth 37*a*).

To rotate the blade cartridge 22 to select a different face (e.g., either face 140 or face 156), the user may retract the bias pin 92 out of the path of the blade cartridge 22 as described herein (see, for example, FIG. 4), and may then rotate the blade cartridge 22 (FIG. 8) in the second direction (e.g., direction R1), thereby causing the pawl 36 to resiliently deform out of the way of the tooth 37*b* and allowing the pivot pin 34 to continue to rotate about the pivot axis PA in the second direction (e.g., R1). Once the user releases the biasing pin 92, the biasing pin 92 urges the blade cartridge 22 in the first direction (e.g., R2) until the pawl 36 contacts the generally vertical portion 41 of a tooth 37. As such, the rotation of the blade cartridge 22 about the pivot axis PA is generally limited to the region between the two teeth 37 adjacent to the pawl 36.

Figure 9:
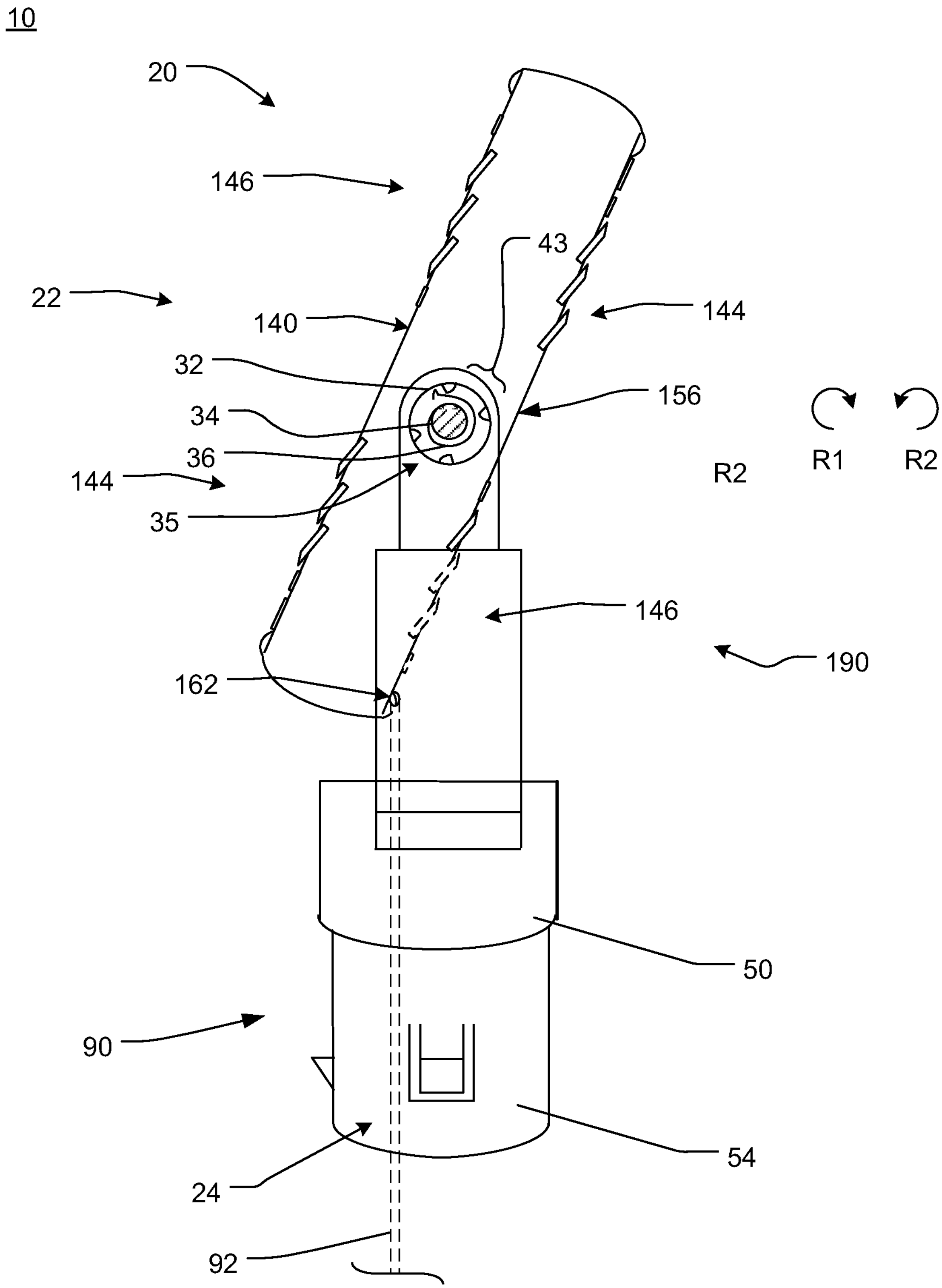
FIG. 9 shows yet another embodiment of a resistive pivot mechanism.
Figure 10:
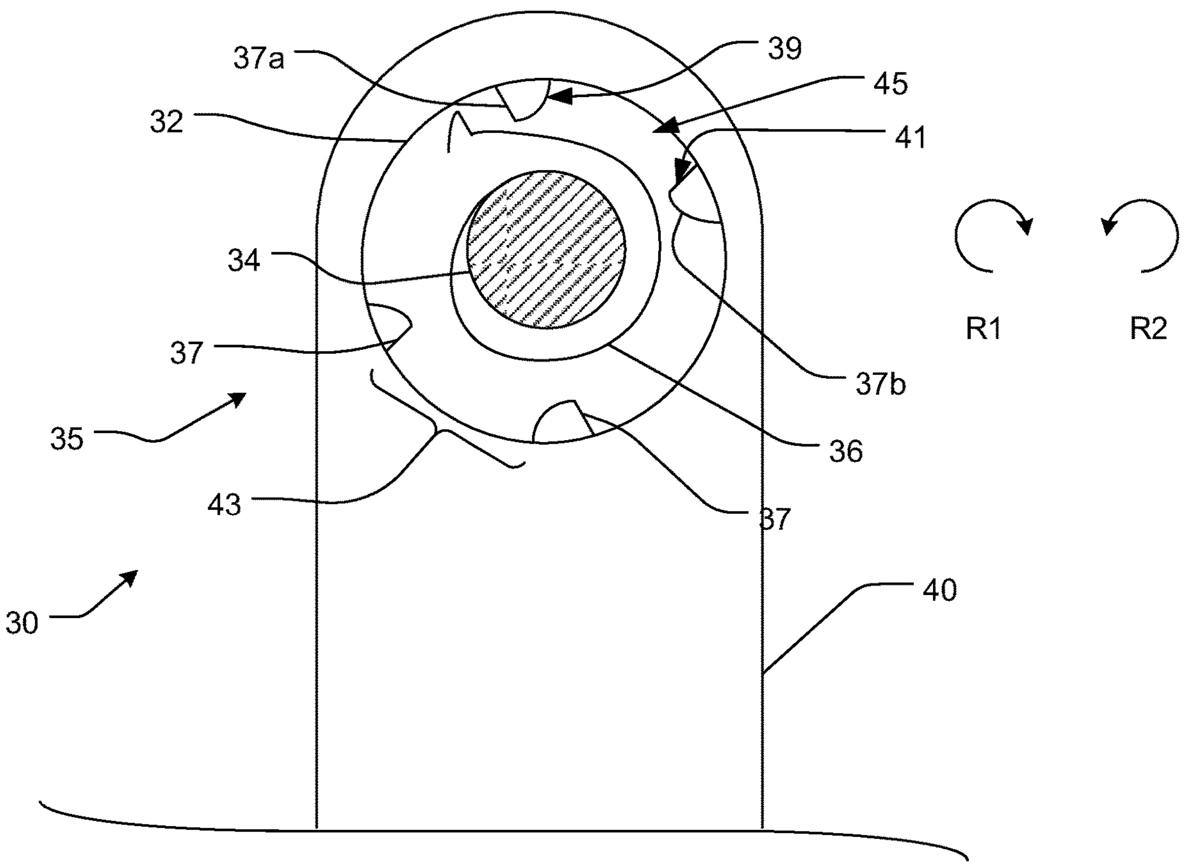
FIG. 10 shows another view of the resistive pivot mechanism consistent with FIG. 9.

Turning now to FIGS. 9 and 10, another embodiment of a resistive pivot mechanism is generally illustrated. The resistive pivot mechanism may include a blade cartridge pivot biasing mechanism 90 (e.g., but not limited to, biasing pin 92) and/or a blade cartridge rotation limiter 35 (e.g., but not limited to, a pawl/coiled pawl 36 and a plurality of teeth 37). In the illustrated embodiment, the resiliently deformable, coiled pawl 36 extends generally radially outward from the pivot pin 34 and the receptacle 32 includes a plurality of teeth 37 extending generally radially inward towards the pivot pin 34. It should be appreciated, however, that the arrangement of the coiled pawl 36 and the teeth 37 vis-à-vis the pivot pin 34 and the receptacle 32 may be switched, and that the coiled pawl 36 may extend generally radially inward from the receptacle 32 and the teeth 37 may extend generally radially outward from the pivot pin 34.

The biasing pin 92 may be configured to urge the blade cartridge 22 in the second direction (e.g., in the direction R1 in the illustrated embodiment) such that the distal end of the pawl 36 contacts against the generally vertical portion 41 of the tooth 37*a* (FIG. 10), thereby limiting the rotation of the blade cartridge 22 in the second direction (e.g., R1). The bias pin 92 may also generally prevent the blade cartridge 22 from rotating about the pivot axis PA beyond a predetermined point in the first direction (e.g., direction R2) unless the bias pin 92 is moved out of the way of the blade cartridge 22 as described herein.

During use of the razor 10, a shaving force Fsu may be applied in the second direction (e.g., R1) by the user, which causes the blade cartridge 22 (and therefore the pivot pin/cylinder 34) to rotate in the second direction (e.g., R1) against the spring force of the coiled pawl 36. Once force Fsu is reduced/removed, the force of the coiled pawl 36 (e.g., resistive coil force Fres) causes the pivot pin/cylinder 34 to move back towards the initial starting position (e.g., wherein the force of the biasing pin 92 and the coil pawl 36 are substantially equal).

The user may also apply a shaving force Fsu in the first direction (e.g., R2) causing the blade cartridge 22 (and therefore the pivot pin/cylinder 34) to rotate in the first direction (e.g., R2) against the spring force of the biasing pin 92, and optionally causing the pawl 36 to move away from the generally vertical portion 41 of the tooth 37*a*. Once force Fsu is reduced/removed, the force of the biasing pin 92 (e.g., resistive force Fres) causes the pivot pin/cylinder 34 to move back towards the initial starting position (e.g., wherein the force of the biasing pin 92 and the coil pawl 36 are substantially equal).

To rotate the blade cartridge 22 to select a different face (e.g., either face 140 or face 156), the user may retract the bias pin 92 out of the path of the blade cartridge 22 as described herein (see, for example, FIG. 4), and may then rotate the blade cartridge 22 in the second direction (e.g., direction R1), thereby causing the coiled pawl 36 to resiliently deform out of the way of the tooth 37*a* and allowing the pivot pin 34 to continue to rotate about the pivot axis PA in the second direction (e.g., R1). Once the user releases the biasing pin 92, the biasing pin 92 urges the blade cartridge 22 in the second direction (e.g., R1) until the distal end of the coiled pawl 36 contacts the generally vertical portion 41 of a tooth 37. As such, the rotation of the blade cartridge 22 about the pivot axis PA is generally limited to the region (i.e., controlled by the position) between the two teeth 37 adjacent to the pawl 36.

While the biasing pin 92 and the coil pawl 36 are illustrated in FIGS. 9 and 10 as urging the blade cartridge 22 in directions R1 and R2, respectively, it should be appreciated that the biasing pin may be configured to urge the blade cartridge 22 in direction R2 and the coil pawl 36 may be configured to urge the blade cartridge 22 in direction R1), and the orientation of the teeth 37 may also be switched. One of ordinary skill in the art would understand such modification in view of the present disclosure.

Figure 11:
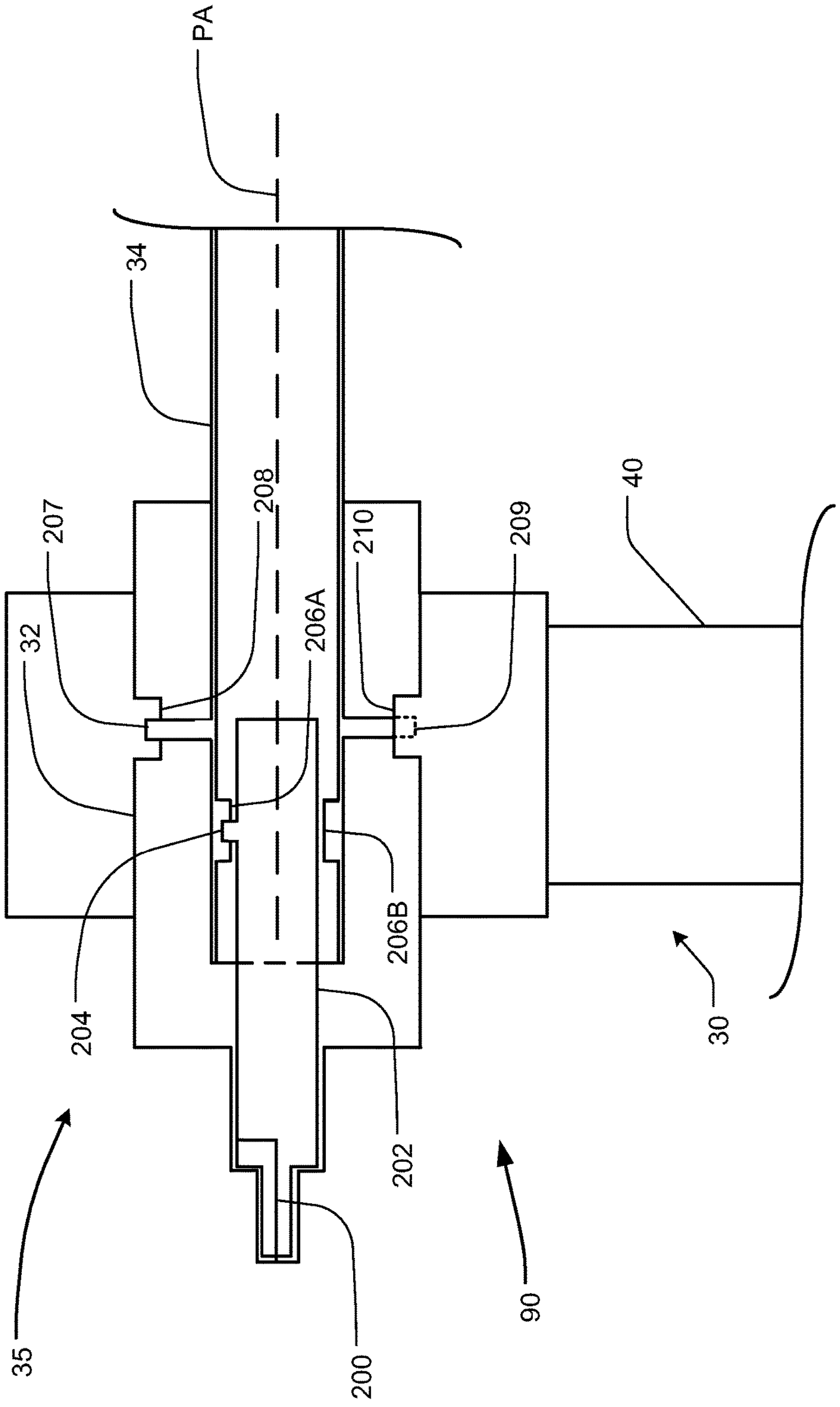
FIG. 11 shows another embodiment of a resistive pivot mechanism consistent with the present disclosure.
Figure 12:
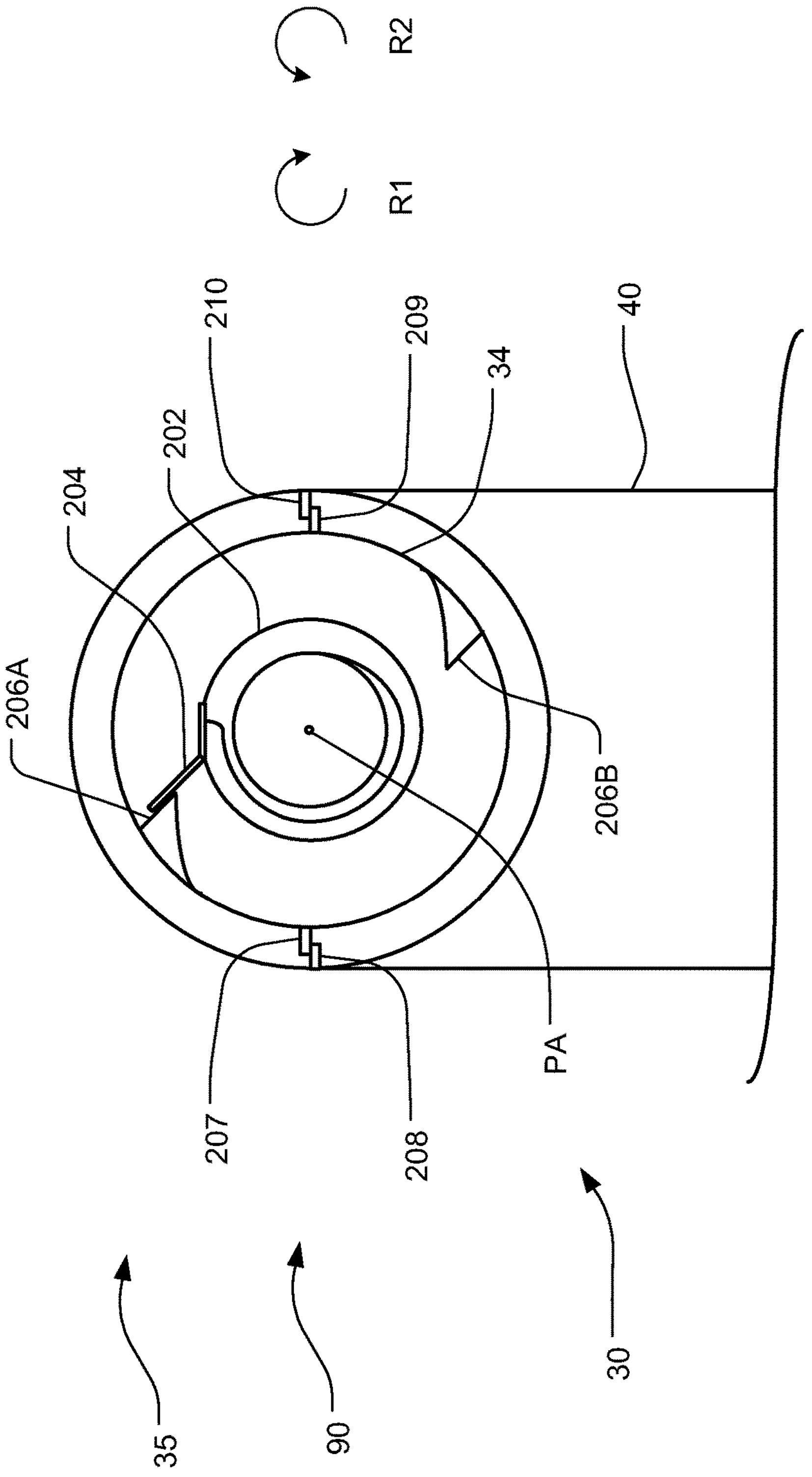
FIG. 12 shows another view of the resistive pivot mechanism consistent with FIG. 11.

Turning now to FIGS. 11 and 12, yet another embodiment of a resistive pivot mechanism is generally illustrated. The resistive pivot mechanism may include a blade cartridge pivot biasing mechanism 90 and a blade cartridge rotation limiter 35. As noted herein, the resistive pivot mechanism is configured to allow the user to rotate the blade cartridge 22 (only the pivot pin/cylinder 34 is shown for clarity) about the pivot axis PA to select one of a plurality of sides/faces, and to allow the blade cartridge 22 to rotate within a predefined rotation range while at the selected blade/face position during normal use of the razor to conform to the user's skin contours.

In the illustrated embodiment, the blade cartridge pivot biasing mechanisms 90 and blade cartridge rotation limiter 35 may include a biasing device 200 (e.g., but not limited to, a torsion spring or the like) having a first end coupled to the arm 30 and a second end configured to urge a biased pivot cylinder 202 in a first direction (e.g., rotation direction R2)

about the pivot axis PA. The biased pivot cylinder 202 includes a pawl 204. The pawl or resilient pawl 204 may extend generally radially outward from the biased pivot cylinder 202. The biasing device 200 may urge the biased pivot cylinder 202 in the first direction (e.g., R2) such that the pawl 204 of the biased pivot cylinder 202 engages a first tooth 206A (which may be configured to extend generally radially inward from the pivot pin/cylinder 34), thereby urging the pivot pin/cylinder 34 in the first direction (e.g., R2) and causing one or more pivot cylinder stop members 207, 209 (which may be configured to extend generally radially outward from the pivot pin/cylinder 34) to engage one or more arm stop members 208, 210, respectively, of the arm 30. The engagement of the pivot cylinder stop members 207, 209 with the arm stop members 208, 210 generally limits the rotation of the pivot pin/cylinder 34 (and therefore the blade cartridge 22) in the first direction (e.g., R2) while the blade cartridge 22 is set at a first blade face position (e.g., a position of the blade cartridge 22 with respect to the handle 60 corresponding to a first face of the blade cartridge 22 operable to be used by a user of the razor 10). For example, the engagement of the pivot cylinder stop members 207, 209 with the arm stop members 208, 210 generally sets the initial starting position of the blade cartridge 22 while set at the first blade position.

During use of the razor 10, the shaving force Fsu is applied in a second direction (e.g., R1) by the user, which causes the blade cartridge 22 (and therefore the pivot pin/cylinder 34) to rotate in the second direction (e.g., R1) against the spring force of the biasing device 200, and causing the pivot cylinder stop members 207, 209 to move away from the arm stop member 208, 210, respectively. Once force Fsu is reduced/removed, the force of the biasing device 200 (e.g., resistive force Fres) causes the pivot pin/cylinder 34 to move back towards the initial starting position (as illustrated FIG. 11).

To rotate the blade cartridge 22 to another blade face position (e.g., a second or third blade face position corresponding to one of the other faces of the blade cartridge 22), the user applies a rotating force Fr to the blade cartridge 22 in the first direction (e.g., R2), thereby causing the pivot cylinder stop members 207, 209 to deform over arm stop members 208, 210, respectively, until the pivot cylinder stop members 207, 209 come into contact again with arm stop members 208, 210, respectively. Additionally, the rotating force Fr causes biased pivot cylinder 202 to rotate slightly about the pivot axis PA until the pawl 204 deforms over tooth 206B and the pawl 204 comes into contact with the generally vertical/straight portion of tooth 206B. The blade cartridge 22 may therefore be rotated approximately 180 degrees such that the opposite face of the blade cartridge 22 may be utilized by the user.

It should be appreciated that while FIGS. 11-12 illustrate a resistive pivot mechanism configured to allow the user to select between two faces of the blade cartridge 22, the resistive pivot mechanism may be configured to allow the user to select between more than two faces of the blade cartridge 22. In particular, the support arm 30 may include stop members 208, 210 spaced apart such that the pivot cylinder stop members 207, 209 may contact one or more of the arm stop members 208, 210 at positions corresponding to a first, second, and at least third initial starting position. The first, second, and at least a third initial starting positions correspond, respectively, to a first, second, and at least a third face of the blade cartridge 22. Additionally (or alternatively), it should be appreciated that the rotating force Fr may cause the arm stop members 208, 210 to deform over the pivot cylinder stop members 207, 209, respectively, until the pivot cylinder stop members 207, 209 come into contact again with arm stop members 208, 210, respectively. As such, either the arm stop members 208, 210 and/or the pivot cylinder stop members 207, 209 may be resiliently deformable. Moreover, it should be appreciated that the pivot pin/cylinder 34 and/or the biased pivot cylinder 202 may include bearing surfaces (not shown for clarity) configured to align the pivot pin/cylinder 34 and/or the biased pivot cylinder 202 with respect to each other and/or the receptacle in the support arm 30.

Figure 13:
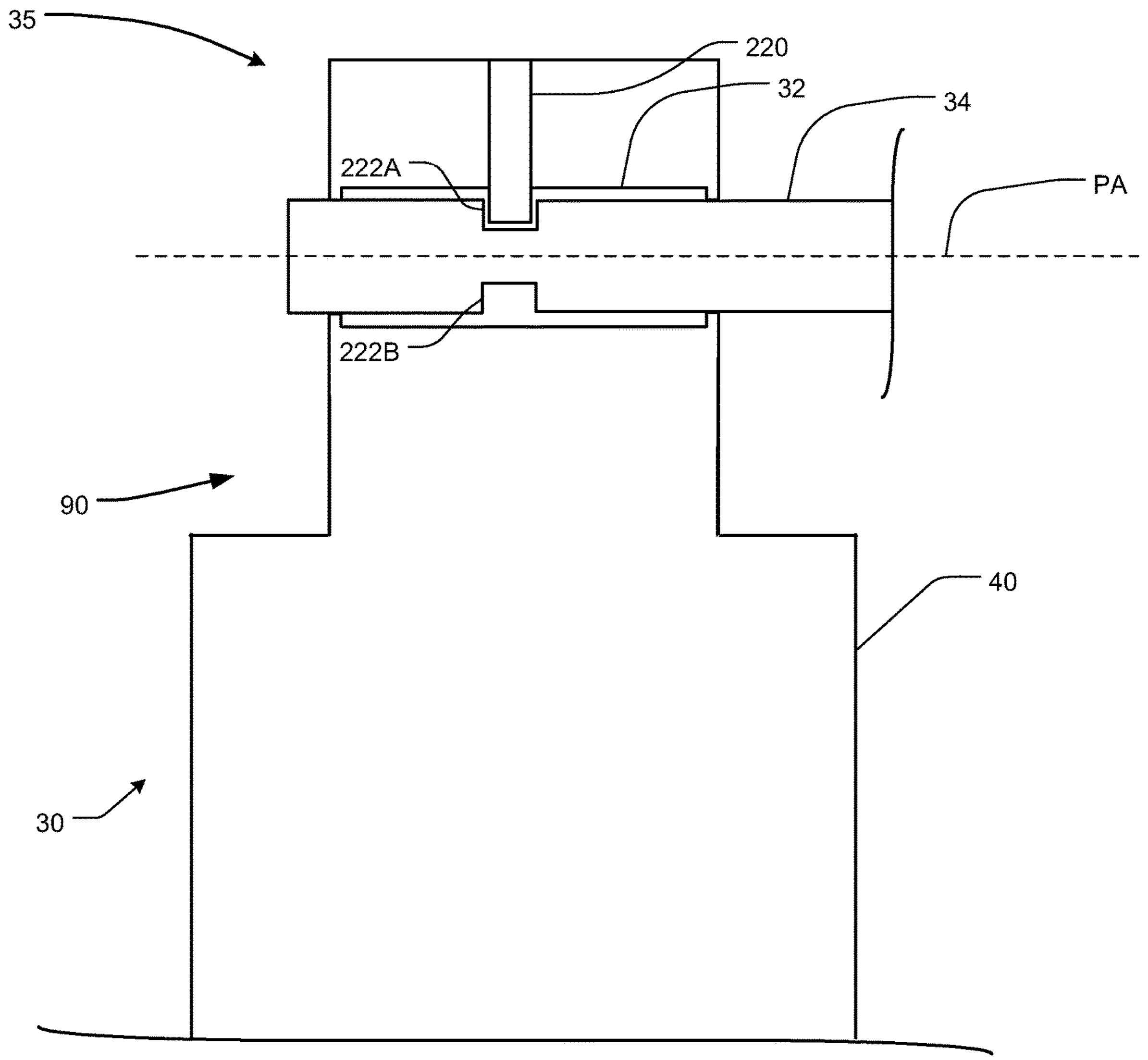
FIG. 13 shows yet another embodiment of a resistive pivot mechanism consistent with the present disclosure.
Figure 14:
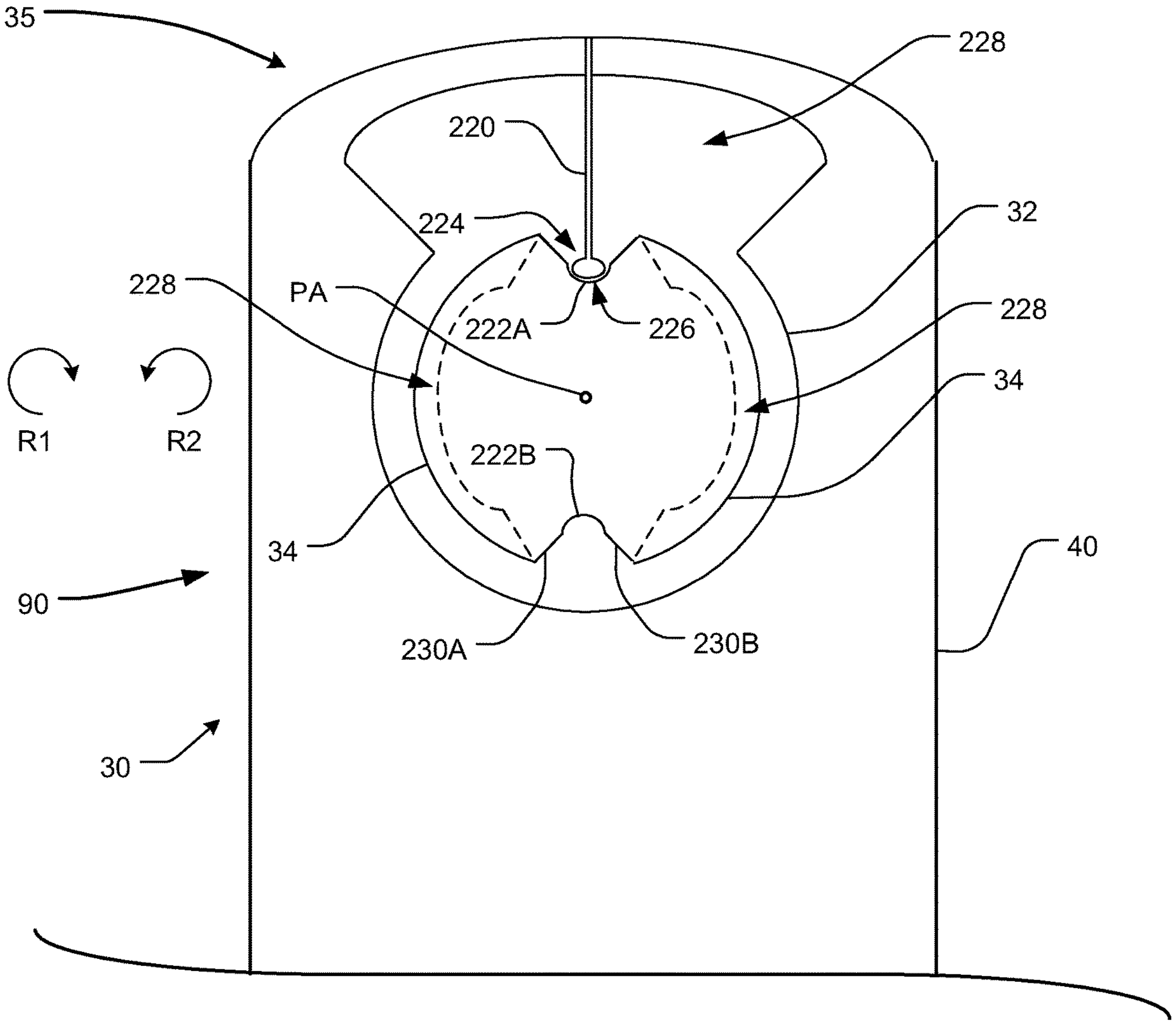
FIG. 14 shows another view of the resistive pivot mechanism consistent with FIG. 13.

With reference to FIGS. 13 and 14, a further embodiment of a resistive pivot mechanism is generally illustrated. The resistive pivot mechanism allows the user to rotate the blade cartridge 22 (only the pivot pin/cylinder 34 is shown for clarity) about the pivot axis PA to select one of a plurality of sides/faces, and that allows the blade cartridge 22 to rotate within a predefined rotation range while at the selected blade/face position during normal use of the razor to conform to the user's skin contours.

The resistive pivot mechanism may include at least one pawl or resilient pawl 220 configured to extend generally radially inward from the receptacle 32 of the arm 30. The pivot pin/cylinder 34 may include a plurality of recesses 222 configured to receive a distal end 224 of the pawl 220. According to one embodiment, the distal end 224 of the pawl 220 may have a shape generally corresponding to a portion of the recess 222A to aid in retaining the pawl 220 relative to the recess 222A. For example, the distal end 224 may have a generally spherical shape while the recess 222A may include a portion 226 having a generally hemispherical shape having a diameter approximately equal to the distal end 224. The location of the recesses 222 may each correspond to one of the plurality of faces of the blade cartridge 22. Thus, while only two recesses 222A, 222B are shown, it may be appreciated that the pivot pin/cylinder 34 may include three or more recesses 222 corresponding to three or more faces of the blade cartridge 20.

It should be appreciated that in any embodiment described herein, the length of the pawl and/or the depth and/or width of the recess may be larger and/or smaller than shown in the illustrations, which will permit a greater degree and/or smaller degree of rotation for the cartridge head within the pre-determined rotation range.

As may be appreciated, the length and flexibility/rigidity of the pawl, in combination with the design of the recesses, may determine the degree of rotation of the blade cartridge (e.g., the predefined rotation range) relative to the initial starting position corresponding to the selected face.

Figure 15:
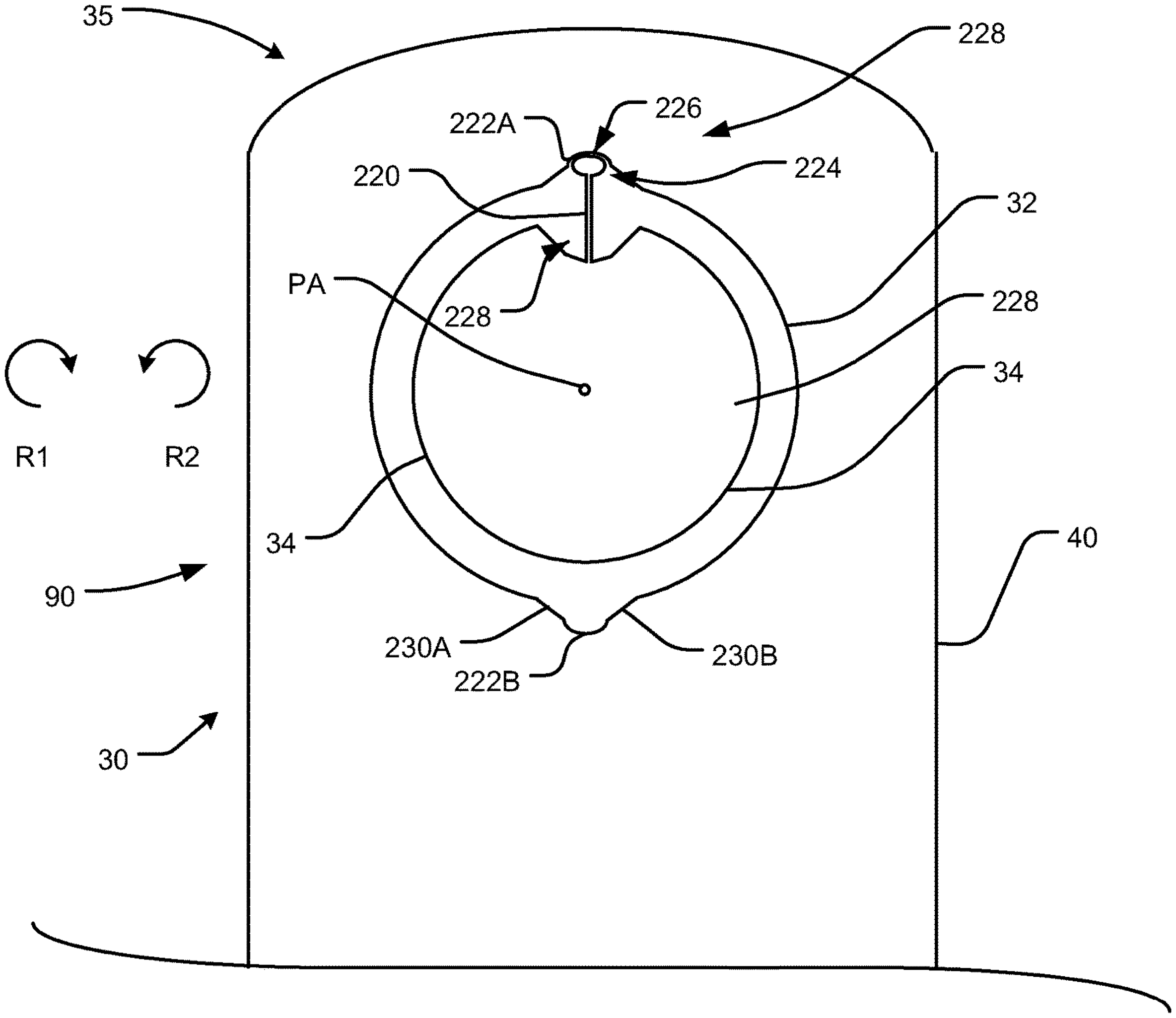
FIG. 15 shows yet a further embodiment of a resistive pivot mechanism consistent with the present disclosure.

With reference to FIG. 15, a variation of the resistive pivot mechanism of FIGS. 13 and 14 is generally illustrated. The resistive pivot mechanism of FIG. 15 is similar to that of FIGS. 13 and 14; however, the pawl 220 is configured to extend generally radially outward from the pivot pin/cylinder 34, and is configured to engage a selected one of a plurality of recesses 222 formed in the arm 30.

In practice (FIGS. 13-15), the user may rotate the blade cartridge 22 (and thus the pivot pin/cylinder 34) such that the desired face of the blade cartridge 22 is in the appropriate position relative to the handle 60. Once in the directed position, the distal end 224 of the pawl 220 may be received in the recess 222A (e.g., but not limited to, the retaining portion 226). This arrangement may be defined as the initial starting position. As a shaving force Fsu is applied to the blade cartridge 20 (and thus the pivot pin/cylinder 34), the pawl 220 applies a resistive force Fres against the blade cartridge 22 urging the blade cartridge 22 in the opposite direction of the shaving force Fsu, and generally towards the initial starting position. Thus, the blade cartridge 22 may rotate about the pivot axis PA within a range relative to the initial starting position.

The number of degrees that the blade cartridge 22 may rotate about the pivot axis PA relative to the initial starting position may depend on the intended use. For example, the blade cartridge 22 may rotate within a range of approximately 5 degrees to approximately 90 degrees about the pivot axis PA relative to the initial starting position, and any range therein. According to another embodiment, the blade cartridge 22 may rotate within a range of approximately 5 degrees to 60 degrees about the pivot axis PA relative to the initial starting position, and any range therein. According to yet another embodiment, the blade cartridge 22 may rotate within a range of approximately 5 degrees to approximately 25 degrees about the pivot axis PA relative to the initial starting position, and any range therein. According to yet a further embodiment, the blade cartridge 22 may rotate within a range of approximately 5 degrees to approximately 15 degrees about the pivot axis PA relative to the initial starting position, and any range therein.

To rotate the blade cartridge 22 to another blade face position (e.g., a second or third blade face position corresponding to one of the other faces of the blade cartridge 22), the user applies a rotating force Fr to the blade cartridge 22 in a first direction (e.g., R1 or R2), thereby causing the pivot pin/cylinder 34 (FIGS. 13-15) to rotate in the first direction (e.g., R1 or R2) until the pawl 220 resilient deforms out of the initial recess 222A. The pivot pin/cylinder 34 and/or arm 30 may optionally include one or more grooves, slots, cavities, or the like 228 (FIGS. 14 and 15) that the pawl 220 may move into as the pivot pin/cylinder 34 is rotated about the pivot axis PA. The user continues to rotate the blade cartridge 22 until the face of the blade cartridge 22 is in the desired location relative to the handle 60. Once in the desired location, the pawl 220 (e.g., the distal end 224 of the pawl 220) will be received in the corresponding recess 222B.

As may be appreciated, one or more of the recesses 222 (FIGS. 13-15) may have a generally concaved configuration. More specifically, the sides 230A, 230B of the recess 222 may slope or taper generally downwardly and/or inwardly towards the pivot axis PA, thereby providing a smoother transition as the pawl 220 enters the recess 222. Alternatively, while not shown, one or more of the recesses 222 (FIGS. 13-15) may have generally vertical, upright, and/or convex configuration, thereby increasing the amount of force needed to deform the pawl 220 out of the recess 222. This configuration may allow pawl 220 to be less rigid, while ensuring that the pawl 220 remains located within the recess 222.

Figure 16A:
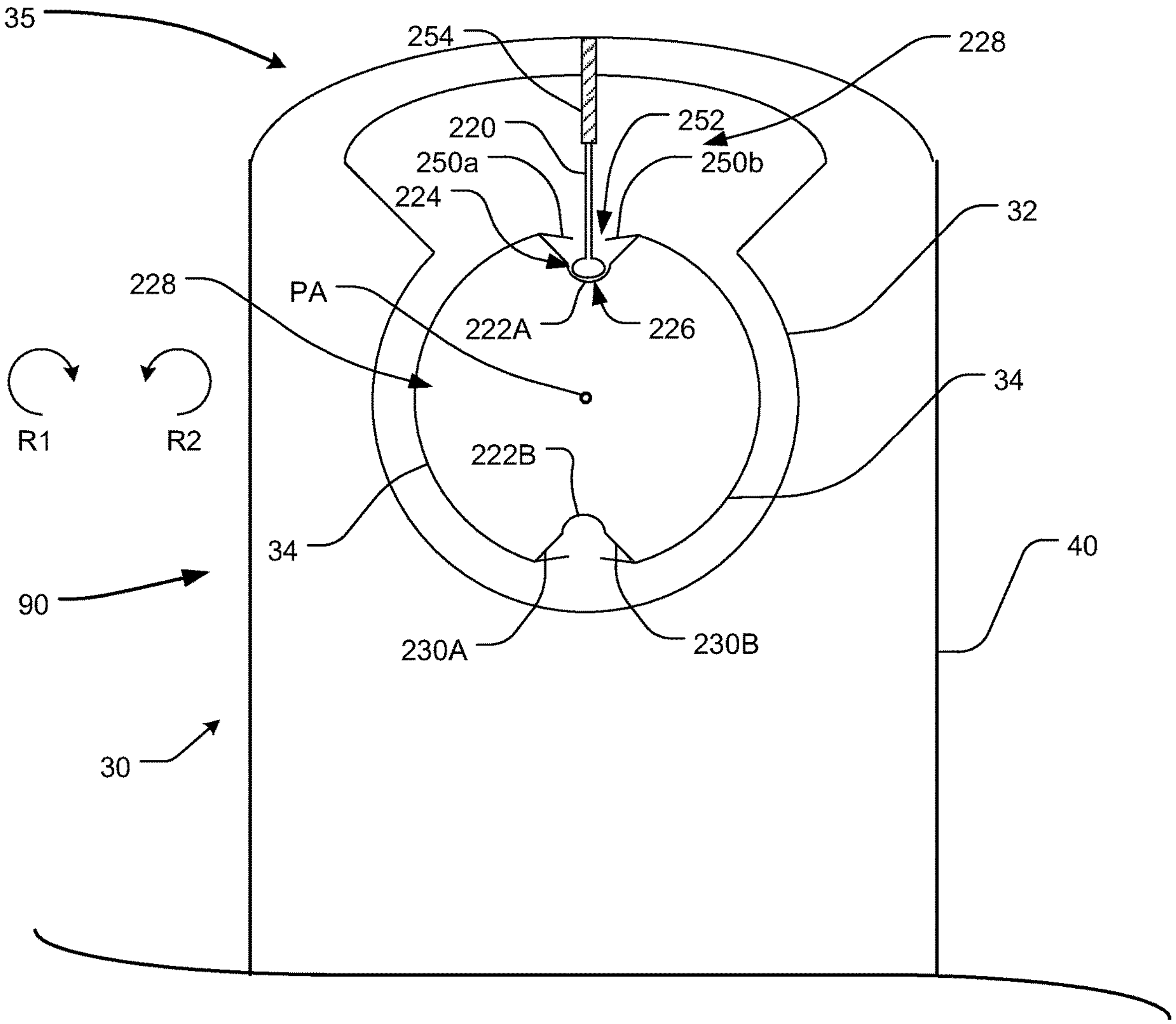
FIG. 16A shows yet an additional embodiment of a resistive pivot mechanism consistent with the present disclosure.
Figure 16B:
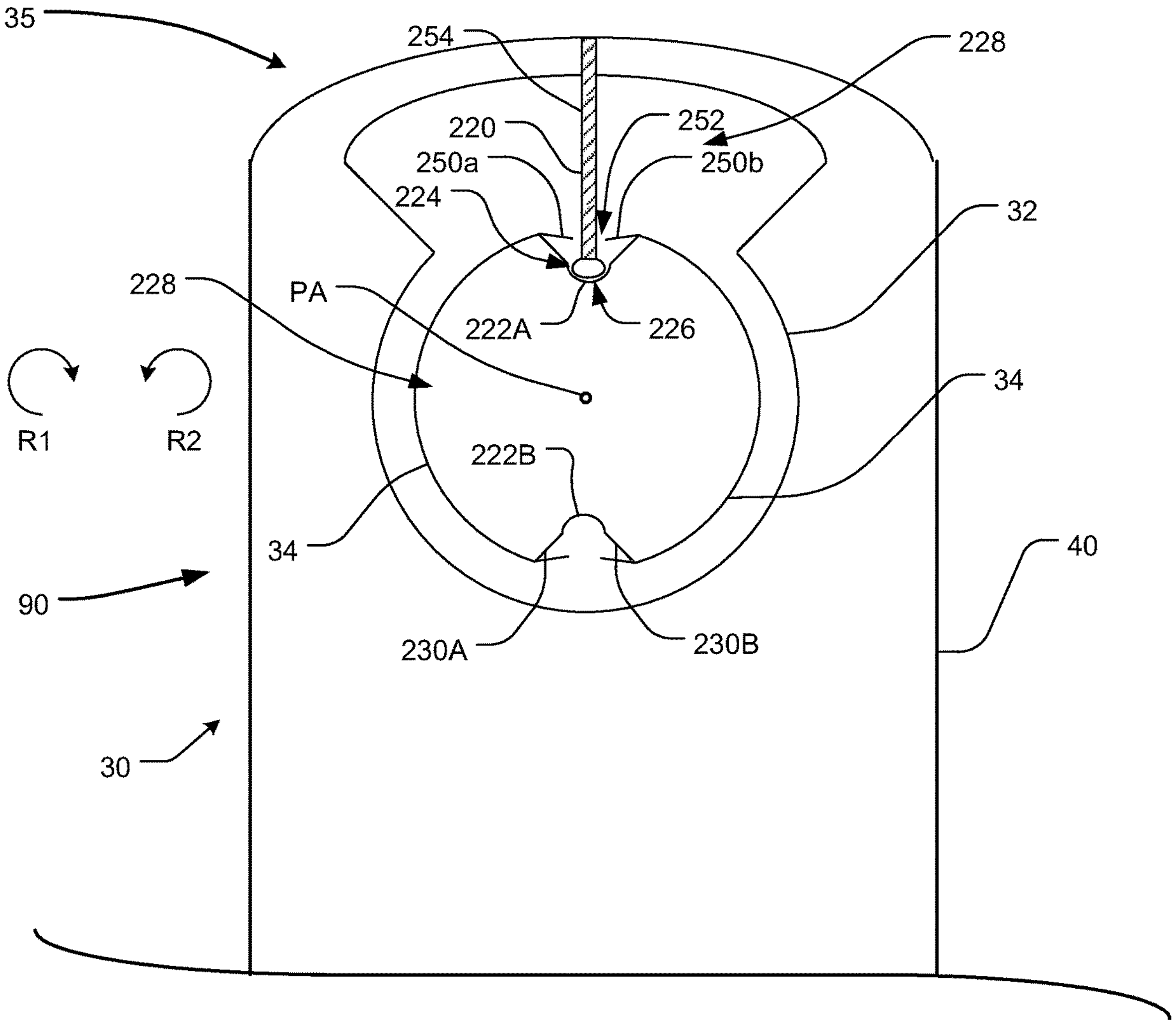
FIG. 16B shows yet an additional embodiment of a resistive pivot mechanism consistent with the present disclosure.
Figure 17A:
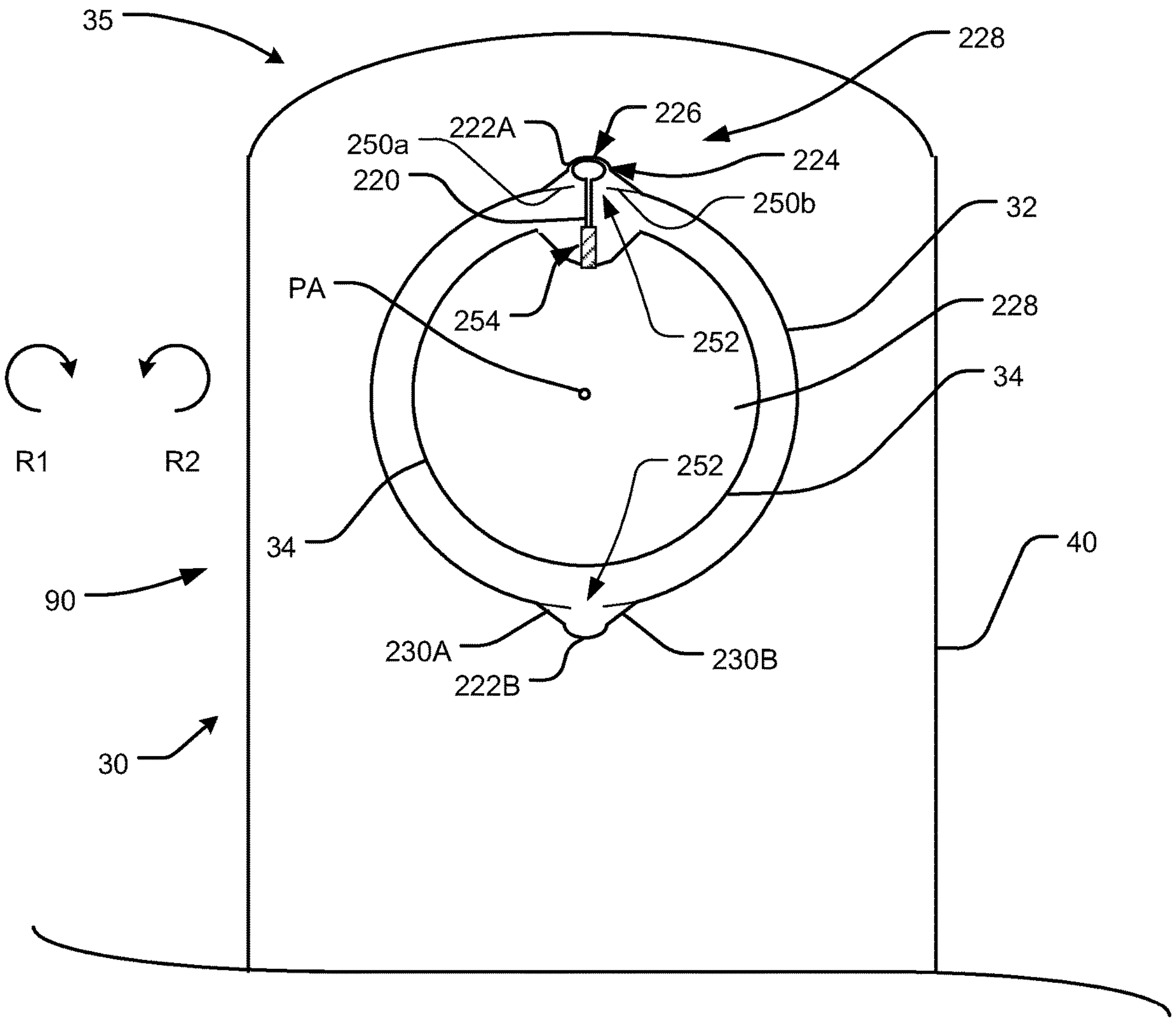
FIG. 17A shows a further embodiment of a resistive pivot mechanism consistent with the present disclosure.
Figure 17B:
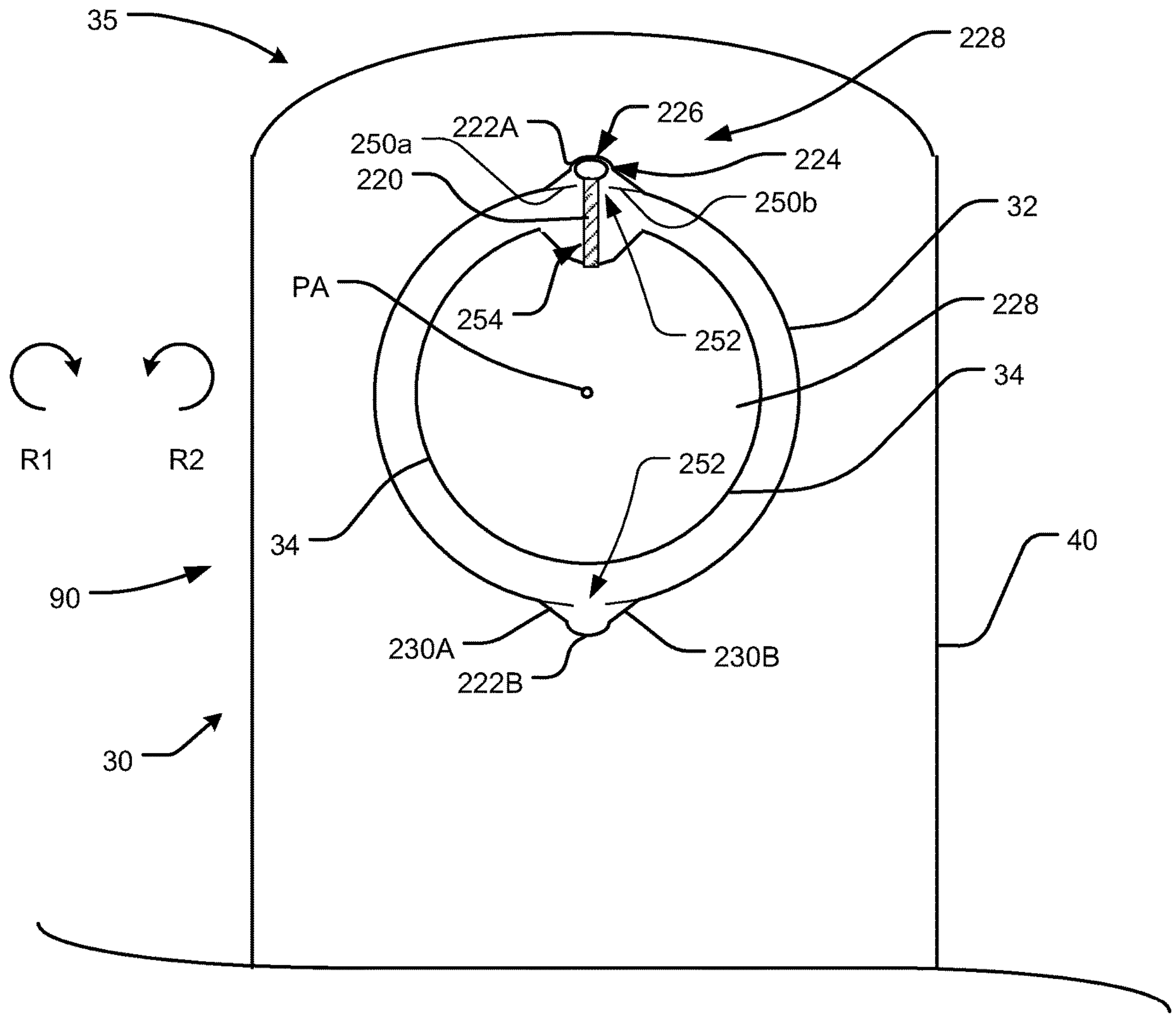
FIG. 17B shows a further embodiment of a resistive pivot mechanism consistent with the present disclosure.

Turning now to FIG. 16A, another embodiment of the resistive pivot mechanism is generally illustrated. The resistive pivot mechanism may be similar to that of FIGS. 13 and 14, however, one or more of the recesses 222 (which are formed in the pivot pin/cylinder 34) may include one or more resiliently deformable flaps 250 and the resilient pawl 220 may optionally include a spring 254. FIG. 16B is similar to FIG. 16A, but the pawl 220 includes a spring 254 extending from the receptacle 32 of the arm 30 and terminating at the distal end 224. The distal end 224 of the pawl 220 may have a shape generally corresponding to a portion of the recess 222A to aid in retaining the pawl 220 relative to the recess 222A. For example, the distal end 224 may have a generally spherical and/or oval shape while the recess 222A may include a portion 226 having a generally hemispherical and/or oval shape having a diameter approximately equal to the distal end 224. FIGS. 17A and 17B are similar to FIGS. 16A and 16B, respectively, but are based on the resistive pivot mechanism of FIG. 15 in which the recesses 222 are formed in the support arm 30 and the resilient pawl 220 extends from the pivot pin/cylinder 34.

With reference to FIGS. 16A-17B, the resiliently deformable flaps 250 extend across at least a portion of the opening of the recesses 222. For example, the resiliently deformable flaps 250 may extend from a portion of the recesses 222 and/or area surrounding the recesses 222. The first and second resiliently deformable flaps 250*a*, 250*b* may extend partially across the opening of a recess 222, and may define a deformable opening 252. The resiliently deformable flaps 250*a*, 250*b* may be configured to resiliently deform such that the distal end 224 of the pawl 220 can pass through the deformable opening 252 and be at least partially received in the recess 222. The resiliently deformable flaps 250 may aid in retaining the distal end 224 of the pawl 220 in the recesses 222.

According to one embodiment, at least a portion of the shaft of the resilient pawl 220 may optionally include a spring such as, but not limited to, a torsion spring, coil spring, or the like 254. The spring 254 may be configured to engage the recess 222 and/or the resiliently deformable flaps 250, and may allow the predefined rotation range within which the blade cartridge 22 rotates to be increased. Upon application of sufficient rotational force.

For example, the resiliently deformable flaps 250 may aid in retaining the distal end 224 of the resilient pawl 220, which in turn may engage the spring 254. Upon application of sufficient rotating force Fr to the blade cartridge 22 by the user, the spring 254 may be "maxed out" and will pull the resilient pawl 220 through the resiliently deformable flaps 250, and the blade cartridge 22 can be rotated to select a new face as described herein.

With reference now to FIGS. 18-20, yet a further embodiment of resistive pivot mechanism is generally illustrated. In particular, FIG. 18 generally illustrates one embodiment of a disposable head assembly 20 consistent with at least one embodiment of the present disclosure, FIG. 19 is a cross-section taken along lines 19-19 of FIG. 18, and FIG. 20 is a cross-section taken along lines 20-20 of FIG. 19. It should be appreciated that the disposable head assembly 20 shown in FIG. 18 is provided for illustrative purposes only, and that the resistive pivot mechanism may be used with any razor 10 and/or disposable head assembly 20 described herein.

With reference to FIGS. 19 and 20, the resistive pivot mechanism may be similar to that of FIGS. 13-17B, however, one or more recesses 322 are formed in blade cartridge 22 and one or more resiliently deformable pawl 320 are formed in a portion of the arm 30 that is recessed (e.g., countersunk) into a portion (e.g., a cavity or recess) 310 of the blade cartridge 22. As described herein, the pawl 320 may include any pawl configuration described herein. The recesses 322 (which may be formed within the cavity 310) may include any recess configuration described herein and may be arranged to generally correspond to one or more of the faces (e.g., 140, 156, etc.) of the blade cartridge 22. The pawl 320 may be engaged within the recesses 322 to allow the blade cartridge 22 to move within the predefined rotation range. For example, the pawl 320 may bend within the recess 322. Alternatively (or in addition), the pawl 320 may move within the recess 322, the size of the recess 322 may define (at least in part) the predefined rotation range. FIGS. 21 and 22 are similar to FIGS. 19 and 20, but the pawl(s) 320 extend from a portion (e.g., a cavity or recess) 310 of the blade cartridge 22 and the recess(es) 322 are formed in a portion of cavity 310 of the blade cartridge 22.

Turning now to FIGS. 23 and 24, yet a further embodiment of a resistive pivot mechanism is generally illustrated. The resistive pivot mechanism may include one or more pawls 420 and recesses 422 as generally described herein. For example, one or more pawls 420 may extend from the arm 30 and one or more recesses 422 may be formed in a portion of cavity 410 of the blade cartridge 22 as generally illustrated in FIG. 23. Alternatively (or in addition), one or more pawls 420 may extend from a portion of cavity 410 of the blade cartridge 22 and one or more recesses 422 may be formed in a portion of the arm 30 as generally illustrated in FIG. 24. It may be appreciated, however, one or more of the pawls 420 and/or recesses 422 may be located anywhere on the blade cartridge 22 and/or the pivot arm 34 as described herein.

The resistive pivot mechanism may also include one or more ballast devices 450 configured to move within at least a portion of the blade cartridge 22. For example, the ballast device 450 may be configured to slide within one or more passageways 452 defined within the blade cartridge 22. The passageways 452 may extend generally perpendicularly to the pivot arms 34. The ballast devices 450 may be configured to urge the blade cartridge 22 generally towards the initial starting position as generally illustrated. The active face of the blade cartridge 22 (i.e., the face being used by user, for example, to shave) may be arranged at an initial starting position which is generally at an angle I of approximately 10 to 30 degrees with respect to the longitudinal axis L of the handle 60.

For example, the weight of the ballast devices 450 may urge the blade cartridge 22 generally in the direction of arrow K until the pawl 420 engages against a portion of the recess 422 as generally illustrated in FIGS. 23 and 24. The blade cartridge 22 may be moved in the direction generally opposite of arrow K within the recesses 422, and the ballast device 450 will urge the blade cartridge 22 generally towards the initial starting position.

To rotate the blade cartridge 22 to another face, the user rotates the blade cartridge 22 relative to the handle 60 until the pawl 420 engages another recesses 422 as generally described herein. Once the angle I of the blade cartridge 22 exceeds 90 degrees relative to the handle 60, the ballast devices 450 may slide to the other side of the blade cartridge 22. The ballast device 450 is therefore ready to urge the blade cartridge 22 generally towards the new initial starting position.

It should be appreciated that while one ballast device 450 is illustrated, the resistive pivot mechanism may include a plurality of ballast devices 450. Additionally, while a single ballast device 450 is shown in a passageway 452, it should be appreciated that a plurality of ballast devices 450 may be disposed within one or more passageways 452. Moreover, while the resistive pivot mechanism is generally illustrated having a pawl and a recess, it should be appreciated that the recess may be defined by one or more teeth or one or more resiliently deformable pawls.

Turning now to FIGS. 25-27, another embodiment of the razor 10 having a hinge 74 is generally illustrated. While the razor 10 of FIGS. 25-27 may be used with any blade cartridge known to those skilled in the art, the razor 10 of FIGS. 25-27 may be particularly useful with a blade cartridge 22 having at least one face 140 with at least one razor 142 aligned to cut in a first shaving direction D1 and at least one razor 142 aligned to cut in a second shaving direction D2 (e.g., but not limited to, the blade cartridge 22 as generally illustrated in FIG. 37).

With reference to FIG. 25, a side view of the razor 10 is shown. The handle 60 includes a first (proximal) shaft portion 75 coupled to a second (distal) shaft portion 77 by way of one or more hinges 74. The hinge 74 may include any hinge mechanism known to those skilled in the art, and may include, for example, a locking mechanism (e.g., but not limited to, a locking pawl, ratchet mechanism, or the like) configured to allow the user to generally lock and/or fix the relative position of the first shaft portion 75 relative to the second shaft portion 77 (e.g., the head assembly 20 relative to the handle 60).

For example, the hinge 74 may be configured to allow the first shaft portion 75 to swing approximately 90 degrees generally along the direction of arc S from the position shown in FIG. 25 to the position shown in FIG. 26. It may be appreciated that the hinge 74 allows the first shaft portion 75 to swing in a direction (e.g., plane or axis) that is generally perpendicular to cutting edge axis CE of the cutting edge 151 of one or more of the razor blades 142 of the head assembly 20.

The handle 60 (e.g., the first shaft portion 75) and/or the support hub 50 may optionally include a swivel or pivot 177 configured to allow the user to manually swivel or rotate the blade cartridge 22 approximately 90 degrees in an axis that is generally parallel to the longitudinal axis Lh of the first shaft portion 75 and/or the support hub 50 such that the cutting edge axis CE of the cutting edge 151 of one or more of the razor blades 142 of the head assembly is aligned generally parallel to the longitudinal axis L of the handle 60 as generally illustrated in FIG. 27. The swivel 177 may include any swivel or pivot mechanism known to those skilled in the art, and may include, for example, a locking mechanism (e.g., but not limited to, a locking pawl, ratchet mechanism, or the like) configured to allow the user to generally lock and/or fix the relative position of the blade cartridge 22 relative to the first shaft portion 75 and/or support hub 50.

A razor 10 having a hinge 74 and swivel 177 as described above (and optionally including, but not limited to, the blade cartridge as generally illustrated and described in FIG. 37 herein) may be particularly useful for shaving a user's head and/or body. In particular, having the cutting edge axis CE of the cutting edge 151 of one or more of the razor blades 142 of the head assembly 20 aligned generally parallel to the longitudinal axis L of the handle 60 as generally illustrated in FIG. 27 may facilitate shaving a user's head and/or body compared with having the cutting edge axis CE of the cutting edge 151 of the razor blades 142 aligned generally perpendicular to the longitudinal axis L of the handle 60 as generally illustrated in FIG. 25.

The blade cartridge 22 in FIGS. 25-27 may optionally include any resistive pivot mechanism described herein. While not a limitation of the present disclosure unless specifically claimed as such, the blade cartridge 22 may include any of the resistive pivot mechanisms and/or any combination of the resistive pivot mechanisms described herein. The resistive pivot mechanisms described herein that do not include a biasing pin 92 may be particularly suited for use with the hinge 74 and swivel 177. As such, the blade cartridge 22 may be located closer to the second shaft portion 77 when arranged in the position shown in FIG. 27.

Turning now to FIGS. 28 and 29, the shaving razor 10 may optionally include a blade cartridge centering mechanism 100. The blade cartridge centering mechanism 100 may be configured to generally align the blade cartridge 22 with respect to the support arms 30. For example, blade cartridge centering mechanism 100 may be configured to generally align the pivot pin 34 within the receptacle 32 as the pivot pin 34 rotates therein. According to one embodiment, the pivot pin 34 may include at least one bearing surface 102 configured to generally engage with a bearing surface 104 of the receptacle 32. The bearing surfaces 102, 104 may have outer and inner diameters such that rotation of the pivot pin 34 is generally concentric with the center of the receptacle 32. Additionally (or alternatively), the pivot pin 34 may include at least one shoulder region 106 configured to generally engage with a shoulder region 108 of the receptacle 32 to generally align the blade cartridge 22 along the pivot axis PA (e.g., left/right as generally illustrated).

Referring now to FIG. 30A, one embodiment of a blade cartridge 22 having at least a first shaving side 140 is generally illustrated. First shaving side 140 comprises at least one razor blade 142. As shown, first shaving side 140 may comprise a plurality of razor blades 142. More particularly, first shaving side 140 may comprise a first set 144 of one or more razor blades 142 and a second set 146 of one or more razor blades 142. In the illustrated embodiment, each set 144, 146 is shown having three razor blades 142, though it will be appreciated that this is not a limitation of the present disclosure unless specifically claimed as such, and that each set 144, 146 may independently have one or more blades. In the present embodiment, all the razor blades 142 of each set 144, 146 are arranged to cut hair in a first shaving stroke direction D1, and the sets 144, 146 may be separated by an intermediate skin lubricating strip 176. As described herein, the razor blades 142 in the sets 144, 146 may optionally be arranged to cut hair in different directions (e.g., one set 146 may be configured to cut hair in a first shaving stroke direction D1 and the other set 144 may be configured to cut hair in a second shaving stroke direction D2).

Blade cartridge 22 may include a continuous outer housing (frame) 188 around a periphery of the first shaving side razor blades 142, which may be formed of plastic or metal, such as stainless steel. The blade cartridge 22 (e.g., frame/housing 188) may include a front edge region 157, a rear/aft edge region 159, a first lateral edge region 161, and a second lateral edge region 163. As used herein, the terms "forward" and "aft" define the relative position between two or more things. A shaving aid "forward" of the razor blades 142, for example, is positioned so that the surface of the skin and/or hair to be shaved encounters the shaving aid before it encounters the razor blades 142, provided the shaving device 10/blade cartridge 22 is being stroked in its intended cutting direction, here direction D1. A shaving feature "aft" of the razor blades 142 is positioned so that the surface of the skin and/or hair to be shaved encounters the shaving aid after it encounters the razor blades 142, provided the shaving device 10/blade cartridge 22 is being stroked in its intended cutting direction, here direction D1. Additionally, the term "lateral" is used relative to the front and aft.

Blade cartridge 22 may optionally include one or more forward shaving aids 160 located in at least a portion of the front edge region 157 and/or one or more aft shaving aids 162 located in at least a portion of the rear/aft edge region 159. For example, a forward shaving aid 160 may be located in front of the razor blades 142 during a shaving stroke in direction D1 (e.g., in front of the first set 144 and/or second set 146) whereas an aft shaving aid 162 may be located behind the razor blades 142 during the shaving stroke in direction D1 (e.g., behind the second set 146 and/or the first set 144).

Blade cartridge 22 may also (or alternatively) include a first lateral (e.g. left) shaving aid 164 and a second lateral (e.g. right) shaving aid 166 located substantially adjacent to a first (e.g. left) longitudinal end 150 and an opposing second (e.g. right) longitudinal end 152 of the first shaving side razor blades 142, respectively, during the shaving stroke in direction D1.

As shown, forward shaving aid 160 may comprise at least one skin engaging strip 170 to provide frictional engagement with skin, particularly to be shaved by the first shaving side razor blades 142. Skin engaging strip 170 may comprise a plurality of flexible raised projections, particularly flexible elongated fins formed of a polymer composition, particularly that of an elastomer. Alternatively or in addition to the foregoing, forward shaving aid 160 may comprise at least one skin lubricating strip 172 to lubricate skin, particularly to be shaved by the first shaving side razor blades 142.

Alternatively or in addition to the foregoing, aft shaving aid 162 may also comprise at least one skin lubricating and/or moisturizing strip 174 to lubricate skin, particularly after being shaved by the first shaving side razor blades 142. Lubricating and/or moisturizing strip 174, as well as lubricating and/or moisturizing strips 172 and 176 may comprise at least one of a lubricant, a conditioner, a moisturizer, a soap, and a gel. As noted herein, the lubricating strip 176 may be disposed between the first and second sets of 144, 146 of razor blades 142. The lubricating strip 176 therefore further lubricates a portion of the user's skin having been shaved by the first set 146 of razor blades 142 before the second set 144 of razor blades 142 contacts the portion of the user's skin.

Alternatively or in addition to the foregoing, one or more of the forward shaving aid 160, the aft shaving aid 162, the first lateral shaving aid 164, and/or the second lateral shaving aid 166 may also comprise at least one roller strip, 182, 184, 186, respectively. The roller strip 180, 182, 184, 186 may include a plurality of ball bearings 190 (e.g., stainless steel) to massage/knead skin, as well as help facilitate an easier feel to shaving with a faster, smoother motion of the razor blade action regardless of the direction of shaving. According to one embodiment, the roller strips 180, 182, 184, 186 may be disposed along at least a portion of the front edge region 157, the rear/aft edge region 159, the first lateral edge region 161, and the second lateral edge region 163, respectively. In the illustrated embodiment, the ball bearings 190 are located completely around a periphery of the frame 188 and are in close proximity to each other; however, it should be appreciated that this not a limitation of the present disclosure unless specifically claimed as such, and the ball bearings 190 may be located around only a portion of the periphery of the frame 188 (e.g., about only a portion of the front edge region 157, the rear/aft edge region 159, the first lateral edge region 161, and/or the second lateral edge region 163).

With reference now to FIG. 30B, another embodiment of a blade cartridge 22 having at least a first shaving side 140 is generally illustrated. The blade cartridge 22 may be similar to the blade cartridge 22 as illustrated and described in FIG. 30A, however, one or more of the front edge region 157 and/or a rear/aft edge region 159 may also comprise at least one elongated ball bearing/roller pin 190. The elongated ball bearing/roller pin 190 may extend along a substantial portion of the front and/or rear/aft edge regions 157, 159 (e.g., along substantially the entire width of the blade cartridge 22).

Turning now to FIG. 31, a cross-sectional view of one embodiment of a blade cartridge 22 having a ball bearing 190 consistent with the present disclosure is generally illustrated. The ball bearing 190 may be located in a receptacle (bore) 192 formed in frame 188 of the blade cartridge 22. Ball bearings 190 may be inserted into the receptacle 192 from the back side of the frame 188 (e.g., a surface generally opposite of the exposed surface 193 of the blade cartridge 22 that contacts the user's skin) and may include an exposed portion 191 that is exposed through and/or extends beyond bearing opening 194 and/or exposed surface 193 of the first shaving side 140 of the frame 188. (It should be appreciated that the ball bearings 190 described herein may also be arranged on the second shaving side 156.) The receptacle 192 may then be closed at the entrance by a closure 196, which may be press fit within the receptacle 192.

The exposed portion 191 may be configured to extend beyond the exposed surface 193 of the frame 188 such that the exposed portion 191 may contact against user's skin. One or more of the ball bearings 190 may be moveable or retractable generally along line B relative to the frame 188 (e.g., generally perpendicular to the exposed surface 193 of the frame 188) such the amount of the exposed portion 191 of the ball bearing 190 extends through bearing opening 194 and/or exposed surface 193 of the frame 188 may change.

For example, one or more of the ball bearings 190 may be seated on a biasing device 198 (e.g., a compression, torsion, or coil spring). The biasing device 198 may be configured to urge the ball bearing 190 generally outwardly beyond the exposed surface 193 of the frame 188. Upon application of a force in the opposite direction of the biasing device 198, the exposed portion 191 of the ball bearings 190 may be retracted relative to the exposed surface 193 of the frame 188 (e.g., into the bore 192) and the ball bearing 190 may move generally along line B. In such a manner, the biasing device 198 may cushion rolling of the ball bearings 190 on a user's skin.

Turning now to FIG. 32, a cross-sectional view of another embodiment of a blade cartridge 22 having a ball bearing 190 consistent with the present disclosure is generally illustrated. As shown in FIG. 32, the ball bearings 190 may be installed in frame 188 of the blade cartridge 22 from exposed surface 193 of the blade cartridge 22 that contacts the user's skin (e.g., the first shaving side 140), rather than the back side of the frame 188 as generally illustrated in FIG. 31. Biasing device 198 (e.g., compression, torsion, or coil spring) may first be placed in a recess 200 formed in the frame 188, and a ball bearing 190 may then be seated on the basing device 198. Thereafter, a housing/cover 202 may be installed in recess 200 with a press fit (forming a housing unit), with the housing/cover 202 including a receptacle 204 for ball bearing 190, as well as providing bearing opening 194.

Turning now to FIG. 33, a cross-sectional view of yet another embodiment of a blade cartridge 22 having a ball bearing 190 consistent with the present disclosure is generally illustrated. The ball bearing 190 may be installed in a housing/cover 202 which is inserted in recess 200 formed in the frame 188 in a sliding manner and secured with a closure 196 formed on the opposite side of the exposed surface 193 of the frame 188. A portion 201 of the frame 188 may extend generally circumferentially around and define the bearing opening 194 such that the exposed surface 193 of the frame 188 extends across at least a portion of the cover 202. Rather than enabling retraction of just the ball bearing 190, biasing device 198 and housing/cover 202 may be arranged such that both the ball bearing 190 and the housing/cover 202 may be retracted into recess 200. The portion 201 of the frame 188 extends across the cover 202 such that as the ball bearing 190 and the housing/cover 202 retract into recess 200, the opening 194 is defined by the portion 201 of the frame 188.

With reference to FIGS. 34-35B, further embodiments of a blade cartridge 22 having a ball bearing 190 and elongated ball bearing/roller pin 190, respectively, consistent with the present disclosure are generally illustrated. When the skin first makes contact with a razor blade, it is tight and tense. As part of the shaving experience, the user may elect to wash the area to be shaved with a warm facecloth or warm water prior to engaging the blades with the skin. While this helps, warm water may not always be available.

The ball bearing 190 and elongated ball bearing/roller pin 190 as generally illustrated in FIGS. 34-35B may feature a self-lubricating ball bearing and/or elongated ball bearing/roller pin which may function as a "skin massager" and skin lubricant applicator whilst facilitating a smoother, faster and more efficient shaving stroke. The ball bearings are configured to rotate freely in any direction. This eliminates the "drag" during a shaving stroke, which is commonly associated with the "glide strips" of razors. The curved contact surface of the ball bearing 190 and/or elongated ball bearing/roller pin 190 lends itself to rolling over and kneading the skin during a shaving stroke. This essentially massages the skin, loosening it up in preparation for shaving. Any of the ball bearings 190 and elongated ball bearing/roller pins 190 may optionally include a textured surface to aid in picking-up or grabbing the lubricant as it rotates.

The self-lubricating ball bearing 190 and/or elongated ball bearing/roller pin 190 may include a lubricant 197 configured to be in contact (e.g., but not limited to, direct contact) with the ball bearing 190 and/or elongated ball bearing/roller pin 190. The lubricant 197 may include a semi-solid or solid lubricant, and may also include moisturizers, exfoliates, scented and/or non-scented, and the like. During a shaving stroke, the razor is drawn over the skin and the ball bearing(s) 190 and/or elongated ball bearing(s)/roller pin(s) 190 rotate. As the ball bearing(s) 190 and/or elongated ball bearing(s)/roller pin(s) 190 rotate, they coat themselves with the skin lubricant 197. The lubricant 197 is then applied continually to the skin, before, during and after each shaving stroke.

The ball bearing 190 and/or elongated ball bearing/roller pin 190 may be biased as described herein. For example, a biasing device (e.g., a spring or the like) 198 may be disposed beneath the lubricant as generally illustrated in FIG. 34. The biasing device 198 may urge the lubricant 197 generally against the ball bearing 190, thereby causing the lubricant 197 to also urge the ball bearing 190 towards the opening 194. The biasing device 198 may cushion and/or dampen the force placed on the lubricant 197 and promote a smoother and more fluid rotation of the ball bearing 190 and/or elongated ball bearing/roller pin 190 while a downward force is being applied during a shaving stroke. As the lubricant 197 diminishes, the biasing device 198 continues to exert an upward force, always providing a positive contact between the lubricant 197 and the ball bearing 190 and/or elongated ball bearing/roller pin 190 until finally the lubricant 197 is used up.

Alternatively (or in addition), a biasing device 198 (e.g., but not limited to a spring) may be coupled to the ball bearing 190 and/or elongated ball bearing/roller pin 190, for example, as generally illustrated in FIGS. 35A and 35B. For example, the ball bearing 190 and/or elongated ball bearing/roller pin 190 may include pins 199 extending outward from opposite portions of the ball bearing 190 and/or elongated ball bearing/roller pin 190 (e.g., at opposite ends). The biasing device 198 may urge the pins 199 and therefore the ball bearing 190 and/or elongated ball bearing/roller pin 190 towards the opening 194. When the ball bearing 190 and/or elongated ball bearing/roller pin 190 is pushed in the opposite direction of the biasing device 198 (e.g., away from the opening 194), the ball bearing 190 and/or elongated ball bearing/roller pin 190 may contact a portion of the lubricant 197. Optionally, the lubricant 197 may be disposed on a base 195 which may be urged by one or more biasing device 198 generally towards the ball bearing 190.

Turning now to both FIGS. 35C-35E, one embodiment of a retention clip 3502 for mounting, securing, and/or otherwise coupling any of the ball bearings 190 described herein is generally illustrated. In particular, FIG. 35C generally illustrates one embodiment of a retention clip 3502 along with a lubricant 197, FIG. 35D generally illustrates one embodiment of just the retention clip 3502 and one embodiment of a ball bearing 190, and FIG. 35E generally illustrates one embodiment of just the retention clip 3502 (though it should be appreciated that these figures are provided only for illustrative purposes only). The retention clip 3502 may be configured to be received at least partially within a cavity 3504 formed in the blade assembly 22. The retention clip 3502 (FIGS. 35D and 35E) may include one or more legs or extensions 3506 extending outward (e.g., downward) from a base region 3508 (which may form the opening 191). A portion of the legs 3506 (e.g., the distal region) may include one or more barbs or the like 3510. The barbs 3510 are configured to engage against a portion of the surface 3512 (FIG. 35C) sidewall of the cavity 3504 to generally retain, secure, mount, and/or couple the retention clip 3502 to the cavity 3504/blade assembly 22, and therefore generally retain, secure, mount, and/or couple the ball bearing 190 (and optionally any lubricant 191 and/or the like) to the cavity 3504/blade assembly 22. The surface 3512 (FIG. 35C) sidewall of the cavity 3504 may optionally include a shoulder, recess, and/or groove 3514 configured to engage the barb 3510 and create a mechanical connection to further facilitate retaining the retention clip 3502 within the cavity 3504. The retention clip 3502 may allow the ball bearing 190 to be loaded/inserted from the outside/exterior (front and/or rear) of the blade cartridge 22, for example, during the assembly of the blade cartridge 22.

With reference to FIGS. 35F-35H, one embodiment of a blade cartridge 22 including a blade retention clip 3520 for mounting, securing, and/or otherwise coupling one or more (e.g., a plurality) of razor blades 142 is generally illustrated. The blade retention clip 3520 described herein may be used for mounting, securing, and/or otherwise coupling any razor blade known to those skilled in the art, and is not limited to any of the embodiments described herein unless specifically claimed as such. Additionally (or alternatively), the blade retention clip 3520 may be used for mounting, securing, and/or otherwise coupling any shaving aid(s) 160, skin engaging strip(s) 170, skin lubricating strip(s) 172, 176, skin lubricating and/or moisturizing strip(s) 174, or the like. As such, the blade retention clip 3520 may be used for mounting, securing, and/or otherwise coupling one or more razor blades and/or any combination of shaving aid(s) 160, skin engaging strip(s) 170, skin lubricating strip(s) 172, 176, skin lubricating and/or moisturizing strip(s) 174, or the like.

With reference to FIG. 35F, blade cartridge 22 may include a housing and/or frame 188 which may be formed of plastic or metal, such as stainless steel. The blade cartridge 22 (e.g., frame/housing 188) may include a front edge region 157, a rear/aft edge region 159, a first lateral edge region 161, and a second lateral edge region 163. In the illustrated embodiment, a blade retention clip 3520 is used at each longitudinal end 150, 152 of the razor blade 140, though this is for illustrative purposes and only one lateral end 150, 152 of the razor blade 142 may be secured with a blade retention clip 3520.

Turning now to FIG. 35G, the blade retention clip 3520 may be configured to be received at least partially within a retention cavity 3522 formed in the blade assembly 22 (e.g., the frame 188). The blade retention clip 3520 (FIG. 35H) may include one or more legs or extensions 3526 extending outward (e.g., downward) from a base region 3528 (which may extend across the mounting width Wm of one or more of the razor blades 140, shaving aid(s) 160, skin engaging strip(s) 170, skin lubricating strip(s) 172, 176, skin lubricating and/or moisturizing strip(s) 174, or the like that are being retained by the blade retention clip 3520). A portion of the legs 3526 (e.g., the distal region) may include one or more barbs or the like 3530. The barbs 3530 are configured to engage against a portion of the surface 3532 (FIG. 35G) sidewall of the blade cavity 3522 to generally retain, secure, mount, and/or couple the blade retention clip 3520 to the blade cavity 3522/blade assembly 22, and therefore generally retain, secure, mount, and/or couple the razor(s) 140 to the blade cavity 3522/blade assembly 22. The surface 3532 (FIG. 35G) sidewall of the blade cavity 3522 may optionally include a shoulder, recess, and/or groove 3534 configured to engage the barb 3530 and create a mechanical connection to further facilitate retaining the blade retention clip 3520 within the blade cavity 3522. The blade retention clip 3520 may allow the blade(s) 140 to be loaded/inserted from the outside/exterior (front and/or rear) of the blade cartridge 22, for example, during the assembly of the blade cartridge 22.

As described herein, a blade cartridge 22 consistent with at least one embodiment described herein may include a first and at least a second shaving side 140, 156 each including one or more razor blades 142 (see, for example, FIGS. 5 and 9). In one embodiment, the faces or sides 140, 156 may include identifying indicia to allow a user to identify one face or side from another. For example, the skin engagement strips (SES) and/or the lubrication strips may be colored differently on each respective face or side 140, 156. Alternatively (or in addition), one or more of the razor blades 142 may include indicia to allow a user to identify one face or side from another. For example, one or more of the razor blades 142 may be colored differently on each respective face or side 140, 156.

The second shaving side 156 may be the same as first shaving side 140 in all aspects described herein, albeit inverted relative to first shaving side 140 to facilitate proper orientation when the blade cartridge 22 is rotated 180 degrees. With reference to FIG. 36, the front and/or rear side 140, 156 may include only one set of one or more razor blades 142. Alternatively, the front and/or rear side 140, 156 may include a first and a second set 144, 146 of at least one razor blades 142 arranged to shave in opposite shaving directions D1 and D2 as generally illustrated in FIG. 37. A blade cartridge 22 having at least one razor to cut hair in a first shaving stroke direction D1 and at least one razor to cut hair in a second shaving stroke direction D2 on the same face 140, 156 may be particularly useful for a user that wishes to shave his/her head since the user may move the razor 10 in a “back and forth” motion without having to lift the razor from the area being shaved to begin a new stroke.

For example, a “body” blade dual cartridge combination configuration may feature one or more cartridge sides/faces having two sets 144, 146 (e.g., FIG. 37) of one or more blades 142 (e.g., but not limited to, three blades in each set), wherein first and second sets 144, 146 are arranged in opposing directions of cut D1, D2. The first and second sets 144, 146, of blades 142 may be separated by a lubrication strip 176. This is a particularly useful blade arrangement for consumers that shave their head or any other awkward area of the body, as they can use a "back and forth" shaving stroke motion, without having to lift the razor from the area being shaved to begin a new stroke. Optionally, the second side/face of the cartridge may include one or more blades 142 all arranged in the same direction of cut for conventional shaving (e.g., FIG. 36). This cartridge configuration gives the user great flexibility, as only one device is required to shave any part of their anatomy. One or more of the faces or sides 140, 156 may have a SES at the lower and upper portion of the cartridge 22. This arrangement may be particularly useful for a body blade dual combination as described herein, where the side that has the blades in opposing directions of cut would be the face or side 140, 156 that have the placement of the two SESs.

Turning now to FIGS. 38-45, a further embodiment of a blade cartridge 22 consistent with the present disclosure is generally illustrated. As discussed herein, the blade cartridge 22 may include more than two faces. In the illustrated embodiment, the blade cartridge 22 is shown having a generally triangular cross-section having three faces, namely, a first face 140, a second face 156, and a third face 240, respectively, configured to be rotated about the pivot axis PA. Any of the faces 140, 156, 240 may include any arrangement of razor blades, mirrors, ball bearings, etc. as described herein. While the faces 140, 156, 240 are illustrated having substantially the same dimensions, it should be appreciated that one or more of the faces 140, 156, 240 may be smaller than, or larger than, one or more of the other faces 140, 156, 240. Additionally, it may be appreciated that any of the resistive pivot mechanisms described herein, or any combination, may be modified to allow the blade cartridge 22 to be rotated (e.g., as generally illustrated by arrow H in FIGS. 41-45) to any one of the initial starting positions corresponding to any one of the faces 140, 156, 240 of the blade cartridge 22. For example, FIG. 40 generally illustrates one embodiment of a pivot pin/cylinder 34 consistent with FIG. 14 having three recesses 222A, 222B, and 222C corresponding to the three faces 140, 156, 240. It should be appreciated, however, that this is only one embodiment and that any resistive pivot mechanism described herein may be used with the blade cartridge 22 as shown in FIGS. 38-45.

Turning now to FIG. 46, another view of a razor 10 consistent with the present disclosure is generally illustrated. The razor 10 includes a disposable head assembly 20 comprising a blade cartridge 22 and a blade cartridge support member 24. As shown, blade cartridge support member 24 comprises a generally U-shaped cartridge support frame 26. U-shaped cartridge support frame 26 comprises two generally curved support arms 30. For example, the support arms 30 may have a generally C-shape or L-shape.

To facilitate pivotable attachment of blade cartridge 22 to the blade cartridge support member 24 and subsequent use thereof, the blade cartridge 22 and the blade cartridge support member 24 may include one or more hinges or pivot assemblies 3 that allows the blade cartridge 22 to rotate about a pivot axis PA (e.g., about a direction generally perpendicular to the longitudinal axis L of the handle 60.) As described herein and generally illustrated in FIGS. 47-49, the hinge or pivot assembly 3 may be configured to allow the blade cartridge 22 to rotate (e.g., in the direction of arrow W) approximately 180 degrees about pivot axis PA such that a front side 140 and rear side 156 of the blade cartridge 22 may be used. According to one embodiment, the hinge or pivot assembly 3 may be configured to allow the blade cartridge 22 to rotate approximately 360 degrees about pivot axis PA.

Referring back to FIG. 46, the hinge or pivot assembly 3 may include a pivot receptacle 32 disposed in each support arm 30 of the blade cartridge support member 24 (e.g., but not limited to, a distal section 40 of the support arms 30), each of which receives a pivot pin/cylinder located on opposing lateral sides of the blade cartridge 22. The pivot pins/cylinders may extend generally outwardly from the lateral sides of the blade cartridge 22. With the foregoing arrangement, the blade cartridge 22 is arranged between the support arms 30 and supported by each support arm 30 at a pivot connection (assembly), and the blade cartridge 22 is able to rotate about the pivot axis PA at any angle, up to and including 360° degrees. It should be appreciated that the location of one or more of the pivot receptacles 32 and the pivot pins may be switched (e.g., one or more of the pivot receptacles 32 may be located in the blade cartridge 22 and one or more of the pivot pins may extend outwardly from the support arms 30 of the blade cartridge support member 24). Additionally, a portion of one or more of the support arms (e.g., but not limited to, the distal section 40) may be at least partially received in one or more hub recesses or pivot receptacles 32 disposed in the lateral sides of the blade cartridge 22 as generally illustrated. Alternatively, it should be appreciated that a portion of one or more of the pivot pin/cylinders may be at least partially received in one or more recesses/hubs disposed in support arms 30 (e.g., but not limited to, the distal section 40 of the support arms 30).

In order to cushion use of blade cartridge 22 while shaving, one or more of the support arms 30 may include a cushioning mechanism 38. As shown, a second (distal) section of each support arm 30 is configured to slide within a receptacle (e.g., a slotted recess) of a first (proximal) section 44 of each support arm 30. Each receptacle may include a compression (e.g., coil) spring or biasing device disposed therein. Alternatively (or in addition), first section 44 may include a cushioning mechanism 38. In particular, the cushioning mechanism 38' (see, for example, FIG. 50) is configured to allow the first section 44 (e.g., an arm fin or the like, 87) to slide (e.g., generally in the direction of arrow Q) within a receptacle (e.g., a slotted recess) of support hub 50. Each receptacle may include a compression (e.g., coil) spring or biasing device 46 disposed therein.

In the foregoing manner, the biasing device of the cushioning mechanisms 38 may compress in response to a downward force placed on blade cartridge 22, with such compression biasing against the downward force. In doing so, such compression may absorb/dampen the downward force to cushion use of the blade cartridge 22. Furthermore, since the cushioning mechanisms 38 of each support arm 30 is independent of one another, the cushioning mechanism 38 may enable each lateral end of the blade cartridge 22 to move and/or be cushioned independently. It should be understood that in other embodiments of shaving device 10, the blade cartridge support member 24 may not include a cushioning mechanism 38.

Referring now to FIGS. 47 and 50, the head assembly 20 may be selectively detachably connectable to the handle 60 by the user. As may be appreciated, any mechanism for selectively coupling the blade cartridge support member 24 to the handle 60 may be used. The blade cartridge support member 24 may include a support hub 50 (e.g., as shown in FIG. 50), which may be centrally disposed between the two support arms 30. The support hub 50 includes a mechanical connection element 52 which mechanically connects the blade cartridge support member 24 to a mechanical connection element 64 of elongated shaft 62 of handle 60 (e.g., as generally illustrated in FIG. 1A).

For example, as shown by FIG. 50, one embodiment of a connection element 52 of the blade cartridge support member 24 comprises a rectangular (e.g., square) shank 54 which is configured to fit within a corresponding recess 66 (e.g., rectangular and/or square recess) of connection element 64 of handle 60. In order to provide a positive mechanical connection, rectangular shank 54 includes a plurality of deformable (cantilevered) and/or spring loaded engagement tabs 56 which engage within engagement apertures 68 and fixes (e.g., locks) the position of the head assembly 20 relative to the handle 60. The deformable (cantilevered and/or spring loaded) engagement tabs 56 may, in one embodiment, be configured to be moved out of engagement with the engagement apertures 68 upon depressing of an actuation button 100 (e.g., as shown in FIGS. 47-49). Alternatively, the engagement tabs 56 may be pressed inwardly manually by the user, for example, using his/her thumbs and/or fingers of each hand respectively.

Once the engagement tabs 56 are engaged within the engagement apertures 68, the head assembly 20 and handle 60 may be generally inhibited from separating from one another. Thereafter (e.g., after the useful life of the blade cartridge 22), the head assembly 20 and handle may be detached from one another by depressing the engagement tabs 56 inward (e.g., manually using the user's fingers and/or by depressing a button or the like disposed on the handle 60 and/or the disposable head assembly 20) out of engagement with the engagement aperture 68, and pulling the shank 54 of the blade cartridge support member 24 out of the recess 66 of the handle 60. The used head assembly 20/blade cartridge 22 may then be replaced with a fresh head assembly 20/blade cartridge 22. Thus, as may be understood the head assembly 20 is selectively detachably connectable to the handle 60 by the user.

Although the shank 54 and recess 66 are shown as part of the blade cartridge support member 24 and the handle 60, respectively, it should be appreciated that the arrangement of the shank 54 and recess 66 may be switched (e.g., the shank 54 and recess 66 may be part of the handle 60 and the blade cartridge support member 24, respectively, see, for example, FIG. 5). Additionally (or alternatively), while the deformable (cantilevered or spring loaded) engagement tabs 56 and the engagement apertures 68 are shown as part of the shank 54 and recess 66, respectively, it should be appreciated that the arrangement of the deformable (cantilevered or spring loaded) engagement tabs 56 and the engagement apertures 68 may be switched (e.g., the deformable (cantilevered or spring loaded) engagement tabs 56 and the engagement apertures 68 may be part of the recess 66 and the shank 54, respectively). Again, it should be appreciated that the connection element 52 is not limited to arrangement illustrated and/or described herein unless specifically claimed as such, and that any connection element 52 that allows a user to selectively releasably couple the head assembly 20 to the handle 60 may be used.

Turning now to FIGS. 46, 51, and 52, another embodiment of the razor 10 having a hinge 74 is generally illustrated. While the razor 10 of FIGS. 25-27 may be used with any blade cartridge known to those skilled in the art, the razor 10 of FIGS. 25-27 may be particularly useful with a blade cartridge 22 having at least one face 140 with at least one razor 142 aligned to cut in a first shaving direction D1 and at least one razor 142 aligned to cut in a second shaving direction D2 (e.g., but not limited to, the blade cartridge 22 as generally illustrated in FIG. 37).

The hinge 74 may be configured to allow the head assembly 20 to rotate from the position generally illustrated in FIG. 46 to the position generally illustrated in FIGS. 51 and 52. The handle 60 may include a first (proximal) shaft portion 75 (FIGS. 51-52) coupled to a second (distal) shaft portion 77 by way of one or more hinges 74. The hinge 74 may include any hinge mechanism known to those skilled in the art, and may include, for example, a locking mechanism (e.g., but not limited to, a locking pawl, ratchet mechanism, or the like) configured to allow the user to generally lock or fix the relative position of the first shaft portion 75 relative to the second shaft portion 77 (e.g., the head assembly 20 relative to the handle 60).

For example, the hinge 74 may be configured to allow the first shaft portion 75 to swing approximately 90 degrees generally along the direction of arc S from the position shown in FIG. 46 to the position shown in FIGS. 51 and 52. It may be appreciated that the hinge 74 allows the first shaft portion 75 to swing in a direction (e.g., plane or axis) that is generally perpendicular to cutting edge axis CE (not shown for clarity) of the cutting edge of one or more of the razor blades 142 of the head assembly 20 when the razor 10 is in the position illustrated in FIG. 47.

The handle 60 (e.g., the first shaft portion 75) and/or the support hub 50 may optionally include a swivel or pivot 177 configured to allow the user to swivel or rotate the blade cartridge 22 approximately 90 degrees (e.g., as indicated by arrow E in FIGS. 51 and 52) in an axis that is generally parallel to the longitudinal axis of the first shaft portion 75 and/or the support hub 50 such that the cutting edge axis CE of the cutting edge of one or more of the razor blades 142 of the head assembly 20 is aligned generally parallel to the longitudinal axis of the handle 60 as generally illustrated in FIGS. 51 and 52. The swivel 177 may include any swivel or pivot mechanism known to those skilled in the art, and may include, for example, a locking mechanism (e.g., but not limited to, a locking pawl, ratchet mechanism, or the like) configured to allow the user to generally lock of fix the relative position of the blade cartridge 22 relative to the first shaft portion 75 and/or support hub 50.

Alternatively, the user may manually detach the head assembly 20 from the handle 60 and rotate the head assembly 20 to the desired position as shown. For example, the connection between the head assembly 20 and the handle 60 may be configured to allow the head assembly to be aligned in two or more different orientations relative to the handle 60. By way of a non-limiting example, the connection between the head assembly 20 and the handle 60 may be generally symmetrical, for example, generally circular and/or square.

A razor 10 having a hinge 74 and swivel 177 as described above may be particularly useful for shaving a user's head and/or body. In particular, having the cutting edge axis CE of the cutting edge 151 of one or more of the razor blades 142 of the head assembly 20 aligned generally parallel to the longitudinal axis L of the handle 60 as generally illustrated in FIGS. 51 and 52 may facilitate shaving a user's head and/or body compared with having the cutting edge axis CE of the cutting edge of the razor blades 142 aligned generally perpendicular to the longitudinal axis L of the handle 60 as generally illustrated in FIG. 46.

The blade cartridge 22 in FIGS. 46, 51 and 52 may optionally include any hinge and/or resistive pivot mechanism described herein to allow the blade cartridge 22 to rotate about the pivot axis PA (e.g., as generally illustrated by arrow T). While not a limitation of the present disclosure unless specifically claimed as such, the blade cartridge 22 may include any of the resistive pivot mechanisms described in FIGS. 11-17. The resistive pivot mechanisms described in FIGS. 11-17 may be particularly suited for use with the hinge 74 and swivel 177 since they do not include the biasing pin 92. As such, the blade cartridge 22 may be located closer to the second shaft portion 77 when arranged in the position shown in FIGS. 51 and 52.

As discussed herein, a razor 10 having a hinge 74 and swivel 177 may be used with any blade cartridge 22 described herein. By way of a non-limiting example, a razor 10 having a hinge 74 and swivel 177 with a blade cartridge having three faces (i.e., a first face 140, a second face 156, and a third face 240) is generally illustrated in FIG. 53.

With reference to FIGS. 51-53, the razor 10 (and in particular, the blade cartridge 22) may optionally include one or more (e.g., a plurality) of wash-out apertures 102. The wash-out apertures 102 may be disposed along one or more of the edge faces 104 of the blade cartridge 22, and may be configured to generally prevent the blade cartridge 22 from clogging with hair and/or shaving cream during the shaving process. In particular, the wash-out apertures 102 may allow hair and/or shaving cream to "wash through" the wash-out apertures 102 by rinsing the blade cartridge 22 with water.

Turning now to FIG. 54, one embodiment of a head assembly 20 including a resistive swing mechanism 540 is generally illustrated. The head assembly 20 includes one or more arms that are rotatably coupled to the support hub 50. The resistive swing mechanism 540 may include one or more biasing devices (e.g., but not limited to, a spring or the like) configured to urge one or more of the arms 30 in a direction generally opposite to arrow W. In use, the user may apply a force generally in the direction of arrow W while shaving and the resistive swing mechanism 540 may allow the blade cartridge 22 to swing in the direction of arrow W. It should be appreciated that while the arms 30 are illustrated moving/swinging relative to the support hub first section 44 of the arms 30 may be stationary relative to the support hub 50 and second section 40 of the arms 30 may be biased as described herein to allow the blade cartridge 22 to swing in the direction of arrow W. Alternatively (or in addition), the resistive swing mechanism 540 may be incorporated into the hinge pin 76, for example, as generally illustrated in FIGS. 47-49. As such, the head assembly 20 may be biased generally in the direction opposite of arrow W relative to the handle 60, and the head assembly 20 may move generally in the direction of arrow W relative to the handle 60 when the user applies a force while shaving.

Turning to FIGS. 55-57, another embodiment of a resistive pivot mechanism is generally illustrated. The resistive pivot mechanism may include a blade cartridge pivot biasing mechanism 90 and/or a blade cartridge rotation limiter 35. As explained herein, the blade cartridge pivot biasing mechanism 90 may allow the blade cartridge 22 to rotate both clockwise and counter clockwise about the pivot axis PA relative to the initial starting position. The initial starting position may correspond to a location/orientation/position of the blade cartridge 22 relative to the blade cartridge support member 24 and/or handle 60 when no external forces are applied to the blade cartridge 22. Each face (e.g., face 140, 156) may have a corresponding initial starting position.

The resistive pivot mechanism may create a biasing force which urges the blade cartridge 22 towards an initial starting position. For example, the biasing force created by the blade cartridge pivot biasing mechanism 90 may include a spring force and/or a magnetic force. The magnetic force may be an attractive magnetic force (e.g., a magnetic force causing the blade cartridge 22 to be urged/pulled towards the blade cartridge support member 24 or handle 60) and/or a repelling magnetic force (e.g., a magnetic force causing the blade cartridge 22 to be urged away from the blade cartridge support member 24 or handle 60). The magnetic force (either attractive and/or repelling) may be between (e.g., generated by) two or more magnets having their poles aligned to either create an attractive or repelling force. For example, one or more magnets may be coupled/secured to the blade cartridge 22 and one or more magnets may be coupled/secured to the blade cartridge support member 24.

The magnetic force may be generated between one or more magnets coupled/secured to the blade cartridge 22 and a ferromagnetic material coupled/secured to the blade cartridge support member 24 (it should be appreciated that the arrangement of the magnets and the ferromagnetic material relative to the blade cartridge 22 and blade cartridge support member 24 may also be reversed).

One or more of the magnets may be either permanent magnets and/or electromagnets. It may also be appreciated that when an electromagnet is used, the current may be adjusted to selectively change the orientation of the resulting magnetic field.

With reference to FIG. 55, one embodiment of a blade cartridge pivot biasing mechanism 90 that creates a magnetic biasing force to urge the blade cartridge 22 towards the initial starting position is generally illustrated. In the illustrated embodiment, the blade cartridge pivot biasing mechanism 90 comprises at least one magnet **99*a* located in the blade cartridge 22 (which may be referred to as a blade cartridge magnet 99*a*) and at least one magnet 99*b* located in the blade cartridge support member 24 (which may be referred to as a blade cartridge support member magnet 99*b*). One or more of the blade cartridge magnet(s) 99*a* and/or the blade cartridge support member magnet(s) 99*b*** may be permanent magnets and/or electromagnets. The power source (e.g., one or more batteries or the like) for the electromagnet is not shown for clarity.

As shown, one or more blade cartridge magnets **99*a* may be located within the blade cartridge frame 188. For example, one or more blade cartridge magnets 99*a* may extend longitudinally along an axis generally parallel to the pivot axis PA of the blade cartridge frame 188. In particular, one or more blade cartridge magnets 99*a* may be disposed along outer longitudinal regions 157, 159 of the blade cartridge frame 188 (e.g., adjacent blades 142), which may be further understood to be the front edge region 157 and the rear/aft edge region 159** relative to cutting direction as explained herein.

In addition to, or as an alternative to being located in the outer longitudinal region(s) 157, 159 of the blade cartridge frame 188, one or more blade cartridge magnets(s) **99*a* may be located in one or both of the outer lateral regions 161, 163 of the blade cartridge frame 188 of the blade cartridge 22. The blade cartridge magnet(s) 99*a* may be fully encapsulated within the blade cartridge frame 188 (i.e. not visible) or may have one or more exposed surfaces on the blade cartridge frame 188**.

When one or more blade cartridge magnets **99*a* are located in the outer longitudinal region 157, 159 of the blade cartridge frame 188, one or more cooperating blade cartridge support member magnets 99*b* may be located in a portion of the blade cartridge support member 24 which is opposed beneath the outer longitudinal region 157, 159 of the blade cartridge frame 188 when the blade cartridge 22 is in its use position. More particularly, the blade cartridge support member magnet 99***b* may be located in the base 45 of the yoke 47 of the blade cartridge support member 24, which may include a proximal section 44 of at least one of the support arms 30.

Alternatively, or in addition to the above, when one or more blade cartridge magnets 99*a* are located in the outer lateral region 161, 163 of the blade cartridge frame 188, one or more cooperating blade cartridge support member magnets 99*b* may be located in a corresponding distal section 40 of at least one of the support arms 30.

As explained in greater detail below, the magnetic fields generated by the blade cartridge magnet(s) 99*a* and blade cartridge support member magnet(s) 99*b* may create an attractive and/or repelling biasing force that urges the blade cartridge 22 towards the initial starting position. The magnetic biasing force may urge the blade cartridge 22 towards the initial starting position as long as the blade cartridge 22 is within a range of predetermined pivot angles θ, and more particularly at an intermediate pivot angle θ in a middle of the range of predetermined pivot angles, as shown in FIG. 56.

With respect to operation, as best shown in FIG. 56, the cooperating blade cartridge magnet(s) 99*a* and blade cartridge support member magnet(s) 99*b* are arranged such that the polarity of their respective magnetic fields, as shown by their north poles N and south poles S, are either attracted and/or repelling to each other over a range of predetermined pivot angles, with the interaction of the attractive and/or repelling magnetic fields increasing towards a maximum level at the intermediate pivot angle θ in a middle of the range of predetermined pivot angles θ (e.g., generally corresponding to the initial starting position).

As shown, the range of pivot angles θ, as well as the intermediate pivot angle θ where the force of the attracting and/or repelling magnetic fields is at its greatest level, may be determined by the angle formed between the front face 140 of the blade cartridge 22 and a longitudinal axis of the longitudinal axis L of the handle 60 of the shaving device 10.

Thus, it should be understood that the cooperating blade cartridge magnet(s) 99*a* and blade cartridge support member magnet(s) 99*b* are arranged such that the magnetic interaction between the interacting (attracting and/or repelling) magnetic fields of the cooperating blade cartridge magnet(s) 99*a* and blade cartridge support member magnet(s) 99*b* varies with a rotation of the blade cartridge 22 and a rotational position of the blade cartridge 22.

Furthermore, it should also be understood, that when the cooperating blade cartridge magnet(s) 99*a* and blade cartridge support member magnet(s) 99*b* are arranged such that there is a magnetic interaction between the attracting and/or repelling magnetic fields of the cooperating blade cartridge magnet(s) 99*a* and blade cartridge support member magnet(s) 99*b*, the force of the interacting (attracting and/or repelling) magnetic fields will rotate the blade cartridge 22 towards the intermediate pivot angle θ in a middle of the range of predetermined pivot angles θ, i.e. to a position where the blade cartridge magnet(s) 99*a* and blade cartridge support member magnet(s) 99*b* are aligned (e.g., fully aligned) with one another and the interaction of the magnetic fields is at its greatest force (e.g., the initial starting position), absent any overriding biasing force.

Referring now to FIG. 57, shaving device 10 may optionally include a blade cartridge rotation limiter 35. Blade cartridge rotation limiter 35 allows the user to rotate the blade cartridge 22 about the pivot axis PA to select one of a plurality of sides/faces 140, 156, and that allows the blade cartridge 22 to rotate within a predefined rotation range while at the selected blade/face position during normal use of the razor to conform to the user's skin contours.

Blade cartridge rotation limiter 35 may include at least one pawl 220 configured to extend generally upward from arm 30. The pivot pin/cylinder 34 of blade cartridge 22 may include a plurality of recesses 222 configured to receive a distal end 224 of the pawl 220. The location of the recesses 222 may each correspond to one of the plurality of faces 140, 156 of the blade cartridge 22. When the distal end 224 of the pawl 220 is engaged in recess 222, each recess 222 may allow the blade cartridge 22 to rotate in a range of 1 to 90 degrees, and more particularly in a range of 2 to 45 degrees, and even more particularly in a range of 5 to 30 degrees.

The pawl 220 may be located at the end of a slidable thumb switch release 28 (FIG. 57), which is biased by upward (engagement) by a spring 29. Slidable thumb switch release 28 may be depressed downward against the bias of spring 29 to remove the distal end 224 of the pawl 220 from recess 222 to rotate blade cartridge 22 outside the confines and limitations of recess 222. After being retracted, the slidable thumb switch release 28 may be released, and the distal end 224 of the pawl 220 may enter a different recess 222 corresponding to another face (e.g., 140, 156) of the blade cartridge 22 after rotation of the blade cartridge 22 thereto. The size of the recess 222 and the pawl 220 will therefore determine the range of rotation corresponding to each face (e.g., 140, 156) of the blade cartridge 22.

In the foregoing embodiment, pawl 220 and more particularly distal end 224, may be rigid and non-deformable. However, in an alternative embodiment, at least the distal end 224 of the pawl 220 may be resiliently deformable and slidable thumb switch release 28 may be eliminated. In such embodiment, pawl 220 and more particularly distal end 224, may be disengaged from recess 222 by deformation of the pawl 220 with a rotation force applied to the blade cartridge 22.

It should also be appreciated that while the recess 222 is illustrated as being part of the blade cartridge 22 and the pawl 220 is illustrated as being coupled to the blade cartridge support member 24, the orientation of these components may be reversed.

It should be appreciated that the blade cartridge pivot biasing mechanism 90 of FIGS. may be incorporated into any resistive pivot mechanism described herein. For example, the blade cartridge pivot biasing mechanism 90 of FIGS. 55-57 may be combined within any blade cartridge rotation limiter 35 described herein.

Turning now to FIGS. 58-64, yet another embodiment of a resistive pivot mechanism is generally illustrated. With reference to FIG. 58, the resistive pivot mechanism may include a blade cartridge pivot biasing mechanism 90 configured to apply a magnetic biasing force to urge the blade cartridge 22 towards the initial starting position while allowing the blade cartridge 22 to rotate clockwise and counter clockwise about the pivot axis PA, and/or a blade cartridge rotation limiter 35 to allow the blade cartridge 22 to rotate within a predefined range from the initial starting position.

Turning now to FIGS. 59A and 60, a partially transparent view of the blade cartridge pivot biasing mechanism 90 and blade cartridge rotation limiter 35 is generally illustrated in which the blade cartridge support member 24 is partially transparent. Similar to the embodiment of FIGS. 55-57, the blade cartridge pivot biasing mechanism 90 of FIGS. 58-64 features a plurality of magnets 99*a*, 99*b* that are arranged such that the magnetic fields cause the blade cartridge 22 to be biased towards the initial starting position. Additionally, blade cartridge rotation limiter 35 of FIGS. 58-64 features one or more detents, pawls (e.g., resiliently deformable pawls), and/or recesses on the blade cartridge 22 and/or the blade cartridge support member 24 that are configured to generally limit the rotation of the blade cartridge 22 within a predefined range of rotation relative to the initial starting position and/or to provide an indication to the user that another face (e.g., 140 or 156) of the blade cartridge 22 is being selected.

With continued reference to FIGS. 59-60 as well as FIGS. 61-62, one embodiment of the blade cartridge support member 24 is generally illustrated. The blade cartridge support member 24 includes one or more blade cartridge support member magnets 99*b* coupled to one or more of the support arms 30. The blade cartridge support member magnets 99*b* may be placed anywhere on the blade cartridge support member 24 such as, but not limited to, generally below or above the pivot axis PA/pivot receptacles 32. While the blade cartridge support member magnets 99*b* are generally illustrated having a generally cylindrical shape, it should be appreciated that the blade cartridge support member magnets 99*b* may have other shapes. For example, the blade cartridge support member magnets 99*b* may have a generally arcuate shape that generally extends along a rotation radius from pivot axis PA that generally corresponds to the distance (i.e., radius) of the blade cartridge magnet 99*a* from the pivot axis PA as described herein. Additionally, while only one blade cartridge support member magnet 99*b* is shown coupled to each arm 30, one or more arms 30 may have a plurality of blade cartridge support member magnets 99*b* or no blade cartridge support member magnets 99*b*.

The blade cartridge support member 24 may also optionally include one or more detents, pawls, and/or recesses 6102 that engage with corresponding elements of the blade cartridge 22 to generally limit the rotation of the blade cartridge 22 within a predefined range of rotation relative to the initial starting position and/or to provide an indication to the user that another face (e.g., 140 or 156) of the blade cartridge 22 is being selected. In the illustrated embodiment, the blade cartridge support member 24 is shown having one detent 6102 extending generally outwardly from each support arm 30. The detent 6102 may be resiliently deformable or generally rigid. While each support arm 30 is shown having one detent 6102, it may be appreciated that one or more of the support arms 30 may include a plurality of detents 6102 or no detents 6102. Additionally, it should be appreciated that one or more of the support arms 30 may include one or more recesses and/or pawls configured to engage with a detent, pawl, or recess on the blade cartridge 22.

With continued reference to FIGS. 59-60 as well as FIGS. 63-64, one embodiment of the blade cartridge 22 is generally illustrated. The blade cartridge 22 includes one or more blade cartridge magnets 99*a* coupled thereto. For example, the blade cartridge 22 may include one or more (e.g., a plurality) of blade cartridge magnets 99*a* coupled to one or more lateral ends of the blade cartridge 22. The blade cartridge magnets 99*a* may be arranged about the pivot axis PA, for example, about the pivot pin/cylinders 34, and may be disposed a distance (e.g., radius) from the pivot axis PA such that the blade cartridge magnets 99*a* and the blade cartridge support magnets 99*b* are generally aligned at generally the same distance (radius) from the pivot axis PA. The magnets 99*a*, 99*b* may also be aligned such that the separation distance $D_{sep}$ (FIG. 59A) between the blade cartridge magnets 99*a* and the blade cartridge support magnets 99*b* is generally minimized when the magnets 99*a*, 99*b* are aligned and generally facing each other. Aligning the magnets 99*a*, 99*b* such that the radius from the pivot axis PA is generally the same may enhance the biasing force of the magnets 99*a*, 99*b*, thereby increasing the biasing force urging the blade cartridge 22 towards the initial starting position.

While the blade cartridge 22 in FIGS. 63 and 64 is illustrated having four blade cartridge magnets 99*a* on each end, it should be appreciated that this is an illustrative example and that the blade cartridge 22 may have greater than or less than four blade cartridge magnets 99*a*. Additionally, one or more of the blade cartridge magnets 99*a* may have a generally arcuate shape having a radius that generally corresponds to the distance (e.g., radius) of the blade cartridge support magnets 99*b* from the pivot axis PA. Moreover, while the blade cartridge support member 24 in FIGS. 61 and 62 is illustrated having one blade cartridge support member magnet 99*b* on each arm 30, it should be appreciated that this is an illustrative example and that the blade cartridge support member 24 may have greater than or less than one blade cartridge support member magnet 99*b* on each arm 30 (e.g., only one arm 30 may include one or more blade cartridge support member magnet 99*b* or both arms may include at least one blade cartridge support member magnet 99*b*).

As discussed herein, the blade cartridge magnets 99*a* and the blade cartridge support member magnets 99*b* may be arranged to bias the blade cartridge towards an initial starting position. The blade cartridge magnets 99*a* and the blade cartridge support member magnets 99*b* may therefore be arranged in any manner to achieve this effect. For example, FIGS. 59B, 59C, and 59D generally illustrate various embodiments of possible arrangements of the blade cartridge magnets 99*a* and the blade cartridge support member magnets 99*b*, along with possible alignments of the various poles of the blade cartridge magnets 99*a* and the blade cartridge support member magnets 99*b*. It should be appreciated that this is provided for illustrative purposes only, and that the present disclosure is not limited to a particular arrangement of the blade cartridge magnets 99*a* and the blade cartridge support member magnets 99*b* unless specifically claimed as such.

The blade cartridge 22 may also optionally include one or more detents, pawls, and/or recesses 6302 that engage with corresponding detents, pawls, and/or recesses 6102 of the blade cartridge support member 24 to generally limit the rotation of the blade cartridge 22 within a predefined range of rotation relative to the initial starting position and/or to provide an indication to the user that another face (e.g., 140 or 156) of the blade cartridge 22 is being selected.

In the illustrated embodiment, the blade cartridge 22 is shown having one or more detents 6302 extending generally outwardly from one or more lateral ends of the blade cartridge 22. The detents 6302 may be arranged about the pivot axis PA, for example, about the pivot pin/cylinders 34, and may be disposed a distance (e.g., radius) from the pivot axis PA such that the detents 6302 of the blade cartridge 22 and the detent 6102 of the blade cartridge support member 24 are generally aligned at generally the same distance (radius) from the pivot axis PA. The detents 6102, 6302 may extend outwardly from blade cartridge support member 24 and the blade cartridge 22, respectively, such that detents 6102, 6302 generally interfere with each as the blade cartridge 22 is rotated about the pivot axis PA. For example, the detents 6102, 6302 may generally contact each other as the blade cartridge 22 is rotated about the pivot axis PA. The contact of the detents 6102, 6302 may generally inhibit further rotation of the blade cartridge 22 in the clockwise and/or counter clockwise direction.

For example, two detents 6302*a*, 6302*b* may be aligned on generally opposite sides of the pivot axis PA (e.g., generally 180 degrees apart from each other). Aligning the detents 6302*a*, 6302*b* 180 degrees apart from each other will generally allow the blade cartridge 22 to rotate approximately 90 degrees in each direction (e.g., clockwise and counter clockwise) from the initial starting position. It should be appreciated that the number of and alignment of the detents 6302 may be selected to allow the blade cartridge 22 to rotate within any predefined range. By way of example, additional detents 6302 may be arranged less than 180 degrees from each (e.g., less than 90 degrees from the initial starting position) to allow the blade cartridge 22 to rotate less than 90 degrees from the initial starting position.

According to one embodiment, the detents 6102, 6302 may be generally rigid. As such, contact between the detents 6102, 6302 will generally prevent further rotation of the blade cartridge 22 without application of a face selection force. As used herein, a face selection force is defined as an amount of force in excess of the normal force applied to the blade cartridge 22 during normal shaving. To rotate the blade cartridge 22 beyond the predefined rotation range to select a different face (e.g., 140 or 156), the user may apply a face selection force to the blade cartridge 22 that may cause one or more of the support arms 30 of the blade cartridge support member 24 to deflect outwardly and increase the separation distance D sep between the blade cartridge 22 and the blade cartridge support member 24, thereby allowing the detents 6302 of the blade cartridge 22 to rotate past the detents 6102 of the blade cartridge support member 24. Once the detents 6302 of the blade cartridge 22 past beyond the detents of the blade cartridge support member 24, the resistive force applied by the blade cartridge support member 24 against the blade cartridge 22 will significantly decrease, thereby indicating to the user that another face (e.g., 140, 156) has been selected. The face selection force may be selected such that user will have to deliberately apply the necessary force to select a face so that another face cannot be selected accidentally during normal shaving use.

It should be appreciated that while the blade cartridge 22 and blade cartridge support member 24 are shown having two detents 6302 and one detent 6102 on each end, respectively, the number and arrangement of the detents 6302, 6102 may be switched and/or changed depending on the intended application.

Additionally, it should be appreciated that while the detents 6302, 6102 have been described as being rigid, one or more of the detents 6302, 6102 may be resiliently deformable. In such an arrangement, the support arms 30 may be generally rigid (i.e., the support arms 30 do not have to deflect in order to select another face).

Moreover, it should be appreciated that one or more of the detents 6302, 6102 may be replaced with a recess and/or a pawl. By way of a non-limiting example, the detents 6302 on the blade cartridge 22 may be replaced with a recess, and a detent 6102 on the blade cartridge support member 24 may be received within the recess. The length of the recess may generally correspond to the desired predefined range of rotation about the pivot axis PA. To select another face, the user will apply a face selection force that either deforms the detent 6102 and/or deflects the support arms 30. Of course, the detent 6102 on the blade cartridge support member 24 may be replaced with a recess and the detent 6302 on the blade cartridge 22 may be received within the recess. Alternatively, in case, one or more of the detents 6302, 6102 may be replaced with a pawl (e.g., a resiliently deformable pawl) that engages a corresponding recess on the blade cartridge 22 and/or blade cartridge support member 24. Moreover, one or more of the detents 6302, 6102 may engage a corresponding pawl (e.g., resiliently deformable pawl) on the blade cartridge 22 and/or blade cartridge support member 24.

It should further be appreciated that the blade cartridge pivot biasing mechanism 90 of FIGS. 58-64 may be incorporated into any resistive pivot mechanism described herein. For example, the blade cartridge pivot biasing mechanism 90 of FIGS. 58-64 may be combined within any blade cartridge rotation limiter 35 described herein. Moreover, the blade cartridge rotation limiter 35 of FIGS. 58-64 may be used with any blade cartridge pivot biasing mechanism 90 described herein. While the magnets 99*a*, 99*b* are shown on the lateral ends of the blade cartridge 22 and the support arms 30 of the blade cartridge support member 24, it should be appreciated that the magnets 99*a*, 99*b* may be disposed in the front edge region 157 and a rear/aft edge region 159 as well as in the yoke region 47 (e.g., as generally illustrated in FIGS. 55-57).

It should also be further appreciated that while the cartridge pivot biasing mechanism 90 is shown having both blade cartridge magnets 99*a* and blade cartridge support member magnets 99*b*, either of these magnets 99*a*, 99*b* may be eliminated and replaced with a ferromagnetic element such that the remaining magnet 99*a* or 99*b* will generate an attractive magnetic biasing force urging the blade cartridge 22 towards the initial starting position.

Turning now to FIGS. 65-69, a further embodiment of a resistive pivot mechanism is generally illustrated. The resistive pivot mechanism may include a blade cartridge pivot biasing mechanism 90 and/or a blade cartridge rotation limiter 35. As explained herein, the blade cartridge pivot biasing mechanism 90 may allow the blade cartridge 22 to rotate both clockwise and counter clockwise about the pivot axis PA relative to the initial starting position. The initial starting position may correspond to a location/orientation/position of the blade cartridge 22 relative to the blade cartridge support member 24 and/or handle 60 when no external forces are applied to the blade cartridge 22. Each face (e.g., face 140, 156) may have a corresponding initial starting position.

The cartridge pivot biasing mechanism 90 may include any cartridge pivot biasing mechanism 90 described herein. In the embodiment illustrated in FIGS. 65-69, the cartridge pivot biasing mechanism 90 includes one or more magnets 99*a* and/or 99*b* configured to create a magnetic biasing force as described herein. Thus, for the sake of brevity, the details of the cartridge pivot biasing mechanism 90 will not be described in further detail.

With continued reference to FIG. 65 as well as FIGS. 66-67, one embodiment of the blade cartridge support member 24 is generally illustrated. The blade cartridge support member 24 may include one or more biased pawls or pins 6602. The biased pawls or pins 6602 may include a cylinder 6604 and a pin 6606 biased, for example, by a spring, pneumatic pressure, or the like. The cylinder 6604 may be separate from the blade cartridge support member 24 or integral (e.g., the cylinder 6604 may be formed by the support arms 30). The pin or pawl 6606 may be biased to extend outwardly from the cylinder 6604. While each support arm 30 is illustrated with a biased pawl/pin 6602, it may be appreciated that each support arm 30 may have more than one biased pawl/pin 6602 or no biased pawl/pin 6602.

With continued reference to FIG. 65 as well as FIGS. 67-69, one embodiment of the blade cartridge 22 is generally illustrated. The blade cartridge 22 may include one or more cams or recesses 6802 corresponding to each face (e.g., 140, 156) of the blade cartridge 22. The cam or recess 6802 may be coupled to one or more of the pivot pin/cylinders 34. The cam or recess 6802 may be configured to receive and/or engage the pin or pawl 6606 of the biased pawl/pin 6602. The contour and/or length of the cams or recesses 6802 and the pin/pawl 6606 may determine the predefined rotation range for the blade cartridge 22. For example, the pin/pawl 6606 may be received in and engage a contoured surface (e.g., cam surface) such that the blade cartridge 22 may rotate with relative ease within the predefined rotation range during normal shaving use. To rotate the blade cartridge 22 to select another face (e.g., 140, 156), the user may apply a face selection force to the blade cartridge 22. The face selection force may be sufficient to cause the pin/pawl 6606 to be retracted against the force of the biasing mechanism within the cylinder 6604 (e.g., spring or the like) such that the pin/pawl 6606 may disengage the cam or recess 6802. As the user continues to rotate the blade cartridge 22, the pin/pawl 6606 will engage another cam/recess 6802 corresponding to the selected face (e.g., 140, 156). It should be appreciated that the arrangement of the biased pawl/pins 6602 and the cams 6802 may be switched.

Turning now to FIGS. 70-76, a further embodiment of a resistive pivot mechanism is generally illustrated. The resistive pivot mechanism may include a blade cartridge pivot biasing mechanism 90 and/or a blade cartridge rotation limiter 35. As explained herein, the blade cartridge pivot biasing mechanism 90 may allow the blade cartridge 22 to rotate both clockwise and counter clockwise about the pivot axis PA relative to the initial starting position. The initial starting position may correspond to a location/orientation/position of the blade cartridge 22 relative to the blade cartridge support member 24 and/or handle 60 when no external forces are applied to the blade cartridge 22. Each face (e.g., face 140, 156) may have a corresponding initial starting position.

With reference to FIG. 70, one embodiment of head assembly 20 is generally illustrated in which the blade cartridge 22 is shown in cross-section with parts removed. The blade cartridge 22 is coupled to an axle 7002 by way of a detent plate 7004 that engages one or more cams 7006 of the axle 7002. The axle 7002 is biased clockwise and/or counter-clockwise about the pivot axis PA by way of one or more biasing devices (e.g., one or more springs including, but not limited to, one or more torsion springs 7008 that are coupled to one or more support arms 30 of the blade cartridge support member 24 as generally illustrated in FIGS. 71-73). For example, one or more of the support arms 30 may include a cavity, groove, or the like to receive at least a portion of one or more springs 7008. In particular, at least two springs 7008 may be at least partially wound around a portion of the axle 7002 and may engage against one or more arms/ears 7010 (e.g., FIG. 71) extending outwardly from one or more of the cams 7006 to urge the arms/ears and the cams 7006 clockwise or counter-clockwise, respectively, about the pivot axis PA. Because the cams 7006 are coupled to the axle 7002, and the axle 7002 is coupled to the blade cartridge 22 through the detent plate 7004, the springs 7008 thereby urge the blade cartridge 22 either clockwise or counter-clockwise about the pivot axis PA relative to an initial starting position.

The detent plate 7004 is coupled/secured to the frame of the blade cartridge 22. As noted above, the detent plate 7004 couples the blade cartridge 22 to the axle 7002. In particular, the detent plate 7004 (FIGS. 74-76) includes one or more resiliently deformable detents 7402 that engage against cam surfaces 7102 (best seen in FIG. 71) of the cams 7006 to releasably couple the detent plate 7004 (and thus the frame of the blade cartridge 22) to the cams 7006, and thus releasably couple the frame of the blade cartridge 22 to the axle 7002.

To select another face, the user may apply a face selection force to the blade cartridge 22 to urge the blade cartridge 22 either clockwise or counter-clockwise. As the blade cartridge 22 rotates, the springs 7008 will apply a resistive force. Once resistive force of the springs exceeds the clamping force of the resiliently deformable detents 7402, the resiliently deformable detents 7402 will disengage from the cam surface 7102, thereby allowing the detent plate 7004 (and thus the frame of the blade cartridge 22) to rotate relative to the cams 7006 and the axle 7002. As the user continues to rotate the blade cartridge 22 around the cams 7006 and axle 7002, the resiliently deformable detents 7402 will engage against the cam surface in an alignment corresponding to the selected face (e.g., 140, 156). For example, the user may rotate the blade cartridge 22 approximately 180 degrees once the resiliently deformable detents 7402 disengage from the cams 7006. Once the desired face of the blade cartridge 22 has been selected, the user releases the blade cartridge 22 and the springs 7008 will cause the blade cartridge 22 to be aligned (e.g., centered) at the new initial starting position within the predefined rotation range.

According to another feature of the present disclosure, the head assembly 20 may be coupled to the handle 60 using one or more magnets. For example, one or more magnets may be coupled/secured to a portion of the head assembly 20 and one or more magnets may be coupled/secured to a portion of the handle 60 (e.g., the collar). The magnets in the head assembly 20 and handle 60 may be configured to generate an attractive magnetic force that is sufficient to join the head assembly 20 to the handle 60 during normal shaving use. Additionally, one or more mechanical fasteners (e.g., clips, snaps, threads, posts, recesses, etc.) may be used. For example, the head assembly 20 may include a recess/cavity configured to receive a post/protrusion extending from the handle 60. While the head assembly 20 and the handle 60 may each include magnets, it should be appreciated that only the head assembly 20 or the handle 60 may include one or more magnets, and the other component may include a ferromagnetic material that is attracted by the magnetic field of the magnets. One or more of the magnets may include an electromagnet and/or permanent magnet. It should also be appreciated that the magnetic coupling of the head assembly 20 and the handle 60 may be used with any head assembly 20 and handle 60 described herein.

Turning now to FIGS. 77-78, one embodiment of a head assembly 20 and a handle configured to be coupled together using one or more magnets consistent with the present disclosure is generally illustrated. In particular, FIG. 77 generally illustrates the head assembly and the handle 60 in a dissembled state, while FIG. 78 generally illustrates the head assembly and the handle 60 in an assembled state. It should be appreciated that the magnetic connection described herein may be used with any head assembly known to those skilled in the art including, but not limited to, any head assembly described herein.

As may be seen, one or more magnets 7702 may be coupled/secured to a portion of the head assembly 20 and one or more magnets 7704 may be coupled/secured to a portion of the handle 60 (e.g., the collar 7714). The magnets 7702, 7704 in the head assembly 20 and handle may be configured to generate an attractive magnetic force that is sufficient to join the head assembly 20 to the handle 60 during normal shaving use. Additionally, one or more mechanical fasteners (e.g., clips, snaps, threads, posts, recesses, etc.) may be used. For example, the head assembly 20 may include a recess/cavity 7706 configured to receive a post/protrusion 7708 extending from the handle 60 (though it should be appreciated that the arrangement of the recess/cavity 7706 and post/protrusion 7708 may be switched).

While the head assembly 20 and the handle 60 may each include magnets 7702, 7704, optionally the head assembly 20 or the handle 60 may include one or more magnets, and the other component may include a ferromagnetic material that is attracted by the magnetic field of the magnets. One or more of the magnets 7702, 7704 may include an electromagnet and/or permanent magnet. It should also be appreciated that the magnetic coupling of the head assembly 20 and the handle 60 may be used with any head assembly 20 and handle 60 described herein.

One or more magnets 7702, 7704 may be exposed to the exterior surface 7710, 7712 of the head assembly 20 and/or handle 60. In such an embodiment, one or more magnets 7702, 7704 may contact each other when in the assembled state.

Alternatively (or in addition), one or more magnets 7702, 7704 may be covered by the exterior surface 7710, 7712 of the head assembly 20 and/or handle 60. In such an embodiment, one or more magnets 7702, 7704 may not contact each other and instead, a magnetic space or gap may exist between the magnets 7702, 7704 when in the assembled state. Providing a magnetic space or gap between the magnets 7702, 7704 when in the assembled state may allow the head assembly 20 to move longitudinally (e.g., generally along arrow 7802 in FIG. 78) relative to the handle 60. This movement of the head assembly 20 relative to the handle 60 may provide a shock absorbing effect while shaving and/or serve as an indicator to the user that the user is applying too much pressure while shaving. According to one embodiment, the post/protrusion 7708 may be biased forward such that the post/protrusion 7708 contacts the base of the recess/cavity 7706 when initially assembled. During use, force applied to either the head assembly 20 and/or handle 60 may cause the head assembly 20 to apply a force against the bias force of the post/protrusion 7708, thereby moving the post/protrusion 7708 against the biasing force and allowing the head assembly 20 to move relative to the handle 60.

As discussed herein, the handle 60 may include a collar 7714 which is mounted, secured, and/or otherwise coupled to the body portion 7716 of the handle 60 or is molded as part of the handle. Optionally, the collar 7714 may be incorporated as part of the body portion 7716 as a singular unit. According to one embodiment, the post/protrusion 7708 may extend generally outward from the body portion 7716 and may be at least partially received within a post cavity 7718 in the collar 7714. One advantage to this arrangement is that the magnets 7704 may be secured (e.g., but not limited to, overmolded) into the collar 7714, and the collar 7714 may then be secured to the body portion 7716. This may allow for the number, size, shape, and/or arrangement of the magnets 7704 to be easily changed for various designs without having to change the manufacturing (e.g., but not limited to, molding) of the body portion 7716. It may also allow for a single collar 7714 to be used with a plurality of different body portions 7716.

Turning now to FIGS. 79-80, another aspect of a head assembly 20 and a handle 60 configured to be coupled together using one or more magnets consistent with the present disclosure is generally illustrated. In particular, FIG. 79 generally illustrates the head assembly and the handle 60 in a dissembled state, while FIG. 80 generally illustrates the head assembly and the handle 60 in an assembled state. It should be appreciated that the magnetic connection described herein may be used with any head assembly known to those skilled in the art including, but not limited to, any head assembly described herein.

Whereas the embodiments described in FIGS. 77-78 may utilize magnetic attractive force to couple the head assembly 20 and the handle 60 together (e.g., the poles of one or more of the magnets 7702, 7704 are aligned such that the magnetic field(s) create an attractive force urging the head assembly 20 and the handle 60 towards each other), the head assembly 20 and handle 60 of FIGS. 79-80 include at least two magnets (e.g., central magnet 7902 and annular magnet 7904) having their poles aligned such that their magnetic fields create a magnetic repulsion force which, as described herein, couples the head assembly 20 and the handle 60 together.

For example, the head assembly 20 may include a protrusion (e.g., head protrusion) 7906 which includes one or more central magnets 7902 configured to be at least partially received in a cavity (e.g., handle cavity) 7908 including one or more annular magnets 7904, and also configured to be at least partially received in a central region of the annular magnet 7904. The annular magnet 7904 may include one or more annular, annulus, and/or toroid (e.g., circular, ring-shaped, discoid, or the like) shaped magnets (e.g., either permanent magnet and/or electromagnet). Alternatively (or in addition), the annular magnet 7904 may include a plurality of (e.g., array) of magnets disposed about in a generally annular, annulus, and/or toroid (e.g., circular, ring-shaped, discoid, doughnut, or the like) configuration to generate a generally annular, annulus, and/or toroid magnetic field (e.g., a magnetic field having magnetic field lines that form a generally annular, annulus, and/or toroid pattern). The central magnet 7902 may include any magnet (e.g., permanent magnet and/or electromagnet) such as, but not limited to, a disc magnet or the like.

As mentioned above, the head assembly 20 and handle 60 may be coupled together using repulsive magnetic forces between the head assembly magnets 7902 and the handle magnets 7904. In particular, the inventors have discovered that if a central magnet 7902 and an annular magnet 7904 (having an inside dimension ID 7910 that is equal to or larger than the outside dimension OD 7912 of the central magnet 7902) are constrained to move generally axially along axis 7914 relative to one another (e.g., by virtue of the OD 7916 of the protrusion 7906 relative to the ID 7918 of the cavity 7908) such that the central magnet 7902 can pass through the central region 7920 of the annular magnet 7904, and are further orientated such that the magnetic poles face in the same direction along the axis 7914, then the resulting force vs. displacement curve (see, e.g., FIGS. 81A-81B) closely resembles that of a traditional mechanical detent.

In particular, with reference to FIGS. 81A and 81B, diagrams illustrating the displacement (e.g., movement) of the central magnet 7902 relative to the annular magnet 7904, along with the resulting magnetic force (e.g., into or away from the cavity 7908) is generally illustrated. With reference to FIG. 81A, as the magnets 7902, 7904 approach each other in direction 8100 along axis 7914 (e.g., the head assembly 20 is advanced towards the handle 60), the repulsive force F created by the magnetic fields 8102, 8104 therebetween will initially create a force (e.g., region 8106) resisting the movement of the head assembly 20 towards the cavity 7908 and will grow (e.g., increase) as the central magnet 7902 approaches the annular magnet 7904 and then begin to decrease (e.g., substantially to zero) when the magnets 7902, 7904 are aligned at position C (e.g., the magnetic fields 8102, 8104 of the magnets 7902, 7904 will balance each other, and substantially no force will be created that urge the head assembly 20 and the blade 60 along the axis 7914). It may be appreciated that when the central magnet 7902 and the annular magnet 7904 are aligned at position C, an unstable equilibrium is achieved. It may be difficult to get the central magnet 7902 and the annular magnet 7904 to stay at this position. This unstable equilibrium is what creates the detent feel.

With reference to FIG. 81B, as the magnet 7902 continues to move in direction 8100 along axis 7914 past position C (e.g., they begin to pass through the central region 7920 of the annular magnet 7904), the repulsive force F created by the magnetic fields 8102, 8104 therebetween switch relative to region 8106 and create a force (e.g., region 8108) urging the head assembly 20 towards the handle 60. This region 8108 of force initially continues to grow until the magnetic fields begin to dissipate. In region 8108, the force begins to push the central magnet 7902 away from annular magnet 7904, thereby urging the head assembly 20 towards the handle 60. From the standpoint of the user pushing the head assembly 20 towards the handle 60, the perception is of an initial resistance increasing to a peak force, followed by an "assist" as the central magnet 7902 passes through the central region 7920 of the annular magnet 7904 and the opposite direction repulsive force takes over. If a hard stop is properly placed (e.g., the protrusion 7906 "bottoms out" relative to the cavity 7908 by virtue of either the distal end of the protrusion 7906 contacting the base of the cavity 7908, the base region of the protrusion 7906 contacting the proximal surface surrounding the opening to the cavity 7908, and/or tapered surfaces of the protrusion 7906 and the cavity 7908 contacting each other), the repulsive force in region 8108 will hold the head assembly 20 against the handle 60, resulting in secure retention between the head assembly 20 and the handle 60.

The repulsive magnetic connection is the result of a feature of the interaction between magnetic field lines of the central magnet 7902 passing through a central region 7920 of an annular magnet 7904 (e.g., that there are field lines in the central region 7920 of the annular magnet 7904 that are directionally opposed to the field lines emanating from the face (e.g., flat face) between the ID and OD. As a result, as the central magnet 7902 approaches the ID of the annular magnet 7904 (FIG. 81A), even though the poles of the central magnet 7902 and annular magnet 7904 are orientated with opposite poles toward each other (which would cause an attractive magnetic force if there were no hole or central region 7920 in the annular magnet 7904), the annular magnet's field 8104 within the ID opposes the magnetic field 8102 of the central magnet 7902, causing a repulsive magnetic force. Again, it should be appreciated that the same effect may be created if the annular magnet 7904 is replaced by a plurality of discrete magnets arranged in a generally circular array. In at least some embodiments, the force required to deliberately separate the head assembly 20 from the handle 60 is approximately 100 times greater than the force required for a razor blade or blades 142 to cut hair. For example, the razor blade cutting force required to cut hair is approximately 3-5 grams and the pull force required to deliberately separate the head assembly 20 from the handle 60 may be 1.2 lbs or more (depending on magnet strength, which can be either increased or decreased depending on the application).

Turning back to FIGS. 79 and 80, an optional helper magnet 7922 may be provided proximate to the base of the cavity 7908. The helper magnet 7922 may have poles aligned with respect to the central magnet 7902 to create an attractive magnetic force therebetween. The attractive magnetic force between the central magnet 7902 and the helper magnet 7922 may further increase the retention force between the head assembly 20 and the handle 60, while still retaining the unique "detent" feature which the user would experience during insertion of the head assembly 20 into the handle 60.

In the illustrated embodiment, the annular magnet 7904 and the cavity 7908 are part of the collar 7714, though it should be appreciated that this is not a limitation of the present disclosure unless specifically claimed as such. Additionally, it should be appreciated that while the head assembly 20 and the handle 60 are illustrated having a head protrusion 7906 received within a handle cavity 7908, this arrangement may be reversed (e.g., the head assembly 20 may include a head assembly cavity having the annular magnet 7904 and the handle 60 may include a handle protrusion having the central magnet 7902), and a person of ordinary skill in the art would understand any additional modifications necessary based on the instant disclosure.

The repulsive magnetic force between the central magnet 7902 and annular magnet 7904 may also be used to generate an ejection feature. More specifically, when the blade cartridge 22 is coupled to the handle 60 using the repulsive magnetic force between the central magnet 7902 and annular magnet 7904, the user may apply a removal/disassembly force to urge the blade cartridge 22 away from the handle 60. When a sufficient removal/disassembly force is applied to urge the central magnet 7902 through the central region 9314 of the annular magnet 7904, the repulsive force between the central magnet 7902 and annular magnet 7904 may urge/repel the blade cartridge 22 away from the handle 60, thereby creating an "ejection feature." In order for the disposable cartridge head assembly 20 to be ejected, an equal amount of force should be applied on either side of the base of the yoke 47 because the geometry between the protrusion of the handle 60 and the cavity of the base of the yoke 47 may prevent an accidental ejection of the head assembly 20 if removal/disassembly force is accidentally applied on only one side on the base of the yoke 47.

Turning now to FIG. 82, another embodiment of a magnetic connection between the head assembly 20 and the handle 60 is generally illustrated. The magnetic connection may be similar to the arrangement illustrated in FIGS. 79-80, except the optional helper magnet 7922 may be replaced with a floating/repulsion magnet 8202. In particular, the floating/repulsion magnet 8202 may have its poles reversed compared to the helper magnet 7922 so that it repels, rather than attracts, the central magnet 7902. The floating/repulsion magnet 8202 thereby causes the central magnet (and thus the head assembly 20) to balance (or hover or float) at a point between the annular magnet 7904 and the floating/repulsion magnet 8202. If a suitable gap or space 8404 is left between the mating surfaces of the head assembly 20 and the handle 60, the head assembly 20 will appear to float axially along axis 7914, while always returning to the balance point following deflection, thereby giving the razor system 10 a small shock absorbing effect. The head assembly 20 may therefore move axially within the space 8404 along axis 7914. It may be appreciated that as the central magnet 7902 is urged towards the floating/repulsion magnet 8202, the repulsive force therebetween increases as the central magnet 7902 and the floating/repulsion magnet 8202 get closer, until they touch at which point the perception is of a hard stop. This closely mimics the behavior of a compression spring which increases in resistive force with displacement until ultimately attaining solid height.

Similar to FIGS. 79-80, it should be appreciated that while the head assembly 20 and the handle 60 are illustrated having a head protrusion 7906 received within a handle cavity 7908, this arrangement may be reversed (e.g., the head assembly 20 may include a head assembly cavity having the annular magnet 7904 and floating/repulsion magnet 8202 and the handle 60 may include a handle protrusion having the central magnet 7902), and a person of ordinary skill in the art would understand any additional modifications necessary based on the instant disclosure. The space 8404 may optionally be covered with a resiliently deformable sock, gaiter, or the like. Additionally, it should be appreciated that the magnetic connection described herein may be used with any head assembly known to those skilled in the art including, but not limited to, any head assembly described herein.

Turning now to FIG. 83, another embodiment of a magnetic connection between the head assembly 20 and the handle 60 is generally illustrated. Similar to FIG. 82, the magnetic connection may include a floating feature, however, the floating/repulsion magnet 8202 of FIG. 82 may be omitted and instead, the balancing may be achieved by the relationship of the poles of the central magnet 7902 relative to the annular magnet 7904 (i.e., such that the poles of the central magnet 7902 are opposite the poles of the annular magnet 7904). The effect of the detent can still be achieved manually, although the resistance as the head assembly 20 approaches the handle 60 during insertion may be reduced compared to the arrangement illustrated in FIGS. 79-80. The balance point between the central magnet 7902 and the annular magnet 7904 occurs when the two magnets 7902, 7904 are coplanar or substantially coplanar; minor deflection in either direction along axis 7914 will be followed by a return to the balance point. For short deflections, the behavior is very similar to that of the arrangement illustrated in FIG. 82; however, the return force of FIG. 83 decreases with larger deflection (rather than increasing as in the arrangement of FIG. 82) since in the absence of the floating/repulsion magnet 8202, the only return force is generated by the attraction between the central magnet 7902 and the annular magnet 7904 which grow farther away with increasing deflection. It should be appreciated that the magnetic connection described herein may be used with any head assembly known to those skilled in the art including, but not limited to, any head assembly described herein.

Turning now to FIGS. 84-85, a blade cartridge connection mechanism for securing a blade cartridge 22 to a blade cartridge support member 24. In particular, FIGS. 84 and 85 generally illustrate a perspective view of the blade cartridge 22 and blade cartridge support member 24 in an unassembled and an assembled state, respectively, while FIGS. 86 and 87 generally illustrate a cross-sectional side view of the blade cartridge 22 and blade cartridge support member 24 in an unassembled and an assembled state, respectively.

The blade cartridge 22 may include any blade cartridge known to those skilled in the art including, but not limited to, any blade cartridge 22 described herein. The head assembly 20 may optionally include any resistive pivot mechanism described herein such as, but not limited to, a magnetic resistive pivot mechanism. As shown, blade cartridge support member 24 comprises a generally U-shaped cartridge support frame 26 having two generally curved support arms 30 (a generally C-shape or L-shape); however, it should be appreciated that this is not a limitation of the present disclosure unless specifically claimed as such.

The blade cartridge 22 may include a frame 188 (which may be either one piece or multi-piece such as, but not limited to, a clam-shell design) having one or more pivot pin/cylinder 34 extending outwardly from the lateral edges of the frame 188 (e.g., a single pivot pin/cylinder 34 that extends across the entire frame 188 or a first and a second pivot pin/cylinder 34 extending outwardly from a first and a second lateral edge of the frame 188, respectively). One or more portions (e.g., distal end regions) of the pivot pin/cylinder 34 may include one or more magnets and/or ferrous materials.

The blade cartridge support member 24 includes one or more pivot receptacles 32. For example, each support arm 30 may include a pivot receptacle 32. At least one of the pivot receptacles 32 may include a receiving pocket or cavity 8602 (best seen in FIG. 86) configured to receive at least a portion of the pivot pin/cylinder 34 located on one of the opposing lateral sides of the blade cartridge 22 (e.g., as generally illustrated in FIGS. 85 and 87).

With reference again to FIG. 86, the pocket or cavity 8602 may include an open end 8604 through which the pivot pin/cylinder 34 may be received into the pocket or cavity 8602. The pocket or cavity 8602 may also include tapered entry and/or tapered sidewalls to facilitate entry of the pivot pin/cylinder 34 into the pocket or cavity 8602. According to one embodiment, the pivot receptacle 32 includes one or more blade cartridge pivot and retention magnets 8606 (e.g., one or more permanent magnets and/or electromagnets) configured to create an attractive magnetic force with the pivot pin/cylinder 34 received therein. For example, the pivot pin/cylinder 34 may include a ferrous material that is magnetically attracted to the blade cartridge pivot and retention magnets 8606, thereby mounting, securing, and/or otherwise coupling the blade cartridge 22 to the blade cartridge support member 24. Alternatively (or in addition), the pivot pin/cylinder 34 may include a magnet having its poles align such that it is magnetically attracted to the blade cartridge pivot and retention magnets 8606, thereby mounting, securing, and/or otherwise coupling the blade cartridge 22 to the blade cartridge support member 24. In either case, the blade cartridge 22 may rotate about the pivot axis PA relative to the blade cartridge support member 24 at any angle, up to and including 360° degrees.

In practice, the user may position the unassembled blade cartridge 22 proximate to the opening 8604 of the pocket or cavity 8602 until the magnetic attraction generated between the pivot pin/cylinder 34 and the pocket or cavity 8602 (by the one or more blade cartridge pivot and retention magnets 8606) causes the pivot pin/cylinder 34 (and therefore the blade cartridge 22) to attach to the pocket or cavity 8602 of the pivot receptacle 32. Likewise, the user may dispose (e.g., remove) the blade cartridge 22 from the pivot receptacle 32 by manually (or using a tool) pry or dislodge the pivot pin/cylinder 34 (and therefore the blade cartridge 22) from the pocket or cavity 8602 of the pivot receptacle 32.

It should be appreciated that while the pivot receptacle 32 is illustrated having one or more blade cartridge pivot and retention magnets 8606, the blade cartridge pivot and retention magnets 8606 may optionally be disposed in only one or more of the pivot pin/cylinders 34. In such an arrangement, the pivot receptacle 32 may include a ferrous material that is magnetically attracted to the blade cartridge pivot and retention magnets 8606 of the pivot pin/cylinder 34.

It should also be appreciated that while each arm 30 of the blade cartridge support member 24 is shown having a pivot receptacle 32 including one or more blade cartridge pivot and retention magnets 8606, only one arm 30 may include the pivot receptacle 32 having one or more blade cartridge pivot and retention magnets 8606

Moreover, the location of one or more of the pivot receptacles 32 and the pivot pins 34 may be switched (e.g., one or more of the pivot receptacles 32 may be located in the blade cartridge 22 and one or more of the pivot pins/cylinders 34 may extend outwardly from the support arms 30 of the blade cartridge support member 24).

Additionally, while the blade cartridge 22 is shown being releasably coupled to the handle 60, the blade cartridge support member 24 and the handle 60 may optionally be an integral, unitary or one-piece construction.

Turning now to FIGS. 88-92, any one of the embodiments described herein with respect to FIGS. 84-87 may optionally include one or more blade cartridge retentioners 8802. The blade cartridge retentioners 8802 may be configured to reduce and/or prevent accidental removal/ejection of the blade cartridge 22 from the blade cartridge support member 24. According to one embodiment, (as illustrated in FIGS. 88-89), the blade cartridge retentioners 8802 may include one or more biasing devices such as, but not limited to, a spring clip and/or resiliently deformable protrusion 8804. The blade cartridge retentioners 8802 may extend outward from a portion of the cavity 8602, e.g., proximate to the opening thereof. In practice, the user may insert the pivot pin/cylinder 34 into the cavity 8602. As the pivot pin/cylinder 34 is inserted into the cavity 8602, the blade cartridge retentioners 8802 may be resiliently deformed, deflected, and/or moved out of the way until the pivot pin/cylinder 34 passes by the blade cartridge retentioners 8802 and the pivot pin/cylinder 34 is seated within the cavity 8602. Once seated/received in the cavity 8602 (as generally illustrated in FIG. 89), the blade cartridge retentioners 8802 may generally prevent the pivot pin/cylinder 34 from moving out of engagement with the cavity 8602 unless a sufficiently large force is exerted to deform, deflect, and/or move the blade cartridge retentioners 8802 out of the way.

Alternatively (or in addition), the blade cartridge retentioners 8802 may include one or more biasing devices such as, but not limited to, a detent, resiliently deformable pawl, lever, or the like 9002 as generally illustrated in FIGS. 90-92. For example, the lever 9002 may be spring biased (spring not visible) and may include an engagement portion (e.g., an engagement ramp) 9004 configured to extend at least partially across an opening of the cavity 8602 when in a retention position (as generally illustrated in FIGS. 90-92), and to pivot about a pivot point 9006 such that the lever 9002 may be rotated out of the way and the pivot pin/cylinder 34 may enter and/or exit the cavity 8602. The lever 9002 may also include an actuation region 9008 (e.g., but not limited to, a raised portion) that allows the user to rotate the lever 9002 about the pivot 9006. As may therefore be appreciated, the lever 9002 may be biased to the engagement position.

Again, it should be appreciated that the arrangement of the cavity 8602 and the pivot pin/cylinder 34 with respect to the blade cartridge 22 and the blade cartridge support member 24 may be reversed, and as such the blade cartridge retentioners 8802 may be reversed. It should also be appreciated that the cartridge pivot and retention magnets 8606 may be eliminated.

Any of the magnets described herein may be either permanent magnets and/or electromagnets. It may also be appreciated that when an electromagnet is used, the current may be adjusted to selectively change the orientation of the resulting magnetic field. The magnets may include any type of magnet such as, but not limited to, rare-earth (lanthanide) magnets (including, but not limited to, neodymium magnets and samarium-cobalt magnets), single-molecule magnets, single-chain magnets, nano-structured magnets, Alnico magnets, or the like. The magnets may include magnetic coverings and/or layers. For example, the magnets may include magnetically doped materials such as, but not limited to, magnetic paint, magnetic polymers, magnetic ceramics, magnetic composites, and/or the like.

The razor blades 142 of the head assembly 20 may be front and/or rear loaded during assembly of the head assembly 20.

Previous embodiments herein describe an axially magnetized disc as it passes through an axially magnetized ring, with the poles of the two magnets facing in the same direction. For example (and without limitation), some embodiments as illustrated in FIGS. 79-82 generally include a ring or annular magnet 7904 affixed to the handle 60 of a razor and the disc or central magnet 7902 affixed to the blade cartridge 22, which produces an effect similar to that of a traditional mechanical detent as the cartridge was being installed on the razor handle. As may be appreciated based on the present disclosure, the magnetic detent, or snap effect remains the same regardless of which element (handle 60 or blade cartridge 22) contains the ring or annular magnet 7704 and which element contains the disc or central magnet 7902; and furthermore, that this effect could be obtained with mating features (e.g., protrusion 7906 and/or cavity 7908) of any suitable shapes or orientation (e.g., protrusion 7906 extending from the handle 60 and cavity 7908 formed in the blade cartridge 22).

Moreover, as described previously herein, two magnets with like poles facing each other can be used to replace the mechanism that traditionally returns the cartridge head to its initial starting position (ISP) after it has been deflected during a shaving stroke.

Turning now to FIGS. 93-96, another embodiment of a resistive pivot mechanism and/or a connection mechanism for coupling blade cartridge to the handle is generally illustrated. In the illustrated embodiment, the handle 60 includes a handle protrusion, projection, or post 9302 that is sized and shaped to be at least partially received within a support member cavity 9304 form in the blade cartridge support member 24, e.g., a portion of the yoke or yoke region 47 that generally locates the position of the disposable head assembly 20 (e.g., the blade cartridge support member 24) relative to the handle 60 (e.g., generally prevents side to side motion). In the illustrated embodiment, the handle post 9302 has a generally cylindrical shape and the support member cavity 9304 has a generally tubular shape having an interior diameter that generally corresponds to the outer diameter of the handle post 9302 to generally prevent relative movement between the handle 60 and the blade cartridge support member 24. Optionally, the handle post 9302 may include one or more locking features 9306 that engages a one or more corresponding locking features 9308 of the support member cavity 9304 to generally limit and/or prevent rotation of the blade cartridge support member 24 in the direction generally illustrated by arrow 9310). For example, the locking features 9306, 9308 may engage each other in a lock-and-key type arrangement that generally prevents rotation. In one embodiment, the locking feature 9306 may include a protrusion and the locking feature 9308 may include a cavity having a size and shape generally corresponding size and shape of the protrusion (though it should be appreciated that the arrangement of the protrusion and cavity may be switched). Alternatively (or in addition), the handle post 9302 and the support member cavity 9304 may have a non-circular cross-section such that the inner surface of the blade cartridge cavity 9304 engages the outer surface of the handle post 9302 to prevent rotation therebetween.

The handle post 9302 may include one or more disc or central magnets 9312 that at least partially pass through a central region 9314 of one or more ring or annular magnets 9316 coupled to the blade cartridge support member 24 (e.g., the support member cavity 9304 and/or a central portion of the yoke region 47) as generally illustrated in FIGS. 94 and 95. As may be seen, the support member cavity 9304 and the central region 9314 of the annular magnet 9316 may be substantially concentric. According to one embodiment, the blade cartridge support member 24 may optionally include a turret 9320 that extends outwardly generally towards the blade cartridge 22. A distal portion of the central magnet 9312 may be substantially coplanar with an opening or inner face of the turret 9320 or may extend through the opening.

As described herein (see, e.g., FIGS. 79-82 and the corresponding description), the poles of the central magnet 9312 and the annular magnet 9316 are aligned such that a repulsive magnetic force is generated between the magnets 9312, 9316 thereby urging the blade cartridge support member 24 and the handle 60 together. The combination of the repulsive magnetic force and the interaction of the handle post 9302 with the support member cavity 9304 (and optionally the locking features 9306, 9308 and/or non-circular cross-sections) may generally secure and/or fix the blade cartridge support member 24 and the handle 60 with respect to each other, thus forming a connection therebetween.

The blade cartridge 22 may be pivotably coupled to one or more arms 30 of the blade cartridge support member 24 and may include one or more razor blades 9322 disposed on one or more faces 9324. In the illustrated embodiment, the blade cartridge 22 includes a plurality of razor blades 9322 on a first face 9324. The opposing face 9326 may include one or more cartridge magnets 9318. While the cartridge magnet 9318 is shown in the middle of the opposing face 9326, it should be appreciated that one or more cartridge magnets 9318 may be disposed anywhere on the face 9326.

The cartridge magnet 9318 has its pole aligned with the central magnet 9312 to generate a repulsive magnetic force when the blade cartridge support member 24 is coupled to the handle 60 (e.g., as generally illustrated in FIGS. 94 and 95). The repulsive magnetic force may generally urge the blade cartridge 22 away from the yoke 47 and/or handle 60, for example, as generally illustrated by arrow 9402. The blade cartridge support member 24 and/or blade cartridge 22 may include one or more IPS protrusions, shoulders, ridge, and/or extensions 9328 that sets the Initial Starting Position (ISP) of the blade cartridge 22 relative to the blade cartridge support member 24 and the handle 60. As may be appreciated, the ISP is the position of the blade cartridge 22 relative to the blade cartridge support member 24 and the handle 60 when no force is applied and the position that the blade cartridge 22 returns to after an external force has been removed. Put another way, when an external force is applied to the blade cartridge 22 during shaving, the external force may overcome the repulsive magnetic force between the cartridge magnet 9318 and the central magnet 9312 such that the blade cartridge 22 moves in a direction generally opposite to arrow 9402. When the external force is removed and/or reduced, the repulsive magnetic force between the cartridge magnet 9318 and the central magnet 9312 urges the blade cartridge 22 back towards the IPS. The ISP protrusion 9328 thus sets the initial starting position of the blade cartridge 22 relative to the blade cartridge support member 24 and limits the rotation of the blade cartridge 22 in the direction of arrow 9402 and/or may also limit/prevent the over rotation of the blade cartridge 22 during a shaving stroke.

In the illustrated embodiment, the ISP protrusion 9328 may extend outward from either the blade cartridge support member 24 a sufficient distance to engage (e.g., directly contact) the blade cartridge 22 and prevent the blade cartridge 22 from rotating about the pivot axis PA any further. For example, the ISP protrusion 9328 may be located on the inside of one or more of the yoke arms 30 below the pivot axis PA (e.g., proximate to the yoke 47), though as mentioned, this is not a limitation of the present disclosure unless specifically claimed as such. Alternatively (or in addition), the ISP protrusion 9328 may extend outward from either the blade cartridge 22 a sufficient distance to engage (e.g., directly contact) the blade cartridge support member 24 and prevent the blade cartridge 22 from rotating about the pivot axis PA any further. The ISP protrusion 9328 therefore sets or defines the 0 position of the blade cartridge 22. The blade cartridge 22 may rotate about the pivot axis PA within a predefined rotation range. For example, the predefined rotation range may be up to 100 degrees, for example, less than 90 degrees or less than 45 degrees. The rotation of the blade cartridge 22 in the direction generally opposite to arrow 9402 (e.g., the deflection direction) may also be limited by ISP protrusion 9328 and/or another protrusion, shoulder, ridge, and/or extension (e.g., a maximum deflection point (MDP) projection) that extends from either the blade cartridge 22 and/or the blade cartridge support member 24. The rotation limit in the deflection direction is referred to as the maximum deflection point (MDP). The ISP protrusion 9328 may therefore function as both an ISP protrusion and a MDP protrusion. This embodiment offers the advantage of generating a return force over a greater range of angular displacement relative to a spring—exceeding 90 degrees, given appropriate adjustments to the surrounding geometrical constraints. In order to minimize the number of magnets in the assembly, the annular magnet 9316 is affixed to the blade cartridge support member 24 and the central magnet 9312 is affixed to the handle 60. The annular magnet 9316, in turn, is then used to repel one or more cartridge magnets 9318 placed on the back side 9326 of the blade cartridge 22, thus performing two functions.

Because the central magnet 9312 and annular magnet 9316 are oriented with their poles facing in the same direction (see cross-section of the assembled unit in FIG. 95), a small return force (e.g., urging the blade cartridge 22 in the direction of arrow 9402) is present even when the disposable head assembly 20 is not coupled to the handle 60, as the annular magnet 9316 repels the cartridge magnet 9318 on the back face 9326 of the blade cartridge 22. However, upon installation, the force generated by the combination of the central magnet 9312 and/or annular magnet 9316 is much greater and closely simulates that of a compression spring, serving to return the blade cartridge 22 to its ISP.

Additional retention force (supplemental to that created by the magnetic detent/coupling effect between the central magnet 9312 and annular magnet 9316), which may serve to make the blade cartridge support member 24 and therefore the blade cartridge 22 more difficult to accidentally pull or knock off of the handle 60, may be created in several ways. One possible method of increasing retention force includes the addition of a helper ring magnet inside the handle 60. The helper magnet may be axially magnetized and oriented in the same direction as the annular magnet 9316 in the blade cartridge support member 24, placed at the base of the handle post 9302 that contains the central magnet 9312. Thus, when the blade cartridge support member 24 is installed onto the handle 60, the helper magnet would present the opposite pole to the closest face of the approaching annular magnet 9316 in the blade cartridge support member 24, generating a pulling force on the blade cartridge support member 24 and serving to increase the forces of attachment (during installation) and retention (after installation). Another possible configuration for increasing retention force includes a compliant ring 9330 in the support member cavity 9304, with an inside diameter slightly smaller than the outside diameter of the handle post 9302, positioned such that the compliant ring 9330 grips a portion of the handle post 9302 (e.g., but not limited to, the distal tip) when it was fully inserted into the support member cavity 9304. Additionally (or alternatively), one or more of the locking features 9306, 9308 may include a compliant receiving receptacle that engages the corresponding locking feature on the opposite component (e.g., but not limited to, a compliant receiving receptacle 9308 on the yoke 47 that would be engaged by the opposing locking feature 9306 located on the handle 60). The protrusion 9306 on the handle post 9302 may engage the sides of the compliant receptacle 9308 to increase the retention force. This may be achieved with an elastomeric compliance ring (or the like) positioned either on the protrusion or the receptacle. These configurations may not increase the attachment force, but the friction generated through deflection of the compliant material due to interference with the post tip or yoke receptacle may serve as an additional impediment to the blade cartridge support member 24 being accidentally dislodged from the handle 60 once it was installed.

The use of the magnetic detent/coupling system does not restrict the configuration of returning the blade cartridge 22 to its ISP to the use of the detent-generating magnets. Any one of embodiments described herein may be used, including but not limited to mechanical means such as a resiliently-deformable pawl (RDP) or other magnetic configurations such as, but not limited to, the magnetic configuration illustrated in FIG. 96. For example, one or more arm magnets 9602 may be mounted to one or more of the arms 30 (e.g., a pair that faces each other) and the blade cartridge 22 may include one or more blade cartridge magnets 9604 having their axes parallel to the pivot axis PA of rotation of the blade cartridge 22. The arm magnet 9602 may be attracted to a central/middle blade cartridge magnet 9604 in the blade cartridge 22 due to their opposite poles being oriented facing each other. According to one embodiment, adjacent blade cartridge magnets 9604*b*, 9604*c* in the blade cartridge 22 may be arranged on one or more sides of a middle blade cartridge magnet 9604*a* with the like poles facing the arm magnet 9602. Thus, the blade cartridge 22 tends to come to rest with the center/middle blade cartridge magnet 9604*a* coaxial to the arm magnet 9602, which determines the ISP. If the blade cartridge 22 is displaced (e.g., rotated) around the pivot axis PA, a resistive torque is experienced due to the combination of attraction to the center/middle blade cartridge magnet 9604*a* and repulsion by the outer blade cartridge magnets 9604*b*, 9604*c*, and when the blade cartridge 22 is released it returns to its ISP. For small displacements, this action also simulates that of a spring. Displacement is limited by a hard stop/ISP protrusion 9328 as generally illustrated in FIG. 97. Depending upon the position of the hard stop ISP protrusion 9328, one or more of the outer blade cartridge magnets 9604*b*, 9604*c* may be redundant (i.e. if the maximum rotation in the direction of one or more of the outer blade cartridge magnets 9604*b*, 9604*c* is very small, its influence will be negligible compared to that of the attractive center/middle blade cartridge magnet 9604*a* and it will not be needed to return the blade cartridge 22 to its ISP). It should be appreciated that the magnet array arrangement may be used in one or both arms 30. It should also be appreciated that the arrangement of the blade cartridge magnets 9604*a*-9604*c* may be replaced with one or more programmable magnets having multiple poles and/or nano-structured magnets having a plurality areas programmed to provide the various poles described herein.

Turning now to FIGS. 98-104, various embodiments of two or more diametrically magnetized (DM) ring and/or disc magnets for coupling two components (e.g., razor handle/cartridge and/or cartridge yoke/cartridge head) are described wherein the two components are securely fixed to each other (e.g., do not separate) but can move, in certain prescribed and limited ways, relative to each other while tending to return to a predetermined rest position; and optionally can be separated manually when sufficient force is applied, for example during replacement of a used razor cartridge with a new one.

With reference to FIGS. 98-100, a first embodiment is illustrated generally illustrated. For example, FIG. 98 generally illustrates the head assembly 20 and the handle 60 in an unassembled state, FIG. 99 generally illustrates the head assembly 20 and the handle 60 in an assembled state in the ISP, and FIG. 100 generally illustrates the head assembly 20 and the handle 60 in a deflected position relative to the ISP.

In particular, one or more handle DM magnets 9802 are permanently and fixedly coupled, secured, and/or otherwise mounted to distal end 9804 of the handle 60 and one or more blade cartridge support member DM magnets 9806 are permanently and fixedly coupled, secured, and/or otherwise mounted to a portion of the blade cartridge support member 24 (e.g., but not limited to, the yoke 47). In the illustrated embodiment, a single handle DM magnet 9802 and a single blade cartridge support member DM magnet 9806 are illustrated; however, it should be appreciated that the handle 60 and/or the blade cartridge support member 24 may include a plurality of DM magnets 9802, 9806. The handle DM magnet 9802 is also illustrated being at least partially received within a handle cavity 9820, while the support member DM magnet 9806 is illustrated partially extending beyond a rear mating face of the blade cartridge support member 24, though it should be appreciated that the cavity 9820 may be formed in the blade cartridge support member 24 and the arrangement may therefore be reversed.

Additionally, the handle DM magnet 9802 and the blade cartridge support member DM magnets 9806 are illustrated as ring magnets. The ring magnet configuration may aid in preventing the DM magnets 9802, 9806 from rotating within their respective components (e.g. handle 60 and blade cartridge support member 24). For example, the central regions 9808, 9810 of the DM ring magnets 9802, 9806 may have non-circular shaped that may be coupled to and/or overmolded with components 60, 24 (e.g. handle 60 and blade cartridge support member 24), to prevent rotation of the DM ring magnets 9802, 9806. It should be appreciated, however, that one or more of these DM magnets 9802, 9806 may be DM disc magnets with no central hole. The DM disc magnets 9802, 9806 may optionally include a non-cylindrical post or an offset post extending outwardly from one or more of the planar faces of the DM disc magnets 9802, 9806 that may also prevent rotation. Additionally (or alternatively), a portion of either the DM disc or ring magnets 9802, 9806 may be noncircular (e.g., the disc or ring may have a generally oblong or oval shape) to prevent rotation of the magnets 9802, 9806 relative to handle 60 and blade cartridge support member 24, respectively.

The handle 60 may be described as having a top surface 9801, a bottom surface 9803, and a right and left surface 9805, 9807 when viewed from the perspective in FIG. 98. The handle DM magnet 9802 may be described as having a first and a second planar face 9809, 9811 and an outer circumferential surface 9813 extending therebetween. The handle DM magnet 9802 may secured to the handle 60 such that the planar faces 9809, 9811 are aligned generally parallel to a longitudinal axis L of the handle and generally perpendicular to the top and bottom surfaces 9801, 9803 and generally parallel to the right and left surfaces 9805, 9807.

The DM magnets 9802, 9806 are mounted to the handle 60/blade cartridge support member 24 such that, when the handle 60 and blade cartridge support member 24 are brought close to each other during the process of installing the disposable head assembly 20 to the handle 60, the opposite poles of the DM magnets 9802, 9806 attract and complete the attachment procedure. According to one embodiment, the DM magnets 9802, 9806 generally tangentially contact each other. The DM magnets 9802, 9806, when positioned tangent to each other, will always seek out the position at which the two opposite poles are in contact. This position will be referred to as the predetermined rest position or initial starting position (ISP). In this embodiment, the two DM magnets 9802, 9806 are installed such that in the predetermined rest position or ISP, the handle 60 and blade cartridge support member 24 are aligned in a straight line (as on a traditional razor).

The distal region 9804 of the handle 60 adjacent/proximate to the handle DM magnet 9802 and the proximal region 9812 of the blade cartridge support member 24 adjacent/proximate to the blade cartridge support member DM magnet 9806 may define a handle interface region 9814 and a support member interface region 9816, respectively. The interface regions 9814, 9816 may have a shape and contour to allow for limited rotational longitudinal motion of the handle 60 and blade cartridge support member 24 relative to one another. The DM magnets 9802, 9806 will allow this motion to occur, but provide noticeable resistance, mimicking the behavior of a spring. In fact the DM magnets 9802, 9806 remain tangent to each other throughout the motion as the contact point between them moves farther away from the poles, so that their behavior resembles that of a pair of gears (i.e. each DM magnet 9802, 9806 not only rotates on its own axis but also “orbits” about the axis of the opposite magnet). Such a displacement, in this case a longitudinal motion (e.g., in a plane extending generally parallel to the longitudinal axis L of the handle 60 and generally perpendicular to the top and bottom surfaces 9801, 9803) is illustrated in FIG. 100. The rotation of the blade cartridge support member 24 relative to the handle 60 in either direction may be set and/or limited by the contours of the interfaces 9814, 9816.

When the handle 60 and blade cartridge support member 24 are released, the DM magnets 9802, 9806 act to reposition themselves relative to each other at the predetermined rest position or ISP, which in turn returns and/or urges the blade cartridge 22 to its original alignment with respect to the handle 60. This feature can be useful for hard to reach shaving areas by manually holding the blade cartridge support member 24 (e.g., yoke 47) and blade cartridge 22 in an angled forward position with a finger. The angle can be easily adjusted depending on the force applied to the blade cartridge support member 24 and blade cartridge 22.

Turning now to FIGS. 101-102, another embodiment utilizing DM magnets is generally illustrated. The arrangement may be similar to the embodiment in FIGS. 98-100, but may also include one or more locking 10102 magnets. The locking magnet 10102 may include, but is not limited to, a DM ring or cylindrical magnets 10102. The locking magnet 10102 may be coupled, secured, or otherwise mounted to handle 60 in a fixed location and orientation relative to the DM handle magnet 9802. When properly oriented, the locking magnet 10102 has the effect of attracting and retaining the blade cartridge support member DM magnet 9806 when the blade cartridge support member 24/blade cartridge 22 is subjected to a sufficient angular displacement to bring the locking magnet 10102 and the blade cartridge support member DM magnet 9806 into close proximity to each other, such that the blade cartridge support member 24/blade cartridge 22 remains in the displaced position when it is released as generally illustrated in FIG. 102. Because the original predetermined rest position (PRP) or ISP shown in FIG. 101, with DM magnets 9802, 9806 aligned with opposite poles adjacent to each other, remains, the result is the existence of two possible conditions, selectable by the user, in which the blade cartridge support member 24/blade cartridge 22 can be either at rest in its predetermined rest position with a spring-like return feature responding to small angular displacements (FIG. 101); or at rest in the displaced position and securely held in place (FIG. 102).

Optionally, a retraction mechanism may be provided to retract the locking magnet 10102 into the handle 60 when it is not being used to affix the blade cartridge support member 24/blade cartridge 22 in the flexed/displaced position. The retraction mechanism allows the locking magnet 10102 to be concealed when the blade cartridge support member 24/blade cartridge 22 is in its predetermined rest position or ISP, so that it would not adversely impact the feel of the razor handle 60 in the user’s hand and/or collect debris. The retraction mechanism may include any arrangement for retracting the locking magnet 10102 such as, but not limited to, a manual lever wherein the user would need to deploy the third magnet before moving the cartridge into the flexed position, or with a properly sized gear train that would automatically position the locking magnet 10102 at the same time as the support member 24/blade cartridge 22 was being moved from its predetermined rest position/ISP to its flexed/displaced position.

While the blade cartridge 22 is illustrated having razors on only a single side, it should be appreciated that the blade cartridge 22 may be double-sided.

The attachment of the blade cartridge 22 to the blade cartridge support member 24 and the limitation and control of the rotation of the blade cartridge 22 within the blade cartridge support member 24 may be accomplished in any number of ways that have been described herein, including but not limited to, mechanical means such as a physical axle feature and a RDP (resiliently deformable pawl) or magnetic arrangements such as alternating attracting/repelling magnets, multi-pole or programmable magnets or the like. In the illustrated embodiments, a single-sided blade cartridge 22 whose ISP is determined by a pair of repelling magnets, one located on the back of the blade cartridge 22 and the other on the leading edge of the center web of the blade cartridge support member 24/yoke 47, has been shown; however, this is not a limitation of present disclosure unless specifically claimed as such.

Additionally, it should be noted that the blade cartridge DM magnet 9806 can also be used to generate the magnetic force (e.g., repel and/or attract) the blade cartridge magnets 11410 (see, e.g., the blade cartridge magnets 11410 in FIGS. 145-147). As such, the DM magnet 9806 may be used to generate the magnetic force in addition to, or in replace of, the blade cartridge support member magnets 11412.

Turning now to FIGS. 103-105, a further embodiment utilizing DM magnets is generally illustrated. Rather than having a handle DM magnet 9802 and a blade cartridge support member DM magnet 9806 as described above, one or more of the arms 30 may include an arm DM magnet 10302 and one or more of the lateral ends 10304 of the blade cartridge 22 may include corresponding blade cartridge DM magnets 10306. The primary responsibilities of the DM magnets 10302, 10306 are to keep the blade cartridge 22 attached to the blade cartridge support member 24/arms 30 and allow it to deflect upward during a shaving stroke as generally illustrated in FIG. 105. The blade cartridge DM magnets 10306 may be exposed or could be disposed within an interior portion of the blade cartridge 22 so as not to protrude from the lateral ends 10304 of the blade cartridge 22. The ISP of the blade cartridge 22 may be established by the locations of the poles of the DM magnets 10302, 10306, and will occur at the angle at which the opposite poles of the DM magnets 10302, 10306 are adjacent to each other. Although the DM magnets 10302, 10306 also partially serve to return the cartridge head to its ISP when it has been subjected to an angular deflection (similar to the way they return the cartridge to its predetermined rest position in the embodiments described above), this function may also be performed by a repelling pair of magnets 10308, 10310 in the blade cartridge support member 24 and blade cartridge 22, respectively. In one embodiment, the blade cartridge support member 24 may remain part of the handle 60 and the blade cartridge 22 may be removed. Alternatively, the blade cartridge 22 and blade cartridge support member 24 may be considered an assembly in which case the blade cartridge support member 24 may be removably coupled to the handle 60 using any arrangement described herein, including but not limited to, a modified twist-lock-eject system utilizing a diametrically magnetized ring and disc pair.

Two or more DM magnets (e.g., but not limited to, ring and/or disc DM magnets) may be utilized to achieve attachment between two components (such as, but not limited to, a razor handle 60 and a blade cartridge 22) such that the two components are securely fixed to each other but can move, in certain prescribed and limited ways, relative to each other while tending to return to a predetermined rest position; and can be separated manually when sufficient force is applied, for example during replacement of a used razor cartridge with a new one.

With reference to FIGS. 106-108, one embodiment of two or more DM magnets that allows lateral movement of the blade cartridge support member 24/blade cartridge 22 relative to the handle 60 is generally illustrated. In particular, one or more handle DM magnets 10602 are permanently and fixedly coupled, secured, and/or otherwise mounted to distal end 9804 of the handle 60 and one or more blade cartridge support member DM magnets 10606 are permanently and fixedly coupled, secured, and/or otherwise mounted to a portion of the blade cartridge support member 24 (e.g., but not limited to, the yoke 47). In the illustrated embodiment, a single handle DM magnet 10602 and a single blade cartridge support member DM magnet 10606 are illustrated; however, it should be appreciated that the handle 60 and/or the blade cartridge support member 24 may include a plurality of DM magnets 10602, 10606. The blade cartridge support member DM magnet 10606 is also illustrated being at least partially received within a blade cartridge support member cavity 10620 formed in the blade cartridge support member 24, while the handle DM magnet 10602 is illustrated partially extending beyond a distal end 9804 of the handle 60, though it should be appreciated that the cavity 10620 may be formed in the handle and the arrangement may therefore be reversed.

Additionally, the handle DM magnet 10602 and the support member DM magnet 10606 are illustrated as ring magnets. The ring magnet configuration may aid in preventing the DM magnets 10602, 10606 from rotating within their respective components (e.g., handle 60 and blade cartridge support member 24). For example, the central regions 10608, 10610 of the DM ring magnets 10602, 10606 may have non-circular shape that may be coupled to and/or overmolded with the handle 60, blade cartridge support member 24 to prevent rotation of the DM ring magnets 10602, 10606. It should be appreciated, however, that one or more of these DM magnets 10602, 10606 may be DM disc magnets with no central hole. The DM disc magnets 10602, 10606 may optionally include a non-cylindrical post or an offset post extending outwardly from one or more of the planar faces of the DM disc magnets 10602, 10606 that may also prevent rotation. Additionally (or alternatively), a portion of either the DM disc or ring magnets 10602, 10606 may be noncircular (e.g., the disc or ring may have a generally oblong or oval shape) to prevent rotation.

The handle 60 may be described as having a top surface 9801, a bottom surface 9803, and a right and left surface 9805, 9807 when viewed from the perspective in FIG. 106. The handle DM magnet 10602 may be described as having a first and a second planar face 10609, 10611 and an outer circumferential surface 10613 extending therebetween. The handle DM magnet 10602 may secured to the handle 60 such that the planar faces 10609, 10611 are aligned generally parallel to the longitudinal axis L of the handle 60 and generally perpendicular to right and left surfaces 9805, 9807 and generally parallel to the top and bottom surfaces 9801, 9803. The lateral movement of the blade cartridge support member 24/blade cartridge 22 relative to the handle 60 therefore corresponds to motion in a plane extending generally parallel to the longitudinal axis L of the handle 60 and generally perpendicular to the right and left surfaces 9805, 9807 (e.g., from side-to-side).

The DM magnets 10602, 10606 are mounted to the handle 60/blade cartridge support member 24 such that, when the handle 60 and blade cartridge support member 24 are brought close to each other during the process of installing the disposable head assembly 20 to the handle the opposite poles of the DM magnets 10602, 10606 attract and complete the attachment procedure. According to one embodiment, the DM magnets 10602, 10606 generally tangentially contact each other. The DM magnets 10602, 10606, when positioned tangent to each other, will always seek out the position at which the two opposite poles are in contact. This position will be referred to as the predetermined rest position or initial starting position (ISP). In this embodiment, the two DM magnets 10602, 10606 are installed such that in the predetermined rest position or ISP, the handle 60 and support member 24 are aligned in a straight line (as on a traditional razor).

The distal region 9804 of the handle 60 adjacent/proximate to the handle DM magnet 10602 and the proximal region 9812 of the blade cartridge support member 24 adjacent/proximate to the support member DM magnet 10606 may define a handle interface region 9814 and a blade cartridge support member interface region 9816, respectively. The interface regions 9814, 9816 may have a shape and contour to allow for limited rotational lateral motion of the handle 60 and blade cartridge support member 24 relative to one another. The DM magnets 10602, 10606 will allow this motion to occur, but provide noticeable resistance, mimicking the behavior of a spring. In fact the DM magnets 10602, 10606 remain tangent to each other throughout the motion as the contact point between them moves farther away from the poles, so that their behavior resembles that of a pair of gears (i.e. each DM magnet 10602, 10606 not only rotates on its own axis but also "orbits" about the axis of the opposite magnet). Such a displacement, in this case a lateral motion (e.g., in a plane extending generally parallel to the longitudinal axis L of the handle 60 and generally perpendicular to the right and left surfaces 9805, 9807) is illustrated in FIG. 108. The rotation of the blade cartridge support member 24 relative to the handle 60 in either direction may be set and/or limited by the contours of the interfaces 9814, 9816.

When the handle 60 and blade cartridge support member 24 are released, the DM magnets 10602, 10606 act to reposition themselves relative to each other at the predetermined rest position or ISP, which in turn returns and/or urges the blade cartridge 22 to its original alignment with respect to the handle 60.

Additionally, it should be noted that the blade cartridge support member DM magnet 10606 can also be used to generate the magnetic force (e.g., repel and/or attract) the blade cartridge magnets 11410 (see, the e.g., the blade cartridge magnets 11410 in FIGS. 147-150). As such, the blade cartridge support member DM magnet 10606 may be used to generate the magnetic force in addition to, or in replace of, the blade cartridge support member magnets 11412. Turning now to FIGS. 109-110, another embodiment featuring two or more DM magnets is generally illustrated. This embodiment is similar to the embodiment described above with respect to FIGS. 106-108, however, the interfaces 9814, 9816 of the handle 60 and the blade cartridge support member 24 have a contour configured to allow not only lateral motion, but also to allow the blade cartridge support member 24/blade cartridge 22 to twist relative to the handle 6 about the longitudinal axis L approximately parallel to the handle 60 (e.g., in a direction generally illustrated by arrow 10902). Optionally, the twist motion may be limited by design due to the engagement of one or more protruding pins 10904 (e.g., but not limited to, a pin extending from the blade cartridge support member 24/yoke 47) that engages and/or is received within receptacle well/groove 10906 (e.g., on handle 60). It should be appreciated that the arrangement of the pin 10904 and groove 10906 may be switched. The pin 10904 and groove 10906 may be configured to limit the twist of the blade cartridge support member 24/blade cartridge 22 relative to the handle 60 to less than 360°, for example, less than 270° or less than 180°. The behavior when the two DM magnets 10602, 10606 are manipulated in this way is a result of the DM magnets 10602, 10606 being in tangential contact with each other. If the DM magnets 10602, 10606 are twisted relative to each other such that their axes are no longer parallel (as generally illustrated in FIG. 110), the DM magnets 10602, 10606 will tend to return to a position in which the axes are parallel because the DM magnets 10602, 10606 are drawn to have the maximum area of contact between them, which occurs when the axes are parallel.

Turning now to FIGS. 111-113, another embodiment featuring two or more DM magnets is generally illustrated. As best illustrated in FIGS. 111 and 112, one or more handle DM magnets 11102 are permanently and fixedly coupled, secured, and/or otherwise mounted to distal end 9804 of the handle 60 and one or more blade cartridge support member DM magnets 11106 are permanently and fixedly coupled, secured, and/or otherwise mounted to a portion of the blade cartridge support member 24 (e.g., but not limited to, the yoke 47). The DM magnets 11102, 11106 may include any size, shape, and/or configuration described herein.

In the illustrated embodiment, the DM magnets 11102, 11106 are aligned such that the planar faces 11109 (see, e.g., FIG. 112) are aligned generally parallel to the longitudinal axis L of the handle 60 (e.g., the longitudinal axis of the collar) and generally parallel to the top and bottom surface 9801, 9803 of the handle 60. The DM magnets 11102, 11106 are oriented concentrically with their poles 180 degrees opposite each other. This is the predetermined rest position due to the force attracting each pair of opposing poles to one another. One or more of the DM magnets 11102, 11106 may be at least partially received within a cavity and one or more of the DM magnets 11102, 11106 may partially extend outwardly from a portion of its respective component 60, 24 such that it may be received at least partially received in the cavity to align the DM magnets 11102, 11106 concentrically.

When the blade cartridge support member 24/blade cartridge 22 and handle 60 are rotated relative to each other around the shared axis of the DM magnets 11102, 11106, the poles of the DM magnets 11102, 11106 draw away from each other circumferentially, causing a torque to be applied as the DM magnets 11102, 11106 attempt to return the two components (e.g., handle 60 and blade cartridge support member 24) to the predetermined rest position. For small angular displacements such as that shown in FIG. 113, the DM magnets 11102, 11106 have a tendency to remain concentric throughout the displacement, such that a mechanical pivot feature is optional. For larger angular displacements this effect is reduced, and a mechanical pivot may be required. In such a case, ring DM magnets 11102, 11106 (as opposed to disc DM magnets 11102, 11106) would offer the advantage of a natural location for this mechanical pivot, i.e. a pin protruding from one component through the inside diameter of both magnets, acting as an axle. Attachment and detachment procedure for the handle 60 and the blade cartridge support member 24 may vary depending upon whether a mechanical pivot feature was present. In the absence of such a feature, the two DM magnets 11102, 11106 may approach each other either radially or axially and ultimately adopt the predetermined rest position naturally. If a mechanical pivot feature is present, the two DM magnets 11102, 11106 may need to be attached to each other via an axial motion.

As may be appreciated, any one or more of the DM magnets described in this embodiment, or any other embodiment, may be replaced with one or more programmable magnets (PMs) comprising multiple pole segments. The PMs may allow for multiple positions of stable equilibrium instead of just one, which would create the effect of indexing or detents as the blade cartridge support member 24 is rotated about the common axis of the magnets. The bs24 could thus be placed in any one of several positions for optimal shaving results. The number of possible positions, and thus the resolution of the magnetic detent system, would be limited only by the maximum number of pole segments that could be applied to the magnets.

Turning now to FIGS. 114-116, a further embodiment featuring two or more DM magnets is generally illustrated. This embodiment is similar to the embodiment described above with respect to FIGS. 106-108 in that two DM magnets 11402, 11406 are placed tangentially; however, in this case the blade cartridge support member DM magnets 11406 is constrained to rotate about an axis that is fixed relative to the handle 60, so it no longer rolls around the circumference of the handle DM magnet 11402. As illustrated in FIG. 114, this is accomplished through the use of a modified "ball and socket" design 11502 (best seen in FIG. 115) in which the motion of the blade cartridge support member 24 is constrained to a single plane. The blade cartridge support member DM magnets 11406, in the shape of a disc or ring, seats in a mating socket in the handle 60. Its predetermined rest position is a result of the tendency of the two DM magnets 11402, 11406 to align such that their opposing poles are as close as possible together. When a lateral rotation is applied as in FIG. 116, the user will experience resistance to the motion, and when the blade cartridge support member 24 is released, the blade cartridge support member 24 will resume its predetermined rest position with respect to the handle 60 as a result of the DM magnets 11402, 11406 re-aligning with each other.

The above-described embodiments are illustrated wherein the blade cartridge support member 24 would comprise a yoke and a blade cartridge 22, assembled such that the blade cartridge 22 can rotate relative to the yoke 47/arm 30 and return to a known location (the initial starting position, or ISP), though this is not a limitation of the present disclosure unless specifically claimed as such. The blade cartridge 22 may be single-sided, such that the axis of rotation exists close to one longitudinal edge of the blade cartridge 22 and the blade cartridge 22 rotation is limited (e.g. 90 degrees upward only); or it may be double-sided, such that the 114 axis of rotation exists at the geometric center of the blade cartridge 22 and the blade cartridge 22 can rotate a full 360 degrees, with two positions of stable equilibrium, selectable by the user and 180 degrees apart. The attachment of the blade cartridge 22 to the yoke 47/arm 30 and the limitation and control of the rotation of the blade cartridge 22 within the yoke 47/arm 30 could be accomplished in any number of ways that have been described herein, including but not limited to mechanical devices such as a physical axle feature and an RDP (resiliently deformable pawl) or magnetic configurations such as (but not limited to) alternating attracting/repelling magnets, multi-pole or programmable magnets or the like. While the embodiment has been illustrated using a single-sided blade cartridge whose ISP is determined by a pair of repelling magnets 11410, 11412, one 11410 located on the back 11409 of the blade cartridge 22 and the other 11412 on the leading edge of the center web of the yoke 47, this is for illustrative purposes only and that any configuration described herein may be used. It should be noted that the repelling magnet 11412 does not necessarily need to be a separate magnet in the assembly, but rather one of the magnets 11402, 11406 in the handle 60 or blade cartridge support member 24 connection can be utilized to generate the repulsive magnetic force with the magnet 11410 in the blade cartridge 22.

Turning now to FIGS. 117-120, multiple pairs of diametrically magnetized (DM) ring and/or disc magnets to achieve attachment between two components (e.g., but not limited to, a razor handle 60 and blade cartridge support member 24) such that the two components are securely fixed to each other but can rotate about multiple axes relative to each other while tending to return to a predetermined rest position; and can be separated manually when sufficient force is applied, for example during replacement of a used head assembly 20 with a new one.

As noted herein, DM cylindrical magnets, when allowed to be in close proximity with planar sides facing each other, will align themselves coaxially such that opposite poles are adjacent; and further. Additionally, if one DM magnet is displaced rotationally from its rest position relative to the other, it will return to its rest position in a manner that closely mimics the behavior of a spring.

Through the use of two or more set of pairs 1702, 1704 of DM magnets, the blade cartridge support member 24 may be rotated from a first position (as generally illustrated in FIG. 117), to a second position (as generally illustrated in FIG. 118) using a first of the pair 1702 of DM magnets, and ultimately to a third position (as generally illustrated in FIG. 118) using a second pair 1704 of the DM magnets. The first pair 11702 of DM magnets may for a yoke joint and the second pair 11704 of DM magnets may form a center joint.

In the illustrated embodiment, the yoke joint 11706 connects the blade cartridge support member 24/yoke 47 to a portion of an intermediate knuckle 11708. The blade cartridge support member 24/yoke 47 and a first portion of the intermediate knuckle 11708 each include one of at least one DM magnet 11710, 11712 of the first pair 11702 of DM magnets, respectively. The DM magnets 11710, 11712 tend to keep the blade cartridge support member 24 and intermediate knuckle 11708 assembled and in the predetermined rest position (as generally illustrated in FIG. 117), but the blade cartridge support member 24 can be twisted relative to the intermediate knuckle 11708 about the shared axis of the DM magnets 11710, 11712 in the direction generally of arrow 11714 by the user applying a torque to the blade cartridge support member 24. Upon release of the force, the tendency of the DM magnets 11710, 11712 to align with their poles adjacent will generate a torque which returns the blade cartridge support member 24 to its predetermined rest position relative to the intermediate knuckle 11708.

The center joint 11716 includes the second pair 11704 of DM magnets and connects the intermediate knuckle 11708 to the razor handle 60. A second portion of the intermediate knuckle 11708 and the handle 60 each include one of at least one DM magnet 11718, 11720 of the second pair 11704 of DM magnets, respectively. It should be appreciated that the intermediate knuckle 11708 may be considered part of the handle 60. For example, the intermediate knuckle 11708 and the portion of the handle 60 that includes the DM magnet 11720 may form a first and a second portion 11701, 11703 of the collar of the handle 60.

As with the yoke joint 11706, the DM magnets 11718, 11720 keep the portions 11701, 11703 assembled and in the predetermined rest position (as generally illustrated in FIG. 117) such that the position of the blade cartridge 22 relative to the handle 60 is similar to that of a traditional razor. The user may turn the blade cartridge support member 24/blade cartridge 22 downward or upward, but will experience spring-like resistance to this motion as a result of the tendency of the DM magnets 11718, 11720 to align with their poles adjacent, and upon release the blade cartridge 22 will return to its predetermined rest position.

For both the yoke and center joints 11706, 11716, given small angular displacements the DM magnets have a tendency to remain concentric throughout the displacement, such that a mechanical pivot feature is optional. For larger angular displacements this effect is reduced, and a mechanical pivot may be used. In such a case, DM ring magnets (as opposed to DM disc magnets) may offer the advantage of a natural location for this mechanical pivot, i.e. a pin protruding from one component through the inside diameter of both magnets, acting as an axle. Attachment and detachment procedure for the two parts would vary depending upon whether a mechanical pivot feature was present. In the absence of such a feature, the two DM magnets could approach each other either radially or axially and ultimately adopt the predetermined rest position naturally. If a mechanical pivot feature is present, the two DM magnets may need to be attached to each other via an axial motion.

Because of the tendency of the DM magnets in both joints 11706, 11716 to assume the predetermined rest position, if the user desires to utilize the razor 10 in a configuration that differs from the predetermined rest position (which is illustrated, for exemplary purposes only, to resemble the configuration of a traditional razor), a manner of locking the joints may be used. One possible system of locks would include two shaving modes, "Face Mode" and "Body Mode". In Face Mode, the center joint 11716 may be locked in its predetermined rest position but the yoke joint 11706 may be allowed to rotate to a limited degree. This mode is illustrated in FIG. 117. Body Mode (e.g., as generally illustrated in FIG. 119) may be adopted through rotating both joints 11706, 11716 90 degrees, so that the blade cartridge support member 24 rotation axis within the yoke 47 is parallel to the handle longitudinal axis L. Because the DM magnets in this condition would be attempting to return both joints 11706, 11716 to their predetermined rest position, mechanical locks may be used to keep both joints 11706, 11716 at the 90 degree position. The process of changing between Face Mode and Body Mode would involve two actions: 1) Rotating the center joint 11716 90 degrees as shown in FIG. 118 and 2) Rotating the yoke joint 11706 90 degrees (illustrated in FIG. 119), with the resulting configuration shown in FIG. 119. These two actions could be performed in either order.

With reference to FIG. 120, the blade cartridge support member 24 may include one or more limiting protrusions 12002 that are s at least partially received within one or more limiting cavities or groves 12004 formed in the intermediate knuckle 11708 (e.g., portion 11701). Similarly, the handle 60 (e.g., portion 11703) may include one or more limiting protrusions 12006 that are s at least partially received within one or more limiting cavities or groves 12008 formed in the intermediate knuckle 11708 (e.g., portion 11701). Of course, the arrangement of the limiting protrusions 12002, 12006 and limiting grooves 12004, 12008 relative to the blade cartridge support member 24, intermediate knuckle 11708 (portion 11701), and/or handle 60 (portion 11703) may be reversed. The limiting protrusions 12002, 1206 and limiting grooves 12004, 12008 may restrict the movement of the yoke and center joints 11706, 11716 to a predefined range. As may be appreciated, the predefined range does not have to be symmetrical about the predetermined rest position. As such, the limiting protrusions 12002, 1206 and limiting grooves 12004, 12008 may allow, for example, 90 degrees of rotation in one direction and less than 20 degrees in the opposite direction (these values are just for illustrative purposes).

It should be appreciated that any one of the DM magnets may be replaced by one or more programmable magnets (PMs) comprising multiple pole segments. The result would be multiple positions of stable equilibrium instead of just one, which would create the effect of indexing or detents as the blade cartridge support member 24 is rotated about the common axis of the magnets. The blade cartridge support member 24 could thus be placed in any one of several positions for optimal shaving results. The number of possible positions, and thus the resolution of the magnetic detent system, would be limited only by the maximum number of pole segments that could be applied to the magnets.

The above-described embodiments are illustrated wherein the blade cartridge support member 24 would comprise a yoke and a blade cartridge 22, assembled such that the blade cartridge 22 can rotate relative to the yoke 47/arm 30 and return to a known location (the initial starting position, or ISP), though this is not a limitation of the present disclosure unless specifically claimed as such. The blade cartridge 22 may be single-sided, such that the axis of rotation exists close to one longitudinal edge of the blade cartridge 22 and the blade cartridge 22 rotation is limited (e.g. 90 degrees upward only); or it may be double-sided, such that the 114 axis of rotation exists at the geometric center of the blade cartridge 22 and the blade cartridge 22 can rotate a full 360 degrees, with two positions of stable equilibrium, selectable by the user and 180 degrees apart. The attachment of the blade cartridge 22 to the yoke 47/arm 30 and the limitation and control of the rotation of the blade cartridge 22 within the yoke 47/arm 30 could be accomplished in any number of ways that have been described herein, including but not limited to mechanical devices such as a physical axle feature and an RDP (resiliently deformable pawl) or magnetic configurations such as (but not limited to) alternating attracting/repelling magnets, multi-pole or programmable magnets or the like. For example (and without limitation), the blade cartridge 22 may include a double-sided cartridge head whose ISP is determined by a pair of multi-pole magnets, located concentrically to the blade cartridge's axis of rotation.

As described herein (see, for example, but not limited to, FIG. 82), two more magnets may be used to create a hovering/floating effect between two components (e.g., but not limited to, a connection between the handle 60 and the blade cartridge support member 24). Turning now to FIGS. 121-126, one embodiment of a razor 10 having at least two concentric, diametrically magnetized magnets 12102, 12104 to achieve a floating effect between two parts of the razor (e.g., but not limited to, between the blade cartridge support member 24 and the handle 60) that allows motion in two degrees of freedom (angular and axial). The razor 10 may additional include use of a repulsive magnetic force between the DM magnets 12102, 12104 to achieve both a lockout and ejection effect between the two parts.

In particular, the razor 10 includes a diametrically magnetized (DM) disc 12102 attached to one razor part (e.g., but not limited to, the handle 60) is positioned concentric to a diametrically magnetized (DM) ring magnet 12104 attached to the other part (e.g., but not limited to, the blade cartridge support member 24), and the poles are arranged such that opposite poles of the two DM magnets 12102, 12104 face each other in the ID of the ring DM magnet 12104, the effect is to cause the DM magnet 11204 of the blade cartridge support member 24 and disc DM magnet 12102 of the handle 60 to balance, float, or hover, at the point at which the DM magnets 12102, 12104 are coplanar.

According to one embodiment, the blade cartridge support member 24 may include a cavity 12502 (best seen in FIG. 125A) and the handle 60 may include a post 12504 extending axially outward. The post 12504 may include the disc DM magnet 12102 and may be configured to be at least partially received within the cavity 12502 which may include the DM disc magnet 12102 such that the disc DM magnet 12102 may be aligned such that opposite poles of the two DM magnets 12102, 12104 face each other in the ID of the ring DM magnet 12104 (e.g., the float position). The cavity 12502 may also be configured to allow the post 12504 to continue to move forward beyond the float position as described herein. Of course, the arrangement of the DM disc magnet 12102 and DM ring magnet 12104, as well as the cavity 12502 and post 12504, may be reversed, and additional combinations of DM disc magnet 12102 and DM ring magnet 12104 may also be included.

If a suitable gap is left between the mating faces 12506, 12508 (best seen in FIG. 125B) of the blade cartridge support member 24 and handle 60, the blade cartridge support member 24 will appear to float axially with respect to the handle 60 while always returning to the balance point following deflection, thus giving the impression of razor 10 having a small shock absorber between the blade cartridge support member 24 and the handle 60. If the blade cartridge support member 24 is given a small axial and/or angular displacement around the shared axis of the DM magnets 12102, 12104 (as generally illustrated in FIG. 122), the attraction of the two DM magnets 12102, 12104 will cause the blade cartridge support member 24 to return to its original angular position (as generally illustrated in FIG. 121) at the balance point. The range of axial and/or angular displacement within which the attraction of the two DM magnets 12102, 12104 will return the two parts to their original juxtaposition is referred to as the "return range."

Optionally, the post 12504 may include a guide pin 12510 (best seen in FIGS. 125A and 125B) which is received within lockout and/or ejection chamber or groove 12512 disposed in the blade cartridge support member 24. For example, the lockout and/or ejection chamber or groove 12512 may include an opening that allows the guide pin 12510 to be received therein. Once inside the lockout and/or ejection chamber or groove 12512, the movement of the guide pin 12510 (and thus the handle 60 relative to the blade cartridge support member 24) is restricted (e.g., subject to mechanical constraints) to keep the relative motion of the two parts within a return range, with the exception of two conditions outlined below.

The lockout and/or ejection chamber or groove 12512 may have one or more different regions or ranges that allow a predetermined motion and/or generally prevent (e.g., generally fix, retain, and/or lock) motion of the blade cartridge support member 24 relative to the handle 60. For example, one embodiment of a lockout and/or ejection chamber or groove 12512 is generally illustrated in FIGS. 125C and 125D. As may be appreciated, the lockout and/or ejection chamber or groove 12512 may extend radially about a portion of blade cartridge support member 24. FIG. 125C generally illustrates the lockout and/or ejection chamber or groove 12512 having a return range 12514, a lockout range 12516, and/or an eject range 12518 (which allows the guide pin 12510 to either enter and/or exit the lockout and/or ejection chamber or groove 12512), and FIG. 125D generally illustrates the guide pin 12510 disposed in different positions within the ranges 12514, 12516, 12518. FIG. 125E illustrates an alternative embodiment of the lockout (e.g., having a 90 degree lockout) and/or ejection chamber or groove 12512 having a return range 12514, an eject range 12518, and/or an alternative lockout range 12516 (e.g., having a 0 degree lockout), along with the guide pin 12510. It should be appreciated that while the guide pin 12510 is shown in FIGS. 125D and 125E being disposed in multiple ranges at once, this is only for illustrative purposes and that the guide pin 12510 would only be in one range at any given time.

In the absence of a mechanical constraint, when a sufficient angular displacement is applied to the blade cartridge support member 24, the "return range" 12514 is exceeded and the DM magnets 12102, 12104 begin to assume a position at which they mutually repel. In the case of a diametrically magnetized disc/ring pair 12102, 12104, the effect of this repulsion is to impart an axial motion such that the two DM magnets 12102, 12104 no longer remain coplanar. Again in the absence of a mechanical constraint, this axial motion is equally likely to occur in either direction. One possible direction of axial motion has the effect of drawing the two parts together, and the other has the effect of pushing them apart. If a mechanical constraint is added (e.g., the guide pin 12510 and lockout and/or ejection chamber or groove 12512), the direction of axial motion which occurs upon exiting the return range can be controlled based on user input.

Turning now to FIG. 123, the razor 10 is illustrated in a position/alignment that encourages the two parts (e.g., the blade cartridge support member 24 and the handle 60) to draw together when the blade cartridge support member 24 is turned in one particular direction (e.g., but not limited to, clockwise, in the embodiment shown). The guide pin 12510 on the handle 60 (e.g., the post 12504) impacts a ramp within the lockout range 12516 of the lockout and/or ejection chamber or groove 12512, which directs the handle 60 and the blade cartridge support member 24 toward each other as rotation continues, to the point at which the gap closes completely and the parts are in intimate contact after turning 90 degrees relative to each other. The result is a "lockout" or elimination of any floating effect, axial or rotational. As illustrated in FIGS. 123, 125C-D, the lockout may optionally include a detent feature whereby the blade cartridge support member 24 must be manually pulled away from the handle 60 in order to overcome the lockout and return the blade cartridge support member 24 to the floating condition.

Turning now to FIG. 124, the razor 10 is illustrated in a position/alignment that encourages the parts (e.g., the blade cartridge support member 24 and the handle 60) to separate axially. In this case, when the blade cartridge support member 24 is turned in one particular direction (e.g., but not limited to, counterclockwise in this embodiment), the guide pin 12510 impacts a ramp within the eject range 12518 which pushes the blade cartridge support member 24 and the handle 60 away from each other. Because of the interaction of the DM magnets 12102, 12104, this feature can be designed to drive the parts to a point at which they will forcefully separate, resulting in an "ejection" effect, if the guide pin 12510 is given an appropriate escape path. If both of these systems (e.g., the lockout and the ejection) are incorporated into a single device, and the "lockout" and "ejection" occur when the blade cartridge support member 24 is turned in two different directions, the result is as shown in FIGS. 125B and 125D, where the guide pin 12510 can exist within three different ranges—the return range 12514, the lockout range 12516, or the ejection range 12518. In this scenario, the user can choose the action to impart to the blade cartridge support member 24 based on which direction he or she turns the blade cartridge support member 24 relative to the handle 60.

As noted above, FIG. 125E also illustrates an alternative lockout mechanism in which the lockout position is angularly identical to the nominal floating position. This could be useful in the event a user wishes to utilize the razor 10 in the traditional orientation but temporarily disable the shock absorber effect inherent in the design. In this case (e.g., "0 lockout") the lockout is achieved by, in sequence, turning the blade cartridge support member 24 counterclockwise, pushing it inward toward the handle 60, turning it clockwise as far as it will go and releasing it. In doing so, the guide pin 12510 is induced to follow a U-shaped path into a lockout position 12516 which results in the blade cartridge support member 24 being at the same angle at which it started. Releasing the blade cartridge support member 24 from this lockout position 12516 would involve reversing the above steps to place the guide pin 12510 back into the return range 12514.

While the razor 10 has been illustrated having a head assembly 20 (including a blade cartridge support member 24 and a blade cartridge 22) having a two-sided blade cartridge 22, pivoting relative to the arms 30 about a pivot axis PA located at its geometric center, with two positions of stable equilibrium (initial starting positions or ISP's), selectable by the user and 180 degrees apart, this is not a limitation of the present disclosure unless specifically claimed as such and the DM magnets (and any of the associated described features) may be used with any blade cartridge described herein. Additionally, the rotation (and control thereof) can be achieved using any resistive pivot mechanism described herein such as, but not limited to, a RDP (resiliently deformable pawl) or magnetic means such as alternating attracting/repelling magnets (chosen illustratively for FIGS. 121-125), multi-pole or programmable magnets or the like Additionally, any side of the blade cartridge 22 may contain multiple blades angled in the same direction (as in a traditional razor utilized for Face Mode) on one face and/or one or more faces having an even number of blades with half the blades angled in one direction and half angled in the other (to allow shaving in either direction utilized for Body Mode). In such a scenario, the user may find it advantageous to utilize one of the two cartridge head positions when the cartridge is in its floating condition and another when it is locked out. This system can be further arranged into a second fixed position—"Body Mode" (FIG. 126). This embodiment may include a handle/collar optionally having a mechanical pivot 12602 that can lock at 90° downwards from the traditional handle position (FIG. 121) or Face Mode and the yoke/cartridge head assembly 90° Lockout position (FIG. 123). The process of changing between Face Mode and Body Mode would involve two actions: 1) Rotating the collar joint 90 degrees as shown in FIG. 126 and 2) Rotating the yoke joint 90 degrees FIG. 123, with the resulting configuration shown in FIG. 126. These two actions could be performed in either order.

As noted above, while a dual-side blade cartridge 22 is illustrated, this is for illustrative purposes only and the blade cartridge may include a single-sided cartridge head. In such a case, the cartridge head may pivot on an axis close to one longitudinal edge of the blade cartridge support member 24 and fixed between the yoke arms 30. The single ISP could be determined in one of a number of ways described herein, including but not limited, to magnetic arrangements such as a pair of repelling magnets, one of which would reside on the back side of the cartridge head and the other on the leading edge of the web spanning the yoke arms.

With reference to FIGS. 127-138, various embodiment of a razor 10 including magnets to position and control a rotating blade cartridge 22 within blade cartridge support member 24 (e.g., a yoke 47) is generally illustrated. The blade cartridge 22 may be disposed at the end of the arm(s) 30 of the yoke 47, and rotates about a pivot axis PA fixed relative to the arm(s) 30, and may include two orientations of stable equilibrium (also called initial starting positions, or ISP's), 180 degrees apart, to be selected by the user. When in either of these orientations, the blade cartridge 22 may be urged back to return to its ISP when subjected to a small (<90 degrees) angular displacement, for example during a shaving stroke, and that the torque required to accomplish this is produced by combinations of magnets and/or ferrous elements in place of a traditional cartridge biasing mechanism. The limitation and control of the rotation of the blade cartridge 22 within the blade cartridge support member 24 may be accomplished in any number of ways that have been described herein, including but not limited to, mechanical means such as a physical axle feature and a RDP (resiliently deformable pawl) or magnetic arrangements such as alternating attracting/repelling magnets, multi-pole or programmable magnets or the like.

Turning now to FIGS. 127-128, one embodiment of a razor 10 having a resistive pivot mechanism consistent with the above is generally illustrated. As shown, one or more fixed arm magnets 12702 (e.g., but not limited to, a disc magnet) are located within one or more of two arms 30 of the blade cartridge support member 24. The arm magnet 12702 may be located off-axis relative to the pivot axis PA and its orientation is known. A ring magnet 12704 which has been diametrically magnetized in four quadrants alternating between north and south may be disposed within and fixed to one or more of the lateral edges of the blade cartridge 22 and generally faces the fixed arm magnet 12702.

Due to the off-axis position of the arm magnet 12702, the arm magnet 12702 has the ability to transmit a torque to the blade cartridge 22 depending upon the quadrant of the ring magnet 12704 that is adjacent to the arm magnet 12702. As a result, the ring magnet(s) 12704 are oriented such that the when the blade cartridge 22 is in one of its two ISP's, the quadrant of each ring magnet 12704 that is adjacent to its corresponding arm magnet 12702 is of opposite polarity to the adjacent face of the disc magnet 12704. As a result, the blade cartridge 22, when subjected to a small rotational displacement about its pivot axis PA, will be urged back toward its nearest (and most recent) ISP.

To switch between the two possible ISP's, the user will intentionally rotate the blade cartridge 22 in either direction about the pivot axis PA until the rotation has passed 90 degrees, at which angle there is a point of unstable equilibrium when like poles of the ring magnet 12704 and fixed arm magnet 12702 are adjacent to, and thus repelling, each other. This condition is illustrated in FIG. 128. In the absence of any significant source of friction, it is generally not possible to balance the blade cartridge 22 at one of these points of unstable equilibrium, so the blade cartridge 22 will naturally continue to rotate past this point and come to rest at the next ISP, which is the point of stable equilibrium 180 degrees apart from the previous ISP. It should be noted that, given magnets 12702, 12704 of sufficient strength, this same behavior may be able to be attained with magnets 12702, 12704 on only one side of the blade cartridge 22 and in one arm 30 of the blade cartridge support member 24 rather than at both lateral ends of the blade cartridge 22 and arms 30 as generally illustrated.

Turning now to FIGS. 129-130, another embodiment of a razor 10 having a resistive pivot mechanism consistent with the above is generally illustrated. As shown, one or more fixed arm magnets 12902 are located within one or more of two arms 30 of the blade cartridge support member 24, and may have an oblong, oval, and/or elongated shape. The arm magnets 12902 may be magnetized across the thickness (depth) of the magnet. The arm magnet 12902 may be located at least partially off-axis relative to the pivot axis PA and its orientation is known. A blade cartridge magnet 12904 may be disposed within and fixed to one or more of the lateral edges of the blade cartridge 22 and generally faces the fixed arm magnet 12902. The blade cartridge magnet 12904 may also have an oblong, oval, and/or elongated shape, however, the blade cartridge magnet 12904 may have a length 12906 that is longer than the length 12908 of the arm magnet 12902. The blade cartridge magnet 12904 may be magnetized across the thickness (depth) of the magnet.

In this embodiment, the magnets 12902, 12904 are always oriented with opposite poles facing each other, so the repelling qualities of the magnets 12902, 12904 are not utilized. This configuration is illustrated in FIG. 129. The magnets 12904 in the blade cartridge 22 may be centered on the pivot axis PA and oriented such that the length 12906 of the magnet 12902 is parallel to the width 12910 of the blade cartridge 22. The magnets 12902 in the blade cartridge support member 24/arm 30 are shorter and positioned behind and surrounding the pivot axis PA. The driving torque inducing the blade cartridge 22 to assume one of the two ISP's derives from the magnets' 12902, 12904 tendency to align such that the mating surfaces have the maximum overlap area. When an angular displacement is applied to the blade cartridge 22, the overlap area between the magnets 12902, 12904 is reduced due to the long axes of the magnet shapes no longer being aligned. If the angular displacement is small (as shown in FIG. 130) the blade cartridge 22 will return to its nearest (and most recent) ISP when released. As with the above embodiment, there is a position of unstable equilibrium when the magnets 12902, 12904 are oriented 90 degrees to each other. Hence if the displacement exceeds 90 degrees, the blade cartridge 22 will flip to the other ISP, which is the point of stable equilibrium 180 degrees apart from the previous ISP.

Turning now to FIG. 131, yet another embodiment of a razor 10 having a resistive pivot mechanism consistent with the above is generally illustrated. This embodiment is similar to those of either FIGS. 127-128 and/or 129-130, however, the magnets may be replaced with one or more magnetized, nanotube-enhanced thermoplastic zones 13102, 13104 that are molded integrally to the blade cartridge 22 and/or arms 30, respectively. The areas 13102, 13104 denoted in FIG. 131 are for illustrative purposes only. The areas 13102, 13104 indicated may not be detectable or visible on the final end product. These areas 13102, 13104 may be programmed such that opposite poles face each other across the gap between the inner surface of the yoke arm and the side surface of the blade cartridge 22; as such, repulsion is not utilized and the behavior of the blade cartridge 22 is driven entirely by varying levels of attraction between the magnetized zones. The ISP's are determined by the blade cartridge 22 positions at which overlap between the magnetized zones 13102, 13104, and hence attraction, is greatest. As is the case with the embodiment of FIGS. 129-130, when the blade cartridge 22 is given a small rotational displacement (<90 degrees), the reduction of overlap area and attraction between the two magnetized zones 13102, 13104 serves to return the blade cartridge 22 to its nearest (and most recent) ISP. When the blade cartridge 22 is rotated 90 degrees from an ISP, it encounters a position of unstable equilibrium and will flip to the other ISP, which is the point of stable equilibrium 180 degrees apart from the previous ISP.

Turning now to FIG. 132, an additional embodiment of a razor 10 having a resistive pivot mechanism consistent with the above is generally illustrated. This embodiment is similar to the embodiment described in FIGS. 129-130, however, one or more of the oblong magnets in the blade cartridge 22 and/or arm 30 may be replaced with ferrous elements. In the illustrated embodiment, the blade cartridge magnet 12904 in the blade cartridge 22 have been replaced with ferrous elements 13202, though it should be appreciated that the arm magnet 12902 may be replaced with a ferrous element and that the blade cartridge magnet 12904 may remain.

Because the embodiment described in FIGS. 129-130 does not make use of repulsion, and the behavior of the blade cartridge 22 in FIG. 132 is governed by varying levels of attraction between the magnetic element 12902 and the ferrous element 13202 as the blade cartridge 22 rotates about its pivot axis PA, it is feasible to replace one set of magnets 12902, 12904 with ferrous bars 13202. This would may offer advantages from cost and manufacturability standpoints while offering similar performance to the paired-magnet 12902, 12904 scenario featured in FIGS. 129-130.

As noted above, the combination of a magnet (either magnet 12902 or magnet 12904) may be disposed in both arms 30 and ends of the blade cartridge 22 (as generally illustrated in FIG. 132) or a single arm 30 and single end of the blade cartridge 22 as generally illustrated in FIG. 133. With reference to FIGS. 134-135, the configuration of FIG. 132 may be modified to remove the arm 30 that does not include a magnet. In this embodiment, the blade cartridge 22 is both constrained and controlled by a single yoke arm 30 and the pivot axis PA is cantilevered from the end of the arm 30 rather than spanning the distance between two symmetrical yoke arms 30 as generally illustrated in FIG. 133. The pivot axis PA for the blade cartridge 22 may be designed such that the blade cartridge 22 can slide off the axle 13502, as generally illustrated in FIG. 135. In this case, the magnetic element(s) (e.g., magnet in the arm 30 and ferrous bar and/or magnet in the blade cartridge 22) serve not only to position the blade cartridge 22 angularly relative to the arm 30, but also to hold the blade cartridge 22 onto the arm 30. Replacing of the blade cartridge 22 would be a simple matter of pulling laterally on the used blade cartridge 22 to overcome the magnetic resistance, sliding the blade cartridge 22 off the axle 13502 and sliding a new blade cartridge 22 on. Due to the magnetic attraction between the arm magnet 12902 and the body ferrous element 13202, the new blade cartridge 22 would adopt its proper position laterally and also adopt one of the two ISP's automatically.

The razors 10 of FIGS. 127-135 are shown having a user-replaceable, disposable blade cartridge 22 that is removable from the handle 60. This could be accomplished in one of a number of ways that have been described in herein, including but not limited to magnetic configurations (e.g., but not limited to, mating diametrically magnetized (DM) discs and/or rings or magnetic detent/snap systems) or mechanical/magnetic configurations such as a modified twist/lock/eject system. In addition (or alternatively), only the blade cartridge 22 may be replaced and the blade cartridge support member 24 may remain part permanently coupled/integrated into the handle 60. In such an embodiment, part or all of the blade cartridge support member 24 would remain with the handle 60 when the blade cartridge 22 are being replaced, rather than being discarded with the blade cartridge 22. These variants offer the advantage of reducing the material usage and part count in the disposable portion of the razor system.

Turning now to FIGS. 136-137, a variation of the embodiment of FIGS. 129-130 is generally illustrated. Whereas the blade cartridge 22 is generally permanently coupled to the blade cartridge support member 24 in the embodiment of FIGS. 129-130, the pivot axle 13602 of FIGS. 136-137 is fixed to the blade cartridge 22 rather than the arm 30, and passageways/grooves/slots 13604 are provided in the arm 30 and/or magnets 13606 to allow the blade cartridge 22 and axle 13602 to be removed from the arm 30. In one embodiment, the slots 13602 may include blind slots that extend through the ends of the arms 30 and end at the desired axis of rotation. The blade cartridge 22 may be held magnetically in the arm 30 due to the fact that the yoke magnets 13606 exist behind the pivot axis PA and, in addition to determining the ISP's, also tend to pull the blade cartridge 22 into the arm 30 until the axle 13602 reach the ends of the blind slots 13604. Replacement of the blade cartridge 22 may involve pulling on the used blade cartridge 22 in a direction away from the handle 60 to overcome the magnetic resistance, removing the blade cartridge 22 and axle 13602, and sliding the axle 13602 of the new blade cartridge 22 into the slots 13604 as generally illustrated in FIG. 137. It should be appreciated that the ferrous element 13202 on the blade cartridge 22 may be replaced with one or more magnets, and the yoke magnets 13606 may be replaced with a ferrous element.

Turning now to FIG. 138, a further embodiment of a razor 10 having a resistive pivot mechanism consistent with the above is generally illustrated. The razor 10 includes two-piece arms 30 having a first portion 13802 permanently coupled to the blade cartridge support member 24 and a second portion 13804 coupled to the blade cartridge 22. The first portion 13802 of the arms 30 includes an arm magnet 13806 having its poles aligned with a blade cartridge magnet 13808 coupled to the blade cartridge 22 to create an attractive magnetic force thereby coupling the blade cartridge 22 to the blade cartridge support member 24. The second portion 13804 may include a cavity 13810 to allow the blade cartridge magnet 13808 to rotate about the pivot axis PA.

For example, a pair of mortise-and-tenon style features may be used to attach each yoke arm tip (e.g., second portion 13804) to the yoke frame (e.g., first portion 13802). Because the yoke arm tips 13804 already have magnets present for blade cartridge 22 positioning purposes (see, e.g., the embodiment of FIG. 132), these magnets can also be used to hold the yoke arm tips 13804 in place if additional magnets or ferrous elements are positioned in the yoke frame 13802 at the junctions between the frame and tips. Removal of the blade cartridge 22 in this instance would involve pulling on the used blade cartridge 22 in a direction away from the handle 60 to overcome the attraction between the magnets in the yoke arm tips 13804 and the magnets or ferrous elements in the yoke frame 13802, and sliding the mortise-and-tenon features apart. The new blade cartridge 22 may be installed by aligning the mortise-and-tenon features on both yoke arm tips 13804 with their corresponding features in the yoke frame 13802, and allowing the magnetic attraction between the elements in the tips 13804 and frame 13802 to complete the attachment. This embodiment may include magnets in both yoke arms 30 (if two arms 30 are present), not only because they are used to affix the yoke arm tips 13804 to the frame 13802, but also because they would assist in aligning the yoke arm tips 13804 relative to the blade cartridge 22 in the same orientation which would be required to properly and simultaneously mate the mortise-and-tenon features on each side during installation of a new blade cartridge 22.

Turning now to FIG. 139, one embodiment of a razor 10 which includes nanotube sheets, strips or threads 13902 incorporated into the disposable head assembly 20 (e.g., but not limited to, the blade cartridge 22) is generally illustrated. The nanotube sheets, strips or threads 13902 may be energized by electric current to warm the skin of the user during shaving. Warmth from the nanotube sheets, strips or threads 13902 is conveyed via IR radiation bands. For example, far infrared radiation (FIR) transfers energy purely in the form of heat which can be perceived by the thermoreceptors in human skin and is felt almost instantaneously. FIR is experienced by the user's body as gentle radiate heat which can penetrate up to 1.5" beneath the skin. FIR is both absorbed and emitted by the human body, so heat generated by the nanotubes is perceived as natural and potentially therapeutic in feel. Nanotube fibers have been successfully impregnated in fabrics, wraps, and garments to deliver FIR to attain health benefits form its effects. Of significance is that the nanotube sheets, strips or threads 13902 are not used to heat any part of the razor 10, but rather only to heat the user's skin. As such, the razor 10 may feel "cool" (e.g., ambient temperature) to the touch.

A power source (e.g., batteries) may be connected electrically to nanotube sheets, strips or threads 13902 which are mounted on, in, or near to the face of a blade cartridge 22, for example, as generally illustrated in FIG. 139. Heating may be controlled by the user through the activation of an electrical switch located on the razor 10 (e.g., the handle 60 and/or the head assembly 20). The batteries or another power source may be located within some section of the razor assembly (e.g. the handle 60) or external to it, and electrical current may flow through the nanotube sheets, strips or threads 13902 via wires or other electrical connections. The nanotube sheets, strips or threads 13902 may be applied to any head assembly 20 described herein.

With reference to FIGS. 139 and 140, another embodiment of a resistive pivot mechanism and a coupling mechanism is generally illustrated. In particular, the pivot axle 14002 (best seen in FIG. 140) may include a ferrous material that is fixed to the blade cartridge 22. U-shaped or slotted magnets 14004 are mounted in the tips of the yoke arms 30, the shape of the magnets 14004 defining a passageway having an opening to allow the blade cartridge 22 (e.g., the axles 14002) to be removed. FIG. 139 generally illustrates the blade cartridge 22 installed/coupled to the blade cartridge support member 24. The passageways are illustrated as blind slots that extend through the ends of the arms 30 and into the magnets 14004, ending at the location of the desired axis of rotation. Because of the intimate contact between the ferrous axle 14002 and the U-shaped magnets 14004, the blade cartridge 22 is held magnetically in the arms 30 and the pivot axis PA is correctly positioned with the axle tips at the ends of the blind slots. Replacement of the blade cartridge 22 involves pulling on the used blade cartridge 22 in a direction away from the handle 60 to overcome the magnetic force binding the ferrous axle 14002 to the magnets 14004, removing the blade cartridge 22 and axle 14002, and sliding the axle 14002 of the new blade cartridge 22 into the slots. The magnetic attraction between the ferrous axle 14002 and the slotted magnets 14004 completes the assembly process. Optionally, the previously described assembly and ISP mechanism can be replaced by the utilization of a programmed magnetic axle (particularly the tips) seating into a slotted programmed magnet receptacle (Magnet with slot to receive pivot pin/s).

Turning now to FIGS. 141-142, one embodiment of pivotably coupling the blade cartridge 22 to the blade cartridge support member 24 using a plurality of magnets is generally illustrated. As explained herein, the connection between the blade cartridge 22 and the blade cartridge support member 24 may appear as if the blade cartridge 22 is hovering with respect to the blade cartridge support member 24.

In particular, the blade cartridge 22 is able to rotate about a pivot axis PA fixed relative to the yoke arms 30, but have the tendency to return to its initial starting position (ISP) when subjected to a small (<90 degree) angular displacement, for example during a shaving stroke. In addition, this behavior is desired to be accomplished in the absence of a traditional axle feature, such that the blade cartridge 22 "hovers" (or appears to hover) while remaining centered on its pivot axis PA, and in the absence of a traditional mechanical biasing mechanism.

To create this effect, a pair of round magnets 14202, 14204 (best seen in FIG. 142) is mounted concentric to the pivot axis PA in each arm 30 and each lateral end of the blade cartridge 22, respectively. A pair of small, axially magnetized disc magnets 14206, 14208 are mounted opposing each other, one 14206 fixed to the lateral ends of the blade cartridge 22 and one 14208 fixed to the yoke arm 30. These magnets 14206, 14208 are oriented such that they repel each other, which in the absence of the identical magnet pair on the opposite side of the blade cartridge 22 would tend to push the blade cartridge 22 away from the yoke arm 30; however due to the pair 14206, 14208 on the opposite end, the two repulsion forces cancel each other out and result in the blade cartridge 22 being centered between the yoke arms 30.

In the absence of additional forces, the blade cartridge 22 would not remain coaxial to the repelling magnets because that position would be one of unstable equilibrium; the blade cartridge 22 would be forced to separate radially from the blade cartridge support member 24. However, surrounding the pair of small axially magnetized discs 14206, 14208 is a pair of larger diametrically magnetized rings 14202, 14204. As with the discs 14206, 14208, one ring 14204 is fixed to the blade cartridge 22 and the other 14202 is fixed to the yoke arm 30. However, these rings 14202, 14204 are oriented such that when the blade cartridge 22 is at its ISP, the opposite poles of the rings 14202, 14204 are adjacent to one another, such that they attract. This arrangement (stacked face to face) of diametrically magnetized rings 14202, 14204 have a tendency to remain positioned coaxially to one another. It is this force that counteracts the radial force imparted by the pairs of repelling discs 14206, 14208 and keeps the blade cartridge 22 positioned within the yoke arms 30 on the pivot axis PA. Furthermore, two stacked diametrically magnetized rings 14202, 14204 which are positioned with opposite poles adjacent to one another remain concentrically located even when subjected to a limited amount of rotation relative to each other about their shared axis, under which condition the magnets 14202, 14204, upon release, tend to rotate back to their preferred juxtaposition with their opposite poles adjacent. It is this feature that leads to the desired biasing behavior as described above. Thus, the task of the inner, axially magnetized disc magnets 14206, 14208 is to create the hovering effect, while the task of the outer, diametrically magnetized ring magnets 14202, 14204 is to keep the blade cartridge 22 positioned on the pivot axis PA and to return it to its ISP when it is subjected to a small rotational displacement.

A variation of this is to incorporate multi-pole, or programmed, magnetic rings in place of the diametrically magnetized rings 14202, 14204. These magnets, like the diametrically magnetized rings 14202, 14204, would be positioned such that their opposite poles were adjacent to each other, however there would be more than two poles per magnet. This would result in there being multiple ISP's or positions of stable equilibrium. A special case of this scenario would utilize four-pole rings, resulting in two ISP's 180 degrees apart. The embodiment is particularly suited for use with a double-sided cartridge head 22, which the user could position at will at one of two possible ISPs.

The blade cartridge 22 may be replaced along with the blade cartridge support member 24 according to any embodiment described herein; however, it is also possible that only the blade cartridge 22 may be removed and that the blade cartridge support member 24 may be integral to the handle 60.

With reference to FIG. 143, the repelling disc magnets 14206, 14208 may optionally include a mating feature such as, but not limited to, dimples 14302 on one magnet and a bump 14304 on the other, located along the pivot axis PA. The bump 14304 may be configured to be at least partially received within the dimple 14302 to introduce an additional element of control in that the blade cartridge 22 may allowed a small amount of radial movement relative to the pivot axis PA, but not be able to be dislodged completely. In such an instance, the blade cartridge support member 24 and blade cartridge 22 may be compose as permanent assembly, and an attachment mechanism between the blade cartridge support member 24 and handle 60 such as was described above may be used.

Turning now to FIGS. 144-146, another embodiment of a razor 10 that may be selectively arranged in either "Face Mode" and "Body Mode" is generally illustrated. In Face Mode, it is anticipated that the blade cartridge 22 will be perpendicular to the handle 60 in the top view, and will have an ideal starting angle relative to the plane of the skin surface that is non-zero. In Body Mode, it is anticipated that the blade cartridge 22 will be parallel to the handle 60 in the top view, and is also best positioned parallel to the plane of the skin surface. As described herein, the razor 10 includes a compound-curvature track 14402 to produce multiple positions of a blade cartridge 22 with respect to the handle 60 (e.g., the Face Mode and Body Mode) and automatically changes the cartridge head ISP (initial starting position) based on the position of the blade cartridge 22 being in either the Face Mode or Body Mode. The compound-curvature track 14402 therefore not only repositions the alignment of the blade cartridge 22 with respect to the handle 60, but also automatically alters the IPS as part of the reorienting of the blade cartridge 22 relative to the handle 60.

The pivoting of the blade cartridge 22 about the pivot axis PA may be accomplished using any embodiment described herein, and may optionally include any resistive pivot mechanism or any combination described herein. Additionally, in the illustrated embodiment one side of the blade cartridge 22 may include multiple blades angled in the same direction (as in a traditional razor) and the other side may include an even number of blades with half the blades angled in one direction and half angled in the other (to allow shaving in either direction). These two sides will be referred to as the "Face Side" and the "Body Side" respectively.

Face Mode is illustrated in the several views in FIG. 144, and Body Mode is illustrated in FIG. 145. The transition between the two modes may be accomplished through the use of the compound-curvature track 14402 including a pair of helical tracks 14404, 14406 (e.g., an upper track 14404 and a lower track 14406) that traverse a compound curve along the perimeter of the blade cartridge support member 24. Engaging these tracks 14404, 14406 are three guide pins 14408*a*, 14408*b*, 14408*c* located in a groove in the collar (affixed to the razor handle 60). Two pins 14408*a*, 14408*b* engage one track 14404 and one pin 14408*c* engages the other track 14406. As illustrated in FIGS. 144 and 145, the two pins 14408*a*, 14408*b* engage the top track 14404 and the single pin 14408*c* engages the bottom track 14406, however this could be reversed with the same results. Changing the position of the blade cartridge 22 (e.g. from Face Mode to Body Mode) involves nothing more than sliding the blade cartridge support member 24 through the groove in the collar. Because three points of contact are sufficient to fully locate the blade cartridge support member 24 in space, the blade cartridge support member 24 is constrained to change its angle as it is being moved through the groove. The helical tracks 14404, 14406 force the blade cartridge support member 24 to reorient itself during this operation such that when the movement is complete and the blade cartridge 22 position relative to the handle 60 has been changed from perpendicular to parallel, the blade cartridge 22 has also changed from being angled to being parallel to the plane of the skin. At this point the blade cartridge 22 can optionally be rotated within the blade cartridge support member 24 from the Face Side to the Body Side.

An optional feature may include multiple detents spaced throughout the range of motion of the blade cartridge support member 24 within the collar, with the purpose of helping to keep the blade cartridge support member 24 in a selected position during shaving strokes. As illustrated in FIGS. 144, 145, two detents 14410*a*, 14410*b* are included, one at each extreme of motion (e.g., corresponding to the Body Mode and Face Mode, respectively). These detents 14410*a*, 14410*b* could be accomplished using one of several possible methods, including a spring-loaded plunger (illustrated) 14420 or mating magnets. An additional optional feature may include a customizable, removable/replaceable dress plate which could exist on the blade cartridge support member 24 in the area spanned by the compound curved feature 14402 which contains the helical tracks 14404, 14406. This dress plate could be used for branding and/or printed instructions or iconography intended to assist the user in selecting the appropriate yoke position.

A design consideration is the angle formed between the razor handle 60 and the blade cartridge 22 in the side view when the blade cartridge 22 is in Body Mode (see, e.g., FIG. 145). This angle is dictated by the degree of twist in the helical track 14402 as it traverses the perimeter of the blade cartridge support member 24 (zero twist would result in the blade cartridge 22 and handle 60 being perfectly parallel in the side view). The designer can select this angle to maximize the number of possible ways to hold the razor 10, especially when shaving hard-to-reach areas. Optionally, there may be tracks 14402 on both sides of the blade cartridge support member 24 rather than just one. In such a case, the range of motion of the blade cartridge support member 24 within the collar would be doubled: The center position may represent Face Mode and there may be two Body Mode positions, one at each end of the tracks 14402. Because the tracks 14402 on the two sides would be independent of each other, the two Body Mode positions could be mirror images of each other (i.e. the only difference would be the side of the handle 60 to which the blade cartridge support member 24 was moved) or they could have different degrees of twist. In such a case, the user could, by choosing which side to slide the blade cartridge support member 24 to, have his or her choice of two resultant angles between the handle 60 and blade cartridge 22 in the side view.

Additionally, the razor 10 may automatically move the blade cartridge 22 to present the Face Side or the Body Side to the skin surface depending upon which mode was selected by the user via his or her positioning of the blade cartridge support member 24 (in Face Mode or Body Mode, respectively). This could be accomplished with a system of cams or gears or through some other configuration. A consideration for such a design would be whether or not the blade cartridge 22 was constrained by the mechanical system to adopt the orientation corresponding to the blade cartridge support member 24 position, or if the user would still have the option to override the system and place the blade cartridge 22 in either orientation.

An additional optional feature is illustrated in FIG. 146. In this configuration, the end of the handle 60 or collar is adapted to include a feature which appears to blend into the curve of the blade cartridge support member 24. In either the configuration with or without this feature, the durable/disposable boundary could be at the juncture between the blade cartridge support member 24 and the collar, the collar and handle, or between the blade cartridge 22 and blade cartridge support member 24. Attachment and release of the disposable portion from handle to the yoke/cartridge head may be achieved using any configuration described herein.

Turning now to FIGS. 147-149, one embodiment of a magnetic biasing system 14702 for urging a blade cartridge to an initial starting position (ISP) is generally illustrated. The magnetic biasing system 14702 may include one or more blade cartridge magnets 11410 (only one shown for clarity) and one or more blade cartridge support member magnets 11412 having their poles configured to generate a repulsive magnetic force that urges the blade cartridge 22 away from blade cartridge support member 24 about the pivot axis PA. In the illustrated embodiment, the magnetic biasing system 14702 is configured to urge the blade cartridge 22 in the direction generally illustrated by arrow 14704; however, it should be appreciated that blade cartridge 22 may be rotated in any direction including, but not limited to, a direction generally opposite of arrow 14704.

According to one embodiment, the blade cartridge magnets 11410 may be located on the back side 11409 of a single-sided blade cartridge 22 (e.g., a side of the blade cartridge 22 generally opposite to the razor blades which are disposed on the front side 14712). For example, the blade cartridge magnets 11410 may be located above the pivot axis PA (e.g., closer to the top edge 14714 of the blade cartridge 22 which is furthest away from the handle 60). The repulsive magnetic force generated by the repulsive magnets 11410, 11412, along with the blade cartridge magnets 11410 being located above the pivot axis PA, urges the blade cartridge 22 to rotate in the direction of arrow 14704 about the pivot axis PA towards the initial starting position (ISP).

The blade cartridge support member 24 and/or blade cartridge 22 may optionally include one or more IPS protrusions, shoulders, ridge, and/or extensions 9328 that sets the Initial Starting Position (ISP) of the blade cartridge 22 relative to the blade cartridge support member 24 and the handle 60. As may be appreciated, the ISP is the position of the blade cartridge 22 relative to the blade cartridge support member 24 and the handle 60 when no force is applied and the position that the blade cartridge 22 returns to after an external force has been removed. Put another way, when an external force is applied to the blade cartridge 22 during shaving, the external force may overcome the repulsive magnetic force between the blade cartridge magnets 11410 and the blade cartridge support member magnets 11412 such that the blade cartridge 22 moves in a direction generally opposite to arrow 14704. When the external force is removed and/or reduced, the repulsive magnetic force between the magnets 11410, 11412 urges the blade cartridge 22 back towards the IPS. The ISP protrusion 9328 thus sets the initial starting position of the blade cartridge 22 relative to the blade cartridge support member 24 and limits the rotation of the blade cartridge 22 in the direction of arrow 14704 and also limits/prevents the over rotation of the cartridge during a shaving stroke.

In the illustrated embodiment, the ISP protrusion 9328 is located on the inside of one or more of the yoke arms 30 below the pivot axis PA (e.g., proximate to the yoke 47), though as mentioned, this is not a limitation of the present disclosure unless specifically claimed as such. The ISP protrusion 9328 therefore sets or defines the 0 position of the blade cartridge 22. The blade cartridge 22 may rotate about the pivot axis PA within a predefined rotation range. For example, the predefined rotation range may be up to 100 degrees, for example, less than 90 degrees or less than 45 degrees. The rotation of the blade cartridge 22 in the direction generally opposite to arrow 14702 may also be limited by ISP protrusion 9328 and/or another protrusion, shoulder, ridge, and/or extension. This embodiment offers the advantage of generating a return force over a greater range of angular displacement relative to a spring—exceeding 90 degrees, given appropriate adjustments to the surrounding geometrical constraints.

While the repulsive magnet 11410, 11412 are illustrated being located in the center of the blade cartridge support member 24 and blade cartridge 22, the repulsive magnets 11410, 11412 may be located anywhere along the blade cartridge support member 24 and/or blade cartridge 22. Moreover, while the repulsive magnets 11410, 11412 are illustrated as being visible, this is for illustrative purposes only and one or more of the repulsive magnets 11410, 11412 may be embedded into the blade cartridge support member 24 and/or blade cartridge 22. Optionally, the blade cartridge support member magnets 11412 may be located in one or more protrusions (e.g., "turrets") 14716 the may extend outwardly from a portion of the blade cartridge support member 24 generally toward the blade cartridge 22. The turret 14716 may allow the blade cartridge support member magnet 11412 to be located closer to the blade cartridge magnet 11410, thereby increasing the repulsive magnetic force urging the blade cartridge 22 toward the IPS. Additionally, the turret 11416 may increase the overall clearance between blade cartridge 22 and the blade cartridge support member 24, thereby allowing the blade cartridge 22 to pivot about the pivot axis PA more freely during use (e.g., to allow for room for shaving cream, debris/hair, etc.).

It should be noted that the blade cartridge support member magnet 11412 does not necessarily need to be a separate magnet in the assembly, but rather one or more of the magnets described herein for coupling the blade cartridge support member 24 to handle 60 can be utilized to generate the repulsive magnetic force with the blade cartridge support member magnet 11410 in the blade cartridge 22. Additionally, it is possible that one or more of the razor blades of the blade cartridge 22 may be magnetized to form the blade cartridge magnet 11410.

While the magnetic biasing system 14702 is illustrated in combination with a single-sided blade cartridge 22, it should be appreciated that this is not a limitation of the present disclosure unless specifically claimed as such and that the magnetic biasing system 14702 may be used with multi-sided blade cartridge 22 (e.g., dual-sided blade cartridge 22). For example, the blade cartridge 22 may include multiple blade cartridge magnets 11410 disposed on opposite sides of a multi-face blade cartridge 22 having their poles aligned in opposite directions such that when the blade cartridge 22 is rotated to a selected face, the blade cartridge support member magnet 11412 associated with the selected face (e.g., the blade cartridge magnet 11410 closest to the support member magnet 11412) has its pole aligned with the blade cartridge support member magnet 11412 to generate the repulsive magnetic force.

The magnetic biasing system 14702 may be used with any handle 60 head assembly described herein including, but not limited to, disposable head assemblies 20 (e.g., including embodiments wherein both the blade cartridge support member 24 and blade cartridge 22 are removably coupled to the handle 60 and/or embodiments wherein only the blade cartridge 22 is removably coupled to the blade cartridge support member 24, and the blade cartridge support member 24 remains part (e.g., integral or unitary component) of the handle 60) as well as head assemblies that are integral or unitary components of the handle 60 (e.g., disposable razors in which the blade cartridge cannot be removed from the handle 60). Additionally, while the magnetic biasing system 14702 is illustrated in combination with a single-sided blade cartridge 22, it should be appreciated that this is not a limitation of the present disclosure unless specifically claimed as such and that the magnetic biasing system 14702 may be used with multi-sided blade cartridge 22 (e.g., dual-sided blade cartridge 22).

In the illustrated embodiment, the blade cartridge support member 24 is coupled to the handle 60 using any mechanical connection and/or fastener described herein and/or known to those skilled in the art (e.g., but not limited to, removable fastener/clip 14902 as generally illustrated in FIG. 149). Alternatively (or in addition), any of the magnetic connections described herein may be used to couple the blade cartridge support member 24 to the handle 60.

With reference to FIG. 150, a razor 10 is generally illustrated having one or more magnets 15002, 15004 disposed on the blade cartridge support member 24 and blade cartridge 22, respectively, having their poles aligned to create an attractive magnetic force. In particular, the blade cartridge magnet 15004 may be disposed on the back side 11409 of the blade cartridge 22, below the pivot axis PA (e.g., closer to the blade cartridge support member 24 and generally opposite of the top edge 14714). The blade cartridge support member magnet 15002 may be disposed anywhere on the blade cartridge support member 24 provided that the attractive magnet is generated. The attractive magnetic force may urge the blade cartridge 22 in the direction generally opposite to arrow 14704 to the ISP as illustrated in FIG. 150. As the user applies a force against the blade cartridge 22 during shaving, the external force may overcome the attractive magnetic force and the blade cartridge 22 may move generally in the direction of arrow 14704. As the external force is removed and/or reduced, the attractive magnetic force may urge the blade cartridge 22 generally in the direction opposite of arrow 14704 back to the ISP. One or more ISP protrusions 9328 may be located blade cartridge support member 24 above and/or below the pivot axis PA to limit motion of the blade cartridge 22 in either direction and/or to set/establish the IPS. It should be appreciated the attractive magnetic force generated by magnets 15002, 15004 may optionally be combined with one or more of the magnets 11410, 11412 to generate both an attractive magnetic force and a repulsive magnetic force (in the same and/or opposite directions).

It should also be appreciated that any one or more of the magnets 11410, 11412 and/or 15002, 15004 may be replaced with nanoparticle magnets as described herein. The nanoparticle magnets may be embedded (e.g., molded into) one or more portions of the blade cartridge support member 24 and/or blade cartridge 22, and may be programed to have the desired poles to create the repulsive magnetic force and/or attractive magnetic force to urge the blade cartridge 22 to the IPS.

Various embodiments have been illustrated herein having a magnetic biasing system 14702 generally consistent with FIGS. 147-149; however, it should be appreciated that this is for illustrative purposes only and that other biasing systems described herein may be used.

With reference to FIG. 151, one embodiment of a blade cartridge 22 including a blade retention clip 14720 for mounting, securing, and/or otherwise coupling one or more (e.g., a plurality) of razor blades 142 is generally illustrated. The blade retention clip 15120 described herein may be used for mounting, securing, and/or otherwise coupling any razor blade known to those skilled in the art, and is not limited to any of the embodiments described herein unless specifically claimed as such. Additionally (or alternatively), the blade retention clip 15120 may be used for mounting, securing, and/or otherwise coupling any shaving aid(s) 160, skin engaging strip(s) 170, skin lubricating strip(s) 172, 176, skin lubricating and/or moisturizing strip(s) 174 (not shown), or the like. As such, the blade retention clip 15120 may be used for mounting, securing, and/or otherwise coupling one or more razor blades 142 and/or any combination of shaving aid(s) 160, skin engaging strip(s) 170, skin lubricating strip(s) 172, 176, skin lubricating and/or moisturizing strip(s) 174, or the like.

As discussed herein, the blade cartridge 22 may include a housing and/or frame 188 which may be formed of plastic or metal, such as stainless steel. The blade cartridge 22 (e.g., frame/housing 188) may include a front edge region 157, a rear/aft edge region 159, a first lateral edge region 161, and a second lateral edge region 163. In the illustrated embodiment, a blade retention clip 15120 is used at each longitudinal end 150, 152 of the razor blade 140, though this is for illustrative purposes and only one lateral end 150, 152 of the razor blade 142 may be secured with a blade retention clip 15120.

Turning now to FIG. 152, one embodiment of a blade retention clip 15120 may be configured to be at least partially received within a retention cavity 3522 formed in the blade assembly 22 (e.g., the frame 188) is generally illustrated. With reference to both FIGS. 152 and 153A, the blade retention clip 15120 may include one or more legs or extensions 3526 extending outward (e.g., downward) from a base region 3528 (which may extend across the mounting width Wm of one or more of the razor blades 142, shaving aid(s) 160, skin engaging strip(s) 170, skin lubricating strip(s) 172, 176, skin lubricating and/or moisturizing strip(s) 174, or the like that are being retained by the blade retention clip 15120). The blade retention clip 15120 may allow the blade(s) 140 to be loaded/inserted from the outside/exterior (front and/or rear) of the blade cartridge 22, for example, during the assembly of the blade cartridge 22.

The blade retention clip 15120 may optionally include one or more blade retention clip magnets 15122 (best seen in FIG. 153A). The blade retention clip magnets 15122 may be configured to secure and/or aid in securing the blade retention clip 15120 to the blade assembly 22 (e.g., frame 188). For example, the blade retention clip magnets 15122 may be configured to generate an attractive and/or repulsive magnetic force with one or more frame magnets 15124 (FIG. 152). The frame magnets 15124 (FIG. 153B) may be located anywhere on the blade assembly 22 (e.g., frame 188). In the illustrated embodiment, the frame magnets 15124 are located proximate to the sidewalls 3532 of the blade cavity 3522, though this is not a limitation of the present disclosure unless specifically claimed.

Turning now to FIGS. 154-155B, a portion of the legs 3526 (e.g., the distal region) of the blade retention clip 15120 may optionally include one or more barbs or the like 3530. The barbs 3530 may be configured to engage against a portion of the surface 3532 (FIGS. 154 and 155B) of the sidewall of the blade cavity 3522 to generally retain, secure, mount, and/or couple the blade retention clip 15120 to the blade cavity 3522/blade assembly 22, and therefore generally retain, secure, mount, and/or couple the razor(s) 140 to the blade cavity 3522/blade assembly 22. The surface 3532 (FIGS. 154 and 155B) of the sidewall of the blade cavity 3522 may optionally include a shoulder, recess, and/or groove 3534 configured to engage the barb 3530 and create a mechanical connection to further facilitate retaining the blade retention clip 15120 within the blade cavity 3522.

The magnetic force generated by the blade retention clip magnets 15122 and/or frame magnets 15124 may be configured to urge the legs 3526 into engagement (e.g., frictional and/or form lock connections). In the illustrated embodiment, the magnetic force generated by the blade retention clip magnets 15122 and/or frame magnets 15124 may be configured to urge the barbs 3520 into contact with at least a portion of the surface 3532 (FIG. 154) of the sidewall of the blade cavity 3522 (e.g., shoulder 3534) to generally retain, secure, mount, and/or couple the blade retention clip 15120 to the blade cavity 3522/blade assembly 22, and therefore generally retain, secure, mount, and/or couple the razor(s) 140 to the blade cavity 3522/blade assembly 22.

It should be appreciated that the blade cartridge 22 does not have to have both the blade retention clip magnets 15122 and the frame magnets 15124, but rather may include only one of the magnets 15122, 15124. For example, FIGS. 156-157B generally illustrate one embodiment in which only the blade retention clip 15120 includes a blade retention clip magnet 15122 (i.e., the frame 188 does not include the frame magnet 15124). In particular, one or more blade retention clip magnets 15122 may be magnetically attracted towards one or more ferrous members 15602 (e.g., ferrous strips, ferrous plates, or the like) secured to a portion of the frame 188 (e.g., but not limited to, proximate to sidewalls 3532 of the blade cavity 3522), thereby securing the blade retention clip 15120 within the blade cavity 3522. Again, this is merely one example, and other embodiments are possible such as, but not limited to, the frame 188 including one or more frame magnets 15124 configured to be magnetically attracted towards one or more ferrous members 15602 of the blade retention clip 15120.

Referring now to FIGS. 158-161, another embodiment of a shaving device 10 is generally illustrated. In particular, FIG. 158 generally illustrates one embodiment of the shaving device 10 in an assembled state, FIG. 159 generally illustrates the shaving device 10 of FIG. 158 in an exploded, unassembled state, FIG. 160 is a cross-sectional view of the shaving device of FIG. 158 taken along lines C160-C160, and FIG. 161 is a cross-sectional view of the shaving device 10 of FIG. 159 taken along lines C161-C161.

The shaving device 10 may include a head assembly 15820 and a handle 15860. The head assembly 15820 comprises a blade cartridge 15822 and a blade cartridge support member 15824. As shown, blade cartridge support member 15824 comprises a generally U-shaped cartridge support frame 15826 including at least one arm 15830, though this is not a limitation of the present disclosure unless specifically claimed and the support frame 15826 may include any configuration. The support frame 15826 may be either permanently coupled and/or integral with the handle 15860 (e.g., a unitary piece with the handle 15860) or may be removably coupled to the handle 15860 in any manner known to those skilled in the art and/or described herein.

The blade cartridge 15822 is configured to be pivotally coupled to the blade cartridge support member 15824 in any manner known to those skilled in the art and/or described herein. The blade cartridge 15822 further comprises one or more replaceable blade assemblies 15800 configured to be removably coupled to a blade cartridge retention frame 15802. The replaceable blade assemblies 15800 may include a replaceable blade assembly body 15801 and one or more razor blades 142, shaving aid(s) 160, skin engaging strip(s) 170, skin lubricating strip(s) 172, 176, skin lubricating and/or moisturizing strip(s) 174 (not all shown for clarity) coupled thereto.

The blade cartridge retention frame 15802 may define one or more replaceable blade cavities 15804 configured to receive at least a portion of one or more replaceable blade assemblies 15800. While the blade cartridge retention frame 15802 is illustrated having a single replaceable blade cavity 15804 configured to receive a single replaceable blade assembly 15800 on a single face of the blade cartridge retention frame 15802, it should be appreciated that the blade cartridge retention frame 15802 may include more than one replaceable blade cavity 15804 on one or more faces thereof and/or that one or more of the replaceable blade cavities 15804 may be configured to at least partially receive more than one replaceable blade assembly 15800.

The replaceable blade assemblies 15800 and/or the blade cartridge retention frame 15802/replaceable blade cavities 15804 may include one or more replaceable blade assembly magnets 15806. For example, both the replaceable blade assemblies 15800 and the blade cartridge retention frame 15802/replaceable blade cavities 15804 may each include one or more replaceable blade assembly magnets 15806 configured to generate an attractive and/or repulsive magnetic force to removably couple the replaceable blade assembly 15800 to the blade cartridge retention frame 15802/replaceable blade cavities 15804.

Alternatively (or in addition), the replaceable blade assemblies 15800 may include one or more ferrous members 15808 (e.g., ferrous strips, ferrous plates, or the like) and the blade cartridge retention frame 15802/replaceable blade cavities 15804 may include one or more replaceable blade assembly magnets 15806. The replaceable blade assembly magnets 15806 of the blade cartridge retention frame 15802/replaceable blade cavities 15804 may be configured to be magnetically attracted towards the ferrous members 15808 of the replaceable blade assemblies 15800, thereby securing the replaceable blade assembly 15800 to the blade cartridge retention frame 15802/replaceable blade cavities 15804. It should be appreciated, however, that the replaceable blade assembly 15800 may include one or more replaceable blade assembly magnets 15806 configured to be magnetically attracted towards one or more ferrous members 15808 of the blade cartridge retention frame 15802/replaceable blade cavities 15804.

Referring now to FIGS. 162-165, another embodiment of a shaving device 10 is generally illustrated. In particular, FIG. 162 generally illustrates one embodiment of the shaving device 10 in an assembled state, FIG. 163 generally illustrates the shaving device 10 of FIG. 162 in an exploded, unassembled state, FIG. 164 is a cross-sectional view of the shaving device of FIG. 162 taken along lines C164-C164, and FIG. 165 is a cross-sectional view of the shaving device 10 of FIG. 163 taken along lines C165-C165.

The shaving device 10 may include a head assembly 16220 and a handle 16260. The head assembly 16220 comprises a blade cartridge 16222 and a blade cartridge support member 16224. As shown, blade cartridge support member 16224 comprises a generally U-shaped cartridge support frame 16226 including at least one arm 16230, though this is not a limitation of the present disclosure unless specifically claimed and the support frame 16226 may include any configuration. The support frame 16226 may be either permanently coupled and/or integral with the handle 16260 (e.g., a unitary piece with the handle 16260) or may be removably coupled to the handle 16260 in any manner known to those skilled in the art and/or described herein.

The blade cartridge 16222 is configured to be pivotally coupled to the blade cartridge support member 16224 in any manner known to those skilled in the art and/or described herein. The blade cartridge 16222 further comprises one or more replaceable blade assemblies 16200 configured to be removably coupled to a blade cartridge retention frame 16202. The replaceable blade assemblies 16200 may include a replaceable blade assembly body 16201 and one or more razor blades 142, shaving aid(s) 160, skin engaging strip(s) 170, skin lubricating strip(s) 172, 176, skin lubricating and/or moisturizing strip(s) 174 (not all shown for clarity) coupled thereto.

The blade cartridge retention frame 16202 may define one or more replaceable blade cavities 16204 configured to receive at least a portion of one or more replaceable blade assemblies 16200. While the blade cartridge retention frame 16202 is illustrated having a single replaceable blade cavity 16204 configured to receive a single replaceable blade assemblies 16200 on a single face of the blade cartridge retention frame 16202, it should be appreciated that the blade cartridge retention frame 16202 may include more than one replaceable blade cavity 16204 on one or more faces thereof and/or that one or more of the replaceable blade cavities 16204 may be configured to at least partially receive more than one replaceable blade assembly 16200.

The replaceable blade assembly 16200 may include one or more locking features 16206 configured to engage with one or more corresponding locking features 16208 of the blade cartridge retention frame 16202/replaceable blade cavities 16204 to releasably couple the replaceable blade assembly 16200 to the blade cartridge retention frame 16202/replaceable blade cavities 16204. One or more of the locking features 16206, 16208 may include a ratchet, deformable pawl, clip, detent, protrusion, or the like configured to engage a corresponding ratchet, deformable pawl, clip, detent, groove, slot, opening, cavity, passageway, or the like. For example, the locking feature 16206 of the replaceable blade assembly 16200 may include a biased, deformable pawl configured to releasably engage a cavity 16208 of the blade cartridge retention frame 16202/replaceable blade cavities 16204, though this is merely an example and that the present disclosure is not limited to this arrangement unless specifically claimed as such. Also, it should be appreciated that the replaceable blade assembly 16200 and/or the blade cartridge retention frame 16202/replaceable blade cavities 16204 may optionally include one or more replaceable blade assembly magnets 15806 and/or ferrous members 15808 as described herein.

Referring now to FIGS. 166-168, one embodiment of a shaving device 10 is generally illustrated in which one or more razor blades 142 and/or any combination of shaving aid(s) 160, skin engaging strip(s) 170, skin lubricating strip(s) 172, 176, skin lubricating and/or moisturizing strip(s) 174, or the like are secured to a blade cartridge 22 as generally illustrated in FIG. 168. With reference to FIG. 166, the shaving device 10 may include a head assembly 16620 which may either removably or permanently coupled to a handle 16660 as described herein. The head assembly 16620 comprises a blade cartridge 16622 and a blade cartridge support member 16624. As shown, blade cartridge support member 16624 comprises a generally U-shaped cartridge support frame 16626 including at least one arm 16630, though this is not a limitation of the present disclosure unless specifically claimed and the support frame 16626 may include any configuration. The blade cartridge 16622 is configured to be pivotally coupled to the blade cartridge support member 16624 in any manner known to those skilled in the art and/or described herein.

The blade cartridge 16622 includes a frame 16688 including one or more blade cartridge retaining magnets 16602*a-n*. The blade cartridge retaining magnets 16602 may be proximate to and/or disposed within a blade cartridge retaining cavity 16604 formed in the frame 16688. The blade cartridge retaining magnets 16602*a-n* may be used during process of assembling the blade cartridge 16622 to properly align one or more razor blades 142 and/or any combination of shaving aid(s) 160, skin engaging strip(s) 170, skin lubricating strip(s) 172, 176, skin lubricating and/or moisturizing strip(s) 174. For example, a first set of blade cartridge retaining magnets 16602*a*, 16602*b* (FIG. 166) may be disposed at generally opposite lateral ends of the frame 16688/blade cartridge retaining cavity 16604 and may be used to align and/or generally retain a shaving aid 160 (FIG. 167). Similarly, another set of blade cartridge retaining magnets 16602*c*, 16602*d* (FIG. 166) may be disposed at generally opposite lateral ends of the frame 16688/blade cartridge retaining cavity 16604 and may be used to align and/or generally retain a razor blade 142 (FIG. 167). The blade cartridge 16622 may include a set of blade cartridge retaining magnets 16602 corresponding to each razor blade 142 and/or shaving aid 160. It should be appreciated that the first and/or second sets of blade cartridge retaining magnets 16602 may include one or more blade cartridge retaining magnets 16602.

The known methods of assembling razor blades into a cartridge assembly involve the use of expensive, precision machinery. The use of the blade cartridge retaining magnets 16602 may eliminate the need for this expensive, precision machinery. In particular, the blade cartridge retaining magnets 16602 may be secured to the frame 16688, and thereafter, the razor blades 142 and/or shaving aids 160 may be "pulled", drawn, attracted into place/alignment within the frame 16688/blade cartridge retaining cavity 16604. The razor blades 142 and/or shaving aids 160 may include a material that is magnetically attracted to the blade cartridge retaining magnets 16602 such as, but not limited to, ferrous materials and/or magnetic materials.

Once the razor blades 142 and/or shaving aids 160 are aligned with respect to the frame 16688/blade cartridge retaining cavity 16604, one or more retaining clips 16802 may be used to secure the razor blades 142 and/or shaving aids 160. The retaining clips 16802 may include any retaining clip known to those skilled in the art and/or described herein.

It should be appreciated that one or more of the blade cartridge retaining magnets 16602*a-n* may be configured to generate a repulsive magnetic force with the razor blades 142, thereby causing a biasing/blade cushioning action between the razor blades 142 and the blade cartridge retaining magnets 16602*a-n*. The razor blades 142 may be generally secured to the blade cartridge 16222 by way of one or more retaining clips 16802, however, the blade cartridge retaining/biasing magnets 16602*a-n* may allow the razor blades 142 to move inwardly toward the blade cartridge 16222 upon application of an external force during a razor stroke. In such an embodiment, each lateral edge of the blade cartridge retaining cavity 16604 may include one or more blade cartridge retaining/biasing magnets 16602*a-n* which may bias one or more razor blades 142. The blade cartridge retaining/biasing magnets 16602*a-n* may be used in lieu of traditional spring fingers.

Turning now to FIGS. 169-170, another embodiment of shaving device 10 is generally illustrated. In the illustrated embodiment, the handle 60 includes a handle protrusion, projection, or post 9302 that is sized and shaped to be at least partially received within a support member cavity 9304 form in the blade cartridge support member 24, e.g., a portion of the yoke or yoke region 47 that generally locates the position of the disposable head assembly 20 (e.g., the blade cartridge support member 24) relative to the handle 60. In the illustrated embodiment, the handle post 9302 has a generally cylindrical shape and the support member cavity 9304 has a generally tubular shape having an interior diameter that generally corresponds to the outer diameter of the handle post 9302, though this is for illustrative purposes only and it should be appreciated that many other shapes are possible.

The handle post 9302 may include one or more disc or central magnets 9312 that at least partially pass through a central region 9314 of one or more ring or annular magnets 9316 coupled to the blade cartridge support member 24 (e.g., the support member cavity 9304 and/or a central portion of the yoke region 47) as generally described herein. The support member cavity 9304 and the central region 9314 of the annular magnet 9316 may be substantially concentric. According to one embodiment, the blade cartridge support member 24 may optionally include a turret 9320 that extends outwardly generally towards the blade cartridge 22. A distal portion of the central magnet 9312 may be substantially coplanar with an opening or inner face of the turret 9320 or may extend through the opening.

As described herein (see, e.g., FIGS. 79-82 and the corresponding description), the poles of the central magnet 9312 and the annular magnet 9316 are aligned such that a repulsive magnetic force is generated between the magnets 9312, 9316 thereby urging the blade cartridge support member 24 and the handle 60 together. It should be appreciated, however, that the shaving device of FIGS. 169-170 is not limited to the resistive pivot mechanism and/or a connection mechanism illustrated in FIGS. 79-82 and/or 169-170, and that any resistive pivot mechanism and/or connection mechanism described herein may be used.

The handle 60 may include one or more handle rotation magnets 16901 configured to generate an attractive magnetic force with one or more blade cartridge rotation magnets 16903 of the blade cartridge 22/support member 24. The attractive magnetic force between the handle rotation magnets 16901 and blade cartridge rotation magnets 16903 may allow the blade cartridge support member 24 to rotate/twist with respect to the handle 60 clockwise and counter-clockwise from an initial or central starting position in the direction of arrow 9310, and may urge the blade cartridge support member 24 back towards the initial/central starting position in which the poles of the handle rotation magnets 16901 and blade cartridge rotation magnets 16903 are aligned. Optionally, the attractive magnetic force between the handle rotation magnets 16901 and blade cartridge rotation magnets 16903 may aid in generally securing and/or retaining the blade cartridge support member 24 to the handle 60.

Optionally, the handle post 9302 may include one or more rotation limiters 16906 that engage one or more corresponding rotation limiters 16908 of the support member cavity 9304. The rotation limiters 16906, 16908 may generally limit the rotation of the blade cartridge support member 24 with respect to the handle 60 in the direction generally illustrated by arrow 9310, thereby ensuring that the attractive magnetic force between the handle rotation magnets 16901 and blade cartridge rotation magnets 16903 is sufficient to urge the blade cartridge support member 24 back to the central position by ensuring that the poles of the handle rotation magnets 16901 and blade cartridge rotation magnets 16903 from separating too far. By way of a non-limiting example, the rotation limiters 16906, 16908 may include a protrusion and groove that engage each other to generally limit the rotation to a predefined range.

In the illustrated embodiment, the handle 60 and blade cartridge 22/support member 24 each include two handle rotation magnets 16901 and blade cartridge rotation magnets 16903, respectively. The two handle rotation magnets 16901 and blade cartridge rotation magnets 16903 may be disposed approximately 180 degrees opposite from each other with respect to the handle 60 and blade cartridge 22/support member 24. It should be appreciated, however, that the handle 60 and/or the blade cartridge 22/support member 24 may include one or more handle rotation magnets 16901 and blade cartridge rotation magnets 16903. For example, one or more of the handle rotation magnets 16901 and/or blade cartridge rotation magnets 16903 may include an arcuate shaped and/or ring shaped magnet.

It should also be appreciated that one or more handle rotation magnets 16901 and blade cartridge rotation magnets 16903 (and optionally the rotation limiters 16906, 16908) may be located between main portion 16998 and collar portion 16999 of the handle 60. In such an embodiment, the blade cartridge 22 may be coupled to the handle 60 in any manner known to those skilled in the art and/or described herein.

Turning now to FIGS. 171-173, one embodiment of an ISP protrusion 9328 and/or blade cartridge rotation limiter 35 (collectively referred to as a blade cartridge biased limiter 17102) is generally illustrated. In particular, FIG. 171 generally illustrates a head assembly 20, FIG. 172 generally illustrates region C172 of FIG. 171 including the blade cartridge biased limiter 17102 in an extended position, and FIG. 173 generally illustrates the blade cartridge biased limiter 17102 of FIG. 172 in a retracted position.

With reference to FIG. 171, the head assembly 20 may include a blade cartridge 22 pivotally coupled to a blade cartridge support member 24. It should be appreciated that the head assembly 20 may include any blade cartridge 22 and blade cartridge support member 24 described herein. The blade cartridge support member 24 may include one or more arms 30 extending outwardly from a yoke 47 as generally described herein. One or more of the arms 30 and/or yoke 47 may include one or more blade cartridge biased limiters 17102. As described herein, the blade cartridge biased limiters 17102 may set an initial starting position of the blade cartridge 22 and/or may generally limit the rotation of the blade cartridge 22 about the pivot axis PA.

Turning now to FIG. 172, one embodiment of the blade cartridge biased limiters 17102 is generally illustrated. The blade cartridge biased limiters 17102 may include a detent and/or pawl 17202 at least partially disposed within a detent cavity 17204. The detent cavity 17204 may be formed in any portion of the blade cartridge support member 24 such as, but not limited to, the arm 30 and/or yoke 47. The detent cavity 17204 includes a detent opening 17206 (best seen in FIG. 173). The detent 17202 may have a size and shape configured to allow a portion of the detent 17202 to extend through the detent opening 17204 when the blade cartridge biased limiters 17102 in the extended position as shown in FIG. 172 while also generally preventing the detent 17202 from passing entirely through the detent opening 17206.

The detent 17202 is biased in the extended position by one or more biasing devices 17208 (e.g., but not limited to, a spring, coil spring, torsion spring, elastomeric/rubber material, deformable material or the like) such that a portion of the detent 17202 may contact against a portion of the blade cartridge 22 as generally illustrated in FIG. 171. When in the extended position, the detent 17202 may engage the blade cartridge 22 to set the initial starting position of the blade cartridge 22 and/or may generally limit the rotation of the blade cartridge 22 about the pivot axis PA as described herein. Upon application of a sufficient force to the blade cartridge 22, the force of the biasing member 17208 may be overcome and the detent 17202 may be urged at least partially into the detent cavity 17204 such that the blade cartridge 22 may pass by the detent 17202 as generally illustrated in FIG. 173.

While the blade cartridge biased limiters 17102 is illustrated as part of the blade cartridge support member 24 and engaging the blade cartridge 22, it should be appreciated that this arrangement may be reversed. For example, the blade cartridge biased limiters 17102 may be part of the blade cartridge 22 and may engage a portion of the blade cartridge support member 24.

With reference now to FIGS. 174-179, another embodiment of shaving device 10 is generally illustrated. In particular, FIG. 174 is an end perspective view of the shaving device 10 in an exploded, unassembled state, FIG. 175 a top view of part of the blade cartridge 22 and handle 60 of FIG. 174, FIG. 176 is an end view of the blade cartridge 22 of FIG. 175, FIG. 177 is an end view of the handle 60 of FIG. 175, FIG. 178 is a cross-sectional view of the blade cartridge 22 taken into the page along lines C178-C178 of FIG. 176, and FIG. 179 is a cross-sectional view of the handle 60 taken into the page along lines C179-C179 of FIG. 177.

With reference to FIG. 174, the handle 60 includes a handle protrusion, projection, or post 9302 that is sized and shaped to be at least partially received within a support member cavity 9304 form in the blade cartridge support member 24, e.g., a portion of the yoke or yoke region 47 that generally locates the position of the disposable head assembly 20 (e.g., the blade cartridge support member 24) relative to the handle 60. In the illustrated embodiment, the handle post 9302 has a generally cylindrical shape and the support member cavity 9304 has a generally tubular shape having an interior diameter that generally corresponds to the outer diameter of the handle post 9302, though this is for illustrative purposes only and it should be appreciated that many other shapes are possible.

The handle post 9302 may include one or more disc or central magnets 9312 that at least partially pass through a central region 9314 of one or more ring or annular magnets 9316 coupled to the blade cartridge support member 24 (e.g., the support member cavity 9304 and/or a central portion of the yoke region 47) as generally described herein. The support member cavity 9304 and the central region 9314 of the annular magnet 9316 may be substantially concentric.

According to one embodiment, the blade cartridge support member 24 may optionally include a turret 9320 that extends outwardly generally towards the blade cartridge 22. A distal portion of the central magnet 9312 may be substantially coplanar with an opening or inner face of the turret 9320 or may extend through the opening. As described herein (see, e.g., FIGS. 79-82 and the corresponding description), the poles of the central magnet 9312 and the annular magnet 9316 are aligned such that a repulsive magnetic force is generated between the magnets 9312, 9316 thereby urging the blade cartridge support member 24 and the handle 60 together.

It should be appreciated that the handle 60, rotating/twisting mechanism described above, collar and blade cartridge support member 24 may all one integral unit and the blade cartridge 22 may attach/detach at the top of the arms 30 (e.g., but not limited to, as shown in FIG. 182).

With reference now to FIGS. 174-179, the blade cartridge support member 24 (e.g., the support member cavity 9304) and the handle 60 (e.g., the handle post 9302) may also include at least one set of cooperating ramps 17402, 17404. The cooperating ramps 17402, 17404 each include a ramp surface 17406, 17408, respectively, configured to allow the blade cartridge support member 24 to rotate/twist with respect to the handle 60 clockwise and counter-clockwise from an initial or central starting position in the direction of arrow 9310 and to urge the blade cartridge support member 24 longitudinally relative to the handle 60 in the direction of arrow 17410. The longitudinal movement 17410 of the blade cartridge support member 24 relative to the handle 60 creates a longitudinal displacement/gap between a portion of the blade cartridge support member 24 (e.g., a portion of the yoke 47) and the distal end 17412 of the handle 60 proximate to the handle post 9302). The longitudinal displacement/gap cause the magnets 9312, 9316 to become closer to each other, thereby increasing the repulsive magnetic force between the blade cartridge support member 24 and the handle 60. Once the twisting force is removed, the repulsive magnetic force generated by the magnets 9312, 9316 (along with the ramp surfaces 17406, 17408 of the cooperating ramps 17402, 17404) urges the blade cartridge support member 24 back towards the initial/central starting position relative to the handle 60.

In the illustrated embodiment, the ramp member 17402 of the blade cartridge support member 24 includes one or more grooves, recesses, and/or notches that is open to a portion of the support member cavity 9304 and extends from a proximal region 17802 (FIG. 178) of the support member cavity 9304 partially towards a distal region 17804 of the support member cavity 9304. The grooves, recesses, and/or notches include one or more arcuate (e.g., but not limited to, V-shaped and/or U-shaped) ramp surfaces 17406. The ramp member 17404 of the handle 60 includes a protrusion extending outwardly from a portion of the handle post 9302. A distal region 17902 (FIG. 179) of the protrusion includes one or more arcuate (e.g., but not limited to, V-shaped and/or U-shaped) ramp surfaces 17408. The ramp members 17402, 17404 are configured such that when the handle post 9302 of the handle 60 is received in the support member cavity 9304, the ramp surfaces 17406, 17408 contact each other. Rotation of the blade cartridge 22 relative to the handle 60 in the direction of arrow 9310 may cause the ramp surfaces 17406, 17408 to slide against each other, thereby causing the blade cartridge support member 24 to move longitudinally away from the handle 60 in the direction of arrow 17410. As discussed above, when the rotational force is removed/reduced, the repulsive magnetic force between the magnets 9312, 9316 urge the blade cartridge support member 24 back towards the handle 60, and the ramp surfaces 17406, 17408 slide against each other causing the blade cartridge support member 24 to rotate in a direction that is opposite to the initially rotation direction. Once the ramp surfaces 17406, 17408 reach an inflection point, the blade cartridge support member 24 stops moving relative to the handle 60 and is set back at the central/initial starting position.

The blade cartridge support member 24 and the handle 60 may each include a plurality of cooperating ramps 17402, 17404. For example, the blade cartridge support member 24 and the handle 60 may each include two cooperating ramps 17402, 17404 arranged on generally opposites sides of the support member cavity 9304 and handle post 9302. Additionally, it should be appreciated that the arrangement of notched and protrusion surfaces 17406, 17408, and of the cooperating ramps 17402, 17404 may be reversed (i.e., the support member cavity 9304 may include a protrusion surface 17408 and handle post 9302 may include a notch surface 17406).

Turning now to FIGS. 180-181, another embodiment of shaving device 10 is generally illustrated. The blade cartridge support member 24 (e.g., a portion of the yoke or yoke region 47) includes a protrusion, projection, or post 18002 that is sized and shaped to be at least partially received within a cavity 18004 form in the handle 60 that generally locates the position of the disposable head assembly 20 (e.g., the blade cartridge support member 24) relative to the handle 60. In the illustrated embodiment, the post 18002 has a generally cylindrical shape and the cavity 18004 has a generally tubular/cylindrical shape having an interior diameter that generally corresponds to the outer diameter of the post 18002, though this is for illustrative purposes only and it should be appreciated that many other shapes are possible.

The handle 60 may include one or more handle rotation magnets 18001 configured to generate an attractive magnetic force with one or more blade cartridge rotation magnets 18003 of the blade cartridge 22/support member 24. The attractive magnetic force between the handle rotation magnets 18001 and blade cartridge rotation magnets 18003 may generally secure and/or retain the blade cartridge support member 24 to the handle 60. Additionally, the attractive magnetic force between the handle rotation magnets 18001 and blade cartridge rotation magnets 18003 may allow the blade cartridge support member 24 to rotate/twist with respect to the handle 60 clockwise and counter-clockwise from an initial or central starting position in the direction of arrow 9310, and may urge the blade cartridge support member 24 back towards the initial/central starting position in which the poles of the handle rotation magnets 18001 and blade cartridge rotation magnets 18003 are aligned.

Optionally, the post 18002 includes one or more rotation limiters 18006 configured to engage one or more corresponding rotation limiters 18008 of the cavity 18004. The rotation limiters 18006, 18008 may generally limit the rotation of the blade cartridge support member 24 with respect to the handle 60 in the direction generally illustrated by arrow 9310, thereby ensuring that the attractive magnetic force between the handle rotation magnets 18001 and blade cartridge rotation magnets 18003 is sufficient to urge the blade cartridge support member 24 back to the central position by ensuring that the poles of the handle rotation magnets 18001 and blade cartridge rotation magnets 18003 from separating too far. By way on a non-limiting example, the rotation limiters 18006, 18008 may include a protrusion and groove that engage each other to generally limit the rotation to a predefined range.

In the illustrated embodiment, the handle 60 and blade cartridge 22/support member 24 each include two handle rotation magnets 18001 and blade cartridge rotation magnets 18003, respectively. The two handle rotation magnets 18001 and blade cartridge rotation magnets 18003 may be disposed approximately 180 degrees opposite from each other with respect to the handle 60 and blade cartridge 22/support member 24. It should be appreciated, however, that the handle 60 and/or the blade cartridge 22/support member 24 may include one or more handle rotation magnets 18001 and blade cartridge rotation magnets 18003. For example, one or more of the handle rotation magnets 18001 and blade cartridge rotation magnets 18003 may include an arcuate shaped and/or ring shaped magnet.

Additionally, it should be appreciated that while the blade cartridge 22 is illustrated with a post 18002 and the handle 60 is illustrated with a cavity 18004, this arrangement may be reversed. Additionally, the arrangement of the protrusion and groove of the rotation limiters 18006, 18008 may also be reversed.

Turning now to FIG. 182, a blade cartridge connection mechanism for securing a blade cartridge 22 to a blade cartridge support member 24. The blade cartridge 22 may include any blade cartridge known to those skilled in the art including, but not limited to, any blade cartridge 22 described herein. The head assembly 20 may optionally include any resistive pivot mechanism described herein such as, but not limited to, a magnetic resistive pivot mechanism. As shown, blade cartridge support member 24 comprises a generally U-shaped cartridge support frame 26 having two generally curved support arms 30 (a generally C-shape or L-shape); however, it should be appreciated that this is not a limitation of the present disclosure unless specifically claimed as such.

The blade cartridge 22 may include a frame 188 (which may be either one piece or multi-piece such as, but not limited to, a clam-shell design) having one or more pivot pin/cylinder 34 extending outwardly from the lateral edges of the frame 188 (e.g., a single pivot pin/cylinder 34 that extends across the entire frame 188 or a first and a second pivot pin/cylinder 34 extending outwardly from a first and a second lateral edge of the frame 188, respectively). One or more portions (e.g., distal end regions) of the pivot pin/cylinder 34 may include one or more magnets and/or ferrous materials.

The blade cartridge support member 24 includes one or more pivot receptacles 32. For example, each support arm 30 may include a pivot receptacle 32. At least one of the pivot receptacles 32 may include a receiving pocket or cavity 18202 configured to receive at least a portion of the pivot pin/cylinder 34 located on one of the opposing lateral sides of the blade cartridge 22.

The pocket or cavity 18202 may include an open end 18204 through which the pivot pin/cylinder 34 may be received into the pocket or cavity 18202. The pocket or cavity 18202 may also include tapered entry and/or tapered sidewalls to facilitate entry of the pivot pin/cylinder 34 into the pocket or cavity 18202. According to one embodiment, the pivot receptacle 32 includes one or more arm magnets 18206 (e.g., one or more permanent magnets and/or electromagnets). The arm magnets 18206 may be configured to create an attractive magnetic force with the pivot pin/cylinder 34 received therein. For example, the pivot pin/cylinder 34 may include a ferrous material that is magnetically attracted to the arm magnets 18206, thereby mounting, securing, and/or otherwise coupling the blade cartridge 22 to the blade cartridge support member 24. Alternatively (or in addition), the pivot pin/cylinder 34 may include a magnet having its poles align such that it is magnetically attracted to the arm magnets 18206, thereby mounting, securing, and/or otherwise coupling the blade cartridge 22 to the blade cartridge support member 24. In either case, the blade cartridge 22 may rotate about the pivot axis PA relative to the blade cartridge support member 24 at any angle, up to and including 360° degrees.

The blade cartridge 22 may include one or more blade cartridge magnets 18208 coupled and fixed to one or more of the lateral edges of the blade cartridge 22 and generally facing the arm magnets 18206. Similar to the arm magnets 18206, the blade cartridge magnets 18208 may also have a square, rectangular, oblong, oval, and/or elongated shape. The arm magnets 18206 and the blade cartridge magnets 18208 may be aligned to generate an attractive magnetic force.

The lateral edges of the blade cartridge 22 may also include one or more rotation limiters 18210. The rotation limiters 18210 may be disposed proximate to the pivot pin/cylinder 34, and may be configured to engage a portion of the arm 30 to generally limit the rotation of the blade cartridge 22 about the pivot axis PA to a predefined range. It should be appreciated that one or more arms 30 may include one or more rotation limiters 18210 which may engage against a portion of the blade cartridge 22 (e.g., but not limited to, the rotation limiters 18210 of the blade cartridge 22).

In practice, the user may position the unassembled blade cartridge 22 proximate to the opening 18204 of the pocket or cavity 18202 until the magnetic attraction generated between the pivot pin/cylinder 34 and/or blade cartridge magnets 18208 and the pocket or cavity 8602 (by the one or more arm magnets 18206) causes the pivot pin/cylinder 34 to attach to the pocket or cavity 18202 of the pivot receptacle 32, and the arm magnets 18206 to align with the blade cartridge magnets 18208 in the initial starting position. Likewise, the user may dispose (e.g., remove) the blade cartridge 22 from the pivot receptacle 32 by manually placing a thumb and forefinger on each lateral end of blade cartridge 22 (or use a tool) to pry or dislodge the pivot pin/cylinder 34 (and therefore the blade cartridge 22) from the pocket or cavity 18202 of the pivot receptacle 32.

It should be appreciated that while the pivot receptacle 32 is illustrated having one arm magnet 18206 in each arm 30, the arm magnets 18206 may optionally be disposed in only one or more of the pivot pin/cylinders 34/arms 30. Moreover, the location of one or more of the pivot receptacles 32 and the pivot pins 34 may be switched (e.g., one or more of the pivot receptacles 32 may be located in the blade cartridge 22 and one or more of the pivot pins/cylinders 34 may extend outwardly from the support arms 30 of the blade cartridge support member 24).

Additionally, while the blade cartridge 20 is shown being releasably coupled to the handle 60, the blade cartridge support member 24 and the handle 60 may optionally be an integral, unitary or one-piece construction (i.e. a disposable razor).

Turning now to FIGS. 183-185, any of the connection systems for removably connecting a disposably head assembly 20/blade cartridge 22 to the handle 60 may be used to removably secure other devices to the handle 60. For example, the connection systems described herein (such as, but not limited to, the attractive and/or repulsive magnetic connection systems) may be used to removably connect a brush 18300 (FIG. 183) (e.g., hair brush and/or toothbrush) to the handle 60, a tooth pick 18400 (FIG. 184) to the handle 60, tweezers 18500 (FIG. 185) to the handle 60, and/or dental floss 18600 (FIG. 186) to the handle 60. It should be appreciated that this is not an exhaustive list of implements/devices that may be coupled to the handle 60, and that other personal hygiene implements/devices may be removably coupled to the handle 60.

With reference to FIG. 187, yet another embodiment of a shaving device 10 consistent with at least one embodiment of the present disclosure is generally illustrated. The shaving device 10 includes a handle 60 and a head assembly 20. The head assembly 20 may be permanently or removably coupled to the handle 60. As described in more detail herein, the blade cartridge support member 24 is configured to rotate/twist with respect to the handle 60 clockwise and counter-clockwise from an initial or central starting position in the direction of arrow 9310.

The handle 60 and the head assembly 20 may include one or more central magnets 7902 and/or annular magnets 7904 (e.g., but not limited to, as generally described with respect to FIG. 79, 93 and FIG. 174) configured to create a magnetic repulsion force. The central magnets 7902 and/or annular magnets 7904 may be arranged in/on handle 60 and blade cartridge support member 24, respectively (as shown), and/or may be reversed.

While not shown, the handle 60 and the head assembly 20 may additionally (or alternatively) include one or more handle rotation magnets configured to generate a repulsive and/or attractive magnetic force with one or more blade cartridge support member rotation magnets of the blade cartridge 22/blade cartridge support member 24 (e.g., but not limited to, as generally described with respect to FIG. 169). The repulsive and/or attractive magnetic forces may optionally aid in generally securing and/or retaining the blade cartridge support member 24 to the handle 60, in addition to facilitating the pivotal rotation and return of blade cartridge support member 24 from the initial/central starting position.

The handle 60 and blade cartridge support member 24 includes a twist interface 18702 which, along with the repulsive and/or attractive magnetic forces, allows the blade cartridge support member 24 to rotate/twist with respect to the handle 60 clockwise and counter-clockwise from an initial or central starting position in the direction of arrow 9310 (e.g., in a direction that is generally perpendicular to the longitudinal axis L of the shaving device 10 and/or handle 60), and may urge the blade cartridge support member 24 back towards the initial/central starting position (e.g., a position in which the blade cartridge support member 24 may rotate generally equidistant clockwise or counterclockwise in the direction of arrow 9310).

As explained in more detail herein, the twist interface 18702 (FIGS. 187-196) is similar to the twist interface described in FIGS. 174-179. For example, the blade cartridge support member 24 (e.g., the support member cavity 9304, yoke 47, and/or, a yoke insert 18706) and the handle 60 (e.g., the collar 7714 and/or the handle post 9302) may include at least one set of cooperating ramps 17402, 17404. The cooperating ramps 17402, 17404 each include a ramp surface 17406, 17408, respectively, (best seen in FIGS. 188, and 191-193) configured to allow the blade cartridge support member 24 to rotate/twist with respect to the handle 60 clockwise and counter-clockwise from an initial or central starting position in the general direction of arrow 9310, and optionally to urge the blade cartridge support member 24 longitudinally relative to the handle 60 in the direction of arrow 17410 (FIG. 187). The longitudinal movement 17410 of the blade cartridge support member 24 relative to the handle 60 creates a longitudinal displacement/gap between a portion of the blade cartridge support member 24 (e.g., a portion of the yoke 47) and the distal end 17412 of the handle 60 proximate to the handle post 9302). The longitudinal displacement/gap cause the magnets 9312, 9316 to become closer to each other, thereby increasing the repulsive magnetic force between the blade cartridge support member 24 and the handle 60. Once the twisting force is removed, the repulsive magnetic force generated by the magnets 9312, 9316 (along with the ramp surfaces 17406, 17408 of the cooperating ramps 17402, 17404) urges the blade cartridge support member 24 back towards the initial/central starting position relative to the handle 60. Again, it may be appreciated that in addition to (or alternative to) the repulsive force generated by the magnets 9312, 9316, the shaving device 10 may include one or more handle rotation magnets configured to generate an attractive magnetic force with one or more blade cartridge support member rotation magnets of the blade cartridge 22/blade cartridge support member 24 (e.g., but not limited to, as generally described with respect to FIG. 169.

In the illustrated embodiment, the ramp member 17402 of the blade cartridge support member 24 includes one or more grooves, recesses, and/or notches that is open to a portion of the support member cavity 9304 and extends from a proximal region of the support member cavity 9304 partially towards a distal region of the support member cavity 9304. The grooves, recesses, and/or notches may include one or more arcuate (e.g., but not limited to, V-shaped and/or U-shaped) or linear ramp surfaces 17406. The ramp member 17404 of the handle 60 includes a protrusion extending outwardly from a portion of the handle post 9302. A distal region 17902 (see, e.g., FIG. 190) of the protrusion includes one or more arcuate (e.g., but not limited to, V-shaped and/or U-shaped) ramp surfaces 17408. The ramp members 17402, 17404 are configured such that when the handle post 9302 of the handle 60 is received in the support member cavity 9304, the ramp surfaces 17406, 17408 contact each other. Rotation of the blade cartridge 22 relative to the handle 60 in the direction of arrow 9310 may cause the ramp surfaces 17406, 17408 to slide against each other, thereby causing the blade cartridge support member 24 to move longitudinally away from the handle 60 in the direction of arrow 17410. As discussed above, when the rotational force is removed/reduced, the repulsive magnetic force between the magnets 9312, 9316 (and optionally or alternatively attractive magnetic force) urge the blade cartridge support member 24 back towards the handle 60, and the ramp surfaces 17406, 17408 slide against each other causing the blade cartridge support member 24 to rotate in a direction that is opposite to the initial rotation direction. Once the ramp surfaces 17406, 17408 reach an inflection point, the blade cartridge support member 24 stops moving relative to the handle 60 and is set back at the initial/central starting position. The initial/central starting position may correspond to a groove, void area, and/or passageway (FIGS. 187, 188, 191, and 192) between the two ramps 17402, 17404, creating a point of stable equilibrium in which the ramp 17404 may reside when no rotational force is applied to the shaving device 10.

The blade cartridge support member 24 and the handle 60 may each include one or more (e.g., a plurality of) cooperating ramps 17402, 17404. For example, the blade cartridge support member 24 and the handle 60 may each include two cooperating ramps 17402, 17404 arranged on generally opposites sides of the support member cavity 9304 and handle post 9302. Additionally, it should be appreciated that the arrangement of notched and protrusion surfaces 17406,

17408, and of the cooperating ramps 17402, 17404 may be reversed (i.e., the support member cavity 9304 may include a protrusion surface 17408 and handle post 9302 may include a notch surface 17406). The cooperating ramps 17402, 17404 allow for a predefined amount of twist to occur during use between the handle 60 and blade cartridge support member 24.

Thus, according to at least one embodiment, the magnets (e.g., the combination of the central magnets 7902 and annular magnets 7904 and/or the handle rotation magnets and blade cartridge support member rotation magnets) are used in conjunction with one or more cooperating ramps 17402, 17404 to "springload" (e.g., bias) the blade cartridge support member 24 (e.g., yoke 47) to return to its center position relative to the handle 60. As the blade cartridge support member 24 is displaced rotationally with respect to the handle 60 by the user from its center (e.g., resting) position (e.g., it twisted), the retention magnets are being pushed closer together by the cooperating ramps 17402, 17404. In one embodiment, the central magnets 7902 and annular magnets 7904 generate a repulsive magnetic force that pushes the blade cartridge support member 24 against the handle 60, which due to the cooperating ramps 17402, 17404, simultaneously drives the blade cartridge support member 24 rotationally (twisting) in a direction back toward its center when the blade cartridge support member 24 is released. At the center point, the cooperating ramp 17402 resides in a groove between the two ramps 17404, creating a point of stable equilibrium.

In addition (or alternatively), the shaving device 10 may include blade cartridge retention mechanism. As described herein (e.g., as described in connection with FIGS. 174-179), the magnetic fields of the central magnet 7902 and annular magnet 7904 will switch positions such that the blade cartridge support member 24 will be ejected from the handle 60 if the yoke is given sufficient axial displacement (e.g., along the longitudinal axis 17410). The blade cartridge retention mechanism is configured such that the blade cartridge support member 24 can only be ejected from the handle 60 (e.g., disconnected) when the blade cartridge support member 24 (e.g., yoke 47) is in its center resting position relative to the handle 60, and not when the blade cartridge support member 24 has been rotationally displaced by the user (e.g., twisted generally in the direction of arrow 9310).

To accomplish this, the blade cartridge retention mechanism may include one or more (e.g., a pair and/or a plurality) of retention posts, protrusions, projections, or the like 18704 which engage/ride in/on one or more retention slots or groves 18708 in the blade cartridge support member 24 (e.g., the support member cavity 9304, yoke 47, and/or, yoke insert 18706). The retention post(s) 18704 may extend generally radially outward (e.g., generally perpendicular to the longitudinal axis of the shaving device 10) from a portion of the handle 60 (e.g., the collar 7714 and/or the handle post 9302), and may also include a generally linear or arcuate shape. For example, the retention post 18704 may have a generally cylindrical shape. The retention slots 18708 may have a generally linear or arcuate shape such as, but not limited to, a T-shaped slot, a Y-shaped slot, or the like.

When the blade cartridge support member 24 is in its center resting position relative to the handle 60, the longitudinal segment 19602 (FIG. 196) of the T-shaped or Y-shaped retention slot 18708 (FIG. 187) allows at least a portion of the retention post 18704 to pass through, so the blade cartridge support member 24 can be installed onto the handle 60 and/or removed (ejected) from the handle 60. When the blade cartridge support member 24 is displaced rotationally from its center position (e.g., twisted generally in the direction of arrow 9310), the retention post 18704 enters one of the two lateral segments 19604 (FIG. 196) of the T-shaped or Y-shaped retention slot 18708, so if the user attempts (purposefully or accidentally) to eject the blade cartridge support member 24 from the handle 60, the retention post 18704 will encounter one or more walls/surfaces of the lateral segments 19604 of the T-shaped or Y-shaped retention slot 18708, which will prevent accidental ejection from occurring. The retention post 18704 and the retention slot 18708 (e.g., the lateral segments 19604) may therefore form a positive mechanical engagement (e.g., a mechanical interlock). Displacement may occur during the shaving of contoured face and body area anatomies. The displacement/twisting movement of blade cartridge support member 24 during a shaving stroke may facilitate a closer shave for the user as the displacement/twisting movement of blade cartridge support member 24 allows the razor blades of blade cartridge 22 to closely follow the contour/terrain of the area being shaved.

It should be appreciated that the retention slot 18708 may have any shape. For example, the retention slot 18708 may have only a single lateral segment 19604. Additionally (or alternatively), the longitudinal segment 19602 of the retention slot 18708 does not have to be centrally located relative to the one or more lateral segments 19604. For example, the longitudinal segment 19602 may extend from one end region of the one or more lateral segments 19604 and/or from an intermediate region of the one or more lateral segments 19604. Additionally, while the longitudinal segment 19602 is shown having a generally linear configuration, the longitudinal segment 19602 may have any shape such as, but not limited to, an arcuate shape, zig-zag shape, or the like.

In the illustrated embodiment, the longitudinal segment 19602 extends from the one or more lateral segments 19604 to the groove, recess, and/or notch of the ramp member 17402 of the blade cartridge support member 24. It should be appreciated that the present disclosure is not limited in this regard, and the longitudinal segment 19602 may be completely separate from the ramp member 17402 of the blade cartridge support member 24.

Additionally, it should be appreciated that the blade cartridge retention mechanism may be used without the twist interface 18702 and/or that the blade cartridge retention mechanism may take the place of the twist interface 18702. In particular, the blade cartridge retention mechanism (e.g., the combination of the retention post 18704 and the retention slot 18708) may be configured to perform both the retention function described above, as well as the twist function described above with respect to the twist interface 18702. To this end, the twist interface 18702 (e.g., the combination of the ramp members 17402, 17404) may be eliminated. Instead, the longitudinal segment 19602 may extend from the proximal end 19102 (FIG. 191) of the blade cartridge support member 24 (e.g., yoke 47). The retention post 18704 may be advance through the longitudinal segment 19602 and ultimately to the one or more lateral segments 19604. The one or more lateral segments 19604 may have a contour which, when engaged by (e.g., abutted against) the retention post 18704, causes the blade cartridge support member 24 to twist and/or lateral move as described above with respect to the twist interface 18702.

One embodiment of a blade cartridge retention mechanism without the twist interface 18702 which also takes the place of the twist interface 18702 (e.g., is configured to perform both the retention function described above, as well as the twist function described above with respect to the twist interface 18702) is shown in FIGS. 217-218. For example, the blade cartridge retention mechanism may include one or more (e.g., a pair and/or a plurality) of retention posts, protrusions, projections, or the like 18704 which engage/ride in/on one or more retention slots or groves 18708 (best seen in FIG. 218) in the blade cartridge support member 24 (e.g., the support member cavity 9304, yoke 47, and/or, yoke insert 18706). The retention post(s) 18704 may extend generally radially outward (e.g., generally perpendicular to the longitudinal axis of the shaving device 10) from a portion of the handle 60 (e.g., the collar 7714 and/or the handle post 9302), and may also include a generally linear or arcuate shape. For example, the retention post 18704 may have a generally cylindrical shape. The retention post(s) 18704 may be molded as part of the handle 60 (e.g., but not limited to, as part of the handle post 9302). The retention slots 18708 may have a generally linear or arcuate shape such as, but not limited to, a T-shaped slot, a Y-shaped slot, or the like.

The blade cartridge support member 24 (e.g., the support member cavity 9304, yoke 47, and/or, yoke insert 18706) may optionally include a retention slot advancement passageway 21802 which extends from the retention slot 18708 to the opening 21804 of the support member cavity 9304. The retention slot advancement passageway 21802 is sized and shaped to allow the retention post 18704 to be advanced through the opening 21804 and into the retention slot 18708 when the handle post 9302 is advanced into the support member cavity 9304.

It should be appreciated that the arrangement of one or more of the retention post(s) 18704 and the retention slots or groves 18708 relative to the handle 60 and the blade cartridge support member 24 may be reversed. Optionally, the handle 60 may include one or more handle rotation magnets 16901 configured to generate an attractive magnetic force with one or more blade cartridge rotation magnets 16903 of the blade cartridge 22/support member 24. The attractive magnetic force between the handle rotation magnets 16901 and blade cartridge rotation magnets 16903 may allow the blade cartridge support member 24 to rotate/twist with respect to the handle 60 clockwise and counter-clockwise from an initial or central starting position in the direction of arrow 9310, and may urge the blade cartridge support member 24 back towards the initial/central starting position in which the poles of the handle rotation magnets 16901 and blade cartridge rotation magnets 16903 are aligned. Consistent with previously described embodiments, the handle rotation magnets 16901 and blade cartridge rotation magnets 16903 may be used in combination with other magnets (e.g., but not limited to, the central magnet 9312 and annular magnet 9316) or in lieu of these magnets (e.g., the central magnet 9312 and annular magnet 9316 may be eliminated).

As may be appreciated, the blade cartridge retention and biasing mechanism of FIGS. 187-196 utilizes only three individual components to achieve five mechanical functions (e.g., connection, biasing, twisting, lockout and ejection). This blade cartridge retention and biasing mechanism therefore significantly increases the functionality of the razor systems that incorporate its use, while simultaneously and significantly reducing the amount of individual components required to perform these five functions. By comparison other shaving devices that are common in the art utilize as few as seven individual components and as many as thirteen to achieve the same (and in some cases lesser) functionality.

Turning now to FIGS. 197-199, any embodiment of a shaving device 10 described herein may optionally include one or more alignment features 19702. The alignment features 19702 may be used to help the user align the blade cartridge support member 24 with the handle 60 when ejecting (e.g., removing/disconnecting) the blade cartridge support member 24 from the handle 60. More specifically, using the alignment feature 19702, the position of the retention post 18704 relative to the longitudinal segment 19602 may be aligned such that the retention post 18704 may be advanced through the longitudinal segment 19602 and the blade cartridge support member 24 may be removed from handle 60.

According to one embodiment, the alignment features 19702 may include at least a first indicia 19704 located on the blade cartridge support member 24 (e.g., but not limited to, the yoke 47) which may be aligned with at least a second indicia 19706 located on the handle 60 (e.g., but not limited to, the collar 7714). Non-limiting examples of one or more of the first and/or second indicia 19704, 19706 may include a line, marking, scoring, molded feature, or the like.

With reference now to FIGS. 198 and 199, the blade cartridge support member 24 has been twisted relative to the handle 60 from the initial/central/starting/ejection position, and the first and second indicia 19704, 19706 are not aligned with respect to each other. In contrast, as can be seen in FIG. 197, the first and second indicia 19704, 19706 which are aligned with respect to each other which indicates that the blade cartridge support member 24 is in the initial/central/starting/ejection position relative to the handle 60. Again, it should be appreciated that the first and second indicia 19704, 19706 are not limited to the embodiment shown in FIGS. 197-199, and that the first and second indicia 19704, 19706 may include any features that allows the user to determine the relative position of the blade cartridge support member 24 to the handle 60 (and more specifically, when the blade cartridge support member 24 is in the initial/central/starting/ejection position relative to the handle 60 such that the blade cartridge support member 24 may be disconnected/removed from the handle 60).

According to one embodiment, the handle 60 may be cast, polished and plated aluminum with elastomeric overmolded grip inserts. The collar 7714 may be cast aluminum or injection-molded plastic as indicated by aesthetics and mass/center-of-gravity considerations. The yoke 47 may be a two-piece injection molded assembly (e.g., as shown), with a center retainer (e.g., yoke insert 18706) being inserted into the outer yoke 47 that serves the dual function of retaining the annular magnet 7904 (e.g., ring magnet) in the yoke 47 and engaging with the features on the collar 7714 which control the relation of axial to rotational movement and limit the overall range of motion. The yoke 47 and yoke insert 18706 may include one or more anti-rotation features 19402, 19404 (FIGS. 194-196) which are configured to engage each other to form a positive mechanical engagement that generally prevent rotation of the yoke insert 18706 relative to the yoke 47.

A portion of the yoke 47 may be cored in order to adhere to injection molding best practices. The yoke 47 may also be assembled as a clamshell, with two opposing halves to conceal the coring and capture the annular magnet 7904. In such a scenario, a retainer may still be used, which would make the yoke 47 a three-piece injection molded assembly. The blade cartridge support member 24 may be constructed from a single injection-molded chassis which holds one or more razor blades, lube strips, skin engagement strips, and self lubricating, rotating bearing surfaces (e.g., as generally described herein). The blade cartridge support member 24 may include one or more (e.g., two) ferrous axles coupled to frame and/or integral plastic axles featuring one-time snaps to engage with the yoke arms 30 (FIG. 187).

Turning now to FIGS. 200-208, a blade cartridge connection mechanism for securing a blade cartridge 22 to a blade cartridge support member 24. The blade cartridge support member 24 may be an integral component of the handle 60 (not shown for clarity) or removably coupled to the handle 60 according to any mechanism known to those skilled in the art and/or described herein. The blade cartridge 22 may include any blade cartridge known to those skilled in the art including, but not limited to, any blade cartridge 22 described herein including, but not limited to, both single-sided and multi-sided blade cartridges 22. The head assembly 20 may optionally include any resistive pivot mechanism described herein such as, but not limited to, a magnetic resistive pivot mechanism. As shown, blade cartridge support member 24 comprises a generally U-shaped cartridge support frame 26 having two generally curved support arms 30 (a generally C-shape or L-shape); however, it should be appreciated that this is not a limitation of the present disclosure unless specifically claimed as such.

The blade cartridge 22 may include a frame 188 (which may be either one piece or multi-piece such as, but not limited to, a clam-shell design) having one or more pivot pin/cylinder 34 extending outwardly from the lateral edges of the frame 188 (e.g., a single pivot pin/cylinder 34 that extends across the entire frame 188) or a first and a second pivot pin/cylinder 34 extending outwardly from a first and a second lateral edge of the frame 188, respectively. One or more portions (e.g., distal end regions) of the pivot pin/cylinder 34 may include one or more magnets and/or ferrous materials.

The blade cartridge support member 24 includes one or more pivot receptacles 32. For example, each support arm 30 may include a pivot receptacle 32. At least one of the pivot receptacles 32 may include a receiving pocket or cavity 18202 configured to receive at least a portion of the pivot pin/cylinder 34 located on one of the opposing lateral sides of the blade cartridge 22.

The pocket or cavity 18202 may include an open end 18204, best seen in FIGS. 203-204) through which the pivot pin/cylinder 34 may be received into the pocket or cavity 18202. The pocket or cavity 18202 may also include tapered entry and/or tapered sidewalls to facilitate entry of the pivot pin/cylinder 34 into the pocket or cavity 18202. According to one embodiment, at least a portion of one or more of the pivot pin/cylinder 34 may have a non-circular cross-section configured to be received within the open end 18204 of the pocket or cavity 18202 in limited (e.g., one or two) orientations/alignments relative to the blade cartridge support member 24.

For example, as shown in FIGS. 205-208, the distal end regions of the pivot pin/cylinder 34 may have a non-circular cross-section, wherein a first transverse dimension 20802 (FIG. 208) is larger than a second transverse dimension 20804. According to at least one embodiment, the second transverse dimension 20804 is perpendicular to the first transverse dimension 20802. With reference to FIGS. 203-204, the open end 18204 of the pocket or cavity 18202 (and/or a passageway 20302 extending from the open end 18204 to the pocket or cavity 18202) may have first cross-section 20304 that is smaller than the second cross-section 20306 of the pocket or cavity 18202.

The first and second transverse dimensions 20802, 20804 of the pin/cylinder 34, as well as the first and second cross-sections 20304, 20306 of the open end/passageway 18204, 20302 and the pocket or cavity 18202, may be selected such that the pin/cylinder 34 can advance through the open end 18204 (and optionally the passageway 20302) when aligned such that the second transverse dimension 20804 of the pin/cylinder 34 is substantially parallel to the first cross-section 20304 of the open end/passageway 18204, 20302 (e.g., also while the first transverse dimension 20802 of the pin/cylinder 34 is aligned perpendicular to the second cross-section 20306 of the open end/passageway 18204, 20302). For example, the second transverse dimension 20804 of the pin/cylinder 34 may be slightly smaller than the first cross-section 20304 of the open end/passageway 18204, 20302 (e.g., but not limited to, less than 5% smaller, less than 10% smaller, or the like).

Once the pin/cylinder 34 is located in the pocket or cavity 18202, the pin/cylinder 34 of the blade cartridge 22 may be rotated within the pocket or cavity 18202 since the first transverse dimension 20802 of the pin/cylinder 34 may be slightly smaller (e.g., but not limited to, less than 5% smaller, less than 10% smaller, or the like) than the second cross-section 20306 of the pocket or cavity 18202. Additionally, it should be appreciated that the pin/cylinder 34 cannot be withdrawn from the pocket or cavity 18202 unless the second transverse dimension 20804 of the pin/cylinder 34 is aligned substantially parallel to the first cross-section 20304 of the open end/passageway 18204, 20302.

According to one embodiment, the pivot receptacle 32 and/or arm 30 includes one or more arm magnets 18206 (e.g., one or more permanent magnets and/or electromagnets). The arm magnets 18206 may be configured to create an attractive magnetic force with the pivot pin/cylinder 34 received therein. For example, the pivot pin/cylinder 34 may include a ferrous material that is magnetically attracted to the arm magnets 18206, thereby mounting, securing, and/or otherwise coupling the blade cartridge 22 to the blade cartridge support member 24. Alternatively (or in addition), the pivot pin/cylinder 34 may include a magnet having its poles align such that it is magnetically attracted to the arm magnets 18206, thereby mounting, securing, and/or otherwise coupling the blade cartridge 22 to the blade cartridge support member 24. In either case, the blade cartridge 22 may rotate about the pivot axis PA relative to the blade cartridge support member 24 at any angle, up to and including 360° degrees.

The blade cartridge 22 may include one or more blade cartridge magnets 18208 coupled and fixed to one or more of the lateral edges of the blade cartridge 22 and generally facing the arm magnets 18206. Similar to the arm magnets 18206, the blade cartridge magnets 18208 may also have a square, rectangular, oblong, oval, and/or elongated shape. The arm magnets 18206 and the blade cartridge magnets 18208 may be aligned to generate an attractive or repulsive magnetic force.

The lateral edges of the blade cartridge 22 may also include one or more rotation limiters 18210. The rotation limiters 18210 may be disposed proximate to the pivot pin/cylinder 34, and may be configured to engage a portion of the arm 30 (e.g., a rotation limiter cavity 20310 as generally illustrated in FIGS. 203-204) to generally limit the rotation of the blade cartridge 22 about the pivot axis PA to a predefined range. For example, the rotation limiters 18210 may include a projection that extends outward (e.g., radially outward about) the pin/cylinder 34 that forms a stop when it engages a portion of the rotation limiter cavity 20310, thereby preventing further rotation of the blade cartridge 22 relative to the arms 30. It should be appreciated that one or more arms 30 may include one or more rotation limiters 18210 which may engage against a portion of the blade cartridge 22 (e.g., but not limited to, the rotation limiters 18210 of the blade cartridge 22).

In practice, the user may position the unassembled blade cartridge 22 proximate to the opening 18204 of the pocket or cavity 18202 with the second transverse dimension 20804 of the pin/cylinder 34 substantially parallel to the first cross-section 20304 of the open end/passageway 18204, 20302 and the magnetic attraction generated between the pivot pin/cylinder 34 and/or blade cartridge magnets 18208 and the one or more arm magnets 18206 may cause the pivot pin/cylinder 34 to advance through the open end/passageway 18204, 20302 until the pivot pin/cylinder 34 is received within the pocket or cavity 18202 of the pivot receptacle 32. The arm magnets 18206 may cause the blade cartridge 22 to align with the blade cartridge magnets 18208 in the initial starting position relative to the blade cartridge support member 24/handle 60. Likewise, the user may dispose (e.g., remove) the blade cartridge 22 from the pivot receptacle 32 by aligning the second transverse dimension 20804 of the pin/cylinder 34 substantially parallel to the first cross-section 20304 of the open end/passageway 18204, 20302 and manually placing a thumb and forefinger on each lateral end of blade cartridge 22 (or use a tool) to dislodge/remove the pivot pin/cylinder 34 (and therefore the blade cartridge 22) from the pocket or cavity 18202 of the pivot receptacle 32.

It should be appreciated that while the pivot receptacle 32 is illustrated having one arm magnet 18206 in each arm 30, the arm magnets 18206 may optionally be disposed in only one or more of the pivot pin/cylinders 34/arms 30. Moreover, the location of one or more of the pivot receptacles 32 and the pivot pins 34 may be switched (e.g., one or more of the pivot receptacles 32 may be located in the blade cartridge 22 and one or more of the pivot pins/cylinders 34 may extend outwardly from the support arms 30 of the blade cartridge support member 24).

Turning now to FIGS. 209-214, this embodiment may be similar to the embodiment described in combination with FIGS. 200-208, however, rather than of the rotation limiters 18210 and rotation limiter cavities 20310, the lateral edges of the blade cartridge 22 may also include one or more resilient detents 21002 (FIGS. 210-212) and/or pawls that engage one or more resilient detents and/or pawls 21302 on the arms 30 (FIGS. 213-214).

In addition to the attraction between the magnets 18206, 18208 mounted in the arms 30 and in the lateral edges/sides of the blade cartridge 22, which tend to return the blade cartridge 22 body to one of two natural resting positions or points of stable equilibrium, the resilient detents 21002, 21302 introduce a detent that resists changing from one side of the blade cartridge 22 to the other (when used with a multi-sided blade cartridge 22), thus requiring an intentional action on the part of the user to make the change (e.g., to change faces on the blade cartridge 22). The resilient detents 21002 may be located/positioned at two points of unstable equilibrium, so that on either side of the resilient detents 21002, the blade cartridge 22 will tend to return to its nearest natural resting position. The resilient detents 21002, 21302 may generally limit rotation of the blade cartridge 22 within a predefined range unless the user intentionally applies enough force to deform the resilient detents 21002, 21302. It should be appreciated that while both sets of detents 21002, 21302 may be resiliently deformable, any of the detents 21002, 21302 may be rigid (e.g., non-deformable). For example, one of the detents 21002 on the blade cartridge 22 may be rigid and the detents 21302 on the arms 30 may be rigid, while another detent 21002 on the blade cartridge 22 may be resiliently deformable. Additionally (or alternatively), the rigid detents 21002, 21302 may generally limit rotation in one direction beyond a certain point (e.g., but not limited to, when used in combination with a single-side blade cartridge 22).

It should be appreciated that the detents 21002, 21302 of FIGS. 209-214 may be combined with the rotation limiters 18210 and rotation limiter cavities 20310 described in combination with FIGS. 200-208. Although the rotation limiters 18210 and rotation limiter cavities 20310 can be used with multi-sided blade cartridges 22, they are particularly useful with single-sided blade cartridges 22. In contrast, while the detents 21002, 21302 may be used with single-sided blade cartridges 22, they are particularly useful with multi-sided blade cartridges 22. By providing the arms 30 with both the detents 21302 and the rotation limiter cavities 20310, the design provides for a singular yoke 47 and cartridge support frame 26 with a singular common connection mechanism capable of receiving and accommodating both single-sided and multi-sided blade cartridges 22.

As noted above, the pivot pin/cylinder 34 and their receiving openings/passageways/recesses 18204, 20302, 18202 in the arms 30 may be configured to limit the range of angles/alignments of the blade cartridge 22 at which the blade cartridge 22 may be removed from the arms 30. The tips of the pivot pin/cylinder 34 may have a non-circular shape (e.g., flat areas 180° apart from one another), and the openings and passageways 18204, 20302 in the arms 30 have a narrow cross-section through which the tips of the pivot pin/cylinder 34 must pass for the blade cartridge 22 to be coupled or removed. As a result, the blade cartridge 22 may only be coupled or removed when the flats of the tips of the pivot pin/cylinder 34 are aligned with the walls of the narrow opening and/or passageway 18204, 20302. Once installed, if the blade cartridge 22 is rotated, the flats of the tips of the pivot pin/cylinder 34 are no longer aligned with the narrow opening and/or passageway 18204, 20302 and the blade cartridge 22 can only rotate but not be radially displaced (e.g., removed from the recess 18202). This serves to reduce the likelihood of the blade cartridge 22 being accidentally ejected from the arms 30, e.g., during a shaving stroke.

Additionally, as noted above, the blade cartridge 22 may include one or more pivot pin/cylinder 34 extending outwardly from the lateral edges of the frame 188 (e.g., a single pivot pin/cylinder 34 that extends across the entire frame 188) or a first and a second pivot pin/cylinder 34 extending outwardly from a first and a second lateral edge of the frame 188, respectively. One or more portions (e.g., distal end regions) of the pivot pin/cylinder 34 may include one or more magnets and/or ferrous materials.

The first and a second pivot pin/cylinder 34 increase the wash-through capabilities of the blade cartridge 22 compared to a single pin/cylinder 34. Additionally, the first transverse dimension 20802 of the pin/cylinder 34 may be in the range of 2 to 3 mm (e.g., but not limited to, 2.5 mm) and the second transverse dimension 20804 may be in the range of 1.5 to 2.0 mm (e.g., but not limited to, 1.88 mm) when used with the connection mechanism between the blade cartridge 22 and the arms 30, for example, as described in FIGS. 200-213. A larger first transverse dimension 20802 of the pin/cylinder 34 allows for a larger difference between the first transverse dimension 20802 and the second transverse dimension 20804.

The blade cartridge 22 may optionally include a face indicator 21102 that allows the user to easily tell which side/face of the blade cartridge 22 is currently in use. The face indicator 21102 may include any indicator such as, but not limited to, a numerical indicator (e.g., roman numerals), one or more bumps (e.g., a single bump indicating a first face of the blade cartridge 22 and two bumps indicating the second face of the blade cartridge 22), or the like. The face indicator 21102 may be used with any multi-sided blade cartridge 22 described herein.

Turning now to FIG. 215, a variation of the blade cartridge connection mechanism for securing a blade cartridge 22 to a blade cartridge support member 24 which is similar to that described above with respect to FIGS. 200-208 is generally illustrated. The arm magnets 18206 and the blade cartridge magnets 18208 may be magnetized across their width rather than through the thickness. The arm magnets 18206 and the blade cartridge magnets 18208 are oriented in the arm 30 and in the blade cartridge 22 such that when the blade cartridge 22 is in its natural resting position, the magnets 18206, 18208 are at maximum attraction due to the orientation of north (on the arm 30) facing south (on the blade cartridge 22) and vice versa. The alignment of the poles of the magnets 18206, 18208 creates a repulsive magnetic force during the insertion and removal of the blade cartridge 22 from the arms 30.

To install the blade cartridge 22, the user would cause the arms 30 (by manipulating the handle 60) to approach the blade cartridge 22 with the arms 30 oriented such that the flats on the pivot pin/cylinder 34 aligns with the narrow passageways/cross-sections as described above. The user would experience a repulsion force as the arms 30 approach the blade cartridge 22, but by overcoming the repulsion force, would cause the pivot pin/cylinder 34 to pass through the narrow passageways/cross-sections. Once the blade cartridge 22 passes the point at which the opposing similar poles on the magnets 18206, 18208 are closest to each other, the repulsion force switch directions and, aided by attraction of the magnets' opposite poles, seat the pivot pin/cylinder 34 fully in the recesses/cavities 18202 in the arms 30. To use the assembled blade cartridge 22, the user would rotate the handle 60 (e.g., upward) such that the flats on the pivot pin/cylinder 34 no longer align with the narrow passageways/cross-sections in the arms 30. As a result, the blade cartridge 22 will be retained by the arms 30 when the handle 60 is pulled away from the blade cartridge 22 because the pivot pin/cylinder 34 cannot pass through the narrow passageways/cross-sections. At this point, the blade cartridge 22 can be rotated, subject to the limitations imposed by the rotation limiters/detents described above. In any angular position of the blade cartridge 22 relative to the arms 30 other than its natural resting position, the magnetic attraction is attempting to return the blade cartridge 22 to its resting position, and the pivot pin/cylinders 34 are constrained in the arms 30 due to the flats being rotated such that the pivot pin/cylinders 34 cannot pass through the narrow passageway/cross-sections.

To eject the blade cartridge 22, the user would push downward on the back side of the blade cartridge 22 when it is in its natural resting position and the flats on the pivot pin/cylinders 34 are aligned with the narrow passageways/cross-sections in the arms 30. After overcoming the initial attraction of the magnets 18206, 18208, the pivot pin/cylinders 34 would begin to pass through the passageways/opening until similar poles on the opposing magnets 18206, 18208 would pass by each other, at which point a repulsive force would cause the blade cartridge 22 to be ejected forcefully away from the arms 30.

It should be appreciated that the blade cartridge connection mechanisms described in connection with FIGS. 200-215 may be combined with any of the connection mechanisms for connecting the blade cartridge support member 24 to the handle 60 described herein such as, but not limited to, the repulsive magnetic connections mechanism described in connection with FIGS. 187-199. Additionally, it should be appreciated that the repulsive magnetic connections mechanism/twisting described in connection with FIGS. 187-199 may be used with a blade cartridge support member 24 that is permanently coupled to the handle 60 as generally described herein. In particular, the repulsive magnetic connections mechanism/twisting described in connection with FIGS. 187-199 may be used with a blade cartridge support member 24 that is permanently coupled to the handle 60 while also allowing the blade cartridge support member 24 to twist relative to the handle 60. Any of the connection mechanisms described herein (e.g., but not limited to, the connection mechanisms between the arms 30 and the blade cartridge 22 described in connection with FIGS. 199-216) may be used to couple (either permanently or removably couple) the blade cartridge 22 to the arm(s) 30.

According to one embodiment, the central magnet 7902 and the annular magnet 7904 may be used only for the connection between the blade cartridge support member 24 and the handle 60. Since the central magnet 7902 is not being used to return the blade cartridge 22 to its natural resting position, the central magnet 7902 may be placed further away from the blade cartridge 22 and may be capped and not visible to the user when the shaving device 10 is assembled. According to another embodiment, the blade cartridge support member 24 may be attached to the handle 60 in the manner in which this is accomplished in FIGS. 187-199, using the magnets' repulsion as a form of connection. The blade cartridge 22 may be held in the arms in the manner in which it is held in FIGS. 200-215, using the attraction between arm magnet 18206 and ferrous pivot pin/cylinder 34. However, unlike in FIGS. 200-215, no magnets would exist in the sides of the blade cartridge 22; instead, the blade cartridge 22 would be induced to return to its natural resting position following a rotational displacement by repulsion between the central magnet 7902 and the annular magnet 7904, e.g., disc magnet mounted on the collar post and a disc magnet mounted on the back of the blade body, as accomplished in FIGS. 187-199.

Optionally, one or more of the arms 30 may additionally include one or more unstable equilibrium magnets 21602, FIGS. 216 and 219. The unstable equilibrium magnets 21602 may be positioned on the arm 30 near the point of unstable equilibrium of the double-sided cartridge (e.g., a region where the magnetic biasing force is weak and/or insufficient to cause the blade cartridge 22 to rotate to either of the center point corresponding to the faces of the blade cartridge 22. The unstable equilibrium magnets 21602 may be configured to repel the arm magnets 18206 of the blade cartridge 22. As noted above, one function of the unstable equilibrium magnets 21602 is to reduce or eliminate the angular range surrounding the true point of unstable equilibrium at which the blade cartridge 22 may become "stuck" due to friction at the pivot point, and aid in returning the blade cartridge 22 to its point of stable equilibrium (e.g., a center point corresponding to a selected face).

It should be appreciated that while the shaving devices 10 of, for example, FIGS. 216 and 219 (as well as FIGS. 209-214) are shown in combination with a multi-faced disposable head assembly 20, the blade cartridge connection mechanism may be used to also secure a single-sided disposable head assembly 20 to the blade cartridge support member 24. Similarly, while the shaving devices 10 of, for example, FIGS. 200-208 (as well as FIG. 215) are shown in combination with a single-sided disposable head assembly 20, the blade cartridge connection mechanism may be used to also secure a multi-faced disposable head assembly 20 to the blade cartridge support member 24. As such, the blade cartridge support members 24 of FIGS. 200-216 (as well as any other embodiment of the blade cartridge connection mechanisms disclosed herein) may be used to secure both single-sided and multi-faced disposable head assemblies 20 to the same blade cartridge support members 24 and handle 60.

Turning now to FIGS. 220-225, another embodiment of a shaving device 10 consistent with the present disclosure is generally illustrated including a handle 60 and a head assembly 20. With reference to FIGS. 220-221, one embodiment of the shaving device 10 in the assembled state is generally illustrated in FIG. 220 while an exploded view of the shaving device of FIG. 220 is generally illustrated in FIG. 221. The blade cartridge support member 24 is configured to rotate/twist with respect to the handle 60 clockwise and counter-clockwise from an initial or central starting position in the direction of arrow 9310. Similar to previous embodiments, (e.g., but not limited to, at least one embodiment of the shaving device 10 of FIG. 187), the shaving device 10 includes a blade cartridge support member retention mechanism that both permanently secures the blade cartridge support member 24 (e.g., yoke 47) to the handle 60 and allows the blade cartridge support member 24 to rotate rotate/twist with respect to the handle clockwise and counter-clockwise from an initial or central starting position in the direction of arrow 9310. To this end, the handle 60 and the head assembly 20 may include one or more central magnets 7902 and/or annular magnets 7904 (e.g., but not limited to, as generally described with respect to FIG. 79, 93 and FIG. 174) configured to create a magnetic repulsion force. The central magnets 7902 and/or annular magnets 7904 may be arranged in/on handle 60 and blade cartridge support member 24, respectively (as shown), and/or may be reversed.

While not shown, the handle 60 and the head assembly 20 may additionally (or alternatively) include one or more handle rotation magnets configured to generate a repulsive and/or attractive magnetic force with one or more blade cartridge support member rotation magnets of the blade cartridge 22/blade cartridge support member 24 (e.g., but not limited to, as generally described with respect to FIG. 169). The repulsive and/or attractive magnetic forces may optionally aid in generally securing and/or retaining the blade cartridge support member 24 to the handle 60, in addition to facilitating the pivotal rotation and return of blade cartridge support member 24 from the initial/central starting position.

The blade cartridge retention mechanism may include one or more (e.g., a pair and/or a plurality) of retention posts, protrusions, projections, or the like 18704 (best seen in FIG. 221) which engage/ride in/on one or more retention slots or groves 18708 (best seen in FIGS. 222-224) in the blade cartridge support member 24 (e.g., the support member cavity 9304, yoke 47, and/or, yoke insert 18706). The retention post(s) 18704 may extend generally radially outward (e.g., generally perpendicular to the longitudinal axis of the shaving device 10) from a portion of the handle 60 (e.g., the collar 7714 and/or the handle post 9302), and may also include a generally linear or arcuate shape. For example, the retention post 18704 may have a generally cylindrical shape. The retention slots 18708 may have a generally linear or arcuate shape such as, but not limited to, a T-shaped slot, a Y-shaped slot, a V-shaped slot, or the like. An exploded view of the retention post 18704 and retention slots or groves 18708 is shown in FIG. 225. While the retention slots or groves 18708 are shown being formed in the yoke insert 18706 in FIGS. 223-225, it should be appreciated that this is not a limitation of the present disclosure unless specifically claimed as such.

According to one embodiment, the retention post(s) 18704 may include one or more pins that are secured to the handle post 9302 after the blade cartridge support member 24 (e.g., the support member cavity 9304, yoke 47, and/or, yoke insert 18706) are mounted on the handle post 9302. For example, the retention post(s) 18704 may be secured to the handle post 9302 after the yoke insert 18706 is mounted on the handle post 9302. To this end, the handle post 9302 and/or the blade cartridge support member 24 (e.g., the support member cavity 9304, yoke 47, and/or, yoke insert 18706) may each include one or more passageways configured to receive a portion of the retention post(s) 18704 after the blade cartridge support member 24 (e.g., the support member cavity 9304, yoke 47, and/or, yoke insert 18706) is mounted on/over the handle post 9302. The retention post(s) 18704 may be secured (e.g., permanently or removably secured) to the handle post 9302 and/or the blade cartridge support member 24 using, for example, an adhesive, welding, overmolding, press-fitting, positive mechanical connection, mechanical snap/retainer/fastener, and/or the like). In at least one embodiment, the blade cartridge support member 24 (e.g., the support member cavity 9304, yoke 47, and/or, yoke insert 18706) may include one or more one-way retainers (e.g., a one-way snap retainer) that allows the retention post(s) 18704 to be advanced into engagement with the handle post 9302 and prevents the retention post(s) 18704 from passing back out again (e.g., for capturing and/or retaining (e.g. locking) the retention post(s) 18704 to the handle post 9302).

The blade cartridge retention mechanism (e.g., the combination of the retention post 18704 and the retention slot 18708) may be configured to perform both the retention function described above, as well as the twist function described above with respect to the twist interface 18702. As such, the twist interface 18702 (e.g., FIG. 174) (e.g., the combination of the ramp members 17402, 17404) may be eliminated. The retention post 18704 may be disposed within one or more lateral segments 19604 of the retention slots or groves 18708 formed within the support member cavity 9304. For example, the support member cavity 9304 may include two retention slots or groves 18708 corresponding to the two retention posts 18704 extending outwardly (e.g., generally perpendicularly outwardly) from the handle 60 (e.g., the handle post 9302). The one or more lateral segments 19604 may have a contour which, when engaged by (e.g., abutted against) the retention post 18704, causes the blade cartridge support member 24 to twist and/or move laterally as described above with respect to the twist interface 18702.

The blade cartridge 22 may be removably coupled to the blade cartridge support member 24 according to any embodiment described herein. For example, the blade cartridge 22 may be removably coupled to the blade cartridge support member 24 as described in FIGS. 182, 200-216, and/or 219. As may be appreciated, the combination of the handle 60 and the blade cartridge support member 24 may be removably coupled to both single-sided disposable head assemblies 20 and multi-faced disposable head assemblies 20. Additionally, the blade cartridge support member 24 may be permanently coupled to the handle 60, while also allowing it to be able to rotate/twist with respect to the handle 60 clockwise and counter-clockwise from an initial or central starting position in the direction of arrow 9310 (and optionally cause the blade cartridge support member 24 to move longitudinally away from the handle 60 in the direction of arrow 17410). As a result, this arrangement greatly reduces the amount of waste material that is discarded after the blade cartridge 22 has become dull, as only the blade cartridge 22 needs to be discarded when a new disposable head assembly 20 is necessary, while the blade cartridge support member 24 and therefore yoke 47 may remain permanently attached to the handle 60.

Optionally, the shaving device 10 may include one or more turret biasing magnets 22202, best seen in FIG. 222. The turret biasing magnet 22202 may generate an attractive (or repulsive) magnetic force with one or more magnets of the handle 60 (central magnet 7902) to adjust the profile of the return force (e.g., the return biasing force) that urges the blade cartridge support member 24 (e.g., the yoke 47) towards the initial starting and/or resting position relative to the handle 60, for example, as generally illustrated by arrow 9310. For example, as the blade cartridge support member 24 (e.g., the yoke 47) is subjected to an increasing angular deflection from its resting position (e.g., as generally illustrated by arrow 9310), the blade cartridge support member 24 (e.g., the yoke 47) may be displaced (e.g., moves) generally along the longitudinal axis of at least a portion of the handle 60 (e.g., but not limited to, along a longitudinal axis of the handle post 9302) such that the separation distance between the turret biasing magnet 22202 and the corresponding magnet of the handle 60 (e.g., but not limited to, the central magnet 7902) either increases and/or decreases as the blade cartridge support member 24 (e.g., the yoke 47) is subjected to an increasing angular deflection from its resting position. In either case, the profile of the return force may increase and/or decrease due to the change in the separation distance between the turret biasing magnet 22202 and the corresponding magnet of the handle 60 (e.g., but not limited to, the central magnet 7902) as the blade cartridge support member 24 (e.g., the yoke 47) is subjected to an increasing angular deflection from its resting position.

The location and/or the magnetic flux (e.g., magnitude) of the turret biasing magnet 22202 relative to the corresponding magnet of the handle 60 (e.g., but not limited to, the central magnet 7902) may be selected to allow the profile of the return force (e.g., the return biasing force) that urges the blade cartridge support member 24 (e.g., the yoke 47) towards the initial starting and/or resting position to be adjusted as the blade cartridge support member 24 (e.g., the yoke 47) is subjected to an increasing angular deflection from its resting position. For example, the turret biasing magnet 22202 and the corresponding magnet of the handle 60 (e.g., but not limited to, the central magnet 7902) may be configured such that the force decreases (e.g., progressively decreases) as the blade cartridge support member 24 (e.g., the yoke 47) is subjected to an increasing angular deflection from its resting position. Alternatively (or in addition), the turret biasing magnet 22202 and the corresponding magnet of the handle 60 (e.g., but not limited to, the central magnet 7902) may be configured such that the force initially decreases and then increases (or increases and then decreases) as the blade cartridge support member 24 (e.g., the yoke 47) is subjected to an increasing angular deflection from its resting position.

In one embodiment, the magnetic force between the turret biasing magnet 22202 relative to the corresponding magnet of the handle 60 (e.g., but not limited to, the central magnet 7902) may be an attractive magnetic force. It should be appreciated that the attractive magnetic force between the turret biasing magnet 22202 and the corresponding magnet of the handle 60 (e.g., but not limited to, the central magnet 7902) may have a magnitude that is greater than (or less than) the repulsive magnetic force between, for example, the central magnet 7902 and the annular magnet 7904. For example, the net force that causes the blade cartridge support member 24 (e.g., the yoke 47) to twist/rotate generally in the direction illustrated by arrow 9310 and/or to be displaced (e.g., moved) generally along the longitudinal axis 17410 of at least a portion of the handle 60 (e.g., but not limited to, along a longitudinal axis of the handle post 9302) may be (and/or include) the sum of the magnetic force (e.g., attractive magnetic force) between the turret biasing magnet 22202 and the corresponding magnet of the handle 60 (e.g., but not limited to, the central magnet 7902) and the repulsive magnetic force between the central magnet 7902 and the annular magnet 7904. By selecting the relative strengths, sizes, and locations of the various magnets (e.g., turret biasing magnet 22202, central magnet 7902, and/or annular magnet 7904), the net force that causes the blade cartridge support member 24 to twist/rotate generally in the direction illustrated by arrow 9310 and/or to be displaced (e.g., moved) generally along the longitudinal axis 17410 of the handle 60 may decrease progressively as the blade cartridge support member 24 (e.g., the yoke 47) is subjected to an increasing angular deflection from its resting position and/or may first decrease then increase.

In another embodiment, the magnetic force between the turret biasing magnet 22202 relative to the corresponding magnet of the handle 60 (e.g., but not limited to, the central magnet 7902) may be a repulsive magnetic force. It should be appreciated that the repulsive magnetic force between the turret biasing magnet 22202 and the corresponding magnet of the handle 60 (e.g., but not limited to, the central magnet 7902) may have a magnitude that is greater than (or less than) the repulsive magnetic force between, for example, the central magnet 7902 and the annular magnet 7904. For example, the net force that causes the blade cartridge support member 24 (e.g., the yoke 47) to twist/rotate generally in the direction illustrated by arrow 9310 and/or to be displaced (e.g., moved) generally along the longitudinal axis 17410 of at least a portion of the handle 60 (e.g., but not limited to, along a longitudinal axis of the handle post 9302) may be (and/or include) the sum of the repulsive magnetic force between the turret biasing magnet 22202 and the corresponding magnet of the handle 60 (e.g., but not limited to, the central magnet 7902) and the repulsive magnetic force between the central magnet 7902 and the annular magnet 7904. By selecting the relative strengths, sizes, and locations of the various magnets (e.g., turret biasing magnet 22202, central magnet 7902, and/or annular magnet 7904), the net force that causes the blade cartridge support member 24 to twist/rotate generally in the direction illustrated by arrow 9310 and/or to be displaced (e.g., moved) generally along the longitudinal axis 17410 of the handle 60 may increase progressively as the blade cartridge support member 24 (e.g., the yoke 47) is subjected to an increasing angular deflection from its resting position and/or may first increase then decrease.

In any of the embodiments described herein where the blade cartridge support member 24 (e.g., the yoke 47) twists (e.g., in the direction of arrow 9310), the shaving device 10 may include a blade cartridge support member lockout. The blade cartridge support member lockout may be user selectable/activatable to lock the position of the blade cartridge support member 24 (e.g., the yoke 47) relative to the handle 60 (the blade cartridge 22 may still rotate relative to the blade cartridge support member 24 (e.g., the yoke 47)). To this end, the user may activate the blade cartridge support member lockout such that the position of the blade cartridge support member 24 (e.g., the yoke 47) is fixed relative to the handle 60 and the blade cartridge support member 24 (e.g., the yoke 47) cannot rotate in the direction of arrow 9310.

One embodiment of the blade cartridge support member lockout is generally illustrated in FIGS. 226-228. The blade cartridge support member lockout 22602 may include a slider switch 22604 mounted on the blade cartridge support member 24 (e.g., the yoke 47 and/or the yoke insert 18706) configured to move (e.g., slide) into and out of engagement with a portion of the handle 60 (e.g., but not limited to, the handle post 9302 and/or collar 16999) between a locked position (as generally illustrated in FIG. 226) in which the position of the blade cartridge support member 24 (e.g., the yoke 47) is fixed relative to the handle 60, and an unlocked position (as generally illustrated in FIG. 227) in which the blade cartridge support member 24 (e.g., the yoke 47) can rotate in the direction of arrow 9310.

The slider switch 22604 is operable to move (e.g., slide) within one or more slider channels, grooves and/or slots 22606 between the locked and unlocked positions. The grooves or slots 22606 may be formed at least partially in the blade cartridge support member 24 (e.g., but not limited to, the top of the yoke 47 and/or the yoke insert 18706) and may extend to the support member cavity 9304. With reference to FIG. 228, a cross-sectional view of a portion of the shaving device 10 of FIG. 226 taken along lines C228-C228 is generally illustrated. As can be seen, the slider switch 22604 may include an upper surface 22802 configured to allow a user to engage (e.g., grip) the slider switch 22604 to move the slider switch 22604 within the slider channels, grooves and/or slots 22606, as well as a slider body 22804 defining at least one lockout pawl/detent 22806. At least a portion of the slider body 22804 is sized and shaped to fit within and retain the slider switch 22604 within the slider channels, grooves and/or slots 22606 while allowing the slider switch 22604 to move within the slider channels, grooves and/or slots 22606 between the locked and unlocked positions.

In at least one embodiment, the blade cartridge support member 24 (e.g., the yoke 47) moves along the longitudinal axis 17410 of at least a portion of the handle 60 (e.g., but not limited to, along a longitudinal axis of the handle post 9302) when the blade cartridge support member 24 is subjected to an angular displacement (e.g., generally in the direction of arrow 9310). When the blade cartridge support member 24 (e.g., but not limited to, the yoke 47) is aligned with the handle 60 (e.g., using indicia 19704, 19706) and the blade cartridge support member lockout 22602 is in the locked position, the lockout pawl/detent 22806 is configured to engage against (e.g., is at least partially received within) a handle notch/recess 22808 formed in the handle 60 (e.g., but not limited to, the handle post 9302). With the lockout pawl/detent 22806 engaged within the handle notch 22808, the blade cartridge support member 24 is prevented from moving along the longitudinal axis 17410 of at least a portion of the handle 60 by virtue of a positive mechanical interference, and as a result, the blade cartridge support member 24 is prevented from twisting (e.g., angular displacement generally in the direction of arrow 9310) relative to the handle 60. When the lockout pawl/detent 22806 disengages the handle notch 22808, the blade cartridge support member 24 is free to move along the longitudinal axis 17410 and rotate (e.g., angular displacement generally in the direction of arrow 9310) relative to the handle 60.

Turning now to FIGS. 229-234, another embodiment of a blade cartridge support member lockout is generally illustrated. The blade cartridge support member lockout 22902 may include a slider switch 22904 mounted on the handle 60 (e.g., the collar 7714/16999) configured to move (e.g., slide) into and out of engagement with a portion of the blade cartridge support member 24 (e.g., the yoke 47 and/or the yoke insert 18706, not shown) between a locked position (as generally illustrated in FIG. 229) in which the position of the blade cartridge support member 24 (e.g., the yoke 47) is fixed relative to the handle 60, and an unlocked position (as generally illustrated in FIG. 230) in which the blade cartridge support member 24 (e.g., the yoke 47) can rotate in the direction of arrow 9310.

The slider switch 22904 is operable to move (e.g., slide) within one or more slider channels, grooves and/or slots 22906 formed at least partially in the handle 60 (e.g., the collar 7714/16999) between the locked and unlocked positions. With reference to FIG. 231, a close-up of one embodiment of the slider switch 22904 is generally illustrated. As can be seen, the slider switch 22904 may include an upper surface 23102 configured to allow a user to engage (e.g., grip) the slider switch 22904 to move the slider switch 22904 within the slider channels, grooves and/or slots 22906, as well as a slider body 23104 defining at least one lockout pawl/detent 23106. One example of the slider channels, grooves and/or slots 22906 is illustrated in FIGS. 232-233. At least a portion of the slider channels, grooves and/or slots 22906 is formed in the handle 60 (e.g., the collar 7714/16999), though the slider channels, grooves and/or slots 22906 may also include an optional portion formed in the blade cartridge support member 24 (e.g., but not limited to, the yoke 47). In at least one embodiment, the slider channels, grooves and/or slots 22906 may be formed in a side portion of the handle 60 and/or blade cartridge support member 24, though this is not a limitation of the present disclosure unless specifically claimed as such. The slider channels, grooves and/or slots 22906 are sized and shaped to receive at least a portion of the slider body 23104 and retain the slider switch 22904 therein while allowing the slider switch 22904 to move within the slider channels, grooves and/or slots 22906 between the locked and unlocked positions.

The blade cartridge support member 24 (e.g., but not limited to, the yoke 47 and/or yoke insert 18706) may also include a blade cartridge support member notch/recess 23204 (best seen in FIGS. 232 and 234). The slider channels, grooves and/or slots 22906 are configured such that at least a portion of the lockout pawl/detent 23106 engages with (e.g., is at least partially received within) the blade cartridge support member notch 23204 when the blade cartridge support member 24 (e.g., but not limited to, the yoke 47) is aligned with the handle 60 (e.g., using indicia 19704, 19706) and the slider switch 22904 is in the locked position (e.g., FIGS. 229 and 232). When the lockout pawl/detent 23106 engages the blade cartridge support member notch 23204, rotation of the blade cartridge support member 24 in the direction of arrow 9310 is generally prevented by virtue of a positive mechanical interference. It should be appreciated that the blade cartridge support member lockout 22902 does not rely upon longitudinal movement of the blade cartridge support member 24 relative to the handle 60 in order to lock the blade cartridge support member 24 relative to the handle 60. When the lockout pawl/detent 23106 is withdrawn from the blade cartridge support member notch 23204, the blade cartridge support member 24 is free to move in the direction of arrow 9310.

In any of the embodiments of the blade cartridge support member lockout described herein (e.g., but not limited to, blade cartridge support member lockouts 22602, 22902), the blade cartridge support member lockout may include a slider switch catch. The slider switch catch is configured to cause the slider switch to be biased in one or both of the positions (e.g. the locked position and/or the unlocked position). The slider switch catch is further configured to require a user to apply a force to the slider switch sufficient to overcome the slider switch catch biasing force in order to cause the slider switch to move from one of the positions to the other position. The slider switch catch may generally prevent a user from accidentally moving the slider switch from one position to the other.

One embodiment of a slider switch catch is generally illustrated in FIGS. 235-236. For example, the slider switch catch may include one or more resiliently deformable tabs 23502 disposed on the slider switch 23504 (FIG. 235). The resiliently deformable tabs 23502 are configured to engage with one or more corresponding tab recesses 23602 formed in the slider channels, grooves and/or slots 23604 (FIG. 236). The tab recesses 23602 may be positioned with respect to the slider channels, grooves and/or slots 23604 such that slider switch 23504 is positioned at one of the desired positions (e.g., locked or unlocked positions) when the resiliently deformable tabs 23502 is at least partially received therein.

By way of a non-limiting example, the resiliently deformable tabs 23502 may be an integral part (e.g. unitary and/or one-piece) of the body 23506 of the slider switch 23504. For example, the resiliently deformable tabs 23502 may be formed from a plastic material configured to snap into and out of engagement with the one or more corresponding tab recesses 23602 formed in the slider channels, grooves and/or slots 23604. Alternatively (or in addition), one or more of the resiliently deformable tabs 23502 may be formed separately from the body 23506 of the slider switch 23504. For example, the resiliently deformable tabs 23502 may be formed from a spring such as, but not limited to, a spring tempered metal (e.g., stainless steel).

According to yet another embodiment, the slider switch catch may include a slider biasing device (e.g., a spring or the like) 23702, FIG. 237. The slider biasing device 23702 may be configured to urge the slider switch towards one of the two positions. For example, the slider biasing device 23702 may be configured to urge the slider switch in the unlocked position. In such an embodiment, the unlocked position may be considered to be the default position of the slider switch, and the user would have to apply a force to the slider switch to urge the slider switch to the locked position against the biasing force of the slider biasing device 23702. Of course, the slider biasing device 23702 may be configured to urge the slider switch to the locked position (e.g., default position). In either case, the slider switch catch would not need (though could optionally also include) a resiliently deformable tabs and/or a corresponding tab recess as described herein.

Turning now to FIGS. 238-242, another embodiment of a blade cartridge support member lockout is generally illustrated. The blade cartridge support member lockout 23802 may include a slider switch 23804 mounted on the handle 60 (e.g., the collar 7714/16999) configured to move (e.g., slide) into and out of engagement with a portion of the blade cartridge support member 24 (e.g., the yoke 47 and/or the yoke insert 18706) between a locked position in which the position of the blade cartridge support member 24 (e.g., the yoke 47) is fixed relative to the handle 60, and an unlocked position in which the blade cartridge support member 24 (e.g., the yoke 47) can rotate in the direction of arrow 9310.

With reference to FIG. 239, a cross-sectional view of the blade cartridge support member lockout 23802 is generally illustrated. The blade cartridge support member lockout 23802 may include the slider switch 23804 operable to move (e.g., slide) within one or more slider channels, grooves and/or slots 23906 formed at least partially in the handle 60 (e.g., the collar 7714/16999) between the locked and unlocked positions. With reference to FIG. 240, a close-up of one embodiment of the slider switch 23804 is generally illustrated. As can be seen, the slider switch 23804 may include a slider body 24006 extending at least between the upper and lower activation surfaces 24002, 24004 and may define at least one lockout pawl/detent 24008 extending generally outward therefrom. The upper and lower activation surfaces 24002, 24004 are configured to allow a user to engage (e.g., grip and/or push) the slider switch 23804 to move the slider switch 23804 within the slider channels, grooves and/or slots 23906 to cause the lockout pawl/detent 24008 to come into and out of engagement with a corresponding blade cartridge support member notch 24102 (FIG. 241) formed in the blade cartridge support member 24 (e.g., but not limited to, the yoke 47 and/or yoke insert 18706).

For example, the upper surface 24002 may be configured to allow the user to move the slider switch 23804 in a first direction 23910 (e.g., generally downwardly as illustrated in FIG. 239) within the slider channels, grooves and/or slots 23906 while the lower surface 24004 may be configured to allow the user to move the slider switch 23804 in a second direction 23912 (e.g., generally upward as illustrated in FIG. 239). A close-up of one embodiment of the slider channels, grooves and/or slots 23906 is generally illustrated in FIG. 242.

With reference to FIGS. 239-242, at least a portion of the slider body 24006 may move generally back and forth along directions 23910, 23912 within the slider channels, grooves and/or slots 23906. The slider channels, grooves and/or slots 23906 may include a lockout pawl/detent passageway 24202 (best seen in FIG. 242) operably coupled to the slider channels, grooves and/or slots 23906 that allows the lockout pawl/detent 24008 to move generally in the direction of arrows 23910, 23912 as the user moves the slider switch 23804. When the blade cartridge support member 24 (e.g., but not limited to, the yoke 47) is aligned with the handle 60 (e.g., using indicia 19704, 19706) and the slider switch 23804 is moved in the direction of arrow 23912 (e.g., the locked position), the lockout pawl/detent 24008 is moved into engagement with the corresponding blade cartridge support member notch 24102. When the lockout pawl/detent 24008 engages the blade cartridge support member notch 24102, rotation of the blade cartridge support member 24 in the direction of arrow 9310 is generally prevented by virtue of a positive mechanical interference. It should be appreciated that the blade cartridge support member lockout 23802 does not rely upon longitudinal movement of the blade cartridge support member 24 relative to the handle 60 in order to lock the blade cartridge support member 24 relative to the handle 60. When the lockout pawl/detent 24008 is withdrawn from the blade cartridge support member notch 24102, the blade cartridge support member 24 is free to move in the direction of arrow 9310.

The blade cartridge support member lockout 23802 may optionally include a slider switch catch. One embodiment of the slider switch catch 23915 includes a slider switch magnet 23916 and an annular or ring handle magnet 23918. The annular or ring handle magnet 23918 is coupled to and stationary relative to the handle 60 (e.g., the collar 7714/16999) while the slider switch magnet 23916 is coupled to the slider switch 23804. As the slider switch 23804 is moved from one position to the other (e.g., generally back and forth along directions 23910, 23912 within the slider channels, grooves and/or slots 23906), the slider switch magnet 23916 moves within the central region 23920 of the annular or ring handle magnet 23918. The poles of the slider switch magnet 23916 and the annular or ring handle magnet 23918 may be configured to generate either an attractive and/or repulsive magnetic force which may urge the slider switch 23804 towards one or both of the positions (e.g., locked and/or unlocked positions) depending on the position of the slider switch magnet 23916 relative to the annular or ring handle magnet 23918.

Turning now to FIG. 243, another embodiment of a blade cartridge support member lockout 24302 is generally illustrated. The blade cartridge support member lockout 24302 may include a resiliently deformable detent 24304 (such as, but not limited to, a rubber O-ring or the like) configured to be at least partially received in one or more corresponding recesses 24306. In one embodiment, the resiliently deformable detent 24304 is coupled to and moves with the slider body 24006, while the recesses 24306 are formed in the slider channels, grooves and/or slots 23906, though it should be appreciated that this arrangement may be reversed. In at least one embodiment, the blade cartridge support member lockout 24302 may include two recesses 24306 corresponding to the locked and unlocked positions of the slider switch 23804, respectively. Alternatively, the blade cartridge support member lockout 24302 may include only one recess 24306 corresponding to either the locked or unlocked positions of the slider switch 23804.

It should be appreciated that the blade cartridge support member lockouts described herein may be used with any shaving device 10 wherein at least a portion of the blade cartridge support member 24 rotates (e.g., generally along the direction of arrow 9310) relative to the handle 60.

Turning now to FIGS. 244-256, another embodiment of a shaving device 10 is generally illustrated. The shaving device 10 includes a handle 60 and a blade cartridge 22 pivotally coupled to one or more arms 30 of a blade cartridge support member 24. As discussed herein, the blade cartridge support member 24 is coupled to and can move in at least one direction relative to the handle 60 (e.g., the collar 7714/16999). The blade cartridge support member 24 may move within one or more predetermined ranges relative to the handle 60. The predetermined ranges of movement may be different based on the directions of the movement of the blade cartridge support member 24. For example, the predetermined range of movement that the blade cartridge support member 24 moves in a twisting direction along the longitudinal axis L (e.g., as generally illustrated by arrow 9310) may be different than the predetermined range of movement that the blade cartridge support member 24 moves in a left/right direction (e.g., rotating about an axis 24403 that is generally perpendicular to the longitudinal axis L of the shaving device 10 and/or handle 60/handle post 9302.) Of course, other directions are also possible.

FIGS. 245-246 generally illustrate exploded, unassembled views of one embodiment the shaving device 10 of FIG. 244. In particular, FIG. 245 shows the shaving device 10 of FIG. 244 exploded along longitudinal axis L of the shaving device 10 and/or handle 60 and FIG. 245 is an exploded view of FIG. 245 showing the back or rear of the blade cartridge support member 24 (e.g., yoke 47). As can be seen in FIG. 246, the handle 60 (e.g., the collar 7714/16999) includes a handle post 9302 configured to be at least partially received in a support member cavity 9304 of the blade cartridge support member 24 (e.g., but not limited to, the yoke 47 and/or yoke insert 18706). The handle post 9302 includes an enlarged ball/head 24602 configured to be received in a corresponding ball or head socket/cavity 24604 of the support member cavity 9304 to form a ball joint (e.g., a ball and socket joint) 24701, best illustrated in FIG. 247. With reference to FIG. 248, the enlarged ball/head 24602 may be disposed at a distal tip of the handle post 9302. The enlarged ball/head 24602 may include at least one head dimension 24802 that is larger than a post dimension 24804 of the handle post 9302 in the region 24806 proximate to the enlarged ball/head 24602. The head dimension 24802 and the post dimension 24804 both include dimensions (e.g., lengths, widths, and/or diameters) that extend in a plane which is generally transverse to the longitudinal axis L of the handle post 9302. According to one embodiment, at least a distal portion of the handle post 9302 (e.g., region 24806) proximate to (e.g., immediately adjacent to) the enlarged ball/head 24602 has an outer configuration which tapers down (e.g., becomes smaller) as one approaches the enlarged ball/head 24602.

For example, the post dimension 24804 may be the smallest transverse dimension of the handle post 9302. Alternatively (or in addition), the post dimension 24804 may be the region 24806 proximate to the enlarged portion 24602. In the illustrated embodiment, the enlarged ball/head 24602 has a generally partially spherical outer surface, though it should be appreciated that the present disclosure is not limited to this embodiment unless specifically claimed as such. For example, the enlarged ball/head 24602 may have a generally oval outer surface and/or a multi-faceted outer surface, e.g., that may approximate a sphere.

Turning now to FIG. 249, a cross-sectional view of one embodiment of the ball or head socket/cavity 24604 of the support member cavity 9304 formed in the blade cartridge support member 24 (e.g., but not limited to, the yoke 47 and/or yoke insert 18706) is generally illustrated. The ball or head socket/cavity 24604 includes an opening 24902 extending between and/or separating the ball or head socket/cavity 24604 and the support member cavity 9304. The opening 24902 is configured to retain the enlarged ball/head 24602 of the handle post 9302 when received therein as generally illustrated FIG. 247, e.g., by virtue of a positive mechanical connection/interference. According to on embodiment, the opening 24902, FIG. 249, may include at least one transverse opening dimension 24904 (e.g., but not limited to, a diameter) that is smaller than a distal region 24906 of the support member cavity 9304 and smaller than a maximum ball cavity cross-sectional dimension 24908 of the ball socket/cavity 24604. In the illustrated embodiment, the ball or head socket/cavity 24604 has a generally partially spherical inner surface, though it should be appreciated that the present disclosure is not limited to this embodiment unless specifically claimed as such. For example, the ball socket/cavity 24604 may have a generally oval inner surface and/or a multi-faceted inner surface, e.g., that may approximate a sphere.

In at least one embodiment, the ball and socket connection formed by the enlarged ball/head 24602 and the ball or head socket/cavity 24604 allows the blade cartridge support member 24 to move in multiple directions relative to the handle 60. For example, the ball and socket connection formed by the enlarged ball/head 24602 and the ball or head socket/cavity 24604 may allow the blade cartridge support member 24 to twist relative to the longitudinal axis L of the handle 60 and/or handle post 9302, move left/right (e.g., generally in the direction of arrow 24402) relative to the longitudinal axis L of the handle 60 and/or handle post 9302, and/or any other direction relative to the longitudinal axis L of the handle 60 and/or handle post 9302.

The handle 60 (e.g., the collar 7714/16999 and/or the handle post 9302) and the blade cartridge support member 24 (e.g., the support member cavity 9304, yoke 47, and/or, yoke insert 18706) may optionally include a movement interface surface configured to limit movement of the blade cartridge support member 24 relative to the handle 60 in one or more directions. For example, the handle 60 (e.g., the collar 7714/16999 and/or the handle post 9302) may include a handle interface surface 24502, FIG. 245, configured to engage against a support member interface surface 24504 of the blade cartridge support member 24. The surfaces 24502, 24504 may have an arcuate shape configured to generally limit movement of the blade cartridge support member 24 in the direction of arrow 24402 by virtue of their corresponding shapes. For example, the surfaces 24502, 24504 may each have a shape that interacts with each other (along with the ball and socket connection formed by the enlarged ball/head 24602 and the ball socket/cavity 24604) to generally restrict movement of the blade cartridge support member 24 in the direction of arrow 24402.

The enlarged ball/head 24602 and/or the ball or head socket/cavity 24604 may be formed from a resiliently deformable material. For example, the enlarged ball/head 24602 may deform to allow the enlarged ball/head 24602 to be advanced into the ball socket/cavity 24604, and once inside the ball socket/cavity 24604, the enlarged ball/head 24602 may return to within 10% of its original shape. The resiliently deformable material may be selected such that the enlarged ball/head 24602 cannot be removed from the ball or head socket/cavity 24604 during normal use while shaving.

Alternatively (or in addition), the enlarged ball/head 24602 may be secured within the ball or head socket/cavity 24604 by way of one or more pins 25002 or the like, e.g., as generally illustrated in FIGS. 250-251. According to one embodiment, the pin 25002 may extend through a portion of the handle post 9302 and may be coupled to a portion of the blade cartridge support member 24 (e.g., but not limited to, the yoke 47 and/or yoke insert 18706). For example, the pin 25002 may extend through a ball pin passageway 25004 and a pin support member passageway 25005 extending through the handle post 9302 (e.g., the enlarged ball/head 24602) and the blade cartridge support member 24 (e.g., but not limited to, the yoke 47 and/or yoke insert 18706), respectively. The pin 25002 may be stationary with respect to the blade cartridge support member 24 and the enlarged ball/head 24602 may rotate/pivot on the pin 25002. Alternatively (or in addition), the pin 25002 may be stationary with respect to the handle post 9302 (e.g., the enlarged ball/head 24602) and the blade cartridge support member 24 may rotate/pivot on the pin 25002.

The pin 25002 and pin passageways 25004 and/or 25005 may be configured to limit movement of the blade cartridge support member 24 in one direction. For example, the pin 25002 may be secured to the blade cartridge support member 24 such the pin 25002 is either stationary with respect to the blade cartridge support member 24 and/or the pin 25002 can only rotate about its longitudinal axis 25006 (e.g., but not limited to, axis 24403). The ball pin passageway 25004 within the handle post 9302 (e.g., the enlarged ball/head 24602) may also be configured to allow the pin 25002 to be either stationary with respect to the handle post 9302 (e.g., the enlarged ball/head 24602) and/or allow the pin 25002 to only rotate about its longitudinal axis 25006. As a result, movement of the blade cartridge support member 24 may be restricted to a direction along the longitudinal axis 25006 of the pin 25002 (e.g., but not limited to, a generally in the direction of arrow 24402 in FIG. 244). Accordingly, the movement of the blade cartridge support member 24 may have one degree of freedom. Of course, the direction that the blade cartridge support member 24 can move relative to the handle 60 may be based on the orientation of the longitudinal axis 25006 of the pin 25002 relative to the handle 60.

The pin 25002 may be advanced into the pin passageway 25004/25005 through an opening formed in an exterior surface of the blade cartridge support member 24 (e.g., but not limited to, the yoke 47 and/or yoke insert 18706) after the enlarged ball/head 24602 is disposed within the ball socket/cavity 24604. For example, the pin support member passageway 25005 may form a blind hole in the blade cartridge support member 24 such the combination of the pin passageways 25004/25005 extend from an exterior surface of the blade cartridge support member 24, partially through the blade cartridge support member 24 (e.g., ball pin passageway 25004), and through a portion of the handle post 9302 (e.g., the enlarged ball/head 24602) and the ball socket/cavity 24604. Alternatively (or in addition), the blade cartridge support member 24 (e.g., but not limited to, the yoke 47 and/or yoke insert 18706) and/or the handle 60 (e.g., the handle post 9302 and/or enlarged ball/head 24602) may be over-molded around at least a portion of the pin 52002 to form the pin passageway 25004/25005.

In addition, the ball or head socket/cavity 24604 does not need to be configured to retain the enlarged ball/head 24602 when used in combination with the pin 25002. To this end, the ball or head socket/cavity 24604 may not include the opening 24902 between and/or separating the ball or head socket/cavity 24604 and the support member cavity 9304. Instead, the ball or head socket/cavity 24604 may form part of the support member cavity 9304, e.g., a distal end of the support member cavity 9304.

A shaving device 10 consistent with the present disclosure may include an enlarged ball/head 24602 secured within a ball or head socket/cavity 24604 by way of one or more pins 25002 that allows two degrees of movement of the blade cartridge support member 24 (e.g., but not limited to, the yoke 47 and/or yoke insert 18706) relative to the handle 60. The two degrees of freedom may be aligned in any two directions. For example, with reference to FIG. 244, two degrees of freedom may include (but are not limited to) a twisting direction (e.g., as generally illustrated by arrow 9310 in which the blade cartridge support member 24 pivots about the longitudinal axis L of the handle 60/handle post 9302) and a left/right direction (e.g., as generally illustrated by arrow 24402 which rotates about an axis 24403 that is generally perpendicular to the longitudinal axis L of the shaving device 10 and/or handle 60). Of course, the directions of these two degrees of freedom are for exemplary purposes only unless specifically claimed as such.

Turning now to FIGS. 252-256, one embodiment of a shaving device 10 including the enlarged ball/head 24602 secured within the ball or head socket/cavity 24604 by way of one or more pins 25002 having two degrees of movement is generally illustrated. In particular, FIG. 252 generally illustrates a plan view of a portion of the handle 60 and the pin 25002, FIG. 253 generally illustrates a cross-sectional view of the handle 60 and the pin 25002 of FIG. 252 taken along lines C253-C253, FIG. 254 generally illustrates a cross-sectional view of just the handle of FIG. 253, and FIG. 255 generally illustrates another cross-sectional view of just the handle of FIG. 252 taken along lines C255-C255.

The ball pin passageway 25004 may include a non-cylindrical shape configured to allow the pin 25002 to move within a predefined range with respect to the handle 60 (e.g., the handle post 9302 and/or enlarged ball/head 24602). According to one embodiment, in the illustrated embodiment, the shape of the ball pin passageway 25004 is configured to allow the pin 25002 to move in a plane 25502 (FIG. 255) that is perpendicular to the longitudinal axis L of the handle 60 (e.g., the handle post 9302). For example, the ball pin passageway 25004 includes a "bow-tie" shaped cross-section. In particular, the ball pin passageway 25004 includes a first and a second opening 25504, 25506 (best seen in FIG. 255) that are disposed on generally opposite ends of the ball pin passageway 25004. Each of the openings 25504, 25506 may have at least one sidewall 25508 that tapers towards a central or middle region 25510 of the ball pin passageway 25004.

Alternatively, the ball pin passageway 25004 may be configured to allow more than two degrees of movement of the blade cartridge support member 24 (e.g., but not limited to, the yoke 47 and/or yoke insert 18706) relative to the handle 60. For example, the ball pin passageway 25004, FIG. 256, may include first and second openings 25504, 25506 (only one opening is visible in FIG. 256) disposed on generally opposite ends of the ball pin passageway 25004. One or more of the openings 25504, 25506 may include one or more sidewalls 25508 extending therefrom having a generally conical shape that taper towards a central or middle region 25510 of the ball pin passageway 25004.

With reference now to FIGS. 244-256, the ball joint (e.g., a ball and socket joint) 24701 may optionally be positioned with the center of rotation located distally relative to the user such that the center of rotation of the ball joint 24701 is in close proximity to the ideal axis of rotation at the centroid of the blade cartridge 22. For example, the enlarged ball/head 24602 may be positioned distally on the handle 60 (e.g., the handle post 9302) and the ball or head socket/cavity 24604 may be located within the blade cartridge support member 24 (e.g., but not limited to, the yoke 47 and/or yoke insert 18706) such that the center of rotation of the blade cartridge 22 is located in close proximity to the ideal axis of rotation at the centroid of the blade cartridge support member 24 and/or the blade cartridge 22. As used herein, the phrase "close proximity to the ideal axis of rotation at the centroid" is intended to mean that the actual axis of rotation of the blade cartridge 22 is positioned a distance from the ideal axis of rotation that is less than or equal to 10% of the diameter of the actual rotation of the blade cartridge 22.

In addition (or alternatively), any of the embodiments of the ball joints (e.g., a ball and socket joint) 24701, FIGS. 244-256, may optionally include one or more magnets configured to urge the blade cartridge support member 24 (e.g., but not limited to, the yoke 47 and/or yoke insert 18706) towards an initial starting position relative to the handle 60 (e.g., but no limited to, an initial starting position in which the blade cartridge support member 24 is substantially perpendicular to the longitudinal axis L of the handle 60 and/or handle post 9302). According to one embodiment, the handle 60 (e.g., the collar 7714/16999 and/or handle post 9302) and the blade cartridge support member 24 (e.g., but not limited to, the yoke 47 and/or yoke insert 18706) include one or more handle centering magnets and corresponding support member centering magnets 24620, 24622, respectively. The magnets 24620, 24622 may be positioned in the handle 60 and blade cartridge support member 24 such that the poles of the corresponding magnets 24620, 24622 are substantially aligned (e.g. coaxial) when the blade cartridge support member 24 is in the initial starting position with respect to the handle 60.

In one embodiment, the poles of at least some of the corresponding magnets 24620, 24622 are aligned to create an attractive magnetic force therebetween (e.g., opposite poles facing each other). As may be appreciated, corresponding magnets 24620, 24622 with their opposite poles facing each other will exert an attractive magnetic force that urges the corresponding magnets 24620, 24622 towards a position at which the magnets 24620, 24622 are closest to each other and closest to being coaxial. This centering magnetic force created by the magnets 24620, 24622 will urge the blade cartridge support member 24 to the desired resting/home position (e.g., the initial starting position).

Optionally (or in addition), at least one of the corresponding pairs of magnets 24620, 24622 may have their poles aligned to create a repulsive magnetic force therebetween (e.g., same poles facing each other). These repulsive pairs or magnets may be disposed, for example, proximate the outer limits of the predetermined range which the blade cartridge support member 24 moves relative to the handle 60. In particular, the repulsive pairs of magnets may urge the blade cartridge support member 24 away from each other and towards the initial starting position. As may be appreciated, the attractive magnetic force between two magnets decreases as the separation distance increases. The repulsive pairs of magnets may be used in applications where the predetermined range of motion of the blade cartridge support member 24 may result in an insufficient attractive magnetic force at the extremes of the predetermined range. It should also be appreciated that the repulsive pairs of magnets may be used without the attractive magnetic pairs of magnets. For example, two or more sets of repulsive pairs of magnets may be disposed at opposite ends of a predetermined range of motion (e.g., at opposite ends of the range of motion in the directions of arrows 9310 and/or 24402) which may be configured to urge the blade cartridge support member 24 towards the initial starting position. The sets of repulsive pairs of magnets may be configured such that an equilibrium is generally established that corresponds to the initial starting position (e.g., where the repulsive forces from each set of repulsive pairs of magnets is substantially equal to each other).

While the present disclosure has been illustrated having at least one pair of corresponding magnets 24620, 24622, it should be appreciated that one of the magnets 24620, 24622 may be replaced with a ferrous material. In such an embodiment, the remaining magnet 24620, 24622 may create an attractive force with the ferrous material disposed on the other component. For example, the blade cartridge support member 24 (e.g., but not limited to, the yoke 47 and/or yoke insert 18706) may include one or more ferrous components that are attracted towards a handle centering magnet 24620 disposed in the handle 60 (e.g., the collar 7714/16999 and/or handle post 9302). Of course, this arrangement may also be switched. Any one of the magnets 24620, 24622 may include a flat and/or disc magnet, an annular magnet, and/or a programmable magnet.

It should be appreciated that any of the shaving devices 10 described herein may include a handle post 9302 that is either rigid or flexible. A flexible handle post 9302 may allow for movement of the blade cartridge support member 24 in one or more directions. For example, a flexible handle post 9302 may be made from a resiliently deformable material that flexes and/or bends under normal forces urged against the shaving device 10 while shaving. As one of ordinary skill in the art would appreciate, a resilient deformable material is a material which, at room temperature, can be stretched under normal forces experienced by a shaving device while shaving, and when released, returns to 90% of its original dimensions and shape. The handle post 9302 may be configured to be more flexible in one direction compared to another direction. The flexible handle post 9302 may be used with any shaving device 10 described herein including, but not limited to, any of the ball joints (e.g., a ball and socket joints) 24701 described herein.

It should be appreciated that in any of the embodiments described with respect to FIGS. 244-256, the blade cartridge support member 24 (e.g., but not limited to, the yoke 47 and/or yoke insert 18706) may be permanently coupled to the handle 60 (e.g., the collar 7714/16999 and/or handle post 9302). In such an embodiment, the blade cartridge 22 may be removably coupled to the blade cartridge support member 24 according to any embodiment described herein. Alternatively, the blade cartridge support member 24 (e.g., but not limited to, the yoke 47 and/or yoke insert 18706) may be removably coupled to the handle 60 (e.g., the collar 7714/16999 and/or handle post 9302) in any of the embodiments described with respect to FIGS. 244-256. In one embodiment, the ball joint (e.g., a ball and socket joint) 24701 may be configured to be removably assembled. For example, the enlarged ball/head 24602 may be configured to be removably secured within the corresponding ball or head socket/cavity 24604 of the support member cavity 9304. In particular, the enlarged ball/head 24602 may be formed from a resiliently deformable material. The resiliently deformable material may be selected to allow the enlarged ball/head 24602 to be inserted into and removed from the ball socket/cavity 24604, while also resisting inadvertent and/or unintentional removal of the enlarged ball/head 24602 from the ball or head socket/cavity 24604 while shaving. Alternatively (or in addition), the yoke insert 18706 may be removably coupled to the yoke 47, the collar 7714/16999 may be removably coupled to the handle, and/or the handle post 9302 may be removably coupled to the handle 60 (e.g., the collar 7714/16999).

It should be appreciated that while the handle post 9302 is illustrated extending from the handle 60 and the support member cavity 9304 is illustrated being formed in the blade cartridge support member 24, the arrangement of the post 9302 and the cavity 9304 in any of the embodiments described herein may be reversed. Similarly, the arrangement of the enlarged ball/head 24602 and the corresponding ball or head socket/cavity 24604 in any of the embodiments described herein may be reversed with respect to the handle 60 and the support member cavity 9304.

Turning now to FIGS. 257-263, another embodiment of a shaving device 10 having a blade cartridge support member 24 configured to move (e.g., pivot and/or rotate) relative to the handle 60 is generally illustrated. In particular, FIG. 257 generally illustrates one embodiment of an assembled shaving device 10, FIG. 258 generally illustrates a cross-sectional view of FIG. 257 taken along lines C258-C258, FIG. 259 generally illustrates one embodiment of an unassembled shaving device of FIG. 257, FIG. 260 generally illustrates a side view of one embodiment of a handle and pendulum pin of the shaving device of FIG. 257, FIG. 261 generally illustrates a perspective view of one embodiment of a blade cartridge assembly of the shaving device of FIG. 257, FIG. 262 generally illustrates a cross-sectional view of the blade cartridge of FIG. 261 taken along lines C262-C262, and FIG. 263 generally illustrates a cross-sectional view of the blade cartridge of FIG. 262 taken along lines C263-C263.

In the illustrated embodiment, the blade cartridge support member 24 may be configured to pivot and/or rotate in a left/right direction relative to the handle 60 (e.g., as generally illustrated by arrow 24402 which rotates about an axis 24403 that is generally perpendicular to the longitudinal axis L of the shaving device 10 and/or handle 60). For example, the blade cartridge support member 24 (e.g., the yoke 47) may pivot about a pivot pin 25802 (e.g., best seen in FIG. 258) that couples the blade cartridge support member 24 to the handle 60.

The handle 60 (e.g., the collar 7714/16999) may include one or more handle posts 9302. The handle post 9302 may define a pendulum swing channel 25804 (best seen in FIGS. 258-260). For example, the pendulum swing channel 25804 may include a region disposed between a first and second portion 25806, 25808 of the handle post 9302. The first and second portions 25806, 25808 of the handle post 9302 may extend generally outward from the handle 60 (e.g., the collar 7714/16999), for example, along the longitudinal axis L of the handle 60 (e.g., but not limited to, the longitudinal axis L of the collar 7714/16999). One or more of the first and second portions 25806, 25808 of the handle post 9302 may also include a post opening 25902 (best seen in FIG. 259) configured to receive the pivot pin 25802.

The handle 60 (e.g., the collar 7714/16999 and/or handle post 9302) may also include one or more handle pendulum magnets 25810 (best seen in FIG. 258). As described herein, the handle pendulum magnet 25810 is configured to create a magnetic force with a corresponding yoke pendulum magnet 25812 of the blade cartridge support member 24 (e.g., the yoke 47) which urges blade cartridge support member 24 towards an initial starting position (as generally illustrated in FIG. 257) in response to the blade cartridge support member 24 being pivoted about the pivot pin 25802 relative to the handle 60.

The blade cartridge support member 24 may include a support member cavity 9304 configured to receive at least a portion of the handle post 9302, for example, as generally illustrated in FIGS. 257-258. With reference to FIGS. 261-263, the support member cavity 9304 may include one or more yoke pendulums 25814. The yoke pendulum 25814 may be disposed within the support member cavity 9304 and may extend generally towards the opening 26102 of the support member cavity 9304. The yoke pendulum 25814 may include one or more yoke pendulum magnets 25812. According to one embodiment, the yoke pendulum magnet 25812 may be located proximate to a distal end of the yoke pendulum 25814 (e.g. closest to the opening 26102 of the support member cavity 9304).

The blade cartridge support member 24 (e.g., the yoke 47 and/or yoke insert 18706) may include one or more pivot apertures 26102 (best seen in FIG. 261). The pivot apertures 26102, along with the post opening 25902, are configured to receive the pivot pin 25802 such that the blade cartridge support member 24 can pivot about the pivot pin 25802 relative to the handle 60 (e.g., the handle post 9302). The yoke pendulum 25814 is sized and shaped to be at least partially received within the pendulum swing channel 25804 as generally illustrated in FIGS. 257-258 such that the yoke pendulum 25814 also pivots about the pivot pin 25802 as the blade cartridge support member 24 pivots relative to the handle 60 (e.g., the handle post 9302).

As the blade cartridge support member 24 pivots, the yoke pendulum 25814 swings within and/or through the pendulum swing channel 25804. The yoke pendulum magnets 25812 therefore move along an arcuate pathway relative to the handle pendulum magnets 25810. The yoke pendulum magnets 25812 and the handle pendulum magnets 25810 may generate an attractive magnetic force that urges the blade cartridge support member 24 towards an initial starting position relative to the handle 60 in response to an external force being applied to the blade cartridge support member 24 that causes the blade cartridge support member 24 to pivot away from the initial starting position. In particular, the yoke pendulum magnets 25812 and the handle pendulum magnets 25810 may be located substantially coaxially (e.g., coaxially with the longitudinal axis L of the handle 60 and/or post 9302) when the blade cartridge support member 24 is disposed at the initial starting position. The attractive magnetic force between the yoke pendulum magnets 25812 and the handle pendulum magnets 25810 will cause the yoke pendulum magnets 25812 and the handle pendulum magnets 25810 to want to naturally align their poles (e.g., a position in which the yoke pendulum magnets 25812 and the handle pendulum magnets 25810 are closest to each other and closest to being coaxial).

It should be appreciated that either the yoke pendulum magnet 25812 or the handle pendulum magnet 25810 may be replaced with a ferrous material configured to generate an attractive magnetic force with the other remaining magnet. In addition, the blade cartridge support member 24 (e.g., but not limited to, the yoke 47) and/or the handle 60 may include a lock (e.g., but not limited to, any locking mechanism described herein) to fix/lock the position of the blade cartridge support member 24 relative to the handle 60. It should also be appreciated the blade cartridge support member 24 (e.g., but not limited to, the yoke 47) may be either permanently attached or removably coupled to the handle 60.

Optionally (or in addition), additional magnets may be provided to aid in urging the blade cartridge support member 24 towards the initial starting position relative to the handle 60. In at least one embodiment, the handle 60 (e.g., the support member cavity 9304, yoke 47, and/or, yoke insert 18706) may include one or more additional magnets configured to generate a repulsive magnetic force with the yoke pendulum magnet 25812. These additional magnets may be disposed, for example, proximate to the outer limits of the predetermined range which the blade cartridge support member 24 moves relative to the handle 60. As may be appreciated, the attractive magnetic force between yoke pendulum magnet 25812 and the handle pendulum magnet 25810 decreases as the separation distance increases. The additional magnets may be used in applications where the predetermined range of motion of the blade cartridge support member 24 may result in insufficient attractive magnetic forces at the extremes of the predetermined range.

It should also be appreciated that the repulsive magnets may be used without the attractive handle pendulum magnets 25810. For example, two or more additional magnets may be disposed at opposite ends of a predetermined range of motion (e.g., at opposite ends of the range of motion in the directions of arrows 9310 and/or 24402) of the handle 60 which may be configured to generate a repulsive magnetic force with the yoke pendulum magnet 25812 to urge the blade cartridge support member 24 towards the initial starting position. The additional magnets on the handle 60 may be configured such that an equilibrium is generally established with the yoke pendulum magnet 25812 that corresponds to the initial starting position (e.g., where the repulsive forces from each additional magnet with the yoke pendulum magnet 25812 are substantially equal to each other).

It should be appreciated that movement of the blade cartridge support member 24 is not limited to movement in the left/right direction relative to the handle 60 (e.g., as generally illustrated by arrow 24402) unless specifically claimed as such, and that the blade cartridge support member 24 may move in any direction relative to the handle 60. In addition, while the illustrated embodiment allows movement of the blade cartridge support member 24 with only one degree of freedom relative to the handle 60, the blade cartridge support member 24 may be coupled to the handle 60 in a manner that allows movement with two or more degrees of freedom. For example, the pivot pin 25802 could be replaced with a universal joint and the pendulum swing channel 25804 may be configured to allow movement of the blade cartridge support member 24 with two or more degrees of freedom relative to the handle 60. Additional magnets may be disposed, for example, on the handle 60 (e.g., the collar 7714/16999 and/or handle post 9302) in areas generally corresponding to the additional directions or movement of the blade cartridge support member 24. These additional magnets may generate a repulsive magnetic force with the yoke pendulum magnet 25812 to urge the blade cartridge support member 24 towards the initial starting position.

Turning now to FIGS. 264-267, another embodiment of a shaving device 10 having a blade cartridge support member 24 configured to move (e.g., pivot and/or rotate) relative to the handle 60 is generally illustrated. In the illustrated embodiment, the blade cartridge support member 24 is configured to move in the left/right direction relative to the handle 60 (e.g., as generally illustrated by arrow 24402); however, the present disclosure is not limited to movement in this direction unless specifically claimed as such.

The blade cartridge support member 24 is moveably coupled to the handle 60 by way of one or more links 26502. In particular, the handle 60 (e.g., the collar 7714/16999) may include one or more handle link cavities 26504, FIGS. 265-266. A first end region 26602 of the links 26502 may be pivotally coupled to the handle link cavities 26504 about a first pivot axis 26604. The handle link cavities 26504 may have a shape configured to limit the range of movement of the links 26502 about the first pivot axis 26604. For example, the handle link cavities 26504 may have a profile (e.g., cross-section) that tapers down from the opening 26606 to a base 26608 of the handle link cavity 26504.

The handle 60 (e.g., the collar 7714/16999) may include one or more handle magnets 26506. As described herein, the handle magnet 26506 may be configured to generate a magnetic biasing force that urges the blade cartridge support member 24 towards an initial starting position (e.g., as generally illustrated in FIG. 264).

The blade cartridge support member 24 (e.g., the yoke 47 and/or yoke insert 18706) may include one or more support member cavities 26702, FIG. 267. A second end region 26610 of the links 26502 may be pivotally coupled to the support member cavities 26702 about a second pivot axis 26612. The support member cavities 26702 may have a shape configured to limit the range of movement of the links 26502 about the second pivot axis 26612. For example, the support member cavities 26702 may have a profile (e.g., cross-section) that tapers down from the opening 26704 to a base 26706 of the support member cavity 26702.

The blade cartridge support member 24 (e.g., the yoke 47 and/or yoke insert 18706) may include one or more support member magnets 26708. As described herein, the handle magnet 26506 and the support member magnets 26708 may be configured to generate a magnetic biasing force that urges the blade cartridge support member 24 towards an initial starting position (e.g., as generally illustrated in FIG. 264) in response to an external force being applied to the blade cartridge support member 24 that causes the blade cartridge support member 24 to pivot away from the initial starting position. In at least one embodiment, the handle magnets 26506 and the support member magnets 26708 may generate an attractive magnetic force. In particular, the handle magnets 26506 and the support member magnets 26708 may be located substantially coaxially (e.g., coaxially with the longitudinal axis L of the handle 60) when the blade cartridge support member 24 is disposed at the initial starting position. The attractive magnetic force between the handle magnets 26506 and the support member magnets 26708 will cause the handle magnets 26506 and the support member magnets 26708 to want to naturally align their poles (e.g., a position in which the handle magnets 26506 and the support member magnets 26708 are closest to each other and closest to being coaxial). As the blade cartridge support member 24 moves relative to the handle 60, the handle 60 will pivot about the first pivot axis 26604 of the links 26502 and the blade cartridge support member 24 will pivot about the second pivot axis 26612 of the links 26502. The movement of the blade cartridge support member 24 may be limited, in some embodiments, by the profile of the handle link cavities 26504 and/or the support member cavities 26702.

The links 26502 may be configured to be positioned generally symmetrically about the center plane of the shaving device 10. As a force is applied to the blade cartridge support member 24 causing it to move in one direction, the links 26502 will cause the blade cartridge support member 24 to rotate (e.g., in a left and right direction) relative to the handle 60. The effective pivot point of the blade cartridge support member 24 may be closer to the ideal position at the centroid of the blade cartridge support member 24.

One or more of the links 26502 may be rigid. According to another embodiment, one or more of the links 26502 may be flexible. For example, the links 26502 may be resiliently deformable. The flexibility may increase the range of movement of the blade cartridge support member 24 and/or may allow the blade cartridge support member 24 to move in two or more degrees of freedom relative to the handle 60.

It should be appreciated that either the handle magnet 26506 or the support member magnet 26708 may be replaced with a ferrous material configured to generate an attractive magnetic force with the other remaining magnet.

Optionally (or in addition), additional magnets may be provided to aid in urging the blade cartridge support member 24 towards the initial starting position relative to the handle 60. In at least one embodiment, the handle 60 (e.g., the collar 7714/16999) may include one or more additional magnets configured to generate a repulsive magnetic force with the support member magnets 26708. Alternatively (or in addition), the blade cartridge support member 24 (e.g., the support member cavity 9304, yoke 47, and/or, yoke insert 18706) may include one or more additional magnets configured to generate a repulsive magnetic force with the handle magnets 26506. In either case, these additional magnets may be disposed, for example, proximate the outer limits of the predetermined range which the blade cartridge support member 24 moves relative to the handle 60. As may be appreciated, the attractive magnetic force between handle magnets 26506 and the support member magnets 26708 decreases as the separation distance increases. The additional magnets may be used in applications where the predetermined range of motion of the blade cartridge support member 24 may result in insufficient attractive magnetic forces at the extremes of the predetermined range.

It should also be appreciated that the repulsive magnets may be used without the attractive handle magnets 26506 and the support member magnets 26708. For example, two or more additional magnets may be disposed at opposite ends of a predetermined range of motion (e.g., at opposite ends of the range of motion in the directions of arrows 9310 and/or 24402) of the handle 60 which may be configure to generate a repulsive magnetic force to urge the blade cartridge support member 24 towards the initial starting position. The additional magnets on the handle 60 may be configured such that an equilibrium is generally established that corresponds to the initial starting position (e.g., where the repulsive forces from each additional magnet are substantially equal to each other).

It should be appreciated that movement of the blade cartridge support member 24 is not limited to movement in the left/right direction relative to the handle 60 (e.g., as generally illustrated by arrow 24402) unless specifically claimed as such, and that the blade cartridge support member 24 may move in any direction relative to the handle 60. In addition, the blade cartridge support member 24 (e.g., but not limited to, the yoke 47) and/or the handle 60 may include a lock (e.g., but not limited to, any locking mechanism described herein) to fix/lock the position of the blade cartridge support member 24 relative to the handle 60. It should also be appreciated the blade cartridge support member 24 (e.g., but not limited to, the yoke 47) may be either permanently attached or removably coupled to the handle 60.

Turning now to FIGS. 268-271, another embodiment of the shaving device 10 (e.g., razor) having a hinge 74 which functions similarly to the hinges of FIGS. 25-27 and FIGS. 46, 51-53 is generally illustrated. While the shaving device 10 may be used with any blade cartridge known to those skilled in the art, the razor 10 of FIGS. 268-271 may be particularly useful with a blade cartridge 22 (e.g., but not limited to, the blade cartridge 22 as generally illustrated in FIG. 37) having at least one face 140 with at least one razor 142 aligned to cut in a first shaving direction D1 and at least one razor 142 aligned to cut in a second shaving direction D2.

The shaving device 10, FIGS. 268-271, includes a handle 60 and a blade cartridge support member 24. In at least one embodiment, the blade cartridge support member 24 and the handle 60 may be disposed in first position (e.g., a Face Mode as generally illustrated in FIGS. 25 and 46) and a second position (e.g., a Body Mode as generally illustrated in FIGS. 27 and 51-53). The handle 60 (e.g., but not limited to, the collar 7714/16999) and/or the blade cartridge support member 24 (e.g., the support member cavity 9304, yoke 47, and/or, yoke insert 18706) may include at least a portion of the hinge 74. For exemplary purposes, the collar 7714/16999 and yoke 47 may be a single piece (e.g. a monolithic component 26802), and a hinge component 26804 may hingedly couple the combined collar/yoke 26802 to the rest of the handle 60 (e.g., shaft portion 77) as described herein.

An axle post 26806 may be fixed to and extend generally outward from the combined collar/yoke 26802 (e.g., generally along a longitudinal axis L of the handle 60 when the shaving device 10 is in the first position as generally illustrated in FIGS. 25 and 46). At least a portion of the axel post 26806 may be configured to be received and rotate within an axle cavity 26808 of the hinge component 26804. The axel post 26806 may include one or more rotation limiter pins 26810, which may extend substantially transverse (e.g. perpendicular) to the axel post 26806. The axle cavity 26808 of the hinge component 26804 may be formed in a first end region 26807 of the hinge component 26804.

To rotate/twist the blade cartridge support member 24 with respect to the handle 60 clockwise and counter-clockwise from an initial or central starting position in the direction of arrow 9310, the axel post 26806 may rotate within the axle cavity 26808 of the hinge component 26804. One or more detent mechanisms 26812 may be configured to retain the blade cartridge support member 24 at one or more predetermined positions relative to the hinge component 26804. For example, the detent mechanisms 26812 may be configured to allow the blade cartridge support member 24 to rotate/twist in the direction of arrow 9310 and retain the rotational position of the blade cartridge support member 24 at a first position relative to the hinge component 26804 (e.g., as generally illustrated in FIGS. 25 and 46) and/or a second position (as generally illustrated in FIGS. 27 and 51-53). To this end, the detent mechanisms 26812 may include one or more biased plungers 26814 and detent cavities 26816. In the illustrated embodiment, the biased plungers 26814 are disposed within and move with the combined collar/yoke 26802 while the detent cavities 26816 are formed in one or more faces 26818 of a first end region 26807 of the hinge component 26804. The position of the detent cavities 26816 with respect to the hinge component 26804 may therefore correspond to the predetermined rotational positions of the blade cartridge support member 24 relative to the hinge component 26804 (e.g., the first and second positions). It should be appreciated, however, that this arrangement may be reversed.

Thus, to rotate/twist the blade cartridge support member 24 from the first position to the second position, the user may urge the blade cartridge support member 24 in the direction of arrow 9310. When sufficient force is applied to the blade cartridge support member 24, the biased plungers 26814 will move out of engagement with one or more first detent cavities 26816 corresponding to the first position and move along the face 26818 of the hinge component 26804. As the axel post 26806 rotates within the axle cavity 26808, the rotation limiter pins 26810 rotate within rotation slots, grooves, and/or channels 26822 formed in the hinge component 26804. The rotation channel 26822 may be sized and shaped to such that the rotation limiter pins 26810 engage the rotation channel 26822 to prevent the axel post 26806 from rotating beyond a predetermined point within the axle cavity 26808. A first and second end of the rotation channel 26822 may therefore correspond to the first and second positions of the blade cartridge support member 24 relative to the hinge component 26804. When the blade cartridge support member 24 is rotated to the second position, the biased plungers 26814 will move into engagement with one or more second detent cavities 26816 corresponding to the second position and the rotation limiter pins 26810 will engage the second end of the rotation channel 26822 to prevent the blade cartridge support member 24 from rotating any further relative to the hinge component 26804 and generally secure the blade cartridge support member 24 in the second rotational position.

While the illustrated embodiment shows the blade cartridge support member 24 rotating/twisting 90 degrees between the first and second positions, it should be appreciated that range of movement of the blade cartridge support member 24 relative to the hinge component 26804 may be increased or decreased. Additionally, while the blade cartridge support member 24 is shown in two positions, it should be appreciated that additional predetermined positions relative to the hinge component 26804 are also possible.

The hinge component 26804 may be pivotally coupled to the handle 60 such that the hinge component 26804 (and therefore the combined collar/yoke 26802 and blade cartridge support member 24) may pivot generally in the direction of arrow 26826 (e.g., a direction generally perpendicular to the longitudinal axis 9310 and generally perpendicular to the razors 142 of the blade cartridge 22 when in the first position as generally illustrated in FIGS. 25 and 46). For example, the hinge component 26804 may be coupled to the handle 60 by way of a pivot pin 26828. The pivot pin 26828 may extend in a direction perpendicular to the longitudinal axis L and the hinge component 26804 may pivot about the pivot pin 26828. By way of a non-limiting example, the pivot pin 26828 may be coupled to the handle 60 and extend through a passageway 26829 formed in a second end region 26809 of the hinge component 26804 (the second end region 26809 is disposed at an opposite end from the first end region 26807). The second end region 26809 of the hinge component 26804 may also include an arcuate pivot surface 26830 which is generally concentric with a pivot pin 26828. The arcuate pivot surface 26830 may be formed on an ear 26902 (best seen in FIG. 269) that extends from the second end region 26809 of the hinge component 26804.

One or more detent mechanisms 26832 may be configured to retain the hinge component 26804 at one or more predetermined positions relative to the handle 60. For example, the detent mechanisms 26832 may be configured to allow the hinge component 26804 to pivot in the direction of arrow 26826 and retain the position of the hinge component 26804 at a first position relative to the handle 60 (e.g., as generally illustrated in FIGS. 25 and 46) and/or a second position (as generally illustrated in FIGS. 27 and 51-53). To this end, the detent mechanisms 26832 may include one or more biased plungers 26834 and detent cavities 26836 (FIGS. 269-271). In the illustrated embodiment, the biased plungers 26834 are disposed within and move with the handle 60 while the detent cavities 26836 are formed on the arcuate pivot surface 26830 of the ear 26902 of the hinge component 26804. The position of the detent cavities 26836 with respect to the handle 60 may therefore correspond to the predetermined rotational positions of the hinge component 26804 relative to the handle 60 (e.g., the first and second positions). It should be appreciated, however, that this arrangement may be reversed.

Thus, to pivot the hinge component 26804 from the first position to the second position, the user may urge the hinge component 26804 in the direction of arrow 26826. When sufficient force is applied to the hinge component 26804, the biased plungers 26834 will move out of engagement with one or more first detent cavities 26836 corresponding to the first position and move along the arcuate pivot surface 26830 of the hinge component 26804. As the handle 60 pivots about the pivot pin 26828, the handle 60 will eventually contact a first hinge limiter surface 26904 formed on the second end region 26809 of the hinge component 26804. The hinge limiter surface 26904 prevents the handle 60 from pivoting about the pivot pin 26828 beyond a first predetermined position in the direction of arrow 26826 (e.g., a predetermined position corresponding to the second position). When the hinge component 26804 is pivoted to the second position, the biased plungers 26834 will move into engagement with one or more second detent cavities 26836 corresponding to the second position and the hinge limiter surface 26904 will engage the handle 60 to prevent the hinge component 26804 from rotating any further relative to the handle 60 in the direction of arrow 26826 and generally secure the hinge component 26804 in the second rotational position. The second end region 26809 of the hinge component 26804 may also include a second hinge limiter surface 26906. The second hinge limiter surface 26906 may prevent the hinge component 26804 from pivot beyond a second predetermined position in the direction of arrow 26826 (e.g., a predetermined position corresponding to the first position). Thus, the first and second hinge limiter surfaces 26904, 26906 may define the outer limits of the range of movement of the hinge component 26804 about the pivot pin 26828.

While the illustrated embodiment shows the hinge component 26804 pivoting 90 degrees between the first and second positions, it should be appreciated that range of movement of the hinge component 26804 relative to the handle 60 may be increased or decreased. Additionally, while the hinge component 26804 is shown in two positions, it should be appreciated that additional predetermined positions relative to the handle 60 are also possible.

Referring now to FIGS. 272-277, another embodiment of a shaving device 10 is generally illustrated which is similar to the shaving device of FIGS. 158-161. In particular, FIG. 272 generally illustrates one embodiment of the shaving device 10 in an exploded, unassembled state and FIG. 273 generally illustrates the shaving device 10 of FIG. 272 in an assembled state.

The shaving device 10 may include a head assembly 27220 and a handle 27260. The head assembly 27220 comprises a replaceable blade cartridge assembly insert 27222 and a blade cartridge support member 27224. As shown, blade cartridge support member 27224 comprises a generally U-shaped cartridge support frame 27226 including at least one arm 27230, though this is not a limitation of the present disclosure unless specifically claimed and the support frame 27226 may include any configuration. The support frame 27226 may be either permanently coupled and/or integral with the handle 27260 (e.g., a unitary piece with the handle 27260) or may be removably coupled to the handle 27260 in any manner known to those skilled in the art and/or described herein.

The replaceable blade cartridge assembly insert 27222 is configured to be pivotally coupled to the blade cartridge support member 27224 in any manner known to those skilled in the art and/or described herein. The replaceable blade cartridge assembly insert 27222 may be configured to be removably coupled to a blade cartridge retention frame 27202. The replaceable blade cartridge assembly insert 27222 may include a replaceable blade assembly body 27201 and one or more razor blades 142, shaving aid(s) 160, skin engaging strip(s) 170, skin lubricating strip(s) 172, 176, skin lubricating and/or moisturizing strip(s) 174 (not all shown for clarity) coupled thereto (not shown).

The blade cartridge retention frame 27202 may define one or more blade cartridge assembly insert cavities 27204 configured to receive at least a portion of one or more replaceable blade cartridges/blade assembly inserts 27222. While the blade cartridge retention frame 27202 is illustrated having a single blade cartridge assembly insert cavity 27204 configured to receive a single replaceable blade cartridge assembly insert 27222 on a single face of the blade cartridge retention frame 27202, it should be appreciated that the blade cartridge retention frame 27202 may include more than one blade cartridge assembly insert cavity 27204 on one or more faces thereof and/or that one or more of the blade cartridge assembly insert cavities 27204 may be configured to at least partially receive more than one replaceable blade cartridge assembly insert 27222.

The replaceable blade cartridge assembly inserts 27222 may be removably coupled to the blade cartridge retention frame 27202/replaceable blade cartridge assembly insert cavities 27204 using one or more magnets. For example, the replaceable blade cartridge assembly inserts 27222 may include a blade assembly post 27251 extending outward from the replaceable blade assembly body 27201, for example, from a surface of the replaceable blade assembly body 27201 generally opposite to the surface having the razor blades 142. The blade assembly post 27251 may include at least one post magnet 27253 (e.g., a disc magnet or the like). In at least one embodiment, the post magnet 27253 may be disposed proximate a distal end of the blade assembly post 27251.

The blade cartridge retention frame 27202 may include a frame cavity and/or aperture 27255 configured to receive at least a portion of the blade assembly post 27251, and in particular, the post magnet 27253. The blade cartridge retention frame 27202 may also include at least one frame magnet 27257 proximate to the frame cavity 27255. In at least one embodiment, the frame magnet 27257 may be an annular magnet that is aligned substantially coaxially with the frame cavity 27255 such that the blade assembly post 27251 (and in particular, the post magnet 27253) is at least partially received in a central region of the annular frame magnet 27257. The annular magnet may include any annular magnet described herein such as, but not limited to, a single ring shaped annular magnet and/or an array of individual magnets aligned in a generally ring shape. Alternatively (or in addition), a frame magnet 27257 may be disposed proximate a base of the frame cavity 27255.

One or more of the post magnets 27253 and frame magnets 27257 may be configured to generate a repulsive magnetic force. In particular, in an embodiment where the frame magnet 27257 is an annular frame magnet, the post magnet 27253 and the annular frame magnet 27257 may secure and retain the replaceable blade cartridge assembly insert 27222 to the blade cartridge retention frame 27202 in a manner substantially similar that described with respect to FIGS. 81A-81B. In particular, the post magnet 27253 and the annular frame magnet 27257 may create a repulsive magnetic force that urges the replaceable blade cartridge assembly insert 27222 into the replaceable blade cartridge assembly insert cavity 27204 of the blade cartridge retention frame 27202. The replaceable blade cartridge assembly insert cavity 27204 may have a size and shape that generally retains the replaceable blade cartridge assembly insert 27222 and generally prevents the replaceable blade cartridge assembly insert 27222 from moving relative to the blade cartridge retention frame 27202.

In one embodiment, a portion of the blade assembly post 27251 extends beyond the frame cavity 27255, for example, as generally illustrated. To remove the replaceable blade assembly 27222 from the replaceable blade cavity 27204, the user may apply a force to the exposed portion of the blade assembly post 27251 to urge the blade assembly post 27251 out of the frame cavity 27255. As described herein, an ejection force may be created between the post magnets 27253 and frame magnets 27257 once the post magnets 27253 pass beyond a certain point of the annular frame magnets 27257 (e.g., position C as shown in FIGS. 81A-81B). The ejection force may facilitate removal of the replaceable blade cartridge assembly insert 27222 from the replaceable blade cavity 27204.

Optionally, the blade cartridge support member 27224 (e.g., but not limited to the yoke 27247) may include biasing magnet 27261. The biasing magnet 27261 may be configured to generate an attractive and/or repulsive magnetic force with the post magnet 27253 and/or the frame magnet 27257 to urge the replaceable blade cartridge assembly insert 27222 and blade cartridge retention frame 27202 towards an initial starting position (e.g., a default position of the shaving device 10). Upon application of an external force to the replaceable blade cartridge assembly insert 27222 and blade cartridge retention frame 27202, the replaceable blade cartridge assembly insert 27222 and blade cartridge retention frame 27202 may pivot about the pivot axis PA (e.g., around pins/cylinders 34) as generally described herein. The attractive and/or repulsive magnetic force between the biasing magnet 27261 and the post magnet 27253 and/or the frame magnet 27257 may resist the external force and urge the replaceable blade cartridge assembly insert 27222 and blade cartridge retention frame 27202 towards the initial starting position when the external force is removed.

A benefit to the embodiment shown in FIGS. 272-273 is that the disposable portion (e.g., the replaceable blade cartridge assembly insert 27222) may reduce the amount of material waste discarded when the blades in the replaceable blade cartridge assembly insert 27222 have become dull and unusable. Further, the embodiment shown in FIGS. 272-273 may be rendered entirely recyclable (depending on the materials used for its construction during manufacturing). In addition and as a result of the design, the amount of magnets discarded (e.g., post magnet 27253) and manufacturing costs may both be reduced.

Turning now to FIGS. 274-275, another embodiment of the replaceable blade cartridge assembly insert 27222 is generally illustrated. The replaceable blade cartridge assembly insert 27222 may be similar to the replaceable blade cartridge assembly insert 27222 of FIGS. 272-273; however, the blade assembly post 27251 (and the post magnet 27253) may be removably coupled to the replaceable blade assembly body 27201. For example, the blade assembly post 27251 may be threadably coupled to the replaceable blade assembly body 27201 as generally illustrated in FIG. 276. As shown, at least a portion of the external surface 27602 of the blade assembly post 27251 may include a threaded region 27604 configured to threadably engage a corresponding threaded region 27606 of a cavity 27608 formed in the replaceable blade assembly body 27201. Of course, this arrangement may also be reversed.

Alternatively, the blade assembly post 27251 may be coupled to the replaceable blade assembly body 27201 using a reversible snap connection or the like as generally illustrated in FIG. 277. For example, the blade assembly post 27251 may define a passageway 27702 that allows an instrument to be inserted therein to move a snap fastener 27704 out of engagement with a corresponding snap retaining cavity 27706 formed within an aperture 27708 of the replaceable blade assembly body 27201. It should be appreciated that these are merely non-limiting examples, and that the blade assembly post 27251 may be removably coupled to the replaceable blade assembly body 27201 in any manner known to those skilled in the art. A benefit of the removable blade assembly post 27251 is that it may facilitate recycling of the post magnet 27253.

It should be appreciated that in any of the embodiments described herein, the collar 7714/16999 may be coupled to the rest of the handle 60 (e.g., but not limited to, the shaft portion 77) using a post and cavity. For example, the shaft portion 77, FIG. 278, may include a shaft post 27802 configure to be at least partially received in a corresponding shaft cavity 27902, FIG. 279, of the collar 7714/16999. The shaft post 27802 may extend outward from a distal end of the shaft portion 77 of the handle 60, for example, generally along a longitudinal axis L of the handle 60 and/or shaft portion 77. The shaft post 27802 may have a cylindrical or non-cylindrical shape, and the shaft cavity 27902 may have a corresponding shape. The non-cylindrical shape of the shaft post 27802 and the shaft cavity 27902 may form a positive mechanical engagement that generally prevents rotation of the collar 7714/16999 relative to the shaft portion 77 of the handle 60.

Optionally, the collar 7714/16999 may include a locking aperture 28002 extending from an external surface of the collar 7714/16999 to the shaft cavity 27902. The locking aperture 28002 may be configured to allow a pin, screw, bolt or the like to extend from the collar 7714/16999, through the locking aperture 28002, and engage a portion of the shaft post 27802 to aid in securing the collar 7714/16999 to the shaft portion 77 of the handle 60 and generally prevent movement therebetween.

Turning now to FIGS. 281-282, another embodiment of a shaving device 10 is generally illustrated. The shaving device 10 includes a blade cartridge support member 24 which may be removably coupled to the handle 60. For example, the handle 60 may include a handle post 9302 extending outward from the handle 60 (such as, but not limited to, from a collar 7714/16999. The blade cartridge support member 24 may include a support member cavity 9304 as described herein configured to receive at least a portion of the handle post 9302. The support member cavity 9304 may include one or more annular magnets 9316 as described herein.

The distal end of the handle post 9302 may optionally include an enlarged ball/head 24602 and may also include one or more central magnets 9312. The poles of the central magnet 9312 and the annular magnet 9316 may be configure to generate a repulsive magnet force that urges the blade cartridge support member 24 and the handle 60 together and couples the blade cartridge support member 24 to the handle 60 as described herein (see, e.g., FIGS. 79-82 and the corresponding description).

The enlarged ball/head 24602 of the handle post 9302 may be configured to pass at least partially through the central region 9314 of the annular magnet 9316. As such, the blade cartridge support member 24 may be coupled to and/or removed from the handle 60 in a manner similar to that described in FIGS. 79-82. The enlarged ball/head 24602 of the handle post 9302 may be received in a corresponding ball or head socket/cavity 24604 of the support member cavity 9304 to form a ball joint (e.g., a ball and socket joint) 24701 such that the blade cartridge support member 24 can move with respect to the longitudinal axis L of the handle 60 (e.g., the handle post 9302). In the embodiment illustrated in FIG. 281, the blade cartridge support member 24 may move in an up/down motion, a left/right motion, and/or a twisting motion relative to the longitudinal axis L. When the blade cartridge support member 24 is displaced from the initial starting position relative to the handle 60 (e.g., upon application of an external force), the repulsive magnetic force between the central magnet 9312 and the annular magnet 9316 may urge the blade cartridge support member 24 back towards the initial starting position.

In particular, the central magnet 9312 may be located substantially coaxially with the annular magnet 9316 when the blade cartridge support member 24 is disposed at the initial starting position. When the blade cartridge support member 24 is displaced from the initial starting position, the repulsive magnetic force between the central magnet 9312 and the annular magnet 9316 will cause the central magnet 9312 and the annular magnet 9316 to want to naturally align their poles such that the poles are closest to each other and closest to being coaxial. As a result, the repulsive magnetic force will urge the blade cartridge support member 24 back towards the initial starting position and the blade cartridge support member 24 will move relative to the handle 60 as the enlarged ball/head 24602 moves within and relative to the corresponding ball or head socket/cavity 24604. Movement of the blade cartridge support member 24 relative to the handle 60 may be limited in one or more directions using any mechanism described herein. For example, the blade cartridge support member 24 and/or the handle 60 may include one or more guides 28202 which may be removably received in and move within slots/channels/grooves or the like 28204 as generally illustrated in FIG. 282.

The blade cartridge 22 may be pivotably coupled to one or more arms 30 of the blade cartridge support member 24 and may include one or more razor blades (not shown) disposed on one or more faces 9324. In the illustrated embodiment, the blade cartridge 22 includes a plurality of razor blades on a first face 9324. The opposing face 9326 may include one or more cartridge magnets 9318. While the cartridge magnet 9318 is shown in the middle of the opposing face 9326, it should be appreciated that one or more cartridge magnets 9318 may be disposed anywhere on the face 9326.

The cartridge magnet 9318 has its pole aligned with the central magnet 9312 to generate a repulsive magnetic force when the blade cartridge support member 24 is coupled to the handle 60. The repulsive magnetic force may generally urge (i.e., biases) the blade cartridge 22 away from the yoke 47 and/or handle 60 as described herein. The blade cartridge support member 24 and/or blade cartridge 22 may include one or more IPS protrusions, shoulders, ridge, and/or extensions 9328 (not shown for clarity) that sets the Initial Starting Position (ISP) of the blade cartridge 22 relative to the blade cartridge support member 24 and the handle 60.

Turning now to FIGS. 283-284, a further embodiment of a shaving device 10 is generally illustrated. The shaving device 10 includes a blade cartridge support member 24 which may be either permanently or removably coupled to the handle 60. For example, the handle 60 may include a handle post 9302 extending outward from the handle 60 (such as, but not limited to, from a collar 7714/16999. The blade cartridge support member 24 may include a support member cavity 9304 as described herein configured to receive at least a portion of the handle post 9302. The support member cavity 9304 may include one or more annular magnets 9316 as described herein.

The distal end of the handle post 9302 may optionally include an enlarged ball/head 24602 and may also include one or more central magnets 9312. The poles of the central magnet 9312 and the annular magnet 9316 may be configured to generate a repulsive magnet force that urges the blade cartridge support member 24 and the handle 60 together and couples the blade cartridge support member 24 to the handle 60 as described herein (see, e.g., FIGS. 79-82 and the corresponding description).

The enlarged ball/head 24602 of the handle post 9302 may have cross-sectional dimensions (e.g., but not limited to, a diameter or the like) which is larger than the cross-sectional dimensions (e.g., but not limited to, a diameter or the like) of the central region 9314 of the annular magnet 9316 such that the enlarged ball/head 24602 is captured within a corresponding ball or head socket/cavity 24604 of the support member cavity 9304 (e.g., by way of a positive mechanical engagement connection) to form a ball joint (e.g., a ball and socket joint) 24701. The enlarged ball/head 24602 may optionally be formed from a resiliently deformable material as described herein such that the enlarged ball/head 24602 may pass through the central region 9314 of the annular magnet 9316 and the blade cartridge support member 24 may be removably coupled to the handle 60.

As noted above, the enlarged ball/head 24602 of the handle post 9302 may be received in a corresponding ball or head socket/cavity 24604 of the support member cavity 9304 to form a ball joint (e.g., a ball and socket joint) 24701 such that the blade cartridge support member 24 can move with respect to the longitudinal axis L of the handle 60 (e.g., the handle post 9302). In the embodiment illustrated in FIG. 283, the blade cartridge support member 24 may move in an up/down motion, a left/right motion, and/or a twisting motion relative to the longitudinal axis L. When the blade cartridge support member 24 is displaced from the initial starting position relative to the handle 60 (e.g., upon application of an external force), the repulsive magnetic force between the central magnet 9312 and the annular magnet 9316 may urge the blade cartridge support member 24 back towards the initial starting position.

In particular, the central magnet 9312 may be located substantially coaxially with the annular magnet 9316 when the blade cartridge support member 24 is disposed at the initial starting position. When the blade cartridge support member 24 is displaced from the initial starting position, the repulsive magnetic force between the central magnet 9312 and the annular magnet 9316 will cause the central magnet 9312 and the annular magnet 9316 to want to naturally align their poles such that the poles are closest to each other and closest to being coaxial. As a result, the repulsive magnetic force will urge the blade cartridge support member 24 back towards the initial starting position and the blade cartridge support member 24 will move relative to the handle 60 as the enlarged ball/head 24602 moves within and relative to the corresponding ball or head socket/cavity 24604. Movement of the blade cartridge support member 24 relative to the handle 60 may be limited in one or more directions using any mechanism described herein. For example, the blade cartridge support member 24 and/or the handle 60 may include one or more guides 28202 which may be removably received in and move within slots/channels/grooves or the like 28204 as generally illustrated in FIG. 284.

The blade cartridge 22 may be removably pivotably coupled to one or more arms 30 of the blade cartridge support member 24 and may include one or more razor blades (not shown) disposed on one or more faces 9324. In the illustrated embodiment, the blade cartridge 22 includes a plurality of razor blades on a first face 9324. As described herein, one or more of the pivot receptacles 32 and/or arms 30 includes one or more arm magnets 18206 (e.g., one or more permanent magnets and/or electromagnets) as described herein. The arm magnets 18206 may be configured to create an attractive magnetic force with the pivot pin/cylinder 34 received therein. For example, the pivot pin/cylinder 34 may include a ferrous material that is magnetically attracted to the arm magnets 18206, thereby mounting, securing, and/or otherwise coupling the blade cartridge 22 to the blade cartridge support member 24. Alternatively (or in addition), the pivot pin/cylinder 34 may include a magnet having its poles align such that it is magnetically attracted to the arm magnets 18206, thereby mounting, securing, and/or otherwise coupling the blade cartridge 22 to the blade cartridge support member 24. In either case, the blade cartridge 22 may rotate about the pivot axis PA relative to the blade cartridge support member 24 at any angle, up to and including 360° degrees as described herein.

The blade cartridge 22 may include one or more blade cartridge magnets 18208 coupled and fixed to one or more of the lateral edges of the blade cartridge 22 and generally facing the arm magnets 18206 as described herein. Similar to the arm magnets 18206, the blade cartridge magnets 18208 may also have a square, rectangular, oblong, oval, and/or elongated shape. The arm magnets 18206 and the blade cartridge magnets 18208 may be aligned to generate an attractive or repulsive magnetic force.

The lateral edges of the blade cartridge 22 and/or the pivot receptacles 32 may also include one or more rotation limiters as described herein (not shown for clarity). The rotation limiters may be disposed proximate to the pivot pin/cylinder 34 and/or the pivot receptacles 32, and may be configured to engage a portion of the arm 30 (e.g., a rotation limiter cavity 20310 as generally illustrated in FIGS. 203-204) to generally limit the rotation of the blade cartridge 22 about the pivot axis PA to a predefined range as described herein. It should be appreciated that one or more arms 30 may include one or more rotation limiters 18210 (not shown for clarity) which may engage against a portion of the blade cartridge 22 (e.g., but not limited to, the rotation limiters 18210 of the blade cartridge 22).

It should be appreciated that one or more of the magnets described herein may include an electromagnet. The electromagnet may be user selectable between a first mode and a second mode. In the first mode, the poles of the electromagnet are aligned as described herein in order to attach, retain, and/or bias the blade cartridge support member 24 relative to the handle 60 and/or to attach, retain, and/or bias the blade cartridge 22 relative to the blade cartridge support member 24 and/or handle 60. In the second mode, the poles of the electromagnet are selectively reversed from the first mode. In particular, a user may reverse the poles of the electromagnet to facilitate removal of the blade cartridge support member 24 relative to the handle 60 and/or to facilitate removal of the blade cartridge 22 relative to the blade cartridge support member 24 and/or handle 60. As may be appreciated, the poles of the electromagnet may be reversed by applying current to the coil in the reverse direction.

Turning now to FIGS. 285-286, yet a further embodiment of a shaving device 10 is generally illustrated. The connection between the blade cartridge support member 24 and the handle 60 may be generally the same as in FIGS. 283-284, however, the shaving device 10 may include a head assembly 27220 including a replaceable blade cartridge assembly insert 27222 and a blade cartridge support member 27224, for example, as described in FIGS. 272-277. In particular, the replaceable blade cartridge assembly inserts 27222 may be removably coupled to the blade cartridge retention frame 27202/replaceable blade cartridge assembly insert cavities 27204 using one or more magnets, e.g., as shown in FIGS. 285-286. For example, the replaceable blade cartridge assembly inserts 27222 may include a blade assembly post 27251 extending outward from the replaceable blade assembly body 27201, for example, from a surface of the replaceable blade assembly body 27201 generally opposite to the surface having the razor blades 142. The blade assembly post 27251 may include at least one post magnet 27253 (e.g., a disc magnet or the like). In at least one embodiment, the post magnet 27253 may be disposed proximate a distal end of the blade assembly post 27251.

The blade cartridge retention frame 27202 may include a frame cavity and/or aperture 27255, FIG. 286, configured to receive at least a portion of the blade assembly post 27251, and in particular, the post magnet 27253. The blade cartridge retention frame 27202 may also include at least one frame magnet 27257 proximate to the frame cavity 27255. In at least one embodiment, the frame magnet 27257 may be an annular magnet that is aligned substantially coaxially with the frame cavity 27255 such that the blade assembly post 27251 (and in particular, the post magnet 27253) is at least partially received in a central region of the annular frame magnet 27257. The annular magnet may include any annular magnet described herein such as, but not limited to, a single ring shaped annular magnet and/or an array of individual magnets aligned in a generally ring shape. Alternatively (or in addition), a frame magnet 27257 may be disposed proximate a base of the frame cavity 27255.

One or more of the post magnets 27253 and frame magnets 27257 may be configured to generate a repulsive magnetic force. In particular, in an embodiment where the frame magnet 27257 is an annular frame magnet, the post magnet 27253 and the annular frame magnet 27257 may secure and retain the replaceable blade cartridge assembly insert 27222 to the blade cartridge retention frame 27202 in a manner substantially similar that described with respect to FIGS. 81A-81B. In particular, the post magnet 27253 and the annular frame magnet 27257 may create a repulsive magnetic force that urges the replaceable blade cartridge assembly insert 27222 into the replaceable blade cartridge assembly insert cavity 27204 of the blade cartridge retention frame 27202. The replaceable blade cartridge assembly insert cavity 27204 may have a size and shape that generally retains the replaceable blade cartridge assembly insert 27222 and generally prevents the replaceable blade cartridge assembly insert 27222 from moving relative to the blade cartridge retention frame 27202.

The post magnet 27253 and/or frame magnet 27257 may generate an either attractive or repulsive magnetic biasing force with the central magnet 9312 and/or the annular magnet 9316 which urges the blade cartridge 22 towards the initial starting position.

Any of the magnets described herein may include nanotechnology materials. It should be appreciated that any of the resistive pivot mechanisms described herein or any combination described herein (such as, but not limited to, the magnetic resistive pivot mechanisms) may be used with any head assembly, and is therefore not limited to a multi-faced head assembly. For example, the resistive pivot mechanisms described herein may be used with a head assembly having razor blades only a single face, and that only pivots about the single face. The resistive pivot mechanisms described herein may also be used with a head assembly of any conventional shaving device, which may have razor blades disposed on only one face of a single sided cartridge head assembly that only pivots about the single side containing the razor blades. It should be further appreciated that any of the resistive pivot mechanisms described herein (such as, but not limited to, the magnetic resistive pivot mechanisms) may provide the added benefit of greatly increasing the predefined degree of rotation, particularly compared to traditional single sided razors, thereby providing the user with a more contoured shave.

Any one of the embodiments described herein may include a head assembly 20 which has two blade faces and is rotatable about the longitudinal axis of the handle 60. For example, the user may select a new face by simply rotating the head assembly 20 in a plane that is substantially perpendicular to the longitudinal axis of the handle 60.

A razor consistent with one or more of the embodiments described herein may feature numerous benefits and/or advantages. For example, a razor consistent with at least one embodiment may feature a more environmentally friendly design because certain components of the single, dual and tri sided cartridge systems may utilize less material during the manufacturing process, than that of any two or three standard single sided cartridge equivalents and their packaging that are assembled individually such as, but not limited to, the connection interface, the yoke, the replaceable cartridge insert frame/housing and razor cartridge packaging.

Additionally, or alternatively, packaging that currently holds four standard single sided cartridges would only need a slight modification to be able to accommodate the equivalent number of dual-sided razors consistent with at least one embodiment of the present disclosure. Essentially enabling the manufacturer to transport the equivalent of double the number of standard single cartridges in a slightly modified container that previously held only four standard single cartridges. Consistent with at least one embodiment of the present disclosure, this may promote a more environmentally friendly design as the amount of containers needed to transport cartridges is dramatically reduced and roughly cut in half.

According to another embodiment, a blade cartridge having a pivot point located at or approximately the center of the cartridge head assembly, is advantageous to the user. For example, this design allows and maximizes the amount of surface area blade contact with the skin. Particularly over contoured areas with difficult terrain, such as the head, neck chin, body anatomy of the trunk area (including the genitals) and the legs. In contrast to the pivot point described herein, having the pivot point located at the bottom of the cartridge is disadvantageous because the bottom portion of the cartridge naturally lifts away from the surface of the skin when the biasing rod “bottoms out” as the razor is drawn over the area being shaved. This results in missed hairs and causes the user to perform additional shaving strokes. This is known as re-stroking, which is a common cause of skin irritation which occurs in some individuals after shaving. The reason this happens is because after the biasing rod bottoms out, the user continues to apply rotation to the cartridge by raising the handle upwards whilst performing a downward shaving stroke or vice versa. This in turn continues to rotate the cartridge, lifting it away from the skin, which as mentioned previously, causes missed hairs and forces the user to perform additional shaving strokes. At least one embodiment of the blade cartridge described herein may address this problem because having the pivot point located at the center of the cartridge head assembly, coupled with the resistive pivot mechanism, may allow the razor cartridge to better follow the contour of the skin. This may increase the surface area blade contact with the area being shaved and may result in fewer missed hairs.

According to yet another embodiment, a razor with a dual or tri-sided rotating cartridge as described herein has significant advantages to both the consumer and the manufacturer. To the consumers and manufacturers that are environmentally sensitive and cost conscious, this design may address both of these important concerns. A recently released consumer report from the EPA, indicated that in the USA alone, over 2 billion disposable razor cartridges are discarded annually. As described herein, one or more embodiments of the present disclosure may address both the economic advantages to the manufacturer and the important environmental issue mentioned above because as previously mentioned, during the manufacturing process certain components of the dual cartridge system may utilize less material than that of two standard single cartridges which are assembled individually. For example, the arms, the connection interface and the cartridge head assembly may all use less material during manufacturing than that of any standard single cartridge equivalents which were assembled individually. Therefore, it is reasonable to assume that a dual or tri-sided razor cartridge system (including the containers in which the cartridges are packaged and shipped) may use less material during manufacturing than that of any two standard single cartridge equivalents and their respective containers and therefore may be more economical to manufacture and subsequently much kinder to the environment. One important reason for this is because the reduction in manufacturing and packaging material may cause the amount of cartridge containers required for shipping to be reduced. This may lower the frequency of transportation needs for distribution purposes, which may cut back on the amount of fuel being burned and released into the atmosphere, and may generally reduce both greenhouse gas emissions as well as unnecessary environmental waste.

As may be appreciated, it is becoming increasingly more popular to shave various parts of ones anatomy, and there are numerous shaving devices to facilitate this. As may be appreciated, having numerous shaving devices is expensive and cumbersome. At least one embodiment of the present disclosure features blade cartridges that will have different blade configurations depending on which cartridge the user selects, thereby giving the user the distinct advantage of needing only one device (where multiple devices were previously required) to perform multiple shaving tasks.

For example, a standard dual cartridge configuration may feature each cartridge side having a “3 & 3” blade arrangement in which six blades are all facing the same direction of cut, separated in the center by a lubrication strip. This configuration may be particularly useful for conventional shaving purposes.

A body blade dual cartridge combination configuration may feature each cartridge side having a “3 & 3” blade arrangement in which six blades are separated in the center by a lubrication strip, but each side will be configured differently. On one side of the cartridge, the two sets of three blades may be separated by the lubrication strip in the center, and will be arranged in opposing directions of cut. This may be a particularly useful blade arrangement for consumers that shave their head or any other awkward area of the body, as they can use a “back and forth” shaving stroke motion, without having to lift the razor from the area being shaved to begin a new stroke. Alternatively, on the second side of the cartridge, all of the blades may be in the same direction of cut for conventional shaving. This cartridge configuration may give the user great flexibility, as only one device is required to shave any part of their anatomy.

Lubrication is an essential component in the never ending quest to give the user a smoother, faster, more efficient and nick free shaving experience. Therefore, at least one embodiment consistent with the present disclosure may feature lubrication strips placed before the blades make contact to the skin and after the shaving stroke is completed. In contrast, placing the lubrication strip at the top edge of the cartridge to lubricate the skin at the end of a shaving stroke may be adequate; however, this arrangement does not provide for lubrication during the motion of a shaving stroke. At least one embodiment consistent with the present disclosure addresses this critical issue by placing a lubrication strip in the center of the cartridge, thereby dividing the blade configuration and further lubricating the skin during the midst of a shaving stroke. As a result, a smoother, faster and more efficient shaving stroke may be provided resulting in an all-round better shaving experience for the user.

Moreover, at least one embodiment consistent with the present disclosure may feature a cushioning mechanism. Having a cushioning mechanism located within the arms (and optionally again at the end of each arm where it attaches to the connection hub assembly), may give this design the significant advantage of independently cushioning each end of the cartridge, thereby providing the blade cartridge a greater range of movement and facilitating a closer and more contoured shaving experience.

At least one embodiment of the present disclosure may feature an extendable/telescoping handle with a hinged neck and detachable head assembly. This arrangement may permit the user to position the cartridge at a right angle to the handle and allow the user to rotate the position of the cartridge head, such that it is aligned generally parallel to the longitudinal axis of the handle. This cartridge position is particularly useful when shaving awkward or hard to reach areas of the user's body like the head, back and legs etc.

According to one aspect, the present disclosure may feature a shaving device comprising a head assembly. The head assembly may include a support member configured to be detachably coupled to a handle and a blade cartridge having a first and a second face wherein at least one of the first or second faces comprises at least one razor blade. The blade cartridge may be configured to be rotatably coupled to the support member about a pivot axis PA such that the blade cartridge is pivotable by a user to select one of the first or second faces.

According to another aspect, the present disclosure may feature a shaving device comprising a handle and a head assembly. The head assembly may include a support member and a blade cartridge. The support member may be configured to be detachably coupled to the handle and include a first and a second support arm comprising a first and a second pivot receptacle. The blade cartridge may include a first and a second face wherein at least one of the first or second faces comprises at least one razor blade extending generally parallel to a longitudinal axis of the blade cartridge. The blade cartridge may further include a first and a second pivot pin extending outwardly from opposing lateral sides of the blade cartridge along a pivot axis PA of the blade cartridge. The pivot axis PA may extend generally parallel to the longitudinal axis of the blade cartridge, and the first and the second pivot pins may be configured to be rotatably coupled to the first and the second pivot receptacles, respectively, such that the blade cartridge may be pivoted about the pivot axis PA to select a first or a second initial starting position corresponding to the first or the second face, respectively.

The shaving device may optionally include a resistive pivot mechanism configured to allow a user to rotate the blade cartridge about the pivot axis PA to select one of a first or second face position corresponding to the first and second faces of the blade cartridge, respectively. The resistive pivot mechanism may be configured to allow the blade cartridge to rotate within a predefined rotation range while at the selected face position. The number of degrees that the blade cartridge may rotate about the pivot axis PA relative to the initial starting position may depend on the intended use. For example, the blade cartridge may rotate within a range of approximately 5 degrees to approximately 90 degrees about the pivot axis PA relative to the initial starting position, and any range therein. According to another embodiment, the blade cartridge may rotate within a range of approximately 5 degrees to 60 degrees about the pivot axis PA relative to the initial starting position, and any range therein. For example, the blade cartridge may rotate within a range of approximately 5 degrees to 45 degrees about the pivot axis PA relative to the initial starting position. According to yet another embodiment, the blade cartridge may rotate within a range of approximately 5 degrees to approximately 25 degrees about the pivot axis PA relative to the initial starting position, and any range therein. According to yet a further embodiment, the blade cartridge may rotate within a range of approximately 5 degrees to approximately 15 degrees about the pivot axis PA relative to the initial starting position, and any range therein.

According to another aspect, the present disclosure may feature a method comprising rotating a blade cartridge coupled to a support member about a pivot axis PA to select one of a plurality of faces of the blade cartridge, wherein at least one of the plurality of faces includes at least one razor blade.

While preferred embodiments of the present disclosure have been described, it should be understood that various changes, adaptations and modifications can be made therein without departing from the spirit of the invention(s) and the scope of the appended claims. The scope of the present disclosure should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A shaving device comprising:

a handle;

a support frame including a first arm and a second arm;

a blade cartridge configured to be secured to said support frame and to pivot about a pivot axis during shaving with said shaving device at a selected position;

a first arm magnet and a second arm magnet fixedly coupled to said first arm and said second arm, respectively;

a first pair of rotation magnets and a second pair of rotation magnets each including a first rotation magnet and a second rotation magnet disposed on opposite sides of said pivot axis;

wherein said first pair of rotation magnets and said second pair of rotation magnets are configured to pivot with said blade cartridge about said pivot axis during use of said shaving device and generate a magnet force with said first arm magnet and said second arm magnet that urges said blade cartridge to an initial starting position relative to said handle, the selected position including the initial starting position.

2. The shaving device of claim 1, wherein said blade cartridge is removably secured to said support frame.

3. The shaving device of claim 1, wherein said blade cartridge includes a first face and a second face each having a plurality of razor blades.

4. The shaving device of claim 3, wherein said first rotation magnet of said first pair of rotation magnets is aligned with said first arm magnet and said first rotation magnet of said second pair of rotation magnets is aligned with said second arm magnet when said blade cartridge is aligned in a first position relative to said handle; and wherein said second rotation magnet of said first pair of rotation magnets is aligned with said first arm magnet and said first rotation magnet of said second pair of rotation magnets is aligned with said second arm magnet when said blade cartridge is aligned in a second position relative to said handle.

5. The shaving device of claim 1, wherein said magnet force includes an attractive magnetic force.

6. A shaving device comprising:

a handle;

a support frame including a first arm and a second arm;

a blade cartridge configured to be secured to said support frame and to pivot about a pivot axis during shaving with said shaving device at a selected position;

a first arm magnet and a second arm magnet fixedly coupled to said first arm and said second arm, respectively;

a first pair of rotation magnets and a second pair of rotation magnets configured to pivot with said blade cartridge about said pivot axis and to face said first arm magnet and second arm magnet, respectively, each of said first pair of rotation magnets and said second pair of rotation magnets including a first rotation magnet and a second rotation magnet disposed on opposite sides of said pivot axis;

wherein said first pair of rotation magnets and said second pair of rotation magnets and said first arm magnet and said second arm magnet are configured to generate a magnet force that urges said blade cartridge to an initial starting position relative to said handle, the selected position including the initial starting position.

7. The shaving device of claim 6, wherein said blade cartridge is removably secured to said support frame.

8. The shaving device of claim 6, wherein said blade cartridge includes a first face and a second face each having a plurality of razor blades.

9. The shaving device of claim 8, wherein said first rotation magnets of said first pair of rotation magnets and said second pair of rotation magnets is aligned with said first arm magnet and said second arm magnet when said blade cartridge is aligned in a first position relative to said handle; and wherein said second rotation magnets of said first pair of rotation magnets and said second pair of rotation magnets is aligned with said first arm magnet and said second arm magnet when said blade cartridge is aligned in a second position relative to said handle.

10. The shaving device of claim 6, wherein said magnet force includes an attractive magnetic force.

11. A shaving device comprising:

a handle;

a support frame including a first arm and a second arm;

a blade cartridge configured to be secured to said support frame and to pivot about a pivot axis during shaving with said shaving device at a selected position, said blade cartridge including a first face and a second face each having a plurality of razor blades;

a first arm magnet fixedly coupled to said first arm;

a first rotation magnet and a second rotation magnet configured to pivot with said blade cartridge about said pivot axis during use of said shaving device;

wherein said first rotation magnet and said first arm magnet are configured to generate a first magnet force that urges said blade cartridge to a first initial starting position relative to said handle; and wherein said second rotation magnet and said first arm magnet are configured to generate a second magnet force that urges said blade cartridge to a second initial starting position relative to said handle;

wherein the selected position includes the first initial starting position and the second initial starting position.

12. The shaving device of claim 11, wherein said blade cartridge is removably secured to said support frame.

13. The shaving device of claim 11, wherein said first magnet force includes an attractive magnetic force.

14. A shaving device comprising:

a handle;

a support frame including a first arm and a second arm;

a blade cartridge configured to be secured to said support frame and to pivot about a pivot axis during shaving with said shaving device at a selected position;

a first arm magnet fixedly coupled to said first arm;

a first blade cartridge magnet configured to pivot with said blade cartridge about said pivot axis during use of said shaving device;

wherein said first blade cartridge magnet and said first arm magnet are configured to generate a magnet force that urges said blade cartridge to a first initial starting position relative to said handle, the selected position including the first initial starting position.

15. The shaving device of claim 14, wherein said blade cartridge is removably secured to said support frame.

16. The shaving device of claim 14, wherein said blade cartridge includes a plurality of razor blades on only a first face of said blade cartridge.

17. The shaving device of claim 14, wherein said blade cartridge includes a first face and a second face each having a plurality of razor blades.

18. The shaving device of claim 17, further comprising a second blade cartridge magnet configured to pivot with said blade cartridge about said pivot axis, said first blade cartridge magnet and said second blade cartridge magnet disposed on opposite sides of said pivot axis;

wherein said first blade cartridge magnet is aligned with said first arm magnet when said blade cartridge is aligned in said first initial starting position relative to said handle; and wherein said second blade cartridge magnet is aligned with said first arm magnet when said blade cartridge is aligned in a second initial starting position relative to said handle;

said first initial starting position and said second initial starting position corresponding to use positions associated with said first face and said second face, respectively.

19. The shaving device of claim 14, wherein said magnet force includes an attractive magnetic force.

* * * * *